United States Patent
Ryan et al.

(10) Patent No.: US 6,684,189 B1
(45) Date of Patent: Jan. 27, 2004

(54) APPARATUS AND METHOD USING FRONT-END NETWORK GATEWAYS AND SEARCH CRITERIA FOR EFFICIENT QUOTING AT A REMOTE LOCATION

(75) Inventors: Ronald B. Ryan, Wilton, CT (US); Ronald G. Marquart, Oakland, CA (US)

(73) Assignee: The Ryan Evalulife Systems, Inc., Stamford, CT (US)

( * ) Notice: Subject to any disclaimer, the term of this patent is extended or adjusted under 35 U.S.C. 154(b) by 0 days.

(21) Appl. No.: 08/906,736

(22) Filed: Aug. 4, 1997

Related U.S. Application Data

(63) Continuation-in-part of application No. 08/210,395, filed on Mar. 18, 1994, now Pat. No. 5,655,085, and a continuation-in-part of application No. 07/912,978, filed on Aug. 17, 1992, now Pat. No. 5,673,402.

(51) Int. Cl.[7] .............................................. G06F 17/60
(52) U.S. Cl. ......................................................... 705/4
(58) Field of Search .................................... 705/4, 36

(56) References Cited

U.S. PATENT DOCUMENTS

| | | | | |
|---|---|---|---|---|
| 3,634,669 A | * | 1/1972 | Soumas et al. ................ | 705/4 |
| 4,334,270 A | | 6/1982 | Towers ........................ | 364/300 |
| 4,346,442 A | | 8/1982 | Musmanao ................... | 364/408 |
| 4,648,037 A | | 3/1987 | Valentino ..................... | 364/408 |
| 4,742,457 A | | 5/1988 | Leon et al. ................... | 364/408 |
| 4,750,121 A | | 6/1988 | Halley et al. ................. | 364/408 |
| 4,752,877 A | | 6/1988 | Roberts et al. ............... | 364/408 |
| 4,831,526 A | * | 5/1989 | Luchs et al. ................... | 705/4 |
| 4,876,648 A | | 10/1989 | Lloyd .......................... | 364/408 |
| 4,953,085 A | | 8/1990 | Atkins ......................... | 364/408 |
| 4,974,878 A | | 12/1990 | Josephson .................... | 283/67 |
| 4,989,141 A | | 1/1991 | Lyons et al. ................. | 364/408 |
| 5,220,500 A | * | 6/1993 | Baird et al. .................... | 705/36 |
| 5,222,019 A | * | 6/1993 | Yoshino et al. ................ | 705/36 |
| 5,231,571 A | * | 7/1993 | D'Agostino ................... | 705/36 |
| 5,479,344 A | * | 12/1995 | Keziah, Jr. ...................... | 705/4 |
| 5,523,942 A | * | 6/1996 | Tyler et al. ..................... | 705/4 |
| 5,631,828 A | * | 5/1997 | Hagan ........................... | 705/4 |
| 5,754,980 A | * | 5/1998 | Anderson et al. .............. | 705/4 |
| 5,761,645 A | * | 6/1998 | Hawkins ........................ | 705/4 |
| 5,809,478 A | * | 9/1998 | Greco et al. ................... | 705/4 |
| 5,873,066 A | * | 2/1999 | Underwood et al. ........... | 705/4 |
| 5,956,691 A | * | 9/1999 | Powers .......................... | 705/4 |
| 5,966,693 A | * | 10/1999 | Burgess ......................... | 705/4 |
| 6,064,969 A | * | 5/2000 | Haskins ......................... | 705/4 |

FOREIGN PATENT DOCUMENTS

| | | | | |
|---|---|---|---|---|
| EP | A 0396 062 | * | 11/1990 | ......... H04N/7/173 |

OTHER PUBLICATIONS

Insurance Software Review v13 No:1 p12–14–Spring, 1988.*

(List continued on next page.)

*Primary Examiner*—Vincent Millin
*Assistant Examiner*—Geoffrey Akers
(74) *Attorney, Agent, or Firm*—Peter K. Trzyna, Esq.

(57) ABSTRACT

A computer-implemented method using front-end network gateways and search criteria entered at a remote computer terminal to conduct a search of multiple financial products for efficient quoting at a remote location. The method includes the steps of providing at least one data input screen with signals communicated from a digital computer to the remote terminal connected by a communications system, the at least one data input screen at the terminal soliciting entry of financial product selection criteria, receiving the selection criteria from the terminal over the communications system at the digital computer, and using the front-end network gateways, data accessible by the digital computer representing the multiple financial products, and the selection criteria entered at the terminal to provide a quote at the terminal for a financial product identified from the multiple financial products.

887 Claims, 153 Drawing Sheets

OTHER PUBLICATIONS

Chen Steven–AT&T Technical Journal v 75 Mar./Apr., 1996 pp6–78.*

Get Rich Quick –David English–Compute! v16 n9 p38(7) Sep. 1994.*

Introduction "The Fcoundation of Webonomics" by Evan I. Schwartz.

Alliance & Leicester, "Guidance Notes for Mortgage Applicant's," (Dec. 1989).

Alliance & Leicester, "Your First Move—A Guide to Home Purchase for First–Time Buyers."

Alliance & Leicester, Insurance Brochure.

Alliance & Leicester, Mortgage Application.

Alliance & Leicester, Payment Protection Brochure.

*American Banker Publications*, Aug. 21, 1984, "Iron Horse of the '80's Clears Out the Pasture: Computer Systems Revamp the Lending World and Redefine the Role of the Lender", by Peter E. Knight.

*American Banker Publications*, Dec. 5, 1985, "Revolution Ahead for the Mortgage Business", by Alan R. Winger.

*American Banker Publications*, Jan. 23, 1984, "Mortgage Networks Arrange Loans on Computers", by David LaGesse.

*American Banker Publications*, Oct. 31, 1984, "Realty World Plans a Computerized Mortgage Network", by David LaGesse.

*Atlantic Monthly*, Jul., 1945, "As We May think" by Vannevar Bush.

*Atlantic Monthly*, May, 1996, "Backlogs of History".

Boleat and Coles, "Chapter 8: Loan Terms and Instruments," *The Mortgage Market*, pp. 94–104.

*Boston Globe*, Sep., 1996, "U.S. Requests Microsoft Documents" by Hiawatha Bray.

Canant, "How UL Can Help Home Owners," *National Underwriter*, pp. 21 & 24 (1985).

Coles, "Developments in the UK Mortgage Market," (Oct. 1990).

Compendium of Insurance Broker Articles.

Compendium of Quotal Articles.

Council of Mortgage Lenders, "How to Buy a House," (1990).

*Dow Jones Newswires*, Apr. 6, 1983, "First Boston Inc. To Offer Computerized Mortgage Banking".

*Elsevier Advanced Technology Publications*, Nov., 1988, "Implementation of an Intelligent Gageway System in Europe Advanced Information Report".

*Financial Services, Inc.*, Sep. 17, 1984, "Computer–based mortgages networks provide competitive edge".

General Portfolio Policy and Description.

Halifax Easy Start Mortgage Brochure.

Halifax, A Guide to Home Buying Brochure.

Halifax, Application for Mortgage.

Halifax, Confidential Questionnaire.

Halifax, Home Buying Service—Promotional Literature.

*IAC Trade & Industry Database*, "Delphi: Small Town Hospitality and Metropolitan Appeal".

*IAC Trade & Industry Database*, Oct., 1990, "A Realtor in the family: some lenders are trying to find out once and for all if it pays to have a Realtor in the family", by Howard Schneider.

*IAC Trade & Industry Database*, Sep., 1994, "Computerized loan origination systems: an industry case study of the electronic markets hypothesis", by Christopher M. Hess; Chris F. Kemerer.

Inview Sales Brochure.

*MIS Quarterly*/Sep., 1988, "Airline Reservations Systems: Lessons From History" by Duncan G. Copeland and James L.McKenney.

*Mortgage Banking*, Nov., a 1992, "Marketing Mortgages on MARS" by Jeff Lebowitz.

Mortgages, The Right One for You, (Jun. 1990).

Personal Finance Intelligence, vol. 4 (1989).

Quotel Insurance System Brochur, Promotional Literature.

Shillito, FCII, "Insurance Computer Systems," *Int'l Business Communications Limited*, (1990).

*The Wall Street Journal*, Mar. 19, 1996, "Computerized Mortgages Hit Snags With Lenders, Brokers", by Robert Guenther.

*Trade & Industry Index*, Sep. 2, 1988, "High–tech loan system grows; but lenders question Rennie Mae network" by Phil Roosevelt.

*US Banker*, Apr., 1995, "Putting lenders and realtors together".

*Washington Post*, Aug., 1996, "Netscape Seeks Closer Probe of Microsoft".

Web Page Georgia Tech, Nov., 1997, "GVU's $8^{th}$ WWW User Survey".

Web Page MIT, May, 1996, Speech by Tim Berners–Lee.

Web Page U. Penn, 1995, "The World Wide Web: Origins & Beyond" by Lenny Zeltser.

*Wired Magazine*, Jun., 1995, "The Curse of Xanadu" by Gary Wolf.

*Wired Magazine*, Oct., 1994, "The Second Phase of the Revolution has Begun" by Gary Wolf.

Introduction "The Foundation of Webonomics" by Evan I. Schwartz.

* cited by examiner

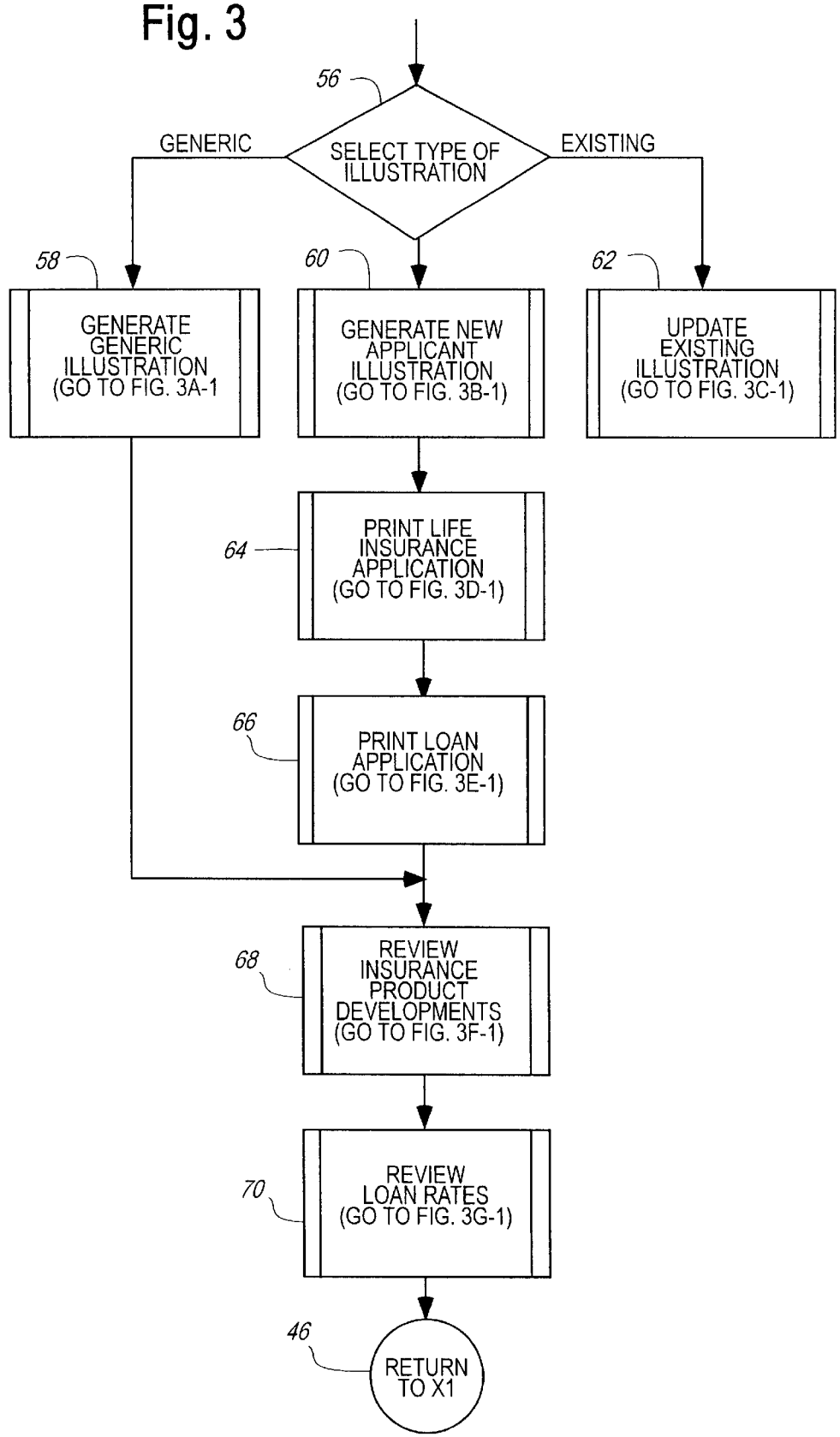

(FROM FIG. 3B-1)

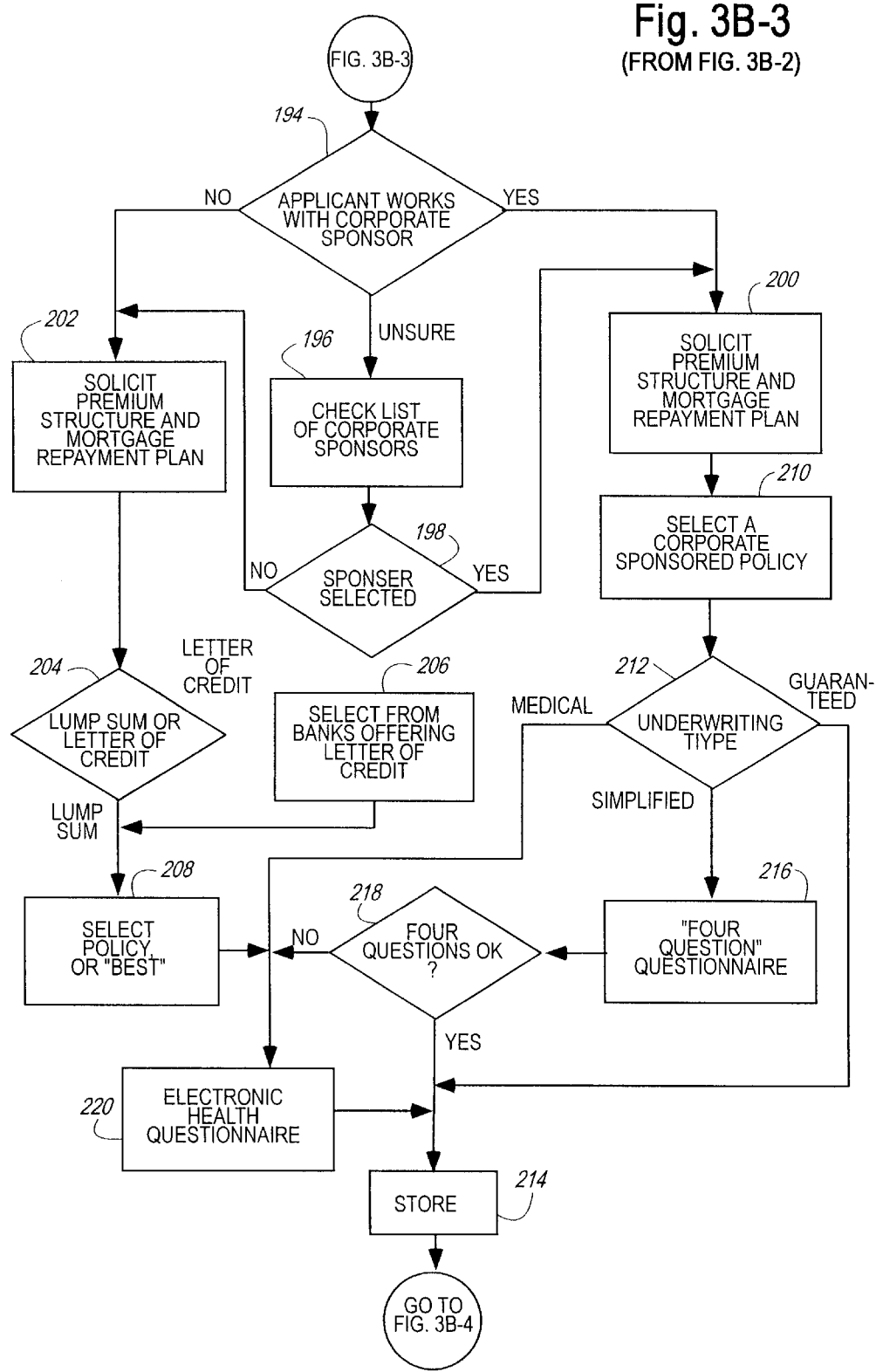

(FROM FIG. 3B-3 OF FIG. 3A-1)

(FROM FIG. 3B-4)

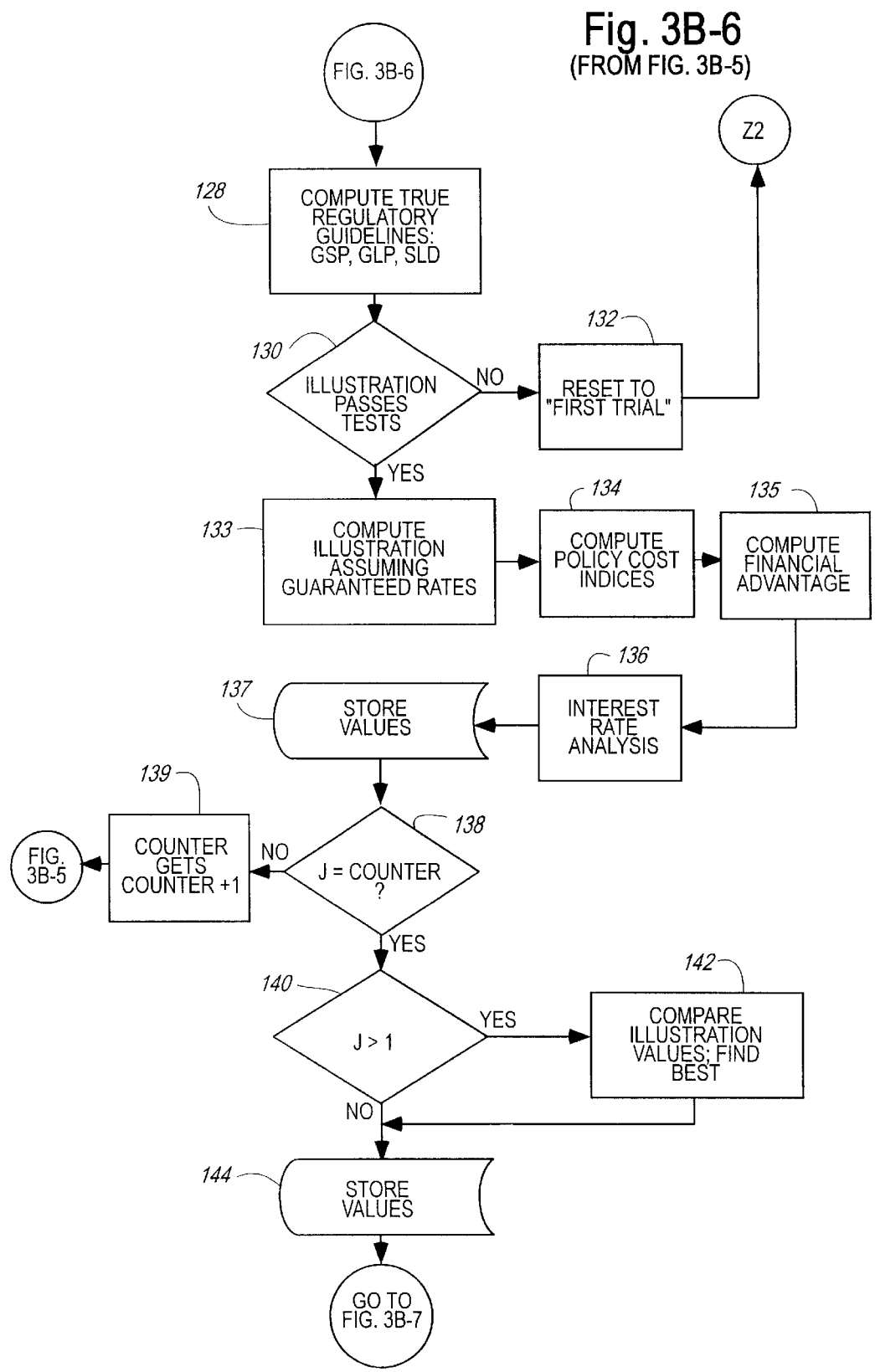

(FROM FIG. 3B-6)

(FROM FIG. 3B-7)

Screen 1. Main Menu Selection Screen

Screen 2. Update database screen depicting the update of the loan package table, used to define the available loan packages in the system.

Screen 3. Generic Illustration Screen.

Fig. 8

```
Applicant  Property  Tax Rate  Insurance  Mortgage  Proceed  Help  Main Menu
┌─────────────┐                ┌─────────┬──────────┐        ┌──────┐
│ Applicant   │                │ Premium │ Mortgage │        │ Help │
│ Employment  │                │ Insuranc│ Closing  │        │ Keys │
│ Health      │                │         │ costs    │        │System│
└─────────────┘                └─────────┴──────────┘        └──────┘
        ┌────────────────────────────────────────────┐
        │        Generic Supermenu Access            │
        ├────────────────────────────────────────────┤
        │              Person ID 382                 │
        │                                            │
        │            Illustration ID 266             │
        │                                            │
        │    Select menu items to review or update   │
        │           for the above applicant          │
        │         When done, select Proceed          │
        └────────────────────────────────────────────┘
```

Screen 4. Generic Supermenu Update Selection Screen

Fig. 9

```
┌─────────────────────── BORROWER ──────────────────────────────┐
│                                                               │
│      Person ID  384                                           │
│                                                               │
│      Last name  Stella                                        │
│     First name  Bozeman                                       │
│    Middle name  Amorey                                        │
│                                                               │
│        Address  666 Greenwich Street                          │
│                 Apt. 933                                      │
│                                                               │
│           City  New York              State  NY  ZIP  10014   │
│                                                               │
│          Phone  (212)861-7543  Date of birth  12/5/59  Sex  M │
│                                                               │
│                                                               │
│ F1 Help, F2 Main Menu, F3 EXIT, [PgUp] Last Screen, [PgDn] Next Screen │
└───────────────────────────────────────────────────────────────┘
```

Screen 5. Personal Information Input Screen

Fig. 10

```
┌─────────────────── EMPLOYER INFORMATION ──────────────────────┐
│  Employer Name  The Homeowner's Endorsement Plan, Inc.        │
│                                                               │
│        Address  3000 Ocean Street                             │
│                 Suite 310                                     │
│                                                               │
│           City  Millvale              State  CT  ZIP  01234   │
│                                                               │
│          Phone  (203)964-6100                                 │
│                                                               │
│        Contact  Pran Annana                                   │
│                                                               │
│     Occupation  Insurance Broker                              │
│          Title  Vice-President                                │
│                                                               │
│      Corporate                                                │
│     Sponsor ID                                                │
│                                                               │
│ F1 Help, F2 Main Menu, F3 EXIT, [PgUp] Last Screen, [PgDn] Next Screen │
└───────────────────────────────────────────────────────────────┘
```

Screen 6. Employer Information Input Screen

```
┌─────────────────────── PROPERTY ───────────────────────┐
│ Applicant is requesting this mortgage for a property at:│
│    Address  62 Hillock Road                             │
│                                                         │
│       City  Cannondale           State CT  ZIP  05555   │
│ Applicant's realty agent:                               │
│                                                Realtor ID│
│       Name  Milly Jenner                        3       │
│                                                         │
│       Firm  Chekov & Karney                             │
│    Address  310 Wilton Way                              │
│                                                         │
│       City  Wilton               State CT  ZIP  06894   │
│ F1 Help, F2 Main Menu, F3 EXIT, [PgUp] Last Screen, [PgDn] Next Screen│
└─────────────────────────────────────────────────────────┘
```

Fig. 11

Press [LIST] to select from a list of available realtors

Screen 7.  Property Information Input Screen

```
┌─────────────────── TAX RATE INFORMATION ───────────────────┐
│                                                             │
│ Enter current tax rate for calculation of mortgage deduction│
│ here  34%                                                   │
│                                                             │
│                                                             │
│ State in which applicant will reside   CT                   │
│ State in which applicant will work     CT                   │
│                                                             │
│ Estimated annual earnings - salary              $100,000.00 │
│ Estimated annual earnings - interest & dividends  $3,000.00 │
│ Other estimated income                           $40,000.00 │
│ Total                                           $143,000.00 │
│                                                             │
│                                                             │
│                                                             │
│                                                             │
│                                                             │
│ F1 Help, F2 Main Menu, F3 EXIT, [PgUp] Last Screen, [PgDn] Next Screen│
└─────────────────────────────────────────────────────────────┘
```

Fig. 12

Screen 8.  Tax Rate Information Input Screen

```
┌─────────────────── MORTGAGE INFORMATION ───────────────────┐
│                                                             │
│ Appraisal value of home  $262,000.00                        │
│                                                             │
│                                                             │
│    Illustration type   [X]  Current RYAN Authorized Loan    │
│                        [ ]  Hypothetical Loan               │
│                                                             │
│                                                             │
│                                                             │
│                                                             │
│                                                             │
│ Enter appraisal value, "X" in illustration type             │
│ F1 Help, F2 Main Menu, F3 EXIT, [PgUp] Last Screen, [PgDn] Next Screen│
└─────────────────────────────────────────────────────────────┘
```

Fig. 13

Screen 9.  Mortgage Information Input Screen

```
┌─────────────────────── MORTGAGE INFORMATION ───────────────────────┐
│ Mortgage information update as of  01-FEB-92                       │
│ Quotes rates valid thru  05-MAR-92  on  RYAN Mortgage              │
│                                                                    │
│ Select RYAN Authorized Loan to be illustrated  2   Current         │
│                                                    Quoted          │
│ # Lender                       Rate      Points  Interest  Term  Cap │
│ 1 Metropolitan Bank            Variable  2       10.25%    30    15.0% │
│ 2 Homeowner's Bank             Variable  1       10.50%    30    14.5% │
│ 3 First Country Bank           Fixed     2.5     11.00%    40    15.0% │
│                                                                    │
│                                                                    │
│ Enter known closing costs or use estimate based on average costs for │
│ mortgage of this size. Check appropriate box.                      │
│ Closing costs type:  [X] Known,  [ ] Estimate; Est closing costs   │
│ If estimate, enter the estimated closing date                      │
│                                                                    │
│ F1 Help, F2 Main Menu, F3 EXIT, [PgUp] Last Screen, [PgDn] Next Screen │
└────────────────────────────────────────────────────────────────────┘
```

Fig. 14

Screen 10.  Ryan Approved Loan Selection Screen

```
┌─────────────────────── MORTGAGE INFORMATION ───────────────────────┐
│                                                                    │
│ Mortgage Type:   RYAN                                              │
│                                                                    │
│                                                                    │
│ Appraisal value of home    $262,000.00                             │
│ Assumed Mortgage Term            30                                │
│ Assumed Rate of Interest     10.50%                                │
│ Assumed Mortgage Points           1                                │
│                                                                    │
│                                                                    │
│                                                                    │
│ Enter known closing costs or use estimate based on average costs for │
│ mortgage of this size. Check appropriate box.                      │
│ Closing costs type:  [ ] Known,  [X] Estimate; Est closing cost $4000.00 │
│ If estimate, enter the estimated closing date  1-MAR-92            │
│                                                                    │
│ F1 Help, F2 Main Menu, F3 EXIT, [PgUp] Last Screen, [PgDn] Next Screen │
└────────────────────────────────────────────────────────────────────┘
```

Fig. 15

Screen 11.  Hypothetical Mortgage Input Screen

```
┌─────────────────────── CLOSING COSTS INFORMATION ──────────────────┐
│ Closing costs information update as of  01-FEB-92                  │
│                                                                    │
│ Estimated Closing Fees other than mortgage points                  │
│                                                                    │
│                         Estimated this                             │
│                         state - mortgage                           │
│                         this size         If known                 │
│ Tax Escrow                $700.00                                  │
│ Interest adjustment     $1,000.00                         ┐        │
│ Legal                     $700.00                         │ Enter either │
│ Title                     $500.00                         ├─item costs OR │
│ Govmt record & trans       $50.00                         │ grand total │
│ Survey & inspection       $350.00                         │        │
│ Hazard insurance          $300.00                         ┘        │
│ Other                     $400.00                                  │
│ Total                   $4,000.00                                  │
│                                                                    │
│ F1 Help, F2 Main Menu, F3 EXIT, [PgUp] Last Screen, [PgDn] Next Screen │
└────────────────────────────────────────────────────────────────────┘
```

Fig. 16

Screen 12.  Known Closing Costs Input Screen

Fig. 17

```
┌─────────────────── PREMIUM STRUCTURE ───────────────────┐
│ Does applicant work for a company with special bulk purchase │
│ agreement with a particular carrier (Y = Yes, N = No)  N    │
│                                                              │
│ (Press [LIST] to see companies with special purchase arrangements │
│ with carriers and their corporate sponsor numbers)          │
│                                                              │
│ Corporate Sponsor number if known     ▒▒▒▒▒▒               │
│                                                              │
│                                                              │
│                                                              │
│                                                              │
│                                                              │
│ F1 Help, F2 Main Menu, F3 EXIT, [PgUp] Last Screen, [PgDn] Next Screen │
└──────────────────────────────────────────────────────────────┘
```

Screen 13. Corporate Sponsor Input Screen

Fig. 18

```
┌─────────────────── PREMIUM STRUCTURE ───────────────────┐
│                                                              │
│ Type of premium plan (choose one, mark with an X):          │
│                                                              │
│         [ ] Lump sum prepayment                              │
│         [ ] Corporate guarantee                              │
│                                                              │
│ Type of mortgage repayment plan (choose one, mark with an X): │
│                                                              │
│         [ ] Using surrender of policy cash value             │
│         [ ] With policy loan                                 │
│         [ ] Rollover - Policy loans pay interest             │
│                                                              │
│                                                              │
│ F1 Help, F2 Main Menu, F3 EXIT, [PgUp] Last Screen, [PgDn] Next Screen │
└──────────────────────────────────────────────────────────────┘
```

Screen 14. Premium Structure Selection Screen for Corporate Sponsored Applicant

Fig. 19

```
┌─────────────────── PREMIUM STRUCTURE ───────────────────┐
│ Type of premium plan (choose one, mark with an X):          │
│                                                              │
│         [ ] Lump sum prepayment                              │
│                                                              │
│         [ ] Letter of credit       Financial Sponsor ID  ▒▒ │
│                                                              │
│ Type of mortgage repayment plan (choose one, mark with an X): │
│                                                              │
│         [ ] Using surrender of policy cash value             │
│         [ ] With policy loan                                 │
│         [ ] Rollover - Policy loans pay interest             │
│                                                              │
│ Press [LIST] to see a complete listing of Financial Sponsors │
│                                                              │
│ F1 Help, F2 Main Menu, F3 EXIT, [PgUp] Last Screen, [PgDn] Next Screen │
└──────────────────────────────────────────────────────────────┘
```

Screen 15. Premium Structure Selection Screen for Non-Corporate Sponsored Applicant

Fig. 20

```
┌──────────────────── INSURANCE POLICY ─────────────────────┐
│ Your applicant's employer has provided for corporate sponsored purchase │
│ of policies from the following carrier(s):                │
│ Select Insurance Policy  4                                │
│                                    Curr    Guar   Moody's  Type of      │
│ # Carrier          Policy Name     Rate    Rate   Rating   Underwrit    │
│ 1 Metro Life       Corporate Plus  9.50%   4.00%  AAC      Simplified   │
│                                                           │
│                                                           │
│                                                           │
│                                                           │
│                                                           │
│                                                           │
│                                                           │
│ Move between policies with [Up], [Down]; select policy with [Insert]    │
│ F1 Help, F2 Main Menu, F3 EXIT, [PgUp] Last Screen, [PgDn] Next Screen  │
└───────────────────────────────────────────────────────────┘
```

Screen 16. Corporate Sponsored Insurance Policy Selection Screen

Fig. 21

```
┌──────────────────── INSURANCE POLICY ─────────────────────┐
│                                                           │
│ Select Insurance Policy  4                                │
│                                    Curr    Guar   Moody's │
│ # Carrier             Policy Name   Rate    Rate   Rating │
│ 1 Benefit Mutual Life Life Strat II 8.50%   5.00%  AA     │
│ 2 GA Mutual Life      Home Equ III  9.25%   4.00%  AAA    │
│ 3 Providential Life   Home Life VI  9.00%   4.00%  AA+    │
│ 4 Metro Life          Retire Roll   9.50%   4.00%  AAC    │
│ 5 Voyager Life        Zero Sprd II  10.00%  4.00%  BAA    │
│ 6 Gibralter Life      Low Down Plus 9.75%   4.00%  AAB    │
│ 7 ANGIC               GTD Return Plus 9.30% 4.00%  AA+    │
│ 8 Farmer's County Lif Joint Survivor II 9.00% 4.00% AAC   │
│ 9 Southeast Mutual    1st Home Life 7.50%   4.00%  AAC    │
│ 10 Guarantor Life     Home Life     7.50%   7.50%  AAC    │
│                                                           │
│ Move between policies with [Up], [Down]; select policy with [Insert]    │
│ F1 Help, F2 Main Menu, F3 EXIT, [PgUp] Last Screen, [PgDn] Next Screen  │
└───────────────────────────────────────────────────────────┘
```

Screen 17. Non-Corporate Sponsored Insurance Policy Selection Screen

Fig. 22

```
┌──────────────────── HEALTH INFORMATION ────────────────────┐
│ Simplified issue questions for Bozeman Amorey Stella       │
│                                                            │
│ [N]  Has the proposed insured applied for and been declined or │
│      postponed life insurance in the last 5 years?         │
│                                                            │
│ [N]  Has the proposed insured ever been treated for, or been diagnosed │
│      as having deficiency of the immune system?            │
│                                                            │
│ [N]  Has the proposed insured ever consulted or been treated by a │
│      physician for heart disease?                          │
│                                                            │
│ [N]  Has the proposed insured ever consulted or been treated by a │
│      physician for cancer?                                 │
│                                                            │
│ Answer Y or N for each question                            │
│                                                            │
│ F1 Help, F2 Main Menu, F3 EXIT, [PgUp] Last Screen, [PgDn] Next Screen │
└────────────────────────────────────────────────────────────┘
```

Screen 18. Health Questionnaire Input Screen

Fig. 23

```
┌─────────────────── HEALTH INFORMATION ───────────────────┐
│ Simplified issue questions for  Bozeman Amorey Stella    │
│      ┌──────────────────────────────────────────────────┐│
│      │Specialized Underwriting required for  Bozeman Amorey Stella│
│  [Y] │                                                  ││
│      │Please ask that the specialized underwriting form printing out│
│      │on your printer be completed. You may continue to illustrate,│
│  [N] │however, illustrated rates will not be accurate until a completed│
│      │form is returned to us via regular mail or you have completed the│
│      │form for electronically.                          ││
│  [N] │              Continue to illustrate              ││
│      │                                                  ││
│      │            Electronic Health Questionnaire       ││
│  [N] │                                                  ││
│      │       Press [Up] or [Down], then [Enter] to select││
│      └──────────────────────────────────────────────────┘│
│ Answer Y or N for each question                          │
│                                                          │
│ F1 Help, F2 Main Menu, F3 EXIT, [PgUp] Last Screen, [PgDn] Next Screen│
└──────────────────────────────────────────────────────────┘
```

Screen 19. Prompt to allow the user to select a choice of continuing to illustrate, or filling in the Electronic Health Questionnaire.

Fig. 24

```
┌─────────────────── HEALTH INFORMATION ───────────────────┐
│ Electronic Health Questionnaire for Bozeman Amorey Stella│
│                                                          │
│ [Y]  Have you used any tobacco products:  in the past 12 months?│
│                                                          │
│ [Y]  in the past 24 months?                              │
│                                                          │
│ [N]  Have you ever had any signs of or been treated for high blood pressure,│
│      tumor, cancer, or other disorder of the heart, digestive system?│
│                                                          │
│ [N]  Have you received treatment for, or been advised to reduce the use of│
│      alcohol, or used drugs other than prescribed by a doctor?│
│                                                          │
│ Answer Y or N for each question                          │
│                                                          │
│ F1 Help, F2 Main Menu, F3 EXIT, [PgUp] Last Screen, [PgDn] Next Screen│
└──────────────────────────────────────────────────────────┘
```

Screen 20. Extended Electronic Health Questionnaire

Fig. 25

```
Applicant Property  Tax Rate  Insurance  Mortgage  Proceed  Help  Main Menu
┌─────────────┐               ┌─────────┬──────────┐
│ Applicant   │               │ Premium │ Mortgage │
│ Employment  │               │ Insuranc│ Closing costs│
│ Health      │               └─────────┴──────────┘
└─────────────┘
              ┌──────────────────────────────┐
              │      Supermenu Access        │
              ├──────────────────────────────┤
              │      Person ID  132          │
              │                              │
              │      Illustration ID  269    │
              │                              │
              │ Select menu items to review or update│
              │      for the above applicant │
              │    When done, select Proceed │
              └──────────────────────────────┘
```

Update applicant information

Screen 21. Update Existing Illustration Supermenu allows the user to update selected screens in the illustration process.

Screen 22. Context Sensitive Hypertext Help Facility

Fig. 27A

THE RYAN MORTGAGE ILLUSTRATION SYSTEM

INTRODUCTION TO THE RYAN MORTGAGE

WHAT YOU SHOULD KNOW ABOUT MORTGAGE COLLATERAL:

Most mortgages in the United States today require you, the borrower, to make a down payment equal to twenty percent of the total cost of the home. This down payment provides you with equity ownership in the home. It also furnishes the lender with collateral to serve as security for the loan it is making to you. Your equity makes you and the lender partners in the repayment of the loan.

Many lenders are willing to lend you more than eighty percent of the price of your home. This reduces your down payment to an amount less than twenty percent of the purchase price. However, statistical studies have shown that the smaller the down payment, the greater the risk incurred by the lender. That is why many lenders in the United States ask you to pay for private mortgage insurance. Lenders generally require it if you are borrowing more than eighty percent of the purchase price of your home. With private mortgage insurance you pay premiums to the lender. The lender, in turn, pays these premiums to a private mortgage insurance company. This provides the lender with an insurance policy against non-payment of the loan. Like any insurance policy you might purchase, private mortgage insurance premiums are not tax deductible.

WHAT YOU SHOULD KNOW ABOUT LIFE INSURANCE:

Collateral for a loan can take many forms. In home purchases, it usually takes the form of your equity in the home purchase. However, lenders will accept other assets as collateral for a loan. One acceptable asset is a permanent life insurance policy. A permanent life insurance policy has cash value that can be used to provide security for your loan. Life insurance has the additional advantage of providing tax-free accumulation of policy funds that you may use later to pay off your mortgage. Also, life insurance provides for tax-free death benefits. Death benefits can pay off your mortgage upon your death.

The attached illustration shows how life insurance can be used instead of the traditional down payment or private mortgage insurance approach to provide security for your mortgage.

WHAT YOU SHOULD KNOW ABOUT MORTGAGES:

Most mortgages in the United States provide for the gradual repayment of principal over time. These are conventional amortization mortgages. They amortize, or repay, part of the mortgage principal with every mortgage payment.

Each month, an ever increasing amount of the mortgage payment goes to repay the amount you borrowed. Over time, the principal owed declines. The amount of interest owed on it declines. The part of your payment that goes to pay off the principal increases. By the end of the mortgage, the payment is nearly all principal.

Fig. 27B

Another kind of mortgage is The Ryan Mortgage. In this mortgage you pay only interest on the principal you owe. The lender waits to get all of the money you have borrowed in one lump sum at the end of the mortgage term. Only interest is tax-deductible on a mortgage payment. Because The Ryan Mortgage includes only interest in your monthly mortgage payment, The Ryan Mortgage normally affords a greater tax benefit from the start.

Most lenders are reluctant to offer Ryan Mortgages without some additional security because without the regular payment of principal, they have greater loan risk. They want assurance that you will be able to pay off the mortgage when it comes due. That is how life insurance can help. Cash value accumulates inside the life insurance policy. It provides assurance to the lender that you will have the money to pay off the mortgage when it comes due.

HOW DOES THE RYAN MORTGAGE WORK?

The Ryan Mortgage replaces the conventional mortgage down payment with a permanent life insurance policy purchase. You may borrow the full purchase price of the home. You put the money you would have invested in a down payment into a life insurance policy. This way, the down payment doesn't remain idle in the home. It goes to work for you. It earns tax-free interest inside the life insurance policy. Your insurance investment grows in value even if real estate doesn't.

LUMP SUM PREPAYMENT OF PREMIUM:

The Ryan Mortgage Illustration System offers you two premium payment methods. The first is a lump sum prepayment. With a lump sum prepayment, you deposit an amount sufficient to pay the first scheduled life insurance premium. You also deposit enough money to purchase an annuity contract that will pay three annual premium payments in the second through fourth years of the life insurance contract. For the next three years, the annuity will make the premium payments on the anniversary of the mortgage transaction. After making this lump sum payment, you normally make no further premium payments. While interest rates remain at or above the rate projected, these scheduled premium payments will be sufficient. They will assure that the life insurance contract remains in force over the life of the mortgage.

The premium is also large enough to assure that the policy will accumulate cash value. This cash value will be enough to repay the mortgage by the end of the mortgage term, assuming interest rates remain at or above their current level. Normally, the lump sum premium payment needed will be less than twenty percent of the purchase price of the home. (The standard down payment amount of a conventional home purchase is twenty percent of the purchase price.) The after-tax monthly cost of The Ryan Mortgage payments will usually be less than or equal to the cost of a conventional mortgage with a similar up-front payment amount.

SPONSORED PREMIUM PAYMENT:

The second premium payment method requires the participation of a guarantor. A guarantor may be your employer, if your company offers such a benefit for its employees. Also, a guarantor may be a lender providing an irrevocable letter of credit. The guarantor provides financial assurances to the lender that you will make the annual insurance payments. In a sponsored transaction, your first premium payment is usually less than five percent of the

Fig. 27C purchase price of the home. It is the first of ten annual life insurance premium payments that will provide adequate cash value to pay off the mortgage obligation in the last year of the mortgage, assuming interest rates remain at or above current rates. This first payment is comparable to the down payment you would make in a conventional mortgage.

A sponsor arrangement allows you to make a drastically reduced up-front payment. This payment is equal to the first of the ten scheduled insurance premiums. However, the transaction will require you to make nine additional premium payments in upcoming years. You pay these insurance payments to the lender monthly. They go into an escrow account. At the end of the year, the lender pays the full premium to the insurance company.

Thus, in the first nine years, the monthly cost to you will include these amounts. They may inflate the monthly cost of The Ryan Mortgage versus the Conventional mortgage. Since the insurance premiums are lower for younger men and women, this plan will be attractive to you if you are younger. Young clients are also the ones most likely to need the smallest possible up-front payment.

COLLATERAL ASSIGNMENT:

Under both premium payment plans, you make a collateral assignment of the life insurance policy to the lender. With some lenders you also might assign the policy to a third party endorser of the mortgage, such as a federal mortgage endorsement agency or private mortgage insurance company. Under the terms of the collateral assignment agreement, the lender has claim to the life insurance contract until you repay the mortgage. The lender only has title to an amount equal to the mortgage principal outstanding. When the you repay the mortgage you have title to both the home and the insurance policy. If you die before the end of the mortgage term, the policy repays the mortgage with tax-free life insurance death benefit proceeds. Any additional policy benefit amounts will go to your estate.

WHAT HAPPENS WHEN I SELL THE HOUSE?

If you sell the home and repay the mortgage, you retain ownership of the life insurance policy. Such a life insurance policy has many uses. For example, you may use the policy as supplemental collateral for another mortgage. This will replace the up-front payment in a second home purchase transaction.

Alternatively, if your needs change you may not want to enter another mortgage transaction of this kind. If so, you can keep the policy and take advantage of the many other benefits of a permanent life insurance policy. You may use the life insurance policy as a savings vehicle. You may use it as a source of additional life insurance coverage. You can use it as a source of cash for other obligations. You can use it for financing retirement benefits.

For example, you can pay additional premiums and enjoy tax-free accumulation of the invested principal. You may elect to reduce the life insurance coverage and withdraw cash from the policy with partial withdrawals or policy loans. You can use these policy distributions to pay for major expenses such as a new car, a medical emergency or college tuition payments for your children. If you no longer need life insurance coverage, you can execute a tax-free exchange of the life insurance policy for an annuity that provides monthly income in retirement.

Fig. 27D

HOW IS THE MORTGAGE REPAID?

The Ryan Mortgage has other unique features designed to maximize the financial benefit to you and minimize the after-tax cost of financing the mortgage. You may repay the mortgage in one of three ways at the end of the mortgage term.

First, you may surrender the life insurance contract and use the proceeds of the policy surrender to pay off the mortgage. Under current tax law, a policyholder must pay taxes on the interest income accumulated over the basis in the contracts. The basis in the contracts is equal to the total premiums you have paid over the life of the policy. You will have had the benefit of tax-deferred accumulation of interest on your principal for the term of your mortgage. Normally the cash value accumulated by the end of your mortgage will be sufficient to both repay the mortgage and pay the taxes on interest earnings over the period.

Second, you may use a policy loan to pay off the mortgage. Life insurance contracts typically permit policyholders to borrow against the cash value of the life insurance policy. A policy loan differs from a mortgage or other loan from a lender in that the policy loan is non-recourse debt. The insurance company issuing the policy loan has recourse only to the life insurance policy cash value. While the policy cash value exceeds the policy loan balance, you won't need to pay interest on the loan. You also won't have to repay the policy loan balance. Nor will you have pay taxes on the accumulated interest earnings in the life insurance contract. When the policyholder dies, the policy death benefit repays the policy loan, and the policy pays the net death benefit remaining to your estate.

The advantage of a policy loan over policy surrender involves income tax. Policy surrenders over basis (premiums paid) are taxable income to the policyholder. Policy loans are not taxable income. Therefore, by using a policy loan to repay the mortgage, you can simply hold the policy until you die. Using this method, you never have to pay taxes on the accumulated interest earned in the life insurance contract.

An additional option may be available to you if you have established a good credit record over the life of the mortgage. You may apply to a lender to roll over the mortgage in the last year and hold it until death. You can use life insurance policy loans at the beginning of the year to pay the mortgage interest. This permits you to keep more money in the life insurance contract and maintain a higher death benefit than you could have, had you paid off the mortgage immediately. It also allows you to maintain tax-deductible mortgage payments in retirement.

WHAT HAPPENS WHEN INTEREST RATES GO UP?

The Ryan Mortgage is a variable rate mortgage. This means that each year, the cost of your mortgage will be recomputed based on changes in the interest rate index. Like a conventional variable rate mortgage, when interest rates go up, your mortgage payment will increase. The life insurance policy you purchase with The Ryan Mortgage also has a variable interest rate. That means that when interest rates go up, your life insurance investment will grow more quickly. This will allow you to repay your mortgage sooner. In a conventional variable rate mortgage, when interest rates rise, the part of your payment that goes to repay mortgage principal actually gets smaller.

Some mortgage products offered through The Ryan Mortgage Illustration System have a cap. A mortgage interest cap means that you will never have to pay more than a

Fig. 27E certain amount of interest. The life insurance products offered by our system do not have an interest rate cap. This means that if the interest rate index goes above the cap, you will actually be better off financially.

WHAT HAPPENS WHEN INTEREST RATES GO DOWN?

When interest rates go down, your mortgage cost will go down. However, your insurance policy will accumulate interest less quickly. In order to assure that your policy has enough cash value to repay the mortgage principal, you may be required to make an additional premium payment. In most years, the amount of the extra premium payment may be more than offset by the reduced cost of the mortgage, so your net payment will be lower. In addition, your policy will have a minimum interest rate guaranteed by the carrier. That means no matter how low interest rates go, you will earn the guaranteed rate of interest in your policy.

The Ryan Mortgage is the only variable rate mortgage available today that can allow you to pay off your mortgage sooner when interest rates go up.

WHICH IS BETTER?

There is no best way to finance your mortgage. The only best mortgage is the mortgage that best suits your needs.

Depending on your age, income, and tax profile each mortgage type has distinct advantages. If you choose a conventional amortization mortgage without life insurance you must provide a large down payment. Your investment will only grow in value if you are able to sell your home at a higher price than you paid for it.

If you choose The Ryan Mortgage, you may be able to provide a smaller up-front payment. This stretches your home purchase dollar. If you expect interest rates to rise, increased tax-free interest earnings in your insurance policy could allow you to pay off your mortgage sooner.

If you choose to use life insurance as collateral, your up-front payment may be smaller while your monthly payments may be higher. They will be higher because you will be borrowing more. Your tax deduction will be larger with The Ryan Mortgage. Your equity will be invested in life insurance contracts that earn interest. Your investment will grow in value even if your home doesn't. You will have the security of knowing that your mortgage will be repaid upon your death.

With The Ryan Mortgage, you will enjoy greater tax deductions from interest than with a conventional mortgage. You will enjoy a low up-front payment. Because your equity in the life insurance policy cash value will accumulate more rapidly than conventional mortgage amortization, you will not have to pay private mortgage insurance.

The attached illustration will allow you to make an informed decision about which mortgage is right for you. The Ryan Mortgage may be the right mortgage for you.

Fig. 28A

| THE RYAN MORTGAGE ILLUSTRATION SYSTEM |
|---|
| COMBINED ILLUSTRATION FOR THE PRODUCTS OF :<br>HOMEOWNER'S BANK<br>AND<br>METRO LIFE INSURANCE CORPORATION |

Illustration Developed For:

Bozeman Amorey Stella
666 Greenwich Street
Apt. 933
New York, NY 10014

By

Bill Simpson
Mortgage ProBrokers
555 Wilton Way
Wilton, CT 06894

With regards to property located at:

62 Hillock Road
Cannondale, CT 05555

The real estate agent representing you in the purchase:

Milly Jenner
Chekov & Karney
310 Wilton Way
Wilton, CT 06894

| INDIVIDUAL DATA FOR: Bozeman Amorey Stella |
|---|

| | |
|---|---|
| Age | 32 |
| Sex | Male |
| Individual Tax Rate: | 34.00 % |

| MORTGAGE ASSUMPTIONS FOR: HOMEOWNER'S BANK |
|---|

The Ryan Mortgage:

| | | |
|---|---|---|
| Principal Amount: | 262,000.00 | |
| Down Payment: | 31,586.00 | |
| Initial Loan Balance: | 262,000.00 | |
| Down Payment as % of Principal: | 12.06 % | |
| Mortgage Interest Rate: | 10.50 % | Cap: 14.50 % |
| Mortgage Points (%) | 1.00 % | |
| Term of Mortgage (Years): | 30 | |
| PMI Cost (%) | 0.00 % | |
| Settlement Costs: | 4,000.00 | |
| Closing Date: | 01-Mar-92 | |

Conventional Mortgage:

| | |
|---|---|
| Principal Amount: | 262,000.00 |
| Down Payment: | 31,586.00 |
| Initial Loan Balance: | 230,414.00 |
| Down Payment as % of Principal: | 12.06 % |
| Mortgage Interest Rate: | 10.50 % |
| Mortgage Points (%): | 1.00 % |
| Term of Mortgage (Years): | 30 |
| PMI Cost (%): | 0.50 % |
| Settlement Costs: | 4,000.00 |
| Closing Date: | 01-Mar-92 |

| INSURANCE ASSUMPTIONS FOR: METRO LIFE INSURANCE CORPORATION |
|---|

Current Rates:

| | |
|---|---|
| Mortality | 1983 GAM |
| Percent | 100.00 % |
| Unloaned Credited Rate: | 9.50 % |
| Loan Charged Rate: | 9.50 % |
| Loan Credited Rate: | 9.50 % |

Guarantees:

| | |
|---|---|
| Mortality | 1980 CSO |
| Percent | 100.00 % |
| Unloaned Credited Rate: | 4.00 % |

ANNUITY DATA
The Ryan down payment will be used, in part, to purchase a single premium immediate annuity (SPIA) to pay the life insurance premiums.

| | |
|---|---|
| Interest Credited Rate: | 9.25 % |
| Number of Insurance Premiums Paid: | 3 |

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

IMPORTANT COMMENTS CONCERNING THE ATTACHED ILLUSTRATION

---

The information contained in the attached illustration is based on both assumptions furnished by the client for whom it is developed and the current assumptions of the mortgage and insurance plans chosen. Unless otherwise indicated, those rates assumed initially continue throughout the life of the illustration Conventional Mortgage assumptions for principal, mortgage interest rate, mortgage points (%) and settlement costs are the same as those assumed for The Ryan Mortgage. The down payment and initial loan balance are as stated on page 1 of this illustration Premium costs may change if the closing date differs from the one given. They may also change if any of the other assumptions used vary The mortgage illustrated is a variable rate mortgage. Mortgage and premium payments are subject to change with variations in interest rates Interest rates credited on unloaned policy values and the cost of insurance charges may vary after the first year. Interest rates charged on policy loans and credited on loaned policy values also may vary after the first year In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
**HOMEOWNER'S BANK
AND
METRO LIFE INSURANCE CORPORATION**

---

ESTIMATED UPFRONT MORTGAGE AND OTHER ESCROW PAYMENT

| The Ryan Mortgage: | | Conventional Mortgage: | |
|---|---|---|---|
| Settlement Costs | 4,000.00 | Settlement Costs | 4,000.00 |
| Mortgage Points | 2,620.00 | Mortgage Points | 2,304.14 |
| PMI Escrow | 0.00 | PMI Escrow | 1,152.07 |
| Down Payment | 31,586.00 * | Down Payment | 31,586.00 |
| *Total Closing Costs* | 38,206.00 | *Total Closing Costs* | 39,042.21 |

\* The down payment is used for purchasing a single premium immediate annuity and for paying an insurance premium.

---

ESTIMATED AVERAGE FIRST YEAR MONTHLY PAYMENT

| The Ryan Mortgage: | | Conventional Mortgage: | |
|---|---|---|---|
| Mortgage | 2,292.50 | Mortgage | 2,107.69 |
| Tax Escrow | 235.00 | Tax Escrow | 235.00 |
| PMI Escrow | 0.00 | PMI Escrow | 96.01 |
| Life Insurance | 0.00 | Life Insurance | 17.42 |
| | 2,527.50 | | 2,456.12 |
| LESS | | LESS | |
| Tax Deduction | 779.45 | Tax Deduction | 683.94 |
| *Net After-Tax Cost* | 1,748.05 | *Net After-Tax Cost* | 1,772.18 |

---

ESTIMATED AVERAGE YEAR 10 MONTHLY PAYMENT

| The Ryan Mortgage: | | Conventional Mortgage: | |
|---|---|---|---|
| Mortgage | 2,292.50 | Mortgage | 2,107.69 |
| Tax Escrow | 235.00 | Tax Escrow | 235.00 |
| PMI Escrow | 0.00 | PMI Escrow | 96.01 |
| Life Insurance | 0.00 | Life Insurance | 29.56 |
| | 2,527.50 | | 2,468.26 |
| LESS | | LESS | |
| Tax Deduction | 779.45 | Tax Deduction | 623.67 |
| *Net After-Tax Cost* | 1,748.05 | *Net After-Tax Cost* | 1,844.59 |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 28D

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

ESTIMATED EQUITY AND FINANCIAL ANALYSIS ASSUMING EARLY HOME SALE

In the following computations, the home is assumed to be sold at the original purchase price. If it is sold for a higher price, the total equity after the sale will increase Mortgage Costs:

|  | Ryan Mortgage | Conventional Mortgage | Financial Benefit From Ryan Mortgage | Cumulative Financial Benefit |
|---|---|---|---|---|
| Total Closing Costs * | 38,206.00 | 39,042.21 | 836.21 | 836.21 |
| Annual After-Tax Mortgage Cost ** | | | | |
| Year 1: | 18,156.60 | 18,446.18 | 289.58 | 1,125.79 |
| Year 2: | 18,156.60 | 18,498.55 | 341.95 | 1,467.74 |
| Year 3: | 18,156.60 | 18,560.47 | 403.87 | 1,871.61 |
| Year 4: | 18,156.60 | 18,629.84 | 473.24 | 2,344.85 |
| Year 5: | 18,156.60 | 18,699.70 | 543.10 | 2,887.95 |
| Year 6: | 18,156.60 | 18,778.13 | 621.53 | 3,509.48 |
| Year 7: | 18,156.60 | 18,865.72 | 709.12 | 4,218.60 |
| Year 8: | 18,156.60 | 18,965.54 | 808.94 | 5,027.54 |
| Year 9: | 18,156.60 | 19,078.19 | 921.59 | 5,949.13 |
| Year 10: | 18,156.60 | 19,204.33 | 1,047.73 | 6,996.86 |

|  | Ryan Mortgage | Conventional Mortgage | Financial Benefit From Ryan Mortgage |
|---|---|---|---|
| Home Sale At The End of Year 5: | | | |
| End of Year Cash Value: | 43,705.78 | 0.00 | 43,705.78 |
| Home Resale: | 262,000.00 | 262,000.00 | 0.00 |
| Mortgage Balance: | (262,000.00) | (223,229.00) | (38,771.00) |
| Total Equity After Sale: | 43,705.78 | 38,771.00 | 4,934.78 |
| Total Closing Costs: * | 38,206.00 | 39,042.21 | 836.21 |
| After-Tax Mortgage Cost ** | 90,783.00 | 92,834.74 | 2,051.74 |
| TOTAL 5 YEAR FINANCIAL BENEFIT: | | | 7,822.73 |
| Home Sale At The End of Year 10: | | | |
| End of Year Cash Value: | 66,850.51 | 0.00 | 66,850.51 |
| Home Resale: | 262,000.00 | 262,000.00 | 0.00 |
| Mortgage Balance: | (262,000.00) | (211,110.76) | (50,889.24) |
| Total Equity After Sale: | 66,850.51 | 50,889.24 | 15,961.27 |
| Total Closing Costs: * | 38,206.00 | 39,042.21 | 836.21 |
| After-Tax Mortgage Cost ** | 181,566.00 | 187,726.65 | 6,160.65 |
| TOTAL 10 YEAR FINANCIAL BENEFIT: | | | 22,958.13 |

\* See top of page 3 for detailed breakdown.
\*\* These values include insurance. (See page 5 for detailed breakdown.)

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 28E

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

ESTIMATED ANNUAL COST
(Does not include Property Taxes or Hazard Insurance)

The Ryan Mortgage:                                    Conventional Mortgage:

| Year | Mortgage | Life Insurance | Interest Tax Deduction | Total After Taxes | Year | Mortgage | PMI plus Life Insurance | Interest Tax Deduction | Total After Taxes |
|---|---|---|---|---|---|---|---|---|---|
| 1 | 27,510.00 | 0.00 | 9,353.40 | 18,156.60 | 1 | 25,292.28 | 1,361.17 | 8,207.27 | 18,446.18 |
| 2 | 27,510.00 | 0.00 | 9,353.40 | 18,156.60 | 2 | 25,292.28 | 1,370.32 | 8,164.06 | 18,498.55 |
| 3 | 27,510.00 | 0.00 | 9,353.40 | 18,156.60 | 3 | 25,292.28 | 1,384.27 | 8,116.08 | 18,560.47 |
| 4 | 27,510.00 | 0.00 | 9,353.40 | 18,156.60 | 4 | 25,292.28 | 1,400.39 | 8,062.82 | 18,629.84 |
| 5 | 27,510.00 | 0.00 | 9,353.40 | 18,156.60 | 5 | 25,292.28 | 1,411.11 | 8,003.70 | 18,699.70 |
|  | 137,550.00 | 0.00 | 46,767.00 | 90,783.00 |  | 126,461.40 | 6,927.26 | 40,553.92 | 92,834.74 |
| 6 | 27,510.00 | 0.00 | 9,353.40 | 18,156.60 | 6 | 25,292.28 | 1,423.90 | 7,938.05 | 18,778.13 |
| 7 | 27,510.00 | 0.00 | 9,353.40 | 18,156.60 | 7 | 25,292.28 | 1,438.61 | 7,865.17 | 18,865.72 |
| 8 | 27,510.00 | 0.00 | 9,353.40 | 18,156.60 | 8 | 25,292.28 | 1,457.52 | 7,784.26 | 18,965.54 |
| 9 | 27,510.00 | 0.00 | 9,353.40 | 18,156.60 | 9 | 25,292.28 | 1,480.34 | 7,694.43 | 19,078.19 |
| 10 | 27,510.00 | 0.00 | 9,353.40 | 18,156.60 | 10 | 25,292.28 | 1,506.76 | 7,594.71 | 19,204.33 |
|  | 275,100.00 | 0.00 | 93,534.00 | 181,566.00 |  | 252,922.80 | 14,234.39 | 79,430.55 | 187,726.65 |
| 11 | 27,510.00 | 0.00 | 9,353.40 | 18,156.60 | 11 | 25,292.28 | 386.64 | 7,483.99 | 18,194.93 |
| 12 | 27,510.00 | 0.00 | 9,353.40 | 18,156.60 | 12 | 25,292.28 | 421.29 | 7,361.07 | 18,352.50 |
| 13 | 27,510.00 | 0.00 | 9,353.40 | 18,156.60 | 13 | 25,292.28 | 462.53 | 7,224.61 | 18,530.21 |
| 14 | 27,510.00 | 0.00 | 9,353.40 | 18,156.60 | 14 | 25,292.28 | 507.26 | 7,073.10 | 18,726.43 |
| 15 | 27,510.00 | 0.00 | 9,353.40 | 18,156.60 | 15 | 25,292.28 | 556.62 | 6,904.91 | 18,944.00 |
|  | 412,650.00 | 0.00 | 140,301.00 | 272,349.00 |  | 379,384.20 | 16,568.73 | 115,478.22 | 280,474.71 |
| 16 | 27,510.00 | 0.00 | 9,353.40 | 18,156.60 | 16 | 25,292.28 | 607.26 | 6,718.17 | 19,181.37 |
| 17 | 27,510.00 | 0.00 | 9,353.40 | 18,156.60 | 17 | 25,292.28 | 657.83 | 6,510.86 | 19,439.26 |
| 18 | 27,510.00 | 0.00 | 9,353.40 | 18,156.60 | 18 | 25,292.28 | 704.82 | 6,280.70 | 19,716.41 |
| 19 | 27,510.00 | 0.00 | 9,353.40 | 18,156.60 | 19 | 25,292.28 | 748.45 | 6,025.17 | 20,015.56 |
| 20 | 27,510.00 | 0.00 | 9,353.40 | 18,156.60 | 20 | 25,292.28 | 783.09 | 5,741.48 | 20,333.89 |
|  | 550,200.00 | 0.00 | 187,068.00 | 363,132.00 |  | 505,845.60 | 20,070.20 | 146,754.60 | 379,161.20 |
| 21 | 27,510.00 | 0.00 | 9,353.40 | 18,156.60 | 21 | 25,292.28 | 810.10 | 5,426.54 | 20,675.85 |
| 22 | 27,510.00 | 0.00 | 9,353.40 | 18,156.60 | 22 | 25,292.28 | 822.05 | 5,076.88 | 21,037.45 |
| 23 | 27,510.00 | 0.00 | 9,353.40 | 18,156.60 | 23 | 25,292.28 | 819.48 | 4,688.69 | 21,423.07 |
| 24 | 27,510.00 | 0.00 | 9,353.40 | 18,156.60 | 24 | 25,292.28 | 797.79 | 4,257.72 | 21,832.35 |
| 25 | 27,510.00 | 0.00 | 9,353.40 | 18,156.60 | 25 | 25,292.28 | 754.62 | 3,779.26 | 22,267.64 |
|  | 687,750.00 | 0.00 | 233,835.00 | 453,915.00 |  | 632,307.00 | 24,074.24 | 169,983.68 | 486,397.56 |
| 26 | 27,510.00 | 0.00 | 9,353.40 | 18,156.60 | 26 | 25,292.28 | 686.41 | 3,248.06 | 22,730.63 |
| 27 | 27,510.00 | 0.00 | 9,353.40 | 18,156.60 | 27 | 25,292.28 | 589.58 | 2,658.33 | 23,223.53 |
| 28 | 27,510.00 | 0.00 | 9,353.40 | 18,156.60 | 28 | 25,292.28 | 456.50 | 2,003.61 | 23,745.17 |
| 29 | 27,510.00 | 0.00 | 9,353.40 | 18,156.60 | 29 | 25,292.28 | 276.69 | 1,276.73 | 24,292.24 |
| 30 | 27,510.00 | 0.00 | 9,353.40 | 18,156.60 | 30 | 25,292.28 | 33.33 | 469.76 | 24,855.86 |
|  | 825,300.00 | 0.00 | 280,602.00 | 544,698.00 |  | 758,768.40 | 26,116.76 | 179,640.18 | 605,244.98 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

**ESTIMATED REMAINING MORTGAGE OBLIGATION
ASSUMING MORTGAGE IS PAID OFF WITH INSURANCE POLICY CASH SURRENDER VALUE**

---

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid The Ryan Mortgage:

Conventional Mortgage:

| Year | Annuity Plus Life Insurance Cash Value** | Tax Owed On Surrender** | Net Policy Proceeds ** | End of Year Mortgage Principal | End of Year Net Mortgage Obligation * | Year | Life Insurance Cash Value | Net Policy Proceeds | End of Year Mortgage Principal |
|---|---|---|---|---|---|---|---|---|---|
| 1 | 31,080.13 | 1,272.63 | 29,807.50 | 262,000.00 | 232,192.50 | 1 | 0.00 | 0.00 | 229,260.77 |
| 2 | 33,831.53 | 1,010.38 | 32,821.15 | 262,000.00 | 229,178.85 | 2 | 0.00 | 0.00 | 227,980.45 |
| 3 | 36,853.75 | 1,123.22 | 35,730.53 | 262,000.00 | 226,269.47 | 3 | 0.00 | 0.00 | 226,559.03 |
| 4 | 40,173.75 | 1,533.10 | 38,640.65 | 262,000.00 | 223,359.35 | 4 | 0.00 | 0.00 | 224,980.97 |
| 5 | 43,705.78 | 2,733.99 | 40,971.79 | 262,000.00 | 221,028.21 | 5 | 0.00 | 0.00 | 223,229.00 |
| 6 | 47,562.67 | 4,045.34 | 43,517.34 | 262,000.00 | 218,482.66 | 6 | 0.00 | 0.00 | 221,283.96 |
| 7 | 51,773.80 | 5,477.12 | 46,296.68 | 262,000.00 | 215,703.32 | 7 | 0.00 | 0.00 | 219,124.57 |
| 8 | 56,369.27 | 7,039.58 | 49,329.69 | 262,000.00 | 212,670.31 | 8 | 0.00 | 0.00 | 216,727.20 |
| 9 | 61,382.49 | 8,744.07 | 52,638.41 | 262,000.00 | 209,361.59 | 9 | 0.00 | 0.00 | 214,065.64 |
| 10 | 66,850.51 | 10,603.20 | 56,247.31 | 262,000.00 | 205,752.69 | 10 | 0.00 | 0.00 | 211,110.76 |
| 11 | 72,812.38 | 12,630.23 | 60,182.14 | 262,000.00 | 201,817.86 | 11 | 0.00 | 0.00 | 207,830.25 |
| 12 | 79,313.73 | 14,840.70 | 64,473.04 | 262,000.00 | 197,526.96 | 12 | 0.00 | 0.00 | 204,188.21 |
| 13 | 86,401.38 | 17,250.50 | 69,150.88 | 262,000.00 | 192,849.12 | 13 | 0.00 | 0.00 | 200,144.81 |
| 14 | 94,129.82 | 19,878.16 | 74,251.65 | 262,000.00 | 187,748.35 | 14 | 0.00 | 0.00 | 195,655.81 |
| 15 | 102,558.24 | 22,743.83 | 79,814.41 | 262,000.00 | 182,185.59 | 15 | 0.00 | 0.00 | 190,672.11 |
| 16 | 111,755.00 | 25,870.73 | 85,884.27 | 262,000.00 | 176,115.73 | 16 | 0.00 | 0.00 | 185,139.18 |
| 17 | 121,796.73 | 29,284.91 | 92,511.81 | 262,000.00 | 169,488.19 | 17 | 0.00 | 0.00 | 178,996.51 |
| 18 | 132,770.96 | 33,016.15 | 99,754.81 | 262,000.00 | 162,245.19 | 18 | 0.00 | 0.00 | 172,176.89 |
| 19 | 144,774.21 | 37,097.26 | 107,676.95 | 262,000.00 | 154,323.05 | 19 | 0.00 | 0.00 | 164,605.73 |
| 20 | 157,909.19 | 41,563.15 | 116,346.04 | 262,000.00 | 145,653.96 | 20 | 0.00 | 0.00 | 156,200.20 |
| 21 | 172,261.15 | 46,442.82 | 125,818.33 | 262,000.00 | 136,181.67 | 21 | 0.00 | 0.00 | 146,868.36 |
| 22 | 187,933.41 | 51,771.39 | 136,162.03 | 262,000.00 | 125,837.97 | 22 | 0.00 | 0.00 | 136,508.11 |
| 23 | 205,058.36 | 57,593.87 | 147,464.49 | 262,000.00 | 114,535.51 | 23 | 0.00 | 0.00 | 125,006.12 |
| 24 | 223,785.81 | 63,961.20 | 159,824.60 | 262,000.00 | 102,175.40 | 24 | 0.00 | 0.00 | 112,236.58 |
| 25 | 244,234.37 | 70,913.71 | 173,320.66 | 262,000.00 | 88,679.34 | 25 | 0.00 | 0.00 | 98,059.79 |
| 26 | 266,569.77 | 78,507.75 | 188,062.02 | 262,000.00 | 73,937.98 | 26 | 0.00 | 0.00 | 82,320.67 |
| 27 | 290,972.69 | 86,804.74 | 204,167.95 | 262,000.00 | 57,832.05 | 27 | 0.00 | 0.00 | 64,847.04 |
| 28 | 317,642.34 | 95,872.42 | 221,769.92 | 262,000.00 | 40,230.08 | 28 | 0.00 | 0.00 | 45,447.76 |
| 29 | 346,797.51 | 105,785.18 | 241,012.33 | 262,000.00 | 20,987.67 | 29 | 0.00 | 0.00 | 23,910.62 |
| 30 | 378,608.59 | 116,600.95 | 262,007.64 | 262,000.00 | (7.64) | 30 | 0.00 | 0.00 | (0.00) |

\* A negative obligation indicates death benefits in excess of the mortgage obligation, payable to policyholder's estate \*\* The value included for the annuity is the present value of future payments, discounted at the annuity interest credited rate

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED REMAINING MORTGAGE OBLIGATION
ASSUMING MORTGAGE IS PAID OFF WITH DEATH PROCEEDS

---

Life Insurance has certain tax advantages. Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid The Ryan Mortgage:                                                                 Conventional Mortgage:

| Year | Life Insurance Death Benefit * | End of Year Mortgage Principal | Net Death Proceeds | | Year | Life Insurance Death Benefit | End of Year Mortgage Principal | Net Death Proceeds |
|---|---|---|---|---|---|---|---|---|
| 1  | 271,378.74 | 262,000.00 | 9,378.74   | | 1  | 229,260.77 | 229,260.77 | 0.00 |
| 2  | 271,378.74 | 262,000.00 | 9,378.74   | | 2  | 227,980.45 | 227,980.45 | 0.00 |
| 3  | 271,378.74 | 262,000.00 | 9,378.74   | | 3  | 226,559.03 | 226,559.03 | 0.00 |
| 4  | 271,378.74 | 262,000.00 | 9,378.74   | | 4  | 224,980.97 | 224,980.97 | 0.00 |
| 5  | 271,378.74 | 262,000.00 | 9,378.74   | | 5  | 223,229.00 | 223,229.00 | 0.00 |
| 6  | 271,378.74 | 262,000.00 | 9,378.74   | | 6  | 221,283.96 | 221,283.96 | 0.00 |
| 7  | 271,378.74 | 262,000.00 | 9,378.74   | | 7  | 219,124.57 | 219,124.57 | 0.00 |
| 8  | 271,378.74 | 262,000.00 | 9,378.74   | | 8  | 216,727.20 | 216,727.20 | 0.00 |
| 9  | 271,378.74 | 262,000.00 | 9,378.74   | | 9  | 214,065.64 | 214,065.64 | 0.00 |
| 10 | 271,378.74 | 262,000.00 | 9,378.74   | | 10 | 211,110.76 | 211,110.76 | 0.00 |
| 11 | 271,378.74 | 262,000.00 | 9,378.74   | | 11 | 207,830.25 | 207,830.25 | 0.00 |
| 12 | 271,378.74 | 262,000.00 | 9,378.74   | | 12 | 204,188.21 | 204,188.21 | 0.00 |
| 13 | 271,378.74 | 262,000.00 | 9,378.74   | | 13 | 200,144.81 | 200,144.81 | 0.00 |
| 14 | 271,378.74 | 262,000.00 | 9,378.74   | | 14 | 195,655.81 | 195,655.81 | 0.00 |
| 15 | 271,378.74 | 262,000.00 | 9,378.74   | | 15 | 190,672.11 | 190,672.11 | 0.00 |
| 16 | 271,378.74 | 262,000.00 | 9,378.74   | | 16 | 185,139.18 | 185,139.18 | 0.00 |
| 17 | 271,378.74 | 262,000.00 | 9,378.74   | | 17 | 178,996.51 | 178,996.51 | 0.00 |
| 18 | 271,378.74 | 262,000.00 | 9,378.74   | | 18 | 172,176.89 | 172,176.89 | 0.00 |
| 19 | 271,378.74 | 262,000.00 | 9,378.74   | | 19 | 164,605.73 | 164,605.73 | 0.00 |
| 20 | 281,078.37 | 262,000.00 | 19,078.37  | | 20 | 156,200.20 | 156,200.20 | 0.00 |
| 21 | 294,566.56 | 262,000.00 | 32,566.56  | | 21 | 146,868.36 | 146,868.36 | 0.00 |
| 22 | 308,210.80 | 262,000.00 | 46,210.80  | | 22 | 136,508.11 | 136,508.11 | 0.00 |
| 23 | 321,941.62 | 262,000.00 | 59,941.62  | | 23 | 125,006.12 | 125,006.12 | 0.00 |
| 24 | 335,678.71 | 262,000.00 | 73,678.71  | | 24 | 112,236.58 | 112,236.58 | 0.00 |
| 25 | 356,582.19 | 262,000.00 | 94,582.19  | | 25 | 98,059.79  | 98,059.79  | 0.00 |
| 26 | 378,529.08 | 262,000.00 | 116,529.08 | | 26 | 82,320.67  | 82,320.67  | 0.00 |
| 27 | 401,542.32 | 262,000.00 | 139,542.32 | | 27 | 64,847.04  | 64,847.04  | 0.00 |
| 28 | 425,640.74 | 262,000.00 | 163,640.74 | | 28 | 45,447.76  | 45,447.76  | 0.00 |
| 29 | 450,836.77 | 262,000.00 | 188,836.77 | | 29 | 23,910.62  | 23,910.62  | 0.00 |
| 30 | 484,618.99 | 262,000.00 | 222,618.99 | | 30 | (0.00)     | (0.00)     | 0.00 |

\* This value does NOT include annuity value.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 28H

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

EFFECTS OF CHANGES IN INTEREST RATES ON MONTHLY RYAN PAYMENTS

As noted on page 2 of this illustration, in the event interest rates go down, variable mortgage payments will go down; life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30.

| | |
|---|---|
| Original Ryan Mortgage (Interest) Payment | 2,292.50 |
| Original Ryan After-Tax Mortgage Payment | 1,513.05 |

| | | | |
|---|---|---|---|
| Interest Crediting Rate (beginning in year 2): | 4.00 % | Interest Crediting Rate (beginning in year 2): | 13.50 % |
| Mortgage Interest Rate (beginning in year 2): | 5.00 % | Mortgage Interest Rate (beginning in year 2): | 14.50 % |

| Year | Incremental LI Premium | Adjusted Mortgage Payment | After-Tax Combined Cost | End of Year Insurance Cash Value | Year | Incremental LI Premium | Adjusted Mortgage Payment | After-Tax Combined Cost | End of Year Insurance Cash Value |
|---|---|---|---|---|---|---|---|---|---|
| 1 | 0.00 | 2,292.50 | 1,513.05 | 8,610.89 | 1 | 0.00 | 2,292.50 | 1,513.05 | 8,610.89 |
| 2 | 82.78 | 1,091.67 | 803.28 | 18,200.05 | 2 | 0.00 | 3,165.83 | 2,089.45 | 18,868.33 |
| 3 | 130.29 | 1,091.67 | 850.79 | 28,692.51 | 3 | 0.00 | 3,165.83 | 2,089.45 | 30,503.46 |
| 4 | 182.28 | 1,091.67 | 902.78 | 40,173.75 | 4 | 0.00 | 3,165.83 | 2,089.45 | 43,702.54 |
| 5 | 198.29 | 1,091.67 | 918.79 | 43,705.78 | 5 | 0.00 | 3,165.83 | 2,089.45 | 49,315.45 |
| 6 | 215.78 | 1,091.67 | 936.28 | 47,562.67 | 6 | 0.00 | 3,165.83 | 2,089.45 | 55,677.84 |
| 7 | 234.88 | 1,091.67 | 955.38 | 51,773.80 | 7 | 0.00 | 3,165.83 | 2,089.45 | 62,890.28 |
| 8 | 255.72 | 1,091.67 | 976.22 | 56,369.27 | 8 | 0.00 | 3,165.83 | 2,089.45 | 71,065.22 |
| 9 | 278.47 | 1,091.67 | 998.97 | 61,382.49 | 9 | 0.00 | 3,165.83 | 2,089.45 | 80,331.22 |
| 10 | 303.29 | 1,091.67 | 1,023.79 | 66,850.51 | 10 | 0.00 | 3,165.83 | 2,089.45 | 90,835.29 |
| 11 | 330.36 | 1,091.67 | 1,050.86 | 72,812.38 | 11 | 0.00 | 3,165.83 | 2,089.45 | 102,743.81 |
| 12 | 359.88 | 1,091.67 | 1,080.38 | 79,313.73 | 12 | 0.00 | 3,165.83 | 2,089.45 | 116,249.43 |
| 13 | 392.08 | 1,091.67 | 1,112.58 | 86,401.36 | 13 | 0.00 | 3,165.83 | 2,089.45 | 131,558.36 |
| 14 | 427.20 | 1,091.67 | 1,147.70 | 94,129.82 | 14 | 0.00 | 3,165.83 | 2,089.45 | 148,876.83 |
| 15 | 465.50 | 1,091.67 | 1,186.00 | 102,558.24 | 15 | 0.00 | 3,165.83 | 2,089.45 | 168,452.82 |
| 16 | 507.30 | 1,091.67 | 1,227.80 | 111,755.00 | 16 | 0.00 | 3,165.83 | 2,089.45 | 190,577.20 |
| 17 | 552.94 | 1,091.67 | 1,273.44 | 121,796.73 | 17 | 0.00 | 3,165.83 | 2,089.45 | 215,579.16 |
| 18 | 602.82 | 1,091.67 | 1,323.32 | 132,770.96 | 18 | 0.00 | 3,165.83 | 2,089.45 | 243,833.84 |
| 19 | 657.36 | 1,091.67 | 1,377.86 | 144,774.21 | 19 | 0.00 | 3,165.83 | 2,089.45 | 275,764.85 |
| 20 | 716.33 | 1,091.67 | 1,436.83 | 157,909.19 | 20 | 0.00 | 3,165.83 | 2,089.45 | 311,871.82 |
| 21 | 779.49 | 1,091.67 | 1,499.99 | 172,261.15 | 21 | 0.00 | 3,165.83 | 2,089.45 | 352,711.73 |
| 22 | 850.41 | 1,091.67 | 1,570.91 | 187,933.41 | 22 | 0.00 | 3,165.83 | 2,089.45 | 398,929.10 * |
| 23 | 927.90 | 1,091.67 | 1,648.40 | 205,058.36 | 23 | 0.00 | 3,165.83 | 2,089.45 | 451,257.35 * |
| 24 | 1,012.65 | 1,091.67 | 1,733.15 | 223,785.81 | 24 | 0.00 | 3,165.83 | 2,089.45 | 510,540.78 * |
| 25 | 1,105.18 | 1,091.67 | 1,825.68 | 244,234.37 | 25 | 0.00 | 3,165.83 | 2,089.45 | 577,632.80 * |
| 26 | 1,206.25 | 1,091.67 | 1,926.75 | 266,569.77 | 26 | 0.00 | 3,165.83 | 2,089.45 | 653,580.81 * |
| 27 | 1,316.67 | 1,091.67 | 2,037.17 | 290,972.69 | 27 | 0.00 | 3,165.83 | 2,089.45 | 739,571.66 * |
| 28 | 1,437.35 | 1,091.67 | 2,157.85 | 317,642.34 * | 28 | 0.00 | 3,165.83 | 2,089.45 | 836,955.72 * |
| 29 | 1,569.28 | 1,091.67 | 2,289.78 | 346,797.51 * | 29 | 0.00 | 3,165.83 | 2,089.45 | 947,267.68 * |
| 30 | 1,713.23 | 1,091.67 | 2,433.73 | 378,608.59 * | 30 | 0.00 | 3,165.83 | 2,089.45 | 1,072,053.80 * |

\* If the insurance policy is surrendered, the after-tax proceeds will pay off the mortgage principal.

\* If the insurance policy is surrendered, the after-tax proceeds will pay off the mortgage principal.

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 28I

```
THE RYAN MORTGAGE ILLUSTRATION SYSTEM

COMBINED ILLUSTRATION FOR THE PRODUCTS OF :
            HOMEOWNER'S BANK
                   AND
        METRO LIFE INSURANCE CORPORATION
```

```
                    GUARANTEED LIFE INSURANCE VALUES
```

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|---|---|---|
| 1 | 7,868.09 | 271,378.74 |
| 2 | 16,201.36 | 271,378.74 |
| 3 | 24,861.90 | 271,378.74 |
| 4 | 33,860.22 | 271,378.74 |
| 5 | 34,611.36 | 271,378.74 |
| 6 | 35,355.73 | 271,378.74 |
| 7 | 36,088.49 | 271,378.74 |
| 8 | 36,802.23 | 271,378.74 |
| 9 | 37,491.65 | 271,378.74 |
| 10 | 38,146.50 | 271,378.74 |
| 11 | 38,765.64 | 271,378.74 |
| 12 | 39,338.36 | 271,378.74 |
| 13 | 39,860.62 | 271,378.74 |
| 14 | 40,321.07 | 271,378.74 |
| 15 | 40,714.93 | 271,378.74 |
| 16 | 41,032.43 | 271,378.74 |
| 17 | 41,265.64 | 271,378.74 |
| 18 | 41,399.12 | 271,378.74 |
| 19 | 41,421.32 | 271,378.74 |
| 20 | 41,305.86 | 271,378.74 |
| 21 | 41,029.55 | 271,378.74 |
| 22 | 40,563.01 | 271,378.74 |
| 23 | 39,872.50 | 271,378.74 |
| 24 | 38,931.35 | 271,378.74 |
| 25 | 37,705.90 | 271,378.74 |
| 26 | 36,169.24 | 271,378.74 |
| 27 | 34,284.62 | 271,378.74 |
| 28 | 32,009.28 | 271,378.74 |
| 29 | 29,283.85 | 271,378.74 |
| 30 | 26,037.72 | 271,378.74 |
| 31 | 22,182.28 | 271,378.74 |
| 32 | 17,610.67 | 271,378.74 |
| 33 | 12,205.04 | 271,378.74 |
| 34 | 5,834.09 | 271,378.74 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 28J

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

LIFE INSURANCE COST INDICES

An explanation of the intended use of these indices is provided in The Life Insurance Buyer's Guide. These indices are useful only for the comparison of relative costs of two or more similar policies.

The cost indices do not reflect any optional benefits.

|  | BASED ON GUARANTEED FACTORS | |
|---|---|---|
|  | 10 Year | 20 Year |
| SURRENDER COST INDEX @ 5% | 4.44 | 4.96 |
| NET PAYMENT COST INDEX @ 5% | 15.09 | 9.35 |

|  | BASED ON CURRENT FACTORS | |
|---|---|---|
|  | 10 Year | 20 Year |
| SURRENDER COST INDEX @ 5% | -3.56 | -7.40 |
| NET PAYMENT COST INDEX @ 5% | 15.09 | 9.34 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

Illustration Developed For

Bozeman Amorey Stella
    666 Greenwich Street
    Apt 933
    New York, NY 10014

By

Bill Simpson
    Mortgage ProBrokers
    555 Wilton Way
    Wilton, CT 06894

With regards to property located at:

62 Hillock Road
    Cannondale, CT 05555

The real estate agent representing you in the purchase:

Milly Jenner
    Chekov & Karney
    310 Wilton Way
    Wilton, CT 06894

---

INDIVIDUAL DATA FOR: Bozeman Amorey Stella

| | |
|---|---|
| Age: | 32 |
| Sex | Male |
| Individual Tax Rate | 34.00 % |

---

MORTGAGE ASSUMPTIONS FOR: HOMEOWNER'S BANK

| The Ryan Mortgage: | | | Conventional Mortgage: | |
|---|---|---|---|---|
| Principal Amount | 262,000.00 | | Principal Amount | 262,000.00 |
| Down Payment | 26,151.00 | | Down Payment | 26,151.00 |
| Initial Loan Balance: | 262,000.00 | | Initial Loan Balance | 235,849.00 |
| Down Payment as % of Principal | 9.98 % | | Down Payment as % of Principal | 9.98 % |
| Mortgage Interest Rate | 10.50 % | Cap: 14.50 % | Mortgage Interest Rate | 10.50 % |
| Mortgage Points (%) | 1.00 % | | Mortgage Points (%) | 1.00 % |
| Term of Mortgage (Years) | 30 | | Term of Mortgage (Years) | 30 |
| PMI Cost (%) | 0.00 % | | PMI Cost (%) | 0.50 % |
| Settlement Costs | 4,000.00 | | Settlement Costs | 4,000.00 |
| Closing Date | 01-Mar-92 | | Closing Date | 01-Mar-92 |

---

INSURANCE ASSUMPTIONS FOR: METRO LIFE INSURANCE CORPORATION

| Current Rates: | | Guarantees: | |
|---|---|---|---|
| Mortality | 1983 GAM | Mortality | 1980 CSO |
| Percent | 100.00 % | Percent | 100.00 % |
| Unloaned Credited Rate | 9.50 % | Unloaned Credited Rate | 4.00 % |
| Loan Charged Rate | 9.50 % | | |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

IMPORTANT COMMENTS CONCERNING THE ATTACHED ILLUSTRATION

---

The information contained in the attached illustration is based on both assumptions furnished by the client for whom it is developed and the current assumptions of the mortgage and insurance plans chosen. Unless otherwise indicated, those rates assumed initially continue throughout the life of the illustration.

Conventional Mortgage assumptions for principal, mortgage interest rate, mortgage points (%) and settlement costs are the same as those assumed for The Ryan Mortgage. The down payment and initial loan balance are as stated on page 1 of this illustration.

Premium costs may change if the closing date differs from the one given. They may also change if any of the other assumptions used vary.

The mortgage illustrated is a variable rate mortgage. Mortgage and premium payments are subject to change with variations in interest rates.

Interest rates credited on unloaned policy values and the cost of insurance charges may vary after the first year. Interest rates charged on policy loans and credited on loaned policy values also may vary after the first year.

In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate.

The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice. Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 29C

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

ESTIMATED UPFRONT MORTGAGE AND OTHER ESCROW PAYMENT

| The Ryan Mortgage: | | Conventional Mortgage: | |
|---|---|---|---|
| Settlement Costs | 4,000.00 | Settlement Costs | 4,000.00 |
| Mortgage Points | 2,620.00 | Mortgage Points | 2,358.49 |
| PMI Escrow | 0.00 | PMI Escrow | 1,179.25 |
| Down Payment | 26,151.00 * | Down Payment | 26,151.00 |
| Total Closing Costs | 32,771.00 | Total Closing Costs | 33,688.74 |

\* The down payment is used for purchasing a single premium
 immediate annuity and for paying an insurance premium.

ESTIMATED AVERAGE FIRST YEAR MONTHLY PAYMENT

| The Ryan Mortgage: | | Conventional Mortgage: | |
|---|---|---|---|
| Mortgage | 2,292.50 | Mortgage | 2,157.40 |
| Tax Escrow | 235.00 | Tax Escrow | 235.00 |
| PMI Escrow | 0.00 | PMI Escrow | 98.27 |
| Life Insurance | 0.00 | Life Insurance | 17.77 |
| | 2,527.50 | | 2,508.44 |
| LESS | | LESS | |
| Tax Deduction | 779.45 | Tax Deduction | 700.07 |
| Net After-Tax Cost | 1,748.05 | Net After-Tax Cost | 1,808.37 |

ESTIMATED AVERAGE YEAR 10 MONTHLY PAYMENT

| The Ryan Mortgage: | | Conventional Mortgage: | |
|---|---|---|---|
| Mortgage | 2,292.50 | Mortgage | 2,157.40 |
| Tax Escrow | 235.00 | Tax Escrow | 235.00 |
| PMI Escrow | 0.00 | PMI Escrow | 98.27 |
| Life Insurance | 0.00 | Life Insurance | 30.19 |
| | 2,527.50 | | 2,520.86 |
| LESS | | LESS | |
| Tax Deduction | 779.45 | Tax Deduction | 638.38 |
| Net After-Tax Cost | 1,748.05 | Net After-Tax Cost | 1,882.48 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 29D

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

ESTIMATED EQUITY AND FINANCIAL ANALYSIS ASSUMING EARLY HOME SALE

In the following computations, the home is assumed to be sold at the original purchase price. If it is sold for a higher price, the total equity after the sale will increase.

Mortgage Costs:

|  | Ryan Mortgage | Conventional Mortgage | Financial Benefit From Ryan Mortgage | Cumulative Financial Benefit |
|---|---|---|---|---|
| Total Closing Costs: * | 32,771.00 | 33,688.74 | 917.73 | 917.73 |
| Annual After-Tax Mortgage Cost ** | | | | |
| Year 1 | 18,156.60 | 18,880.43 | 723.83 | 1,641.56 |
| Year 2 | 18,156.60 | 18,934.03 | 777.43 | 2,418.99 |
| Year 3 | 18,156.60 | 18,997.41 | 840.81 | 3,259.81 |
| Year 4 | 18,156.60 | 19,068.42 | 911.82 | 4,171.63 |
| Year 5 | 18,156.60 | 19,139.93 | 983.33 | 5,154.96 |
| Year 6 | 18,156.60 | 19,220.21 | 1,063.61 | 6,218.57 |
| Year 7 | 18,156.60 | 19,309.87 | 1,153.27 | 7,371.84 |
| Year 8 | 18,156.60 | 19,412.03 | 1,255.43 | 8,627.27 |
| Year 9 | 18,156.60 | 19,527.34 | 1,370.74 | 9,998.01 |
| Year 10 | 18,156.60 | 19,656.47 | 1,499.87 | 11,497.88 |

|  | Ryan Mortgage | Conventional Mortgage | Financial Benefit From Ryan Mortgage |
|---|---|---|---|
| Home Sale At The End of Year 5: | | | |
| End of Year Cash Value | 35,856.75 | 0.00 | 35,856.75 |
| Home Resale | 262,000.00 | 262,000.00 | 0.00 |
| Mortgage Balance | (262,000.00) | (228,494.52) | (33,505.48) |
| Total Equity After Sale | 35,856.75 | 33,505.48 | 2,351.27 |
| Total Closing Costs: * | 32,771.00 | 33,688.74 | 917.73 |
| After-Tax Mortgage Cost: ** | 90,783.00 | 95,020.22 | 4,237.22 |
| TOTAL 5 YEAR FINANCIAL BENEFIT: | | | 7,506.22 |
| Home Sale At The End of Year 10: | | | |
| End of Year Cash Value | 54,490.43 | 0.00 | 54,490.43 |
| Home Resale | 262,000.00 | 262,000.00 | 0.00 |
| Mortgage Balance | (262,000.00) | (216,090.44) | (45,909.56) |
| Total Equity After Sale | 54,490.43 | 45,909.56 | 8,580.87 |
| Total Closing Costs * | 32,771.00 | 33,688.74 | 917.73 |
| After-Tax Mortgage Cost: ** | 181,566.00 | 192,146.13 | 10,580.14 |
| TOTAL 10 YEAR FINANCIAL BENEFIT: | | | 20,078.75 |

\* See top of page 3 for detailed breakdown.
\*\* These values include insurance. (See page 5 for detailed breakdown.)

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 29E

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED ANNUAL COST
(Does not include Property Taxes or Hazard Insurance)
```

The Ryan Mortgage:                                              Conventional Mortgage:

| Year | Mortgage | Life Insurance | Interest Tax Deduction | Total After Taxes | Year | Mortgage | PMI plus Life Insurance | Interest Tax Deduction | Total After Taxes |
|---|---|---|---|---|---|---|---|---|---|
| 1 | 27,510.00 | 0.00 | 9,353.40 | 18,156.60 | 1 | 25,888.80 | 1,392.49 | 8,400.86 | 18,880.43 |
| 2 | 27,510.00 | 0.00 | 9,353.40 | 18,156.60 | 2 | 25,888.80 | 1,401.86 | 8,356.63 | 18,934.03 |
| 3 | 27,510.00 | 0.00 | 9,353.40 | 18,156.60 | 3 | 25,888.80 | 1,416.14 | 8,307.53 | 18,997.41 |
| 4 | 27,510.00 | 0.00 | 9,353.40 | 18,156.60 | 4 | 25,888.80 | 1,432.63 | 8,253.01 | 19,068.42 |
| 5 | 27,510.00 | 0.00 | 9,353.40 | 18,156.60 | 5 | 25,888.80 | 1,443.61 | 8,192.49 | 19,139.93 |
|  | 137,550.00 | 0.00 | 46,767.00 | 90,783.00 |  | 129,444.00 | 7,086.73 | 41,510.51 | 95,020.22 |
| 6 | 27,510.00 | 0.00 | 9,353.40 | 18,156.60 | 6 | 25,888.80 | 1,456.70 | 8,125.29 | 19,220.21 |
| 7 | 27,510.00 | 0.00 | 9,353.40 | 18,156.60 | 7 | 25,888.80 | 1,471.76 | 8,050.69 | 19,309.87 |
| 8 | 27,510.00 | 0.00 | 9,353.40 | 18,156.60 | 8 | 25,888.80 | 1,491.11 | 7,967.88 | 19,412.03 |
| 9 | 27,510.00 | 0.00 | 9,353.40 | 18,156.60 | 9 | 25,888.80 | 1,514.47 | 7,875.93 | 19,527.34 |
| 10 | 27,510.00 | 0.00 | 9,353.40 | 18,156.60 | 10 | 25,888.80 | 1,541.52 | 7,773.85 | 19,656.47 |
|  | 275,100.00 | 0.00 | 93,534.00 | 181,566.00 |  | 258,888.00 | 14,562.29 | 81,304.15 | 192,146.13 |
| 11 | 27,510.00 | 0.00 | 9,353.40 | 18,156.60 | 11 | 25,888.80 | 1,574.22 | 7,660.52 | 19,802.50 |
| 12 | 27,510.00 | 0.00 | 9,353.40 | 18,156.60 | 12 | 25,888.80 | 430.44 | 7,534.70 | 18,784.54 |
| 13 | 27,510.00 | 0.00 | 9,353.40 | 18,156.60 | 13 | 25,888.80 | 472.66 | 7,395.02 | 18,966.44 |
| 14 | 27,510.00 | 0.00 | 9,353.40 | 18,156.60 | 14 | 25,888.80 | 518.43 | 7,239.94 | 19,167.29 |
| 15 | 27,510.00 | 0.00 | 9,353.40 | 18,156.60 | 15 | 25,888.80 | 568.97 | 7,067.78 | 19,389.99 |
|  | 412,650.00 | 0.00 | 140,301.00 | 272,349.00 |  | 388,332.00 | 18,127.01 | 118,202.12 | 288,256.89 |
| 16 | 27,510.00 | 0.00 | 9,353.40 | 18,156.60 | 16 | 25,888.80 | 620.80 | 6,876.64 | 19,632.96 |
| 17 | 27,510.00 | 0.00 | 9,353.40 | 18,156.60 | 17 | 25,888.80 | 672.56 | 6,664.43 | 19,896.93 |
| 18 | 27,510.00 | 0.00 | 9,353.40 | 18,156.60 | 18 | 25,888.80 | 720.66 | 6,428.84 | 20,180.62 |
| 19 | 27,510.00 | 0.00 | 9,353.40 | 18,156.60 | 19 | 25,888.80 | 765.32 | 6,167.29 | 20,486.83 |
| 20 | 27,510.00 | 0.00 | 9,353.40 | 18,156.60 | 20 | 25,888.80 | 800.78 | 5,876.91 | 20,812.66 |
|  | 550,200.00 | 0.00 | 187,068.00 | 363,132.00 |  | 517,776.00 | 21,707.14 | 150,216.24 | 389,266.89 |
| 21 | 27,510.00 | 0.00 | 9,353.40 | 18,156.60 | 21 | 25,888.80 | 828.43 | 5,554.54 | 21,162.69 |
| 22 | 27,510.00 | 0.00 | 9,353.40 | 18,156.60 | 22 | 25,888.80 | 840.65 | 5,196.63 | 21,532.82 |
| 23 | 27,510.00 | 0.00 | 9,353.40 | 18,156.60 | 23 | 25,888.80 | 838.03 | 4,799.29 | 21,927.54 |
| 24 | 27,510.00 | 0.00 | 9,353.40 | 18,156.60 | 24 | 25,888.80 | 815.82 | 4,358.15 | 22,346.47 |
| 25 | 27,510.00 | 0.00 | 9,353.40 | 18,156.60 | 25 | 25,888.80 | 771.63 | 3,868.40 | 22,792.03 |
|  | 687,750.00 | 0.00 | 233,835.00 | 453,915.00 |  | 647,220.00 | 25,801.69 | 173,993.25 | 499,028.44 |
| 26 | 27,510.00 | 0.00 | 9,353.40 | 18,156.60 | 26 | 25,888.80 | 701.82 | 3,324.68 | 23,265.94 |
| 27 | 27,510.00 | 0.00 | 9,353.40 | 18,156.60 | 27 | 25,888.80 | 602.70 | 2,721.04 | 23,770.46 |
| 28 | 27,510.00 | 0.00 | 9,353.40 | 18,156.60 | 28 | 25,888.80 | 466.48 | 2,050.87 | 24,304.41 |
| 29 | 27,510.00 | 0.00 | 9,353.40 | 18,156.60 | 29 | 25,888.80 | 282.43 | 1,306.85 | 24,864.38 |
| 30 | 27,510.00 | 0.00 | 9,353.40 | 18,156.60 | 30 | 25,888.80 | 33.33 | 480.84 | 25,441.30 |
|  | 825,300.00 | 0.00 | 280,602.00 | 544,698.00 |  | 776,664.00 | 27,888.45 | 183,877.53 | 620,674.93 |

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 29F

THE RYAN MORTGAGE ILLUSTRATION SYSTEM

COMBINED ILLUSTRATION FOR THE PRODUCTS OF:
HOMEOWNER'S BANK
AND
METRO LIFE INSURANCE CORPORATION

---

ESTIMATED REMAINING MORTGAGE OBLIGATION
ASSUMING MORTGAGE IS PAID OFF WITH INSURANCE POLICY CASH SURRENDER VALUE

---

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid.

The Ryan Mortgage:                                                                               Conventional Mortgage:

| Year | Annuity plus Life Insurance Cash Value** | Tax Owed On Surrender** | Net Policy Proceeds** | End of Year Mortgage Principal | End of Year Net Mortgage Obligation * | Year | Life Insurance Cash Value | Net Policy Proceeds | End of Year Mortgage Principal |
|---|---|---|---|---|---|---|---|---|---|
| 1  | 25,642.68  | 1,045.56  | 24,597.12  | 262,000.00 | 237,402.88 | 1  | 0.00 | 0.00 | 234,668.57 |
| 2  | 27,872.19  | 792.26    | 27,079.92  | 262,000.00 | 234,920.08 | 2  | 0.00 | 0.00 | 233,358.05 |
| 3  | 30,318.89  | 869.87    | 29,449.02  | 262,000.00 | 232,550.98 | 3  | 0.00 | 0.00 | 231,903.10 |
| 4  | 33,004.05  | 1,190.74  | 31,813.31  | 262,000.00 | 230,186.69 | 4  | 0.00 | 0.00 | 230,287.82 |
| 5  | 35,856.75  | 2,160.66  | 33,696.09  | 262,000.00 | 228,303.91 | 5  | 0.00 | 0.00 | 228,494.52 |
| 6  | 38,969.18  | 3,218.89  | 35,750.30  | 262,000.00 | 226,249.70 | 6  | 0.00 | 0.00 | 226,503.60 |
| 7  | 42,364.35  | 4,373.24  | 37,991.11  | 262,000.00 | 224,008.89 | 7  | 0.00 | 0.00 | 224,293.27 |
| 8  | 46,065.38  | 5,631.59  | 40,433.79  | 262,000.00 | 221,566.21 | 8  | 0.00 | 0.00 | 221,839.36 |
| 9  | 50,097.92  | 7,002.66  | 43,095.26  | 262,000.00 | 218,904.74 | 9  | 0.00 | 0.00 | 219,115.01 |
| 10 | 54,490.43  | 8,496.11  | 45,994.32  | 262,000.00 | 216,005.68 | 10 | 0.00 | 0.00 | 216,090.44 |
| 11 | 59,272.41  | 10,121.98 | 49,150.43  | 262,000.00 | 212,849.57 | 11 | 0.00 | 0.00 | 212,732.54 |
| 12 | 64,478.90  | 11,892.19 | 52,586.71  | 262,000.00 | 209,413.29 | 12 | 0.00 | 0.00 | 209,004.60 |
| 13 | 70,144.83  | 13,818.61 | 56,326.23  | 262,000.00 | 205,673.77 | 13 | 0.00 | 0.00 | 204,865.82 |
| 14 | 76,311.49  | 15,915.27 | 60,396.22  | 262,000.00 | 201,603.78 | 14 | 0.00 | 0.00 | 200,270.93 |
| 15 | 83,023.21  | 18,197.26 | 64,825.95  | 262,000.00 | 197,174.05 | 15 | 0.00 | 0.00 | 195,169.67 |
| 16 | 90,331.81  | 20,682.18 | 69,649.63  | 262,000.00 | 192,350.37 | 16 | 0.00 | 0.00 | 189,506.24 |
| 17 | 98,295.45  | 23,389.82 | 74,905.63  | 262,000.00 | 187,094.37 | 17 | 0.00 | 0.00 | 183,218.67 |
| 18 | 106,981.11 | 26,342.94 | 80,638.17  | 262,000.00 | 181,361.83 | 18 | 0.00 | 0.00 | 176,238.20 |
| 19 | 116,462.16 | 29,566.50 | 86,895.66  | 262,000.00 | 175,104.34 | 19 | 0.00 | 0.00 | 168,488.45 |
| 20 | 126,824.08 | 33,089.55 | 93,734.53  | 262,000.00 | 168,265.47 | 20 | 0.00 | 0.00 | 159,884.65 |
| 21 | 138,159.54 | 36,943.61 | 101,215.93 | 262,000.00 | 160,784.07 | 21 | 0.00 | 0.00 | 150,332.68 |
| 22 | 150,576.61 | 41,165.41 | 109,411.20 | 262,000.00 | 152,588.80 | 22 | 0.00 | 0.00 | 139,728.06 |
| 23 | 164,193.49 | 45,795.15 | 118,398.34 | 262,000.00 | 143,601.66 | 23 | 0.00 | 0.00 | 127,954.77 |
| 24 | 179,138.13 | 50,876.33 | 128,261.80 | 262,000.00 | 133,738.20 | 24 | 0.00 | 0.00 | 114,884.02 |
| 25 | 195,493.92 | 56,437.30 | 139,056.62 | 262,000.00 | 122,943.38 | 25 | 0.00 | 0.00 | 100,372.82 |
| 26 | 213,358.90 | 62,511.39 | 150,847.51 | 262,000.00 | 111,152.49 | 26 | 0.00 | 0.00 | 84,262.45  |
| 27 | 232,877.60 | 69,147.75 | 163,729.85 | 262,000.00 | 98,270.15  | 27 | 0.00 | 0.00 | 66,376.65  |
| 28 | 254,209.35 | 76,400.54 | 177,808.81 | 262,000.00 | 84,191.19  | 28 | 0.00 | 0.00 | 46,519.78  |
| 29 | 277,529.17 | 84,329.28 | 193,199.89 | 262,000.00 | 68,800.11  | 29 | 0.00 | 0.00 | 24,474.62  |
| 30 | 302,973.30 | 92,980.29 | 209,993.01 | 262,000.00 | 52,006.99  | 30 | 0.00 | 0.00 | (0.00)     |

\* A negative obligation indicates death benefits in excess of the
mortgage obligation, payable to policyholder's estate.

\*\* The value included for the annuity is the present value of future payments,
discounted at the annuity interest credited rate.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED REMAINING MORTGAGE OBLIGATION
ASSUMING MORTGAGE IS PAID OFF WITH DEATH PROCEEDS

---

Life Insurance has certain tax advantages. Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid The Ryan Mortgage:                                  Conventional Mortgage:

| Year | Life Insurance Death Benefit * | End of Year Mortgage Principal | Net Death Proceeds | | Year | Life Insurance Death Benefit | End of Year Mortgage Principal | Net Death Proceeds |
|---|---|---|---|---|---|---|---|---|
| 1  | 262,000.00 | 262,000.00 | 0.00     | | 1  | 234,668.57 | 234,668.57 | 0.00 |
| 2  | 262,000.00 | 262,000.00 | 0.00     | | 2  | 233,358.05 | 233,358.05 | 0.00 |
| 3  | 262,000.00 | 262,000.00 | 0.00     | | 3  | 231,903.10 | 231,903.10 | 0.00 |
| 4  | 262,000.00 | 262,000.00 | 0.00     | | 4  | 230,287.82 | 230,287.82 | 0.00 |
| 5  | 262,000.00 | 262,000.00 | 0.00     | | 5  | 228,494.52 | 228,494.52 | 0.00 |
| 6  | 262,000.00 | 262,000.00 | 0.00     | | 6  | 226,503.60 | 226,503.60 | 0.00 |
| 7  | 262,000.00 | 262,000.00 | 0.00     | | 7  | 224,293.27 | 224,293.27 | 0.00 |
| 8  | 262,000.00 | 262,000.00 | 0.00     | | 8  | 221,839.36 | 221,839.36 | 0.00 |
| 9  | 262,000.00 | 262,000.00 | 0.00     | | 9  | 219,115.01 | 219,115.01 | 0.00 |
| 10 | 262,000.00 | 262,000.00 | 0.00     | | 10 | 216,090.44 | 216,090.44 | 0.00 |
| 11 | 262,000.00 | 262,000.00 | 0.00     | | 11 | 212,732.54 | 212,732.54 | 0.00 |
| 12 | 262,000.00 | 262,000.00 | 0.00     | | 12 | 209,004.60 | 209,004.60 | 0.00 |
| 13 | 262,000.00 | 262,000.00 | 0.00     | | 13 | 204,865.82 | 204,865.82 | 0.00 |
| 14 | 262,000.00 | 262,000.00 | 0.00     | | 14 | 200,270.93 | 200,270.93 | 0.00 |
| 15 | 262,000.00 | 262,000.00 | 0.00     | | 15 | 195,169.67 | 195,169.67 | 0.00 |
| 16 | 262,000.00 | 262,000.00 | 0.00     | | 16 | 189,506.24 | 189,506.24 | 0.00 |
| 17 | 262,000.00 | 262,000.00 | 0.00     | | 17 | 183,218.67 | 183,218.67 | 0.00 |
| 18 | 262,000.00 | 262,000.00 | 0.00     | | 18 | 176,238.20 | 176,238.20 | 0.00 |
| 19 | 262,000.00 | 262,000.00 | 0.00     | | 19 | 168,488.45 | 168,488.45 | 0.00 |
| 20 | 262,000.00 | 262,000.00 | 0.00     | | 20 | 159,884.65 | 159,884.65 | 0.00 |
| 21 | 262,000.00 | 262,000.00 | 0.00     | | 21 | 150,332.68 | 150,332.68 | 0.00 |
| 22 | 262,000.00 | 262,000.00 | 0.00     | | 22 | 139,728.06 | 139,728.06 | 0.00 |
| 23 | 262,000.00 | 262,000.00 | 0.00     | | 23 | 127,954.77 | 127,954.77 | 0.00 |
| 24 | 268,707.19 | 262,000.00 | 6,707.19 | | 24 | 114,884.02 | 114,884.02 | 0.00 |
| 25 | 285,421.13 | 262,000.00 | 23,421.13| | 25 | 100,372.82 | 100,372.82 | 0.00 |
| 26 | 302,969.64 | 262,000.00 | 40,969.64| | 26 | 84,262.45  | 84,262.45  | 0.00 |
| 27 | 321,371.09 | 262,000.00 | 59,371.09| | 27 | 66,376.65  | 66,376.65  | 0.00 |
| 28 | 340,640.53 | 262,000.00 | 78,640.53| | 28 | 46,519.78  | 46,519.78  | 0.00 |
| 29 | 360,787.92 | 262,000.00 | 98,787.92| | 29 | 24,474.62  | 24,474.62  | 0.00 |
| 30 | 387,805.83 | 262,000.00 |125,805.83| | 30 | (0.00)     | (0.00)     | 0.00 |

* This does NOT include annuity value

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

EFFECTS OF CHANGES IN INTEREST RATES ON MONTHLY RYAN PAYMENTS

---

As noted on page 2 of this illustration, in the event interest rates go down, variable mortgage payments will go down; life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30.

| | |
|---|---|
| Original Ryan Mortgage (Interest) Payment: | 2,292.50 |
| Original Ryan After-Tax Mortgage Payment: | 1,513.05 |

| | | | | |
|---|---|---|---|---|
| Interest Crediting Rate (beginning in year 2): | 4.00 % | | Interest Crediting Rate (beginning in year 2): | 13.50 % |
| Mortgage Interest Rate (beginning in year 2): | 5.00 % | | Mortgage Interest Rate (beginning in year 2): | 14.50 % |

| Year | Incremental LI Premium | Adjusted Mortgage Payment | After-Tax Combined Cost | End of Year Insurance Cash Value | Year | Incremental LI Premium | Adjusted Mortgage Payment | After-Tax Combined Cost | End of Year Insurance Cash Value |
|---|---|---|---|---|---|---|---|---|---|
| 1 | 0.00 | 2,292.50 | 1,513.05 | 7,056.07 | 1 | 0.00 | 2,292.50 | 1,513.05 | 7,056.07 |
| 2 | 68.02 | 1,091.67 | 788.52 | 14,941.78 | 2 | 0.00 | 3,165.83 | 2,089.45 | 15,490.92 |
| 3 | 107.08 | 1,091.67 | 827.58 | 23,567.89 | 3 | 0.00 | 3,165.83 | 2,089.45 | 25,056.18 |
| 4 | 149.82 | 1,091.67 | 870.32 | 33,004.05 | 4 | 0.00 | 3,165.83 | 2,089.45 | 35,904.25 |
| 5 | 162.76 | 1,091.67 | 883.26 | 35,856.75 | 5 | 0.00 | 3,165.83 | 2,089.45 | 40,465.46 |
| 6 | 176.88 | 1,091.67 | 897.38 | 38,969.18 | 6 | 0.00 | 3,165.83 | 2,089.45 | 45,633.08 |
| 7 | 192.28 | 1,091.67 | 912.78 | 42,364.35 | 7 | 0.00 | 3,165.83 | 2,089.45 | 51,488.04 |
| 8 | 209.08 | 1,091.67 | 929.58 | 46,065.38 | 8 | 0.00 | 3,165.83 | 2,089.45 | 58,120.37 |
| 9 | 227.38 | 1,091.67 | 947.88 | 50,097.92 | 9 | 0.00 | 3,165.83 | 2,089.45 | 65,633.01 |
| 10 | 247.33 | 1,091.67 | 967.83 | 54,490.43 | 10 | 0.00 | 3,165.83 | 2,089.45 | 74,143.69 |
| 11 | 269.06 | 1,091.67 | 989.56 | 59,272.41 | 11 | 0.00 | 3,165.83 | 2,089.45 | 83,785.18 |
| 12 | 292.72 | 1,091.67 | 1,013.22 | 64,478.90 | 12 | 0.00 | 3,165.83 | 2,089.45 | 94,711.69 |
| 13 | 318.48 | 1,091.67 | 1,038.98 | 70,144.83 | 13 | 0.00 | 3,165.83 | 2,089.45 | 107,096.49 |
| 14 | 346.52 | 1,091.67 | 1,067.02 | 76,311.49 | 14 | 0.00 | 3,165.83 | 2,089.45 | 121,140.72 |
| 15 | 377.06 | 1,091.67 | 1,097.56 | 83,023.21 | 15 | 0.00 | 3,165.83 | 2,089.45 | 137,053.19 |
| 16 | 410.31 | 1,091.67 | 1,130.81 | 90,331.81 | 16 | 0.00 | 3,165.83 | 2,089.45 | 155,040.93 |
| 17 | 446.54 | 1,091.67 | 1,167.04 | 98,295.45 | 17 | 0.00 | 3,165.83 | 2,089.45 | 175,368.19 |
| 18 | 486.05 | 1,091.67 | 1,206.55 | 106,981.11 | 18 | 0.00 | 3,165.83 | 2,089.45 | 198,340.00 |
| 19 | 529.17 | 1,091.67 | 1,249.67 | 116,462.16 | 19 | 0.00 | 3,165.83 | 2,089.45 | 224,300.75 |
| 20 | 576.29 | 1,091.67 | 1,296.79 | 126,824.08 | 20 | 0.00 | 3,165.83 | 2,089.45 | 253,656.65 |
| 21 | 627.83 | 1,091.67 | 1,348.33 | 138,159.54 | 21 | 0.00 | 3,165.83 | 2,089.45 | 286,860.57 |
| 22 | 684.26 | 1,091.67 | 1,404.76 | 150,576.61 | 22 | 0.00 | 3,165.83 | 2,089.45 | 324,436.50 |
| 23 | 746.13 | 1,091.67 | 1,466.63 | 164,193.49 | 23 | 0.00 | 3,165.83 | 2,089.45 | 366,980.74 |
| 24 | 813.53 | 1,091.67 | 1,534.03 | 179,138.13 | 24 | 0.00 | 3,165.83 | 2,089.45 | 415,179.75 * |
| 25 | 884.62 | 1,091.67 | 1,605.12 | 195,493.92 | 25 | 0.00 | 3,165.83 | 2,089.45 | 469,727.35 * |
| 26 | 965.46 | 1,091.67 | 1,685.96 | 213,358.90 | 26 | 0.00 | 3,165.83 | 2,089.45 | 531,475.11 * |
| 27 | 1,053.79 | 1,091.67 | 1,774.29 | 232,877.60 | 27 | 0.00 | 3,165.83 | 2,089.45 | 601,387.97 * |
| 28 | 1,150.32 | 1,091.67 | 1,870.82 | 254,209.35 | 28 | 0.00 | 3,165.83 | 2,089.45 | 680,563.83 * |
| 29 | 1,255.84 | 1,091.67 | 1,976.34 | 277,529.17 | 29 | 0.00 | 3,165.83 | 2,089.45 | 770,250.42 * |
| 30 | 1,370.98 | 1,091.67 | 2,091.48 | 302,973.30 * | 30 | 0.00 | 3,165.83 | 2,089.45 | 871,704.89 * |

\* If the insurance policy is surrendered, the after-tax proceeds will pay off the mortgage principal.

\* If the insurance policy is surrendered, the after-tax proceeds will pay off the mortgage principal.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 29I

```
THE RYAN MORTGAGE ILLUSTRATION SYSTEM

COMBINED ILLUSTRATION FOR THE PRODUCTS OF:
HOMEOWNER'S BANK
AND
METRO LIFE INSURANCE CORPORATION
```

```
ESTIMATED POLICY VALUES FOR POLICY YEAR 31 THROUGH AGE 99
ASSUMING INSURANCE POLICY IS KEPT AFTER YEAR 30
```

The Ryan Mortgage Illustration shows an option whereby the mortgage balance is paid at the end of year 30 by a policy loan taken against the policy cash value. One benefit of this option is that the life insurance coverage continues after the mortgage is paid off. Annual policy loan interest due is paid with additional policy loans.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|------|---------------------------------------|-------------|-------------------------|-------------------|--------------------------------------|---------------------------|-------------------------------|
| 31 | 330,730.60 | 24,890.00 | 262,000.00 | 24,890.00 | 43,840.60 | 416,720.56 | 129,830.56 |
| 32 | 361,007.97 | 27,254.55 | 286,890.00 | 27,254.55 | 46,863.42 | 447,649.89 | 133,505.34 |
| 33 | 394,032.30 | 29,843.73 | 314,144.55 | 29,843.73 | 50,044.01 | 480,719.40 | 136,731.12 |
| 34 | 430,054.73 | 32,678.89 | 343,988.28 | 32,678.89 | 53,387.57 | 516,065.68 | 139,398.51 |
| 35 | 469,271.63 | 35,783.38 | 376,667.17 | 35,783.38 | 56,821.08 | 558,433.23 | 145,982.68 |
| 36 | 511,955.57 | 39,182.80 | 412,450.55 | 39,182.80 | 60,322.21 | 604,107.57 | 152,474.22 |
| 37 | 558,407.11 | 42,905.17 | 451,633.35 | 42,905.17 | 63,868.59 | 653,336.32 | 158,797.80 |
| 38 | 608,961.53 | 46,981.16 | 494,538.52 | 46,981.16 | 67,441.85 | 706,395.38 | 164,875.70 |
| 39 | 663,992.74 | 51,444.37 | 541,519.68 | 51,444.37 | 71,028.69 | 763,591.66 | 170,627.61 |
| 40 | 724,135.89 | 56,331.58 | 592,964.05 | 56,331.58 | 74,840.25 | 818,273.55 | 168,977.92 |
| 41 | 789,949.54 | 61,683.09 | 649,295.63 | 61,683.09 | 78,970.82 | 876,843.99 | 165,865.26 |
| 42 | 862,069.33 | 67,542.98 | 710,978.72 | 67,542.98 | 83,547.63 | 939,655.57 | 161,133.87 |
| 43 | 941,225.99 | 73,959.56 | 778,521.70 | 73,959.56 | 88,744.73 | 1,007,111.81 | 154,630.55 |
| 44 | 1,028,272.36 | 80,985.72 | 852,481.26 | 80,985.72 | 94,805.38 | 1,079,685.98 | 146,219.00 |
| 45 | 1,123,103.83 | 88,679.36 | 933,466.98 | 88,679.36 | 100,957.48 | 1,179,259.02 | 157,112.68 |
| 46 | 1,226,354.81 | 97,103.90 | 1,022,146.34 | 97,103.90 | 107,104.56 | 1,287,672.55 | 168,422.30 |
| 47 | 1,338,703.79 | 106,328.77 | 1,119,250.25 | 106,328.77 | 113,124.77 | 1,405,638.98 | 180,059.96 |
| 48 | 1,460,874.91 | 116,430.01 | 1,225,579.02 | 116,430.01 | 118,865.89 | 1,533,918.66 | 191,909.64 |
| 49 | 1,593,641.62 | 127,490.86 | 1,342,009.03 | 127,490.86 | 124,141.74 | 1,673,323.70 | 203,823.82 |
| 50 | 1,737,827.70 | 139,602.49 | 1,469,499.88 | 139,602.49 | 128,725.33 | 1,824,719.08 | 215,616.71 |
| 51 | 1,894,311.38 | 152,864.73 | 1,609,102.37 | 152,864.73 | 132,344.28 | 1,989,026.95 | 227,059.85 |
| 52 | 2,064,030.47 | 167,386.87 | 1,761,967.10 | 167,386.87 | 134,676.50 | 2,167,231.99 | 237,878.02 |
| 53 | 2,247,986.51 | 183,288.63 | 1,929,353.97 | 183,288.63 | 135,343.91 | 2,360,385.83 | 247,743.24 |
| 54 | 2,447,247.00 | 200,701.05 | 2,112,642.60 | 200,701.05 | 133,903.36 | 2,569,609.35 | 256,265.71 |
| 55 | 2,662,907.34 | 219,767.65 | 2,313,343.64 | 219,767.65 | 129,796.05 | 2,796,052.71 | 262,941.42 |
| 56 | 2,896,141.74 | 240,645.57 | 2,533,111.29 | 240,645.57 | 122,384.88 | 3,040,948.83 | 267,191.97 |
| 57 | 3,148,165.22 | 263,506.90 | 2,773,756.86 | 263,506.90 | 110,901.45 | 3,305,573.48 | 268,309.72 |
| 58 | 3,420,231.79 | 288,540.06 | 3,037,263.77 | 288,540.06 | 94,427.96 | 3,591,243.38 | 265,439.55 |
| 59 | 3,713,629.92 | 315,951.36 | 3,325,803.82 | 315,951.36 | 71,874.73 | 3,899,311.42 | 257,556.23 |
| 60 | 4,037,032.85 | 345,966.74 | 3,641,755.19 | 345,966.74 | 49,310.92 | 4,198,514.16 | 210,792.24 |
| 61 | 4,394,888.34 | 378,833.58 | 3,987,721.93 | 378,833.58 | 28,332.83 | 4,526,734.99 | 160,179.48 |
| 62 | 4,792,499.32 | 414,822.77 | 4,366,555.51 | 414,822.77 | 11,121.04 | 4,888,349.31 | 106,971.02 |
| 63 | 5,236,086.64 | 454,230.94 | 4,781,378.29 | 454,230.94 | 477.41 | 5,288,447.50 | 52,838.28 |
| 64 | 5,733,449.17 | 497,382.88 | 5,235,609.22 | 497,382.88 | 457.07 | 5,733,449.17 | 457.07 |
| 65 | 6,278,061.14 | 544,634.25 | 5,732,992.10 | 544,634.25 | 434.79 | 6,278,061.14 | 434.79 |

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 29J

<div style="border:1px solid black; padding:8px; text-align:center;">
THE RYAN MORTGAGE ILLUSTRATION SYSTEM COMBINED ILLUSTRATION FOR THE PRODUCTS OF :
HOMEOWNER'S BANK
AND
METRO LIFE INSURANCE CORPORATION
</div>

<div style="border:1px solid black; padding:8px; text-align:center;">
ESTIMATED POLICY VALUES FOR POLICY YEAR 31 THROUGH AGE 99
ASSUMING INSURANCE POLICY IS KEPT AFTER YEAR 30
</div>

The Ryan Mortgage Illustration shows an option whereby the mortgage balance is paid at the end of year 30 by a policy loan taken against the policy cash value. One benefit of this option is that the life insurance coverage continues after the mortgage is paid off. Annual policy loan interest due is paid with additional policy loans.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 66 | 6,874,411.24 | 596,374.50 | 6,277,626.35 | 596,374.50 | 410.39 | 6,874,411.24 | 410.39 |
| 67 | 7,527,414.61 | 653,030.08 | 6,874,000.85 | 653,030.08 | 383.68 | 7,527,414.61 | 383.68 |
| 68 | 8,242,453.30 | 715,067.94 | 7,527,030.93 | 715,067.94 | 354.43 | 8,242,453.30 | 354.43 |

<div style="border:1px solid black; padding:8px;">
The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.
</div>

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

GUARANTEED LIFE INSURANCE VALUES

---

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued

| Year | End of Year Cash Value | End of Year Death Benefit |
|---|---|---|
| 1  | 6,400.72  | 262,000.00 |
| 2  | 13,205.66 | 262,000.00 |
| 3  | 20,274.15 | 262,000.00 |
| 4  | 27,613.78 | 262,000.00 |
| 5  | 28,121.90 | 262,000.00 |
| 6  | 28,613.43 | 262,000.00 |
| 7  | 29,083.06 | 262,000.00 |
| 8  | 29,522.90 | 262,000.00 |
| 9  | 29,927.13 | 262,000.00 |
| 10 | 30,284.95 | 262,000.00 |
| 11 | 30,594.52 | 262,000.00 |
| 12 | 30,844.48 | 262,000.00 |
| 13 | 31,029.99 | 262,000.00 |
| 14 | 31,138.89 | 262,000.00 |
| 15 | 31,165.46 | 262,000.00 |
| 16 | 31,098.94 | 262,000.00 |
| 17 | 30,930.31 | 262,000.00 |
| 18 | 30,642.91 | 262,000.00 |
| 19 | 30,223.84 | 262,000.00 |
| 20 | 29,645.12 | 262,000.00 |
| 21 | 28,881.78 | 262,000.00 |
| 22 | 27,902.34 | 262,000.00 |
| 23 | 26,670.64 | 262,000.00 |
| 24 | 25,157.40 | 262,000.00 |
| 25 | 23,325.93 | 262,000.00 |
| 26 | 21,146.10 | 262,000.00 |
| 27 | 18,577.39 | 262,000.00 |
| 28 | 15,572.73 | 262,000.00 |
| 29 | 12,067.46 | 262,000.00 |
| 30 | 7,984.73  | 262,000.00 |
| 31 | 3,228.30  | 262,000.00 |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 29L

| THE RYAN MORTGAGE ILLUSTRATION SYSTEM |
|---|
| COMBINED ILLUSTRATION FOR THE PRODUCTS OF :<br>HOMEOWNER'S BANK<br>AND<br>METRO LIFE INSURANCE CORPORATION |

| LIFE INSURANCE COST INDICES |
|---|

An explanation of the intended use of these indices is provided in The Life Insurance Buyer's Guide. These indices are useful only for the comparison of relative costs of two or more similar policies The cost indices do not reflect any optional benefits

|  | BASED ON GUARANTEED FACTORS | |
|---|---|---|
|  | 10 Year | 20 Year |
| SURRENDER COST INDEX @ 5% | 4.17 | 4.75 |
| NET PAYMENT COST INDEX @ 5% | 12.93 | 8.01 |

|  | BASED ON CURRENT FACTORS | |
|---|---|---|
|  | 10 Year | 20 Year |
| SURRENDER COST INDEX @ 5% | -2.82 | -5.93 |
| NET PAYMENT COST INDEX @ 5% | 12.93 | 8.01 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30A

```
                    THE RYAN MORTGAGE ILLUSTRATION SYSTEM

COMBINED ILLUSTRATION FOR THE PRODUCTS OF :
                           HOMEOWNER'S BANK
                                  AND
                    METRO LIFE INSURANCE CORPORATION
```

Illustration Developed For:                         By:

Bozeman Amorey Stella                           Bill Simpson
   666 Greenwich Street                             Mortgage ProBrokers
   Apt. 933                                         555 Wilton Way
   New York, NY  10014                              Wilton, CT  06894

With regards to property located at                 The real estate agent representing you in the purchase:

Milly Jenner
                                                    Chekov & Karney
   62 Hillock Road                                  310 Wilton Way
   Cannondale, CT  05555                            Wilton, CT  06894

```
              INDIVIDUAL DATA FOR:  Bozeman Amorey Stella
```

Age                          32
Sex                          Male
Individual Tax Rate          34.00 %

```
              MORTGAGE ASSUMPTIONS FOR:  HOMEOWNER'S BANK
```

| The Ryan Mortgage: | | | Conventional Mortgage: | |
|---|---|---|---|---|
| Principal Amount | 262,000.00 | | Principal Amount: | 262,000.00 |
| Down Payment | 26,151.00 | | Down Payment: | 26,151.00 |
| Initial Loan Balance: | 262,000.00 | | Initial Loan Balance: | 235,849.00 |
| Down Payment as % of Principal | 9.98 % | | Down Payment as % of Principal: | 9.98 % |
| Mortgage Interest Rate: | 10.50 % | Cap: 14.50 % | Mortgage Interest Rate: | 10.50 % |
| Mortgage Points (%) | 1.00 % | | Mortgage Points (%): | 1.00 % |
| Term of Mortgage (Years) | 30 * | | Term of Mortgage (Years) | 30 |
| PMI Cost (%) | 0.00 % | | PMI Cost (%): | 0.50 % |
| Settlement Costs | 4,000.00 | | Settlement Costs | 4,000.00 |
| Closing Date | 01-Mar-92 | | Closing Date: | 01-Mar-92 |

* This is the initial mortgage term.

```
        INSURANCE ASSUMPTIONS FOR:  METRO LIFE INSURANCE CORPORATION
```

| Current Rates: | | Guarantees: | |
|---|---|---|---|
| Mortality | 1983 GAM | Mortality: | 1980 CSO |
|   Percent | 100.00 % |   Percent: | 100.00 % |
| Unloaned Credited Rate: | 9.50 % | Unloaned Credited Rate: | 4.00 % |
| Loan Charged Rate: | 9.50 % | | |
| Loan Credited Rate | 9.50 % | | |

ANNUITY DATA
The Ryan down payment will be used, in part, to purchase a single premium immediate annuity (SPIA) to pay the life insurance premiums.

Interest Credited Rate              9.25 %
Number of Insurance Premiums Paid      3

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

IMPORTANT COMMENTS CONCERNING THE ATTACHED ILLUSTRATION

---

The information contained in the attached illustration is based on both assumptions furnished by the client for whom it is developed and the current assumptions of the mortgage and insurance plans chosen. Unless otherwise indicated, those rates assumed initially continue throughout the life of the illustration.

Conventional Mortgage assumptions for principal, mortgage interest rate, mortgage points (%) and settlement costs are the same as those assumed for The Ryan Mortgage. The down payment and initial loan balance are as stated on page 1 of this illustration.

Premium costs may change if the closing date differs from the one given. They may also change if any of the other assumptions used vary.

The mortgage illustrated is a variable rate mortgage. Mortgage and premium payments are subject to change with variations in interest rates.

Interest rates credited on unloaned policy values and the cost of insurance charges may vary after the first year. Interest rates charged on policy loans and credited on loaned policy values also may vary after the first year.

In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate.

The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice. Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30C

```
THE RYAN MORTGAGE ILLUSTRATION SYSTEM

COMBINED ILLUSTRATION FOR THE PRODUCTS OF :
           HOMEOWNER'S BANK
                  AND
        METRO LIFE INSURANCE CORPORATION
```

ESTIMATED UPFRONT MORTGAGE AND OTHER ESCROW PAYMENT

| The Ryan Mortgage: | | Conventional Mortgage: | |
|---|---:|---|---:|
| Settlement Costs | 4,000.00 | Settlement Costs | 4,000.00 |
| Mortgage Points | 2,620.00 | Mortgage Points | 2,358.49 |
| PMI Escrow | 0.00 | PMI Escrow | 1,179.25 |
| Down Payment | 26,151.00 * | Down Payment | 26,151.00 |
| Total Closing Costs | 32,771.00 | Total Closing Costs | 33,688.74 |

\* The down payment is used for purchasing a single premium immediate annuity and for paying an insurance premium

ESTIMATED AVERAGE FIRST YEAR MONTHLY PAYMENT

| The Ryan Mortgage: | | Conventional Mortgage: | |
|---|---:|---|---:|
| Mortgage | 2,292.50 | Mortgage | 2,157.40 |
| Tax Escrow | 235.00 | Tax Escrow | 235.00 |
| PMI Escrow | 0.00 | PMI Escrow | 98.27 |
| Life Insurance | 0.00 | Life Insurance | 17.77 |
| | 2,527.50 | | 2,508.44 |
| LESS | | LESS | |
| Tax Deduction | 779.45 | Tax Deduction | 700.07 |
| Net After-Tax Cost | 1,748.05 | Net After-Tax Cost | 1,808.37 |

ESTIMATED AVERAGE YEAR 10 MONTHLY PAYMENT

| The Ryan Mortgage: | | Conventional Mortgage: | |
|---|---:|---|---:|
| Mortgage | 2,292.50 | Mortgage | 2,157.40 |
| Tax Escrow | 235.00 | Tax Escrow | 235.00 |
| PMI Escrow | 0.00 | PMI Escrow | 98.27 |
| Life Insurance | 0.00 | Life Insurance | 30.19 |
| | 2,527.50 | | 2,520.86 |
| LESS | | LESS | |
| Tax Deduction | 779.45 | Tax Deduction | 638.38 |
| Net After-Tax Cost | 1,748.05 | Net After-Tax Cost | 1,882.48 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED EQUITY AND FINANCIAL ANALYSIS ASSUMING EARLY HOME SALE

---

In the following computations, the home is assumed to be sold at the original purchase price. If it is sold for a higher price, the total equity after the sale will increase.

Mortgage Costs:

|  | Ryan Mortgage | Conventional Mortgage | Financial Benefit From Ryan Mortgage | Cumulative Financial Benefit |
|---|---|---|---|---|
| Total Closing Costs * | 32,771.00 | 33,688.74 | 917.73 | 917.73 |
| Annual After-Tax Mortgage Cost ** | | | | |
| Year 1 | 18,156.60 | 18,880.43 | 723.83 | 1,641.56 |
| Year 2 | 18,156.60 | 18,934.03 | 777.43 | 2,418.99 |
| Year 3 | 18,156.60 | 18,997.41 | 840.81 | 3,259.81 |
| Year 4 | 18,156.60 | 19,068.42 | 911.82 | 4,171.63 |
| Year 5 | 18,156.60 | 19,139.93 | 983.33 | 5,154.96 |
| Year 6 | 18,156.60 | 19,220.21 | 1,063.61 | 6,218.57 |
| Year 7 | 18,156.60 | 19,309.87 | 1,153.27 | 7,371.84 |
| Year 8 | 18,156.60 | 19,412.03 | 1,255.43 | 8,627.27 |
| Year 9 | 18,156.60 | 19,527.34 | 1,370.74 | 9,998.01 |
| Year 10 | 18,156.60 | 19,656.47 | 1,499.87 | 11,497.88 |

| Home Sale At The End of Year 5: | Ryan Mortgage | Conventional Mortgage | Financial Benefit From Ryan Mortgage |
|---|---|---|---|
| End of Year Cash Value | 35,856.75 | 0.00 | 35,856.75 |
| Home Resale | 262,000.00 | 262,000.00 | 0.00 |
| Mortgage Balance | (262,000.00) | (228,494.52) | (33,505.48) |
| Total Equity After Sale | 35,856.75 | 33,505.48 | 2,351.27 |
| Total Closing Costs * | 32,771.00 | 33,688.74 | 917.73 |
| After-Tax Mortgage Cost ** | 90,783.00 | 95,020.22 | 4,237.22 |
| TOTAL 5 YEAR FINANCIAL BENEFIT: | | | 7,506.22 |

Home Sale At The End of Year 10:

|  | Ryan Mortgage | Conventional Mortgage | Financial Benefit From Ryan Mortgage |
|---|---|---|---|
| End of Year Cash Value | 54,490.43 | 0.00 | 54,490.43 |
| Home Resale | 262,000.00 | 262,000.00 | 0.00 |
| Mortgage Balance | (262,000.00) | (216,090.44) | (45,909.56) |
| Total Equity After Sale | 54,490.43 | 45,909.56 | 8,580.87 |
| Total Closing Costs * | 32,771.00 | 33,688.74 | 917.73 |
| After-Tax Mortgage Cost ** | 181,566.00 | 192,146.14 | 10,580.14 |
| TOTAL 10 YEAR FINANCIAL BENEFIT: | | | 20,078.75 |

\* See top of page 3 for detailed breakdown
\*\* These values include insurance. (See page 5 for detailed breakdown.)

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30E

```
THE RYAN MORTGAGE ILLUSTRATION SYSTEM

COMBINED ILLUSTRATION FOR THE PRODUCTS OF :
              HOMEOWNER'S BANK
                    AND
         METRO LIFE INSURANCE CORPORATION
```

```
                        ESTIMATED ANNUAL COST
              (Does not include Property Taxes or Hazard Insurance)
```

The Ryan Mortgage:                                    Conventional Mortgage:

| Year | Mortgage | Life Insurance | Interest Tax Deduction | Total After Taxes | Year | Mortgage | PMI plus Life Insurance | Interest Tax Deduction | Total After Taxes |
|---|---|---|---|---|---|---|---|---|---|
| 1 | 27,510.00 | 0.00 | 9,353.40 | 18,156.60 | 1 | 25,888.80 | 1,392.49 | 8,400.86 | 18,880.43 |
| 2 | 27,510.00 | 0.00 | 9,353.40 | 18,156.60 | 2 | 25,888.80 | 1,401.86 | 8,356.63 | 18,934.03 |
| 3 | 27,510.00 | 0.00 | 9,353.40 | 18,156.60 | 3 | 25,888.80 | 1,416.14 | 8,307.53 | 18,997.41 |
| 4 | 27,510.00 | 0.00 | 9,353.40 | 18,156.60 | 4 | 25,888.80 | 1,432.63 | 8,253.01 | 19,068.42 |
| 5 | 27,510.00 | 0.00 | 9,353.40 | 18,156.60 | 5 | 25,888.80 | 1,443.61 | 8,192.49 | 19,139.93 |
|   | 137,550.00 | 0.00 | 46,767.00 | 90,783.00 |   | 129,444.00 | 7,086.73 | 41,510.51 | 95,020.22 |
| 6 | 27,510.00 | 0.00 | 9,353.40 | 18,156.60 | 6 | 25,888.80 | 1,456.70 | 8,125.29 | 19,220.21 |
| 7 | 27,510.00 | 0.00 | 9,353.40 | 18,156.60 | 7 | 25,888.80 | 1,471.76 | 8,050.69 | 19,309.87 |
| 8 | 27,510.00 | 0.00 | 9,353.40 | 18,156.60 | 8 | 25,888.80 | 1,491.11 | 7,967.88 | 19,412.03 |
| 9 | 27,510.00 | 0.00 | 9,353.40 | 18,156.60 | 9 | 25,888.80 | 1,514.47 | 7,875.93 | 19,527.34 |
| 10 | 27,510.00 | 0.00 | 9,353.40 | 18,156.60 | 10 | 25,888.80 | 1,541.52 | 7,773.85 | 19,656.47 |
|    | 275,100.00 | 0.00 | 93,534.00 | 181,566.00 |   | 258,888.00 | 14,562.29 | 81,304.15 | 192,146.14 |
| 11 | 27,510.00 | 0.00 | 9,353.40 | 18,156.60 | 11 | 25,888.80 | 1,574.22 | 7,660.52 | 19,802.50 |
| 12 | 27,510.00 | 0.00 | 9,353.40 | 18,156.60 | 12 | 25,888.80 | 430.44 | 7,534.70 | 18,784.54 |
| 13 | 27,510.00 | 0.00 | 9,353.40 | 18,156.60 | 13 | 25,888.80 | 472.66 | 7,395.02 | 18,966.44 |
| 14 | 27,510.00 | 0.00 | 9,353.40 | 18,156.60 | 14 | 25,888.80 | 518.43 | 7,239.94 | 19,167.29 |
| 15 | 27,510.00 | 0.00 | 9,353.40 | 18,156.60 | 15 | 25,888.80 | 568.97 | 7,067.78 | 19,389.99 |
|    | 412,650.00 | 0.00 | 140,301.00 | 272,349.00 |   | 388,332.00 | 18,127.01 | 118,202.12 | 288,256.89 |
| 16 | 27,510.00 | 0.00 | 9,353.40 | 18,156.60 | 16 | 25,888.80 | 620.80 | 6,876.64 | 19,632.96 |
| 17 | 27,510.00 | 0.00 | 9,353.40 | 18,156.60 | 17 | 25,888.80 | 672.56 | 6,664.43 | 19,896.93 |
| 18 | 27,510.00 | 0.00 | 9,353.40 | 18,156.60 | 18 | 25,888.80 | 720.66 | 6,428.84 | 20,180.62 |
| 19 | 27,510.00 | 0.00 | 9,353.40 | 18,156.60 | 19 | 25,888.80 | 765.32 | 6,167.29 | 20,486.83 |
| 20 | 27,510.00 | 0.00 | 9,353.40 | 18,156.60 | 20 | 25,888.80 | 800.78 | 5,876.91 | 20,812.66 |
|    | 550,200.00 | 0.00 | 187,068.00 | 363,132.00 |   | 517,776.00 | 21,707.14 | 150,216.24 | 389,266.89 |
| 21 | 27,510.00 | 0.00 | 9,353.40 | 18,156.60 | 21 | 25,888.80 | 828.43 | 5,554.54 | 21,162.69 |
| 22 | 27,510.00 | 0.00 | 9,353.40 | 18,156.60 | 22 | 25,888.80 | 840.65 | 5,196.63 | 21,532.82 |
| 23 | 27,510.00 | 0.00 | 9,353.40 | 18,156.60 | 23 | 25,888.80 | 838.03 | 4,799.29 | 21,927.54 |
| 24 | 27,510.00 | 0.00 | 9,353.40 | 18,156.60 | 24 | 25,888.80 | 815.82 | 4,358.15 | 22,346.47 |
| 25 | 27,510.00 | 0.00 | 9,353.40 | 18,156.60 | 25 | 25,888.80 | 771.63 | 3,868.40 | 22,792.03 |
|    | 687,750.00 | 0.00 | 233,835.00 | 453,915.00 |   | 647,220.00 | 25,801.69 | 173,993.25 | 499,028.44 |
| 26 | 27,510.00 | 0.00 | 9,353.40 | 18,156.60 | 26 | 25,888.80 | 701.82 | 3,324.68 | 23,265.94 |
| 27 | 27,510.00 | 0.00 | 9,353.40 | 18,156.60 | 27 | 25,888.80 | 602.70 | 2,721.04 | 23,770.46 |
| 28 | 27,510.00 | 0.00 | 9,353.40 | 18,156.60 | 28 | 25,888.80 | 466.48 | 2,050.87 | 24,304.41 |
| 29 | 27,510.00 | 0.00 | 9,353.40 | 18,156.60 | 29 | 25,888.80 | 282.43 | 1,306.85 | 24,864.38 |
| 30 | 27,510.00 | 0.00 | 9,353.40 | 18,156.60 | 30 | 25,888.80 | 33.33 | 480.84 | 25,441.30 |
|    | 825,300.00 | 0.00 | 280,602.00 | 544,598.00 |   | 776,664.00 | 27,888.45 | 183,877.53 | 620,674.93 |

```
   The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 30F

```
THE RYAN MORTGAGE ILLUSTRATION SYSTEM

COMBINED ILLUSTRATION FOR THE PRODUCTS OF :
           HOMEOWNER'S BANK
                  AND
        METRO LIFE INSURANCE CORPORATION
```

```
ESTIMATED REMAINING MORTGAGE OBLIGATION
ASSUMING MORTGAGE IS PAID OFF WITH INSURANCE POLICY CASH SURRENDER VALUE
```

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid.

The Ryan Mortgage:

| Year | Annuity plus Life Insurance Cash Value** | Tax Owed On Surrender** | Net Policy Proceeds** | End of Year Mortgage Principal | End of Year Net Mortgage Obligation * |
|---|---|---|---|---|---|
| 1 | 25,642.68 | 1,045.56 | 24,597.12 | 262,000.00 | 237,402.88 |
| 2 | 27,872.19 | 792.26 | 27,079.92 | 262,000.00 | 234,920.08 |
| 3 | 30,318.89 | 869.87 | 29,449.02 | 262,000.00 | 232,550.98 |
| 4 | 33,004.05 | 1,190.74 | 31,813.31 | 262,000.00 | 230,186.69 |
| 5 | 35,856.75 | 2,160.66 | 33,696.09 | 262,000.00 | 228,303.91 |
| 6 | 38,969.18 | 3,218.89 | 35,750.30 | 262,000.00 | 226,249.70 |
| 7 | 42,364.35 | 4,373.24 | 37,991.11 | 262,000.00 | 224,008.89 |
| 8 | 46,065.38 | 5,631.59 | 40,433.79 | 262,000.00 | 221,566.21 |
| 9 | 50,097.92 | 7,002.66 | 43,095.26 | 262,000.00 | 218,904.74 |
| 10 | 54,490.43 | 8,496.11 | 45,994.32 | 262,000.00 | 216,005.68 |
| 11 | 59,272.41 | 10,121.98 | 49,150.43 | 262,000.00 | 212,849.57 |
| 12 | 64,478.90 | 11,892.19 | 52,586.71 | 262,000.00 | 209,413.29 |
| 13 | 70,144.83 | 13,818.61 | 56,326.23 | 262,000.00 | 205,673.77 |
| 14 | 76,311.49 | 15,915.27 | 60,396.22 | 262,000.00 | 201,603.78 |
| 15 | 83,023.21 | 18,197.26 | 64,825.95 | 262,000.00 | 197,174.05 |
| 16 | 90,331.81 | 20,682.18 | 69,649.63 | 262,000.00 | 192,350.37 |
| 17 | 98,295.45 | 23,389.82 | 74,905.63 | 262,000.00 | 187,094.37 |
| 18 | 106,981.11 | 26,342.94 | 80,638.17 | 262,000.00 | 181,361.83 |
| 19 | 116,462.16 | 29,566.50 | 86,895.66 | 262,000.00 | 175,104.34 |
| 20 | 126,824.08 | 33,089.55 | 93,734.53 | 262,000.00 | 168,265.47 |
| 21 | 138,159.54 | 36,943.61 | 101,215.93 | 262,000.00 | 160,784.07 |
| 22 | 150,576.61 | 41,165.41 | 109,411.20 | 262,000.00 | 152,588.80 |
| 23 | 164,193.49 | 45,795.15 | 118,398.34 | 262,000.00 | 143,601.66 |
| 24 | 179,138.13 | 50,876.33 | 128,261.80 | 262,000.00 | 133,738.20 |
| 25 | 195,493.92 | 56,437.30 | 139,056.62 | 262,000.00 | 122,943.38 |
| 26 | 213,358.90 | 62,511.39 | 150,847.51 | 262,000.00 | 111,152.49 |
| 27 | 232,877.60 | 69,147.75 | 163,729.85 | 262,000.00 | 98,270.15 |
| 28 | 254,209.35 | 76,400.54 | 177,808.81 | 262,000.00 | 84,191.19 |
| 29 | 277,529.17 | 84,329.28 | 193,199.89 | 262,000.00 | 68,800.11 |
| 30 | 302,973.30 | 92,980.29 | 209,993.01 | 262,000.00 | 52,006.99 |

Conventional Mortgage:

| Year | Life Insurance Cash Value | Net Policy Proceeds | End of Year Mortgage Principal |
|---|---|---|---|
| 1 | 0.00 | 0.00 | 234,668.57 |
| 2 | 0.00 | 0.00 | 233,358.05 |
| 3 | 0.00 | 0.00 | 231,903.10 |
| 4 | 0.00 | 0.00 | 230,287.82 |
| 5 | 0.00 | 0.00 | 228,494.52 |
| 6 | 0.00 | 0.00 | 226,503.60 |
| 7 | 0.00 | 0.00 | 224,293.27 |
| 8 | 0.00 | 0.00 | 221,839.36 |
| 9 | 0.00 | 0.00 | 219,115.01 |
| 10 | 0.00 | 0.00 | 216,090.44 |
| 11 | 0.00 | 0.00 | 212,732.54 |
| 12 | 0.00 | 0.00 | 209,004.60 |
| 13 | 0.00 | 0.00 | 204,865.82 |
| 14 | 0.00 | 0.00 | 200,270.93 |
| 15 | 0.00 | 0.00 | 195,169.67 |
| 16 | 0.00 | 0.00 | 189,506.24 |
| 17 | 0.00 | 0.00 | 183,218.67 |
| 18 | 0.00 | 0.00 | 176,238.20 |
| 19 | 0.00 | 0.00 | 168,488.45 |
| 20 | 0.00 | 0.00 | 159,884.65 |
| 21 | 0.00 | 0.00 | 150,332.68 |
| 22 | 0.00 | 0.00 | 139,728.06 |
| 23 | 0.00 | 0.00 | 127,954.77 |
| 24 | 0.00 | 0.00 | 114,884.02 |
| 25 | 0.00 | 0.00 | 100,372.82 |
| 26 | 0.00 | 0.00 | 84,262.45 |
| 27 | 0.00 | 0.00 | 66,376.65 |
| 28 | 0.00 | 0.00 | 46,519.78 |
| 29 | 0.00 | 0.00 | 24,474.62 |
| 30 | 0.00 | 0.00 | (0.00) |

\* A negative obligation indicates death benefits in excess of the mortgage obligation, payable to policyholder's estate.

\*\* The value included for the annuity is the present value of future payments, discounted at the annuity interest credited rate.

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 30G

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

**ESTIMATED REMAINING MORTGAGE OBLIGATION
ASSUMING MORTGAGE IS PAID OFF WITH DEATH PROCEEDS**

Life Insurance has certain tax advantages. Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid The Ryan Mortgage:                                         Conventional Mortgage:

| Year | Life Insurance Death Benefit * | End of Year Mortgage Principal | Net Death Proceeds | Year | Life Insurance Death Benefit | End of Year Mortgage Principal | Net Death Proceeds |
|---|---|---|---|---|---|---|---|
| 1  | 262,000.00 | 262,000.00 | 0.00 | 1  | 234,668.57 | 234,668.57 | 0.00 |
| 2  | 262,000.00 | 262,000.00 | 0.00 | 2  | 233,358.05 | 233,358.05 | 0.00 |
| 3  | 262,000.00 | 262,000.00 | 0.00 | 3  | 231,903.10 | 231,903.10 | 0.00 |
| 4  | 262,000.00 | 262,000.00 | 0.00 | 4  | 230,287.82 | 230,287.82 | 0.00 |
| 5  | 262,000.00 | 262,000.00 | 0.00 | 5  | 228,494.52 | 228,494.52 | 0.00 |
| 6  | 262,000.00 | 262,000.00 | 0.00 | 6  | 226,503.60 | 226,503.60 | 0.00 |
| 7  | 262,000.00 | 262,000.00 | 0.00 | 7  | 224,293.27 | 224,293.27 | 0.00 |
| 8  | 262,000.00 | 262,000.00 | 0.00 | 8  | 221,839.36 | 221,839.36 | 0.00 |
| 9  | 262,000.00 | 262,000.00 | 0.00 | 9  | 219,115.01 | 219,115.01 | 0.00 |
| 10 | 262,000.00 | 262,000.00 | 0.00 | 10 | 216,090.44 | 216,090.44 | 0.00 |
| 11 | 262,000.00 | 262,000.00 | 0.00 | 11 | 212,732.54 | 212,732.54 | 0.00 |
| 12 | 262,000.00 | 262,000.00 | 0.00 | 12 | 209,004.60 | 209,004.60 | 0.00 |
| 13 | 262,000.00 | 262,000.00 | 0.00 | 13 | 204,865.82 | 204,865.82 | 0.00 |
| 14 | 262,000.00 | 262,000.00 | 0.00 | 14 | 200,270.93 | 200,270.93 | 0.00 |
| 15 | 262,000.00 | 262,000.00 | 0.00 | 15 | 195,169.67 | 195,169.67 | 0.00 |
| 16 | 262,000.00 | 262,000.00 | 0.00 | 16 | 189,506.24 | 189,506.24 | 0.00 |
| 17 | 262,000.00 | 262,000.00 | 0.00 | 17 | 183,218.67 | 183,218.67 | 0.00 |
| 18 | 262,000.00 | 262,000.00 | 0.00 | 18 | 176,238.20 | 176,238.20 | 0.00 |
| 19 | 262,000.00 | 262,000.00 | 0.00 | 19 | 168,488.45 | 168,488.45 | 0.00 |
| 20 | 262,000.00 | 262,000.00 | 0.00 | 20 | 159,884.65 | 159,884.65 | 0.00 |
| 21 | 262,000.00 | 262,000.00 | 0.00 | 21 | 150,332.68 | 150,332.68 | 0.00 |
| 22 | 262,000.00 | 262,000.00 | 0.00 | 22 | 139,728.06 | 139,728.06 | 0.00 |
| 23 | 262,000.00 | 262,000.00 | 0.00 | 23 | 127,954.77 | 127,954.77 | 0.00 |
| 24 | 268,707.19 | 262,000.00 | 6,707.19 | 24 | 114,884.02 | 114,884.02 | 0.00 |
| 25 | 285,421.13 | 262,000.00 | 23,421.13 | 25 | 100,372.82 | 100,372.82 | 0.00 |
| 26 | 302,969.64 | 262,000.00 | 40,969.64 | 26 | 84,262.45 | 84,262.45 | 0.00 |
| 27 | 321,371.09 | 262,000.00 | 59,371.09 | 27 | 66,376.65 | 66,376.65 | 0.00 |
| 28 | 340,640.53 | 262,000.00 | 78,640.53 | 28 | 46,519.78 | 46,519.78 | 0.00 |
| 29 | 360,787.92 | 262,000.00 | 98,787.92 | 29 | 24,474.62 | 24,474.62 | 0.00 |
| 30 | 387,805.83 | 262,000.00 | 125,805.83 | 30 | (0.00) | (0.00) | 0.00 |

* This does NOT include annuity value.

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30H

---
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

EFFECTS OF CHANGES IN INTEREST RATES ON MONTHLY RYAN PAYMENTS

---

As noted on page 2 of this illustration, in the event interest rates go down, variable mortgage payments will go down; life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30

| | |
|---|---|
| Original Ryan Mortgage (Interest) Payment | 2,292.50 |
| Original Ryan After-Tax Mortgage Payment | 1,513.05 |

| Interest Crediting Rate (beginning in year 2): | 4.00 % | Interest Crediting Rate (beginning in year 2): | 13.50 % |
|---|---|---|---|
| Mortgage Interest Rate (beginning in year 2): | 5.00 % | Mortgage Interest Rate (beginning in year 2): | 14.50 % |

| Year | Incremental LI Premium | Adjusted Mortgage Payment | After-Tax Combined Cost | End of Year Insurance Cash Value | Year | Incremental LI Premium | Adjusted Mortgage Payment | After-Tax Combined Cost | End of Year Insurance Cash Value |
|---|---|---|---|---|---|---|---|---|---|
| 1 | 0.00 | 2,292.50 | 1,513.05 | 7,056.07 | 1 | 0.00 | 2,292.50 | 1,513.05 | 7,056.07 |
| 2 | 68.02 | 1,091.67 | 788.52 | 14,941.78 | 2 | 0.00 | 3,165.83 | 2,089.45 | 15,490.92 |
| 3 | 107.08 | 1,091.67 | 827.58 | 23,567.89 | 3 | 0.00 | 3,165.83 | 2,089.45 | 25,056.18 |
| 4 | 149.82 | 1,091.67 | 870.32 | 33,004.05 | 4 | 0.00 | 3,165.83 | 2,089.45 | 35,904.25 |
| 5 | 162.76 | 1,091.67 | 883.26 | 35,856.75 | 5 | 0.00 | 3,165.83 | 2,089.45 | 40,465.46 |
| 6 | 176.88 | 1,091.67 | 897.38 | 38,969.18 | 6 | 0.00 | 3,165.83 | 2,089.45 | 45,633.08 |
| 7 | 192.28 | 1,091.67 | 912.78 | 42,364.35 | 7 | 0.00 | 3,165.83 | 2,089.45 | 51,488.04 |
| 8 | 209.08 | 1,091.67 | 929.58 | 46,065.38 | 8 | 0.00 | 3,165.83 | 2,089.45 | 58,120.37 |
| 9 | 227.38 | 1,091.67 | 947.88 | 50,097.92 | 9 | 0.00 | 3,165.83 | 2,089.45 | 65,633.01 |
| 10 | 247.33 | 1,091.67 | 967.83 | 54,490.43 | 10 | 0.00 | 3,165.83 | 2,089.45 | 74,143.69 |
| 11 | 269.06 | 1,091.67 | 989.56 | 59,272.41 | 11 | 0.00 | 3,165.83 | 2,089.45 | 83,765.18 |
| 12 | 292.72 | 1,091.67 | 1,013.22 | 64,478.90 | 12 | 0.00 | 3,165.83 | 2,089.45 | 94,711.69 |
| 13 | 318.48 | 1,091.67 | 1,038.98 | 70,144.83 | 13 | 0.00 | 3,165.83 | 2,089.45 | 107,096.49 |
| 14 | 346.52 | 1,091.67 | 1,067.02 | 76,311.49 | 14 | 0.00 | 3,165.83 | 2,089.45 | 121,140.72 |
| 15 | 377.06 | 1,091.67 | 1,097.56 | 83,023.21 | 15 | 0.00 | 3,165.83 | 2,089.45 | 137,053.19 |
| 16 | 410.31 | 1,091.67 | 1,130.81 | 90,331.81 | 16 | 0.00 | 3,165.83 | 2,089.45 | 155,040.93 |
| 17 | 446.54 | 1,091.67 | 1,167.04 | 98,295.45 | 17 | 0.00 | 3,165.83 | 2,089.45 | 175,368.19 |
| 18 | 486.05 | 1,091.67 | 1,206.55 | 106,981.11 | 18 | 0.00 | 3,165.83 | 2,089.45 | 198,340.00 |
| 19 | 529.17 | 1,091.67 | 1,249.67 | 116,462.16 | 19 | 0.00 | 3,165.83 | 2,089.45 | 224,300.75 |
| 20 | 576.29 | 1,091.67 | 1,296.79 | 126,824.08 | 20 | 0.00 | 3,165.83 | 2,089.45 | 253,656.65 |
| 21 | 627.83 | 1,091.67 | 1,348.33 | 138,159.54 | 21 | 0.00 | 3,165.83 | 2,089.45 | 286,860.57 |
| 22 | 684.26 | 1,091.67 | 1,404.76 | 150,576.61 | 22 | 0.00 | 3,165.83 | 2,089.45 | 324,436.50 |
| 23 | 746.13 | 1,091.67 | 1,466.63 | 164,193.49 | 23 | 0.00 | 3,165.83 | 2,089.45 | 366,980.74 |
| 24 | 813.53 | 1,091.67 | 1,534.03 | 179,138.13 | 24 | 0.00 | 3,165.83 | 2,089.45 | 415,179.75 * |
| 25 | 884.62 | 1,091.67 | 1,605.12 | 195,493.92 | 25 | 0.00 | 3,165.83 | 2,089.45 | 469,727.35 * |
| 26 | 965.46 | 1,091.67 | 1,685.96 | 213,358.90 | 26 | 0.00 | 3,165.83 | 2,089.45 | 531,475.11 * |
| 27 | 1,053.79 | 1,091.67 | 1,774.29 | 232,877.60 | 27 | 0.00 | 3,165.83 | 2,089.45 | 601,387.97 * |
| 28 | 1,150.32 | 1,091.67 | 1,870.82 | 254,209.35 | 28 | 0.00 | 3,165.83 | 2,089.45 | 680,563.83 * |
| 29 | 1,255.84 | 1,091.67 | 1,976.34 | 277,529.17 | 29 | 0.00 | 3,165.83 | 2,089.45 | 770,250.42 * |
| 30 | 1,370.98 | 1,091.67 | 2,091.48 | 302,973.30 * | 30 | 0.00 | 3,165.83 | 2,089.45 | 871,704.69 * |

\* If the insurance policy is surrendered, the after-tax proceeds will pay off the mortgage principal \* If the insurance policy is surrendered, the after-tax proceeds will pay off the mortgage principal ---
The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30I

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED POLICY VALUES FOR POLICY YEAR 31 THROUGH AGE 99
ASSUMING INSURANCE POLICY IS KEPT AFTER YEAR 30
```

The Ryan Mortgage Illustration shows an option whereby the mortgage is extended and annual policy loans are taken to pay the annual after-tax mortgage cost. One benefit of this option is that the life insurance coverage continues. The annual loan is increased by the amount needed to pay the annual policy loan interest due.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 31 | 330,730.60 | 18,156.60 | 18,156.60 | 1,724.88 | 310,849.13 | 416,720.56 | 396,839.08 |
| 32 | 361,007.97 | 19,881.48 | 38,038.08 | 3,613.62 | 319,356.28 | 447,649.89 | 405,998.19 |
| 33 | 394,032.30 | 21,770.22 | 59,808.29 | 5,681.79 | 328,542.21 | 480,719.40 | 415,229.32 |
| 34 | 430,054.73 | 23,838.39 | 83,646.68 | 7,946.43 | 338,461.62 | 516,065.68 | 424,472.56 |
| 35 | 469,271.63 | 26,103.03 | 109,749.72 | 10,426.22 | 349,095.69 | 558,433.23 | 438,257.29 |
| 36 | 511,955.57 | 28,582.82 | 138,332.54 | 13,141.59 | 360,481.43 | 604,107.57 | 452,633.44 |
| 37 | 558,407.11 | 31,298.19 | 169,630.73 | 16,114.92 | 372,661.46 | 653,336.32 | 467,590.67 |
| 38 | 608,961.53 | 34,271.52 | 203,902.25 | 19,370.71 | 385,688.57 | 706,395.38 | 483,122.41 |
| 39 | 663,992.74 | 37,527.31 | 241,429.56 | 22,935.81 | 399,627.37 | 763,591.66 | 499,226.28 |
| 40 | 724,135.89 | 41,092.41 | 282,521.97 | 26,839.59 | 414,774.33 | 818,273.55 | 508,911.99 |
| 41 | 789,949.54 | 44,996.19 | 327,518.16 | 31,114.23 | 431,317.15 | 876,843.99 | 518,211.60 |
| 42 | 862,069.33 | 49,270.83 | 376,788.99 | 35,794.95 | 449,485.39 | 939,655.57 | 527,071.63 |
| 43 | 941,225.99 | 53,951.55 | 430,740.54 | 40,920.35 | 469,565.10 | 1,007,111.81 | 535,450.92 |
| 44 | 1,028,272.36 | 59,076.95 | 489,817.49 | 46,532.66 | 491,922.21 | 1,079,685.98 | 543,335.83 |
| 45 | 1,123,103.83 | 64,689.26 | 554,506.75 | 52,678.14 | 515,918.93 | 1,179,259.02 | 572,074.12 |
| 46 | 1,226,354.81 | 70,834.74 | 625,341.49 | 59,407.44 | 541,605.87 | 1,287,672.55 | 602,923.61 |
| 47 | 1,338,703.79 | 77,564.04 | 702,905.54 | 66,776.03 | 569,022.23 | 1,405,638.98 | 635,957.42 |
| 48 | 1,460,874.91 | 84,932.63 | 787,838.16 | 74,844.63 | 598,192.13 | 1,533,918.66 | 671,235.87 |
| 49 | 1,593,641.62 | 93,001.23 | 880,839.39 | 83,679.74 | 629,122.49 | 1,673,323.70 | 708,804.57 |
| 50 | 1,737,827.70 | 101,836.34 | 982,675.73 | 93,354.19 | 661,797.77 | 1,824,719.08 | 748,689.16 |
| 51 | 1,894,311.38 | 111,510.79 | 1,094,186.52 | 103,947.72 | 696,177.14 | 1,989,026.95 | 790,892.71 |
| 52 | 2,064,030.47 | 122,104.32 | 1,216,290.84 | 115,547.63 | 732,191.99 | 2,167,231.99 | 835,393.52 |
| 53 | 2,247,986.51 | 133,704.23 | 1,349,995.07 | 128,249.53 | 769,741.90 | 2,360,385.83 | 882,141.23 |
| 54 | 2,447,247.00 | 146,406.13 | 1,496,401.21 | 142,158.11 | 808,687.68 | 2,569,609.35 | 931,050.03 |
| 55 | 2,662,907.34 | 160,314.71 | 1,656,715.92 | 157,388.01 | 848,803.41 | 2,796,052.71 | 981,948.77 |
| 56 | 2,896,141.74 | 175,544.61 | 1,832,260.53 | 174,064.75 | 889,816.46 | 3,040,948.83 | 1,034,623.55 |
| 57 | 3,148,165.22 | 192,221.35 | 2,024,481.88 | 192,325.78 | 931,357.56 | 3,305,573.48 | 1,088,765.82 |
| 58 | 3,420,231.79 | 210,482.38 | 2,234,964.26 | 212,321.60 | 972,945.92 | 3,591,243.38 | 1,143,957.51 |
| 59 | 3,713,629.92 | 230,478.20 | 2,465,442.47 | 234,217.03 | 1,013,970.42 | 3,899,311.42 | 1,199,651.92 |
| 60 | 4,037,032.85 | 252,373.63 | 2,717,816.10 | 258,192.53 | 1,061,024.22 | 4,198,514.16 | 1,222,505.53 |
| 61 | 4,394,888.34 | 276,349.13 | 2,994,165.23 | 284,445.70 | 1,116,277.41 | 4,526,734.99 | 1,248,124.06 |
| 62 | 4,792,499.32 | 302,602.30 | 3,296,767.53 | 313,192.92 | 1,182,538.88 | 4,888,349.31 | 1,278,388.86 |
| 63 | 5,236,086.64 | 331,349.52 | 3,628,117.04 | 344,671.12 | 1,263,298.47 | 5,288,447.50 | 1,315,659.34 |
| 64 | 5,733,449.17 | 362,827.72 | 3,990,944.76 | 379,139.75 | 1,363,364.65 | 5,733,449.17 | 1,363,364.65 |
| 65 | 6,278,061.14 | 397,296.35 | 4,388,241.12 | 416,882.91 | 1,472,937.11 | 6,278,061.14 | 1,472,937.11 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED POLICY VALUES FOR POLICY YEAR 31 THROUGH AGE 99
ASSUMING INSURANCE POLICY IS KEPT AFTER YEAR 30

---

The Ryan Mortgage Illustration shows an option whereby the mortgage is extended and annual policy loans are taken to pay the annual after-tax mortgage cost. One benefit of this option is that the life insurance coverage continues. The annual loan is increased by the amount needed to pay the annual policy loan interest due.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 66 | 6,874,411.24 | 435,039.51 | 4,823,280.62 | 458,211.66 | 1,592,918.96 | 6,874,411.24 | 1,592,918.96 |
| 67 | 7,527,414.61 | 476,368.26 | 5,299,648.88 | 503,466.64 | 1,724,299.09 | 7,527,414.61 | 1,724,299.09 |
| 68 | 8,242,453.30 | 521,623.24 | 5,821,272.12 | 553,020.85 | 1,868,160.32 | 8,242,453.30 | 1,868,160.32 |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30K

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
GUARANTEED LIFE INSURANCE VALUES
```

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|---|---|---|
| 1 | 6,400.72 | 262,000.00 |
| 2 | 13,205.66 | 262,000.00 |
| 3 | 20,274.15 | 262,000.00 |
| 4 | 27,613.78 | 262,000.00 |
| 5 | 28,121.90 | 262,000.00 |
| 6 | 28,613.43 | 262,000.00 |
| 7 | 29,083.06 | 262,000.00 |
| 8 | 29,522.90 | 262,000.00 |
| 9 | 29,927.13 | 262,000.00 |
| 10 | 30,284.95 | 262,000.00 |
| 11 | 30,594.52 | 262,000.00 |
| 12 | 30,844.48 | 262,000.00 |
| 13 | 31,029.99 | 262,000.00 |
| 14 | 31,138.89 | 262,000.00 |
| 15 | 31,165.46 | 262,000.00 |
| 16 | 31,098.94 | 262,000.00 |
| 17 | 30,930.31 | 262,000.00 |
| 18 | 30,642.91 | 262,000.00 |
| 19 | 30,223.84 | 262,000.00 |
| 20 | 29,645.12 | 262,000.00 |
| 21 | 28,881.78 | 262,000.00 |
| 22 | 27,902.34 | 262,000.00 |
| 23 | 26,670.64 | 262,000.00 |
| 24 | 25,157.40 | 262,000.00 |
| 25 | 23,325.93 | 262,000.00 |
| 26 | 21,146.10 | 262,000.00 |
| 27 | 18,577.39 | 262,000.00 |
| 28 | 15,572.73 | 262,000.00 |
| 29 | 12,067.46 | 262,000.00 |
| 30 | 7,984.73 | 262,000.00 |
| 31 | 3,228.30 | 262,000.00 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 30L

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

LIFE INSURANCE COST INDICES

An explanation of the intended use of these indices is provided in The Life Insurance Buyer's Guide. These indices are useful only for the comparison of relative costs of two or more similar policies The cost indices do not reflect any optional benefits

|  | BASED ON GUARANTEED FACTORS | |
|---|---|---|
|  | 10 Year | 20 Year |
| SURRENDER COST INDEX @ 5% | 4.17 | 4.75 |
| NET PAYMENT COST INDEX @ 5% | 12.93 | 8.01 |

|  | BASED ON CURRENT FACTORS | |
|---|---|---|
|  | 10 Year | 20 Year |
| SURRENDER COST INDEX @ 5% | -2.82 | -5.93 |
| NET PAYMENT COST INDEX @ 5% | 12.93 | 8.01 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 31A

```
                    THE RYAN MORTGAGE ILLUSTRATION SYSTEM

COMBINED ILLUSTRATION FOR THE PRODUCTS OF :
                              HOMEOWNER'S BANK
                                     AND
                        METRO LIFE INSURANCE CORPORATION
```

Illustration Developed For                          By

Bozeman Amorey Stella                         Bill Simpson
   666 Greenwich Street                           Mortgage ProBrokers
   Apt 933                                        555 Wilton Way
   New York, NY 10014                             Wilton, CT 06894

With regards to property located at:                The real estate agent representing you in the purchase:

Milly Jenner
                                                  Chekov & Karney
   62 Hillock Road                                310 Wilton Way
   Cannondale, CT 05555                           Wilton, CT 06894

```
                    INDIVIDUAL DATA FOR:  Bozeman Amorey Stella
```

Age:                            32
Sex                             Male
Individual Tax Rate:            34.00 %

```
                    MORTGAGE ASSUMPTIONS FOR:  HOMEOWNER'S BANK
```

The Ryan Mortgage:                              Conventional Mortgage:

Principal Amount:           262,000.00              Principal Amount:           262,000.00
Down Payment                  4,700.70              Down Payment:                13,100.00
Initial Loan Balance:       262,000.00              Initial Loan Balance:       248,900.00

Down Payment as % of Principal:    1.79 %           Down Payment as % of Principal:    5.00 %

Mortgage Interest Rate:         10.50 %   Cap. 14.50 %   Mortgage Interest Rate:         10.50 %
Mortgage Points (%):             1.00 %                  Mortgage Points (%):             1.00 %
Term of Mortgage (Years):           30                   Term of Mortgage (Years):           30
PMI Cost (%):                    0.00 %                  PMI Cost (%):                    0.50 %

Settlement Costs             4,000.00               Settlement Costs:            4,000.00

Closing Date                01-Mar-92               Closing Date:               01-Mar-92

```
          INSURANCE ASSUMPTIONS FOR:  METRO LIFE INSURANCE CORPORATION
```

Current Rates:                                  Guarantees:

Mortality                    1983 GAM               Mortality:                   1980 CSO
  Percent                   100.00 %                 Percent:                  100.00 %
Unloaned Credited Rate         9.50 %               Unloaned Credited Rate:        4.00 %
Loan Charged Rate              9.50 %
Loan Credited Rate             9.50 %

This illustration assumes life insurance premium payments will be guaranteed by:
Homeowner's Endorsement Plan Incorporated
3000 Ocean Street
Millvale, CT 01234
                      Contact: Pran Annana
Sponsor Number        0001

Fig. 31B

| THE RYAN MORTGAGE ILLUSTRATION SYSTEM |
|---|
| COMBINED ILLUSTRATION FOR THE PRODUCTS OF :<br>HOMEOWNER'S BANK<br>AND<br>METRO LIFE INSURANCE CORPORATION |

| IMPORTANT COMMENTS CONCERNING THE ATTACHED ILLUSTRATION |
|---|

The information contained in the attached illustration is based on both assumptions furnished by the client for whom it is developed and the current assumptions of the mortgage and insurance plans chosen. Unless otherwise indicated, those rates assumed initially continue throughout the life of the illustration.

Conventional Mortgage assumptions for principal, mortgage interest rate, mortgage points (%) and settlement costs are the same as those assumed for The Ryan Mortgage. The down payment and initial loan balance are as stated on page 1 of this illustration.

Premium costs may change if the closing date differs from the one given. They may also change if any of the other assumptions used vary.

The mortgage illustrated is a variable rate mortgage. Mortgage and premium payments are subject to change with variations in interest rates.

Interest rates credited on unloaned policy values and the cost of insurance charges may vary after the first year. Interest rates charged on policy loans and credited on loaned policy values also may vary after the first year.

In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate.

The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice. Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 31C

| THE RYAN MORTGAGE ILLUSTRATION SYSTEM |
|---|
| COMBINED ILLUSTRATION FOR THE PRODUCTS OF : <br> HOMEOWNER'S BANK <br> AND <br> METRO LIFE INSURANCE CORPORATION |

| ESTIMATED UPFRONT MORTGAGE AND OTHER ESCROW PAYMENT |
|---|

The Ryan Mortgage:

| | |
|---|---|
| Settlement Costs | 4,000.00 |
| Mortgage Points | 2,620.00 |
| PMI Escrow | 0.00 |
| Down Payment | 4,700.70 * |
| *Total Closing Costs* | 11,320.70 |

Conventional Mortgage:

| | |
|---|---|
| Settlement Costs | 4,000.00 |
| Mortgage Points | 2,489.00 |
| PMI Escrow | 1,244.50 |
| Down Payment | 13,100.00 |
| *Total Closing Costs* | 20,833.50 |

\* The down payment is used for paying an insurance premium

| ESTIMATED AVERAGE FIRST YEAR MONTHLY PAYMENT |
|---|

The Ryan Mortgage:

| | |
|---|---|
| Mortgage | 2,292.50 |
| Tax Escrow | 235.00 |
| PMI Escrow | 0.00 |
| Life Insurance | 391.73 |
| | 2,919.23 |
| LESS: | |
| Tax Deduction | 779.45 |
| *Net After-Tax Cost* | 2,139.78 |

Conventional Mortgage:

| | |
|---|---|
| Mortgage | 2,276.79 |
| Tax Escrow | 235.00 |
| PMI Escrow | 103.71 |
| Life Insurance | 18.60 |
| | 2,634.10 |
| LESS: | |
| Tax Deduction | 738.81 |
| *Net After-Tax Cost* | 1,895.29 |

| ESTIMATED AVERAGE YEAR 10 MONTHLY PAYMENT |
|---|

The Ryan Mortgage:

| | |
|---|---|
| Mortgage | 2,292.50 |
| Tax Escrow | 235.00 |
| PMI Escrow | 0.00 |
| Life Insurance | 0.00 |
| | 2,527.50 |
| LESS: | |
| Tax Deduction | 779.45 |
| *Net After-Tax Cost* | 1,748.05 |

Conventional Mortgage:

| | |
|---|---|
| Mortgage | 2,276.79 |
| Tax Escrow | 235.00 |
| PMI Escrow | 103.71 |
| Life Insurance | 31.71 |
| | 2,647.21 |
| LESS: | |
| Tax Deduction | 673.70 |
| *Net After-Tax Cost* | 1,973.51 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED EQUITY AND FINANCIAL ANALYSIS ASSUMING EARLY HOME SALE

---

In the following computations, the home is assumed to be sold at the original purchase price. If it is sold for a higher price, the total equity after the sale will increase.

Mortgage Costs:

|  | Ryan Mortgage | Conventional Mortgage | Financial Benefit From Ryan Mortgage | Cumulative Financial Benefit |
|---|---|---|---|---|
| Total Closing Costs * | 11,320.70 | 20,833.50 | 9,512.80 | 9,512.80 |
| Annual After-Tax Mortgage Cost ** |  |  |  |  |
| Year 1 | 22,857.30 | 19,923.45 | (2,933.85) | 6,578.95 |
| Year 2 | 22,857.30 | 19,980.01 | (2,877.29) | 3,701.66 |
| Year 3 | 22,857.30 | 20,046.90 | (2,810.40) | 891.26 |
| Year 4 | 22,857.30 | 20,121.84 | (2,735.46) | (1,844.20) |
| Year 5 | 22,857.30 | 20,197.30 | (2,660.00) | (4,504.20) |
| Year 6 | 22,857.30 | 20,282.03 | (2,575.27) | (7,079.47) |
| Year 7 | 22,857.30 | 20,376.65 | (2,480.65) | (9,560.12) |
| Year 8 | 22,857.30 | 20,484.47 | (2,372.83) | (11,932.95) |
| Year 9 | 22,857.30 | 20,606.16 | (2,251.14) | (14,184.09) |
| Year 10 | 18,156.60 | 20,742.43 | 2,585.83 | (11,598.26) |

|  | Ryan Mortgage | Conventional Mortgage | Financial Benefit From Ryan Mortgage |
|---|---|---|---|
| Home Sale At The End of Year 5: |  |  |  |
| End of Year Cash Value | 26,437.59 | 0.00 | 26,437.59 |
| Home Resale | 262,000.00 | 262,000.00 | 0.00 |
| Mortgage Balance | (262,000.00) | (241,138.55) | (20,861.45) |
| Total Equity After Sale | 26,437.59 | 20,861.45 | 5,576.14 |
| Total Closing Costs * | 11,320.70 | 20,833.50 | 9,512.80 |
| After-Tax Mortgage Cost ** | 114,286.50 | 100,269.51 | (14,017.00) |
| TOTAL 5 YEAR FINANCIAL BENEFIT: |  |  | 1,071.94 |
| Home Sale At The End of Year 10: |  |  |  |
| End of Year Cash Value | 67,779.76 | 0.00 | 67,779.76 |
| Home Resale | 262,000.00 | 262,000.00 | 0.00 |
| Mortgage Balance | (262,000.00) | (228,048.07) | (33,951.93) |
| Total Equity After Sale | 67,779.76 | 33,951.93 | 33,827.83 |
| Total Closing Costs * | 11,320.70 | 20,833.50 | 9,512.80 |
| After-Tax Mortgage Cost ** | 223,872.30 | 202,761.24 | (21,111.06) |
| TOTAL 10 YEAR FINANCIAL BENEFIT: |  |  | 22,229.57 |

\* See top of page 3 for detailed breakdown.
\*\* These values include insurance. (See page 5 for detailed breakdown.)

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 31E

THE RYAN MORTGAGE ILLUSTRATION SYSTEM

COMBINED ILLUSTRATION FOR THE PRODUCTS OF:
HOMEOWNER'S BANK
AND
METRO LIFE INSURANCE CORPORATION

ESTIMATED ANNUAL COST
(Does not include Property Taxes or Hazard Insurance)

The Ryan Mortgage:

| Year | Mortgage | Life Insurance | Interest Tax Deduction | Total After Taxes |
|---|---|---|---|---|
| 1 | 27,510.00 | 4,700.70 | 9,353.40 | 22,857.30 |
| 2 | 27,510.00 | 4,700.70 | 9,353.40 | 22,857.30 |
| 3 | 27,510.00 | 4,700.70 | 9,353.40 | 22,857.30 |
| 4 | 27,510.00 | 4,700.70 | 9,353.40 | 22,857.30 |
| 5 | 27,510.00 | 4,700.70 | 9,353.40 | 22,857.30 |
|   | 137,550.00 | 23,503.50 | 46,767.00 | 114,286.50 |
| 6 | 27,510.00 | 4,700.70 | 9,353.40 | 22,857.30 |
| 7 | 27,510.00 | 4,700.70 | 9,353.40 | 22,857.30 |
| 8 | 27,510.00 | 4,700.70 | 9,353.40 | 22,857.30 |
| 9 | 27,510.00 | 4,700.70 | 9,353.40 | 22,857.30 |
| 10 | 27,510.00 | 0.00 | 9,353.40 | 18,156.60 |
|    | 275,100.00 | 42,306.30 | 93,534.00 | 223,872.30 |
| 11 | 27,510.00 | 0.00 | 9,353.40 | 18,156.60 |
| 12 | 27,510.00 | 0.00 | 9,353.40 | 18,156.60 |
| 13 | 27,510.00 | 0.00 | 9,353.40 | 18,156.60 |
| 14 | 27,510.00 | 0.00 | 9,353.40 | 18,156.60 |
| 15 | 27,510.00 | 0.00 | 9,353.40 | 18,156.60 |
|    | 412,650.00 | 42,306.30 | 140,301.00 | 314,655.30 |
| 16 | 27,510.00 | 0.00 | 9,353.40 | 18,156.60 |
| 17 | 27,510.00 | 0.00 | 9,353.40 | 18,156.60 |
| 18 | 27,510.00 | 0.00 | 9,353.40 | 18,156.60 |
| 19 | 27,510.00 | 0.00 | 9,353.40 | 18,156.60 |
| 20 | 27,510.00 | 0.00 | 9,353.40 | 18,156.60 |
|    | 550,200.00 | 42,306.30 | 187,068.00 | 405,438.30 |
| 21 | 27,510.00 | 0.00 | 9,353.40 | 18,156.60 |
| 22 | 27,510.00 | 0.00 | 9,353.40 | 18,156.60 |
| 23 | 27,510.00 | 0.00 | 9,353.40 | 18,156.60 |
| 24 | 27,510.00 | 0.00 | 9,353.40 | 18,156.60 |
| 25 | 27,510.00 | 0.00 | 9,353.40 | 18,156.60 |
|    | 687,750.00 | 42,306.30 | 233,835.00 | 496,221.30 |
| 26 | 27,510.00 | 0.00 | 9,353.40 | 18,156.60 |
| 27 | 27,510.00 | 0.00 | 9,353.40 | 18,156.60 |
| 28 | 27,510.00 | 0.00 | 9,353.40 | 18,156.60 |
| 29 | 27,510.00 | 0.00 | 9,353.40 | 18,156.60 |
| 30 | 27,510.00 | 0.00 | 9,353.40 | 18,156.60 |
|    | 825,300.00 | 42,306.30 | 280,602.00 | 587,004.30 |

Conventional Mortgage:

| Year | Mortgage | PMI plus Life Insurance | Interest Tax Deduction | Total After Taxes |
|---|---|---|---|---|
| 1 | 27,321.48 | 1,467.70 | 8,865.73 | 19,923.45 |
| 2 | 27,321.48 | 1,477.59 | 8,819.05 | 19,980.01 |
| 3 | 27,321.48 | 1,492.66 | 8,767.23 | 20,046.90 |
| 4 | 27,321.48 | 1,510.06 | 8,709.70 | 20,121.84 |
| 5 | 27,321.48 | 1,521.65 | 8,645.83 | 20,197.30 |
|   | 136,607.40 | 7,469.66 | 43,807.54 | 100,269.51 |
| 6 | 27,321.48 | 1,535.46 | 8,574.92 | 20,282.03 |
| 7 | 27,321.48 | 1,551.36 | 8,496.19 | 20,376.65 |
| 8 | 27,321.48 | 1,571.78 | 8,408.79 | 20,484.47 |
| 9 | 27,321.48 | 1,596.43 | 8,311.75 | 20,606.16 |
| 10 | 27,321.48 | 1,624.97 | 8,204.03 | 20,742.43 |
|    | 273,214.80 | 15,349.66 | 85,803.22 | 202,761.24 |
| 11 | 27,321.48 | 1,659.49 | 8,084.43 | 20,896.54 |
| 12 | 27,321.48 | 1,696.92 | 7,951.65 | 21,066.75 |
| 13 | 27,321.48 | 1,741.47 | 7,804.23 | 21,258.71 |
| 14 | 27,321.48 | 1,789.78 | 7,640.58 | 21,470.68 |
| 15 | 27,321.48 | 598.61 | 7,458.88 | 20,461.20 |
|    | 409,822.20 | 22,835.92 | 124,742.98 | 307,915.14 |
| 16 | 27,321.48 | 653.31 | 7,257.17 | 20,717.63 |
| 17 | 27,321.48 | 707.94 | 7,033.22 | 20,996.20 |
| 18 | 27,321.48 | 758.70 | 6,784.59 | 21,295.58 |
| 19 | 27,321.48 | 805.83 | 6,508.57 | 21,618.74 |
| 20 | 27,321.48 | 843.25 | 6,202.12 | 21,962.61 |
|    | 546,429.60 | 26,604.94 | 158,528.65 | 414,505.89 |
| 21 | 27,321.48 | 872.42 | 5,861.90 | 22,332.00 |
| 22 | 27,321.48 | 885.32 | 5,484.20 | 22,722.61 |
| 23 | 27,321.48 | 882.56 | 5,064.86 | 23,139.17 |
| 24 | 27,321.48 | 859.12 | 4,599.31 | 23,581.29 |
| 25 | 27,321.48 | 812.49 | 4,082.46 | 24,051.50 |
|    | 683,037.00 | 30,916.85 | 183,621.39 | 530,332.46 |
| 26 | 27,321.48 | 738.81 | 3,508.65 | 24,551.63 |
| 27 | 27,321.48 | 634.20 | 2,871.61 | 25,084.08 |
| 28 | 27,321.48 | 490.45 | 2,164.36 | 25,647.58 |
| 29 | 27,321.48 | 296.21 | 1,379.17 | 26,238.53 |
| 30 | 27,321.48 | 33.33 | 507.44 | 26,847.37 |
|    | 819,644.40 | 33,109.86 | 194,052.62 | 658,701.64 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 31F

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED REMAINING MORTGAGE OBLIGATION
ASSUMING MORTGAGE IS PAID OFF WITH INSURANCE POLICY CASH SURRENDER VALUE
```

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid.

The Ryan Mortgage:

Conventional Mortgage:

| Year | Life Insurance Cash Value | Tax Owed On Surrender | Net Policy Proceeds | End of Year Mortgage Principal | End of Year Net Mortgage Obligation * | Year | Life Insurance Cash Value | Net Policy Proceeds | End of Year Mortgage Principal |
|---|---|---|---|---|---|---|---|---|---|
| 1 | 4,275.82 | 0.00 | 4,275.82 | 262,000.00 | 257,724.18 | 1 | 0.00 | 0.00 | 247,654.25 |
| 2 | 9,110.82 | 0.00 | 9,110.82 | 262,000.00 | 252,889.18 | 2 | 0.00 | 0.00 | 246,271.21 |
| 3 | 14,387.39 | 97.00 | 14,290.39 | 262,000.00 | 247,709.61 | 3 | 0.00 | 0.00 | 244,735.75 |
| 4 | 20,145.00 | 456.35 | 19,688.65 | 262,000.00 | 242,311.35 | 4 | 0.00 | 0.00 | 243,031.08 |
| 5 | 26,437.59 | 997.59 | 25,440.00 | 262,000.00 | 236,560.00 | 5 | 0.00 | 0.00 | 241,138.55 |
| 6 | 33,313.77 | 1,737.25 | 31,576.51 | 262,000.00 | 230,423.49 | 6 | 0.00 | 0.00 | 239,037.46 |
| 7 | 40,827.13 | 2,693.56 | 38,133.57 | 262,000.00 | 223,866.43 | 7 | 0.00 | 0.00 | 236,704.82 |
| 8 | 49,033.51 | 3,885.49 | 45,148.02 | 262,000.00 | 216,851.98 | 8 | 0.00 | 0.00 | 234,115.12 |
| 9 | 57,994.83 | 5,334.10 | 52,660.73 | 262,000.00 | 209,339.27 | 9 | 0.00 | 0.00 | 231,240.02 |
| 10 | 67,779.76 | 7,062.74 | 60,717.02 | 262,000.00 | 201,282.98 | 10 | 0.00 | 0.00 | 228,048.07 |
| 11 | 73,693.06 | 9,073.26 | 64,619.80 | 262,000.00 | 197,380.20 | 11 | 0.00 | 0.00 | 224,504.37 |
| 12 | 80,125.02 | 11,260.13 | 68,864.89 | 262,000.00 | 193,135.11 | 12 | 0.00 | 0.00 | 220,570.13 |
| 13 | 87,116.81 | 13,637.34 | 73,479.48 | 262,000.00 | 188,520.52 | 13 | 0.00 | 0.00 | 216,202.33 |
| 14 | 94,717.64 | 16,221.62 | 78,496.02 | 262,000.00 | 183,503.98 | 14 | 0.00 | 0.00 | 211,353.18 |
| 15 | 102,979.93 | 19,030.80 | 83,949.14 | 262,000.00 | 178,050.86 | 15 | 0.00 | 0.00 | 205,969.63 |
| 16 | 111,965.47 | 22,085.88 | 89,879.59 | 262,000.00 | 172,120.41 | 16 | 0.00 | 0.00 | 199,992.80 |
| 17 | 121,743.60 | 25,410.44 | 96,333.16 | 262,000.00 | 165,666.84 | 17 | 0.00 | 0.00 | 193,357.31 |
| 18 | 132,394.70 | 29,031.82 | 103,362.88 | 262,000.00 | 158,637.12 | 18 | 0.00 | 0.00 | 185,990.56 |
| 19 | 144,006.41 | 32,979.80 | 111,026.61 | 262,000.00 | 150,973.39 | 19 | 0.00 | 0.00 | 177,811.97 |
| 20 | 156,681.68 | 37,289.39 | 119,392.29 | 262,000.00 | 142,607.71 | 20 | 0.00 | 0.00 | 168,732.07 |
| 21 | 170,531.39 | 41,998.29 | 128,533.09 | 262,000.00 | 133,466.91 | 21 | 0.00 | 0.00 | 158,651.53 |
| 22 | 185,686.03 | 47,150.87 | 138,535.16 | 262,000.00 | 123,464.84 | 22 | 0.00 | 0.00 | 147,460.09 |
| 23 | 202,287.60 | 52,795.40 | 149,492.19 | 262,000.00 | 112,507.81 | 23 | 0.00 | 0.00 | 135,035.30 |
| 24 | 220,497.05 | 58,986.62 | 161,510.44 | 262,000.00 | 100,489.56 | 24 | 0.00 | 0.00 | 121,241.27 |
| 25 | 240,493.29 | 65,785.34 | 174,707.95 | 262,000.00 | 87,292.05 | 25 | 0.00 | 0.00 | 105,927.08 |
| 26 | 262,451.64 | 73,251.18 | 189,200.46 | 262,000.00 | 72,799.54 | 26 | 0.00 | 0.00 | 88,925.22 |
| 27 | 286,476.56 | 81,419.65 | 205,056.91 | 262,000.00 | 56,943.09 | 27 | 0.00 | 0.00 | 70,049.69 |
| 28 | 312,733.10 | 90,346.87 | 222,386.22 | 262,000.00 | 39,613.78 | 28 | 0.00 | 0.00 | 49,094.02 |
| 29 | 341,436.65 | 100,106.08 | 241,330.57 | 262,000.00 | 20,669.43 | 29 | 0.00 | 0.00 | 25,828.95 |
| 30 | 372,754.97 | 110,754.31 | 262,000.66 | 262,000.00 | (0.66) | 30 | 0.00 | 0.00 | (0.00) |

\* A negative obligation indicates death benefits in excess of the mortgage obligation, payable to policyholder's estate.

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 31G

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED REMAINING MORTGAGE OBLIGATION
ASSUMING MORTGAGE IS PAID OFF WITH DEATH PROCEEDS
```

Life Insurance has certain tax advantages. Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid The Ryan Mortgage:                                              Conventional Mortgage:

| Year | Life Insurance Death Benefit | End of Year Mortgage Principal | Net Death Proceeds | Year | Life Insurance Death Benefit | End of Year Mortgage Principal | Net Death Proceeds |
|------|------------------------------|-------------------------------|--------------------|------|------------------------------|-------------------------------|--------------------|
| 1 | 357,684.95 | 262,000.00 | 95,684.95 | 1 | 247,654.25 | 247,654.25 | 0.00 |
| 2 | 357,684.95 | 262,000.00 | 95,684.95 | 2 | 246,271.21 | 246,271.21 | 0.00 |
| 3 | 357,684.95 | 262,000.00 | 95,684.95 | 3 | 244,735.75 | 244,735.75 | 0.00 |
| 4 | 357,684.95 | 262,000.00 | 95,684.95 | 4 | 243,031.08 | 243,031.08 | 0.00 |
| 5 | 357,684.95 | 262,000.00 | 95,684.95 | 5 | 241,138.55 | 241,138.55 | 0.00 |
| 6 | 357,684.95 | 262,000.00 | 95,684.95 | 6 | 239,037.46 | 239,037.46 | 0.00 |
| 7 | 357,684.95 | 262,000.00 | 95,684.95 | 7 | 236,704.82 | 236,704.82 | 0.00 |
| 8 | 357,684.95 | 262,000.00 | 95,684.95 | 8 | 234,115.12 | 234,115.12 | 0.00 |
| 9 | 357,684.95 | 262,000.00 | 95,684.95 | 9 | 231,240.02 | 231,240.02 | 0.00 |
| 10 | 357,684.95 | 262,000.00 | 95,684.95 | 10 | 228,048.07 | 228,048.07 | 0.00 |
| 11 | 357,684.95 | 262,000.00 | 95,684.95 | 11 | 224,504.37 | 224,504.37 | 0.00 |
| 12 | 357,684.95 | 262,000.00 | 95,684.95 | 12 | 220,570.13 | 220,570.13 | 0.00 |
| 13 | 357,684.95 | 262,000.00 | 95,684.95 | 13 | 216,202.33 | 216,202.33 | 0.00 |
| 14 | 357,684.95 | 262,000.00 | 95,684.95 | 14 | 211,353.18 | 211,353.18 | 0.00 |
| 15 | 357,684.95 | 262,000.00 | 95,684.95 | 15 | 205,969.63 | 205,969.63 | 0.00 |
| 16 | 357,684.95 | 262,000.00 | 95,684.95 | 16 | 199,992.80 | 199,992.80 | 0.00 |
| 17 | 357,684.95 | 262,000.00 | 95,684.95 | 17 | 193,357.31 | 193,357.31 | 0.00 |
| 18 | 357,684.95 | 262,000.00 | 95,684.95 | 18 | 185,990.56 | 185,990.56 | 0.00 |
| 19 | 357,684.95 | 262,000.00 | 95,684.95 | 19 | 177,811.97 | 177,811.97 | 0.00 |
| 20 | 357,684.95 | 262,000.00 | 95,684.95 | 20 | 168,732.07 | 168,732.07 | 0.00 |
| 21 | 357,684.95 | 262,000.00 | 95,684.95 | 21 | 158,651.53 | 158,651.53 | 0.00 |
| 22 | 357,684.95 | 262,000.00 | 95,684.95 | 22 | 147,460.09 | 147,460.09 | 0.00 |
| 23 | 357,684.95 | 262,000.00 | 95,684.95 | 23 | 135,035.30 | 135,035.30 | 0.00 |
| 24 | 357,684.95 | 262,000.00 | 95,684.95 | 24 | 121,241.27 | 121,241.27 | 0.00 |
| 25 | 357,684.95 | 262,000.00 | 95,684.95 | 25 | 105,927.08 | 105,927.08 | 0.00 |
| 26 | 372,681.33 | 262,000.00 | 110,681.33 | 26 | 88,925.22 | 88,925.22 | 0.00 |
| 27 | 395,337.66 | 262,000.00 | 133,337.66 | 27 | 70,049.69 | 70,049.69 | 0.00 |
| 28 | 419,062.35 | 262,000.00 | 157,062.35 | 28 | 49,094.02 | 49,094.02 | 0.00 |
| 29 | 443,867.65 | 262,000.00 | 181,867.65 | 29 | 25,828.95 | 25,828.95 | 0.00 |
| 30 | 477,126.37 | 262,000.00 | 215,126.37 | 30 | (0.00) | (0.00) | 0.00 |

```
    The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 31H

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

EFFECTS OF CHANGES IN INTEREST RATES ON MONTHLY RYAN PAYMENTS

As noted on page 2 of this illustration, in the event interest rates go down, variable mortgage payments will go down, life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30. Scheduled life insurance premiums begin in year 1.

| | | | |
|---|---|---|---|
| Original Ryan Mortgage (Interest) Payment | 2,292.50 | Original Scheduled Life Insurance Premium: | 391.73 |
| Original Ryan After-Tax Mortgage Payment | 1,513.05 | Number of Years of Premium Payments: | 10 |

| | | | |
|---|---|---|---|
| Interest Crediting Rate (beginning in year 2): | 4.00 % | Interest Crediting Rate (beginning in year 2): | 13.50 % |
| Mortgage Interest Rate (beginning in year 2): | 5.00 % | Mortgage Interest Rate (beginning in year 2): | 14.50 % |

| Year | Scheduled + Incremental LI Premium | Adjusted Mortgage Payment | After-Tax Combined Cost | End of Year Insurance Cash Value | Year | Scheduled + Incremental LI Premium | Adjusted Mortgage Payment | After-Tax Combined Cost | End of Year Insurance Cash Value |
|---|---|---|---|---|---|---|---|---|---|
| 1 | 391.73 | 2,292.50 | 1,904.78 | 4,275.82 | 1 | 391.73 | 2,292.50 | 1,904.78 | 4,275.82 |
| 2 | 433.50 | 1,091.67 | 1,154.00 | 9,110.82 | 2 | 391.73 | 3,165.83 | 2,481.18 | 9,448.17 |
| 3 | 457.43 | 1,091.67 | 1,177.93 | 14,387.39 | 3 | 391.73 | 3,165.83 | 2,481.18 | 15,301.06 |
| 4 | 483.53 | 1,091.67 | 1,204.03 | 20,145.00 | 4 | 391.73 | 3,165.83 | 2,481.18 | 21,924.14 |
| 5 | 512.05 | 1,091.67 | 1,232.55 | 26,437.59 | 5 | 391.73 | 3,165.83 | 0.00 | 29,430.16 |
| 6 | 543.21 | 1,091.67 | 1,263.71 | 33,313.77 | 6 | 391.73 | 3,165.83 | 2,481.18 | 37,936.60 |
| 7 | 577.26 | 1,091.67 | 1,297.76 | 40,827.13 | 7 | 391.73 | 3,165.83 | 2,481.18 | 47,577.36 |
| 8 | 614.46 | 1,091.67 | 1,334.96 | 49,033.51 | 8 | 391.73 | 3,165.83 | 2,481.18 | 58,501.89 |
| 9 | 655.09 | 1,091.67 | 1,375.59 | 57,994.83 | 9 | 391.73 | 3,165.83 | 2,481.18 | 70,881.01 |
| 10 | 307.75 | 1,091.67 | 1,028.25 | 67,779.76 | 10 | 0.00 | 3,165.83 | 2,089.45 | 84,910.11 |
| 11 | 334.63 | 1,091.67 | 1,055.13 | 73,693.06 | 11 | 0.00 | 3,165.83 | 2,089.45 | 95,867.27 |
| 12 | 363.87 | 1,091.67 | 1,084.37 | 80,125.02 | 12 | 0.00 | 3,165.83 | 2,089.45 | 108,273.39 |
| 13 | 395.67 | 1,091.67 | 1,116.17 | 87,116.81 | 13 | 0.00 | 3,165.83 | 2,089.45 | 122,321.28 |
| 14 | 430.26 | 1,091.67 | 1,150.76 | 94,717.64 | 14 | 0.00 | 3,165.83 | 2,089.45 | 138,235.48 |
| 15 | 467.86 | 1,091.67 | 1,188.36 | 102,979.93 | 15 | 0.00 | 3,165.83 | 2,089.45 | 156,272.02 |
| 16 | 508.77 | 1,091.67 | 1,229.27 | 111,965.47 | 16 | 0.00 | 3,165.83 | 2,089.45 | 176,728.40 |
| 17 | 553.28 | 1,091.67 | 1,273.78 | 121,743.60 | 17 | 0.00 | 3,165.83 | 2,089.45 | 199,904.28 |
| 18 | 601.76 | 1,091.67 | 1,322.26 | 132,394.70 | 18 | 0.00 | 3,165.83 | 2,089.45 | 226,099.61 |
| 19 | 654.60 | 1,091.67 | 1,375.10 | 144,006.41 | 19 | 0.00 | 3,165.83 | 2,089.45 | 255,703.31 |
| 20 | 712.27 | 1,091.67 | 1,432.77 | 156,681.68 | 20 | 0.00 | 3,165.83 | 2,089.45 | 289,178.61 |
| 21 | 775.28 | 1,091.67 | 1,495.78 | 170,531.39 | 21 | 0.00 | 3,165.83 | 2,089.45 | 327,041.89 |
| 22 | 844.19 | 1,091.67 | 1,564.69 | 185,686.03 | 22 | 0.00 | 3,165.83 | 2,089.45 | 369,890.69 * |
| 23 | 919.66 | 1,091.67 | 1,640.16 | 202,287.60 | 23 | 0.00 | 3,165.83 | 2,089.45 | 418,404.97 * |
| 24 | 1,002.42 | 1,091.67 | 1,722.92 | 220,497.05 | 24 | 0.00 | 3,165.83 | 2,089.45 | 473,367.52 * |
| 25 | 1,093.27 | 1,091.67 | 1,813.77 | 240,493.29 | 25 | 0.00 | 3,165.83 | 2,089.45 | 535,569.52 * |
| 26 | 1,190.92 | 1,091.67 | 1,911.42 | 262,451.64 | 26 | 0.00 | 3,165.83 | 2,089.45 | 605,982.04 * |
| 27 | 1,296.33 | 1,091.67 | 2,016.83 | 286,476.56 | 27 | 0.00 | 3,165.83 | 2,089.45 | 685,705.44 * |
| 28 | 1,415.14 | 1,091.67 | 2,135.64 | 312,733.10 * | 28 | 0.00 | 3,165.83 | 2,089.45 | 775,991.65 * |
| 29 | 1,545.03 | 1,091.67 | 2,265.53 | 341,436.65 * | 29 | 0.00 | 3,165.83 | 2,089.45 | 878,263.51 * |
| 30 | 1,686.74 | 1,091.67 | 2,407.24 | 372,754.97 * | 30 | 0.00 | 3,165.83 | 2,089.45 | 993,954.58 * |

\* If the insurance policy is surrendered, the after-tax proceeds will pay off the mortgage principal.

\* If the insurance policy is surrendered, the after-tax proceeds will pay off the mortgage principal.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 31I

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
GUARANTEED LIFE INSURANCE VALUES
```

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|---|---|---|
| 1 | 3,644.41 | 357,684.95 |
| 2 | 7,569.30 | 357,684.95 |
| 3 | 11,627.25 | 357,684.95 |
| 4 | 15,817.64 | 357,684.95 |
| 5 | 20,140.11 | 357,684.95 |
| 6 | 24,591.23 | 357,684.95 |
| 7 | 29,171.20 | 357,684.95 |
| 8 | 33,877.30 | 357,684.95 |
| 9 | 38,710.45 | 357,684.95 |
| 10 | 43,665.57 | 357,684.95 |
| 11 | 44,212.50 | 357,684.95 |
| 12 | 44,684.26 | 357,684.95 |
| 13 | 45,074.65 | 357,684.95 |
| 14 | 45,367.57 | 357,684.95 |
| 15 | 45,555.66 | 357,684.95 |
| 16 | 45,624.78 | 357,684.95 |
| 17 | 45,563.18 | 357,684.95 |
| 18 | 45,348.85 | 357,684.95 |
| 19 | 44,964.89 | 357,684.95 |
| 20 | 44,374.11 | 357,684.95 |
| 21 | 43,543.50 | 357,684.95 |
| 22 | 42,431.34 | 357,684.95 |
| 23 | 40,989.74 | 357,684.95 |
| 24 | 39,180.17 | 357,684.95 |
| 25 | 36,954.26 | 357,684.95 |
| 26 | 34,272.61 | 357,684.95 |
| 27 | 31,081.97 | 357,684.95 |
| 28 | 27,320.49 | 357,684.95 |
| 29 | 22,902.87 | 357,684.95 |
| 30 | 17,727.79 | 357,684.95 |
| 31 | 11,668.25 | 357,684.95 |
| 32 | 4,571.03 | 357,684.95 |

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 31J

---
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

LIFE INSURANCE COST INDICES

---

An explanation of the intended use of these indices is provided in The Life Insurance Buyer's Guide These indices are useful only for the comparison of relative costs of two or more similar policies The cost indices do not reflect any optional benefits

|  | BASED ON GUARANTEED FACTORS | |
|---|---|---|
|  | 10 Year | 20 Year |
| SURRENDER COST INDEX @ 5% | 3.90 | 4.57 |
| NET PAYMENT COST INDEX @ 5% | 13.14 | 8.14 |

|  | BASED ON CURRENT FACTORS | |
|---|---|---|
|  | 10 Year | 20 Year |
| SURRENDER COST INDEX @ 5% | -1.21 | -4.47 |
| NET PAYMENT COST INDEX @ 5% | 13.14 | 8.14 |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32A

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

Illustration Developed For:

Bozeman Amorey Stella
666 Greenwich Street
Apt 933
New York, NY 10014

By:

Bill Simpson
Mortgage ProBrokers
555 Wilton Way
Wilton, CT 06894

With regards to property located at

62 Hillock Road
Cannondale, CT 05555

The real estate agent representing you in the purchase:

Milly Jenner
Chekov & Karney
310 Wilton Way
Wilton, CT 06894

| INDIVIDUAL DATA FOR: Bozeman Amorey Stella |  |
|---|---|

| Age | 32 |
|---|---|
| Sex | Male |
| Individual Tax Rate | 34.00 % |

| MORTGAGE ASSUMPTIONS FOR: HOMEOWNER'S BANK |  |
|---|---|

The Ryan Mortgage:

| | | | |
|---|---|---|---|
| Principal Amount | 262,000.00 | | |
| Down Payment | 3,849.60 | | |
| Initial Loan Balance | 262,000.00 | | |
| Down Payment as % of Principal | 1.47 % | | |
| Mortgage Interest Rate | 10.50 % | Cap: | 14.50 % |
| Mortgage Points (%) | 1.00 % | | |
| Term of Mortgage (Years) | 30 | | |
| PMI Cost (%) | 0.00 % | | |
| Settlement Costs | 4,000.00 | | |
| Closing Date | 01-Mar-92 | | |

Conventional Mortgage:

| | |
|---|---|
| Principal Amount | 262,000.00 |
| Down Payment | 13,100.00 |
| Initial Loan Balance | 248,900.00 |
| Down Payment as % of Principal | 5.00 % |
| Mortgage Interest Rate | 10.50 % |
| Mortgage Points (%) | 1.00 % |
| Term of Mortgage (Years) | 30 |
| PMI Cost (%) | 0.50 % |
| Settlement Costs | 4,000.00 |
| Closing Date | 01-Mar-92 |

| INSURANCE ASSUMPTIONS FOR: METRO LIFE INSURANCE CORPORATION |  |
|---|---|

Current Rates:

| | |
|---|---|
| Mortality | 1983 GAM |
| Percent | 100.00 % |
| Unloaned Credited Rate | 9.50 % |
| Loan Charged Rate | 9.50 % |
| Loan Credited Rate | 9.50 % |

Guarantees:

| | |
|---|---|
| Mortality | 1980 CSO |
| Percent | 100.00 % |
| Unloaned Credited Rate | 4.00 % |

This illustration assumes life insurance premium payments will be guaranteed by:
Homeowner's Endorsement Plan Incorporated
3000 Ocean Street
Millvale, CT 01234
Contact: Pran Annana
Sponsor Number 0001

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

IMPORTANT COMMENTS CONCERNING THE ATTACHED ILLUSTRATION

---

The information contained in the attached illustration is based on both assumptions furnished by the client for whom it is developed and the current assumptions of the mortgage and insurance plans chosen. Unless otherwise indicated, those rates assumed initially continue throughout the life of the illustration.

Conventional Mortgage assumptions for principal, mortgage interest rate, mortgage points (%) and settlement costs are the same as those assumed for The Ryan Mortgage. The down payment and initial loan balance are as stated on page 1 of this illustration.

Premium costs may change if the closing date differs from the one given. They may also change if any of the other assumptions used vary.

The mortgage illustrated is a variable rate mortgage. Mortgage and premium payments are subject to change with variations in interest rates.

Interest rates credited on unloaned policy values and the cost of insurance charges may vary after the first year. Interest rates charged on policy loans and credited on loaned policy values also may vary after the first year.

In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate.

The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice. Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32C

```
THE RYAN MORTGAGE ILLUSTRATION SYSTEM

COMBINED ILLUSTRATION FOR THE PRODUCTS OF :
         HOMEOWNER'S BANK
              AND
    METRO LIFE INSURANCE CORPORATION
```

ESTIMATED UPFRONT MORTGAGE AND OTHER ESCROW PAYMENT

| The Ryan Mortgage: | | Conventional Mortgage: | |
|---|---:|---|---:|
| Settlement Costs | 4,000.00 | Settlement Costs | 4,000.00 |
| Mortgage Points | 2,620.00 | Mortgage Points | 2,489.00 |
| PMI Escrow | 0.00 | PMI Escrow | 1,244.50 |
| Down Payment | 3,849.60 * | Down Payment | 13,100.00 |
| Total Closing Costs | 10,469.60 | Total Closing Costs | 20,833.50 |

\* The down payment is used for paying an insurance premium

ESTIMATED AVERAGE FIRST YEAR MONTHLY PAYMENT

| The Ryan Mortgage: | | Conventional Mortgage: | |
|---|---:|---|---:|
| Mortgage | 2,292.50 | Mortgage | 2,276.79 |
| Tax Escrow | 235.00 | Tax Escrow | 235.00 |
| PMI Escrow | 0.00 | PMI Escrow | 103.71 |
| Life Insurance | 320.80 | Life Insurance | 18.60 |
|  | 2,848.30 |  | 2,634.10 |
| LESS: | | LESS: | |
| Tax Deduction | 779.45 | Tax Deduction | 738.81 |
| Net After-Tax Cost | 2,068.85 | Net After-Tax Cost | 1,895.29 |

ESTIMATED AVERAGE YEAR 10 MONTHLY PAYMENT

| The Ryan Mortgage: | | Conventional Mortgage: | |
|---|---:|---|---:|
| Mortgage | 2,292.50 | Mortgage | 2,276.79 |
| Tax Escrow | 235.00 | Tax Escrow | 235.00 |
| PMI Escrow | 0.00 | PMI Escrow | 103.71 |
| Life Insurance | 0.00 | Life Insurance | 31.71 |
|  | 2,527.50 |  | 2,647.21 |
| LESS | | LESS: | |
| Tax Deduction | 779.45 | Tax Deduction | 673.70 |
| Net After-Tax Cost | 1,748.05 | Net After-Tax Cost | 1,973.51 |

> The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.
>
> This illustration is based on these assumptions and is only valid with all pages attached.

THE RYAN MORTGAGE ILLUSTRATION SYSTEM

COMBINED ILLUSTRATION FOR THE PRODUCTS OF:
HOMEOWNER'S BANK
AND
METRO LIFE INSURANCE CORPORATION

---

ESTIMATED EQUITY AND FINANCIAL ANALYSIS ASSUMING EARLY HOME SALE

---

In the following computations, the home is assumed to be sold at the original purchase price. If it is sold for a higher price, the total equity after the sale will increase.

Mortgage Costs:

|  | Ryan Mortgage | Conventional Mortgage | Financial Benefit From Ryan Mortgage | Cumulative Financial Benefit |
|---|---|---|---|---|
| Total Closing Costs: * | 10,469.60 | 20,833.50 | 10,363.90 | 10,363.90 |
| Annual After-Tax Mortgage Cost ** |  |  |  |  |
| Year 1 | 22,006.20 | 19,923.45 | (2,082.75) | 8,281.15 |
| Year 2 | 22,006.20 | 19,980.01 | (2,026.19) | 6,254.96 |
| Year 3 | 22,006.20 | 20,046.90 | (1,959.30) | 4,295.66 |
| Year 4 | 22,006.20 | 20,121.84 | (1,884.36) | 2,411.30 |
| Year 5 | 22,006.20 | 20,197.30 | (1,808.90) | 602.40 |
| Year 6 | 22,006.20 | 20,282.03 | (1,724.17) | (1,121.77) |
| Year 7 | 22,006.20 | 20,376.65 | (1,629.55) | (2,751.32) |
| Year 8 | 22,006.20 | 20,484.47 | (1,521.73) | (4,273.05) |
| Year 9 | 22,006.20 | 20,606.16 | (1,400.04) | (5,673.09) |
| Year 10 | 18,156.60 | 20,742.43 | 2,585.83 | (3,087.26) |

|  | Ryan Mortgage | Conventional Mortgage | Financial Benefit From Ryan Mortgage |
|---|---|---|---|
| Home Sale At The End of Year 5: |  |  |  |
| End of Year Cash Value | 21,535.83 | 0.00 | 21,535.83 |
| Home Resale | 262,000.00 | 262,000.00 | 0.00 |
| Mortgage Balance | (262,000.00) | (241,138.55) | (20,861.45) |
| Total Equity After Sale | 21,535.83 | 20,861.45 | 674.38 |
| Total Closing Costs: * | 10,469.60 | 20,833.50 | 10,363.90 |
| After-Tax Mortgage Cost ** | 110,031.00 | 100,269.51 | (9,761.50) |
| TOTAL 5 YEAR FINANCIAL BENEFIT: |  |  | 1,276.78 |
| Home Sale At The End of Year 10: |  |  |  |
| End of Year Cash Value | 55,253.39 | 0.00 | 55,253.39 |
| Home Resale | 262,000.00 | 262,000.00 | 0.00 |
| Mortgage Balance | (262,000.00) | (228,048.07) | (33,951.93) |
| Total Equity After Sale | 55,253.39 | 33,951.93 | 21,301.46 |
| Total Closing Costs: * | 10,469.60 | 20,833.50 | 10,363.90 |
| After-Tax Mortgage Cost ** | 216,212.40 | 202,761.24 | (13,451.16) |
| TOTAL 10 YEAR FINANCIAL BENEFIT: |  |  | 18,214.20 |

* See top of page 3 for detailed breakdown.
** These values include insurance. (See page 5 for detailed breakdown.)

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32E

```
THE RYAN MORTGAGE ILLUSTRATION SYSTEM

COMBINED ILLUSTRATION FOR THE PRODUCTS OF :
         HOMEOWNER'S BANK
               AND
   METRO LIFE INSURANCE CORPORATION
```

```
                    ESTIMATED ANNUAL COST
            (Does not include Property Taxes or Hazard Insurance)
```

The Ryan Mortgage:                                                  Conventional Mortgage:

| Year | Mortgage | Life Insurance | Interest Tax Deduction | Total After Taxes | Year | Mortgage | PMI plus Life Insurance | Interest Tax Deduction | Total After Taxes |
|---|---|---|---|---|---|---|---|---|---|
| 1 | 27,510.00 | 3,849.60 | 9,353.40 | 22,006.20 | 1 | 27,321.48 | 1,467.70 | 8,865.73 | 19,923.45 |
| 2 | 27,510.00 | 3,849.60 | 9,353.40 | 22,006.20 | 2 | 27,321.48 | 1,477.59 | 8,819.05 | 19,980.01 |
| 3 | 27,510.00 | 3,849.60 | 9,353.40 | 22,006.20 | 3 | 27,321.48 | 1,492.66 | 8,767.23 | 20,046.90 |
| 4 | 27,510.00 | 3,849.60 | 9,353.40 | 22,006.20 | 4 | 27,321.48 | 1,510.06 | 8,709.70 | 20,121.84 |
| 5 | 27,510.00 | 3,849.60 | 9,353.40 | 22,006.20 | 5 | 27,321.48 | 1,521.65 | 8,645.83 | 20,197.30 |
|   | 137,550.00 | 19,248.00 | 46,767.00 | 110,031.00 |   | 136,607.40 | 7,469.66 | 43,807.54 | 100,269.51 |
| 6 | 27,510.00 | 3,849.60 | 9,353.40 | 22,006.20 | 6 | 27,321.48 | 1,535.46 | 8,574.92 | 20,282.03 |
| 7 | 27,510.00 | 3,849.60 | 9,353.40 | 22,006.20 | 7 | 27,321.48 | 1,551.36 | 8,496.19 | 20,376.65 |
| 8 | 27,510.00 | 3,849.60 | 9,353.40 | 22,006.20 | 8 | 27,321.48 | 1,571.78 | 8,408.79 | 20,484.47 |
| 9 | 27,510.00 | 3,849.60 | 9,353.40 | 22,006.20 | 9 | 27,321.48 | 1,596.43 | 8,311.75 | 20,606.16 |
| 10 | 27,510.00 | 0.00 | 9,353.40 | 18,156.60 | 10 | 27,321.48 | 1,624.97 | 8,204.03 | 20,742.43 |
|   | 275,100.00 | 34,646.40 | 93,534.00 | 216,212.40 |   | 273,214.80 | 15,349.66 | 85,803.22 | 202,761.24 |
| 11 | 27,510.00 | 0.00 | 9,353.40 | 18,156.60 | 11 | 27,321.48 | 1,659.49 | 8,084.43 | 20,896.54 |
| 12 | 27,510.00 | 0.00 | 9,353.40 | 18,156.60 | 12 | 27,321.48 | 1,696.92 | 7,951.65 | 21,066.75 |
| 13 | 27,510.00 | 0.00 | 9,353.40 | 18,156.60 | 13 | 27,321.48 | 1,741.47 | 7,804.23 | 21,258.71 |
| 14 | 27,510.00 | 0.00 | 9,353.40 | 18,156.60 | 14 | 27,321.48 | 1,789.78 | 7,640.58 | 21,470.68 |
| 15 | 27,510.00 | 0.00 | 9,353.40 | 18,156.60 | 15 | 27,321.48 | 598.61 | 7,458.88 | 20,461.20 |
|   | 412,650.00 | 34,646.40 | 140,301.00 | 306,995.40 |   | 409,822.20 | 22,835.92 | 124,742.98 | 307,915.14 |
| 16 | 27,510.00 | 0.00 | 9,353.40 | 18,156.60 | 16 | 27,321.48 | 653.31 | 7,257.17 | 20,717.63 |
| 17 | 27,510.00 | 0.00 | 9,353.40 | 18,156.60 | 17 | 27,321.48 | 707.94 | 7,033.22 | 20,996.20 |
| 18 | 27,510.00 | 0.00 | 9,353.40 | 18,156.60 | 18 | 27,321.48 | 758.70 | 6,784.59 | 21,295.58 |
| 19 | 27,510.00 | 0.00 | 9,353.40 | 18,156.60 | 19 | 27,321.48 | 805.83 | 6,508.57 | 21,618.74 |
| 20 | 27,510.00 | 0.00 | 9,353.40 | 18,156.60 | 20 | 27,321.48 | 843.25 | 6,202.12 | 21,962.61 |
|   | 550,200.00 | 34,646.40 | 187,068.00 | 397,778.40 |   | 546,429.60 | 26,604.94 | 158,528.65 | 414,505.89 |
| 21 | 27,510.00 | 0.00 | 9,353.40 | 18,156.60 | 21 | 27,321.48 | 872.42 | 5,861.90 | 22,332.00 |
| 22 | 27,510.00 | 0.00 | 9,353.40 | 18,156.60 | 22 | 27,321.48 | 885.32 | 5,484.20 | 22,722.61 |
| 23 | 27,510.00 | 0.00 | 9,353.40 | 18,156.60 | 23 | 27,321.48 | 882.56 | 5,064.86 | 23,139.17 |
| 24 | 27,510.00 | 0.00 | 9,353.40 | 18,156.60 | 24 | 27,321.48 | 859.12 | 4,599.31 | 23,581.29 |
| 25 | 27,510.00 | 0.00 | 9,353.40 | 18,156.60 | 25 | 27,321.48 | 812.49 | 4,082.46 | 24,051.50 |
|   | 687,750.00 | 34,646.40 | 233,835.00 | 488,561.40 |   | 683,037.00 | 30,916.85 | 183,621.39 | 530,332.46 |
| 26 | 27,510.00 | 0.00 | 9,353.40 | 18,156.60 | 26 | 27,321.48 | 738.81 | 3,508.65 | 24,551.63 |
| 27 | 27,510.00 | 0.00 | 9,353.40 | 18,156.60 | 27 | 27,321.48 | 634.20 | 2,871.61 | 25,084.08 |
| 28 | 27,510.00 | 0.00 | 9,353.40 | 18,156.60 | 28 | 27,321.48 | 490.45 | 2,164.36 | 25,647.58 |
| 29 | 27,510.00 | 0.00 | 9,353.40 | 18,156.60 | 29 | 27,321.48 | 296.21 | 1,379.17 | 26,238.53 |
| 30 | 27,510.00 | 0.00 | 9,353.40 | 18,156.60 | 30 | 27,321.48 | 33.33 | 507.44 | 26,847.37 |
|   | 825,300.00 | 34,646.40 | 280,602.00 | 579,344.40 |   | 819,644.40 | 33,109.86 | 194,052.62 | 658,701.64 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32F

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED REMAINING MORTGAGE OBLIGATION
ASSUMING MORTGAGE IS PAID OFF WITH INSURANCE POLICY CASH SURRENDER VALUE
```

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid.

The Ryan Mortgage:                                                                                          Conventional Mortgage:

| Year | Life Insurance Cash Value | Tax Owed On Surrender | Net Policy Proceeds | End of Year Mortgage Principal | End of Year Net Mortgage Obligation * | Year | Life Insurance Cash Value | Net Policy Proceeds | End of Year Mortgage Principal |
|---|---|---|---|---|---|---|---|---|---|
| 1 | 3,459.99 | 0.00 | 3,459.99 | 262,000.00 | 258,540.01 | 1 | 0.00 | 0.00 | 247,654.25 |
| 2 | 7,403.67 | 0.00 | 7,403.67 | 262,000.00 | 254,596.33 | 2 | 0.00 | 0.00 | 246,271.21 |
| 3 | 11,707.46 | 53.94 | 11,653.51 | 262,000.00 | 250,346.49 | 3 | 0.00 | 0.00 | 244,735.75 |
| 4 | 16,403.50 | 341.73 | 16,061.77 | 262,000.00 | 245,938.23 | 4 | 0.00 | 0.00 | 243,031.08 |
| 5 | 21,535.83 | 777.86 | 20,757.97 | 262,000.00 | 241,242.03 | 5 | 0.00 | 0.00 | 241,138.55 |
| 6 | 27,144.06 | 1,375.80 | 25,768.27 | 262,000.00 | 236,231.73 | 6 | 0.00 | 0.00 | 239,037.46 |
| 7 | 33,271.89 | 2,150.40 | 31,121.50 | 262,000.00 | 230,878.50 | 7 | 0.00 | 0.00 | 236,704.82 |
| 8 | 39,964.84 | 3,117.13 | 36,847.70 | 262,000.00 | 225,152.30 | 8 | 0.00 | 0.00 | 234,115.12 |
| 9 | 47,273.35 | 4,293.16 | 42,980.18 | 262,000.00 | 219,019.82 | 9 | 0.00 | 0.00 | 231,240.02 |
| 10 | 55,253.39 | 5,697.51 | 49,555.88 | 262,000.00 | 212,444.12 | 10 | 0.00 | 0.00 | 228,048.07 |
| 11 | 60,059.54 | 7,331.60 | 52,727.94 | 262,000.00 | 209,272.06 | 11 | 0.00 | 0.00 | 224,504.37 |
| 12 | 65,286.85 | 9,108.89 | 56,177.96 | 262,000.00 | 205,822.04 | 12 | 0.00 | 0.00 | 220,570.13 |
| 13 | 70,968.68 | 11,040.71 | 59,927.97 | 262,000.00 | 202,072.03 | 13 | 0.00 | 0.00 | 216,202.33 |
| 14 | 77,144.88 | 13,140.62 | 64,004.26 | 262,000.00 | 197,995.74 | 14 | 0.00 | 0.00 | 211,353.18 |
| 15 | 83,857.92 | 15,423.05 | 68,434.87 | 262,000.00 | 193,565.13 | 15 | 0.00 | 0.00 | 205,969.63 |
| 16 | 91,157.88 | 17,905.04 | 73,252.84 | 262,000.00 | 188,747.16 | 16 | 0.00 | 0.00 | 199,992.80 |
| 17 | 99,100.97 | 20,605.69 | 78,495.28 | 262,000.00 | 183,504.72 | 17 | 0.00 | 0.00 | 193,357.31 |
| 18 | 107,752.36 | 23,547.16 | 84,205.20 | 262,000.00 | 177,794.80 | 18 | 0.00 | 0.00 | 185,990.56 |
| 19 | 117,183.09 | 26,753.61 | 90,429.48 | 262,000.00 | 171,570.52 | 19 | 0.00 | 0.00 | 177,811.97 |
| 20 | 127,476.67 | 30,253.43 | 97,223.24 | 262,000.00 | 164,776.76 | 20 | 0.00 | 0.00 | 168,732.07 |
| 21 | 138,722.98 | 34,077.17 | 104,645.81 | 262,000.00 | 157,354.19 | 21 | 0.00 | 0.00 | 158,651.53 |
| 22 | 151,027.90 | 38,260.85 | 112,767.05 | 262,000.00 | 149,232.95 | 22 | 0.00 | 0.00 | 147,460.09 |
| 23 | 164,506.58 | 42,843.60 | 121,662.98 | 262,000.00 | 140,337.02 | 23 | 0.00 | 0.00 | 135,035.30 |
| 24 | 179,289.57 | 47,869.81 | 131,419.76 | 262,000.00 | 130,580.24 | 24 | 0.00 | 0.00 | 121,241.27 |
| 25 | 195,521.96 | 53,388.83 | 142,133.13 | 262,000.00 | 119,866.87 | 25 | 0.00 | 0.00 | 105,927.08 |
| 26 | 213,352.50 | 59,451.21 | 153,901.29 | 262,000.00 | 108,098.71 | 26 | 0.00 | 0.00 | 88,925.22 |
| 27 | 232,870.60 | 66,087.37 | 166,783.24 | 262,000.00 | 95,216.76 | 27 | 0.00 | 0.00 | 70,049.69 |
| 28 | 254,201.71 | 73,339.94 | 180,861.77 | 262,000.00 | 81,138.23 | 28 | 0.00 | 0.00 | 49,094.02 |
| 29 | 277,520.83 | 81,268.44 | 196,252.39 | 262,000.00 | 65,747.61 | 29 | 0.00 | 0.00 | 25,828.95 |
| 30 | 302,964.20 | 89,919.19 | 213,045.01 | 262,000.00 | 48,954.99 | 30 | 0.00 | 0.00 | (0.00) |

\* A negative obligation indicates death benefits in excess of the mortgage obligation, payable to policyholder's estate

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 32G

> THE RYAN MORTGAGE ILLUSTRATION SYSTEM
>
> COMBINED ILLUSTRATION FOR THE PRODUCTS OF :
> HOMEOWNER'S BANK
> AND
> METRO LIFE INSURANCE CORPORATION

> ESTIMATED REMAINING MORTGAGE OBLIGATION
> ASSUMING MORTGAGE IS PAID OFF WITH DEATH PROCEEDS

Life Insurance has certain tax advantages. Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid.

The Ryan Mortgage:                                            Conventional Mortgage:

| Year | Life Insurance Death Benefit | End of Year Mortgage Principal | Net Death Proceeds | | Year | Life Insurance Death Benefit | End of Year Mortgage Principal | Net Death Proceeds |
|---|---|---|---|---|---|---|---|---|
| 1 | 292,923.18 | 262,000.00 | 30,923.18 | | 1 | 247,654.25 | 247,654.25 | 0.00 |
| 2 | 292,923.18 | 262,000.00 | 30,923.18 | | 2 | 246,271.21 | 246,271.21 | 0.00 |
| 3 | 292,923.18 | 262,000.00 | 30,923.18 | | 3 | 244,735.75 | 244,735.75 | 0.00 |
| 4 | 292,923.18 | 262,000.00 | 30,923.18 | | 4 | 243,031.08 | 243,031.08 | 0.00 |
| 5 | 292,923.18 | 262,000.00 | 30,923.18 | | 5 | 241,138.55 | 241,138.55 | 0.00 |
| 6 | 292,923.18 | 262,000.00 | 30,923.18 | | 6 | 239,037.46 | 239,037.46 | 0.00 |
| 7 | 292,923.18 | 262,000.00 | 30,923.18 | | 7 | 236,704.82 | 236,704.82 | 0.00 |
| 8 | 292,923.18 | 262,000.00 | 30,923.18 | | 8 | 234,115.12 | 234,115.12 | 0.00 |
| 9 | 292,923.18 | 262,000.00 | 30,923.18 | | 9 | 231,240.02 | 231,240.02 | 0.00 |
| 10 | 292,923.18 | 262,000.00 | 30,923.18 | | 10 | 228,048.07 | 228,048.07 | 0.00 |
| 11 | 292,923.18 | 262,000.00 | 30,923.18 | | 11 | 224,504.37 | 224,504.37 | 0.00 |
| 12 | 292,923.18 | 262,000.00 | 30,923.18 | | 12 | 220,570.13 | 220,570.13 | 0.00 |
| 13 | 292,923.18 | 262,000.00 | 30,923.18 | | 13 | 216,202.33 | 216,202.33 | 0.00 |
| 14 | 292,923.18 | 262,000.00 | 30,923.18 | | 14 | 211,353.18 | 211,353.18 | 0.00 |
| 15 | 292,923.18 | 262,000.00 | 30,923.18 | | 15 | 205,969.63 | 205,969.63 | 0.00 |
| 16 | 292,923.18 | 262,000.00 | 30,923.18 | | 16 | 199,992.80 | 199,992.80 | 0.00 |
| 17 | 292,923.18 | 262,000.00 | 30,923.18 | | 17 | 193,357.31 | 193,357.31 | 0.00 |
| 18 | 292,923.18 | 262,000.00 | 30,923.18 | | 18 | 185,990.56 | 185,990.56 | 0.00 |
| 19 | 292,923.18 | 262,000.00 | 30,923.18 | | 19 | 177,811.97 | 177,811.97 | 0.00 |
| 20 | 292,923.18 | 262,000.00 | 30,923.18 | | 20 | 168,732.07 | 168,732.07 | 0.00 |
| 21 | 292,923.18 | 262,000.00 | 30,923.18 | | 21 | 158,651.53 | 158,651.53 | 0.00 |
| 22 | 292,923.18 | 262,000.00 | 30,923.18 | | 22 | 147,460.09 | 147,460.09 | 0.00 |
| 23 | 292,923.18 | 262,000.00 | 30,923.18 | | 23 | 135,035.30 | 135,035.30 | 0.00 |
| 24 | 292,923.18 | 262,000.00 | 30,923.18 | | 24 | 121,241.27 | 121,241.27 | 0.00 |
| 25 | 292,923.18 | 262,000.00 | 30,923.18 | | 25 | 105,927.08 | 105,927.08 | 0.00 |
| 26 | 302,960.54 | 262,000.00 | 40,960.54 | | 26 | 88,925.22 | 88,925.22 | 0.00 |
| 27 | 321,361.43 | 262,000.00 | 59,361.43 | | 27 | 70,049.69 | 70,049.69 | 0.00 |
| 28 | 340,630.30 | 262,000.00 | 78,630.30 | | 28 | 49,094.02 | 49,094.02 | 0.00 |
| 29 | 360,777.08 | 262,000.00 | 98,777.08 | | 29 | 25,828.95 | 25,828.95 | 0.00 |
| 30 | 387,794.17 | 262,000.00 | 125,794.17 | | 30 | (0.00) | (0.00) | 0.00 |

> The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.
>
> This illustration is based on these assumptions and is only valid with all pages attached.

Fig. 32H

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

EFFECTS OF CHANGES IN INTEREST RATES ON MONTHLY RYAN PAYMENTS

As noted on page 2 of this illustration, in the event interest rates go down, variable mortgage payments will go down, life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30. Scheduled life insurance premiums begin in year 1.

| | | | | |
|---|---|---|---|---|
| Original Ryan Mortgage (Interest) Payment: | 2,292.50 | | Original Scheduled Life Insurance Premium: | 320.80 |
| Original Ryan After-Tax Mortgage Payment: | 1,513.05 | | Number of Years of Premium Payments: | 10 |
| Interest Crediting Rate (beginning in year 2): | 4.00 % | | Interest Crediting Rate (beginning in year 2): | 13.50 % |
| Mortgage Interest Rate (beginning in year 2): | 5.00 % | | Mortgage Interest Rate (beginning in year 2): | 14.50 % |

| Year | Scheduled + Incremental LI Premium | Adjusted Mortgage Payment | After-Tax Combined Cost | End of Year Insurance Cash Value | Year | Scheduled + Incremental LI Premium | Adjusted Mortgage Payment | After-Tax Combined Cost | End of Year Insurance Cash Value |
|---|---|---|---|---|---|---|---|---|---|
| 1 | 320.80 | 2,292.50 | 1,833.85 | 3,459.99 | 1 | 320.80 | 2,292.50 | 1,833.85 | 3,459.99 |
| 2 | 354.75 | 1,091.67 | 1,075.25 | 7,403.67 | 2 | 320.80 | 3,165.83 | 2,410.25 | 7,677.84 |
| 3 | 374.27 | 1,091.67 | 1,094.77 | 11,707.46 | 3 | 320.80 | 3,165.83 | 2,410.25 | 12,450.57 |
| 4 | 395.56 | 1,091.67 | 1,116.06 | 16,403.50 | 4 | 320.80 | 3,165.83 | 2,410.25 | 17,851.25 |
| 5 | 418.82 | 1,091.67 | 1,139.32 | 21,535.83 | 5 | 320.80 | 3,165.83 | 2,410.25 | 23,971.85 |
| 6 | 444.23 | 1,091.67 | 1,164.73 | 27,144.06 | 6 | 320.80 | 3,165.83 | 2,410.25 | 30,908.13 |
| 7 | 472.00 | 1,091.67 | 1,192.50 | 33,271.89 | 7 | 320.80 | 3,165.83 | 2,410.25 | 38,769.25 |
| 8 | 502.34 | 1,091.67 | 1,222.84 | 39,964.84 | 8 | 320.80 | 3,165.83 | 2,410.25 | 47,677.05 |
| 9 | 535.48 | 1,091.67 | 1,255.98 | 47,273.35 | 9 | 320.80 | 3,165.83 | 2,410.25 | 57,770.75 |
| 10 | 250.88 | 1,091.67 | 971.38 | 55,253.39 | 10 | 0.00 | 3,165.83 | 2,089.45 | 69,209.65 |
| 11 | 272.72 | 1,091.67 | 993.22 | 60,059.54 | 11 | 0.00 | 3,165.83 | 2,089.45 | 78,125.88 |
| 12 | 296.49 | 1,091.67 | 1,016.99 | 65,286.85 | 12 | 0.00 | 3,165.83 | 2,089.45 | 88,220.86 |
| 13 | 322.34 | 1,091.67 | 1,042.84 | 70,968.68 | 13 | 0.00 | 3,165.83 | 2,089.45 | 99,651.35 |
| 14 | 350.44 | 1,091.67 | 1,070.94 | 77,144.88 | 14 | 0.00 | 3,165.83 | 2,089.45 | 112,599.93 |
| 15 | 381.00 | 1,091.67 | 1,101.50 | 83,857.92 | 15 | 0.00 | 3,165.83 | 2,089.45 | 127,274.82 |
| 16 | 414.23 | 1,091.67 | 1,134.73 | 91,157.88 | 16 | 0.00 | 3,165.83 | 2,089.45 | 143,917.92 |
| 17 | 450.39 | 1,091.67 | 1,170.89 | 99,100.97 | 17 | 0.00 | 3,165.83 | 2,089.45 | 162,777.02 |
| 18 | 489.77 | 1,091.67 | 1,210.27 | 107,752.36 | 18 | 0.00 | 3,165.83 | 2,089.45 | 184,094.61 |
| 19 | 532.69 | 1,091.67 | 1,253.19 | 117,183.09 | 19 | 0.00 | 3,165.83 | 2,089.45 | 208,185.91 |
| 20 | 579.52 | 1,091.67 | 1,300.02 | 127,476.67 | 20 | 0.00 | 3,165.83 | 2,089.45 | 235,427.87 |
| 21 | 630.69 | 1,091.67 | 1,351.19 | 138,722.98 | 21 | 0.00 | 3,165.83 | 2,089.45 | 266,240.74 |
| 22 | 686.64 | 1,091.67 | 1,407.14 | 151,027.90 | 22 | 0.00 | 3,165.83 | 2,089.45 | 301,110.80 |
| 23 | 747.92 | 1,091.67 | 1,468.42 | 164,506.58 | 23 | 0.00 | 3,165.83 | 2,089.45 | 340,591.40 |
| 24 | 815.11 | 1,091.67 | 1,535.61 | 179,289.57 | 24 | 0.00 | 3,165.83 | 2,089.45 | 385,319.56 * |
| 25 | 888.87 | 1,091.67 | 1,609.37 | 195,521.96 | 25 | 0.00 | 3,165.83 | 2,089.45 | 435,939.15 * |
| 26 | 968.73 | 1,091.67 | 1,689.23 | 213,352.50 | 26 | 0.00 | 3,165.83 | 2,089.45 | 493,240.42 * |
| 27 | 1,053.76 | 1,091.67 | 1,774.26 | 232,870.60 | 27 | 0.00 | 3,165.83 | 2,089.45 | 558,118.82 * |
| 28 | 1,150.28 | 1,091.67 | 1,870.78 | 254,201.71 | 28 | 0.00 | 3,165.83 | 2,089.45 | 631,593.18 * |
| 29 | 1,255.80 | 1,091.67 | 1,976.30 | 277,520.83 | 29 | 0.00 | 3,165.83 | 2,089.45 | 714,821.40 * |
| 30 | 1,370.94 | 1,091.67 | 2,091.44 | 302,964.20 * | 30 | 0.00 | 3,165.83 | 2,089.45 | 808,970.08 * |

\* If the insurance policy is surrendered, the after-tax proceeds will pay off the mortgage principal.

\* If the insurance policy is surrendered, the after-tax proceeds will pay off the mortgage principal.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32I

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED POLICY VALUES FOR POLICY YEAR 31 THROUGH AGE 99
ASSUMING INSURANCE POLICY IS KEPT AFTER YEAR 30
```

The Ryan Mortgage Illustration shows an option whereby the mortgage balance is paid at the end of year 30 by a policy loan taken against the policy cash value. One benefit of this option is that the life insurance coverage continues after the mortgage is paid off. Annual policy loan interest due is paid with additional policy loans.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 31 | 330,720.66 | 24,890.00 | 262,000.00 | 24,890.00 | 43,830.66 | 416,708.03 | 129,818.03 |
| 32 | 360,997.12 | 27,254.55 | 286,890.00 | 27,254.55 | 46,852.57 | 447,636.43 | 133,491.88 |
| 33 | 394,020.45 | 29,843.73 | 314,144.55 | 29,843.73 | 50,032.17 | 460,704.95 | 136,716.66 |
| 34 | 430,041.80 | 32,678.89 | 343,988.28 | 32,678.89 | 53,374.63 | 516,050.16 | 139,382.99 |
| 35 | 469,257.51 | 35,783.38 | 376,667.17 | 35,783.38 | 56,806.96 | 558,416.44 | 145,965.89 |
| 36 | 511,940.17 | 39,182.80 | 412,450.55 | 39,182.80 | 60,306.81 | 604,089.40 | 152,456.04 |
| 37 | 558,390.31 | 42,905.17 | 451,633.35 | 42,905.17 | 63,851.79 | 653,316.66 | 158,778.14 |
| 38 | 608,943.21 | 46,981.16 | 494,538.52 | 46,981.16 | 67,423.53 | 706,374.13 | 164,854.44 |
| 39 | 663,972.77 | 51,444.37 | 541,519.68 | 51,444.37 | 71,008.72 | 763,568.68 | 170,604.63 |
| 40 | 724,114.10 | 56,331.58 | 592,964.05 | 56,331.58 | 74,818.46 | 818,248.93 | 168,953.29 |
| 41 | 789,925.76 | 61,683.09 | 649,295.63 | 61,683.09 | 78,947.04 | 876,817.60 | 165,838.88 |
| 42 | 862,043.38 | 67,542.98 | 710,978.72 | 67,542.98 | 83,521.68 | 939,627.28 | 161,105.59 |
| 43 | 941,197.66 | 73,959.56 | 778,521.70 | 73,959.56 | 88,716.40 | 1,007,081.50 | 154,600.24 |
| 44 | 1,028,241.41 | 80,985.72 | 852,481.26 | 80,985.72 | 94,774.43 | 1,079,653.48 | 146,186.50 |
| 45 | 1,123,070.02 | 88,679.36 | 933,466.98 | 88,679.36 | 100,923.68 | 1,179,223.52 | 157,077.18 |
| 46 | 1,226,317.89 | 97,103.90 | 1,022,146.34 | 97,103.90 | 107,067.64 | 1,287,633.78 | 168,383.54 |
| 47 | 1,338,663.49 | 106,328.77 | 1,119,250.25 | 106,328.77 | 113,084.47 | 1,405,596.66 | 180,017.65 |
| 48 | 1,460,830.93 | 116,430.01 | 1,225,579.02 | 116,430.01 | 118,821.91 | 1,533,872.48 | 191,863.45 |
| 49 | 1,593,593.63 | 127,490.86 | 1,342,009.03 | 127,490.86 | 124,093.75 | 1,673,273.32 | 203,773.43 |
| 50 | 1,737,775.37 | 139,602.49 | 1,469,499.88 | 139,602.49 | 128,673.00 | 1,824,664.14 | 215,561.77 |
| 51 | 1,894,254.34 | 152,864.73 | 1,609,102.37 | 152,864.73 | 132,287.24 | 1,988,967.06 | 226,999.96 |
| 52 | 2,063,958.31 | 167,386.87 | 1,761,967.10 | 167,386.87 | 134,614.34 | 2,167,166.73 | 237,812.76 |
| 53 | 2,247,918.81 | 183,288.63 | 1,929,353.97 | 183,288.63 | 135,276.22 | 2,360,314.75 | 247,672.16 |
| 54 | 2,447,173.31 | 200,701.05 | 2,112,642.60 | 200,701.05 | 133,829.66 | 2,569,531.97 | 256,188.33 |
| 55 | 2,662,827.15 | 219,767.65 | 2,313,343.64 | 219,767.65 | 129,715.86 | 2,795,968.50 | 262,857.21 |
| 56 | 2,896,054.53 | 240,645.57 | 2,533,111.29 | 240,645.57 | 122,297.66 | 3,040,857.25 | 267,100.39 |
| 57 | 3,148,070.41 | 263,506.90 | 2,773,756.86 | 263,506.90 | 110,806.64 | 3,305,473.93 | 268,210.16 |
| 58 | 3,420,128.78 | 288,540.06 | 3,037,263.77 | 288,540.06 | 94,324.96 | 3,591,135.22 | 265,331.40 |
| 59 | 3,713,518.08 | 315,951.36 | 3,325,803.82 | 315,951.36 | 71,762.89 | 3,899,193.98 | 257,438.79 |
| 60 | 4,036,911.26 | 345,966.74 | 3,641,755.19 | 345,966.74 | 49,189.34 | 4,198,387.72 | 210,665.79 |
| 61 | 4,394,755.98 | 378,833.58 | 3,987,721.93 | 378,833.58 | 28,200.46 | 4,526,598.65 | 160,043.14 |
| 62 | 4,792,354.98 | 414,822.77 | 4,366,555.51 | 414,822.77 | 10,976.69 | 4,888,202.08 | 106,823.79 |
| 63 | 5,235,928.93 | 454,230.94 | 4,781,378.29 | 454,230.94 | 319.71 | 5,288,288.22 | 52,679.00 |
| 64 | 5,733,276.48 | 497,382.88 | 5,235,609.22 | 497,382.88 | 284.38 | 5,733,276.48 | 284.38 |
| 65 | 6,277,872.05 | 544,634.25 | 5,732,992.10 | 544,634.25 | 245.70 | 6,277,872.05 | 245.70 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

ESTIMATED POLICY VALUES FOR POLICY YEAR 31 THROUGH AGE 99
ASSUMING INSURANCE POLICY IS KEPT AFTER YEAR 30

---

The Ryan Mortgage Illustration shows an option whereby the mortgage balance is paid at the end of year 30 by a policy loan taken against the policy cash value. One benefit of this option is that the life insurance coverage continues after the mortgage is paid off. Annual policy loan interest due is paid with additional policy loans.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 66 | 6,874,204.19 | 596,374.50 | 6,277,626.35 | 596,374.50 | 203.34 | 6,874,204.19 | 203.34 |
| 67 | 7,527,187.89 | 653,030.08 | 6,874,000.85 | 653,030.08 | 156.95 | 7,527,187.89 | 156.95 |
| 68 | 8,242,205.04 | 715,067.94 | 7,527,030.93 | 715,067.94 | 106.16 | 8,242,205.04 | 106.16 |

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32K

```
THE RYAN MORTGAGE ILLUSTRATION SYSTEM

COMBINED ILLUSTRATION FOR THE PRODUCTS OF :
              HOMEOWNER'S BANK
                    AND
       METRO LIFE INSURANCE CORPORATION
```

GUARANTEED LIFE INSURANCE VALUES

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|---|---|---|
| 1  | 2,944.95  | 292,923.18 |
| 2  | 6,146.22  | 292,923.18 |
| 3  | 9,455.91  | 292,923.18 |
| 4  | 12,873.48 | 292,923.18 |
| 5  | 16,398.62 | 292,923.18 |
| 6  | 20,028.46 | 292,923.18 |
| 7  | 23,763.16 | 292,923.18 |
| 8  | 27,600.43 | 292,923.18 |
| 9  | 31,540.99 | 292,923.18 |
| 10 | 35,580.63 | 292,923.18 |
| 11 | 36,009.37 | 292,923.18 |
| 12 | 36,375.65 | 292,923.18 |
| 13 | 36,674.34 | 292,923.18 |
| 14 | 36,892.17 | 292,923.18 |
| 15 | 37,023.06 | 292,923.18 |
| 16 | 37,055.36 | 292,923.18 |
| 17 | 36,979.35 | 292,923.18 |
| 18 | 36,776.92 | 292,923.18 |
| 19 | 36,434.13 | 292,923.18 |
| 20 | 35,920.39 | 292,923.18 |
| 21 | 35,208.51 | 292,923.18 |
| 22 | 34,264.17 | 292,923.18 |
| 23 | 33,047.95 | 292,923.18 |
| 24 | 31,528.09 | 292,923.18 |
| 25 | 29,664.75 | 292,923.18 |
| 26 | 27,425.42 | 292,923.18 |
| 27 | 24,766.21 | 292,923.18 |
| 28 | 21,636.13 | 292,923.18 |
| 29 | 17,964.92 | 292,923.18 |
| 30 | 13,669.11 | 292,923.18 |
| 31 | 8,644.10  | 292,923.18 |
| 32 | 2,763.71  | 292,923.18 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 32L

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
LIFE INSURANCE COST INDICES
```

An explanation of the intended use of these indices is provided in The Life Insurance Buyer's Guide. These indices are useful only for the comparison of relative costs of two or more similar policies The cost indices do not reflect any optional benefits

|  | BASED ON GUARANTEED FACTORS | |
|---|---|---|
|  | 10 Year | 20 Year |
| SURRENDER COST INDEX @ 5% | 3.94 | 4.61 |
| NET PAYMENT COST INDEX @ 5% | 13.14 | 8.14 |

|  | BASED ON CURRENT FACTORS | |
|---|---|---|
|  | 10 Year | 20 Year |
| SURRENDER COST INDEX @ 5% | -1.14 | -4.39 |
| NET PAYMENT COST INDEX @ 5% | 13.14 | 8.14 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

Illustration Developed For:

Bozeman Amorey Stella
    666 Greenwich Street
    Apt 933
    New York, NY 10014

With regards to property located at:

62 Hillock Road
    Cannondale, CT 05555

By:

Bill Simpson
    Mortgage ProBrokers
    555 Wilton Way
    Wilton, CT 06894

The real estate agent representing you in the purchase:

Milly Jenner
    Chekov & Karney
    310 Wilton Way
    Wilton, CT 06894

---

INDIVIDUAL DATA FOR: Bozeman Amorey Stella

---

| | |
|---|---|
| Age: | 32 |
| Sex: | Male |
| Individual Tax Rate: | 34.00 % |

---

MORTGAGE ASSUMPTIONS FOR: HOMEOWNER'S BANK

---

The Ryan Mortgage:

| | | |
|---|---|---|
| Principal Amount: | 262,000.00 | |
| Down Payment: | 3,849.60 | |
| Initial Loan Balance: | 262,000.00 | |
| | | |
| Down Payment as % of Principal: | 1.47 % | |
| | | |
| Mortgage Interest Rate: | 10.50 % | Cap: 14.50 % |
| Mortgage Points (%): | 1.00 % | |
| Term of Mortgage (Years): | 30 * | |
| PMI Cost (%): | 0.00 % | |
| | | |
| Settlement Costs: | 4,000.00 | |
| | | |
| Closing Date: | 01-Mar-92 | |

Conventional Mortgage:

| | |
|---|---|
| Principal Amount: | 262,000.00 |
| Down Payment: | 13,100.00 |
| Initial Loan Balance: | 248,900.00 |
| | |
| Down Payment as % of Principal: | 5.00 % |
| | |
| Mortgage Interest Rate: | 10.50 % |
| Mortgage Points (%): | 1.00 % |
| Term of Mortgage (Years): | 30 |
| PMI Cost (%): | 0.50 % |
| | |
| Settlement Costs: | 4,000.00 |
| | |
| Closing Date: | 01-Mar-92 |

\* This is the initial mortgage term.

---

INSURANCE ASSUMPTIONS FOR: METRO LIFE INSURANCE CORPORATION

---

Current Rates:

| | |
|---|---|
| Mortality: | 1983 GAM |
|     Percent: | 100.00 % |
| Unloaned Credited Rate: | 9.50 % |
| Loan Charged Rate: | 9.50 % |
| Loan Credited Rate: | 9.50 % |

Guarantees:

| | |
|---|---|
| Mortality: | 1980 CSO |
|     Percent: | 100.00 % |
| Unloaned Credited Rate: | 4.00 % |

This illustration assumes life insurance premium payments will be guaranteed by:
Homeowner's Endorsement Plan Incorporated
3000 Ocean Street
Millvale, CT 01234
                    Contact: Pran Annana
Sponsor Number:    0001

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

IMPORTANT COMMENTS CONCERNING THE ATTACHED ILLUSTRATION

---

The information contained in the attached illustration is based on both assumptions furnished by the client for whom it is developed and the current assumptions of the mortgage and insurance plans chosen. Unless otherwise indicated, those rates assumed initially continue throughout the life of the illustration.

Conventional Mortgage assumptions for principal, mortgage interest rate, mortgage points (%) and settlement costs are the same as those assumed for The Ryan Mortgage. The down payment and initial loan balance are as stated on page 1 of this illustration.

Premium costs may change if the closing date differs from the one given. They may also change if any of the other assumptions used vary.

The mortgage illustrated is a variable rate mortgage. Mortgage and premium payments are subject to change with variations in interest rates.

Interest rates credited on unloaned policy values and the cost of insurance charges may vary after the first year. Interest rates charged on policy loans and credited on loaned policy values also may vary after the first year.

In the event interest rates go down, variable mortgage payments will go down; life insurance premiums may increase in both amount and number. If interest rates go up, variable mortgage payments may increase, but life insurance premium payments will not.

Some banks offer variable mortgage products which limit the rate of interest that can be charged. This provides a maximum allowable combined mortgage/insurance payment under The Ryan Mortgage Plan. Life insurance companies offer a guaranteed minimum interest rate at which cash values will grow. There is no limit on the interest that can be earned in a life insurance policy. Higher interest crediting rates may result in higher cash values, which may permit the homeowner to repay the mortgage sooner. Higher interest crediting rates may also result in higher death benefits, providing an additional benefit to the homeowner's estate.

The Ryan Mortgage Illustration System cannot approve loans or insurance applications. It can only forward loan and life insurance applications to participating financial services institutions and provide you information as to their response.

The attached illustration should not be construed as, and is not offered as, real estate, legal, tax or investment advice. Please consult your accountant, tax advisor or legal counselor prior to entering into any transaction.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33C

| THE RYAN MORTGAGE ILLUSTRATION SYSTEM |
|---|
| COMBINED ILLUSTRATION FOR THE PRODUCTS OF :<br>HOMEOWNER'S BANK<br>AND<br>METRO LIFE INSURANCE CORPORATION |

| ESTIMATED UPFRONT MORTGAGE AND OTHER ESCROW PAYMENT |
|---|

| The Ryan Mortgage: | | Conventional Mortgage: | |
|---|---|---|---|
| Settlement Costs | 4,000.00 | Settlement Costs | 4,000.00 |
| Mortgage Points | 2,620.00 | Mortgage Points | 2,489.00 |
| PMI Escrow | 0.00 | PMI Escrow | 1,244.50 |
| Down Payment | 3,849.60 * | Down Payment | 13,100.00 |
| *Total Closing Costs* | 10,469.60 | *Total Closing Costs* | 20,833.50 |

\* The down payment is used for paying an insurance premium.

| ESTIMATED AVERAGE FIRST YEAR MONTHLY PAYMENT |
|---|

| The Ryan Mortgage: | | Conventional Mortgage: | |
|---|---|---|---|
| Mortgage | 2,292.50 | Mortgage | 2,276.79 |
| Tax Escrow | 235.00 | Tax Escrow | 235.00 |
| PMI Escrow | 0.00 | PMI Escrow | 103.71 |
| Life Insurance | 320.80 | Life Insurance | 18.60 |
| | 2,848.30 | | 2,634.10 |
| LESS: | | LESS: | |
| Tax Deduction | 779.45 | Tax Deduction | 738.81 |
| *Net After-Tax Cost* | 2,068.85 | *Net After-Tax Cost* | 1,895.29 |

| ESTIMATED AVERAGE YEAR 10 MONTHLY PAYMENT |
|---|

| The Ryan Mortgage: | | Conventional Mortgage: | |
|---|---|---|---|
| Mortgage | 2,292.50 | Mortgage | 2,276.79 |
| Tax Escrow | 235.00 | Tax Escrow | 235.00 |
| PMI Escrow | 0.00 | PMI Escrow | 103.71 |
| Life Insurance | 0.00 | Life Insurance | 31.71 |
| | 2,527.50 | | 2,647.21 |
| LESS: | | LESS: | |
| Tax Deduction | 779.45 | Tax Deduction | 673.70 |
| *Net After-Tax Cost* | 1,748.05 | *Net After-Tax Cost* | 1,973.51 |

> The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.
>
> This illustration is based on these assumptions and is only valid with all pages attached.

Fig. 33D

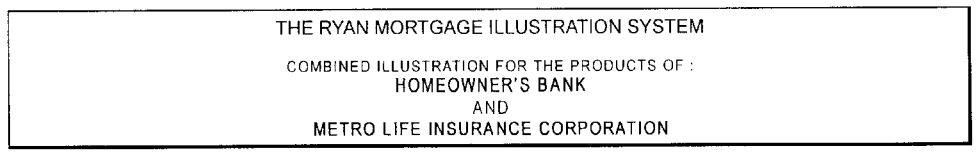

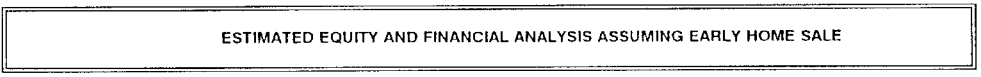

In the following computations, the home is assumed to be sold at the original purchase price. If it is sold for a higher price, the total equity after the sale will increase Mortgage Costs:

|  | Ryan Mortgage | Conventional Mortgage | Financial Benefit From Ryan Mortgage | Cumulative Financial Benefit |
|---|---|---|---|---|
| Total Closing Costs: * | 10,469.60 | 20,833.50 | 10,363.90 | 10,363.90 |
| Annual After-Tax Mortgage Cost: ** | | | | |
| Year 1: | 22,006.20 | 19,923.45 | (2,082.75) | 8,281.15 |
| Year 2 | 22,006.20 | 19,980.01 | (2,026.19) | 6,254.96 |
| Year 3 | 22,006.20 | 20,046.90 | (1,959.30) | 4,295.66 |
| Year 4 | 22,006.20 | 20,121.84 | (1,884.36) | 2,411.30 |
| Year 5 | 22,006.20 | 20,197.30 | (1,808.90) | 602.40 |
| Year 6 | 22,006.20 | 20,282.03 | (1,724.17) | (1,121.77) |
| Year 7 | 22,006.20 | 20,376.65 | (1,629.55) | (2,751.32) |
| Year 8 | 22,006.20 | 20,484.47 | (1,521.73) | (4,273.05) |
| Year 9 | 22,006.20 | 20,606.16 | (1,400.04) | (5,673.09) |
| Year 10: | 18,156.60 | 20,742.43 | 2,585.83 | (3,087.26) |

|  | Ryan Mortgage | Conventional Mortgage | Financial Benefit From Ryan Mortgage |
|---|---|---|---|
| Home Sale At The End of Year 5: | | | |
| End of Year Cash Value | 21,535.83 | 0.00 | 21,535.83 |
| Home Resale | 262,000.00 | 262,000.00 | 0.00 |
| Mortgage Balance | (262,000.00) | (241,138.55) | (20,861.45) |
| Total Equity After Sale | 21,535.83 | 20,861.45 | 674.38 |
| Total Closing Costs: * | 10,469.60 | 20,833.50 | 10,363.90 |
| After-Tax Mortgage Cost: ** | 110,031.00 | 100,269.51 | (9,761.50) |
| TOTAL 5 YEAR FINANCIAL BENEFIT: | | | 1,276.78 |
| Home Sale At The End of Year 10: | | | |
| End of Year Cash Value: | 55,253.39 | 0.00 | 55,253.39 |
| Home Resale | 262,000.00 | 262,000.00 | 0.00 |
| Mortgage Balance: | (262,000.00) | (228,048.07) | (33,951.93) |
| Total Equity After Sale | 55,253.39 | 33,951.93 | 21,301.46 |
| Total Closing Costs: * | 10,469.60 | 20,833.50 | 10,363.90 |
| After-Tax Mortgage Cost: ** | 216,212.40 | 202,761.24 | (13,451.16) |
| TOTAL 10 YEAR FINANCIAL BENEFIT: | | | 18,214.20 |

\* See top of page 3 for detailed breakdown.
\*\* These values include insurance. (See page 5 for detailed breakdown.)

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33E

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

ESTIMATED ANNUAL COST
(Does not include Property Taxes or Hazard Insurance)

The Ryan Mortgage:  Conventional Mortgage:

| Year | Mortgage | Life Insurance | Interest Tax Deduction | Total After Taxes | Year | Mortgage | PMI plus Life Insurance | Interest Tax Deduction | Total After Taxes |
|---|---|---|---|---|---|---|---|---|---|
| 1 | 27,510.00 | 3,849.60 | 9,353.40 | 22,006.20 | 1 | 27,321.48 | 1,467.70 | 8,865.73 | 19,923.45 |
| 2 | 27,510.00 | 3,849.60 | 9,353.40 | 22,006.20 | 2 | 27,321.48 | 1,477.59 | 8,819.05 | 19,980.01 |
| 3 | 27,510.00 | 3,849.60 | 9,353.40 | 22,006.20 | 3 | 27,321.48 | 1,492.66 | 8,767.23 | 20,046.90 |
| 4 | 27,510.00 | 3,849.60 | 9,353.40 | 22,006.20 | 4 | 27,321.48 | 1,510.06 | 8,709.70 | 20,121.84 |
| 5 | 27,510.00 | 3,849.60 | 9,353.40 | 22,006.20 | 5 | 27,321.48 | 1,521.65 | 8,645.83 | 20,197.30 |
|   | 137,550.00 | 19,248.00 | 46,767.00 | 110,031.00 |   | 136,607.40 | 7,469.66 | 43,807.54 | 100,269.51 |
| 6 | 27,510.00 | 3,849.60 | 9,353.40 | 22,006.20 | 6 | 27,321.48 | 1,535.46 | 8,574.92 | 20,282.03 |
| 7 | 27,510.00 | 3,849.60 | 9,353.40 | 22,006.20 | 7 | 27,321.48 | 1,551.36 | 8,496.19 | 20,376.65 |
| 8 | 27,510.00 | 3,849.60 | 9,353.40 | 22,006.20 | 8 | 27,321.48 | 1,571.78 | 8,408.79 | 20,484.47 |
| 9 | 27,510.00 | 3,849.60 | 9,353.40 | 22,006.20 | 9 | 27,321.48 | 1,596.43 | 8,311.75 | 20,606.16 |
| 10 | 27,510.00 | 0.00 | 9,353.40 | 18,156.60 | 10 | 27,321.48 | 1,624.97 | 8,204.03 | 20,742.43 |
|   | 275,100.00 | 34,646.40 | 93,534.00 | 216,212.40 |   | 273,214.80 | 15,349.66 | 85,803.22 | 202,761.24 |
| 11 | 27,510.00 | 0.00 | 9,353.40 | 18,156.60 | 11 | 27,321.48 | 1,659.49 | 8,084.43 | 20,896.54 |
| 12 | 27,510.00 | 0.00 | 9,353.40 | 18,156.60 | 12 | 27,321.48 | 1,696.92 | 7,951.65 | 21,066.75 |
| 13 | 27,510.00 | 0.00 | 9,353.40 | 18,156.60 | 13 | 27,321.48 | 1,741.47 | 7,804.23 | 21,258.71 |
| 14 | 27,510.00 | 0.00 | 9,353.40 | 18,156.60 | 14 | 27,321.48 | 1,789.78 | 7,640.58 | 21,470.68 |
| 15 | 27,510.00 | 0.00 | 9,353.40 | 18,156.60 | 15 | 27,321.48 | 598.61 | 7,458.88 | 20,461.20 |
|   | 412,650.00 | 34,646.40 | 140,301.00 | 306,995.40 |   | 409,822.20 | 22,835.92 | 124,742.98 | 307,915.14 |
| 16 | 27,510.00 | 0.00 | 9,353.40 | 18,156.60 | 16 | 27,321.48 | 653.31 | 7,257.17 | 20,717.63 |
| 17 | 27,510.00 | 0.00 | 9,353.40 | 18,156.60 | 17 | 27,321.48 | 707.94 | 7,033.22 | 20,996.20 |
| 18 | 27,510.00 | 0.00 | 9,353.40 | 18,156.60 | 18 | 27,321.48 | 758.70 | 6,784.59 | 21,295.58 |
| 19 | 27,510.00 | 0.00 | 9,353.40 | 18,156.60 | 19 | 27,321.48 | 805.83 | 6,508.57 | 21,618.74 |
| 20 | 27,510.00 | 0.00 | 9,353.40 | 18,156.60 | 20 | 27,321.48 | 843.25 | 6,202.12 | 21,962.61 |
|   | 550,200.00 | 34,646.40 | 187,068.00 | 397,778.40 |   | 546,429.60 | 26,604.94 | 158,528.65 | 414,505.89 |
| 21 | 27,510.00 | 0.00 | 9,353.40 | 18,156.60 | 21 | 27,321.48 | 872.42 | 5,861.90 | 22,332.00 |
| 22 | 27,510.00 | 0.00 | 9,353.40 | 18,156.60 | 22 | 27,321.48 | 885.32 | 5,484.20 | 22,722.61 |
| 23 | 27,510.00 | 0.00 | 9,353.40 | 18,156.60 | 23 | 27,321.48 | 882.56 | 5,064.86 | 23,139.17 |
| 24 | 27,510.00 | 0.00 | 9,353.40 | 18,156.60 | 24 | 27,321.48 | 859.12 | 4,599.31 | 23,581.29 |
| 25 | 27,510.00 | 0.00 | 9,353.40 | 18,156.60 | 25 | 27,321.48 | 812.49 | 4,082.46 | 24,051.50 |
|   | 687,750.00 | 34,646.40 | 233,835.00 | 488,561.40 |   | 683,037.00 | 30,916.85 | 183,621.39 | 530,332.46 |
| 26 | 27,510.00 | 0.00 | 9,353.40 | 18,156.60 | 26 | 27,321.48 | 738.81 | 3,508.65 | 24,551.63 |
| 27 | 27,510.00 | 0.00 | 9,353.40 | 18,156.60 | 27 | 27,321.48 | 634.20 | 2,871.61 | 25,084.08 |
| 28 | 27,510.00 | 0.00 | 9,353.40 | 18,156.60 | 28 | 27,321.48 | 490.45 | 2,164.36 | 25,647.58 |
| 29 | 27,510.00 | 0.00 | 9,353.40 | 18,156.60 | 29 | 27,321.48 | 296.21 | 1,379.17 | 26,238.53 |
| 30 | 27,510.00 | 0.00 | 9,353.40 | 18,156.60 | 30 | 27,321.48 | 33.33 | 507.44 | 26,847.37 |
|   | 825,300.00 | 34,646.40 | 280,602.00 | 579,344.40 |   | 819,644.40 | 33,109.86 | 194,052.62 | 658,701.64 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33F

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED REMAINING MORTGAGE OBLIGATION
ASSUMING MORTGAGE IS PAID OFF WITH INSURANCE POLICY CASH SURRENDER VALUE
```

Life Insurance has certain tax advantages. Under current law, cash value accumulation inside the policy is tax free. However, if you surrender the policy in order to pay off your mortgage obligation, you will have to pay taxes on that amount by which your policy's cash value exceeds the cumulative amount of premiums you have paid.

The Ryan Mortgage:

| Year | Life Insurance Cash Value | Tax Owed On Surrender | Net Policy Proceeds | End of Year Mortgage Principal | End of Year Net Mortgage Obligation * |
|---|---|---|---|---|---|
| 1 | 3,459.99 | 0.00 | 3,459.99 | 262,000.00 | 258,540.01 |
| 2 | 7,403.67 | 0.00 | 7,403.67 | 262,000.00 | 254,596.33 |
| 3 | 11,707.46 | 53.94 | 11,653.51 | 262,000.00 | 250,346.49 |
| 4 | 16,403.50 | 341.73 | 16,061.77 | 262,000.00 | 245,938.23 |
| 5 | 21,535.83 | 777.86 | 20,757.97 | 262,000.00 | 241,242.03 |
| 6 | 27,144.06 | 1,375.80 | 25,768.27 | 262,000.00 | 236,231.73 |
| 7 | 33,271.89 | 2,150.40 | 31,121.50 | 262,000.00 | 230,878.50 |
| 8 | 39,964.84 | 3,117.13 | 36,847.70 | 262,000.00 | 225,152.30 |
| 9 | 47,273.35 | 4,293.16 | 42,980.18 | 262,000.00 | 219,019.82 |
| 10 | 55,253.39 | 5,697.51 | 49,555.88 | 262,000.00 | 212,444.12 |
| 11 | 60,059.54 | 7,331.60 | 52,727.94 | 262,000.00 | 209,272.06 |
| 12 | 65,286.85 | 9,108.89 | 56,177.96 | 262,000.00 | 205,822.04 |
| 13 | 70,968.68 | 11,040.71 | 59,927.97 | 262,000.00 | 202,072.03 |
| 14 | 77,144.88 | 13,140.62 | 64,004.26 | 262,000.00 | 197,995.74 |
| 15 | 83,857.92 | 15,423.05 | 68,434.87 | 262,000.00 | 193,565.13 |
| 16 | 91,157.88 | 17,905.04 | 73,252.84 | 262,000.00 | 188,747.16 |
| 17 | 99,100.97 | 20,605.69 | 78,495.28 | 262,000.00 | 183,504.72 |
| 18 | 107,752.36 | 23,547.16 | 84,205.20 | 262,000.00 | 177,794.80 |
| 19 | 117,183.09 | 26,753.61 | 90,429.48 | 262,000.00 | 171,570.52 |
| 20 | 127,476.67 | 30,253.43 | 97,223.24 | 262,000.00 | 164,776.76 |
| 21 | 138,722.98 | 34,077.17 | 104,645.81 | 262,000.00 | 157,354.19 |
| 22 | 151,027.90 | 38,260.85 | 112,767.05 | 262,000.00 | 149,232.95 |
| 23 | 164,506.58 | 42,843.60 | 121,662.98 | 262,000.00 | 140,337.02 |
| 24 | 179,289.57 | 47,869.81 | 131,419.76 | 262,000.00 | 130,580.24 |
| 25 | 195,521.96 | 53,388.83 | 142,133.13 | 262,000.00 | 119,866.87 |
| 26 | 213,352.50 | 59,451.21 | 153,901.29 | 262,000.00 | 108,098.71 |
| 27 | 232,870.60 | 66,087.37 | 166,783.24 | 262,000.00 | 95,216.76 |
| 28 | 254,201.71 | 73,339.94 | 180,861.77 | 262,000.00 | 81,138.23 |
| 29 | 277,520.83 | 81,268.44 | 196,252.39 | 262,000.00 | 65,747.61 |
| 30 | 302,964.20 | 89,919.19 | 213,045.01 | 262,000.00 | 48,954.99 |

Conventional Mortgage:

| Year | Life Insurance Cash Value | Net Policy Proceeds | End of Year Mortgage Principal |
|---|---|---|---|
| 1 | 0.00 | 0.00 | 247,654.25 |
| 2 | 0.00 | 0.00 | 246,271.21 |
| 3 | 0.00 | 0.00 | 244,735.75 |
| 4 | 0.00 | 0.00 | 243,031.08 |
| 5 | 0.00 | 0.00 | 241,138.55 |
| 6 | 0.00 | 0.00 | 239,037.46 |
| 7 | 0.00 | 0.00 | 236,704.82 |
| 8 | 0.00 | 0.00 | 234,115.12 |
| 9 | 0.00 | 0.00 | 231,240.02 |
| 10 | 0.00 | 0.00 | 228,048.07 |
| 11 | 0.00 | 0.00 | 224,504.37 |
| 12 | 0.00 | 0.00 | 220,570.13 |
| 13 | 0.00 | 0.00 | 216,202.33 |
| 14 | 0.00 | 0.00 | 211,353.18 |
| 15 | 0.00 | 0.00 | 205,969.63 |
| 16 | 0.00 | 0.00 | 199,992.80 |
| 17 | 0.00 | 0.00 | 193,357.31 |
| 18 | 0.00 | 0.00 | 185,990.56 |
| 19 | 0.00 | 0.00 | 177,811.97 |
| 20 | 0.00 | 0.00 | 168,732.07 |
| 21 | 0.00 | 0.00 | 158,651.53 |
| 22 | 0.00 | 0.00 | 147,460.09 |
| 23 | 0.00 | 0.00 | 135,035.30 |
| 24 | 0.00 | 0.00 | 121,241.27 |
| 25 | 0.00 | 0.00 | 105,927.08 |
| 26 | 0.00 | 0.00 | 88,925.22 |
| 27 | 0.00 | 0.00 | 70,049.69 |
| 28 | 0.00 | 0.00 | 49,094.02 |
| 29 | 0.00 | 0.00 | 25,828.95 |
| 30 | 0.00 | 0.00 | (0.00) |

* A negative obligation indicates death benefits in excess of the mortgage obligation, payable to policyholder's estate

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 33G

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED REMAINING MORTGAGE OBLIGATION
ASSUMING MORTGAGE IS PAID OFF WITH DEATH PROCEEDS
```

Life Insurance has certain tax advantages Under current law, cash value accumulation inside the policy is tax free. In addition, any death benefits paid out by the policy will be tax free. However, if you surrender the policy in order to pay off your mortgage obligation, you will have to pay taxes on that amount by which your policy's cash value exceeds the cumulative amount of premiums you have paid The Ryan Mortgage:

Conventional Mortgage:

| Year | Life Insurance Death Benefit | End of Year Mortgage Principal | Net Death Proceeds | | Year | Life Insurance Death Benefit | End of Year Mortgage Principal | Net Death Proceeds |
|---|---|---|---|---|---|---|---|---|
| 1 | 292,923.18 | 262,000.00 | 30,923.18 | | 1 | 247,654.25 | 247,654.25 | 0.00 |
| 2 | 292,923.18 | 262,000.00 | 30,923.18 | | 2 | 246,271.21 | 246,271.21 | 0.00 |
| 3 | 292,923.18 | 262,000.00 | 30,923.18 | | 3 | 244,735.75 | 244,735.75 | 0.00 |
| 4 | 292,923.18 | 262,000.00 | 30,923.18 | | 4 | 243,031.08 | 243,031.08 | 0.00 |
| 5 | 292,923.18 | 262,000.00 | 30,923.18 | | 5 | 241,138.55 | 241,138.55 | 0.00 |
| 6 | 292,923.18 | 262,000.00 | 30,923.18 | | 6 | 239,037.46 | 239,037.46 | 0.00 |
| 7 | 292,923.18 | 262,000.00 | 30,923.18 | | 7 | 236,704.82 | 236,704.82 | 0.00 |
| 8 | 292,923.18 | 262,000.00 | 30,923.18 | | 8 | 234,115.12 | 234,115.12 | 0.00 |
| 9 | 292,923.18 | 262,000.00 | 30,923.18 | | 9 | 231,240.02 | 231,240.02 | 0.00 |
| 10 | 292,923.18 | 262,000.00 | 30,923.18 | | 10 | 228,048.07 | 228,048.07 | 0.00 |
| 11 | 292,923.18 | 262,000.00 | 30,923.18 | | 11 | 224,504.37 | 224,504.37 | 0.00 |
| 12 | 292,923.18 | 262,000.00 | 30,923.18 | | 12 | 220,570.13 | 220,570.13 | 0.00 |
| 13 | 292,923.18 | 262,000.00 | 30,923.18 | | 13 | 216,202.33 | 216,202.33 | 0.00 |
| 14 | 292,923.18 | 262,000.00 | 30,923.18 | | 14 | 211,353.18 | 211,353.18 | 0.00 |
| 15 | 292,923.18 | 262,000.00 | 30,923.18 | | 15 | 205,969.63 | 205,969.63 | 0.00 |
| 16 | 292,923.18 | 262,000.00 | 30,923.18 | | 16 | 199,992.80 | 199,992.80 | 0.00 |
| 17 | 292,923.18 | 262,000.00 | 30,923.18 | | 17 | 193,357.31 | 193,357.31 | 0.00 |
| 18 | 292,923.18 | 262,000.00 | 30,923.18 | | 18 | 185,990.56 | 185,990.56 | 0.00 |
| 19 | 292,923.18 | 262,000.00 | 30,923.18 | | 19 | 177,811.97 | 177,811.97 | 0.00 |
| 20 | 292,923.18 | 262,000.00 | 30,923.18 | | 20 | 168,732.07 | 168,732.07 | 0.00 |
| 21 | 292,923.18 | 262,000.00 | 30,923.18 | | 21 | 158,651.53 | 158,651.53 | 0.00 |
| 22 | 292,923.18 | 262,000.00 | 30,923.18 | | 22 | 147,460.09 | 147,460.09 | 0.00 |
| 23 | 292,923.18 | 262,000.00 | 30,923.18 | | 23 | 135,035.30 | 135,035.30 | 0.00 |
| 24 | 292,923.18 | 262,000.00 | 30,923.18 | | 24 | 121,241.27 | 121,241.27 | 0.00 |
| 25 | 292,923.18 | 262,000.00 | 30,923.18 | | 25 | 105,927.08 | 105,927.08 | 0.00 |
| 26 | 302,960.54 | 262,000.00 | 40,960.54 | | 26 | 88,925.22 | 88,925.22 | 0.00 |
| 27 | 321,361.43 | 262,000.00 | 59,361.43 | | 27 | 70,049.69 | 70,049.69 | 0.00 |
| 28 | 340,630.30 | 262,000.00 | 78,630.30 | | 28 | 49,094.02 | 49,094.02 | 0.00 |
| 29 | 360,777.08 | 262,000.00 | 98,777.08 | | 29 | 25,828.95 | 25,828.95 | 0.00 |
| 30 | 387,794.17 | 262,000.00 | 125,794.17 | | 30 | (0.00) | (0.00) | 0.00 |

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 33H

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

---

EFFECTS OF CHANGES IN INTEREST RATES ON MONTHLY RYAN PAYMENTS

As noted on page 2 of this illustration, in the event interest rates go down, variable mortgage payments will go down; life insurance premiums may increase in both amount and number. If interest rates go up, variable mortgage payments may increase, but life insurance premium payments will not.

Set out below are the effects of these changes on The Ryan Mortgage monthly payment, assuming rates change in year 2 and remain at that level through year 30. Scheduled life insurance premiums begin in year 1.

| | | |
|---|---|---|
| Original Ryan Mortgage (Interest) Payment: | 2,292.50 | Original Scheduled Life Insurance Premium: 320.80 |
| Original Ryan After-Tax Mortgage Payment: | 1,513.05 | Number of Years of Premium Payments: 10 |

| | | | | |
|---|---|---|---|---|
| Interest Crediting Rate (beginning in year 2): | 4.00 % | | Interest Crediting Rate (beginning in year 2): | 13.50 % |
| Mortgage Interest Rate (beginning in year 2): | 5.00 % | | Mortgage Interest Rate (beginning in year 2): | 14.50 % |

| Year | Scheduled + Incremental LI Premium | Adjusted Mortgage Payment | After-Tax Combined Cost | End of Year Insurance Cash Value | Year | Scheduled + Incremental LI Premium | Adjusted Mortgage Payment | After-Tax Combined Cost | End of Year Insurance Cash Value |
|---|---|---|---|---|---|---|---|---|---|
| 1 | 320.80 | 2,292.50 | 1,833.85 | 3,459.99 | 1 | 320.80 | 2,292.50 | 1,833.85 | 3,459.99 |
| 2 | 354.75 | 1,091.67 | 1,075.25 | 7,403.67 | 2 | 320.80 | 3,165.83 | 2,410.25 | 7,677.84 |
| 3 | 374.27 | 1,091.67 | 1,094.77 | 11,707.46 | 3 | 320.80 | 3,165.83 | 2,410.25 | 12,450.57 |
| 4 | 395.56 | 1,091.67 | 1,116.06 | 16,403.50 | 4 | 320.80 | 3,165.83 | 2,410.25 | 17,851.25 |
| 5 | 418.82 | 1,091.67 | 1,139.32 | 21,535.83 | 5 | 320.80 | 3,165.83 | 2,410.25 | 23,971.85 |
| 6 | 444.23 | 1,091.67 | 1,164.73 | 27,144.06 | 6 | 320.80 | 3,165.83 | 2,410.25 | 30,908.13 |
| 7 | 472.00 | 1,091.67 | 1,192.50 | 33,271.89 | 7 | 320.80 | 3,165.83 | 2,410.25 | 38,769.25 |
| 8 | 502.34 | 1,091.67 | 1,222.84 | 39,964.84 | 8 | 320.80 | 3,165.83 | 2,410.25 | 47,677.05 |
| 9 | 535.48 | 1,091.67 | 1,255.98 | 47,273.35 | 9 | 320.80 | 3,165.83 | 2,410.25 | 57,770.75 |
| 10 | 250.88 | 1,091.67 | 971.38 | 55,253.39 | 10 | 0.00 | 3,165.83 | 2,089.45 | 69,209.65 |
| 11 | 272.72 | 1,091.67 | 993.22 | 60,059.54 | 11 | 0.00 | 3,165.83 | 2,089.45 | 78,125.88 |
| 12 | 296.49 | 1,091.67 | 1,016.99 | 65,286.85 | 12 | 0.00 | 3,165.83 | 2,089.45 | 88,220.86 |
| 13 | 322.34 | 1,091.67 | 1,042.84 | 70,968.68 | 13 | 0.00 | 3,165.83 | 2,089.45 | 99,651.35 |
| 14 | 350.44 | 1,091.67 | 1,070.94 | 77,144.88 | 14 | 0.00 | 3,165.83 | 2,089.45 | 112,599.93 |
| 15 | 381.00 | 1,091.67 | 1,101.50 | 83,857.92 | 15 | 0.00 | 3,165.83 | 2,089.45 | 127,274.82 |
| 16 | 414.23 | 1,091.67 | 1,134.73 | 91,157.88 | 16 | 0.00 | 3,165.83 | 2,089.45 | 143,917.92 |
| 17 | 450.39 | 1,091.67 | 1,170.89 | 99,100.97 | 17 | 0.00 | 3,165.83 | 2,089.45 | 162,777.02 |
| 18 | 489.77 | 1,091.67 | 1,210.27 | 107,752.36 | 18 | 0.00 | 3,165.83 | 2,089.45 | 184,094.61 |
| 19 | 532.69 | 1,091.67 | 1,253.19 | 117,183.09 | 19 | 0.00 | 3,165.83 | 2,089.45 | 208,185.91 |
| 20 | 579.52 | 1,091.67 | 1,300.02 | 127,476.67 | 20 | 0.00 | 3,165.83 | 2,089.45 | 235,427.87 |
| 21 | 630.69 | 1,091.67 | 1,351.19 | 138,722.98 | 21 | 0.00 | 3,165.83 | 2,089.45 | 266,240.74 |
| 22 | 686.64 | 1,091.67 | 1,407.14 | 151,027.90 | 22 | 0.00 | 3,165.83 | 2,089.45 | 301,110.80 |
| 23 | 747.92 | 1,091.67 | 1,468.42 | 164,506.58 | 23 | 0.00 | 3,165.83 | 2,089.45 | 340,591.40 |
| 24 | 815.11 | 1,091.67 | 1,535.61 | 179,289.57 | 24 | 0.00 | 3,165.83 | 2,089.45 | 385,319.56 * |
| 25 | 888.87 | 1,091.67 | 1,609.37 | 195,521.96 | 25 | 0.00 | 3,165.83 | 2,089.45 | 435,939.15 * |
| 26 | 968.73 | 1,091.67 | 1,689.23 | 213,352.50 | 26 | 0.00 | 3,165.83 | 2,089.45 | 493,240.42 * |
| 27 | 1,053.76 | 1,091.67 | 1,774.26 | 232,870.60 | 27 | 0.00 | 3,165.83 | 2,089.45 | 558,118.82 * |
| 28 | 1,150.28 | 1,091.67 | 1,870.78 | 254,201.71 | 28 | 0.00 | 3,165.83 | 2,089.45 | 631,593.18 * |
| 29 | 1,255.80 | 1,091.67 | 1,976.30 | 277,520.83 | 29 | 0.00 | 3,165.83 | 2,089.45 | 714,821.40 * |
| 30 | 1,370.94 | 1,091.67 | 2,091.44 | 302,964.20 * | 30 | 0.00 | 3,165.83 | 2,089.45 | 808,970.08 * |

\* If the insurance policy is surrendered, the after-tax proceeds will pay off the mortgage principal.

\* If the insurance policy is surrendered, the after-tax proceeds will pay off the mortgage principal.

---

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33l

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

**ESTIMATED POLICY VALUES FOR POLICY YEAR 31 THROUGH AGE 99
ASSUMING INSURANCE POLICY IS KEPT AFTER YEAR 30**

The Ryan Mortgage Illustration shows an option whereby the mortgage is extended and annual policy loans are taken to pay the annual after-tax mortgage cost. One benefit of this option is that the life insurance coverage continues. The annual loan is increased by the amount needed to pay the annual policy loan interest due.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 31 | 330,720.66 | 18,156.60 | 18,156.60 | 1,724.88 | 310,839.19 | 416,708.03 | 396,826.56 |
| 32 | 360,997.12 | 19,881.48 | 38,038.08 | 3,613.62 | 319,345.43 | 447,636.43 | 405,984.74 |
| 33 | 394,020.45 | 21,770.22 | 59,808.29 | 5,681.79 | 328,530.37 | 480,704.95 | 415,214.86 |
| 34 | 430,041.80 | 23,838.39 | 83,646.68 | 7,946.43 | 338,448.68 | 516,050.16 | 424,457.05 |
| 35 | 469,257.51 | 26,103.03 | 109,749.72 | 10,426.22 | 349,081.57 | 558,416.44 | 438,240.50 |
| 36 | 511,940.17 | 28,582.82 | 138,332.54 | 13,141.59 | 360,466.03 | 604,089.40 | 452,615.26 |
| 37 | 558,390.31 | 31,298.19 | 169,630.73 | 16,114.92 | 372,644.66 | 653,316.66 | 467,571.01 |
| 38 | 608,943.21 | 34,271.52 | 203,902.25 | 19,370.71 | 385,670.25 | 706,374.13 | 483,101.16 |
| 39 | 663,972.77 | 37,527.31 | 241,429.56 | 22,935.81 | 399,607.39 | 763,568.68 | 499,203.31 |
| 40 | 724,114.10 | 41,092.41 | 282,521.97 | 26,839.59 | 414,752.53 | 818,248.93 | 508,887.37 |
| 41 | 789,925.76 | 44,996.19 | 327,518.16 | 31,114.23 | 431,293.38 | 876,817.60 | 518,185.21 |
| 42 | 862,043.38 | 49,270.83 | 376,788.99 | 35,794.95 | 449,459.44 | 939,627.28 | 527,043.34 |
| 43 | 941,197.66 | 53,951.55 | 430,740.54 | 40,920.35 | 469,536.77 | 1,007,081.50 | 535,420.60 |
| 44 | 1,028,241.41 | 59,076.95 | 489,817.49 | 46,532.66 | 491,891.26 | 1,079,653.48 | 543,303.33 |
| 45 | 1,123,070.02 | 64,689.26 | 554,506.75 | 52,678.14 | 515,885.12 | 1,179,223.52 | 572,038.62 |
| 46 | 1,226,317.89 | 70,834.74 | 625,341.49 | 59,407.44 | 541,568.95 | 1,287,633.78 | 602,884.85 |
| 47 | 1,338,663.49 | 77,564.04 | 702,905.54 | 66,776.03 | 568,981.93 | 1,405,596.66 | 635,915.10 |
| 48 | 1,460,830.93 | 84,932.63 | 787,838.16 | 74,844.63 | 598,148.14 | 1,533,872.48 | 671,189.69 |
| 49 | 1,593,593.63 | 93,001.23 | 880,839.39 | 83,679.74 | 629,074.51 | 1,673,273.32 | 708,754.19 |
| 50 | 1,737,775.37 | 101,836.34 | 982,675.73 | 93,354.19 | 661,745.45 | 1,824,664.14 | 748,634.22 |
| 51 | 1,894,254.34 | 111,510.79 | 1,094,186.52 | 103,947.72 | 696,120.10 | 1,988,967.06 | 790,832.81 |
| 52 | 2,063,968.31 | 122,104.32 | 1,216,290.84 | 115,547.63 | 732,129.84 | 2,167,166.73 | 835,328.26 |
| 53 | 2,247,918.81 | 133,704.23 | 1,349,995.07 | 128,249.53 | 769,674.21 | 2,360,314.75 | 882,070.15 |
| 54 | 2,447,173.31 | 146,406.13 | 1,496,401.21 | 142,158.11 | 808,613.98 | 2,569,531.97 | 930,972.65 |
| 55 | 2,662,827.15 | 160,314.71 | 1,656,715.92 | 157,388.01 | 848,723.21 | 2,795,968.50 | 981,864.57 |
| 56 | 2,896,054.53 | 175,544.61 | 1,832,260.53 | 174,064.75 | 889,729.24 | 3,040,857.25 | 1,034,531.97 |
| 57 | 3,148,070.41 | 192,221.35 | 2,024,481.88 | 192,325.78 | 931,262.75 | 3,305,473.93 | 1,088,666.27 |
| 58 | 3,420,128.78 | 210,482.38 | 2,234,964.26 | 212,321.60 | 972,842.91 | 3,591,135.22 | 1,143,849.35 |
| 59 | 3,713,518.08 | 230,478.20 | 2,465,442.47 | 234,217.03 | 1,013,858.58 | 3,899,193.98 | 1,199,534.48 |
| 60 | 4,036,911.26 | 252,373.63 | 2,717,816.10 | 258,192.53 | 1,060,902.63 | 4,198,387.72 | 1,222,379.08 |
| 61 | 4,394,755.98 | 276,349.13 | 2,994,165.23 | 284,445.70 | 1,116,145.05 | 4,526,598.65 | 1,247,987.73 |
| 62 | 4,792,354.98 | 302,602.30 | 3,296,767.53 | 313,192.92 | 1,182,394.54 | 4,888,202.08 | 1,278,241.63 |
| 63 | 5,235,928.93 | 331,349.52 | 3,628,117.04 | 344,671.12 | 1,263,140.77 | 5,288,288.22 | 1,315,500.06 |
| 64 | 5,733,276.48 | 362,827.72 | 3,990,944.76 | 379,139.75 | 1,363,191.96 | 5,733,276.48 | 1,363,191.96 |
| 65 | 6,277,872.05 | 397,296.35 | 4,388,241.12 | 416,882.91 | 1,472,748.02 | 6,277,872.05 | 1,472,748.02 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33J

```
THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION
```

```
ESTIMATED POLICY VALUES FOR POLICY YEAR 31 THROUGH AGE 99
ASSUMING INSURANCE POLICY IS KEPT AFTER YEAR 30
```

The Ryan Mortgage Illustration shows an option whereby the mortgage is extended and annual policy loans are taken to pay the annual after-tax mortgage cost. One benefit of this option is that the life insurance coverage continues. The annual loan is increased by the amount needed to pay the annual policy loan interest due.

The estimated annual end of year life insurance policy values along with the life insurance death benefit are:

| Year | End of Year Life Insurance Cash Value | Annual Loan | Cumulative Loan Balance | Loan Interest Due | End of Year Net Insurance Cash Value | End of Year Death Benefit | End of Year Net Death Benefit |
|---|---|---|---|---|---|---|---|
| 66 | 6,874,204.19 | 435,039.51 | 4,823,280.62 | 458,211.66 | 1,592,711.91 | 6,874,204.19 | 1,592,711.91 |
| 67 | 7,527,187.89 | 476,368.26 | 5,299,648.88 | 503,466.64 | 1,724,072.36 | 7,527,187.89 | 1,724,072.36 |
| 68 | 8,242,205.04 | 521,623.24 | 5,821,272.12 | 553,020.85 | 1,867,912.06 | 8,242,205.04 | 1,867,912.06 |

```
The data shown is based on both assumptions furnished by the client for whom it is developed and the current assumptions
of the mortgage and insurance plans chosen, as well as current law concerning taxation and allowable tax deductions. These
assumptions are shown on pages 1 and 2 of this illustration.

This illustration is based on these assumptions and is only valid with all pages attached.
```

Fig. 33K

```
THE RYAN MORTGAGE ILLUSTRATION SYSTEM

COMBINED ILLUSTRATION FOR THE PRODUCTS OF :
            HOMEOWNER'S BANK
                    AND
        METRO LIFE INSURANCE CORPORATION
```

```
                GUARANTEED LIFE INSURANCE VALUES
```

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued

| Year | End of Year Cash Value | End of Year Death Benefit |
|---|---|---|
| 1 | 2,944.95 | 292,923.18 |
| 2 | 6,146.22 | 292,923.18 |
| 3 | 9,455.91 | 292,923.18 |
| 4 | 12,873.48 | 292,923.18 |
| 5 | 16,398.62 | 292,923.18 |
| 6 | 20,028.46 | 292,923.18 |
| 7 | 23,763.16 | 292,923.18 |
| 8 | 27,600.43 | 292,923.18 |
| 9 | 31,540.99 | 292,923.18 |
| 10 | 35,580.63 | 292,923.18 |
| 11 | 36,009.37 | 292,923.18 |
| 12 | 36,375.65 | 292,923.18 |
| 13 | 36,674.34 | 292,923.18 |
| 14 | 36,892.17 | 292,923.18 |
| 15 | 37,023.06 | 292,923.18 |
| 16 | 37,055.36 | 292,923.18 |
| 17 | 36,979.35 | 292,923.18 |
| 18 | 36,776.92 | 292,923.18 |
| 19 | 36,434.13 | 292,923.18 |
| 20 | 35,920.39 | 292,923.18 |
| 21 | 35,208.51 | 292,923.18 |
| 22 | 34,264.17 | 292,923.18 |
| 23 | 33,047.95 | 292,923.18 |
| 24 | 31,528.09 | 292,923.18 |
| 25 | 29,664.75 | 292,923.18 |
| 26 | 27,425.42 | 292,923.18 |
| 27 | 24,766.21 | 292,923.18 |
| 28 | 21,636.13 | 292,923.18 |
| 29 | 17,964.92 | 292,923.18 |
| 30 | 13,669.11 | 292,923.18 |
| 31 | 8,644.10 | 292,923.18 |
| 32 | 2,763.71 | 292,923.18 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 33L

THE RYAN MORTGAGE ILLUSTRATION SYSTEM

COMBINED ILLUSTRATION FOR THE PRODUCTS OF :
HOMEOWNER'S BANK
AND
METRO LIFE INSURANCE CORPORATION

LIFE INSURANCE COST INDICES

An explanation of the intended use of these indices is provided in The Life Insurance Buyer's Guide. These indices are useful only for the comparison of relative costs of two or more similar policies.

The cost indices do not reflect any optional benefits.

|  | BASED ON GUARANTEED FACTORS | |
|---|---|---|
|  | 10 Year | 20 Year |
| SURRENDER COST INDEX @ 5% | 3.94 | 4.61 |
| NET PAYMENT COST INDEX @ 5% | 13.14 | 8.14 |

|  | BASED ON CURRENT FACTORS | |
|---|---|---|
|  | 10 Year | 20 Year |
| SURRENDER COST INDEX @ 5% | -1.14 | -4.39 |
| NET PAYMENT COST INDEX @ 5% | 13.14 | 8.14 |

The data shown is based on both assumptions furnished by the client for whom it is developed and the current assumptions of the mortgage and insurance plans chosen, as well as current law concerning taxation and allowable tax deductions. These assumptions are shown on pages 1 and 2 of this illustration.

This illustration is based on these assumptions and is only valid with all pages attached.

Fig. 34A

Metro Life Insurance Corporation Application For
Anytown, USA                    Life Insurance   Part 1   F000-0  N° 000000

All information requested below pertains to the proposed insured unless stated otherwise.

1. a) Name _Bozeman Amorey Stella_           b) Sex ■ M ☐ F   c) SS# _123-45-6798_
   d) Use unisex rates? ☐ Yes ■ No           e) Married? ☐ Yes ■ No
   f) U.S. citizen? ■ Yes ☐ No      g) Place of Birth _____ _____    h) Date of Birth ___12/05/59___
                                              (City)     (State)                        Month Day Year
2. a) Residence _666 Greenwich St. Apt. 933 N.Y._   _Manhattan_   _NY_   _10014_
      (No. and Street)            (City)             (County)    (State)  (Zip Code)
   b) Business _3000 Ocean St. Millvale_            _Fairfield_   _CT_   _01234_
      (No. and Street)            (City)             (County)    (State)  (Zip Code)
3. Policy a) Plan _Whole Life_                b) Face/Specified Amt. $ _262,000_
4. Employer Sponsored Plan? a) ☐ Yes ■ No   b) Normal Retirement Age ___ c) Policy Year Date _____
5. Extra Benefit Riders (check if desired):
   ☐ Total Disability Benefit                      ☐ Additional Purchase Protection $ _____
   ☐ Accidental Death Benefit $ _____            ☐ Other _____
6. Premium/Billing                                                              (mark only one)
   a) Notice to insured at 2a? ■ Yes ☐ No (Enter Below)  b) Bill Type & Frequency  ■ Direct-A-/ S / Q
      Name: _____                                                             ☐ List  A / S / Q / M
      Address: _____                                                          ☐ AMP Monthly Only
              (Street and No.)
      _____ _____ _____
      (City)  (State)  (Zip Code)
7. Automatic Loans? ■ Yes ☐ No
8. Dividend Plan: ☐ Addition  ☐ Cash  ☐ Premium reduction  ☐ Other: _____
9. Beneficiary
   a) At death of the proposed insured (give relationship for (2) below):
      ☐ 1) the owner  ■ 2) _Frank Stella - brother_
      _____
   b) At the maturity date: the owner
10. a) Owner: ■ 1) the insured  ☐ 2) _____
    b) Owner Social Security/Tax ID # _123-45-6798_
11. a) Present occupation & duties: _Insurance broker_
    b) In the last 90 days were you absent from your place of employment or not performing the customary
       duties of your occupation for at least 35 hours a week due to illness, injury, treatment, surgery, or
       observation? ☐ Yes ■ No  (If "Yes," explain in #21)
12. Present life insurance amount $ _100,000_                 ADB $ _100,000_

|  | YES | NO | Remarks & details of "YES" answers |
|---|---|---|---|
| 13. If this policy is issued, will any existing insurance or annuity be replaced, changed, or borrowed against? (Indicate Company and amount) | ☐ | ■ | |
| 14. Has any application for insurance on your life been declined, or has any policy been issued other than as applied for? | ☐ | ■ | |
| 15. Do you plan to travel or live outside the U.S.A. within the next 12 months? | ☐ | ■ | |
| 16. Have you, within the past 3 years: | | | |
| a) flown as a pilot or crew member in any type of aircraft? | ☐ | ■ | |
| b) engaged in parachuting, racing, scuba diving or hang gliding? | ■ | ☐ | _scuba diving_ |
| c) been charged with any motor vehicle moving violation? | ☐ | ■ | |

F000-0                                                          (Continued on another page)

Fig. 34B

```
(Continuation of Application)
                                                    YES     NO      Remarks & details of "YES"
17. Have you used any tobacco products:
    a) in the past 12 months? .................      ■      □       1/2 pack a day
    b) in the past 24 months? .................      ■      □       1/2 pack a day
    (If "Yes," indicate type & amounts)

18. a) Height  5'11"            b) Weight  185 lbs.
19. Name and address of personal physician(s)  Dr. Frank N. Stein
    Millvale, CT
    (Please indicate date, reason last consulted, diagnosis and treatment in #21)
20. Have you:                                                               YES     NO
    a) Ever had any signs of or been treated for high blood pressure, chest pain, diabetes,
       tumor, cancer or other disorder of the heart, digestive system, lungs, kidneys, or liver?   □      ■
    b) Received treatment for, or been advised to reduce the use of alcohol or drugs, or ever
       used drugs other than prescribed by a doctor? ...............................    □      ■
    c) Within the past 5 years, consulted a physician for any other physical or emotional
       disorder or illness, had any surgery, or been a patient in a hospital?  ........    □      ■
    (If "Yes," give details in #21)

21. Remarks, details and special requests:
```

I have received a Notice of Insurance Information Practices.

Each of the undersigned represents that all of the statements above are true and complete to the best of his/her knowledge and belief. It is agreed that: a) this and any amendments or supplements to it is the application and is the basis of the policy; b) if there is no prepayment, the policy will take effect only if, at the time the first premium is paid, the insured is alive, and all the statements above which are material to the risk are still true and complete to the best of the undersigneds' knowledge and belief; and c) only an officer of the Company can legally bind the company or waive any of its rights or requirements.

Payment to any trustee designated herein will discharge the company from all liability. The Company will not be responsible for the proper discharge of the trust or any of its terms.

Witness  Horace L. Dagent
         (Licensed Resident Agent where required)

Proposed
Insured  *Bozeman - Imorey Stella*
                                    (Sign)

Dated  January 15, 1992

Applicant/
Owner _____
       (if other than Proposed Insured)

At  ____Millvale____  ____CT____    By: _____
       (City)          (State)                    (Title)

Homeowner's Bank — RESIDENTIAL LOAN APPLICATION

| MORTGAGE APPLIED FOR ☞ | Conventional ☐  FHA ☐  VA ☐  ■ Ryan | Amount $220,000 | Interest Rate 10.5% | No. of Months 360 | Monthly Payment Prin. & Interest $2,292.50 | Escrow/Impounds (to be collected monthly) ■ Taxes ☐ Hazard Ins. ☐ Mtg. Ins. ☐ Life Ins. $235 |
|---|---|---|---|---|---|---|
| Prepayment Option | | | | | | |

| Property Street Address 62 Hillock Road | | City Cannondale | County Fairfield | State CT | Zip 05555 | No. Units |
|---|---|---|---|---|---|---|
| Legal Description (Attach description if necessary) | | | | Year Built 1984 | | |

| Purpose of Loan | Purchase | Construction - Permanent | Construction | Refinance | Other (Explain) |
|---|---|---|---|---|---|
| Complete this line if Construction-Permanent or Construction Loan ☞ | Lot Value Data Value (a) Year Acquired $ | Original Cost $ | Present $ | Cost of Imps. (b) $ | Total (a + b) $ | ENTER TOTAL AS PURCHASE PRICE IN DETAILS OF PURCHASE. ☜ |

| Complete this line if a Refinance Loan | Purpose of Refinance | Describe Improvements | [ ] made  [ ] to be made |
|---|---|---|---|
| Year Acquired | Original Cost $ | Amt. Exist. Liens $ | | | Cost $ |

| Title Will Be Held In What Name(s) Bozeman Amorey Stella | Manner In Which Title Will Be Held Individually |
|---|---|
| Source of Downpayment and Settlement Charges 1991 Incentive Commissions | |

This application is designed to be completed by the borrower(s) with the lender's assistance. The Co-Borrower Section and all other Co-Borrower questions must be completed and the appropriate boxes checked if another person will be obligated with the Borrower on the loan, or the Borrower is relying on income from alimony, child support or separate maintenance or on the income or assets of another person as a basis for repayment of the loan, or the Borrower is married and resides, or the property is located, in a community property state.

BORROWER / CO-BORROWER

| BORROWER | | | | CO-BORROWER | | | |
|---|---|---|---|---|---|---|---|
| Name Bozeman Amorey Stella | | Age 32 | School Yrs. 18 | Name | | Age | School Yrs. |
| Present Address  No. Years 1  ☐ Own  ■ Rent | | | | Present Address  No. Years  Own  Rent | | | |
| Street 666 Greenwich St. Apt.933 | | | | Street | | | |
| City/State/Zip New York, NY 10014 | | | | City/State/Zip | | | |
| Former Address if less than 2 years at present address | | | | Former Address if less than 2 years at present address | | | |
| Street Via Del Banchi Vecchi, 64 | | | | Street | | | |
| City/State/Zip 00168, Rome Italy | | | | City/State/Zip | | | |
| Years at former address 1+  ☐ Own  ■ Rent | | | | Years at former address  Own  Rent | | | |
| Marital Status: ☐ Married  ■ Unmarried  ☐ Separated (incl. single, divorced, widowed) | Dependents Other Than Listed By Co-Borrower | | | Marital Status: Married  Unmarried  Separated (incl. single, divorced, widowed) | Dependents Other Than Listed By Borrower | | |
| | No. | Ages | | | No. | Ages | |
| Name and Address of Employer Homeowner's Endorsement Plan Inc. 1000 Ocean Street Millvale, CT 05555 | Years employed in this line of work or profession?  1.2 years Years on this job 1.2 ☐ Self-Employed* | | | Name and Address of Employer | Years employed in this line of work or profession?  years Years on this job Self Employed* | | |
| Position/Title Vice President | Type of Business Ins. Broker | | | Position/Title | Type of Business | | |
| Social Security Number*** 123-45-6789 | Home Phone 284-555-1234 | Business Phone 212-444-5678 | | Social Security Number*** | Home Phone | Business Phone | |

GROSS MONTHLY INCOME / MONTHLY HOUSING EXPENSE** / DETAILS OF PURCHASE

| Item | Borrower | Co-Borrower | Total | | Present | Proposed | | |
|---|---|---|---|---|---|---|---|---|
| | | | | Rent | 1828.50 | | Do Not Complete If Refinance | |
| Base Emp. Income | $100,000 | $ | $100,000 | First Mortgage (P&I) | $ | $2,292.50 | a. Purchase Price | $262,000 |
| Overtime | | | | Other Financing (P&I) | | | b. Total Closing Costs (Est.) | 5,920 |
| Bonuses | | | | Hazard Insurance | | | c. Prepaid Escrows (Est.) | 700 |
| Commissions | 40,000 | | 40,000 | Real Estate Taxes | | 235 | d. Total (a + b + c) | $6,620 |
| Dividends/Interest | 3,000 | | 3,000 | Mortgage Insurance | | | e. Amount This Mortgage | (262,000 ) |
| Net Rental Income | | | | Homeowner Assn. Dues | | | f. Other Financing | ( ) |
| Other † (before completing, see notice under Describe Other Income) | | | | Other | | | g. Other Equity | ( ) |
| | | | | Total Monthly Pmt. | $1928.50 | $2,527.50 | h. Amount of Cash Deposit | 31,586 |
| | | | | Utilities | $160.00 | $200 | i. Closing Costs Paid by Seller | ( ) |
| Total | $143,000 | $ | $143,000 | Total | $2088.50 | $2,277.50 | j. Cash Reqd. For Closing (Est.) | $38,206 |

* FHLMC FNMA require business credit report, signed Federal Income Tax returns for the last two years, and if available, audited Profit and Loss Statement plus balance sheet for the same period.
** All Present Monthly Housing Expenses of Borrower and Co-Borrower should be listed on a combined basis.
*** Optional for FHLMC FHLMC Form 65 Rev. 10 86  Fannie Mae Form 1003 Rev. 10 86

Fig. 35B

| | | DESCRIBE OTHER INCOME | | | |
|---|---|---|---|---|---|
| ↓ B Borrower C CoBorrower | NOTICE: Alimony, Child Support, or separate maintenance income need not be revealed if the Borrower or Co-Borrower does not choose to have it considered as a basis for repaying this loan. | | | | Monthly Amount |
| | | | | | $ |
| | | | | | |
| | | | | | |

| | IF EMPLOYED IN CURRENT POSITION FOR LESS THAN TWO YEARS, COMPLETE THE FOLLOWING | | | | |
|---|---|---|---|---|---|
| B/C | Previous Employer/School | City/State | Type of Business | Position/Title | Dates From/To | Monthly Income |
| B | MCA Group Italia SRL | Rome, Italy | Mgmt. Consulting | Associate | 7/87-9/88 | $5,766.30 |
| B | Thorton School | Metropolis, PA | | MBA Student | 9/85-6/87 | |
| B | MCA Group, Inc | Macbridge, MA | Mgmt. Consulting | Analyst | 6/83-9/85 | 2,000 |
| B | Vard College | Macbridge, MA | | Student | 9/78-6/83 | |

THESE QUESTIONS APPLY TO BOTH BORROWER AND CO-BORROWER

| If a yes answer is given to a question in this column, please explain on an attached sheet. | Borrower Yes or No | Co-Borrower Yes or No | | | |
|---|---|---|---|---|---|
| Are there any outstanding judgments against you? | No | | | Borrower Yes or No | Co Borrower Yes or No |
| Have you been declared bankrupt within the past 7 years? | No | | | | |
| Have you had property foreclosed upon or given title or deed in lieu thereof in the last 7 years? | No | | Are you a U.S. citizen? | Yes | |
| | | | If "no", are you a resident alien? | | |
| Are you a party to a law suit? | No | | If "no", are you a non-resident alien? | | |
| Are you obligated to pay alimony, child support, or separate maintenance? | No | | Explain Other Financing or Other Equity (if any): | | |
| Is any part of the down payment borrowed? | No | | | | |
| Are you a co-maker or endorser on a note? | No | | | | |

This Statement and any applicable supporting schedules may be completed jointly by both married and un-married co-borrowers if their assets and liabilities are sufficiently joined so that the Statement can be meaningfully and fairly represented on a combined basis; otherwise separate Statements and Schedules are required (FHLMC 65A/FNMA 100A). If the borrower section was completed about a spouse, this statement and supporting schedules must be completed about that spouse also
☐ Completed Jointly  ☐ Not Completed Jointly

| ASSETS | | LIABILITIES AND PLEDGED ASSETS | | | |
|---|---|---|---|---|---|
| Indicate by (*) those liabilities or pledged assets which will be satisfied upon sale of real estate owned or upon refinancing of subject property. | | | | | |
| DESCRIPTION | CASH OR MARKET VALUE | CREDITORS' NAME, ADDRESS AND ACCOUNT NUMBER | ACCT. NAME IF NOT BORROWER'S | MO. PMT. AND MOS. LEFT TO PAY | UNPAID BALANCE |
| Cash Deposit Toward Purchase Held By Chekov & Karney Trustee | $2,600 | INSTALLMENT DEBTS (Include "revolving" charge accounts) | | $ Pmt/Mos | $2,700 |
| | | Co. Lemon Master/Visa  Acct. No. | | | |
| Checking and Savings Accounts (Show Names of Institutions Account Numbers) Bank, S&L or Credit Union Lemon Bank | 2,000 | Addr. P.O. Box 35001  43216622 | | | |
| | | City Wilmington, DE | | 125/ | |
| Addr. P.O. Box 13778 | | Co.  Acct. No. | | | |
| City Tippsburgh, PA | | Addr. | | | |
| Acct. No. 7-654-321 | | City | | / | |
| Bank, S&L or Credit Union First Product Bank | 30,000 | Co. PCN Education Loan  Acct. No. | | | 7,400 |
| | | Addr. Dept. 718  00875584 | | | |
| Addr. 711 Prospect St | | City Tippsburgh, PA | | 79.321120 | |
| City Millvale, CT 05555 | | Co.  Acct. No. | | | |
| Acct. No. 539 45 6771 | | Addr. | | | |
| Bank, S&L or Credit Union | | City | | / | |
| | | Co.  Acct. No. | | | |
| Addr. | | Addr. | | | |
| City | | City | | / | |
| Acct. No. | | Other Debts including Stock Pledges | | | |
| Stocks & Bonds (No./Description) | | | | | |

FHLMC Form 65 Rev. 10 86                                                                                                                                Fannie Mae Form 1003 Rev. 10 86

Fig. 35C

| Securities (con't) | | | | | | 5,000 |
|---|---|---|---|---|---|---|
| | | Real Estate Loans Co | Acct. No. | | / | |
| | | Addr | | | | |
| Life Insurance Net Cash Value | | City | | | | |
| Face Amount $ | | Co. | Acct. No. | | | |
| Subtotal Liquid Assets | 34,600 | Addr | | | | |
| Real Estate Owned (Enter Market Value from Schedule of Real Estate Owned) | | City | | | | |
| | | Automobile Loans Co CMAC | Acct. No | | | |
| Vested Interest In Retirement Fund | | Addr. P.O. Box 9638 | 08XYZ35942 | | | |
| Net Worth of Business Owned (ATTACH FINANCIAL STATEMENT) | | City New Raven, CT | | | 412.59125 | 8,770 |
| Automobiles Owned (Make and Year) 1990 Chevy Blazer | 12,153 | Co. | Acct. No | | | |
| | | Addr. | | | | |
| | | City | | | / | |
| Furniture and Personal Property | 20,000 | Alimony/Child Support/Separate Maintenance Payments Owed to | | | | |
| Other Assets (Itemize) | | | | | / | |
| | | TOTAL MONTHLY PAYMENTS | | | $616.91 | |
| TOTAL ASSETS | (A) $66,753 | NET WORTH (A - B) $ | | | TOTAL LIABILITIES | (B) $23,900 |

SCHEDULE OF REAL ESTATE OWNED (If Additional Properties Owned Attach Separate Schedule)

| Address of Property (Indicate S if Sold, PS if Pending Sale or R if Rental being held for income) | | Type of Property | Present Market Value | Amount of Mortgages & Liens | Gross Rental Income | Mortgage Payments | Taxes, Ins. Maintenance and Misc. | Net Rental Income |
|---|---|---|---|---|---|---|---|---|
| | ↓ | | $ | $ | $ | $ | $ | $ |
| | | | | | | | | |
| | | TOTALS → | $ | $ | $ | $ | $ | $ |

LIST PREVIOUS CREDIT REFERENCES

| ↓ | B - Borrower  C - Co-Borrower | Creditor's Name and Address | Account Number | Purpose | Highest Balance | Date Paid |
|---|---|---|---|---|---|---|
| B | Auto Credit Corp. | 1810 Firestone Exp., Firestone, NY | 9090807 | Car Loan | 15,187.08 | 10/89 |

List any additional names under which credit has previously been received_____

AGREEMENT: The undersigned applies for the loan indicated in this application to be secured by a first mortgage or deed of trust on the property described herein, and represents that the property will not be used for any illegal or restricted purpose, and that all statements made in this application are true and are made for the purpose of obtaining the loan. Verification may be obtained from any source named in this application. The original or a copy of this application will be retained by the lender, even if the loan is not granted. The undersigned ■ intend or ☐ do not intend to occupy the property as their primary residence.

I/we fully understand that it is a federal crime punishable by fine or imprisonment, or both, to knowingly make ant false statements concerning any of the above facts as applicable under the provisions of Title 18, United States Code, Section 1014.

_Bozeman Amorey Stella_     January 15, 1992

Borrower's Signature     Date     Co-Borrower's Signature     Date

INFORMATION FOR GOVERNMENT MONITORING PURPOSES

The following information is requested by the Federal Government for certain types of loans related to a dwelling, in order to monitor the lender's compliance with equal credit opportunity and fair housing laws. You are not required to furnish this information, but are encouraged to do so. The law provides that a lender may neither discriminated on the basis of this information nor on whether you choose to furnish it. However, if you choose to furnish it, under Federal regulations this lender is required to note race and sex on the basis of visual observation and surname. If you do not wish to furnish the above information, please check the box below. [Lender must review the above material to assure that the disclosures satisfy all requirements to which the Lender is subject under applicable state law for the particular type of loan applied for].

| BORROWER: ☐ I do not wish to furnish this information | CO-BORROWER: ☐ I do not wish to furnish this information. |
|---|---|
| RACE/ ☐ American Indian, Alaskan Native ☐ Asian, Pacific Islander | RACE/ ☐ American Indian, Alaskan Native ☐ Asian, Pacific Islander |
| NATIONAL ☐ Black ☐ Hispanic ■ White     SEX: ☐ Female | NATIONAL ☐ Black ☐ Hispanic ☐ White     SEX: ☐ Female |
| ORIGIN ☐ Other (specify)     ■ Male | ORIGIN ☐ Other (specify) ☐     ☐ Male |

TO BE COMPLETED BY INTERVIEWER

This application was taken by:
- ☐ face to face interview
- ☐ by mail
- ☐ by telephone
- ■ by modem Interviewer     Name of Interviewer's Employer Interviewer's Phone Number     Address of Interviewer's Employer FHLMC Form 65 Rev. 10 86     Fannie Mae Form 1003 Rev. 10 86

(FROM FIG. 37B-1)

(FROM FIG. 37B-2)

(FROM FIG. 37B-3)

(FROM FIG. 37B-4)

(FROM FIG. 37B-5)

(FROM FIG. 37B-6)

(FROM FIG. 37B-7)

(FROM FIG. 37B-8)

Screen 1. Main Menu with Illustration Submenu

Fig. 40

| Policy Information |
|---|

| | |
|---|---|
| Choose Policy Type: | Individual |
| | Joint & Survivor |

Screen 2. Selecting Policy Type

Fig. 41

```
┌─────────────────────────────────────────────────────────────────┐
│                      Personal Information                        │
│                                                                  │
│ Last Name:      _____         │
│ First Name:     _____         │
│ Middle Name:_____         │
│                                                                  │
│ Address:        _____         │
│                 _____         │
│                                                                  │
│ City:         _____       State: __  Zip Code: _____ │
│                                                                  │
│ Phone: _____              Date of Birth: _____            │
│                                                                  │
│ Sex: __       Smoking: __     Marital Status: __                 │
└─────────────────────────────────────────────────────────────────┘
┌─────────────────────────────────────────────────────────────────┐
│ F5-Help   F6-Main Menu  F7-Exit  F8-Cancel  PgUp-Last  PgDn-Next │
└─────────────────────────────────────────────────────────────────┘
```

Screen 3. Personal Information

Fig. 42

| Employer Information |
|---|
| Employer Name: _____ |
| Address: _____ |
| City: _____ State: __ Zip: _____ |
| Phone: _____ |
| Occupation: _____ |
| Title: _____ |

| F5-Help   F6-Main Menu   F7-Exit   F8-Cancel   PgUp-Last   PgDn-Next |
|---|

Screen 4. Employer Information

Fig. 43

```
           Health Information

Simplified issue questions for Boseman Amorey Stella

[N]   Has the proposed insured applied for and been declined or
postponed life insurance in the last 5 years?

[N]   Has the proposed insured ever been treated for, or been
diagnosed as having deficiency of the immune system?

[N]   Has the proposed insured ever consulted or been treated by
a physician for cancer?

Answer Y or N for each question
```

```
F5-Help   F6-Main Menu   F7-Exit   F8-Cancel   PgUp-Last   PgDn-Next
```

Screen 5. Health Questionnaire Input Screen - Insured

Fig. 44

| Insurance Requirements - Insured |
|---|

| Choose Two of the Following: |
|---|
| Minimum Death Benefit: _____ |
| Cash Value and Year Attained: _____ \_\_ |
| Yearly Payment: _____ |

| Number of Years Required to Pay in Full: \_\_ or Pay Till Age: \_\_\_ |
|---|

Screen 6. Insurance Requirements - Insured

Fig. 45

| Additional Coverage - Insured |
|---|

| |
|---|
| Waiver of Premium Annual Benefit (Y/N): _____<br><br>        Accidental Death Benefit: _____<br><br>        Additional Death Benefit: _____<br><br>           Spouse Death Benefit: _____ |

Screen 7  Additional Benefits - Insured

Fig. 46

| State in which policy will be issued: __ |
|---|

Screen 8. State Solicitation

Fig. 47

```
Select from a list of available policies or
allow system to choose the Best available policy:

[S(elect) / B(est)]? _
```

Screen 9. Select or Best Solicitation

Fig. 48

```
                    You have specified the following:

Policy Type: [Individual/Joint/Survivor]

Insured        Co-Insured
Date of Birth                        _____      _____
Sex                                      _              _
Smoking                                  _              _
Marital Status                           _              _
# of Indemnity Exceptions                _              _
Minimum Death Benefit                _____
Cash Value                           _____
Years for Cash Value                     _
Number of Years to Pay                   _
Yearly Payment - Base Policy         _____
Riders
    Waiver of Premium                _____
    Accidental Death                 _____
    Additional Death Benefit         _____
    Spouse Death Benefit             _____

Check/Correct Values, PgDn - Start Calculation, PgUp - Cancel, F5 - Help
```

Screen 10. Summary of Parameters

Fig. 49

Selecting the Best Insurance from ___ Policies

Processing Policy Number ___

Carrier Name

Policy Name

Screen 11. Progress Report for Best Policy Selection

Fig. 50

| Choose Best Policy | | | | |
|---|---|---|---|---|
| Company Name | Policy Name | Yearly Payment | Total Insurance Payments | Moody's Rating |
| Available Insurance Policies Find: _____ | | | | |
| Beneficial Mutual | Life Strat II | 15,000.00 | 350,000.00 | AA |
| GA Mutual Life | Life M-2 | 15,350.00 | 357,600.00 | AAA |
| Providential Life | Safety-Life | 16,475.00 | 382,000.00 | AA+ |
| Metro Life | Retire Roll | 17,000.00 | 396,500.00 | AAC |
| Voyage Life | Zero Sprd | 18,500.00 | 403,000.00 | AAB |
| Gibralter Life | Rock Solid | 18,560.00 | 404,400.00 | AA+ |
| ANGIC | GTD Return + | 18,700.00 | 405,000.00 | A |

Screen 12. Choosing a Policy from among the Best

Fig. 51

| Insurance Policy | | | | |
|---|---|---|---|---|
| Company Name | Policy Name | Current Rate | Guarntd Rate | Moody's Rating |
| Available Insurance Policies Find: _____ | | | | |
| Beneficial Mutual | Life Strat II | 6.5 | 2.5 | AA |
| GA Mutual Life | Life M-2 | 7.25 | 2.5 | AAA |
| Providential Life | Safety-Life | 7 | 2.6 | AA+ |
| Metro Life | Retire Roll | 7.5 | 2.5 | AAC |
| Voyage Life | Zero Sprd | 8 | 2.6 | AAB |
| Gibralter Life | Rock Solid | 7.75 | 2.5 | AA+ |
| ANGIC | GTD Return + | 7.3 | 2.5 | A |

Screen 13. Choosing a Policy from Available Policies

Fig. 52

```
The Ryan Insurance Illustration System

Carrier Name

Policy Name

Illustration 4750 Developed for:

Stella Amorey
666 Greenwich Street
Apt. 933
New York, NY 10014

Insurance Assumptions:
Current                              Guarantees

Mortality:     1983 GAM              Mortality:   1980 CSO
  Percent:     100 %                   Percent:   100 %
Unloaned Credited Rate: 5.5 %        Unloaned Credited Rate: 2.5%
```

Screen 14. Online Insurance Illustration

Fig. 53

| Create the Insurance Application? |
|---|

| Yes |
|---|

No

Screen 15. Determining Whether to Create the Insurance Application

Fig. 54

```
┌─────────────────────────────────────────────────┐
│                Insurance Application             │
│                                                  │
│                   Company Name                   │
│                                                  │
│                   Policy Name                    │
└─────────────────────────────────────────────────┘

┌─────────────────────────────────────────────────┐
│ Question:                                        │
│ Beneficiary and Relationship                     │
│                                                  │
└─────────────────────────────────────────────────┘

┌─────────────────────────────────────────────────┐
│ Answer:                                          │
│ Monty Stella - Husband                           │
│                                                  │
└─────────────────────────────────────────────────┘

┌─────────────────────────────────────────────────┐
│ F5-Help  F6-Main Menu  F7-Exit  F8-Cancel  PgUp-Last  PgDn-Next │
└─────────────────────────────────────────────────┘
```

Screen 16 Insurance Application Question and Answer

Screen 17. Main Menu with Update Application Submenus

Screen 18. Main Menu with Update Application Design Submenus

Screen 19. Main Menu with Update Client Submenus

Screen 20 Main Menu with Illustration Submenus

Screen 21. Main Menu with Insurance Submenus

Fig. 60

| Evergreen Help Facility  Current Topic: Employment [1] |
|---|

Enter the employer information requested on the screen for the applicant or the co-applicant. Please note that if the employer is already in our database you may retrieve the information merely by entering the first few letters of the employer name and then pressing the LIST key. You will be provided with a list of employers whose name starts with the letters that you enter. Select from this list by highlighting the appropriate employer by moving the UP and DOWN arrow keys and pressing the ENTER key to make the selection. If the application or co-applicant's employer is not in the database, merely enter the name and address information as requested. The occupation and title information is associated with the applicant or co-applicant.

| [List] Choose Topic    [Help] Using Help    [Exit] Exit Help |
|---|
| [Down] Move Down  [--] At Top |

Screen 22. Help Message

THE EVALULIFE MORTGAGE ILLUSTRATION SYSTEM

ILLUSTRATION FOR THE PRODUCT OF:

ABC Insurance Company

---

Illustration 2026 Developed For:

Bozeman Amorey Stella
666 Greenwich Street
Apt. 933
New York, NY 10014

By:

ED FREES
ABC Realtors Inc
1 Realtors Way
Anytown, AZ 11111

---

INDIVIDUAL DATA FOR: Bozeman Amorey Stella

Age: 32
Sex: Male
Smoker: N

---

TARGET AND CALCULATED PARAMETERS:

| Target: | | Calculated: | |
|---|---|---|---|
| Death Benefit: | 300,000 | Death Benefit: | 304,651.39 |
| Premium: | | Premium: | 9,165.23 |
| No. of Years: | 4 | No. of Years: | 4 |
| Cash Value in Year 30: | 375,000 | Cash Value in Year 30: | 378,767.16 |

---

INSURANCE ASSUMPTIONS FOR: ABC Insurance Company

| Current Rates: | | Guarantees: | |
|---|---|---|---|
| Mortality: | 1983 GAM - 104 | Mortality: | 1980 CSO-N |
| Percent: | 100.00 % | Percent: | 100.00 % |
| Credited Rate: | 9.50 % | Credited Rate: | 4.00 % |

---

RIDERS

| Riders Selected: | Amount | Duration |
|---|---|---|
| Waiver of Stipulated Premium | N/A | N/A |
| Accidental Death Benefit | N/A | N/A |
| Additional Term Insurance (on Insured) | N/A | N/A |
| Additional Term Insurance (for Spouse) | N/A | N/A |

THE EVALULIFE MORTGAGE ILLUSTRATION SYSTEM

ILLUSTRATION FOR THE PRODUCT OF:

ABC Insurance Company

---

IMPORTANT COMMENTS CONCERNING THE ATTACHED ILLUSTRATION

The information contained in the attached illustration is based on both assumptions furnished by the client for whom it is developed and the current assumptions of the insurance plan chosen. Unless otherwise indicated, those rates assumed initially continue throughout the life of the illustration.

Premium costs may change if the purchase date differs from the one given. They may also change if any of the other assumptions used vary.

Premium payments are subject to change with variations in interest rates.

Interest rates credited on policy values and the cost of insurance charges may vary after the first year. Interest rates charged on policy loans and credited on loaned policy values also may vary after the first year.

The Ryan EvaluLife Illustration System cannot approve insurance applications. It can only forward life insurance applications to participating financial services institutions and provide you information as to their response.

The attached illustration should not be construed as, and is not offered as, legal, tax or investment advice. Please consult your accountant, tax advisor or legal counselor prior to entering into any transaction.

---

The data shown is based on both assumptions furnished by the client for whom it is developed and the current assumptions of the insurance plan chosen. These assumptions are shown on pages 1 and 2 of this illustration.

This Illustration is based on these assumptions and is only valid with all pages attached.

THE RYAN EVALULIFE ILLUSTRATION SYSTEM

ILLUSTRATION FOR THE PRODUCT OF:

ABC Insurance Company

---

UNIVERSAL LIFE INSURANCE VALUES

---

Life Insurance has certain tax advantages. Under current law, cash value accumulation inside the policy is tax free. In addition, any death benefits paid out by the policy will be tax free. However, if you surrender the policy, you will have to pay taxes on that amount by which your policy's cash value exceeds the cumulative amount of premiums you have paid.

The projected values below are not guaranteed. Changes in interest credited rates and carrier expense charges could result in an increase or decrease in the projected values.

| Year | Premium | Death Benefit | Cash Value |
|------|---------|---------------|------------|
| 1 | 9,165.23 | 301,651.39 | 8,511.06 |
| 2 | 9,165.23 | 301,651.39 | 17,988.94 |
| 3 | 9,165.23 | 301,651.39 | 28,361.58 |
| 4 | 9,165.23 | 301,651.39 | 39,710.18 |
| 5 | 0.00 | 301,651.39 | 43,230.09 |
| 6 | 0.00 | 301,651.39 | 47,074.51 |
| 7 | 0.00 | 301,651.39 | 51,271.94 |
| 8 | 0.00 | 301,651.39 | 55,853.43 |
| 9 | 0.00 | 301,651.39 | 60,852.24 |
| 10 | 0.00 | 301,651.39 | 66,305.01 |
| 11 | 0.00 | 301,651.39 | 72,251.73 |
| 12 | 0.00 | 301,651.39 | 78,735.67 |
| 13 | 0.00 | 301,651.39 | 85,805.38 |
| 14 | 0.00 | 301,651.39 | 93,514.03 |
| 15 | 0.00 | 301,651.39 | 101,920.44 |
| 16 | 0.00 | 301,651.39 | 111,091.40 |
| 17 | 0.00 | 301,651.39 | 121,101.80 |
| 18 | 0.00 | 301,651.39 | 132,035.57 |
| 19 | 0.00 | 301,651.39 | 143,987.26 |
| 20 | 0.00 | 301,651.39 | 157,062.61 |
| 21 | 0.00 | 301,651.39 | 171,379.88 |
| 22 | 0.00 | 306,793.54 | 187,069.23 |
| 23 | 0.00 | 320,678.21 | 204,251.73 |
| 24 | 0.00 | 334,579.39 | 223,052.92 |
| 25 | 0.00 | 355,647.10 | 243,593.90 |
| 26 | 0.00 | 377,778.62 | 266,041.28 |
| 27 | 0.00 | 400,996.78 | 290,577.37 |
| 28 | 0.00 | 425,319.16 | 317,402.36 |
| 29 | 0.00 | 450,758.56 | 346,737.35 |
| 30 | 0.00 | 484,821.97 | 378,767.16 |

---

The data shown is based on both assumptions furnished by the client for whom it is developed and the current assumptions of the insurance plans chosen. These assumptions are shown on pages 1 and 2 of this illustration.

This illustration is based on these assumptions and is only valid with all pages attached.

Fig. 61D

THE RYAN EVALULIFE ILLUSTRATION SYSTEM

ILLUSTRATION FOR THE PRODUCT OF:

ABC Insurance Company

GUARANTEED LIFE INSURANCE VALUES

The following values were calculated assuming the interest rates and mortality rates guaranteed in the life insurance contract. These are the minimum interest rate that can be credited and the maximum cost of insurance rates that can be charged. These rates are shown on page 1 of this illustration. The Life Insurance Cost Indices for this policy are shown on the following page. Additional information concerning the life insurance contract may be included with the policy when it is issued.

| Year | End of Year Cash Value | End of Year Death Benefit |
|------|------------------------|---------------------------|
| 1 | 7,795.28 | 301,651.39 |
| 2 | 16,056.22 | 301,651.39 |
| 3 | 24,643.98 | 301,651.39 |
| 4 | 33,567.75 | 301,651.39 |
| 5 | 34,376.05 | 301,651.39 |
| 6 | 35,188.25 | 301,651.39 |
| 7 | 36,002.00 | 301,651.39 |
| 8 | 36,812.13 | 301,651.39 |
| 9 | 37,616.04 | 301,651.39 |
| 10 | 38,405.65 | 301,651.39 |
| 11 | 39,180.63 | 301,651.39 |
| 12 | 39,932.63 | 301,651.39 |
| 13 | 40,660.98 | 301,651.39 |
| 14 | 41,354.33 | 301,651.39 |
| 15 | 42,006.22 | 301,651.39 |
| 16 | 42,609.89 | 301,651.39 |
| 17 | 43,158.29 | 301,651.39 |
| 18 | 43,638.78 | 301,651.39 |
| 19 | 44,043.40 | 301,651.39 |
| 20 | 44,350.61 | 301,651.39 |
| 21 | 44,537.86 | 301,651.39 |
| 22 | 44,584.05 | 301,651.39 |
| 23 | 44,458.98 | 301,651.39 |
| 24 | 44,135.92 | 301,651.39 |
| 25 | 43,583.75 | 301,651.39 |
| 26 | 42,777.07 | 301,651.39 |
| 27 | 41,683.13 | 301,651.39 |
| 28 | 40,253.14 | 301,651.39 |
| 29 | 38,434.24 | 301,651.39 |
| 30 | 36,166.05 | 301,651.39 |
| 31 | 33,368.57 | 301,651.39 |
| 32 | 29,945.20 | 301,651.39 |
| 33 | 25,785.64 | 301,651.39 |
| 34 | 20,771.88 | 301,651.39 |
| 35 | 14,781.87 | 301,651.39 |
| 36 | 7,667.19 | 301,651.39 |

The data shown is based on both assumptions furnished by the client for whom it is developed and the current assumptions of the insurance plan chosen. These assumptions are shown on pages 1 and 2 of this illustration.

This illustration is based on these assumptions and is only valid with all pages attached.

THE RYAN EVALULIFE ILLUSTRATION SYSTEM

ILLUSTRATION FOR THE PRODUCT OF:

ABC Insurance Company

---

LIFE INSURANCE COST INDICES

---

An explanation of the intended use of these indices is provided in The Life Insurance Buyer's Guide. These indices are useful only for the comparison of relative costs of two or more similar policies.

The cost indices do not reflect any optional benefits.

|  | BASED ON GUARANTEED FACTORS | |
|---|---|---|
|  | 10 Year | 20 Year |
| SURRENDER COST INDEX @ 5% | 3.81 | 4.10 |
| NET PAYMENT COST INDEX @ 5% | 13.45 | 8.33 |

|  | BASED ON CURRENT FACTORS | |
|---|---|---|
|  | 10 Year | 20 Year |
| SURRENDER COST INDEX @ 5% | (3.20) | (6.66) |
| NET PAYMENT COST INDEX @ 5% | 13.45 | 8.33 |

---

The data shown is based on both assumptions furnished by the client for whom it is developed and the current assumptions of the insurance plan chosen. These assumptions are shown on pages 1 and 2 of this illustration.

This Illustration is based on these assumptions and is only valid with all pages attached.

Fig. 62

EVALULIFE INSURANCE ILLUSTRATION SYSTEM

COMPARISON OF CASH VALUES FROM INSURANCE CARRIERS

| Name: | Stella Amorey | | | Initial face: | $262,000 |
|---|---|---|---|---|---|
| Sex: | F | | | Premium: | $6,313 |
| Birthdate: | February 14, 1959 | | | # of years: | 10 |
| Smoker: | N | | | | |

| Credit rate: | 6.50% | 7.25% | 7.00% | 7.50% | 8.00% | 7.75% | 7.30% |
|---|---|---|---|---|---|---|---|
| | Beneficial | GA Mutual | | | | | |
| Year | Mutual | Life | Providential | Metro | Voyage | Gibralter | ANGIC |
| 1 | 5,837 | 5,836 | 5,779 | 5,828 | 5,704 | 5,815 | 5,753 |
| 2 | 12,150 | 12,219 | 12,113 | 12,234 | 12,093 | 12,211 | 12,108 |
| 3 | 18,859 | 19,051 | 18,877 | 19,107 | 18,979 | 19,089 | 18,915 |
| 4 | 25,991 | 26,365 | 26,101 | 26,481 | 26,402 | 26,486 | 26,204 |
| 5 | 33,570 | 34,192 | 33,813 | 34,391 | 34,402 | 34,439 | 34,008 |
| 6 | 41,623 | 42,569 | 42,048 | 42,878 | 43,024 | 42,992 | 42,365 |
| 7 | 50,182 | 51,536 | 50,842 | 51,984 | 52,319 | 52,190 | 51,314 |
| 8 | 59,278 | 61,133 | 60,231 | 61,752 | 62,338 | 62,081 | 60,897 |
| 9 | 68,942 | 71,404 | 70,255 | 72,232 | 73,137 | 72,717 | 71,157 |
| 10 | 79,209 | 82,396 | 80,956 | 83,473 | 84,777 | 84,153 | 82,142 |
| 11 | 83,908 | 87,905 | 86,142 | 89,264 | 91,025 | 90,168 | 87,647 |
| 12 | 88,872 | 93,775 | 91,651 | 95,451 | 97,735 | 96,611 | 93,514 |
| 13 | 94,114 | 100,027 | 97,502 | 102,060 | 104,940 | 103,511 | 99,767 |
| 14 | 99,651 | 106,689 | 103,718 | 109,121 | 112,680 | 110,903 | 106,432 |
| 15 | 105,499 | 113,787 | 110,321 | 116,666 | 120,994 | 118,823 | 113,538 |
| 16 | 111,679 | 121,355 | 117,341 | 124,733 | 129,932 | 127,315 | 121,117 |
| 17 | 118,214 | 129,428 | 124,808 | 133,363 | 139,545 | 136,423 | 129,206 |
| 18 | 125,125 | 138,043 | 132,751 | 142,598 | 149,887 | 146,196 | 137,842 |
| 19 | 132,435 | 147,237 | 141,202 | 152,482 | 161,017 | 156,685 | 147,062 |
| 20 | 140,162 | 157,047 | 150,193 | 163,060 | 172,994 | 167,941 | 156,906 |
| 21 | 148,328 | 167,513 | 159,753 | 174,379 | 185,882 | 180,020 | 167,413 |
| 22 | 156,952 | 178,676 | 169,918 | 186,490 | 199,751 | 192,981 | 178,626 |
| 23 | 166,057 | 190,583 | 180,722 | 199,448 | 214,678 | 206,891 | 190,591 |
| 24 | 175,668 | 203,284 | 192,206 | 213,315 | 230,748 | 221,821 | 203,360 |
| 25 | 185,812 | 216,836 | 204,416 | 228,161 | 248,056 | 237,853 | 216,993 |
| 26 | 196,521 | 231,303 | 217,402 | 244,061 | 266,710 | 255,079 | 231,553 |
| 27 | 207,830 | 246,754 | 231,221 | 261,103 | 286,827 | 273,600 | 247,113 |
| 28 | 219,778 | 263,270 | 245,935 | 279,382 | 308,541 | 293,528 | 263,753 |
| 29 | 232,405 | 280,935 | 261,611 | 299,004 | 331,999 | 314,990 | 281,561 |
| 30 | 245,760 | 299,848 | 278,328 | 320,086 | 357,367 | 338,126 | 300,637 |

Note: These values are based on current credited rates. Carrier current credited rates will change annually, but will never fall below the guaranteed rates under the policy. Ask for an illustration of current and guaranteed performance before buying any policy.

Fig. 63A

Metro Life Insurance Corporation Application For
Anytown, USA  Life Insurance Part 1  F000-0  N° 000000

All information requested below pertains to the proposed insured unless stated otherwise.

1. a) Name <u>Bozeman Amorey Stella</u>  b) Sex ■ M ☐ F  c) SS# <u>123-45-6798</u>
   d) Use unisex rates? ☐ Yes ■ No  e) Married? ☐ Yes ■ No
   f) U.S. citizen? ■ Yes ☐ No  g) Place of Birth _____  h) Date of Birth <u>12/05/59</u>
   *(City)  (State)*  *Month Day Year*
2. a) Residence <u>666 Greenwich St. Apt. 933 N.Y.</u>  <u>Manhattan</u>  <u>NY</u>  <u>10014</u>
   *(No. and Street)  (City)  (County)  (State)  (Zip Code)*
   b) Business <u>3000 Ocean St. Millvale</u>  <u>Fairfield</u>  <u>CT</u>  <u>01234</u>
   *(No. and Street)  (City)  (County)  (State)  (Zip Code)*
3. Policy a) Plan <u>Whole Life</u>  b) Face/Specified Amt. $ <u>262,000</u>
4. Employer Sponsored Plan? a) ☐ Yes ■ No  b) Normal Retirement Age ___  c) Policy Year Date _____
5. Extra Benefit Riders (check if desired):
   ☐ Total Disability Benefit  ☐ Additional Purchase Protection $ _____
   ☐ Accidental Death Benefit $ _____  ☐ Other _____
6. Premium/Billing
   *(mark only one)*
   a) Notice to insured at 2a? ■ Yes ☐ No (Enter Below)  b) Bill Type & Frequency  ■ Direct–A / S / Q
   Name: _____  ☐ List  A / S / Q / M
   Address: _____  ☐ AMP Monthly Only
   *(Street and No.)*
   _____
   *(City)  (State)  (Zip Code)*
7. Automatic Loans? ■ Yes ☐ No
8. Dividend Plan: ☐ Addition  ☐ Cash  ☐ Premium reduction  ☐ Other: _____
9. Beneficiary
   a) At death of the proposed insured (give relationship for (2) below):
   ☐ 1) the owner  ■ 2) <u>Frank Stella - brother</u>
   _____
   b) At the maturity date: the owner
10. a) Owner: ■ 1) the insured  ☐ 2) _____
    b) Owner Social Security/Tax ID # <u>123-45-6798</u>
11. a) Present occupation & duties: <u>Insurance broker</u>
    b) In the last 90 days were you absent from your place of employment or not performing the customary duties of your occupation for at least 35 hours a week due to illness, injury, treatment, surgery, or observation? ☐ Yes ■ No  (If "Yes," explain in #21)
12. Present life insurance amount $ <u>100,000</u>  ADB $ <u>100,000</u>

| | YES | NO | Remarks & details of "YES" answers |
|---|---|---|---|
| 13. If this policy is issued, will any existing insurance or annuity be replaced, changed, or borrowed against? (Indicate Company and amount) | ☐ | ■ | |
| 14. Has any application for insurance on your life been declined, or has any policy been issued other than as applied for? | ☐ | ■ | |
| 15. Do you plan to travel or live outside the U.S.A. within the next 12 months? | ☐ | ■ | |
| 16. Have you, within the past 3 years: | | | |
| a) flown as a pilot or crew member in any type of aircraft? | ☐ | ■ | |
| b) engaged in parachuting, racing, scuba diving or hang gliding? | ■ | ☐ | scuba diving |
| c) been charged with any motor vehicle moving violation? | ☐ | ■ | |

F000-0  (Continued on another page)

Fig. 63B (Continuation of Application)

|  | YES | NO | Remarks & details of "YES" |
|---|---|---|---|
| 17. Have you used any tobacco products: | | | |
| a) in the past 12 months? | ■ | ☐ | 1/2 pack a day |
| b) in the past 24 months? | ■ | ☐ | 1/2 pack a day |
| (If "Yes," indicate type & amounts) | | | |

18. a) Height _5'11"_   b) Weight _185 lbs._

19. Name and address of personal physician(s) _Dr. Frank N. Stein_
    _Hillvale, CT_
    (Please indicate date, reason last consulted, diagnosis and treatment in #21)

20. Have you:

|  | YES | NO |
|---|---|---|
| a) Ever had any signs of or been treated for high blood pressure, chest pain, diabetes, tumor, cancer or other disorder of the heart, digestive system, lungs, kidneys, or liver? | ☐ | ■ |
| b) Received treatment for, or been advised to reduce the use of alcohol or drugs, or ever used drugs other than prescribed by a doctor? | ☐ | ■ |
| c) Within the past 5 years, consulted a physician for any other physical or emotional disorder or illness, had any surgery, or been a patient in a hospital? | ☐ | ■ |

(If "Yes," give details in #21)

21. Remarks, details and special requests:

_____
_____
_____
_____
_____
_____
_____
_____
_____
_____

I have received a Notice of Insurance Information Practices.

Each of the undersigned represents that all of the statements above are true and complete to the best of his/her knowledge and belief. It is agreed that: a) this and any amendments or supplements to it is the application and is the basis of the policy; b) if there is no prepayment, the policy will take effect only if, at the time the first premium is paid, the insured is alive, and all the statements above which are material to the risk are still true and complete to the best of the undersigneds' knowledge and belief; and c) only an officer of the Company can legally bind the company or waive any of its rights or requirements.

Payment to any trustee designated herein will discharge the company from all liability. The Company will not be responsible for the proper discharge of the trust or any of its terms.

Witness _Horace L. Dagent_
(Licensed Resident Agent where required)

Proposed
Insured _Bozeman Amorey Stella_
(Sign)

Dated _January 15, 1992_

Applicant/
Owner _____
(If other than Proposed Insured)

At _Hillvale_   _CT_   By: _____
   (City)      (State)        (Title)

F000-0

APPARATUS AND METHOD USING FRONT-END NETWORK GATEWAYS AND SEARCH CRITERIA FOR EFFICIENT QUOTING AT A REMOTE LOCATION

This is a continuation-in-part of U.S. patent application Ser. No. 07/912,978 having a filing date of Aug. 17, 1992 now U.S. Pat. No. 5,673,402, and a continuation-in-part of U.S. patent application Ser. No. 08/210,395 having a filing date of Mar. 18, 1994 now U.S. Pat. No. 5,655,085, the latter of which also claims priority from the former.

I. BACKGROUND OF THE INVENTION

A. Technical Field of the Invention

This invention concerns an electrical computer and a data processing system, and methods involving the same, applied to the financial fields of insurance and mortgages. More particularly, this invention relates to a computer system for preparing, processing and transmitting life insurance premium quotes as part of a mortgage calculation in support of a new financial product. In the new financial product, life insurance is used as collateral and a means for repayment of a mortgage, and facilitates the purchase of real estate without (or with a greatly reduced) down payment. The invention includes automated aspects of the use of premiums paid on life insurance as a substitute for the initial down payment on a mortgage, the use of life insurance policy death benefits to retire the mortgage upon the death of the borrower, the use of accumulated cash values to retire the outstanding principal on a mortgage in the event of the borrower's survival, and the services of storage and transmission of data for all of the foregoing.

This invention optionally also relates generally to a computerized system for preparing and processing multiple universal life insurance quotes and for preparing and processing universal life insurance applications, based upon those quotes. More particularly, the present invention relates to a machine, manufacture, process, and improvement thereof.

More particularly, this invention relates to a computer system for preparing, processing and transmitting life insurance premium quotes as part of a mortgage calculation in support of a new financial product. In the new financial product, life insurance is used as collateral and a means for repayment of a mortgage, and facilitates the purchase of real estate without (or with a greatly reduced) down payment. The invention includes automated aspects of the use of premiums paid on life insurance as a substitute for the initial down payment on a mortgage, the use of life insurance policy death benefits to retire the mortgage upon the death of the borrower, the use of accumulated cash values to retire the outstanding principal on a mortgage in the event of the borrower's survival, and the services of storage and transmission of data for all of the foregoing.

B. Description of the Background Art

In the United States, the declining supply of low-cost housing and the inability of many low-income renters to save enough money to make a down payment has forced many potential home buyers out of the housing market, according to a study released Mar. 17, 1988, by the Harvard University Joint Center for Housing Studies. (Reported in the Mar. 28, 1988, Bureau of National Affairs Banking Report.) To address this problem in the United Kingdom, a way has been found to combine life insurance and a mortgage into what is known as an "endowment mortgage."

A UK endowment mortgage is a balloon payment mortgage combined with an endowment life insurance contract. A UK endowment life insurance policy provides life insurance coverage and tax-free accumulation of premium dollars invested in the life insurance policy over a stipulated time period—usually between twenty and forty years. The lender and the insurance company work in concert to engineer a balloon payment mortgage linked to an endowment life insurance policy so that, at the end of the mortgage period, the cash value accumulated via the life insurance is sufficient to repay the mortgage in a single, lump-sum "balloon" repayment.

A home buyer financing the purchase of a home with a UK endowment mortgage pays no principal to the lender over the term of the mortgage. Monthly loan payments are limited to interest only. The mortgage principal is repaid separately by using the life insurance policy. This principal accumulates in an endowment life insurance policy—a universal life insurance policy with a level death benefit equal to the purchase price of the home. The premium dollars invested grow over the term of the mortgage to meet the amount of the principal borrowed to purchase the home. In the last year of the mortgage, the life insurance policy "endows," and the homeowner uses a one-time tax-free distribution from the life insurance policy to repay the mortgage.

The endowment mortgage has numerous advantages to UK borrowers and lenders. First, it is more tax-efficient for borrowers than a conventional amortization mortgage. This is because monthly payments include only interest and are therefore 100 percent tax deductible. Second, principal payments, made in the form of premium payments to the endowment policy (less the cost of mortality and insurance charges), accumulate tax free. This causes endowment policy assets to grow more rapidly, and in turn allows lenders to lower the amount of the required down payment. Third, it is a more secure lending vehicle for the lender. The lender has collateral rights to both the mortgaged property and the insurance policy. Fourth, because of the insurance component of the endowment mortgage, the homeowner has built-in security that so long as he or she maintains the mortgage payments, the survivors will inherit the mortgaged property free of the mortgage.

Subsequent generations of products have expanded on the endowment mortgage concept in the UK. Derivative versions of the product include the so-called Pension Mortgage and Personal Equity Plan (PEP) Mortgage. Both products link the UK equivalent of an Individual Retirement Account or Keough Account, term insurance, and a balloon payment mortgage. These financial products include all of the characteristics of an endowment mortgage (full deductibility of mortgage interest payments, life coverage, and tax-free accumulation of principal). The term insurance provides the life coverage component of the endowment mortgage, the Pension or PEP provides the tax-free accumulation of principal, and the balloon payment mortgage provides fully deductible loan interest. In addition, both the PEP and Pension mortgages have the additional benefit of offering at least a partially deductible principal repayment. Both PEP and Pension contributions are tax-deductible up to certain limits.

Endowment mortgages dominate the residential mortgage market in the UK. For example, approximately 82 percent of all mortgages underwritten in the UK in 1988 were endowment, pension, or PEP type mortgages. Conventional amortization type mortgages, similar to those commonly available in the United States, are also available in the UK, but these accounted for only 18 percent of new mortgage sales in 1988.

Despite their great success in the UK, endowment type mortgages have not similarly dominated the United States residential mortgage market, apparently largely due to the different laws of each nation. In the United States, federal statutes forbid most lenders from selling life insurance. Also, most states have laws forbidding tie-in sales of mortgages. A tie-in sale occurs when a lender insists that a borrower buy a particular insurance product from a particular life insurance company. Legal impediments also exist for life insurers wishing to lend money as an inducement to sell insurance. Further, in the United States the tax treatment of life insurance is different from that in the United Kingdom. In the United States, policyowners must pay taxes on policy distributions in excess of the basis (for US tax purposes, the basis is equal to cumulative premium payments) in the contract. In the UK, distributions from endowment type insurance contracts are tax free.

Thus, in the US there is a unique problem of how to lawfully combine a mortgage and life insurance and additionally make a viable financial product. Accordingly, it is not surprising that computer systems to illustrate such a financial product have been lacking in the United States.

A proposal to combine life insurance and a mortgage, implemented by means of a computer system, has been made in U.S. Pat. No. 4,876,648, titled "System and Method for Implementing and Administrating a Mortgage Plan" (Charles Lloyd) (hereinafter "LLOYD"), issued on Oct. 24, 1988. Under LLOYD's mortgage scheme, as it is presently understood, each year the lender charges some percent over the standard interest rate to cover the cost of insurance premiums ($100,000×1%=$1,000 in LLOYD's example). These insurance premium payments buy an insurance policy that is owned by the lender as the means by which the mortgage principal is repaid. At five-year intervals, the homeowner may receive a rebate of this extra interest paid (and deducted) by exercising a cost containment clause. At the execution of this clause, the lender makes a distribution equal to the policy premiums to the homeowner. For example, in year 20, the distribution would be equal to $20,000 for a total of 20 annual premiums of $1,000. By exercising the cost containment clause to obtain the $20,000 distribution and using that distribution to buy the life insurance policy from the lender at the lender's basis in the policy, $20,000, the homeowner can pay down the mortgage. That is, the homeowner now owns an insurance policy with a cash value of $40,648, which may be used to pay down the mortgage.

However, there are a number of significant problems with the LLOYD approach. These problems seem to center on the mechanism for getting the money out of the insurance policy to retire the mortgage, i.e., the cost containment clause. One significant problem that may be real or perceptual is the possibility that the financial product could be viewed as constituting an unlawful discrimination based on age and sex. That is, if the lender builds the cost of the policy premium into the mortgage interest rate, then there will be the appearance of charging different interest rates to different individuals based on their age and sex. Such pricing differences are lawful in a life insurance transaction because these factors relate to the insurance risk. But age and sex discrimination in lending is generally forbidden under the Equal Credit Opportunity Act, 15 U.S.C. § 1691(a)(1), which provides that "It shall be unlawful for any creditor to discriminate against any applicant with respect to any aspect of a credit transaction—(1) on the basis of race, color, religion, national origin, sex or marital status, or age. . . ."

It remains undecided whether a court would view the higher interest rate charged as an interest payment, and therefore subject to the regulations regarding equal treatment for all borrowers with the same credit rating, or as an insurance premium. Nonetheless, there may be a perception that there is some risk that whoever attempts to sell the LLOYD financial product would be sued and would lose, and the penalties for unlawful interest rate discrimination are considerable: 15 U.S.C. § 1691(e)(a) provides for class action suits; subsection (b) provides for punitive damages; and subsection (c) provides for recovery of attorney fees and costs. In the end, though, the perception of discrimination may be the real Achilles heel of the LLOYD financial product, as the lender would have to offer different rates based on age and sex.

Another drawback of the LLOYD approach is that it has potentially adverse tax consequences. It is unclear if the incremental interest in the LLOYD financial product is tax deductible as home mortgage interest or non-tax deductible as an insurance policy premium payment. That is, if the homeowner has taken a deduction for the incremental interest paid of $1,000 per year over the term of the mortgage, and the cost containment clause is exercised, it is not clear what the tax treatment of the rebate would be. Certainly the IRS will not permit the homeowner to take a deduction for an interest payment for money that is later rebated, and LLOYD acknowledges the possibility of a tax problem with his financial product. See Col. 16, lines 6–20.

For example, in order to buy the policy from the lender at its cost of $20,000, the LLOYD homeowner will have to pay the difference between the cost of the policy and the after-tax proceeds from the interest rebate. This amounts to about $14,000, assuming that the individual is in a 30 percent tax bracket.

Still another drawback to the LLOYD approach is its lack of flexibility. While LLOYD mentions the use of variable and fixed rate mortgages the borrower makes only fixed cost containment clause payments, and there exists no mechanism for adjusting the amount of the payments in the event of declining interest rates. The borrower is therefore financing the repayment of a fixed obligation (i.e., the mortgage) with a variable asset (i.e., an interest-sensitive universal life insurance policy). Thus, in the event of declining interest rates, there is no assurance that the cash value accumulated in the cost containment clause will be sufficient to completely repay the mortgage. Furthermore, if the individual wants to sell the home at any time other than at the precise five-year intervals required by the cost containment clause, he or she will lose the value of the incremental interest payments. It is undoubtedly cumbersome to have to retire the mortgage (i.e., exercise the cost containment clause) "only during the fifth, tenth, fifteenth, etc., years of the mortgage." See LLOYD at Col. 7, line 47–Col. 8, line 6.

Yet another problem with the LLOYD approach is that, under some circumstances, it appears that the lender may end up with either the incremental insurance payments or the insurance policy after the mortgage is retired. For example, if the home buyer missed the 30-day deadline required for the cost containment clause anniversary in year 20, even if the home buyer happens to have $20,000 and buys the policy outright, he or she will receive a policy worth $60,648. But because the home buyer has already invested $20,000 over the previous twenty years, the lender is $20,000 richer, and the homeowner $20,000 poorer, for the exchange.

In addition, there appears to be a potential problem with the approach of LLOYD under circumstances where the mortgage is paid off with cash, such as when the mortgaged property is sold. Assume a $100,000 mortgage is retired with cash at the end of the mortgage term. Under LLOYD, the borrower apparently must pay an additional $30,000 to purchase the insurance policy from the lender.

This is not to say that the financial product proposed in LLOYD is not worthwhile. Rather, LLOYD provides an excellent example of the difficulty in linking a mortgage and an insurance product under the present laws of the United States on a commercially feasible basis.

In sum, then, United States laws (which define a US mortgage) and other obstacles have seemingly prevented a mortgage/insurance type product from being sold. Despite great success of the endowment type mortgage in the United Kingdom, despite billions of dollars lost in bad real estate loans and many collapsed lenders in the United States, despite the creative prowess of the US financial industry which has tried and failed to successfully develop and sell anything resembling a UK endowment type program in the US, the problem remained unsolved: "for some renters longing to enter the housing market, the likelihood of coming up with a down payment may seem like a pie-in-the-sky notion." (Chicago Tribune, Jan. 24, 1992.) It remained for the present inventors to find a solution.

As a further aspect of the present invention, prior to the present invention, insurance quotes for term life insurance, health insurance, and dental insurance were available from a single computer, but universal life insurance quotes were not known to be available.

Using such single-computer based systems, insurance sellers of annuities, health policies, and term life insurance could request quotes from a large data base of insurance carriers' products. The computer computes the price of a particular financial product offered by a particular carrier for a given customer of a given age, sex, and health, or insured population profile. Then the computer repeats this operation for a large number of different insurance companies. Comparing the values so calculated for a larger number of different carriers' insurance products has permitted the computer to automatically identify that product which provides the best value for the consumer. This also permitted the seller to provide the insurance purchaser with the least expensive quote with a minimum of effort.

Companies which have developed and used technology of this kind include Quotesmith, in Palatine, Ill., Group Benefit Shoppers in Boulder, Colorado, Dinan in San Jose, Calif., Select Quote in San Francisco, Calif., and Insurance Information Inc. in Lowell, Mass. Quotesmith, Group Benefit Shoppers and Dinan operate primarily in the group medical field, identifying the best policy for brokers and agents seeking to offer competitive quotes. Quotesmith also uses its technology to provide a similar service to brokers wishing to identify the best term life insurance, single premium deferred annuity, individual medical insurance, and group dental insurance policies. Select Quote offers to find the lowest cost quote for a term life insurance policy, selling insurance to the general public on a discount basis. Insurance Information Inc. offers to find the best term life insurance policy for a fee. See "New Firms Offer Computer Listings Of Insurance Prices: Both Have National Ambitions; Both Are Interested in Affiliations with Banks," American Banker, Oct. 3, 1985, Pg. 1; "Here's how to find cheaper and better health insurance," Medical Economics, Mar. 19, 1990, Pg. 109; and "Health quoters target agents," National Underwriter Property & Casualty Risk-Benefits Management, Aug. 28, 1989, Pg. 9.

While companies have discussed a desire to have the ability to quote homeowners' insurance, a form of universal life insurance, as early as 1985, as of September 1993, no company or individual has been known to find a way to provide multiple universal life insurance quotes to the public in the United States from a single computer, let alone use that ability to identify the best product.

Instead, insurance agents, insurance brokers, and others representing individuals wishing to purchase universal life insurance policies have been forced to go to many different insurance companies to request quotes. Once received, these universal life insurance quotes have been difficult to compare. Differences in the way these carriers calculate the universal life insurance values have made product comparisons difficult. As a result, insurance sellers have been forced to conduct lengthy and time-consuming analyses to establish which was the best product for the customer. But in view of the aforementioned technological limitations and a fragmented life insurance industry with more than 5,000 carriers; brokers and agents work with only a few carriers. They have not had the ability to search out the best product for their customers. This has become increasingly problematic as product complexity has grown in the universal life insurance industry. Indeed, in some cases unscrupulous agents have taken advantage of increasing complexity in products to further their own unethical ends. In "Investigating Agents," Best's Review, September, 1993, pp. 29–30, the authors, Stefan E. Keller and Tony D'Orazio, pointed out, "The intricacies of these [life insurance] products require that agents and brokers be more educated than ever to be able to adequately represent the products to consumers. At the same time, the growing complexity increases the probability that products will be represented in an unethical fashion." In the absence of a systematic means for computing universal life insurance values and comparing products, a consumer purchasing a universal life insurance policy has little to assure himself or herself that he or she has purchased the best policy.

Once a seller has identified the appropriate product for an individual from one of the thousands of policies available, the process of completing the life insurance carrier's application forms and obtaining underwriting approval for the product can take weeks or months. Because carriers have different insurance forms, and no system has been designed to accommodate the different policies and their associated forms, even if a consumer, agent, or broker identifies the best policy, he or she might not have the appropriate policy forms on hand to initiate an application. He or she and would have to request these forms by mail and, having received them, complete them manually. Because many different carriers have different ways of assessing their underwriting risks, if the prospective insured is of less than perfect health, the agent or broker may have to request additional illustrations. (An illustration is a projection of estimated policy values over a defined period beginning in the present.) For example, a single "No" response to an underwriting question may trigger a rated policy with higher premiums. Such a policy rating would necessitate a new round of illustrations, starting the whole cycle of illustrations over again.

Given that a system for preparing and processing multiple universal life insurance quotes and for preparing and processing universal life insurance applications would be highly desirable, it would seem obvious that such a system should exist. However, there are several reasons that the aforementioned invention seems to have been elusive heretofore.

The first reason that multiple universal life insurance quotations have not been available from a single computer in the past has to do with, among other things, the mathematics of universal life insurance. Universal life insurance generally involve iteration computations, unlike health insurance, dental insurance, or term life insurance, where a strict linear relationship exists between a given set of insurance parameters (e.g., age, health characteristics, etc.) and the benefit cost. Therefore, product illustrations or projected values for those products require simply looking up the appropriate value in a data base structure based on a given set of product parameters. The best product, given the selection criteria presented, is always the cheapest product. However complicated, complexity of the design for such a system is limited to the requirements of table manipulation. In addition, the universal life insurance policy accumulates cash value. Universal life insurance is therefore a savings vehicle, and any system which produces universal life insurance illustrations must take into account the time value of money. The time value of money is an exponential, non-linear function. The relationships between the cash value accumulated by the policy, its death benefit, and the amount of premium needed to generate them, are also non-linear. They take into account the time value of money and other factors, such as Internal Revenue Service guidelines for the definition of insurance. Therefore, unlike term life insurance, health insurance and annuity products, such a system for illustrating universal life insurance cannot depend on tables of values which can be selected from using a simple set of selection parameters. Heretofore no system has been able to iterate sufficiently efficiently to find the lowest premium from among a large number of different universal life policies using a single, affordable computer.

A second reason that universal life quotes from multiple carriers have not been available from a single computer has to do with how universal life insurance calculations must be manipulated to solve for non-linear values. The best policy in a universal life insurance policy comparison can be determined in several ways other than by calculating the lowest premium. The best policy could also be a policy which remains in force for the longest period of time, given specific assumptions regarding interest rates and the insured person's longevity. On the other hand, the best policy could be the policy which provides the highest death benefit or cash value accumulation, given an assumed number of level premium payments over a stipulated period. Finally, the best policy could be the policy which provides the highest guaranteed rate of interest in times of low interest rates or the highest policy crediting rates during times of higher interest rates. The complexity of solving for these variables in a non-linear set of equations is an additional impediment to the development of such a system.

A third reason that universal life insurance quotes from multiple carriers have not been available from a single computer has to do with the way in which different life insurance carriers compute universal life insurance policy values. While most universal life policy illustration systems are structurally similar, many different carriers have different ways of computing the various elements of a life insurance policy. These different methods have evolved from actuarial conventions designed to reduce the complexity of computations prior to the age of computing, and, of course, through the process of product differentiation. For example, the way in which annual mortality rates are converted into monthly cost of insurance charges may be computed using a variety of different actuarial assumptions regarding the rate of deaths during the year. Some carriers assume deaths are evenly distributed across all twelve months. Other carriers assume more deaths at the end of the year. Other carriers assume the converse. Similarly, different carriers have different methods for calculating policy administrative expense charges and interest credited.

A fourth reason that universal life insurance quotes from multiple carriers have not been available from a single computer has to do with the way in which insurance is regulated. Each state has legal authority to regulate the way insurance is sold and the kind of insurance that is sold within its boundaries. Therefore, each product sold must be filed with the state insurance commissioner's office. Each state may require that universal life insurance policies have values that are calculated in different ways. For example, some states may require the use of unisex tables in computing mortality costs even though traditional actuarial principles might dictate otherwise. Other states might require different minimum guarantees in terms of the maximum insurance costs that a carrier may charge. Because in the United States an insurance quote system must be able to provide insurance quotes in more than one state in order to justify the cost of development, such state by state differences (added to the aforementioned product by product differences) increase the difficulty of developing a system for finding the best universal life insurance quote from a single computer.

II. OBJECTS OF THE PRESENT INVENTION

Therefore it is an object of the present invention to provide a computerized investment and mortgage payment calculation system which overcomes the previously mentioned disadvantages and limitations of the prior art.

A further object of this invention is to provide a computerized investment and mortgage illustration system, and a method of operating that system, in which a standardized illustration request form is filled out electronically for the purposes of providing a mortgage quote and an investment quote, and a means for computing mortgage and investment payments in conformity with those quotes.

An additional object of this invention is to provide a computerized investment and mortgage illustration system which uses a central computer to provide information concerning a mortgage using an investment as collateral and as a means for repaying the mortgage.

Another object of this invention is to provide a computer system for producing a printed illustration document which will permit comparison of the innovative financial product with other loan products.

Yet another object of this invention is to provide a computer system incorporating a central database into which data representing different lenders' mortgage rates is written and from which data is read in order to provide an illustration of a mortgage collateralized by an investment which is most suitable to the borrower's needs.

Still another object of this invention is to provide a computer system incorporating a central database into which data regarding different carriers' life insurance policies is written and verified by each such carrier authorized for retrieval thereof and from which is read data making up an illustration proposal of a mortgage backed by a life insurance policy which is most suitable to the borrower's needs given underwriting and policy requirements.

Still another object of the invention is to provide a computer system incorporating a central database accessible via modem capable of storing and transmitting locally applicable mortgage and insurance quotes on a national basis.

Still another object of this invention is to provide a computerized insurance and mortgage illustration system capable of showing the projected annual accumulation of life insurance cash values that (under current interest and mortality charge assumptions under a given life insurance carrier's life contract and authorized projections thereof) will provide collateral for a mortgage and which will eventually pay off that mortgage with the after-tax proceeds from surrendering the insurance policy after a stipulated period.

Still another object of this invention is to provide a computerized insurance and mortgage illustration system capable of showing the projected annual accumulation of life insurance cash values that (under current interest and mortality charge assumptions under a given life insurance carrier's life contract and authorized projections thereof) will provide collateral for a mortgage and which will eventually pay off that mortgage with the proceeds from a life insurance policy loan after a stipulated period.

Still another object of this invention is to provide a computerized insurance and mortgage illustration system capable of showing the projected annual accumulation of life insurance cash values that (under current interest and mortality charge assumptions under a given life insurance carrier's life contract and authorized projections thereof) will provide collateral for a mortgage and which will eventually pay off that mortgage with the proceeds from life insurance policy death benefits.

Still another object of this invention is to provide a computerized insurance and mortgage illustration system capable of showing the projected annual accumulation of life insurance cash values that (under current interest and mortality charge assumptions under a given life insurance carrier's life contract and authorized projections thereof) will provide collateral for a mortgage and which will eventually pay the interest on that mortgage with the proceeds from life insurance policy loans after a stipulated period.

Still another object of this invention is to provide a computerized insurance and mortgage illustration system capable of showing the annual death benefit amount which will provide for the payment of the remaining principal owed in each year over the stipulated term of the mortgage.

Still another object of this invention is to provide a computerized insurance system capable of identifying potentially higher risk individuals and providing specialized insurance values for those individuals in an illustration of a mortgage using life insurance cash values as collateral.

Still another object of this invention is to provide a computerized insurance and mortgage illustration system incorporating a central database into which data is written and from which such data is read, to provide the prospective applicant with finally printed, individualized, loan and insurance application forms prepared from standardized textual material in combination with the aforementioned information.

It is also an object of the present invention to provide a machine, manufacture, process, and improvement thereof in which an electrical signal processing system processes and modifies electrical signals representing data so as to overcome the aforementioned disadvantages of prior art systems and construct and manipulate multiple universal life insurance quotes by electrical engineering means.

Another object of this invention is to provide a machine, manufacture, process, and improvement thereof in which a computerized system is capable of using iteration to efficiently arrive at the correct amount of a universal life insurance policy premium and, indeed, amounts for other universal life insurance policies as well.

Yet another object of the invention is to provide a machine, manufacture, process, and improvement thereof in which a computerized system is capable of comparing multiple universal life insurance quotes in order to identify the policy which best fits a given consumer's needs as defined, for example, by the lowest premium, highest cash value, highest policy death benefit, or longest in-force policy life.

Yet another object of the invention is to provide a machine, manufacture, process, and improvement thereof in which a computerized system is capable of taking into account a large number of different actuarial methods for computing universal life insurance policy values.

Yet another object of the invention is to provide a machine, manufacture, process, and improvement thereof in which a computerized system is capable of accommodating different universal life insurance values from different states.

Yet another object of the invention is to provide a machine, manufacture, process, and improvement thereof in which a computerized system is adapted for preparing and processing universal life insurance quotes from many policies based on underwriting information obtained in a single set of questions common to all carriers.

Yet another object of the invention is to provide a machine, manufacture, process, and improvement thereof in which a computerized system in which different carriers' universal life insurance application forms are available electronically, and may be completed electronically for the purpose of producing both paper and electronic applications to be sent to a carrier.

Other objects and advantages of the present invention will become apparent from the following summary of the invention, drawings, and detailed description of the invention and its preferred embodiment.

Various other objects, advantages and features of the present invention will become readily apparent from the ensuing detailed description, and the novel features will be particularly pointed out in the appended claims.

III. SUMMARY OF THE INVENTION

In accordance with the broad, general objects of this invention, particularly as regards the mortgage aspect of the present invention, a computerized investment and mortgage illustration system is provided for use in illustrating and supporting an innovative financial product. The innovation involves a financial product using an investment other than a down payment (such as cash value life insurance) as collateral and a repayment means for a mortgage, preferably wherein the financial product is devoid of a cost containment clause. This can be accomplished, for example, by having the borrower own an insurance policy and use the policy to secure the loan. In one embodiment (to which the present invention is not limited), a party other than the lender or insurer can illustrate a combination of life insurance and a mortgage preferably selected from those of numerous lenders and insurers.

Accordingly, the present invention involves processing information in a standardized manner, preferably to package an individually selected mortgage product with an individually selected investment product, the products each being selected from respective groups of such products made available by different suppliers. The packaging process tailors the financial product to the prospective applicant's particular needs.

The system can, for example, be owned and operated by a suitably licensed national intermediary, for example, a broker or data processing company. The intermediary would work in conjunction with lenders, securities firms and life insurance companies (and their agents and representatives) and with mortgage brokers to design, develop, and distribute investment and mortgage products. The investment and mortgage products, when used in combination with one another, will provide mortages using an investment as supplemental collateral acceptable to lenders, mortgage insurers and endorsers, and investors in the secondary market for mortgages. The intermediary, operating nationally in cooperation with lenders and utilizing the system provided by this invention, can facilitate the sale of the combined investment/mortgage products by providing authorized lawyers, real estate agents, accountants, financial consultants, relocation specialists, corporate benefits advisors, or mortgage and/or life insurance agents and securities brokers with access to the system of this invention via remote terminals. As compensation for its work in designing the products, maintaining the system, and administering new kinds of supplemental collateral made possible by the system, the intermediary and user of the system would receive commissions for the sale of investments or, when appropriate, would receive fees for services provided.

Having a data processor or broker working in conjunction with lenders differs from past intermediaries both in the United States and the United Kingdom in that the system of this invention creates for the first time the capability of offering a number of different investment and mortgage products which may be used in conjunction with one another. By bringing these disparate products together in a combined format that is understandable to the end customer, the system permits the customer to have the benefit of access to a new composite mortgage instrument with supplemental security which would otherwise not be available, without encountering the aforementioned problems of the prior art.

A user of the system can be an employee of the aforementioned intermediary providing illustrations requested by individuals outside of that firm. Alternatively, a user of the system can be an individual who has received special approval from the intermediary to use the system.

A central processing unit in a digital computer is at the heart of the system. The central processing unit can access a database into which data is written and from which data is read. That data includes information regarding life insurance, mortgage information, actuarial information, insurance premium information, and predetermined text data for incorporation into the combined mortgage and insurance illustrations. The computer system further includes information corresponding to requirements of laws and regulations governing insurance and information on personal tax rates.

Plural terminals are provided for communicating with the central processing unit, each terminal having input means, such as a keyboard, and a display, such as a cathode ray tube (CRT) or a video display terminal (VDT). Each terminal is operable by a user to produce requests and to enter information and/or retrieve information for writing into and/or reading from the database via the central processing unit. The central processing unit provides a means for enabling access to the database in response to predetermined information entered at the terminal by the user and is suitably programmed to recognize particular authorizations.

In accordance with one desirable aspect of the invention, information regarding a life to be insured and other data needed to provide illustrations of a mortgage using life insurance as collateral for that individual is keyed into the central processing unit by a system user using a keyboard at a video display terminal. To assist the user in entering the appropriate data, a series of data comprising a "form" is displayed on the user's terminal by the central processing unit, and the user will normally proceed to enter pertinent information in the blanks provided. This information constitutes such things as the potential borrower's name and address, the amount of the mortgage requested, the amount of life insurance coverage required, the individual's personal tax rate, the number of points required by the lending institution, the individual's age, sex, and health status, and any other information necessary in providing an illustration of a mortgage using life insurance as collateral. This information is correlated via the central processing unit, resulting in the generation of premium quotation and mortgage illustration information. This information is then displayed at the user's terminal and can be printed out on the user's printer. Thus, in a matter of minutes, a prospective applicant is apprised of information pertinent to the mortgage such as (but not limited to) what the up-front payment and monthly payments would be for the mortgage if life insurance is used as collateral.

Once data called for by the "form" is entered into the computer system at the user's keyboard, a client information file or database record (hereinafter "client file") is established which will be variously updated as the user conducts sensitivity analyses of the impact of different insurance and loan related assumptions on the ultimate amount of the up-front payment and the mortgage. Once the prospective applicant decides to apply for a life insurance policy and loan, a final version of the illustration is saved by the user in a master database file for later retrieval and processing.

After input data has been compiled in a client file, errors or omissions in that data (e.g., the amount of requested insurance may be too high or omitted altogether, etc.) are detected. If these errors cannot be corrected immediately (for example, by supplying information from another file or record), further processing of the illustration request is suspended and the need for additional information is reported.

In the event that the prospective applicant wishes to proceed immediately to obtain the respective applications for the insurance and mortgage products, the system is capable of taking the information stored in a final illustration database file, requesting a minimum of information otherwise not required in the illustration process (such as the prospective applicant's personal balance sheet information, which typically is required in the loan application form) and merging it with prepared textual information about the insurance and loan products to generate printed application documents in a form acceptable to, and previously approved by, the lender and the insurance company. The system also permits the user to separately enter these forms and fill the forms out electronically. The application forms still require signature by the prospective applicant, however. When signed, these forms are sent, for example, by mail or courier, to the lending institution and the system owner/operator for further processing. Should the prospective applicant wish to have this process expedited, the user may send the information on the signed forms electronically to a computer at the lending institution and/or system owner/operator, facilitating processing in advance of the receipt of the signed paper copies.

An alternative method for entering client data into the system, rather than by entering this data directly at a user's terminal, is to have the prospective applicant manually complete insurance and loan illustration request forms which may or may not have been generated at the user's terminal. The request form can be sent by mail or courier to the system operator and entered by the user into the computer system.

By means of the aforementioned computer system, this invention makes it possible for the first time to offer the American consumer a US mortgage arrangement which will perform like the endowment mortgage available in the United Kingdom. This mortgage/insurance financial product (referenced herein as the "Ryan Mortgage") has innovative characteristics uniquely suited to the US legal environment, but without the drawbacks of LLOYD. Unlike LLOYD, the Ryan Mortgage is typically not a single financial product necessarily offered by a single seller (e.g., a lender). In a preferred embodiment, it is a combination of two or more different financial products offered by different suppliers (i.e., multiple lenders and multiple insurance carriers). Because the consumer, not the lender, is the owner of the life insurance policy, there is no cost containment clause in the Ryan Mortgage.

Also, the borrower owns the means for repaying the mortgage; the borrower may completely repay the mortgage without having to purchase the means for repaying the mortgage from the lender. Like the UK product, the key components to the transaction may include: a balloon repayment mortgage, life insurance coverage equal to the amount of the mortgage, and a separate vehicle for accumulating principal. Vehicles for accumulating principal might include a universal life insurance contract, an Individual Retirement Account, Keough Account, or zero coupon bond.

This description will focus on a preferred embodiment of the invention using as an investment a universal life insurance policy, but it is to be explicitly understood that other equivalent investments can be used as a means for repaying the mortgage, e.g., term life insurance with a zero coupon bond, IRA, Keough Account, or tax-deferred annuity, or some other (preferably tax-favored) means for producing secured revenue in conjunction with life insurance. Indeed, in another embodiment of the present invention, an investment for repaying the mortgage can be selected from any two or three of a group consisting of a life insurance policy, a security, and an annuity. Further, the mortgage repayment vehicle can comprise a plurality of these investments selected from the group.

As in the UK, a purchaser of a Ryan Mortgage will enjoy fully deductible mortgage interest payments over the life of the mortgage. Premium payments provide life insurance coverage, and tax-free growth of principal for the repayment of the mortgage.

Unlike the UK product or a conventional US mortgage, the Ryan Mortgage completely or partially replaces the traditional mortgage down payment with an insurance purchase. For example, to purchase a $262,000 home rather than pay $52,400 (20% of the home purchase price) as a down payment and borrow the remaining $209,600, the Ryan Mortgage home buyer pays $31,586 (12% of the home purchase price) to purchase a life insurance contract and borrows $262,000, the full purchase price of the home. The $31,586 life insurance investment provides paid up coverage for the remainder of the borrower's life. The policy also accumulates sufficient cash value to repay the $262,000 balloon payment mortgage loan when it comes due, for example, in thirty years. The borrower pays only monthly interest charges on the mortgage. Monthly mortgage payments do not include principal repayment. Monthly mortgage payments are one hundred percent tax deductible over the life of the mortgage. (See Specimen 2.)

Normally lenders are reluctant to provide financing for one hundred percent of the purchase price of a home and are unwilling to wait until the end of the mortgage for the repayment of principal. However, under the Ryan Mortgage, the lender has additional security: the real estate plus the insurance.

The Ryan Mortgage offers the borrower at least two premium payment methods. The first is a lump-sum prepayment. With a lump-sum prepayment, the home buyer deposits an amount sufficient to pay the first scheduled premium. He or she also deposits enough money to purchase an annuity contract that will pay three annual premium payments (for example) for the second through fourth years of the life insurance contract. For example, of the $31,586 payment described above, $8,916.16 would go to pay the first scheduled premium payment and $22,669.84 would go to purchase an annuity at the date of the mortgage closing. Over the next three years, the annuity will make the premium payment of $8,916.16 on the anniversary of the mortgage transaction. After making his or her lump-sum payment, the home buyer normally makes no further premium payments. While interest rates remain at or above the rate projected, these premium payments will be sufficient to ensure that the life insurance contract remains in force over the life of the mortgage. The premium is also large enough to assure that the policy will accumulate sufficient cash value to repay the mortgage by the end of the mortgage term. Normally, the lump-sum prepayment needed will be less than twenty percent of the purchase price of the home. (The standard down payment amount of a conventional home purchase is twenty percent of the purchase price.) Also, the after-tax monthly cost of the all-interest monthly mortgage payments will typically be less than or equal to the cost of a conventional mortgage with a similar down payment amount.

The second premium payment method involves the participation of a guarantor. A guarantor could be an employer wishing to provide a benefit for its employees to relocate for business purposes. Also, a guarantor could be a lender providing an irrevocable letter of credit in exchange for a fee. The guarantor provides financial assurances to the lender that the home buyer will make the annual insurance payments. In a guaranteed transaction, the homeowner's premium payment would usually be less than five percent of the purchase price of the home. For example, ten annual premium payments of $4,700.70 could provide adequate cash value to pay off the $262,000 mortgage obligation in the last year of the mortgage. A guarantor arrangement allows the home buyer to make a drastically reduced up-front payment. In this example, the first of ten annual premium payments, $4,700.70, amounts to 1.79% of the $262,000 home purchase price. However, the transaction will require the home buyer to make, for example, nine additional premium payments in upcoming years. These insurance payments are divided into monthly payments and paid into an escrow account. Thus, in the first years, the monthly cost to the prospective applicant will include these amounts which may inflate the Ryan Mortgage cost versus the conventional mortgage. Since the insurance premiums are typically lower for younger individuals, the Ryan Mortgage will be most attractive to that kind of person. Younger individuals, such as first time home buyers, are also the ones most likely to need the smallest possible up-front payment. (See Specimen 5 for sample system output.)

Under both premium payment plans, the borrower makes a collateral assignment of the policy to the lender or a third party endorser of the mortgage, such as a federal mortgage endorsement agency or a private mortgage insurance company. Under the terms of the collateral assignment agreement, the assignee has claim to the life insurance contract until the borrower repays the mortgage. When the borrower repays the mortgage, title to the home and the insurance policy vest in the borrower. If the borrower dies before the end of the mortgage term, the borrower's estate receives tax-free life insurance death benefit proceeds after deduction of the amount required to repay the mortgage obligation.

Should the home be sold for an amount which permits the mortgage to be paid out of the proceeds, the borrower will retain ownership of the life insurance contract. Such a life insurance policy has many uses. For example, the policyholder may use the policy as supplemental collateral for another mortgage and to replace the down payment in a subsequent home purchase and mortgage transaction.

Alternatively, the homeowner may not want to enter another Ryan Mortgage transaction. If so, he or she can keep the policy and take advantage of the many other benefits of a permanent life insurance policy. A policyholder may use the life insurance policy as a savings vehicle, a source of additional life insurance coverage, a source of cash for other obligations, or a means of financing retirement benefits. For example, the policyholder may pay additional premiums and enjoy tax-free accumulation of the invested principal. The policyholder may elect to reduce his or her coverage and withdraw cash from the policy via partial withdrawals or policy loans. Policy distributions can be used to pay for major expenses such as a new car, a medical emergency, or college tuition payments for children. If the policyholder no longer needs life insurance coverage, the policyholder can enter into a tax-free exchange of the life insurance policy. For example, the policyholder can exchange the life insurance policy for an annuity that provides monthly income in retirement.

The Ryan Mortgage has other unique features designed to maximize benefit to the consumer and minimize the after-tax cost of financing the mortgage. The homeowner may repay the mortgage in one of at least three ways at the end of the mortgage term. First, the homeowner may surrender the life insurance contract and use the proceeds of the policy surrender to pay off the mortgage. Under US tax law, presently, the policyholder must pay taxes on the interest income accumulated over the basis in the contract in the event of policy surrender. However, the policyholder will have had the benefit of tax-deferred accumulation of interest on the principal for up to forty years. Normally, cash value accumulated by the end of the mortgage will be sufficient to both repay the mortgage and pay the taxes on interest earnings.

Second, the homeowner may use a policy loan to pay off the mortgage. Life insurance contracts typically permit policyholders to borrow against the cash value of the life insurance policy. A policy loan differs from a mortgage or other loan from a lender in that the policy loan is nonrecourse debt. The insurance company, in issuing the policy loan, has recourse only to the life insurance policy cash value. Under some policy loan provisions, as long as the policy cash value exceeds the policy loan balance, the policyholder need never pay interest on the loan, or repay the policy loan balance. When the policyholder dies, the policy loan is deducted from the policy death benefit and the insurance company will pay the net death benefit remaining to the policyholder's estate.

The advantage of a policy loan over a policy surrender has to do with the income tax effects of the two transactions. Proceeds from policy surrenders which are in excess of the basis (premiums) represent taxable income to the policyholder. On the other hand, policy loans are not taxable income to the recipient. Therefore, by using a policy loan to repay the mortgage, the homeowner can simply hold the policy until death. Using this method, the policyholder never has to pay taxes on the accumulated interest earned in the life insurance contract.

A third option may be available to the homeowner with a good credit record during the life of the mortgage. The homeowner may roll over the mortgage in the last year and hold it until death. By using life insurance policy loans at the beginning of each year to pay the annual mortgage interest, the policyholder keeps more money in the life insurance contract and maintains a higher death benefit than if the money had been used to pay off the mortgage immediately. This approach also allows the homeowner to maintain tax-deductible mortgage interest payments in retirement.

Further, as regards the insurance component of the present invention, and in accordance with the broad, general objects of this invention, a digital signal processing system processes and modifies electrical signals representing data to construct multiple universal life insurance quotes. Accordingly, the present invention involves processing information in a standardized manner, preferably to offer an individually selected universal life insurance product, the product being selected from a group of such products made available by different suppliers.

The system can, for example, be owned and operated by a suitably licensed national intermediary, for example, a broker or data processing company. The intermediary would work in conjunction with life insurance companies (and their agents and representatives) to design, develop, and distribute universal life insurance policies. The intermediary, operating nationally in cooperation with life insurance companies and utilizing the system provided by this invention, can facilitate the sale of the universal life insurance by agents accessing the system of this invention via remote terminals.

A user of the system can be an employee of the aforementioned intermediary providing illustrations requested by individuals outside of that firm. Alternatively, a user of the system can be an individual who has received special approval from the intermediary to use the system. (In a simplified version of the product, it is anticipated that an authorized user might even include a member of the general public, in states where the direct sale of insurance via computer is permitted.) A central processing unit in an electrical digital computer is at the heart of the system. The central processing unit can access a database into which data is written and from which data is read. That data includes information regarding life insurance, actuarial information, insurance premium information, and predetermined text data for incorporation into the insurance illustrations. The computer system further includes information corresponding to requirements of laws and regulations governing insurance.

At least one, preferably multiple terminals are provided for communicating with the central processing unit, each terminal having input means, such as a keyboard, and a display, such as a cathode ray tube (CRT) or a video display terminal (VDT). Each terminal is operable by a user to produce requests and to enter information and/or retrieve information for writing into and/or reading from the database via the central processing unit. The central processing unit provides a means for enabling access to the database in response to predetermined information entered at the terminal by the user and is suitably programmed to recognize particular authorized users.

In accordance with one desirable aspect of the invention, information regarding a life to be insured and other data needed to provide an illustration of a universal life insurance policy for that individual is keyed into the computer system user using a keyboard at a video display terminal. To assist the user in entering the appropriate data, a series of data comprising a "form" is displayed on the user's terminal by the central processing unit, and the user will normally proceed to enter pertinent information in the blanks provided. This information constitutes such things as the potential insured's name and address, the amount of the mortgage requested, the amount of life insurance coverage required, the individual's age, sex, and health status, and any other information necessary in providing an illustration of a universal life insurance policy. This information is correlated via the central processing unit, resulting in the signal processing generation of premium quotation. This information is then displayed at the user's terminal and can be printed out on the user's printer. Thus, a prospective applicant is quickly apprised of information pertinent to the policy such as (but not limited to) what the premium payment would be.

Once data called for by the "form" is entered into the computer system at the user's keyboard, a client information file or database record (hereinafter "client file") is established which will be variously updated as the user conducts sensitivity analyses of the impact of different insurance-related assumptions on the ultimate amount of the premium payment. Once the prospective applicant decides to apply for a life insurance policy, a final version of the illustration is saved by the user in a master database file for later retrieval and processing.

After input data has been compiled in a client file, errors or omissions in that data (e.g., the amount of requested insurance may be too high, etc.) are detected. If these errors cannot be corrected immediately (for example, by supplying information from another file or record), further processing of the illustration request is suspended and the need for additional information is reported.

In the event that the prospective applicant wishes to proceed immediately to obtain the application for the insurance, the system is capable of taking the information stored in a final illustration database file, requesting a minimum of information otherwise not required in the illustration process (such as additional health information not taken in the initial illustration process) and merging it with prepared textual information about the insurance policy to generate printed application documents in a form acceptable to, and previously approved by, the insurance company. The system also permits the user to separately fill the forms out electronically. The application forms still can require signature by the prospective applicant, however. When signed, these forms are sent, for example, by mail or courier, to the system owner/operator (or carrier) for further processing. Should the prospective applicant wish to have this process expedited, the user may send the information on the signed forms electronically to a computer at the carrier, facilitating processing in advance of the receipt of the signed paper copies.

An alternative method for entering client data into the system, rather than by entering this data directly at a user's terminal, is to have the prospective applicant manually complete insurance illustration request forms which may or may not have been generated at the user's terminal. The request form can be sent by mail or courier to the system operator and entered by the user into the computer system.

By means of the aforementioned computer system, this invention makes it possible for the first time to offer the American consumer a universal life insurance policy which is verifiably the best policy to suit his or her needs. The need for such a capability is well documented: "There can hardly be a banker left in the United States who doesn't know that the insurance distribution system is costly, inefficient, and vulnerable to attack. There are more than 5,000 insurance companies in the United States, their products are sold one-on-one, and—although most of these products are commodities—their prices vary by hundreds of dollars," *American Banker*, Oct. 3, 1985, Pg. 1. While many have discussed creating such a system, it was left to the present inventor to conceive of a way to make the present invention.

IV. BRIEF DESCRIPTION OF THE FIGURES, SCREENS, VARIABLES, AND SPECIMENS— MORTGAGE COMPONENT

The following description, given by way of example and not intended to limit the present invention solely to the described embodiments, will be best understood in conjunction with the accompanying drawings, the computer or "user" screens, and specimens incorporated herein.

A. Figures

FIG. 3A-1 represents a schematic flow chart of the logic used in making standardized or "generic" illustrations designed to provide potential purchasers with examples of how the life insurance and mortgage combination might perform, according to the present invention.

FIGS. 3B-1–3B-8 provide a flow chart of the logic used in calculating and printing an individualized or "new" prospective applicant illustration tailored to the individual, and in creating a corresponding new prospective applicant data file, in accordance with the present invention.

Figure 1:
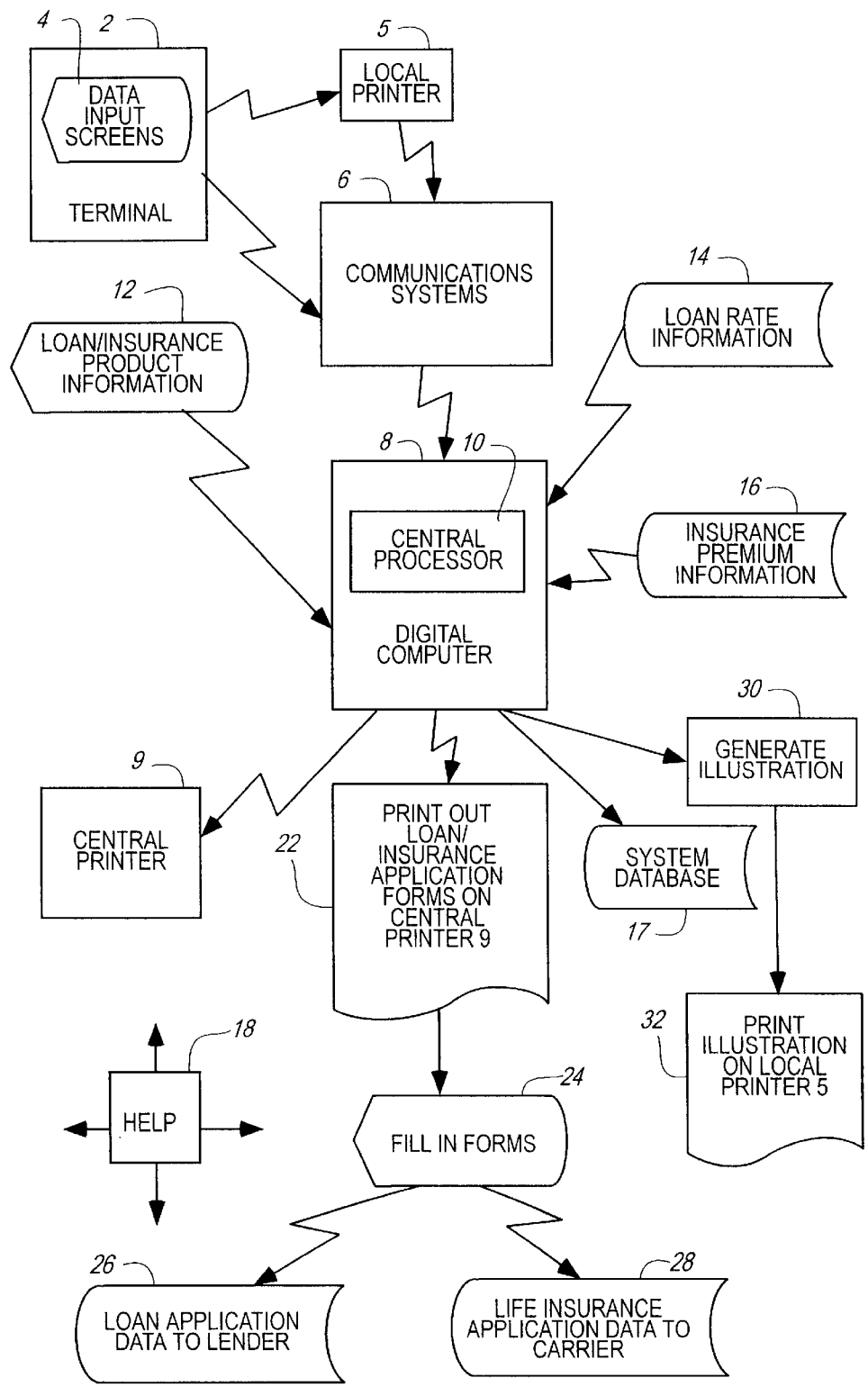
FIG. 1 is a schematic representation of the computerized insurance and mortgage illustration system of the present invention.
Figures 1, 3A:
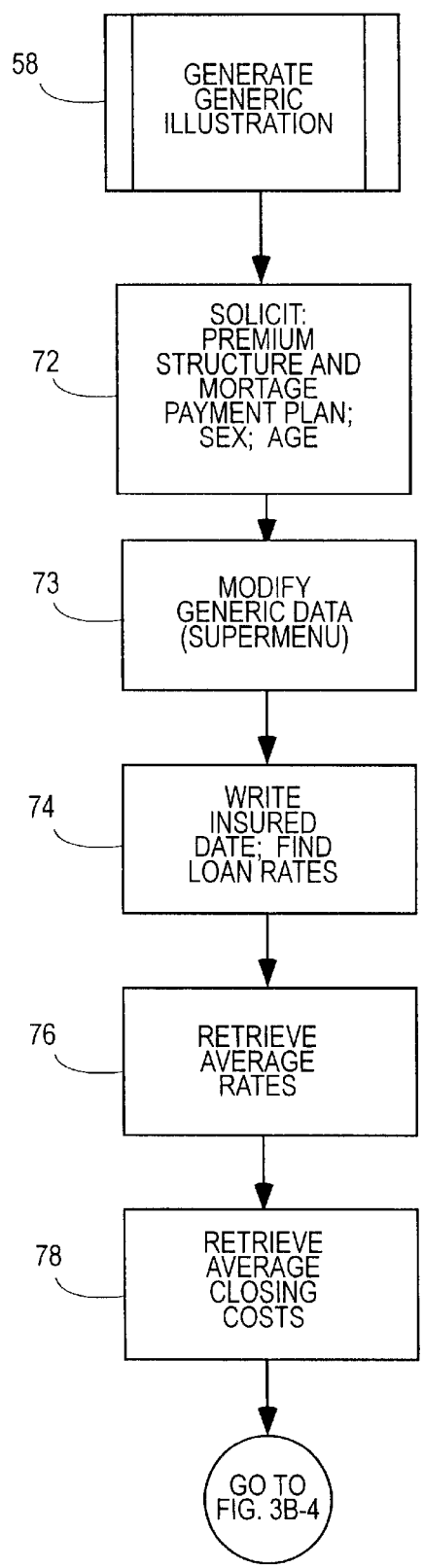
Figures 1, 3B:
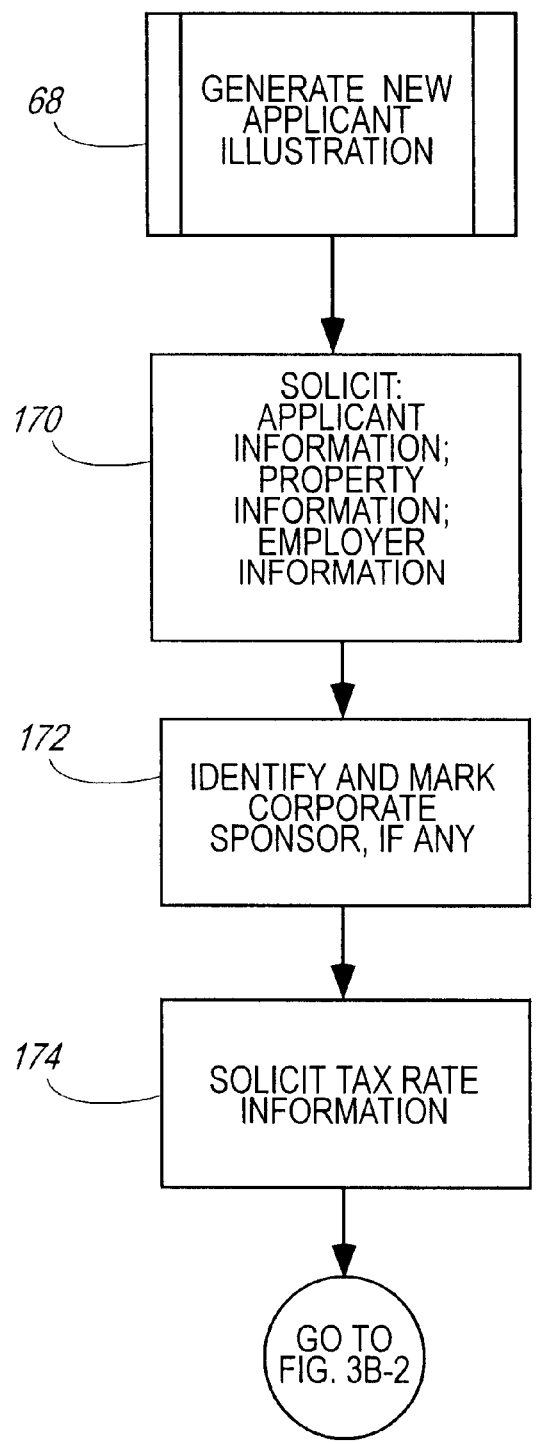
Figures 2, 3B:
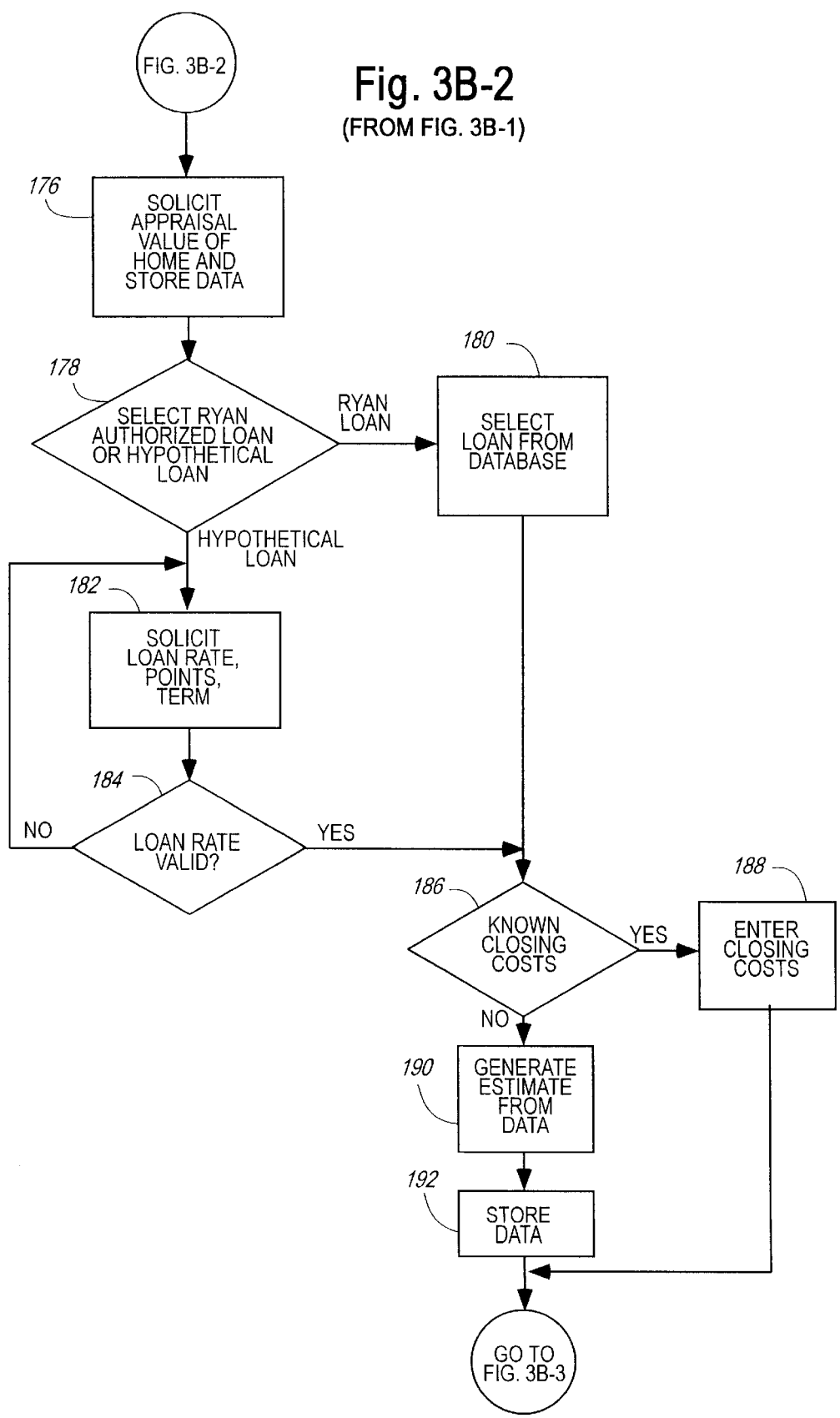
Figures 3, 3B, 4:
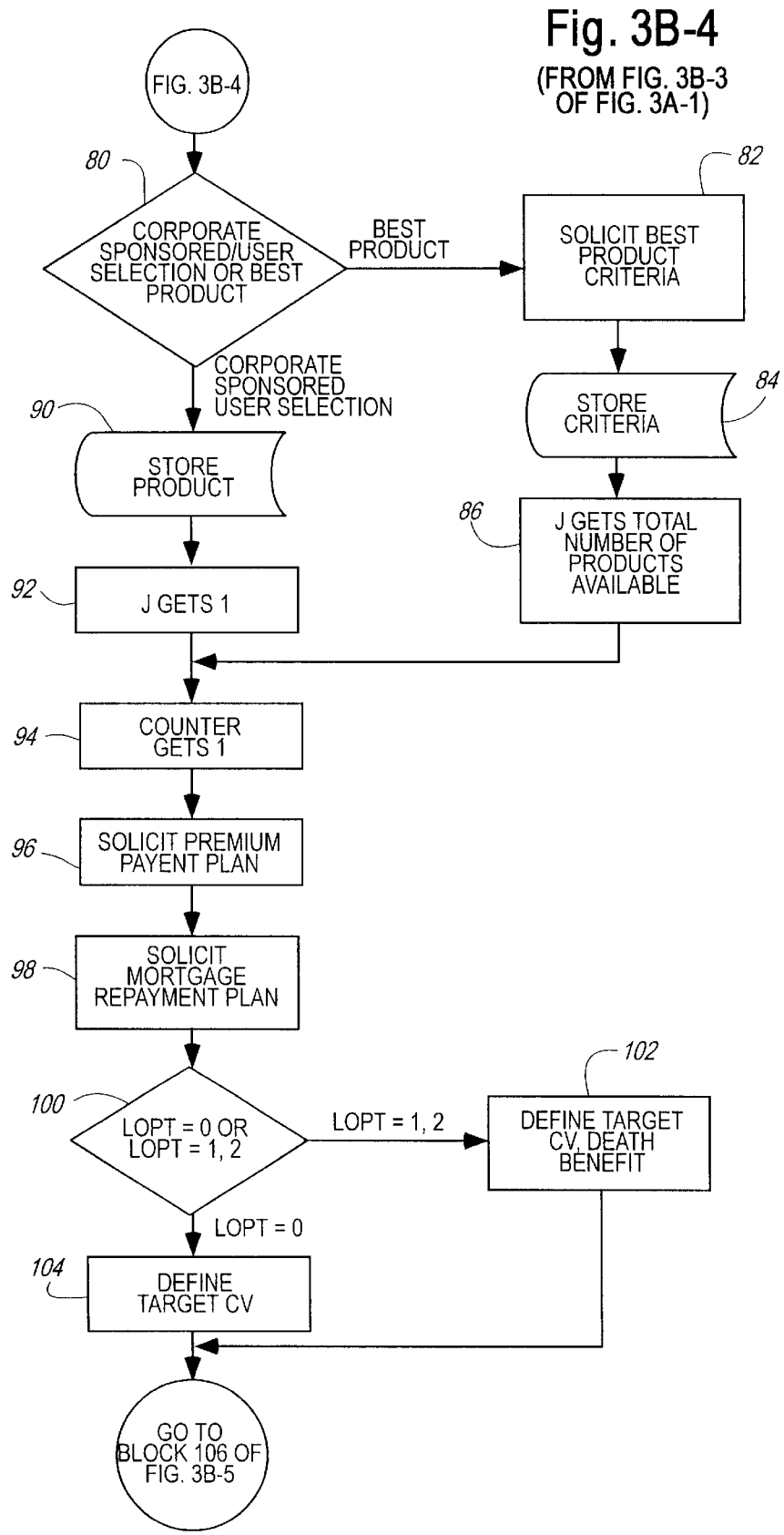
FIG. 3 depicts the logic behind the illustration function of the present invention.
Figures 3, 3B, 4, 5:
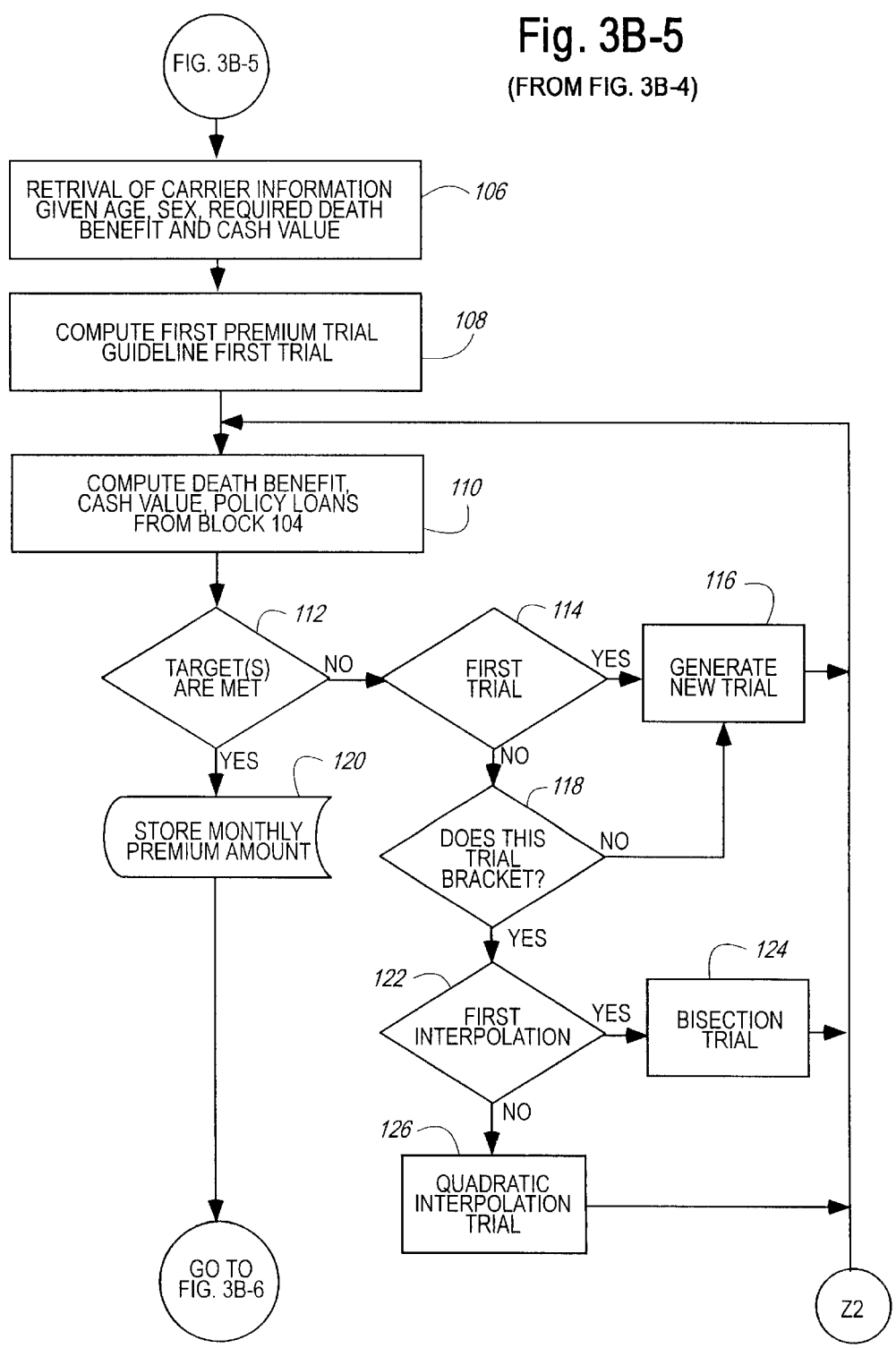
Figures 3, 3B, 4, 5, 6, 7:
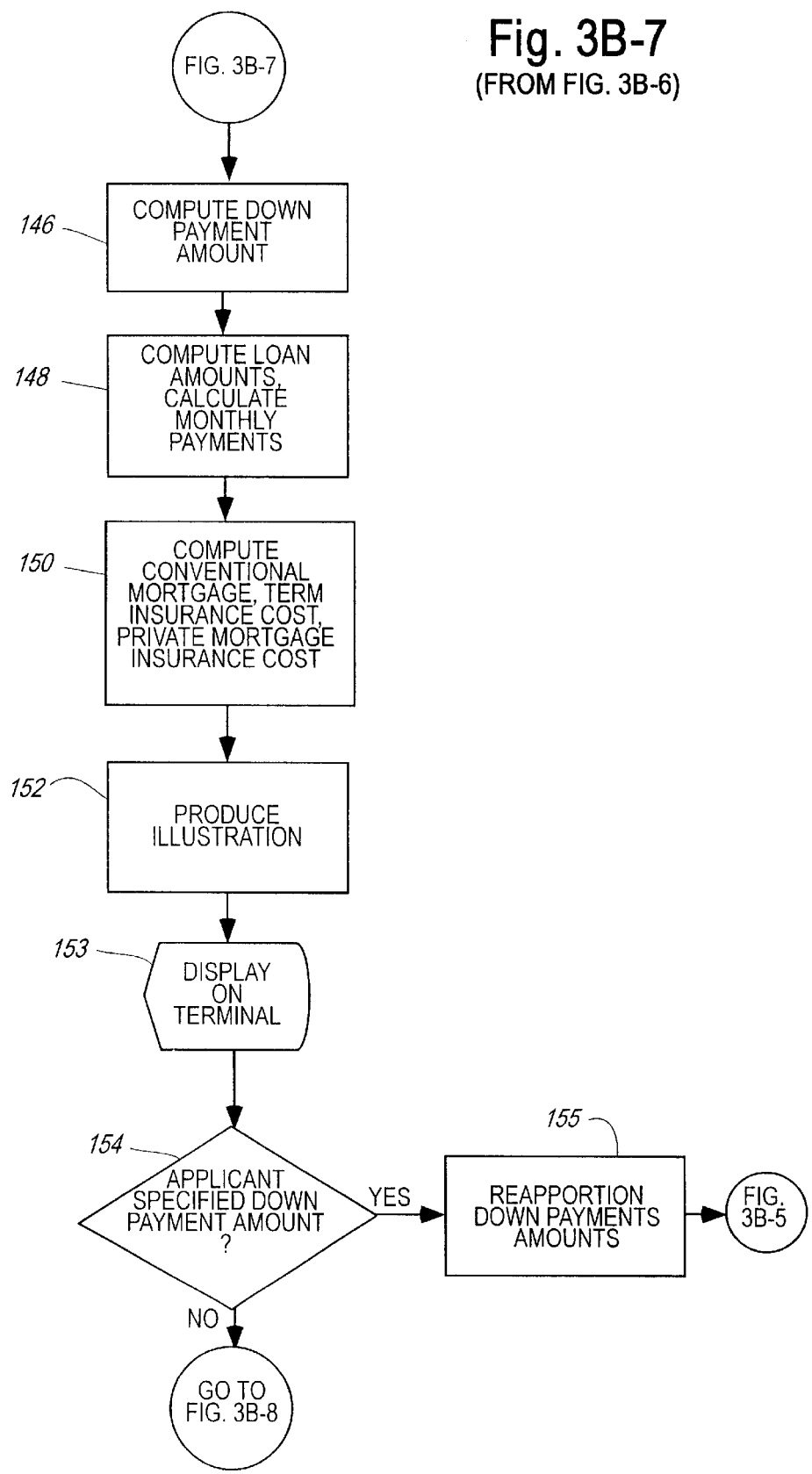
Figures 3, 3B, 4, 5, 6, 7, 8:
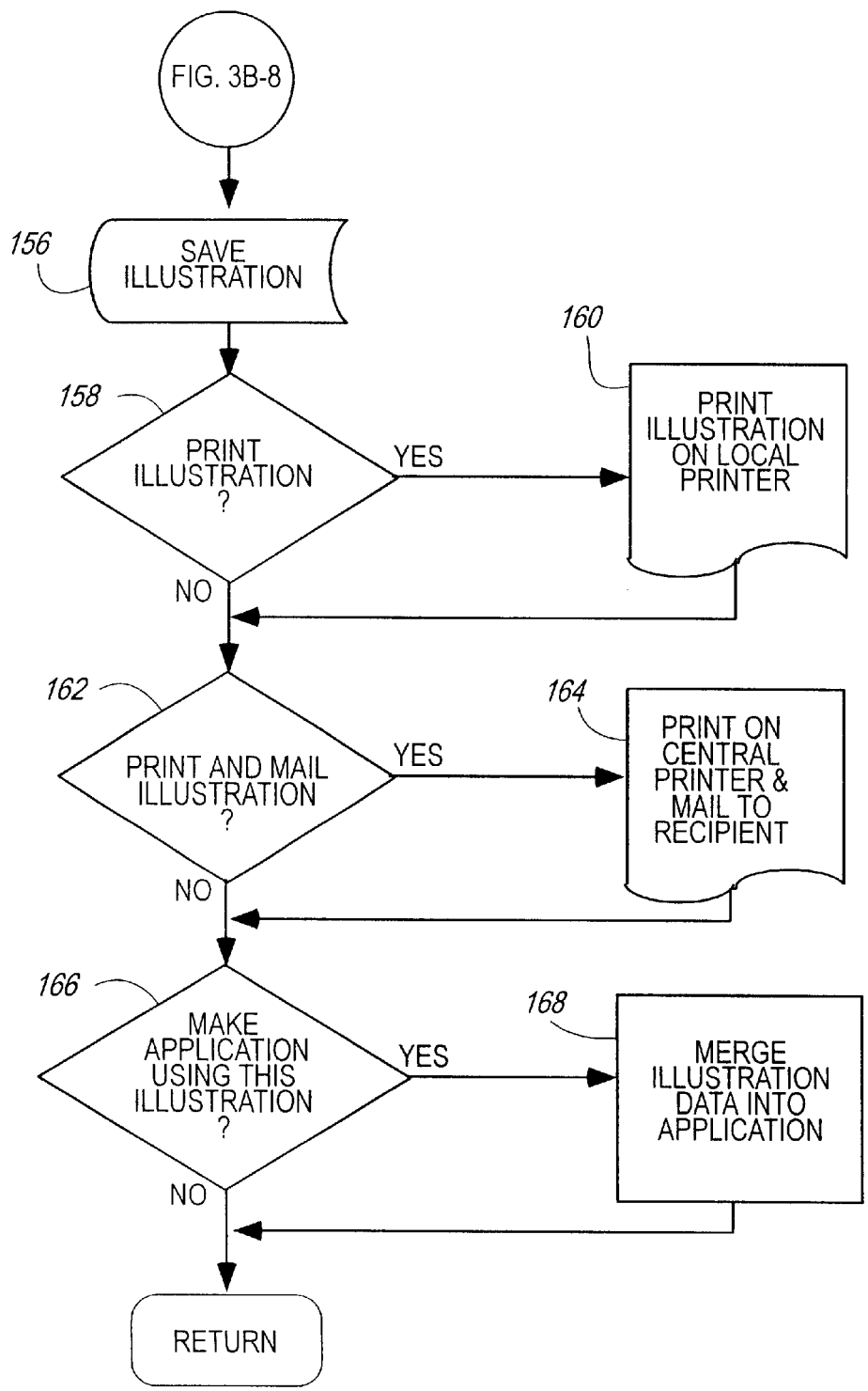
Figures 1, 3C:
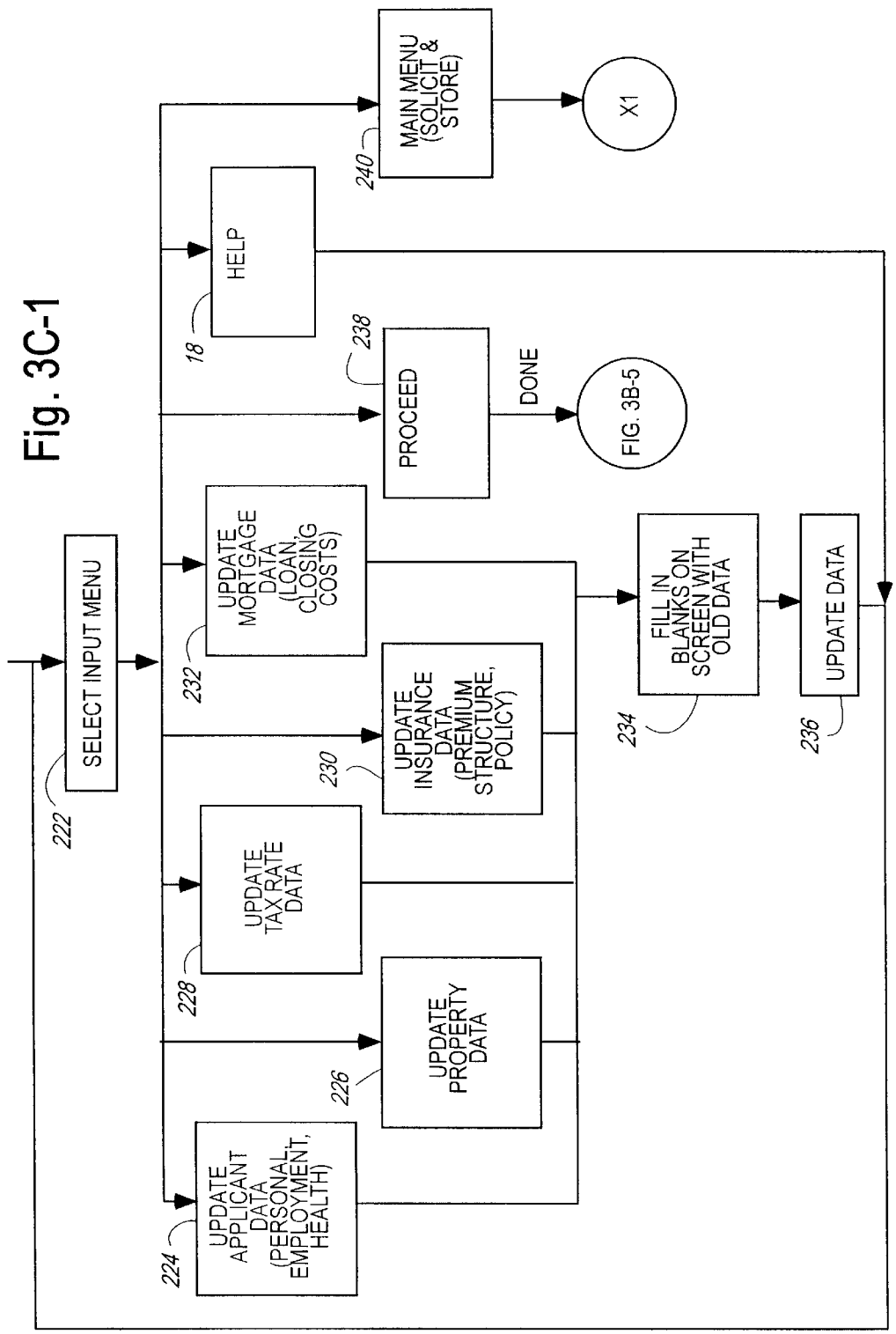

FIG. 3C-1 provides a flow chart of the logic used in changing or updating an existing client data file for the purpose of providing the prospective applicant new illustrations based on assumptions which differ from those originally illustrated, in accordance with the present invention.

Figures 1, 3D:
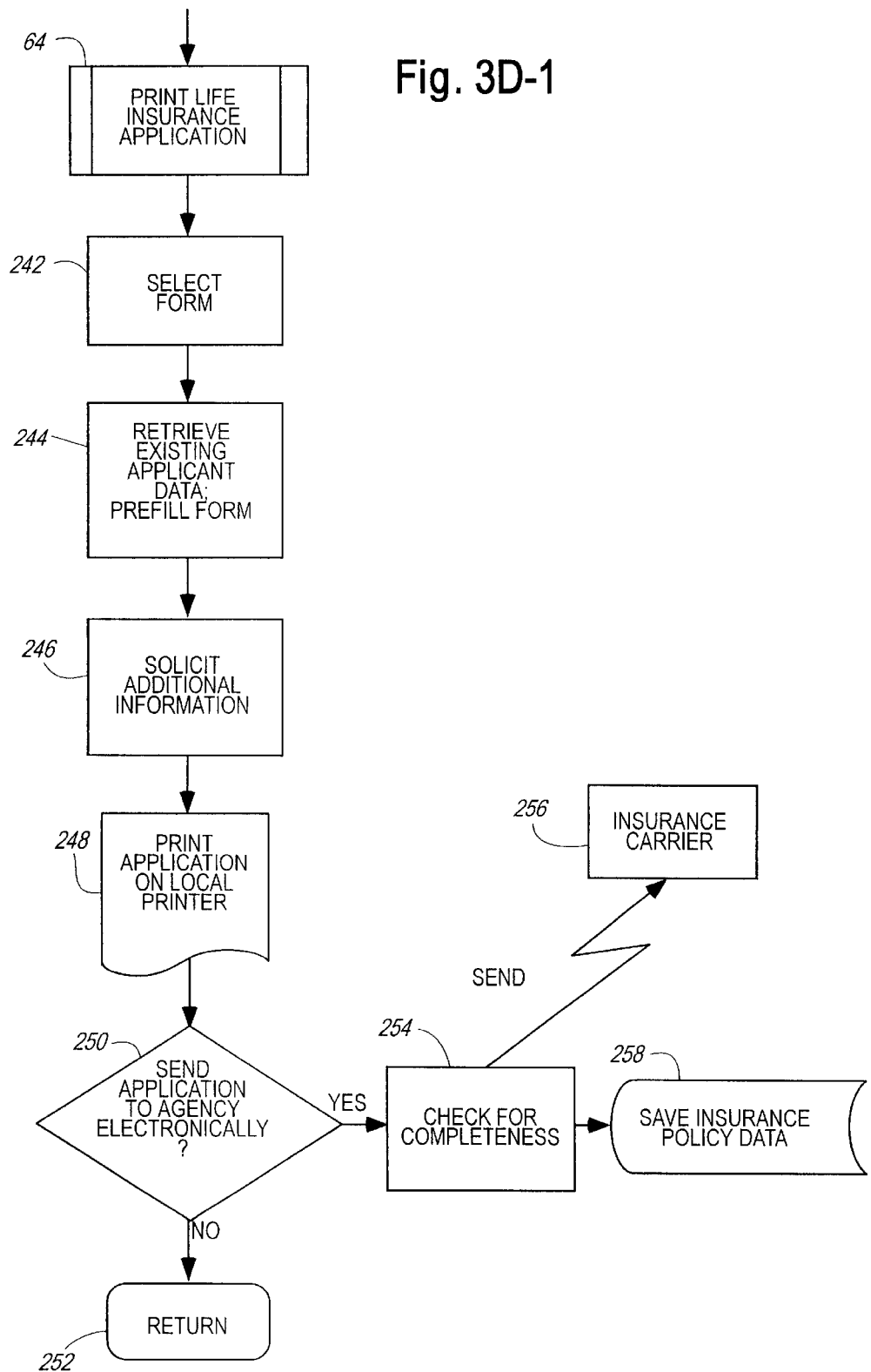

FIG. 3D-1 represents a flow chart of the logic used in electronically completing and/or printing a life insurance application form and storing the information contained on the insurance application form in a database of the host computer for later retrieval, in accordance with the present invention.

Figures 1, 3E:
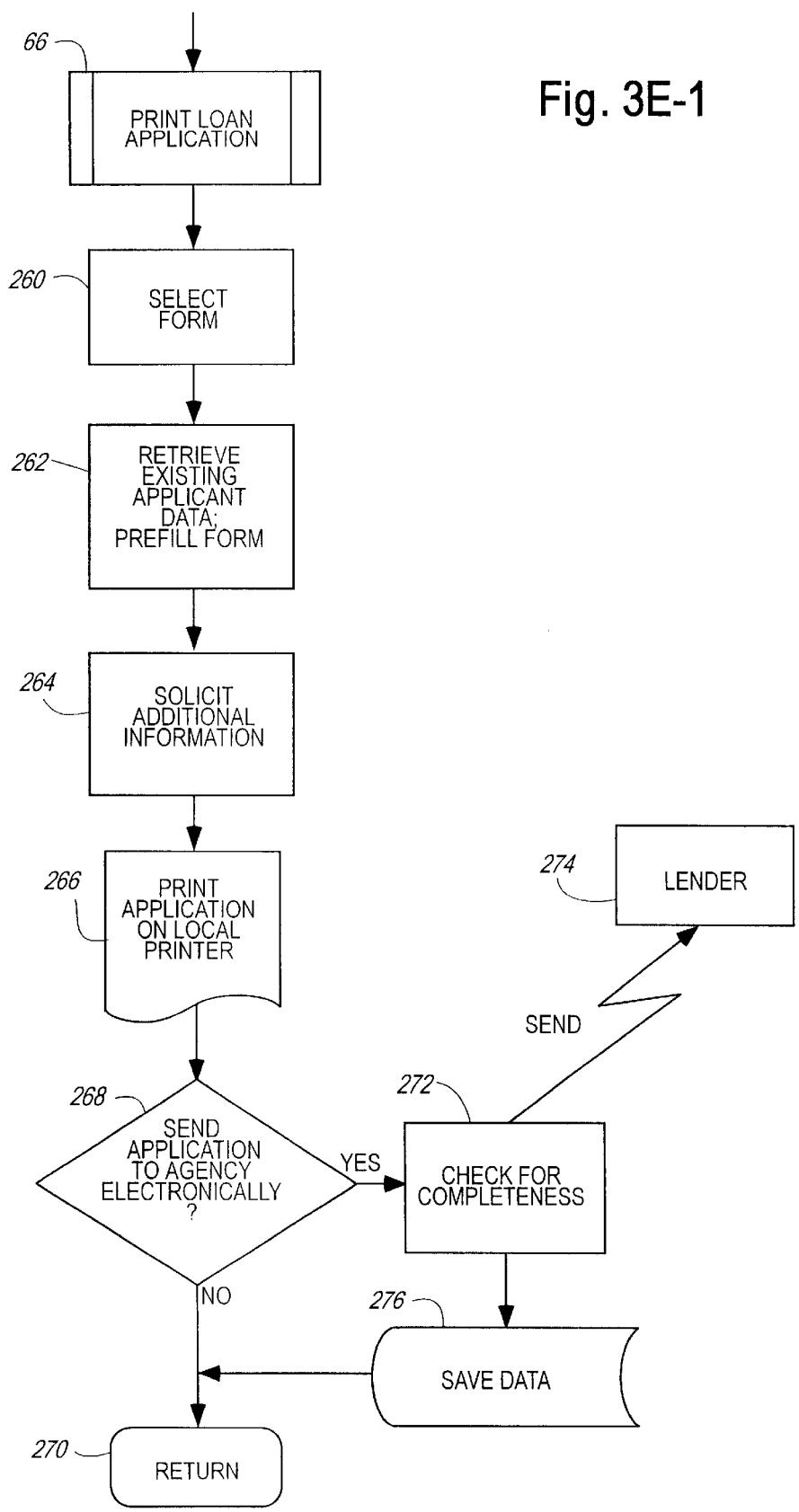

FIG. 3E-1 represents a flow chart of the logic used in electronically completing and/or printing a mortgage loan application form and storing the information contained on the mortgage loan application form in a database of the host computer for later retrieval, in accordance with the present invention.

Figures 1, 3F:
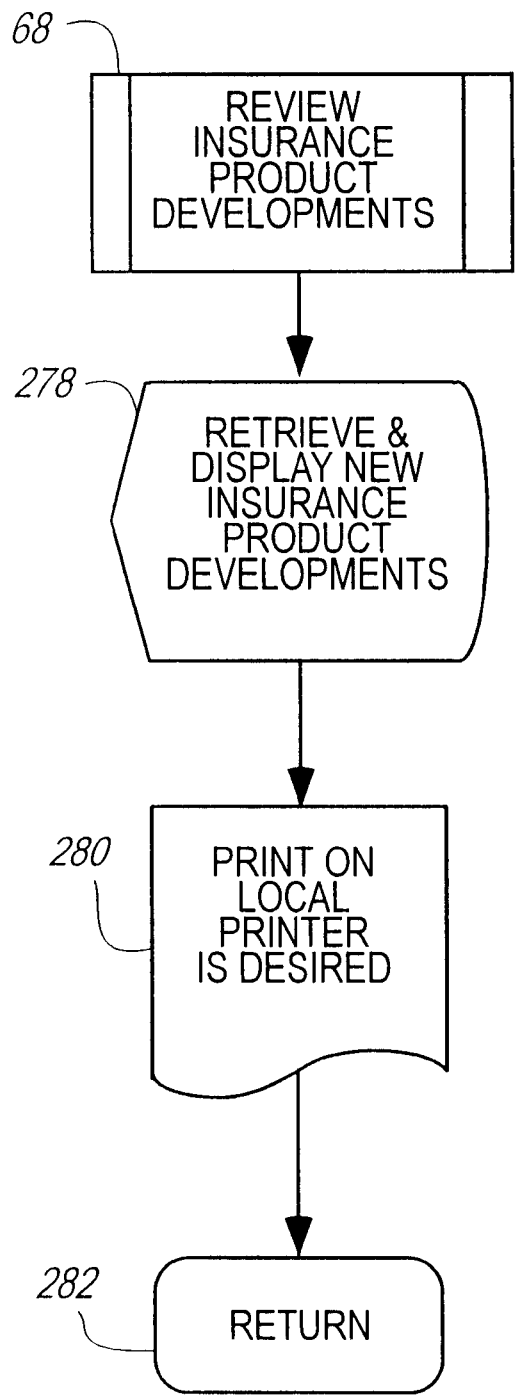

FIG. 3F-1 represents a flow chart of the logic used to access the host computer for, and/or print out information regarding, new insurance product developments.

Figures 1, 3G:
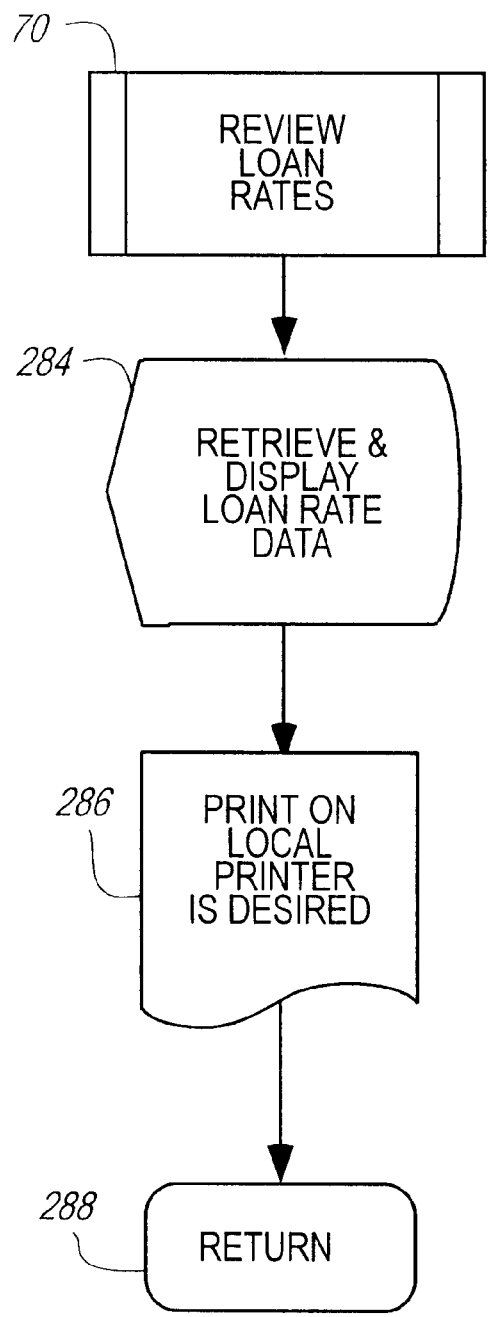

FIG. 3G-1 represents a flow chart of the logic used to access the host computer for, and/or print out information regarding, current loan rates and other mortgage-product related information.

Figure 2:
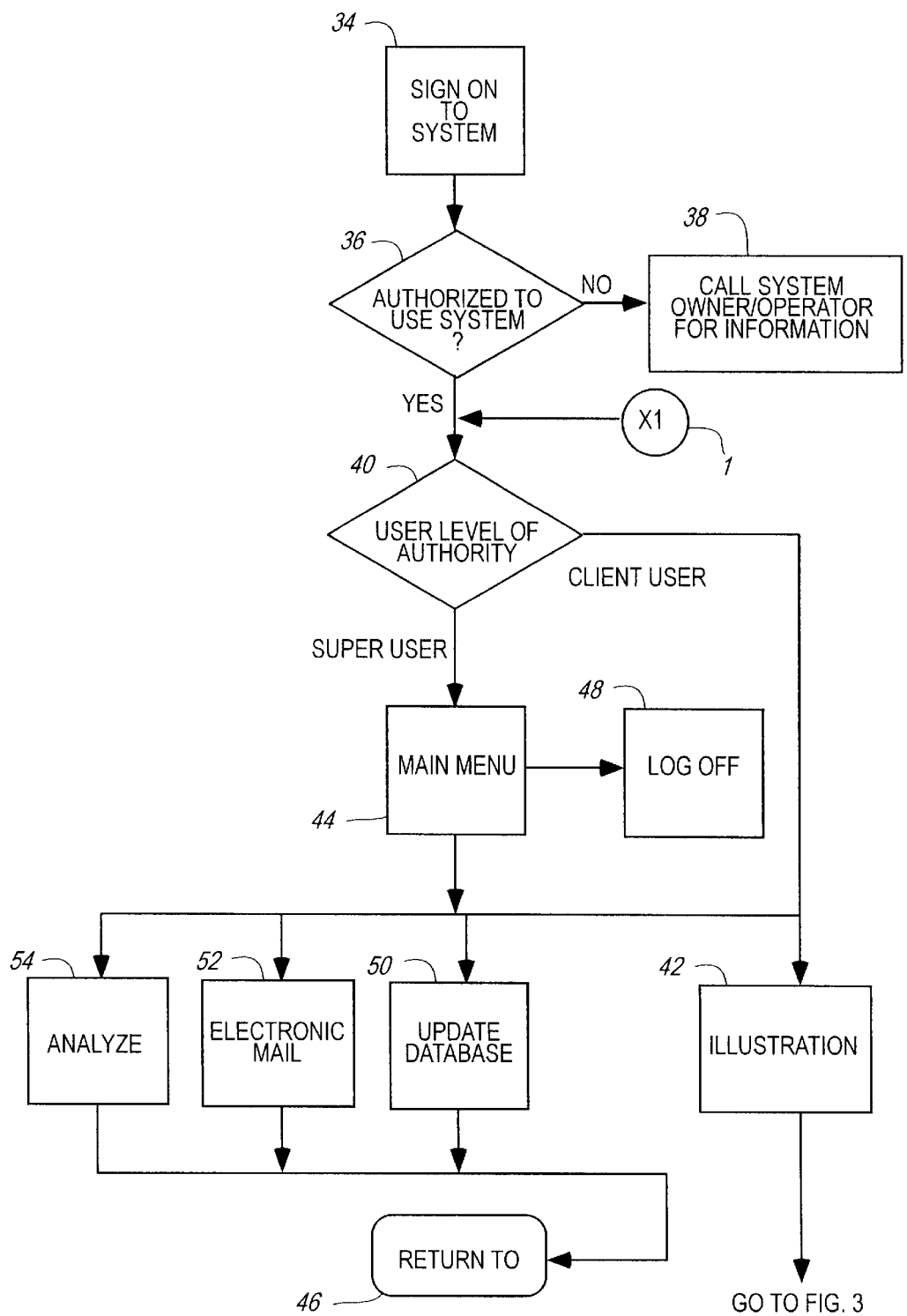
FIG. 2 represents a schematic flow chart of the logic behind the "main menu" (or user screen with a list of the functional choices that the computerized system provides to users) of the present invention.
Figures 1, 3H:
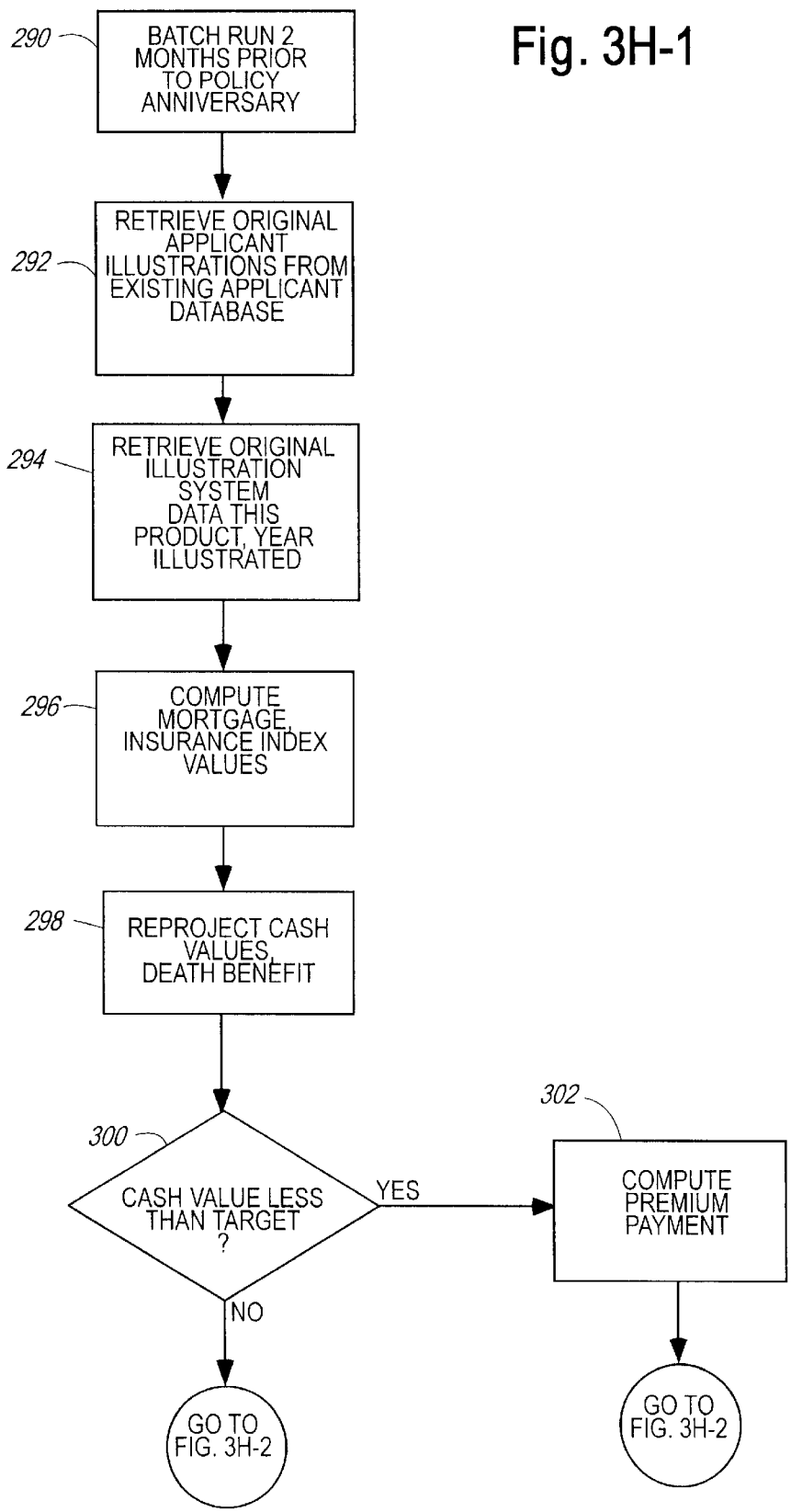
Figures 2, 3H:
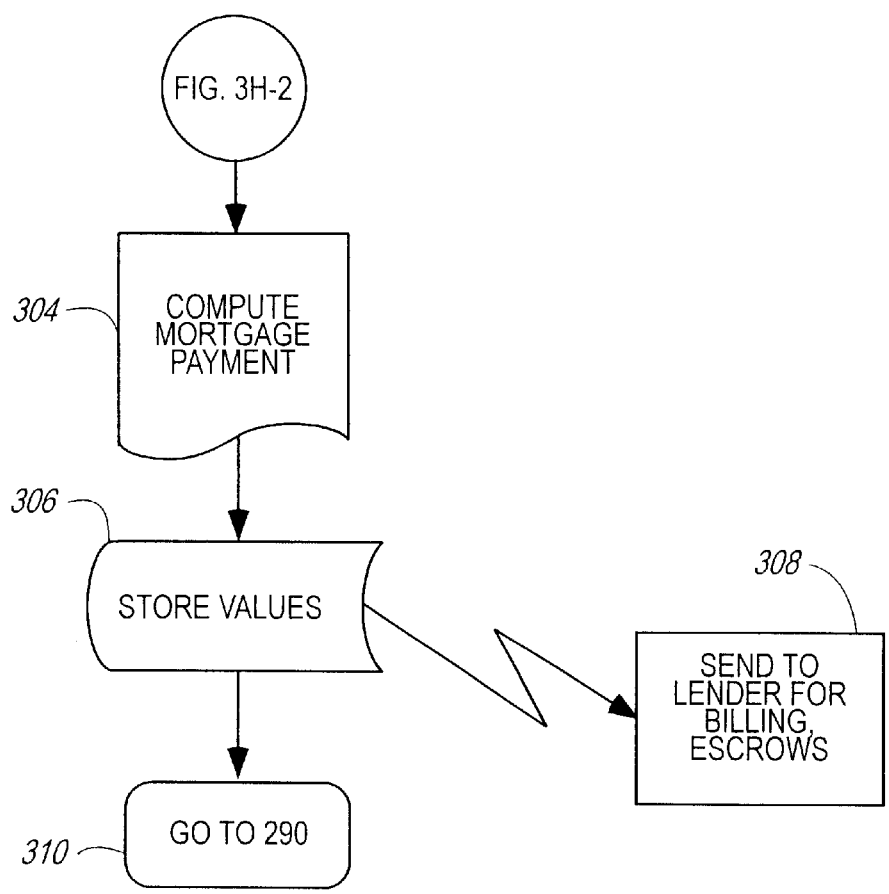
Figure 4:
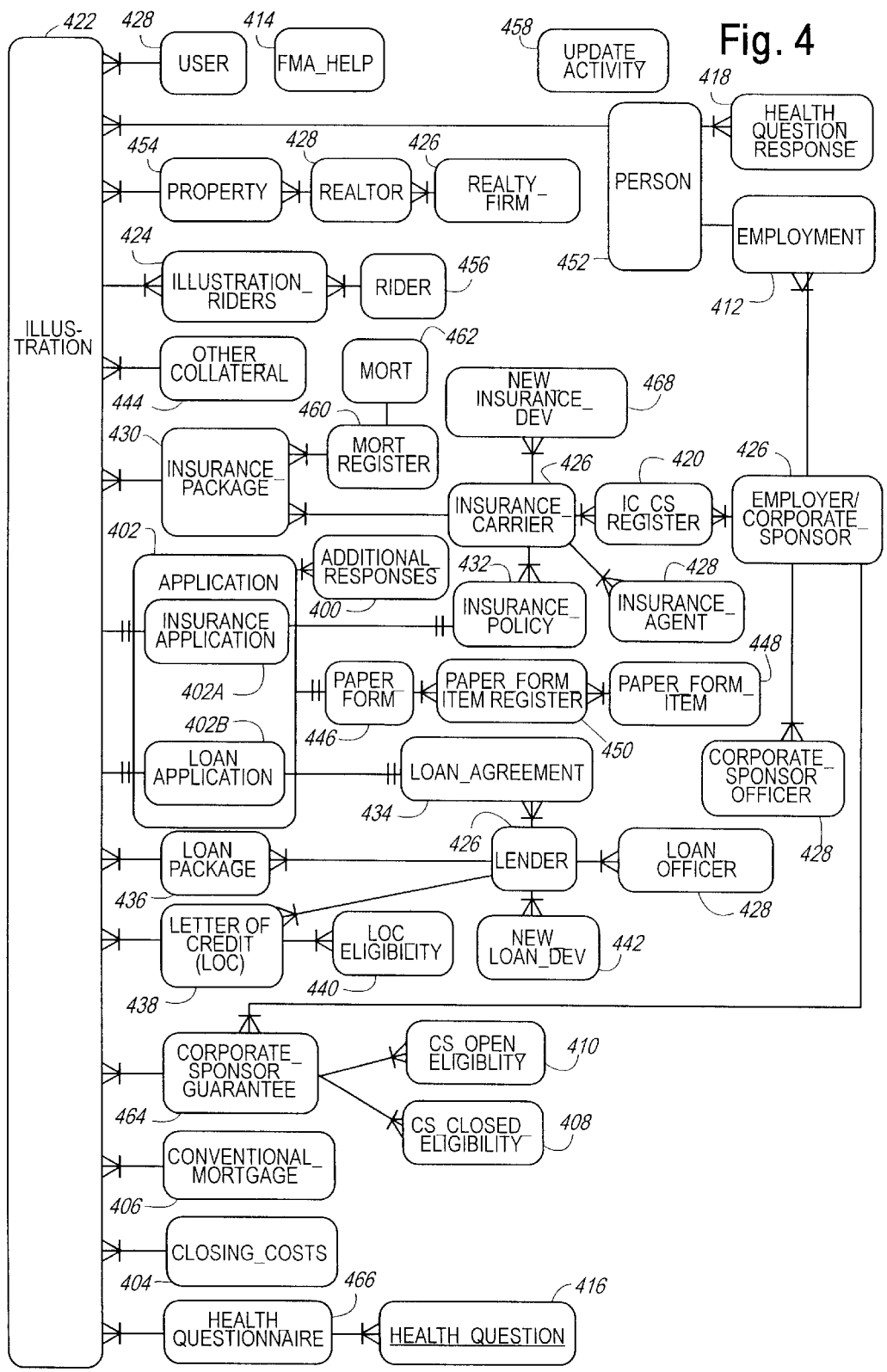
Figures 5, 6, 7:
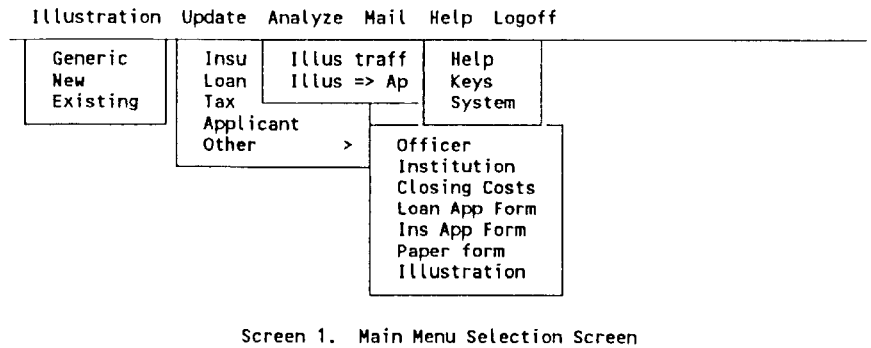

FIGS. 3H-1–3H-2 provide a flow chart of the logic used in recalculating a homeowner's mortgage and premium payments in a given year after the mortgage transaction has been completed.

FIGS. 4–35C are schematic representations of the relationships between various data entities (database tables) within the database system of the present invention.

FIG. 5 is a representation of a computer user screen, User Screen 1, in accordance with the present invention.

FIG. 6 is a representation of a computer user screen, Screen 2 in accordance with the present invention.

FIG. 7 is a representation of a computer user screen, Screen 3 in accordance with the present invention.

FIG. 8 is a representation of a computer user screen, Screen 4 in accordance with the present invention.

Figure 37A:
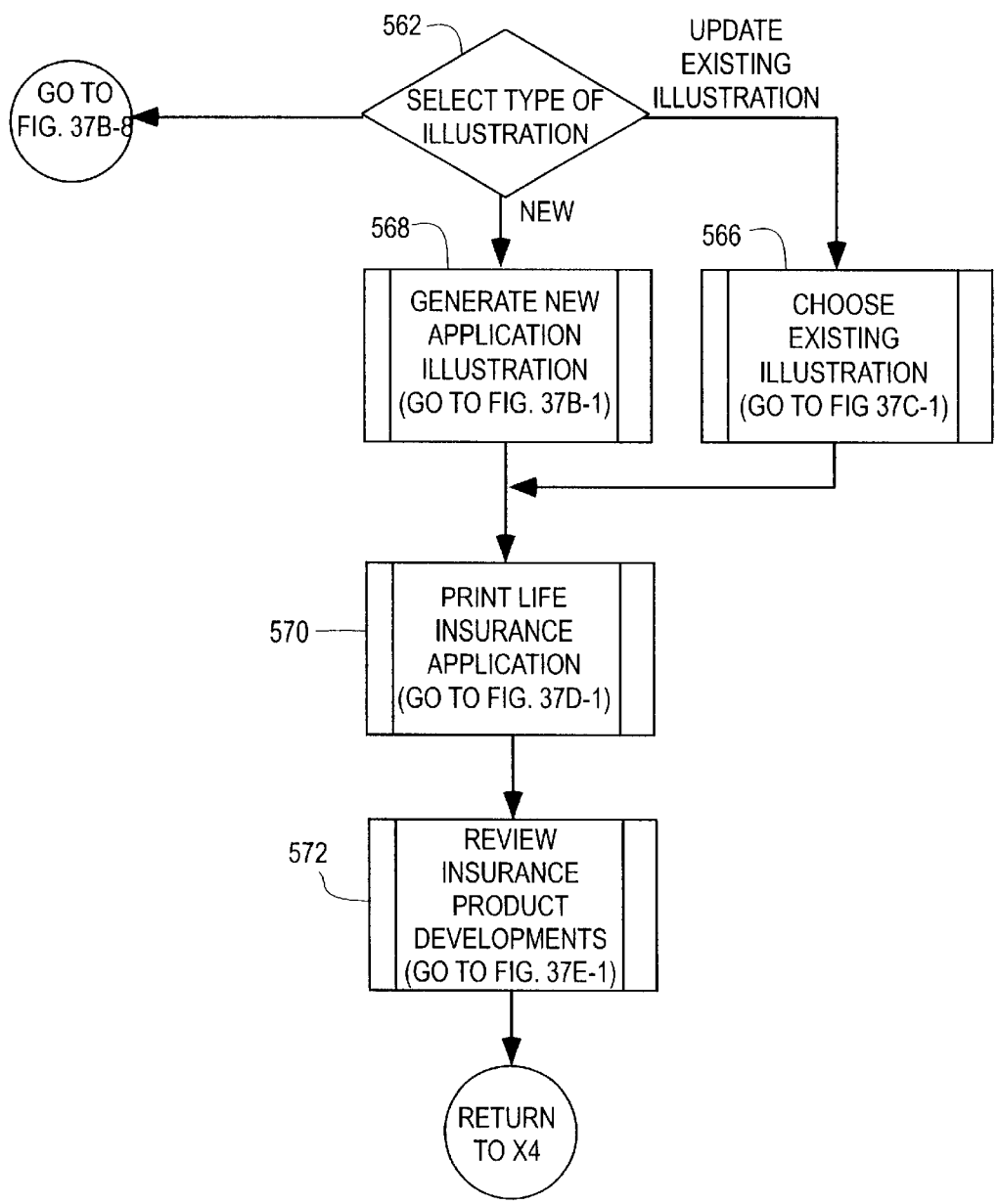
Figures 1, 37B:
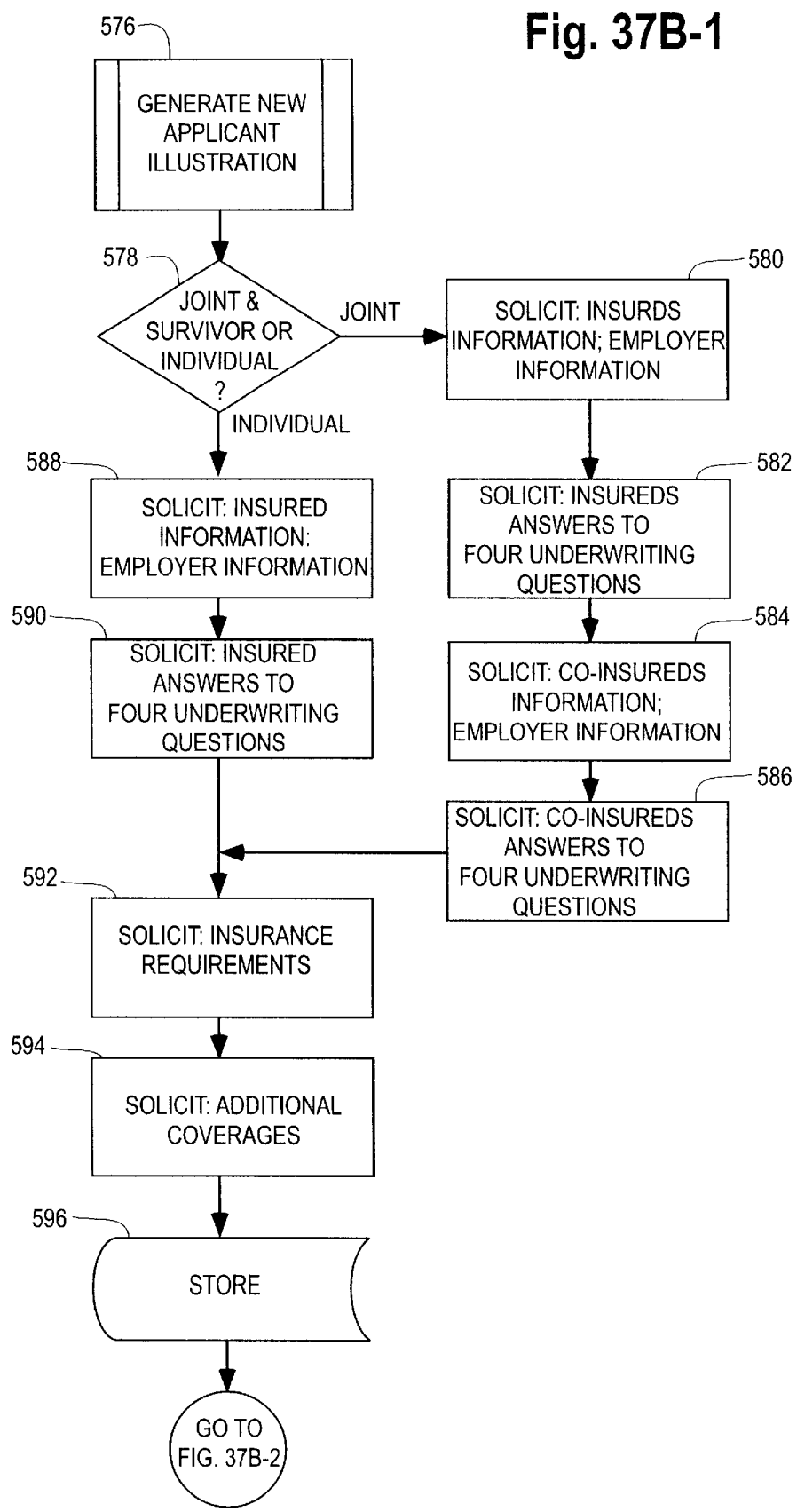
Figures 2, 37B:
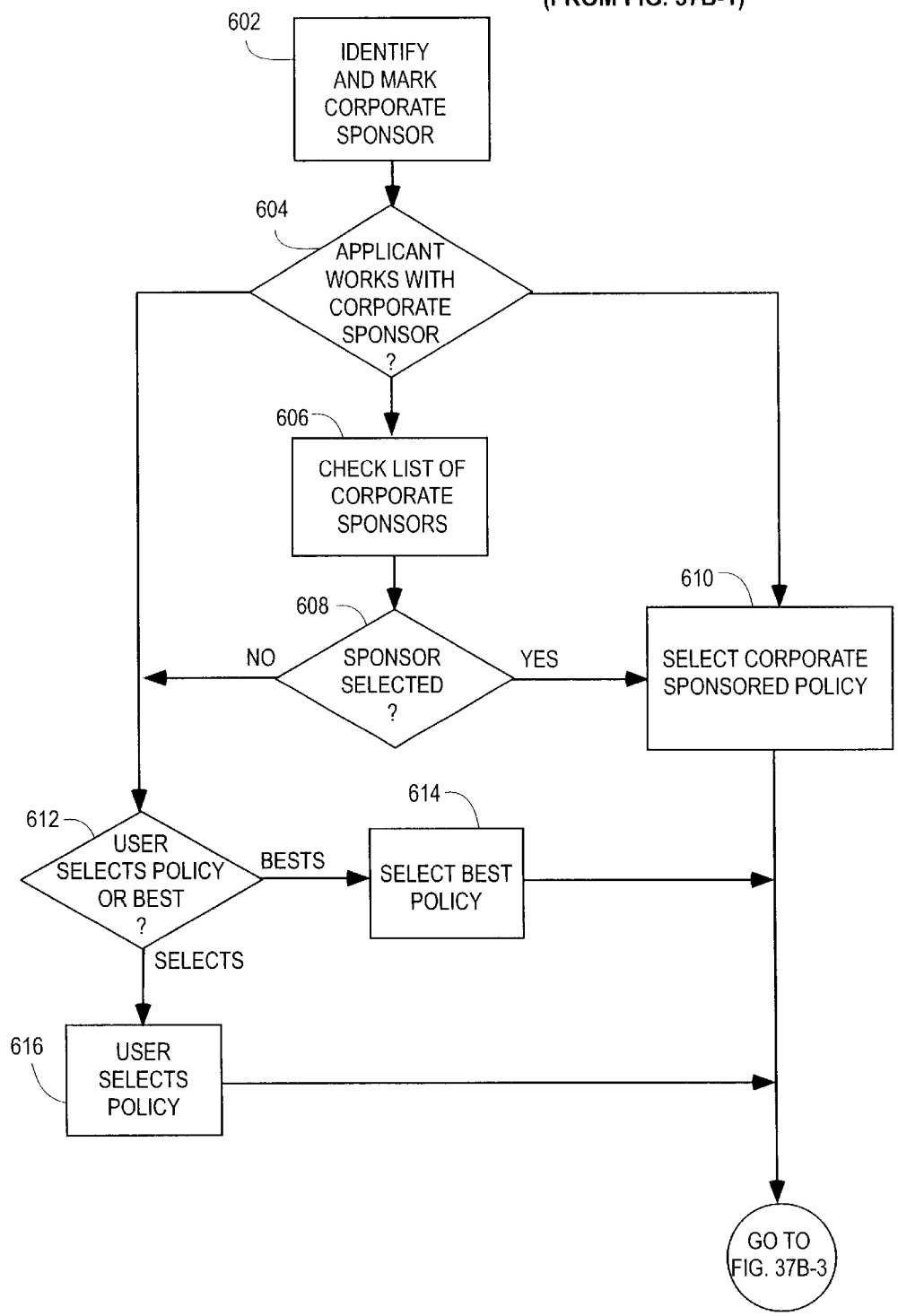
Figures 3, 37B:
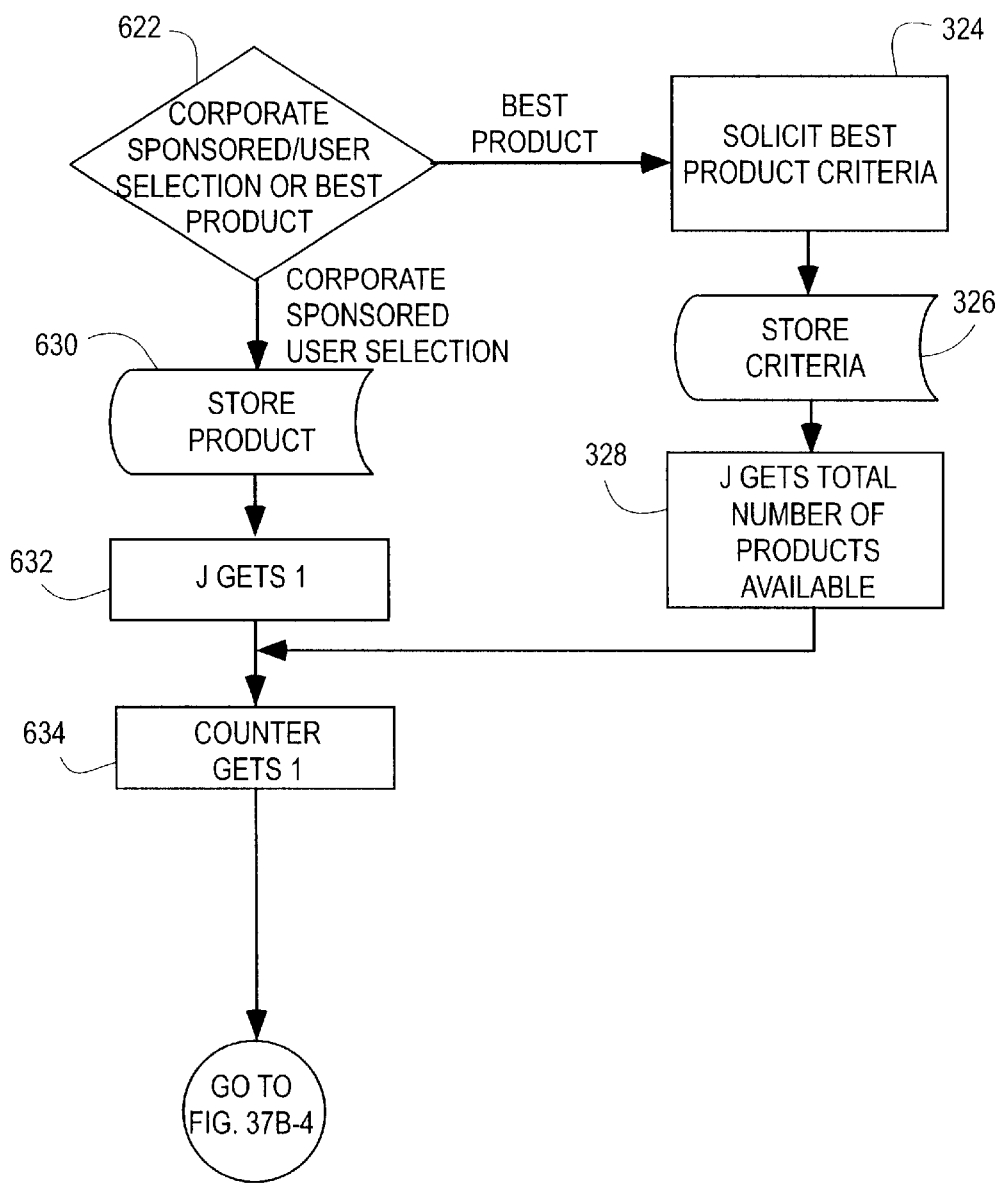
Figures 4, 37B:
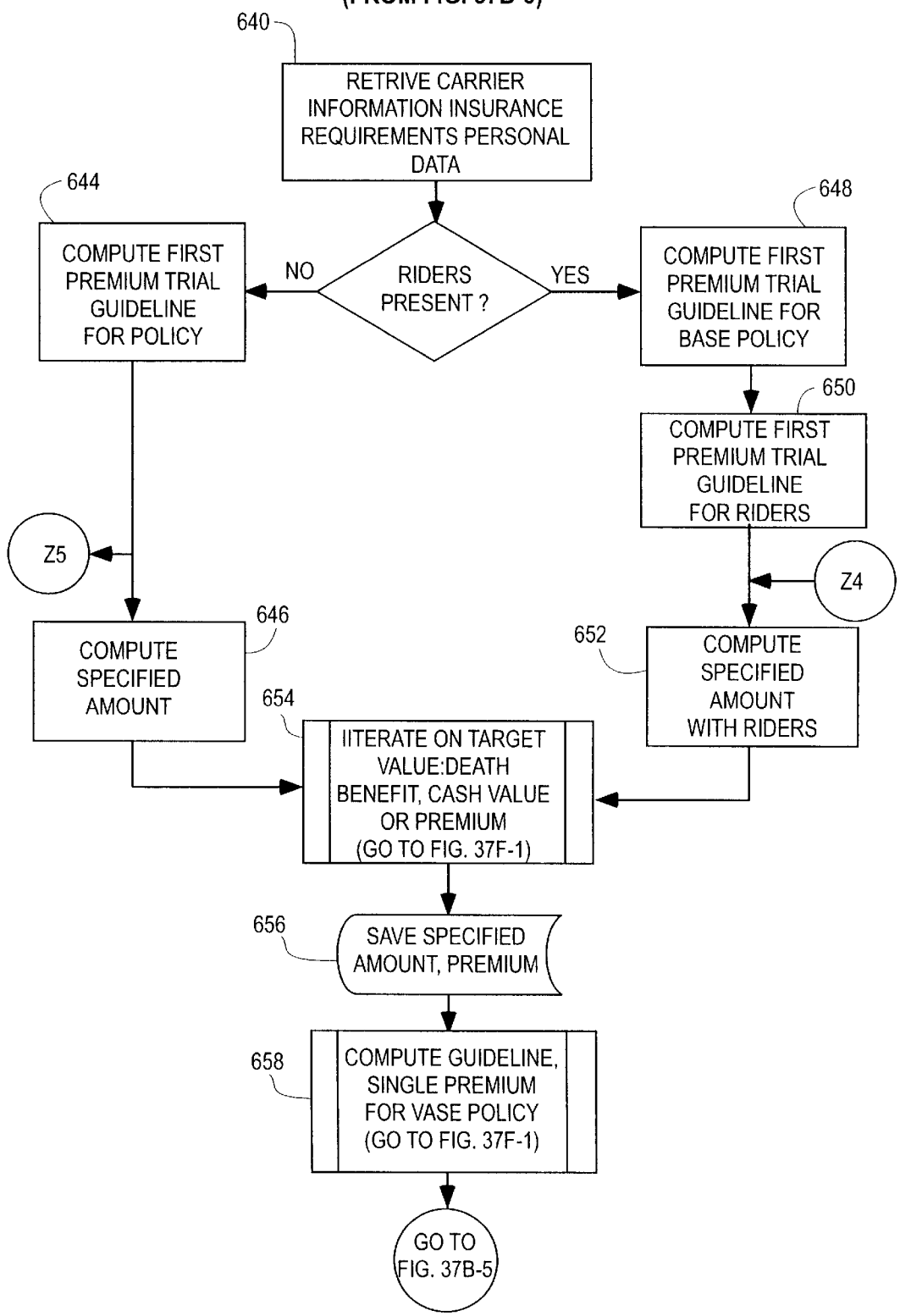
Figures 5, 37B:
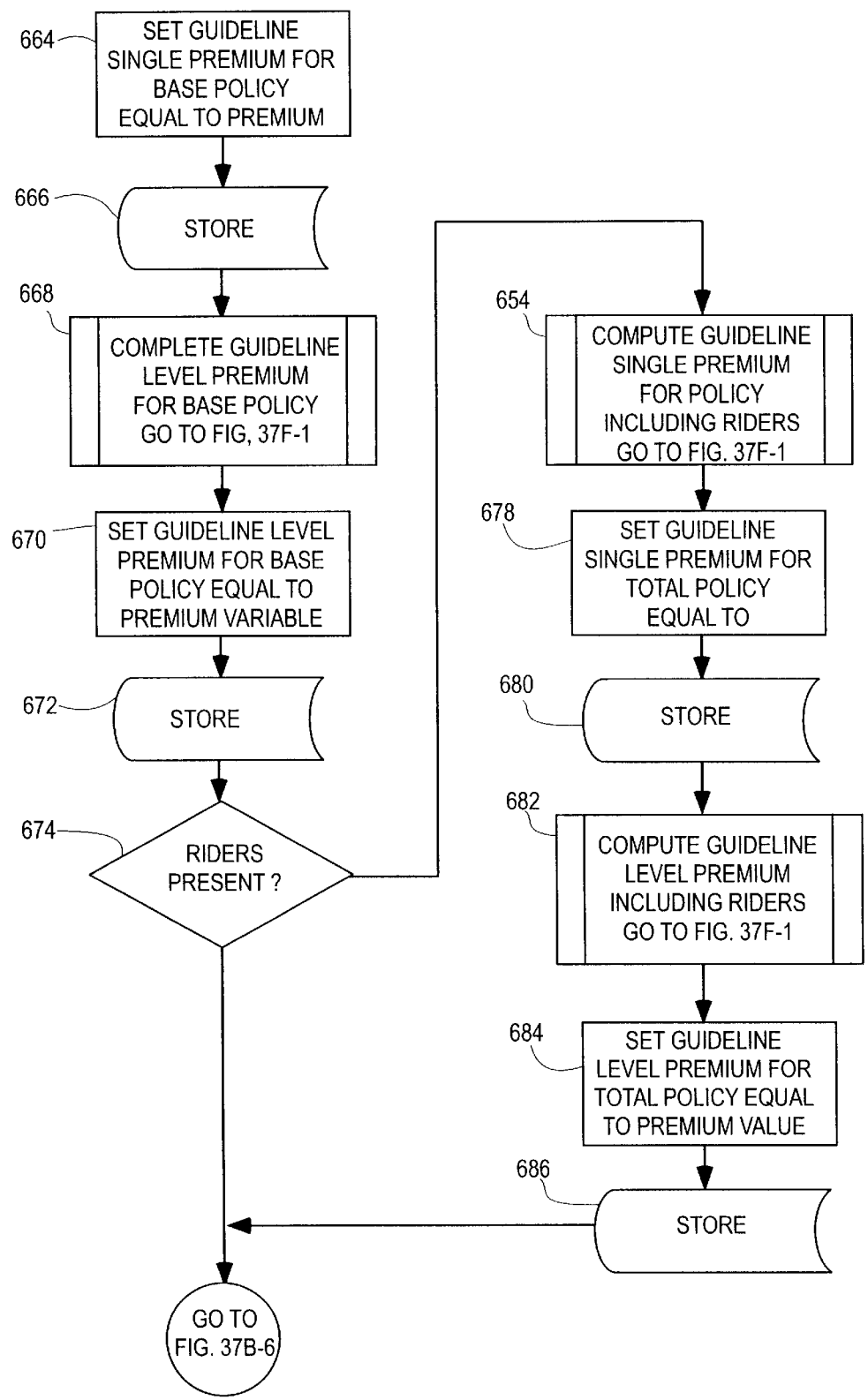
Figures 6, 37B:
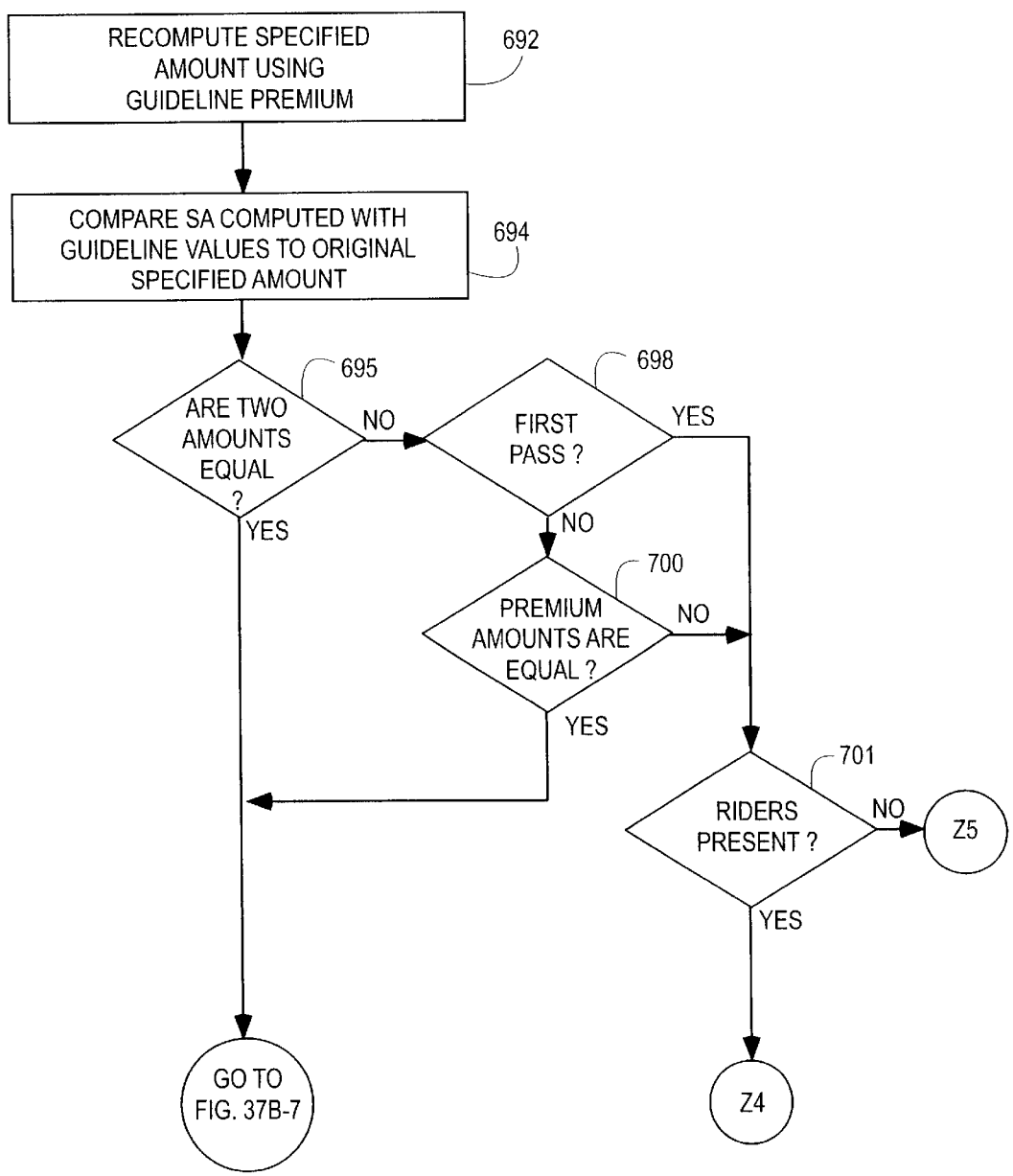
Figures 7, 37B:
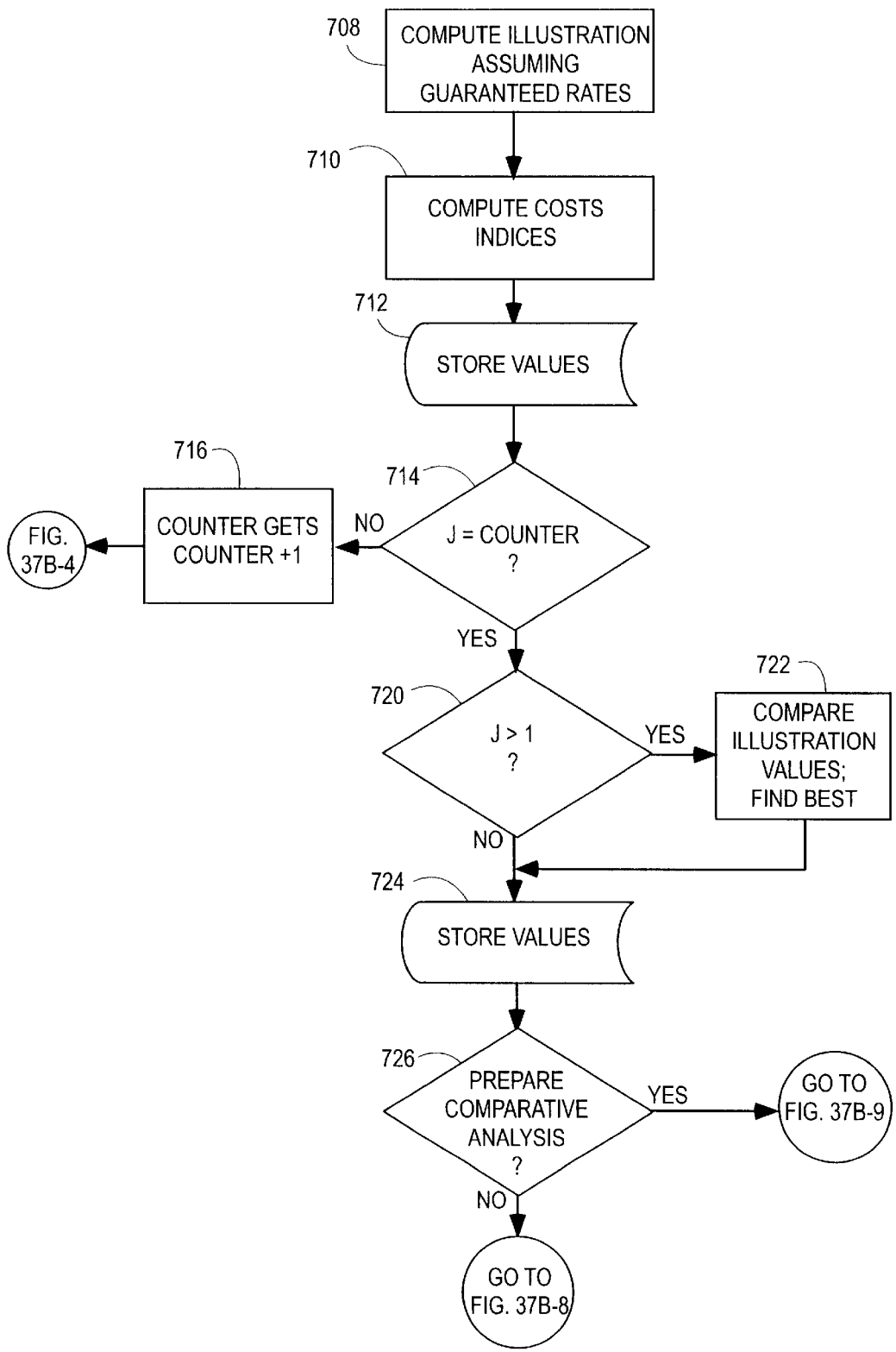
Figures 8, 37B:
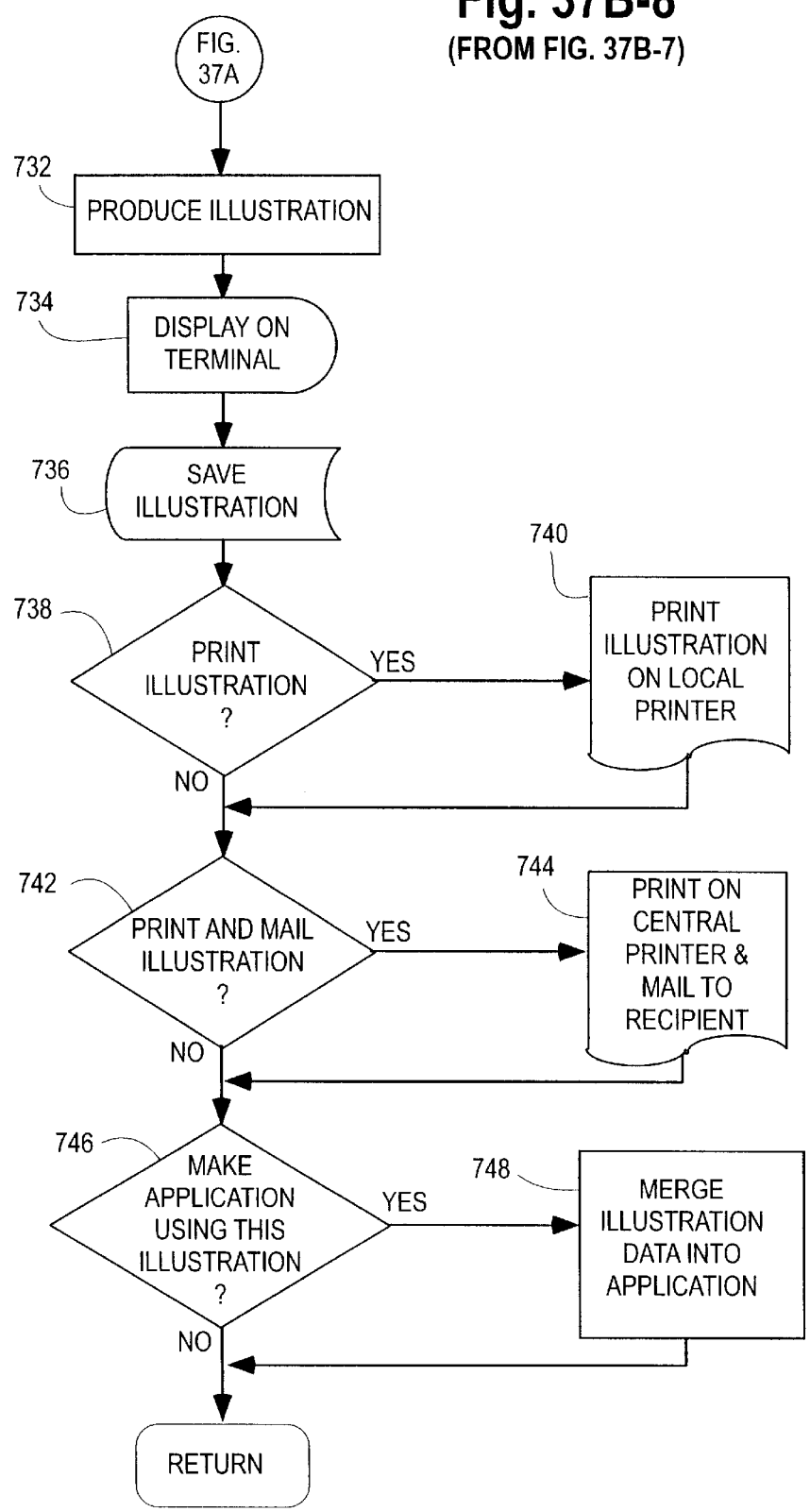
Figures 9, 37B:
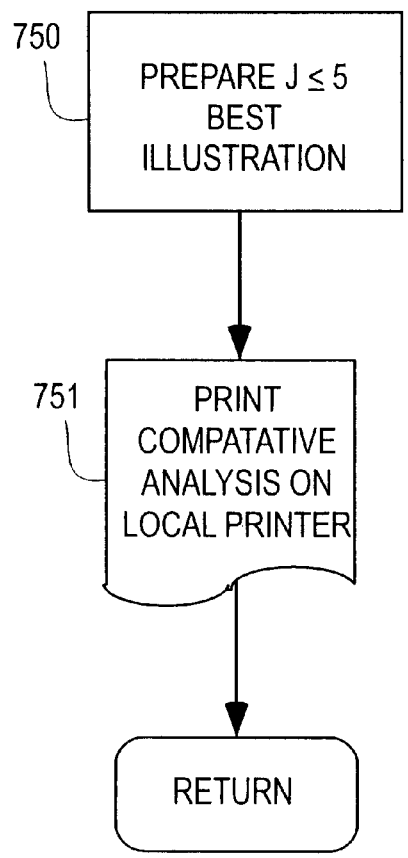

FIG. 9 is a representation of a computer user screen, Screen 5 in accordance with the present invention.

FIG. 10 is a representation of a computer user screen, Screen 6 in accordance with the present invention.

FIG. 11 is a representation of a computer user screen, Screen 7 in accordance with the present invention.

FIG. 12 is a representation of a computer user screen, Screen 8 in accordance with the present invention.

FIG. 13 is a representation of a computer user screen, Screen 9 in accordance with the present invention.

FIG. 14 is a representation of a computer user screen, Screen 10 in accordance with the present invention.

FIG. 15 is a representation of a computer user screen, Screen 11 in accordance with the present invention.

FIG. 16 is a representation of a computer user screen, Screen 12 in accordance with the present invention.

FIG. 17 is a representation of a computer user screen, Screen 13 in accordance with the present invention.

FIG. 18 is a representation of a computer user screen, Screen 14 in accordance with the present invention.

FIG. 19 is a representation of a computer user screen, Screen 15 in accordance with the present invention.

FIG. 20 is a representation of a computer user screen, Screen 16 in accordance with the present invention.

FIG. 21 is a representation of a computer user screen, Screen 17 in accordance with the present invention.

FIG. 22 is a representation of a computer user screen, Screen 18 in accordance with the present invention.

FIG. 23 is a representation of a computer user screen, Screen 19 in accordance with the present invention.

FIG. 24 is a representation of a computer user screen, Screen 20 in accordance with the present invention.

FIG. 25 is a representation of a computer user screen, Screen 21 in accordance with the present invention.

Figure 26:
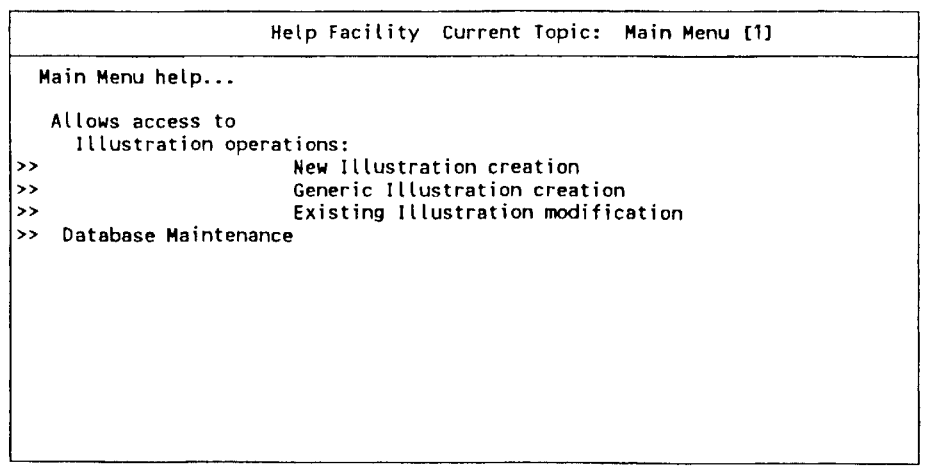

FIG. 26 is a representation of a computer user screen, Screen 22 in accordance with the present invention.

FIG. 27A, which continues through FIG. 27E, represents a portion of an example of a printed specimen, Specimen 1, in accordance with the present invention.

FIG. 27B is a continuation from FIG. 27A and represents a portion of an example of a printed specimen, Specimen 1, in accordance with the present invention.

FIG. 27C is a continuation from FIG. 27A and represents a portion of an example of a printed specimen, Specimen 1, in accordance with the present invention.

FIG. 27D is a continuation from FIG. 27A and represents a portion of an example of a printed specimen, Specimen 1, in accordance with the present invention.

FIG. 27E is a continuation from FIG. 27A and represents a portion of an example of a printed specimen, Specimen 1, in accordance with the present invention.

FIG. 28A, which continues through FIG. 28J, represents a portion of an example of a printed specimen, Specimen 2, in accordance with the present invention.

FIG. 28B is a continuation from FIG. 28A and represents a portion of an example of a printed specimen, Specimen 2, in accordance with the present invention.

FIG. 28C is a continuation from FIG. 28A and represents a portion of an example of a printed specimen, Specimen 2, in accordance with the present invention.

FIG. 28D is a continuation from FIG. 28A and represents a portion of an example of a printed specimen, Specimen 2, in accordance with the present invention.

FIG. 28E is a continuation from FIG. 28A and represents a portion of an example of a printed specimen, Specimen 2, in accordance with the present invention.

FIG. 28F is a continuation from FIG. 28A and represents a portion of an example of a printed specimen, Specimen 2, in accordance with the present invention.

FIG. 28G is a continuation from FIG. 28A and represents a portion of an example of a printed specimen, Specimen 2, in accordance with the present invention.

FIG. 28H is a continuation from FIG. 28A and represents a portion of an example of a printed specimen, Specimen 2, in accordance with the present invention.

FIG. 28I is a continuation from FIG. 28A and represents a portion of an example of a printed specimen, Specimen 2, in accordance with the present invention.

FIG. 28J is a continuation from FIG. 28A and represents a portion of an example of a printed specimen, Specimen 2, in accordance with the present invention.

FIG. 29A, which continues through FIG. 29L, represents a portion of an example of a printed specimen, Specimen 3, in accordance with the present invention.

FIG. 29B is a continuation from FIG. 29A and represents a portion of an example of a printed specimen, Specimen 3, in accordance with the present invention.

FIG. 29C is a continuation from FIG. 29A and represents a portion of an example of a printed specimen, Specimen 3, in accordance with the present invention.

FIG. 29D is a continuation from FIG. 29A and represents a portion of an example of a printed specimen, Specimen 3, in accordance with the present invention.

FIG. 29E is a continuation from FIG. 29A and represents a portion of an example of a printed specimen, Specimen 3, in accordance with the present invention.

FIG. 29F is a continuation from FIG. 29A and represents a portion of an example of a printed specimen, Specimen 3, in accordance with the present invention.

FIG. 29G is a continuation from FIG. 29A and represents a portion of an example of a printed specimen, Specimen 3, in accordance with the present invention.

FIG. 29H is a continuation from FIG. 29A and represents a portion of an example of a printed specimen, Specimen 3, in accordance with the present invention.

FIG. 29I is a continuation from FIG. 29A and represents a portion of an example of a printed specimen, Specimen 3, in accordance with the present invention.

FIG. 29J is a continuation from FIG. 29A and represents a portion of an example of a printed specimen, Specimen 3, in accordance with the present invention.

FIG. 29K is a continuation from FIG. 29A and represents a portion of an example of a printed specimen, Specimen 3, in accordance with the present invention.

FIG. 29L is a continuation from FIG. 29A and represents a portion of an example of a printed specimen, Specimen 3, in accordance with the present invention.

FIG. 30A, which continues through FIG. 30L, represents a portion of an example of a printed specimen, Specimen 4, in accordance with the present invention.

FIG. 30B is a continuation from FIG. 30A and represents a portion of an example of a printed specimen, Specimen 4, in accordance with the present invention.

FIG. 30C is a continuation from FIG. 30A and represents a portion of an example of a printed specimen, Specimen 4, in accordance with the present invention.

FIG. 30D is a continuation from FIG. 30A and represents a portion of an example of a printed specimen, Specimen 4, in accordance with the present invention.

FIG. 30E is a continuation from FIG. 30A and represents a portion of an example of a printed specimen, Specimen 4, in accordance with the present invention.

FIG. 30F is a continuation from FIG. 30A and represents a portion of an example of a printed specimen, Specimen 4, in accordance with the present invention.

FIG. 30G is a continuation from FIG. 30A and represents a portion of an example of a printed specimen, Specimen 4, in accordance with the present invention.

FIG. 30H is a continuation from FIG. 30A and represents a portion of an example of a printed specimen, Specimen 4, in accordance with the present invention.

FIG. 30I is a continuation from FIG. 30A and represents a portion of an example of a printed specimen, Specimen 4, in accordance with the present invention.

FIG. 30J is a continuation from FIG. 30A and represents a portion of an example of a printed specimen, Specimen 4, in accordance with the present invention.

FIG. 30K is a continuation from FIG. 30A and represents a portion of an example of a printed specimen, Specimen 4, in accordance with the present invention.

FIG. 30L is a continuation from FIG. 30A and represents a portion of an example of a printed specimen, Specimen 4, in accordance with the present invention.

FIG. 31A, which continues through FIG. 31J, represents a portion of an example of a printed specimen, Specimen 5, in accordance with the present invention.

FIG. 31B is a continuation from FIG. 31A and represents a portion of an example of a printed specimen, Specimen 5, in accordance with the present invention.

FIG. 31C is a continuation from FIG. 31A and represents a portion of an example of a printed specimen, Specimen 5, in accordance with the present invention.

FIG. 31D is a continuation from FIG. 31A and represents a portion of an example of a printed specimen, Specimen 5, in accordance with the present invention.

FIG. 31E is a continuation from FIG. 31A and represents a portion of an example of a printed specimen, Specimen 5, in accordance with the present invention.

FIG. 31F is a continuation from FIG. 31A and represents a portion of an example of a printed specimen, Specimen 5, in accordance with the present invention.

FIG. 31G is a continuation from FIG. 31A and represents a portion of an example of a printed specimen, Specimen 5, in accordance with the present invention.

FIG. 31H is a continuation from FIG. 31A and represents a portion of an example of a printed specimen, Specimen 5, in accordance with the present invention.

FIG. 31I is a continuation from FIG. 31A and represents a portion of an example of a printed specimen, Specimen 5, in accordance with the present invention.

FIG. 31J is a continuation from FIG. 31A and represents a portion of an example of a printed specimen, Specimen 5, in accordance with the present invention.

FIG. 32A, which continues through FIG. 32L, represents a portion of an example of a printed specimen, Specimen 6, in accordance with the present invention.

FIG. 32B is a continuation from FIG. 32A and represents a portion of an example of a printed specimen, Specimen 6, in accordance with the present invention.

FIG. 32C is a continuation from FIG. 32A and represents a portion of an example of a printed specimen, Specimen 6, in accordance with the present invention.

FIG. 32D is a continuation from FIG. 32A and represents a portion of an example of a printed specimen, Specimen 6, in accordance with the present invention.

FIG. 32E is a continuation from FIG. 32A and represents a portion of an example of a printed specimen, Specimen 6, in accordance with the present invention.

FIG. 32F is a continuation from FIG. 32A and represents a portion of an example of a printed specimen, Specimen 6, in accordance with the present invention.

FIG. 32G is a continuation from FIG. 32A and represents a portion of an example of a printed specimen, Specimen 6, in accordance with the present invention.

FIG. 32H is a continuation from FIG. 32A and represents a portion of an example of a printed specimen, Specimen 6, in accordance with the present invention.

FIG. 32I is a continuation from FIG. 32A and represents a portion of an example of a printed specimen, Specimen 6, in accordance with the present invention.

FIG. 32J is a continuation from FIG. 32A and represents a portion of an example of a printed specimen, Specimen 6, in accordance with the present invention.

FIG. 32K is a continuation from FIG. 32A and represents a portion of an example of a printed specimen, Specimen 6, in accordance with the present invention.

FIG. 32L is a continuation from FIG. 32A and represents a portion of an example of a printed specimen, Specimen 6, in accordance with the present invention.

FIG. 33A, which continues through FIG. 33L, represents a portion of an example of a printed specimen, Specimen 7, in accordance with the present invention.

FIG. 33B is a continuation from FIG. 33A and represents a portion of an example of a printed specimen, Specimen 7, in accordance with the present invention.

FIG. 33C is a continuation from FIG. 33A and represents a portion of an example of a printed specimen, Specimen 7, in accordance with the present invention.

FIG. 33D is a continuation from FIG. 33A and represents a portion of an example of a printed specimen, Specimen 7, in accordance with the present invention.

FIG. 33E is a continuation from FIG. 33A and represents a portion of an example of a printed specimen, Specimen 7, in accordance with the present invention.

FIG. 33F is a continuation from FIG. 33A and represents a portion of an example of a printed specimen, Specimen 7, in accordance with the present invention.

FIG. 33G is a continuation from FIG. 33A and represents a portion of an example of a printed specimen, Specimen 7, in accordance with the present invention.

FIG. 33H is a continuation from FIG. 33A and represents a portion of an example of a printed specimen, Specimen 7, in accordance with the present invention.

FIG. 33I is a continuation from FIG. 33A and represents a portion of an example of a printed specimen, Specimen 7, in accordance with the present invention.

FIG. 33J is a continuation from FIG. 33A and represents a portion of an example of a printed specimen, Specimen 7, in accordance with the present invention.

FIG. 33K is a continuation from FIG. 33A and represents a portion of an example of a printed specimen, Specimen 7, in accordance with the present invention.

FIG. 33L is a continuation from FIG. 33A and represents a portion of an example of a printed specimen, Specimen 7, in accordance with the present invention.

FIG. 34A, which continues through FIG. 34B, represents a portion of an example of an application for life insurance, Specimen 8, in accordance with the present invention.

FIG. 34B is a continuation from FIG. 34A and represents a portion of an example of an application for life insurance, Specimen 8, in accordance with the present invention.

FIG. 35A, which continues through FIG. 35C, represents a portion of an example of a residential loan application, Specimen 9, in accordance with the present invention.

FIG. 35B is a continuation from FIG. 35A and represents a portion of an example of an application for life insurance, Specimen 9, in accordance with the present invention.

FIG. 35C is a continuation from FIG. 35A and represents a portion of an example of an application for life insurance, Specimen 9, in accordance with the present invention.

B. User Screens

User Screens 1–22 provide a representative group of screens shown on a monitor or other output device and produced by means of the computer system of the present invention. The User Screens can be seen by the system users as they prepare or update illustrations.

C. Variables, Identities, and Formulas

Variables, identities, and formulas which can be used throughout the illustration system are provided subsequently herein.

D. Specimens

Specimens 1–9 provide examples of printed product illustrations, a life insurance application form, and a mortgage application form which can be created by the present invention. The printed illustrations also include prepared textual information explaining the use of life insurance as collateral for a mortgage, life insurance policy information, mortgage information, and a comparison of these and other forms of financing.

Specimens 2–7 show an illustration of an investment, here exemplified as a life insurance policy, used as at least a partial replacement for a down payment, when contrasted with a conventional mortgage. (An illustration is a printed or visual representation of estimated values which permits a customer for or seller of a financial product to understand how that product will perform given a specified set of assumptions.) This investment/collateral/mortgage repayment means is owned by the home buyer.

V. BRIEF DESCRIPTION OF DRAWINGS, SCREENS, VARIABLES, AND SPECIMENS— INSURANCE COMPONENT

The following description, given by way of example and not intended to limit the present invention solely to the described embodiments, will be best understood in conjunction with the accompanying drawings, computer or "user" screens, variables, and specimens incorporated herein.

A. Figures

Figure 36:
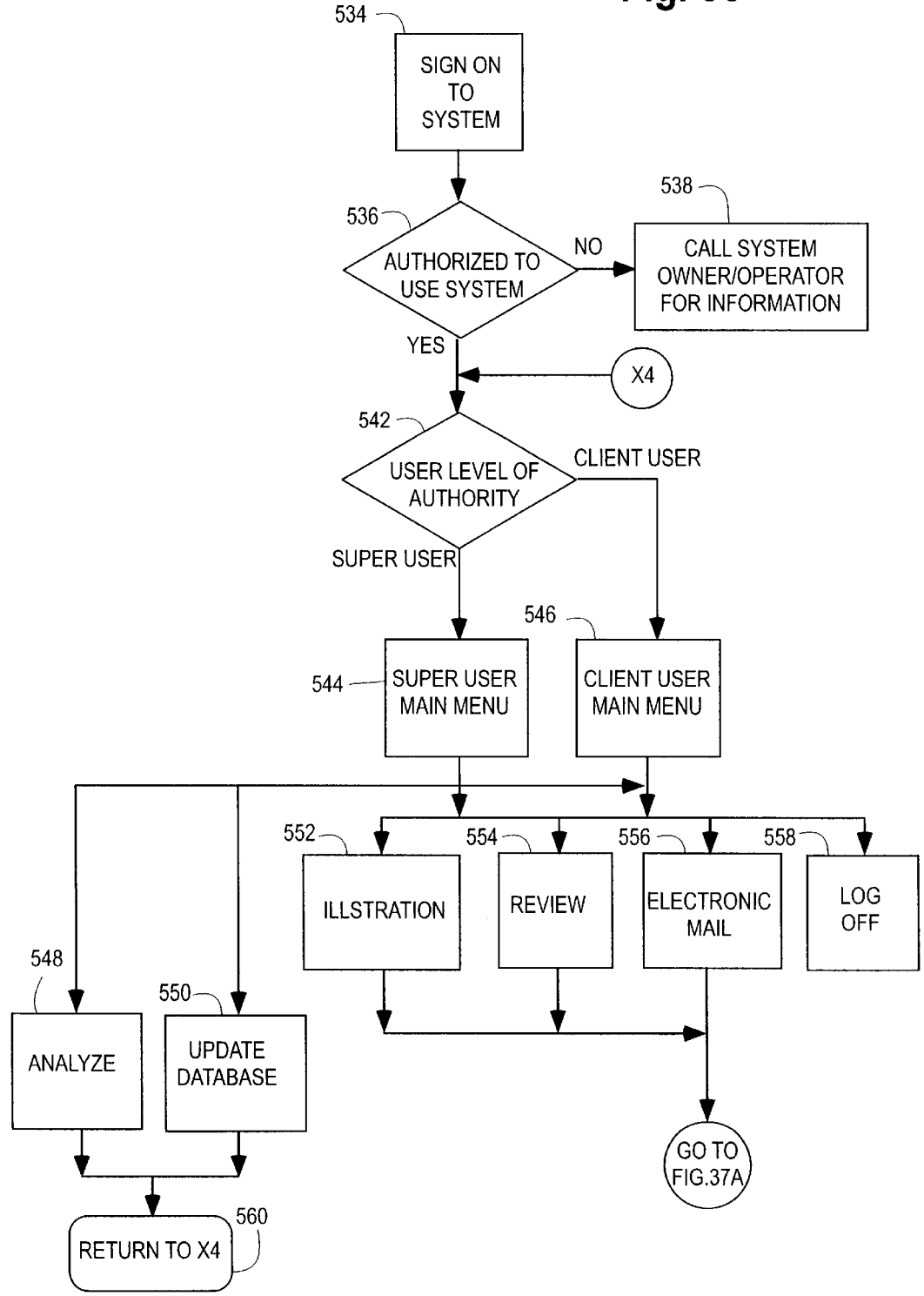

FIG. 36 represents a schematic flow chart of logic behind a "main menu" (or user screen with a list of the functional choices that the computerized system provides to users) of the present invention.

Figures 1, 37C:
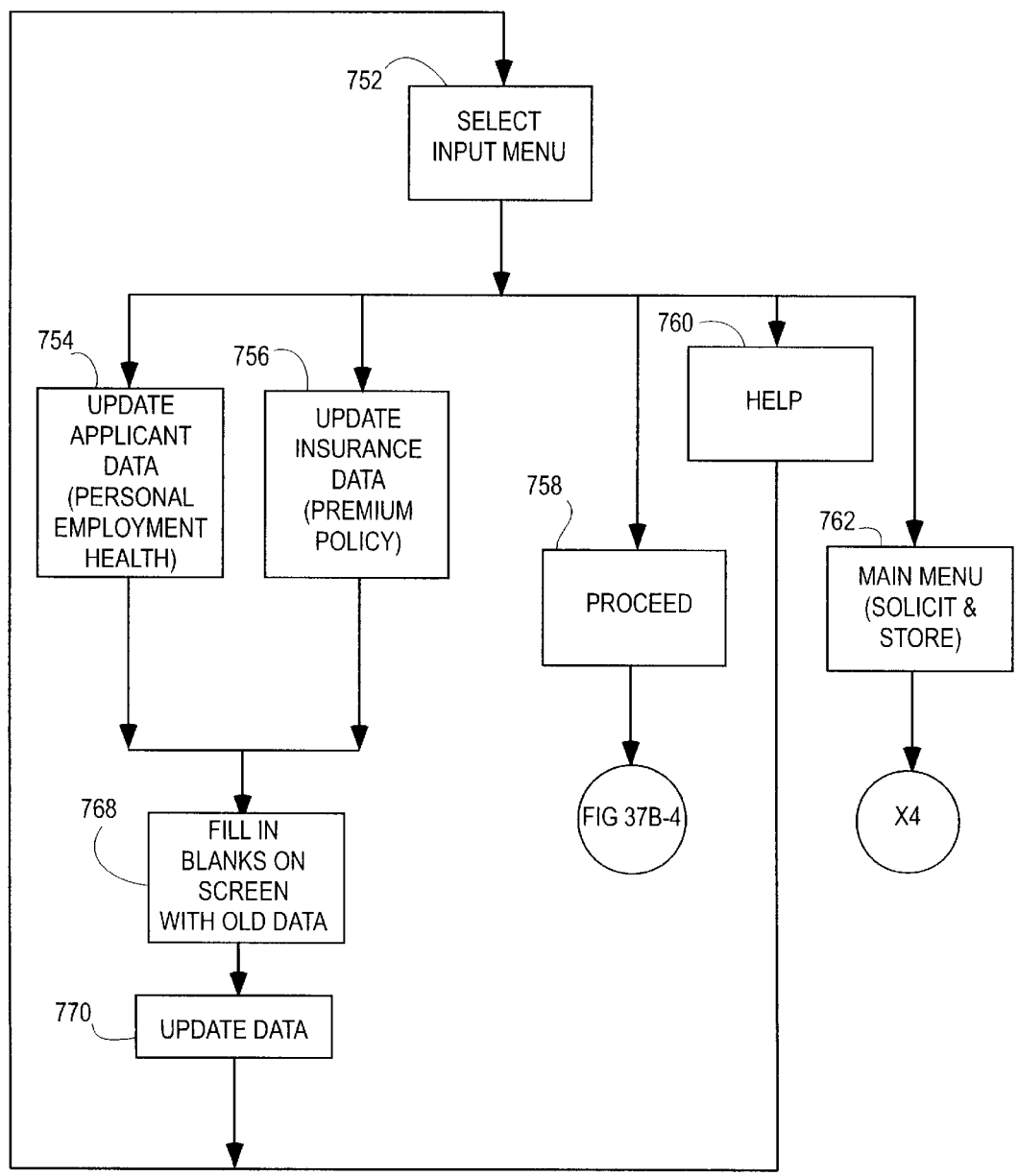
Figures 1, 37D:
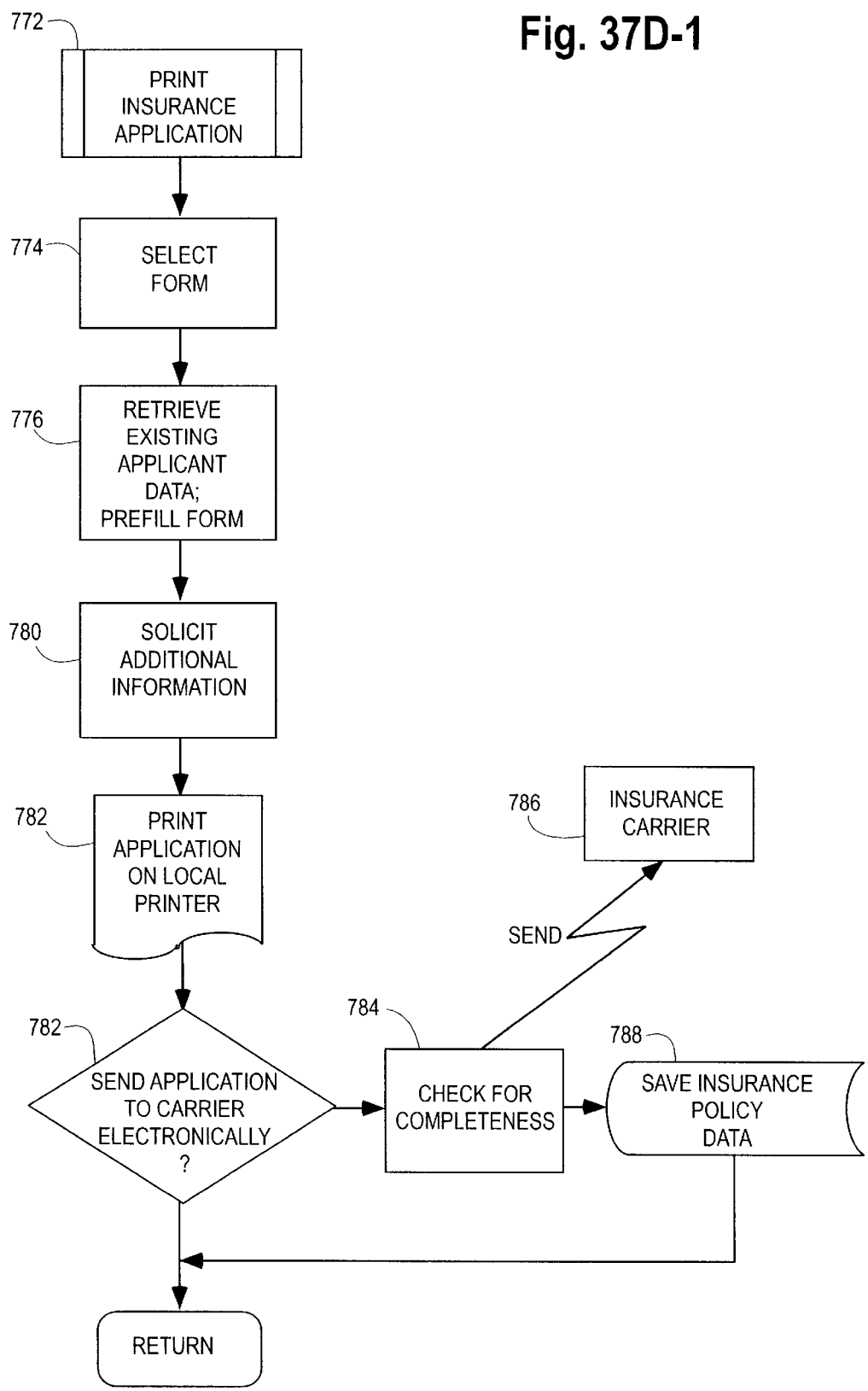
Figures 1, 37E:
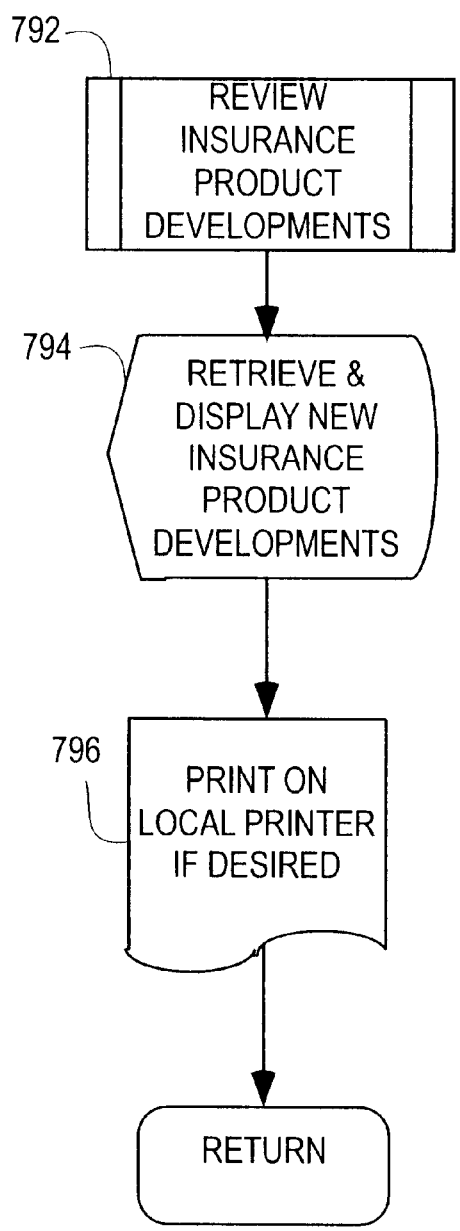
Figures 1, 37F:
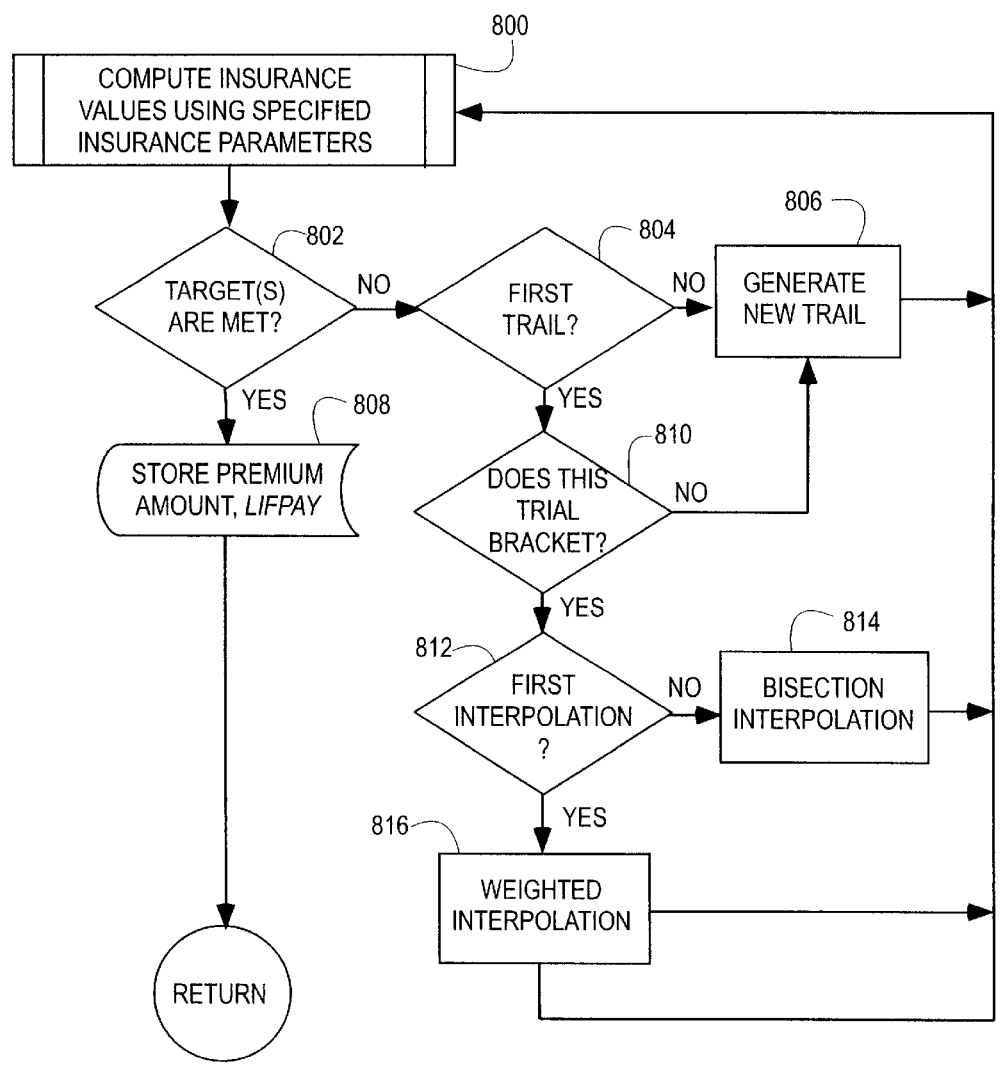

FIG. 37A depicts logic behind an illustration function of the present invention, as continued in FIGS. 37B-1–37F-1.

FIG. 37B-1 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-2 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-3 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-4 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-5 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-6 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-7 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-8 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37B-9 is a portion of FIG. 37 that provides a flow chart of logic used in calculating and printing an individualized or "new" prospective applicant illustration tailored to the individual, and in creating a corresponding new prospective applicant data file, in accordance with the present invention.

FIG. 37C-1 provides a flow chart of logic used in changing or updating an existing client data file for the purpose of providing the prospective applicant new illustrations based on assumptions which differ from those originally illustrated, in accordance with the present invention.

FIG. 37D-1 represents a flow chart of logic used in electronically completing and/or printing a life insurance application form and storing the information contained on the insurance application form in a database of the host computer for later retrieval, in accordance with the present invention.

FIG. 37E-1 represents a flow chart of logic used to access the host computer for, and/or print out information regarding, new insurance product developments.

FIG. 37F-1 represents a flow chart of logic used in interpolating to find target universal life insurance illustration values.

Figure 38A:
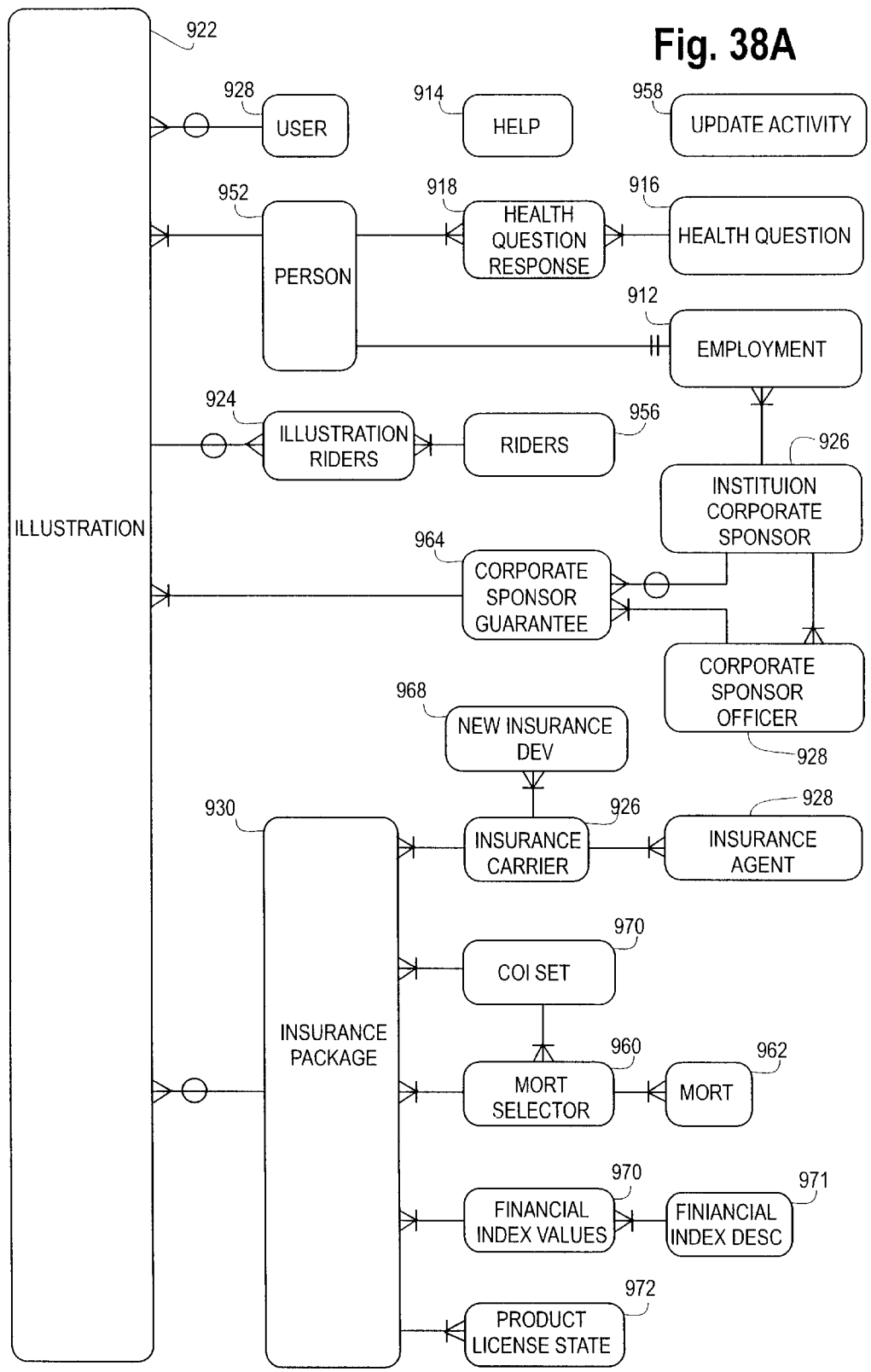
Figure 38B:
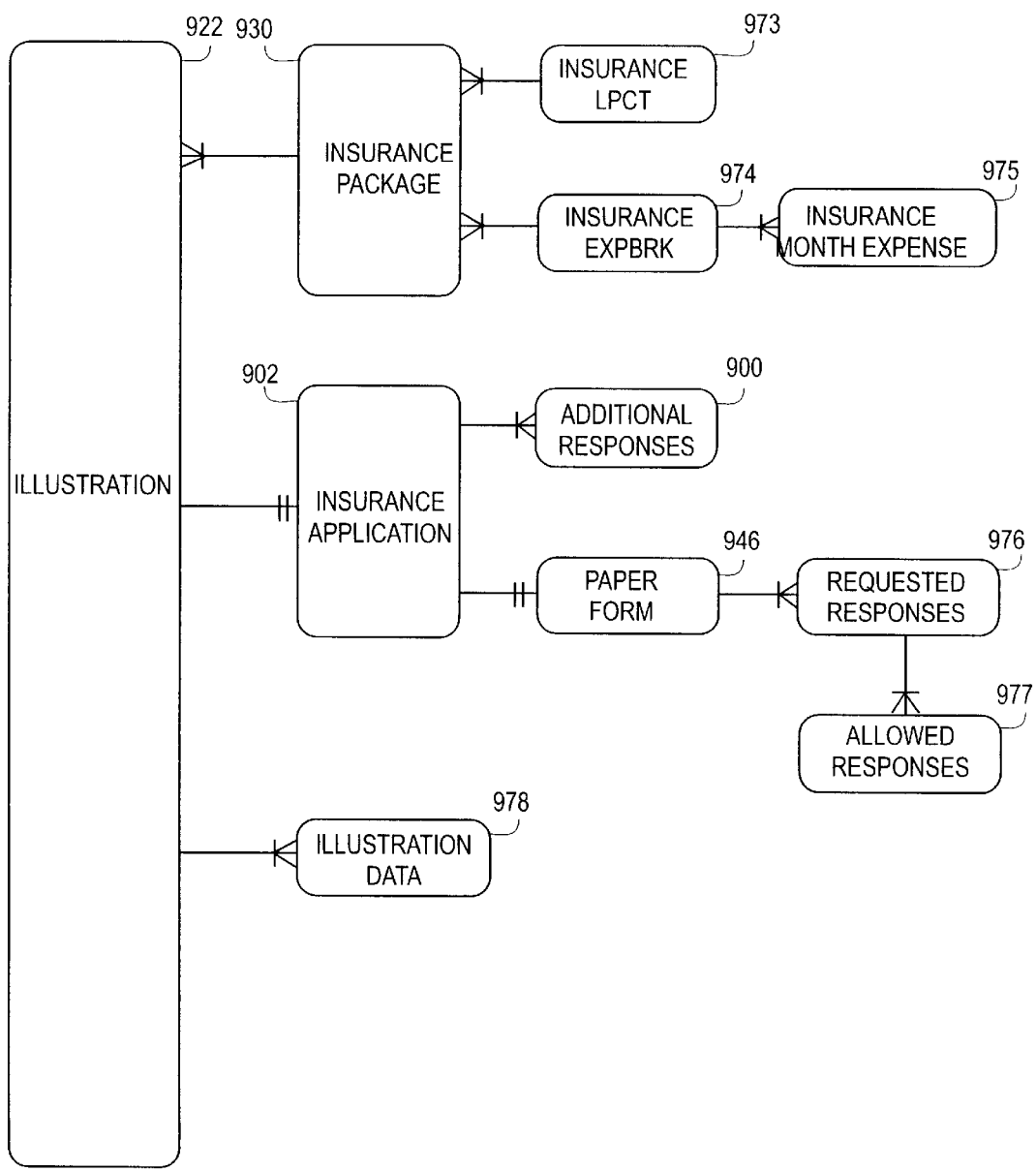

FIG. 38A, which is continued to FIG. 38B, is a schematic representation of relationships between various data entities (database tables) within the database system of the present invention.

FIG. 38B is a continuation from FIG. 38A of the schematic representation of relationships between various data entities (database tables) within the database system of the present invention.

Figure 39:
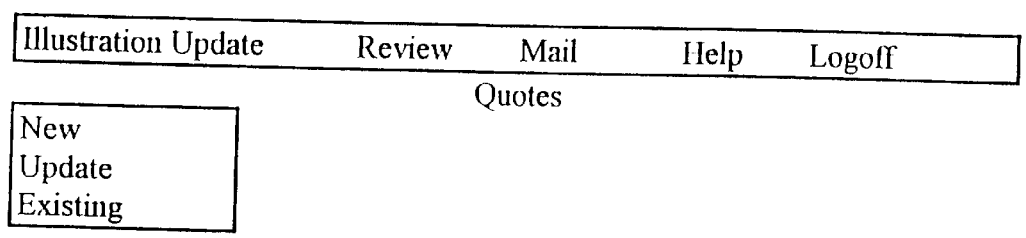

FIG. 39 represents a User Screen shown on a monitor or other output device and produced by means of the computer system of the present invention, to be seen by the system users as they prepare or update illustrations.

FIG. 40 represents a User Screen shown on a monitor or other output device and produced by means of the computer system of the present invention, to be seen by the system users as they prepare or update illustrations.

FIG. 41 represents a User Screen shown on a monitor or other output device and produced by means of the computer system of the present invention, to be seen by the system users as they prepare or update illustrations.

FIG. 42 represents a User Screen shown on a monitor or other output device and produced by means of the computer system of the present invention, to be seen by the system users as they prepare or update illustrations.

FIG. 43 represents a User Screen shown on a monitor or other output device and produced by means of the computer system of the present invention, to be seen by the system users as they prepare or update illustrations.

FIG. 44 represents a User Screen shown on a monitor or other output device and produced by means of the computer system of the present invention, to be seen by the system users as they prepare or update illustrations.

FIG. 45 represents a User Screen shown on a monitor or other output device and produced by means of the computer system of the present invention, to be seen by the system users as they prepare or update illustrations.

FIG. 46 represents a User Screen shown on a monitor or other output device and produced by means of the computer system of the present invention, to be seen by the system users as they prepare or update illustrations.

FIG. 47 represents a User Screen shown on a monitor or other output device and produced by means of the computer system of the present invention, to be seen by the system users as they prepare or update illustrations.

FIG. 48 represents a User Screen shown on a monitor or other output device and produced by means of the computer system of the present invention, to be seen by the system users as they prepare or update illustrations.

FIG. 49 represents a User Screen shown on a monitor or other output device and produced by means of the computer system of the present invention, to be seen by the system users as they prepare or update illustrations.

FIG. 50 represents a User Screen shown on a monitor or other output device and produced by means of the computer system of the present invention, to be seen by the system users as they prepare or update illustrations.

FIG. 51 represents a User Screen shown on a monitor or other output device and produced by means of the computer system of the present invention, to be seen by the system users as they prepare or update illustrations.

FIG. 52 represents a User Screen shown on a monitor or other output device and produced by means of the computer system of the present invention, to be seen by the system users as they prepare or update illustrations.

FIG. 53 represents a User Screen shown on a monitor or other output device and produced by means of the computer system of the present invention, to be seen by the system users as they prepare or update illustrations.

FIG. 54 represents a User Screen shown on a monitor or other output device and produced by means of the computer system of the present invention, to be seen by the system users as they prepare or update illustrations.

Figure 55:
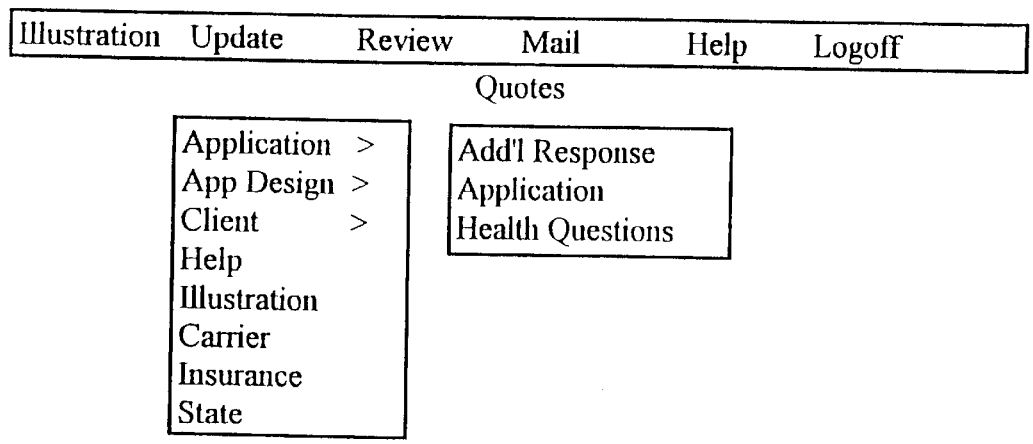

FIG. 55 represents a User Screen shown on a monitor or other output device and produced by means of the computer system of the present invention, to be seen by the system users as they prepare or update illustrations.

Figure 56:
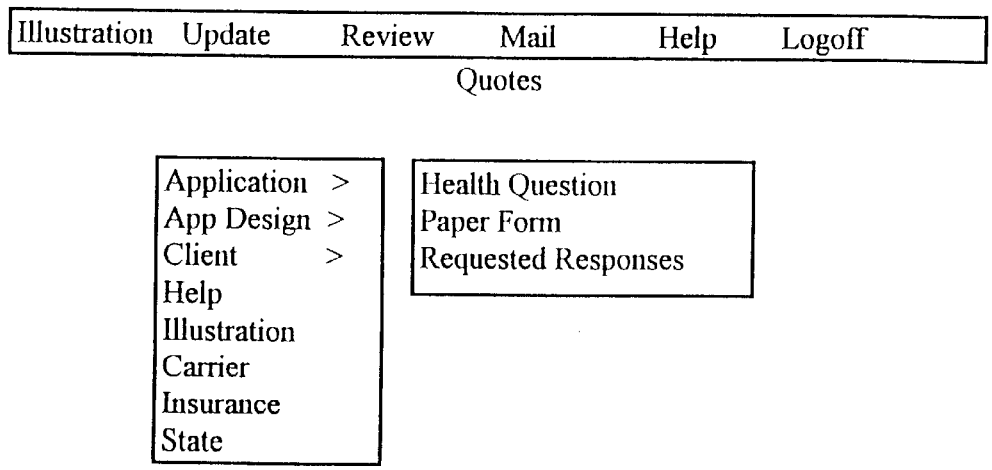

FIG. 56 represents a User Screen shown on a monitor or other output device and produced by means of the computer system of the present invention, to be seen by the system users as they prepare or update illustrations.

Figure 57:
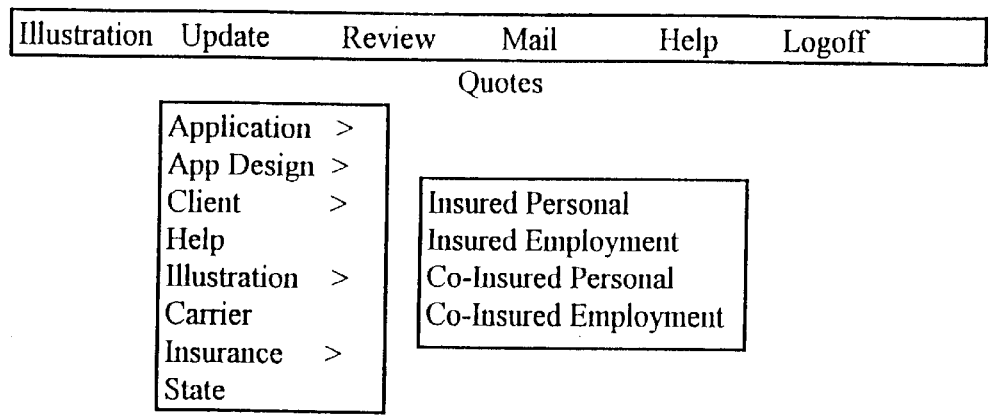

FIG. 57 represents a User Screen shown on a monitor or other output device and produced by means of the computer system of the present invention, to be seen by the system users as they prepare or update illustrations.

Figure 58:
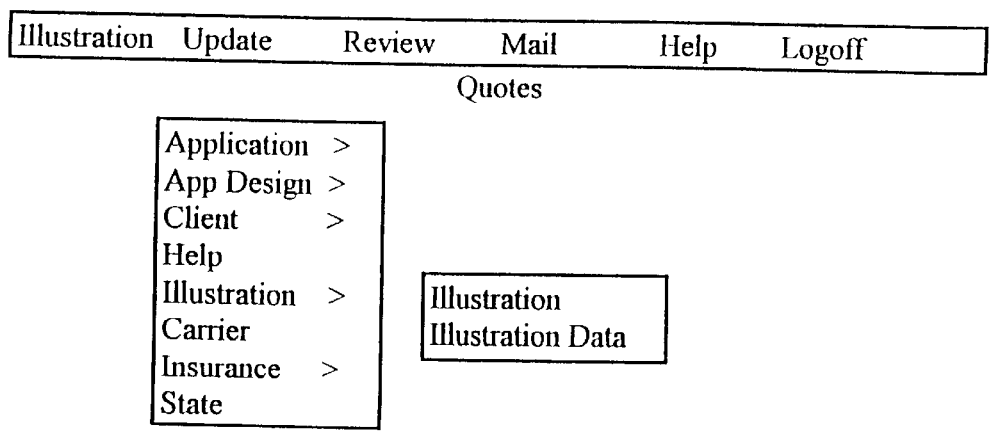

FIG. 58 represents a User Screen shown on a monitor or other output device and produced by means of the computer system of the present invention, to be seen by the system users as they prepare or update illustrations.

Figure 59:
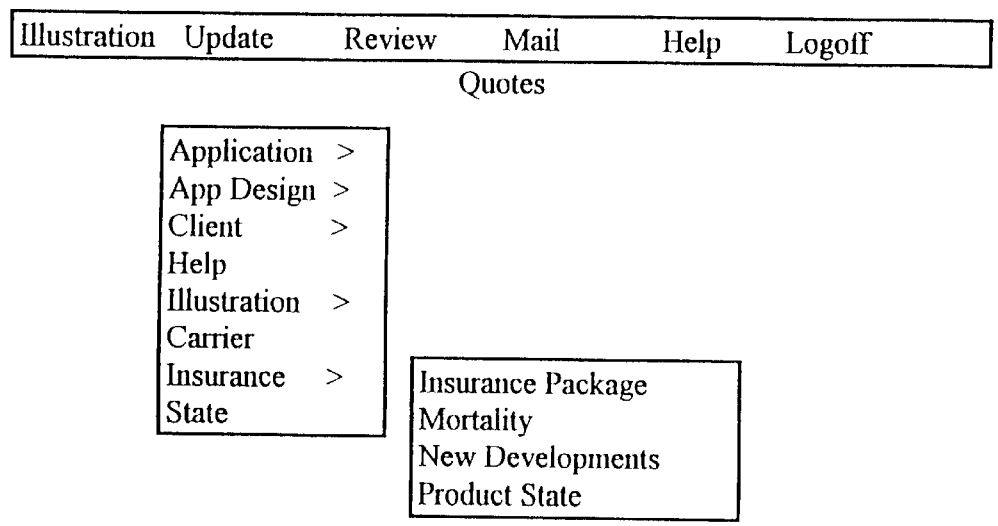

FIG. 59 represents a User Screen shown on a monitor or other output device and produced by means of the computer system of the present invention, to be seen by the system users as they prepare or update illustrations.

FIG. 60 represents a User Screen shown on a monitor or other output device and produced by means of the computer system of the present invention, to be seen by the system users as they prepare or update illustrations.

FIG. 61A, which continues through FIG. 61E, represents a portion of an example of a printed product illustration prepared in accordance with the present invention.

FIG. 61B, represents a portion of an example of a printed product illustration prepared in accordance with the present invention.

FIG. 61C, represents a portion of an example of a printed product illustration prepared in accordance with the present invention.

FIG. 61D, represents a portion of an example of a printed product illustration prepared in accordance with the present invention.

FIG. 61E, represents a portion of an example of a printed product illustration prepared in accordance with the present invention.

FIG. 62 represents an example of a printed product illustration prepared in accordance with the present invention.

FIG. 63A, which continues through FIG. 63B, represents an example of a printed life insurance application form prepared in accordance with the present invention.

FIG. 63B, which continues FIG. 63A, represents an example of a printed life insurance application form prepared in accordance with the present invention.

B. User Screens

User Screens 23–42 provide a representative group of screens shown on a monitor or other output device and produced by means of the computer system of the present invention. The User Screens can be seen by the system users as they prepare or update illustrations.

C. Variables, Identities, and Formulas

Variables, identities, and formulas which can be used throughout the illustration system are provided subsequently herein.

It should be kept in mind that such variables, identities, and formulas are not the present invention—rather, they are convenient ways of characterizing the electrical signal modification being accomplished by the digital electrical signal processing system of the present invention, as defined in the claims herein.

D. Specimens

The specimens provide examples of printed product illustrations, and a life insurance application form. It should also be kept in mind that the present invention, as defined in the claims, is not merely a printed publication or a business—rather, the claimed invention is a tool having utility in commercial, scholarly, and other applications.

VI. DETAILED DESCRIPTION OF A PREFERRED EMBODIMENT AND BEST MODE

Because the present invention is directed at modifying electrical signals in a computer system having a processor, such as a microprocessor, to understand how the signals are modified, a basic understanding of computer science and electrical engineering is useful. It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference. A copy of source code is also included herewith and incorporated by reference herein, the source code including files that can be catagorized by their file extensions as follows: .INP—Oracle Forms 3.0; PC—Oracle ProC; C—"C" language; .H—"C" language header; and .TXT—control files used to link and\or run the programs.

Mortgage Component
A. Discussion of Figures (FIGS.) and User Screens

The following is a description of a preferred embodiment and best mode of the invention. The following includes a description of the manner in which the computerized insurance system of the present invention can be made and used. Some of the unique insurance and mortgage transactions that are carried out by this system are described in detail. Other transactions are described more generally. In the interest of brevity, a highly detailed description of each and every one of the data transactions that may be performed by the computerized system of the present invention is not provided. But based upon the detailed description of certain examples, and the knowledge of those familiar with the life insurance industry and the mortgage lending industry, how to make and use the present invention should be readily apparent from the information provided herein.

Generally, in the computations underpinning the use of a mortgage in conjunction with life insurance as collateral, there is a computer system for producing an illustration of an investment as a means for repaying a mortgage. The system includes a digital computer for receiving input data and for storing borrower information and investment information. The digital computer is programmed with means, responsive to the data, the borrower information, and to the investment information, for computing an amount of investment funding sufficient to repay the mortgage and for generating an illustration of said investment as a means for repaying the mortgage. Further, the computer system is devoid of means for generating an illustration of a mortgage plan having a cost containment clause.

More particularly, the computer system requests that a user input data specifying the kind of mortgage and the kind of insurance policy (e.g., or some equivalent financial vehicle) to be illustrated. This information is stored in the computer's database system. Also, the computer is programmed to make calculations of loan and insurance values and other data needed for the illustration. When all the values have been computed and written to the database, the computer will then combine them with text data to provide an illustration that can be printed out. This information will also be stored in a database and may be updated as needed.

Once the user, in consultation with a prospective borrower, has designated the illustration as complete, data in the database can be merged with stored text data and other input data in order to produce loan and insurance application forms. These forms can be printed out on the user's printer for signature by the prospective applicant and for subsequent processing by the system operator, the life insurance carrier, and the lender.

FIG. 1 shows an overview of a data processing system for producing an insurance policy/mortgage illustration according to the present invention. The Data Screen 4, discussed more fully hereinafter, can be produced on Terminal 2, for example an IBM compatible PC running Smarterm 340 (available from Persoft Corp.), with a Local Printer 5, e.g., a laser printer. Terminal 2 is linkable to Communications System 6. The Communication System 6 can be a modem and appropriate telephone lines. Communications System 6 is thus linkable to a Digital Computer 8, for example, a Digital Equipment Corporation VAX with a VMS operating system, ORACLE, and WordPerfect (e.g., 5.1) from WordPerfect Corporation. Digital Computer 8 is operably connected to Central Printer 9. The Digital Computer 8 contains a Central Processor 10 that is operable to obtain Loan/Insurance Product Information 12, Loan Rate Information 14, and Insurance Premium Information 16. The respective information of Blocks 12, 14, and 16 can optionally be accessible on line to other computers or stored as data in a System Database 17 of the Digital Computer 8.

Help 18 is a computerized system, preferably a context sensitive, hypertext-linked help system. Help 18 is available throughout the program.

Central Processor 10 is also operable to activate a function Print Out Loan/Insurance Application Forms 22 on Central Printer 9, which points to the function Fill In Forms 24 to selectively transmit Loan Application Data To Lender 26 and Life Insurance Application Data To Carrier 28.

Further, Central Processor 10 can generate an illustration via a function Generate Illustration 30, which leads to Print Illustration 32 On Local Printer 5. The generated illustration can be saved in the Database 17.

When the system is accessed, the user must choose the transaction desired, and the selection will vary by the type of user. A management level user with a higher level of authority can update the data used in the illustration process. This data includes, but is not limited to: (1) current interest rates and other charges for loans offered by the lenders wishing to provide loans collateralized with life insurance; (2) insurance underwriting related values, including age, sex, and health characteristics, premium amounts to be applied, cash value accumulation, annual death benefit amounts, and typical policy interest crediting rates and insurance charges; (3) all of the illustrations saved in the Database 17 which may be used for manipulation and analysis in both the marketing and underwriting functions carried out by an insurance agent, a carrier, and a lender; and (4) administrative messages from other users. Otherwise, a non-management user of the system has access to only a portion of the system.

Prior to engaging the computerized aspects of the present invention, the user should consult with the prospective applicant to obtain such information as the prospective insured's age and sex, the amount of the mortgage desired, the individual's ability or willingness to provide a down payment on the property, the individual's employment status, whether or not the individual has certain health problems which may require specialized insurance underwriting, whether or not the individual's employer is currently involved in a program that will guarantee the payment of policy premiums, etc. After this information-gathering step has been completed, the user "logs" on at Terminal 4 by entering an assigned authorization password.

Turning now to FIG. 2, the user engages the system at Sign On To System 34. Branch 36, Authorized To Use System?, checks the password against stored passwords to determine whether the user is authorized to use the system. If the user is not authorized, Block 38 displays a message on the Terminal 2 that the user should telephone the system owner/operator for further information. If the user is authorized, meaning that the password is recognized by the Digital Computer 8, the logic continues to Branch 40. However, prior to Branch 40, there is a logic entry point X1, which is described more fully below, but which generally is a connection from another part of the logic.

In any case, Branch 40 assesses the level of authority of the user from the password. In the present embodiment of the invention, there are two alternatives. First, as previously suggested, the user could be a "Client User," in which case the logic connects to Illustration 42, as is subsequently discussed. Second, the user could be a "Super User," having access to Main Menu 44.

The Client User/Super User authorization system is included in a preferred embodiment of this invention to avoid security problems which would otherwise be created by a diverse number of users using the system. It also provides for confidentiality of database information and, in the case of communications between the system owner/operator and users, allows each user to view only the information relating to the applicants for whom the user is providing illustrations.

From the Main Menu 44, if the user does not yet wish to log off at Block 48, there are a number of choices shown in User Screen 1.

The Main Menu 44 permits access to Illustration 42 used to create an illustration (Generic, New, or Existing). The user can also select Update Database 50, which is described with particularity hereinafter, but which generally is a list of tables that can be updated. A typical Update Database 50 screen is shown in User Screen 2.

The user can select Analyze 54 to access various reports and statistics on illustrations. Electronic Mail 52 permits electronic communication between system users (see FIG. 1). Mail messages may be printed out via the Printers 5 and 9.

Returning to FIG. 2, the Electronic Mail 52 function utilizes the VMS operating system mail feature. The system has the ability to alert the user that a message is present in his or her electronic "mail box." The system is capable of reading these messages from that file onto the user's screen, again allowing the user to move from screen-to-screen at his or her own speed. Once the user has completed a review of the data, one or all of the textual screens or "pages" may be printed at the Local Printer 5. The user may also write electronic messages to other users' mail boxes to be used in a similar manner.

At the completion of each subordinate function 42, 50, 52, 54, and 18, control is returned to the Main Menu 44 via the Return To Main Menu Block 46.

Turning now to FIG. 3 where the logic proceeds from Illustration 42 of FIG. 2, the user is presented with a Select Type Of Illustration 56 submenu, shown as a portion of User Screen 1. Each of the functions of the submenu of Branch 56 will be presented in summary form here and described subsequently in detail. One function is Generate Generic Illustration 58, which is elaborated by FIG. 3A-1. Generally, Function 58 permits the user to quickly provide an illustration of how a mortgage using life insurance as collateral might work for a standard mortgage amount. By limiting the number of variables and illustrating a standard amount, this Function 58 allows the user to quickly provide the prospective applicant with enough information to decide whether a mortgage using life insurance as collateral might be of interest. The information created in this Function 58 can be sent directly to the Local Printer 5 for review by the prospective applicant.

A second function under Submenu 56 is Generate New Applicant Illustration 60, which goes to FIG. 3B-1. This Function 60 permits the user to provide a detailed presentation, tailored to the prospective applicant's own factual situation, of how a mortgage using life insurance as collateral might perform for the prospective applicant. This Function 60 also allows the user to save the illustration for later updates and to send the illustration to the Local Printer 5 for review by the prospective applicant.

A third function of Submenu 56 is Update Existing Illustration 62, which goes to FIG. 3C-1. This Function 62 permits the user to update a previously saved prospective applicant illustration using different assumptions. This Function 62 also allows the user to quickly create an illustration which is different from one already saved by allowing the user to change only those few items that the prospective applicant may select, thereby avoiding the laborious process of entering all of the information required to create a new prospective applicant illustration. This Function 62 likewise allows the user to save a new illustration for later updates and to send the illustration to the Local Printer 5 to permit review by the prospective applicant.

Returning to FIG. 3, once the illustration has been compiled, the system presents a sequence of further options. Print Life Insurance Application 64, goes to FIG. 3D-1. This Function 64 allows the user to: (1) take the information generated and saved in the aforementioned illustration process, add to it, and merge it with life insurance application form text data to construct a customized, printed life insurance application form for signature; (2) electronically save in a file the customized life insurance application form; or (3) print out a partially completed or blank life insurance application form for later manual completion by the prospective applicant.

Print Loan Application 66 goes to FIG. 3E-1. This Function 66 allows the user to: (1) take the information generated and saved in the aforementioned illustration process, add to it, and merge it with loan application form text data to provide a customized, printed loan application form for signature; (2) electronically save in a file the customized loan application form; or (3) print out a partially completed or blank loan application form for later manual completion by the prospective applicant.

In another embodiment of the present invention, a Block can be added at this point to perform the analogous function for a securities brokerage account application form to permit use of a security and/or an annuity as the investment to repay the mortgage.

Review Insurance Product Developments 68 goes to FIG. 3F-1. This Function 68 allows the user to be quickly apprised of new developments in the insurance products used in forming the illustrations including, but not limited to, changes in interest rates credited by carriers on cash value reserves in the life insurance policies, new underwriting rules, new products provided by different carriers, etc. This information is available inside the Generate New Applicant Illustration 60 and Update Existing Applicant Illustration 62 functions. Information may be read from the screen or printed out.

Review Loan Rates 70 goes to FIG. 3G-1. This Function 70 allows the user to be quickly apprised of current loan rates and other timely product information from lenders. This information coincides with the Generate New Applicant Illustration 60 and Update Existing Applicant Illustration 62 functions. Information may also be read from the data screen 4 or printed out.

With further reference to FIG. 3, it should be noted that, in another embodiment of the present invention, the computer system is modified to accommodate other species of investment for repaying the mortgage. The modifications would include adapting FIG. 3, particularly Blocks 58, 60, and 62, to consider these additional investments. These other investments can include, for example, joint or joint and survivor life insurance, insurance (such as term insurance) in combination with an annuity or securities (for example, a zero coupon bond), an Individual Retirement Account (IRA), or a Keough Account. In the interest of brevity, this application will not delve into each of these variations on the theme of a preferably tax-exempt repayment vehicle for serving as partial down payment and the means for repaying the mortgage. A suitably skilled computer programmer would recognize from the detailed description of the logic, user screens, specimens, and text discussion herein, that the logic would simply be modified to focus on distinctive features of the other repayment vehicle(s). Thus, for example, the alternate embodiment of the computer system would be adapted to obtain data and compute information sufficient for determining how and when the repayment vehicle will pay off the mortgage. The data can be obtained, for example, in a manner parallel to that described in Insurance Premium Information 16 or via modem, for example, from a plurality of stock brokers. There would be means for generating an illustration of such an investment, along with investment implementing documentation, brokerage account applications, etc. Similarly, the logic described herein can be modified to reflect different mortgage products. These can include fixed and variable rate mortgages with negative or positive amortization. While the fixed rate mortgages would be handled by means for computing fixed rate mortgage payments, an adjustable rate mortgage would be more complicated, having a means for computing extra amortization of mortgage principal when interest rates are low, and negative amortization when interest rates are high. The cash value accumulation can be treated as an offset to negative amortization.

Turning now to FIG. 3A-1, the Generate Generic Illustration 58 function is illustrated. The Function 58 begins with User Screen 3 via Block 72, which asks the user to input the age and sex of the prospective client. A Ryan Mortgage involves the payment of monthly interest only on the loan, with repayment of principal at the end of the mortgage term. Conventional amortization mortgages, on the other hand, involve a gradual repayment of principal over the term of the mortgage. Since a preferred embodiment of this invention involves the illustration of how accumulated life insurance cash values may be used to pay off the mortgage at the end of the mortgage term, the amount and timing of the principal repayment is an important variable in the presentation of mortgage alternatives.

The specification of age and sex is appropriate, even for an illustration designed to show only average or hypothetical insurance values, i.e., values not entirely tailored to the individual prospective applicant. This is because the statistical probability of the insured's death (and hence the amount the insurance carrier must charge policyholders in order to have adequate reserves for the payment of policy death proceeds) varies according to the age and sex of the individual insured. This in turn has an important impact on how the policy is designed and has an ultimate bearing on the price and term for policy premium payments.

User Screen 3, via Block 72 in FIG. 3A-1, also asks the user to select whether the life insurance premiums are to be paid in a lump-sum prepayment, which is a single premium payment plus (at least) three premiums prepaid with the purchase of an annuity. This minimum number of premium payments is required under present law to avoid treatment of the policy as a modified endowment contract. The system automatically preselects these amounts: (1) to assure that the policy conforms to US tax regulations and avoids modified endowment contract status under IRC Section 7702A(b) (thereby assuring that the policyholder avoids costly tax penalties in the event of policy surrender); and (2) to assure that the life insurance cash value will be sufficient to provide an amount of collateral which will be acceptable to prospective lenders.

In addition, User Screen 3, Block 72 in FIG. 3A-1, asks the user to select the preferred mortgage repayment plan. Each plan offers distinct financial advantages to the prospective applicant and allows him or her to select the plan that best suits his or her needs.

Block 73 allows the user to modify any of the default generic data to more closely parallel the prospective applicant's situation. This allows for a more personalized generic illustration, without requiring the prospective applicant to complete the more thorough Generate New Applicant Illustration 60.

User Screen 4 depicts Submenu 73, also known as the Generic Supermenu. After modifying whatever data the prospective applicant wishes to change, Block 74 saves the data. Block 74 also finds loan rates from the Database 17, Block 76 gets the average loan rates, and Block 78 gets average closing costs.

Retrieve Average Closing Costs 78 uses an average loan closing cost based on the amount of the mortgage by consulting the database of average closing costs, as measured, for example, by the Department of Housing and Urban Development or some other reliable source of statistics on the costs involved in completing a home purchase transaction.

Proceeding to FIG. 3B-4, the insurance illustration system can be designed so that the same computer can be used to provide product illustrations for the insurance products of different carriers. In this embodiment of the invention, the system offers maximum flexibility so that it may accommodate virtually any life insurance policy and/or annuity. In a preferred embodiment of the invention, the system also provides many tables for product-specific data such as mortality tables, expense charges, interest rates, and other insurance related data. These tables can be used to store the different components of the carriers' products. Product specific "flags" or identifiers in the insurance computation formulas can be used to provide maximum flexibility in the way the system makes insurance computations. This allows the system to offer a method of customizing computations that are common to all life insurance products. This feature also makes it possible for a single computer to efficiently provide multiple life insurance product illustrations for multiple life insurance carriers. (In another embodiment of the invention, the system can use front-end network gateways to connect multiple carriers' computers to the Digital Computer 8.)

The system maintains security by affording limited access to carrier-specific databases. The system provides carriers exclusive access to their own databases, for example, via modem, by requiring a password. Only individuals authorized by the carrier can access or see the carrier's databases.

In the case of a generic illustration, Block 80 leads to Block 82, which solicits a selection of the best product criteria. Criteria solicited by the system in Block 82 might include, for example, minimum initial or minimum monthly costs to the borrower. These criteria are subsequently used by the system to find the best product. The system also stores the selection in Database 17, via Block 84.

However, if the user selected Generate New Applicant Illustration 60 in FIG. 3 instead of Generate Generic Illustration 58, the user would have selected a product displayed on the User Screen 2. The system stores either the product displayed in FIG. 3B-3 or the product found in FIG. 3B-3 in Blocks 90 and 84, respectively.

Blocks 92 and 86 identify a count of products to be illustrated and Block 94 initializes a counter to keep track of the number of products being illustrated. Solicit Premium Payment Plan 96 solicits the mortgage repayment plan, unless this data has already been selected as part of the generic illustration in User Screen 3.

The insurance illustration aspect of the present invention involves computing the amount of up-front payments required to obtain an insurance policy that will, after N years (typically thirty), have sufficient cash value to repay the mortgage. Given the selection of how the user premium payments will be made, the user must select how the mortgage will be repaid in Block 98. Under existing law, the mortgage can economically be repaid in one of three ways. The policyowner may surrender the contract and use policy proceeds to repay the mortgage. In this case, the system assigns a value of 0 to the mortgage repayment variable, LOPT, in Block 98. The policyowner may use a policy loan to repay the mortgage and plan to hold the life insurance contract until death. In this case, LOPT is set equal to 1.

Alternatively, the policyholder may hold the mortgage and life insurance policy until death, using annual policy loans to pay the mortgage interest, in which case LOPT is set equal to 2. The user may select any combination of the premium payment and mortgage repayment options at the outset of the illustration process.

There is no formula for the correct premium amount. Instead, in FIG. 3B-5, the system uses formulas that project a cash value amount corresponding to a given premium amount and premium payment plan. The system tests this cash value amount to see if it falls within the system's mortgage repayment guidelines as defined in Blocks 102 and 104 of FIG. 3B-4. (Separate guidelines exist for each mortgage repayment plan.)

Turning now to FIG. 3B-5, at Block 106, the system retrieves from Database 17 carrier product information. Block 108 uses this information to make a first trial annual premium, and the remainder of FIG. 3B-5 tunes the trial premium to make it more accurate. If the projected cash value falls outside system parameters in Block 112 and if this is the first trial in Block 114, the system selects another trial premium amount above or below (as is discussed more fully hereinafter) the first trial premium in Block 116 and produces another cash value estimate in Block 110.

Because various insurance expenses are variable in ratio to the premium and policy cash value, the system does not depend on scaling. Instead, the system uses bracketing (i.e., finding a value above, and a value below, a target value). The system finds two premium/cash value pairs that bracket the desired goals in Block 118, and can use bisection or Newton's method to find the desired premium amount. That is, in the second pass through Branch 112, if the target is not met, Branch 114 is "no" (as it is not the first trial). Block 118 tests whether the first and second trial premiums bracket (fall above and below) the target. If not, Block 116 generates a third trial premium, etc., until the target is bracketed. If at Branch 122 the system has found two bracketing trial premium amounts, Block 124 then finds a third trial premium via bisection or Newton's method. To accelerate convergence, if at Branch 122 the system has found three trials, from then on, the system uses quadratic interpolation in Block 126 to find the next trial premium. The system replaces the more outlying trial with the new one, and conducts another iteration. Once the target is met in Branch 112, the monthly premium amount is stored via Block 120, and the logic goes to FIG. 3B-6.

The two premium payment plans have two system defaults, although others may be used at the discretion of the system owner/operator. For a sponsored transaction in which a corporation or financial services institution guarantees the payment of premiums, the default number of premium payments is ten. The home buyer pays one as part of the mortgage closing, and pays the remainder in monthly installments to a lender escrow account over the next nine years. For a lump-sum prepayment of the premium, the default number of premiums is four. One is payable at closing, and the rest are prepaid by an annuity purchased at the closing. The system ignores the annuity cost calculation until it has solved for the correct four premium payment amounts. (Specimens 2–4 show sample illustrations assuming lump-sum prepayment of the premium, and specimens 5–7 show illustrations assuming sponsored mortgage transactions.)

More particularly in Blocks 106 and 108, the first way the mortgage can be repaid is by surrendering the policy. In searching for this amount, the system will iteratively solve for an amount of cash value targeted in FIG. 3B-4, Block 104. This amount will repay the mortgage assuming the policyowner/borrower surrenders the policy at the end of the last year of the mortgage. To arrive at the appropriate cash value amount, the system will iteratively repeat the following six steps until it arrives at a premium amount that will generate an after-tax cash surrender value equal to the mortgage principal:

1) Select a premium amount, based on a first trial;
2) Use the selected premium amount to compute a cash value in the Nth year of the mortgage;
3) Compute a life insurance policy basis by adding up cumulative premiums over the life of the mortgage;
4) Subtract the basis from a total cash value projected in the Nth year of the policy to arrive at the taxable gain in the policy;
5) Multiply the taxable gain by one minus the customer's tax rate to arrive at the customer's net after-tax gain; and
6) Add the basis back to the net after-tax gain to arrive at the after-tax cash surrender value.

For example, assume the amount of the mortgage is $262,000 and the homeowner's expected tax rate in year thirty of the mortgage is thirty-four percent. The system will iteratively solve until it arrives at a premium amount of $35,664.64 ($8,916.16 annually for four years) and a cash value amount of [($378,608.59−$35,664.64)×(1−0.34)]+$35,664.64=$262,007.64. (Specimen 2 shows sample output for this mortgage and the LOPT=0 mortgage repayment method. Specimen 5 shows sample output for this mortgage assuming a sponsored premium payment plan and LOPT=0).

The second way in which the mortgage may be repaid is using a life insurance policy loan. This illustration assumes that the policyholder elects to take a policy loan against the cash value of the policy in the last year of the mortgage. Then the policyholder uses the proceeds of the policy loan to repay the borrowed mortgage principal. In this way the homeowner is converting debt with recourse (the lender has recourse to the mortgaged property and the life insurance policy) to non-recourse debt (the insurance company has recourse only to the life insurance policy).

With this second method of mortgage repayment, the system at Blocks 106 and 108 uses a different definition of adequate cash value in Block 102. The adequate cash value amount is enough to allow the policyholder to maintain the policy until death. The system assumes death at age ninety-five or ninety-nine, depending on the requirements of the specific policy being illustrated. For the policy to remain in force until that age, both the policy cash value and death benefit must always exceed the outstanding policy loan balance. Policy loan balances grow in tandem with cash values. Rather than pay each year's policy loan interest, the policyholder may elect to add this interest to the policy loan principal as additional policy borrowing. By means of a default, the system assumes that the policyholder never repays the policy loan and holds the policy and policy loan until death. (Specimen 3 shows sample system output for such a mortgage, a lump-sum prepayment, and LOPT=1. Specimen 6 shows the same transaction assuming a sponsored transaction.)

In the example described above, the system illustrates the policyholder receiving a policy loan equal to $262,000 in the Nth year of the life insurance contract. This amount is enough to repay the mortgage on the home. The policy loan eliminates the mortgage obligation. The terms of the life insurance contract illustrated might call for a policy loan rate of 9.5%. The system would then project the policy loan interest equal to $24,890 at the end of the N+1st year of the life insurance contract. At the beginning of the N+2nd year, the policy loan interest for the previous year would be added to the policy loan and the new policy loan balance would be $286,890. For the N+2nd year, the system would calculate policy loan interest based on the current year's policy loan balance of $286,890. The policy loan interest would therefore be $27,254.55 in the N+2nd year. At the beginning of the N+3rd year, this would be added to the policy loan balance. The system would repeat this procedure until the final year of the illustration, when the insured reaches age ninety-five or ninety-nine.

The system projects cash value amounts which may be adjusted by the policy loan balance. The system guideline or target cash value for this computation is the cash value balance net of policy loan balances and accrued policy loan interest. This amount must be slightly greater than zero in the policy year that the insured would have his or her ninety-ninth birthday. The invention allows for two different rates at which interest will be credited toward cash value balances. The first rate is the unloaned funds credited rate, which is the rate credited on policy cash values not subject to liens from policy loans. The second rate is the loaned funds credited rate, which is the rate earned on that portion of the cash value that the policy has borrowed against.

Returning to the above example, assume that the system lowered its initial premium plus annuity payment to $26,151. The system now projects the cash value to be $302,973.30 in the thirtieth year of the mortgage. After the homeowner uses the $262,000 policy loan to pay off the mortgage obligation, the cash value will remain at $302,973.30. However, by year 30 the remainder will be equal to $40,973.30 net of policy loans. This amount, $40,973.30 net of policy loans, will earn interest at an unloaned funds credited rate. The $262,000 in cash value nominally collateralizing the policy loan will earn interest at a loaned funds credited rate.

In most universal life insurance policies the loaned funds credited rate is much lower than the policy loan interest rate. This creates a negative arbitrage or "spread" between the interest earned and interest paid within the two accounts of the policy. Because of this negative spread, policy loan balances typically grow much more quickly than the policy cash value. After a few years, policy debt will exceed cash value. At this time, the policyholder must either pay additional premiums, reduce the policy loan balance, or allow the life insurance policy to lapse. Using the above example, assume the individual requesting the illustration is a male aged thirty-two at the time of the illustration. Assume further that the loaned funds credited rate is a full three percentage points less than the 9.5% policy loan rate. Here again the system will compute the policy cash value as $302,973.30 in year 30. However, by year 36 of the policy, the policy loan balance plus outstanding policy loan interest would be $451,633.35, while the policy cash value would be $440,503.71. This would force the policyholder to pay additional premium payments or allow the policy to lapse (and pay the tax consequences) in the following year.

On the other hand, assuming a zero spread policy loan, by the end policy of year 36, the policy cash value would be $511,955.57. The policy loan balance plus outstanding policy loan interest would again be $451,633.35, yielding a net cash value of $60,322.21. Assuming constant interest rates and mortality charges, the policy would remain in place until the insured's assumed death at age ninety-nine when the net cash value would be $354.43. So long as interest rates remain relatively constant, no further premium payments are required of the insured.

Low or zero spread policy loans have been available to policyholders in the past. However, their use has been limited previously to key-man or corporate owned life insurance policies. They have not heretofore been used in conjunction with home mortgages in accordance with the teachings of the present invention, wherein a system illustrates, monitors, and administers these policy cash values and policy loan balances efficiently and at low cost. This capability permits carriers to offer prospective applicants a low or zero spread policy loan for use in the repayment of mortgages. Such a spread is preferably less than 300 basis points. The use of these smaller spreads minimizes the ratio of cash value to policy loan value required to keep the policy in force over the life of the policy. This, in turn, reduces the amount of up-front premium payments required in the funding of the transaction.

The third illustration option (LOPT=2) is computed using the target cash value for the zero-spread/low spread policy loan option described above (LOPT=1) and computed in Block 102. This is because it assumes a roll-over of the mortgage obligation. In this scenario, at the end of the term of the mortgage, the homeowner requests a new mortgage. The lender will approve such a transaction subject to a second credit review and collateral evaluation in the last year of the mortgage. The system therefore calculates an amount of premium plus annuity ($26,151) which will provide for repayment of the mortgage in the Nth year (assuming LOPT=1), then shows alternative uses of the policy as of that year.

This third method assumes the homeowner does not pay off the principal in year N. Instead, he or she rolls over the mortgage and uses policy loans thereafter to pay the mortgage interest. The mortgage is held until the death of the homeowner. Mortgage interest is paid using zero or low spread policy loans from the life insurance policy. This method of mortgage repayment is attractive to those wishing to maximize the amount of life insurance death benefit payable to their estate. For the above example, assuming death at age ninety-nine, the death benefit net of policy loans would be $1,868,160.32. The policy loan balances in this repayment option remain extremely low compared to the policy cash value and death benefit ($5.8 million vs. death benefits of $8.2 million). Therefore, an amount of premium plus annuity to generate enough cash value to pay off the mortgage at the end of the mortgage term assuming LOPT=1 ($26,151) will be more than sufficient to carry the policy until the insured's ninety-ninth birthday. (Specimen 4 shows sample system output assuming the above-characterized mortgage, a lump-sum prepayment premium plan, and LOPT=2. Specimen 7 shows the same transaction but with a sponsored premium plan.)

Moving now to FIG. 3B-6, the system begins a process of checking the illustration just calculated to make sure it is in conformity with the legal definition of insurance by calculating regulatory guideline premium amounts in Block 128. These amounts are regulatory limits on the size of the premium relative to life insurance cash value and death benefits. As is subsequently discussed, the regulatory benchmarks include guidelines for Single Premium, Level Premium, and "Seven Pay" premium amounts. In Branch 130, the system compares these guideline premium amounts to those premium amounts previously stored via Block 120, the premium amounts for the proposed illustration. The cumulative premium initially illustrated must not exceed the cumulative Guideline Level Premium or the Guideline Single Premium in any given year of the proposed illustration. If the premium amounts exceed any of the guidelines, the system recomputes the needed premium using the newly computed guidelines via Block 132 and goes via logic entry point Z2 to FIG. 3B-5.

Once the system has solved for the correct premium/cash value combination and has tested this value against regulatory requirements, the system carries out four other operations. First, it prepares a further illustration in Block 133. This illustration assumes that the policyholder pays the previously determined premium amount and maintains the desired death benefit. However, the illustration further assumes that the carrier pays only the minimum guaranteed interest crediting rate on policy cash value, and charges the maximum mortality charges possible under the terms of the insurance contract. Samples of these Guaranteed Values appear in Specimens 2–7.

Next, the system in Block 134 computes two policy cost indices designed to provide the prospective applicant with a bench mark for measuring product performance. The first index is the Surrender Cost Index which is 1000 times the present value of premiums paid discounted at five percent minus the present value of the end-of-period cash value divided by the present value of the death benefits. The second index, known as the Net Payment Cost Index, is equal to 1000 times the ratio of the present value of the premiums discounted at five percent to the present value of the death benefits over the period discounted at five percent. The system calculates these two indices through Years 10 and 20 of the policy illustrated, assuming current interest and mortality charges apply, and assuming guaranteed interest and mortality charges apply. Sample calculations of these cost indices appear on the last page of Specimens 2–7.

Next the system computes the financial advantage to the prospective applicant of the Ryan Mortgage in Block 135. The computation compares these costs for the Ryan Mortgage and a conventional mortgage after five and ten years. The analysis also includes a comparison of the homeowner's equity in the home, assuming the home buyer enters into a conventional mortgage transaction, and the accumulated cash value in the life insurance contract in the Ryan Mortgage. This analysis appears in Specimens 2–7.

Next, the system provides an analysis of the effect of a change in interest rates on the required premium payment and cash value in Block 136. The system conducts this analysis first, by assuming the interest rate index pushes the carrier's credited rate down to the guaranteed rate and second, assuming the index pushes the mortgage rate up to the lender's cap after the first year. (The system does not perform the second analysis in the event a fixed rate or variable mortgage with no cap has been chosen.)

The first analysis assumes a decline in interest rates. Using the premium amount previously solved for, the system reprojects the cash value assuming mortality charges remain constant, but interest rates go down to the carrier's guaranteed rate. The analysis, provided for years 2 through the end of the mortgage, also assumes that in each year the customer is required to make additional premium payments. These additional premium payments are equal to one-twelfth of the difference between the cash value as it was originally projected and the cash value assuming a minimum guaranteed interest rate (plus premium processing charges). The payments are made monthly to the lender where they are held in escrow until the end of the year whereupon they are sent to the carrier. Because in a preferred embodiment of the invention the carrier credited and mortgage interest rates are tied to the same index, the decrease in the mortgage cost in most years will be less than the increase in the cost of a supplemental premium.

The additional premiums paid by the borrower will also permit the home buyer to pay off the mortgage sooner, assuming the home buyer has chosen to repay the mortgage by surrendering the life insurance contract. This is because the additional premium increases the policyholder's basis, thereby reducing the amount of the cash value which must be used to pay taxes upon surrender.

The second analysis made by the system in Block 136 assumes that the interest index rate rises, pushing the mortgage interest rate up to the cap. In a preferred embodiment of the invention the mortgage interest rate is variable. The carrier's crediting rate also rises with the index. This, in turn, causes cash value to accumulate faster than originally projected. This will permit the home buyer to pay off the mortgage sooner. The interest rate sensitivities summarized in Block 136 appear in Specimens 2–7.

These analyses, furthermore, permit the system to automatically generate Truth in Lending disclosures. By calculating the maximum cost to the consumer, assuming both maximum and minimum interest rates, the system apprises the consumer of the maximum mortgage cost in any year.

After the aforementioned supplemental analyses have been completed, the system saves the results in Block 137 for later printing. This completes the illustration for a particular financial product. Next, the system checks to see if it needs to make a similar computation for other products. If in Branch 138 it finds that not all desired products have been illustrated by comparing a target number of products to be illustrated (from Block 92 or 86) with a counter, the system increments the counter in Block 139 and returns to FIG. 3B-5 to initiate another illustration.

Otherwise, the system tests whether more than one product has been illustrated (J>1), and if so, proceeds to Block 142 to find the best product based on the criteria entered in Block 82. In either case, the logic goes to Block 144 to store the insurance product specific data for an illustration, and then goes to FIG. 3B-7.

FIG. 3B-7 produces a comparative illustration of a conventional mortgage. Block 146 computes the down payment amount. Block 148 then computes the loan amounts and calculates monthly payments. Block 150 computes a conventional mortgage, term insurance cost, and private mortgage insurance cost such that Block 152 can produce an illustration of the Ryan Mortgage in comparison with a conventional mortgage. The illustration is displayed on Terminal 2 via Block 153. If, in Branch 154, the prospective client specifies a changed down payment amount, the system performs a recomputation via FIG. 3B-5. Otherwise, the system goes to FIG. 3B-8.

Turning to FIG. 3B-8 at Block 156, the values relevant to the computation of an illustration are stored in the Database 17. The user can select a number of options: Print Illustration? 158, which will print the information on the Local Printer 5 via Block 160; Print and Mail Illustration? 162, which will print the illustration on the Central Printer 9 for mailing to a requested address via Block 164; and Make Application Using This Illustration? 166, which merges illustration data with stored text to make an application form, in Block 168. Block 168 also will save the illustration results for further analysis or review, except if this is a generic illustration (as it has been in the present discussion), in which case the generic illustration is removed from the Database 17. However, were this a new applicant illustration, the user could also access the saved illustration (for example, by the Update Existing Illustration 62). The logic returns to the submenu provided by Block 56 in FIG. 3. This return is helpful for changing the generic illustration assumptions in order to see a different version of the generic illustration.

In FIG. 3, again, the Generate New Applicant Illustration 60 function is illustrated in FIGS. 3B-1–3B-8 and User Screens 5–20. This part of the logic performs a similar function to that described above with reference to the Generate Generic Illustration 58 function, with the exception that illustrations can be customized to the prospective applicant's own particular circumstances to produce an illustration that resembles a financial transaction that might be entered into.

In FIG. 3B-1, Solicit 170 generates User Screens 5–7 to obtain information about the prospective applicant, the prospective applicant's employer, and the property at issue, respectively.

User Screens 5–7 request informational items for use in providing a mortgage quote. These items include, but are not limited to, the prospective applicant's name and address, the name and address of the prospective applicant's employer, the location of the property to be mortgaged, and the name and address of the realtor or sales agent representing the individual borrower in the purchase of the property.

Information regarding the employer (User Screen 6) of the prospective applicant is useful for the purpose of providing a printed loan application form. Also, because such data may be referenced against the list in the Database 17 of companies that have agreed to guarantee the premium payments to be made by employees, this information may also be useful in facilitating the loan approval and endorsement process. Such guarantees increase the security of the mortgage from the lender's perspective, thereby increasing the likelihood of mortgage approval on the part of a lender or other loan endorsing entity. Therefore, maintaining information on such guarantees and providing a function to verify the availability of such guarantees and the authenticity thereof is an important feature of the invention.

Information regarding the employer of the prospective applicant is also useful in the life insurance underwriting process. For example, there exist policies that life insurance carriers sell in large volumes through sponsored corporate purchases. These demand far less stringent underwriting requirements than would otherwise be required had the prospective applicant attempted to purchase the life insurance individually. The reason life insurance carriers may offer such policies has to do with the risks inherent in insuring large groups. If an insurance company were to offer to the general public life insurance policies that asked no questions as to the prospective insured's health, the insurance carrier would attract primarily those individuals who were of ill health or who expected to have increased mortality risk. This is known to those familiar with the life insurance industry as "adverse selection." Adverse selection can be avoided in the case of a sponsored corporate purchase by designating a class of insureds all of whom will be insured. A class of insureds thereby takes on the characteristics of a randomly selected portion of the population at large, which, if large enough, will exhibit the same statistical distribution of deaths as the population at large. A class can be defined in many ways and might include such groups as all individuals who are members of the management of a large corporation or those who are relocated to a new community as a result of the normal performance of their duties.

In the event that corporations are willing to offer corporate sponsored purchase of life insurance, life insurance carriers may be willing to relax their underwriting requirements. Relaxed underwriting requirements usually take one of two forms, simplified issue or guaranteed issue. In simplified issue underwriting, only a few simple questions (typically three or four) are asked of the insured. In guaranteed issue underwriting, no questions apart from the age and sex of the prospective insured are asked.

The availability of this kind of underwriting may be beneficial to both the insurance carrier, which may profit from increased insurance sales by providing insurance policies with reduced underwriting in a high volume sale, and to the employer, which as a consequence may offer an enhanced product to its employees. In addition, this kind of underwriting creates another use for the prospective applicant's employment information. The employment information may be compared to a database of all those companies which offer corporate sponsorship of insurance purchases for their employees. If there is a match between the data provided concerning a prospective applicant's employer and information in the database, a corporate sponsor number will be used to identify a product which may be offered to the employee at reduced cost or with less stringent underwriting requirements.

A preferred embodiment of the invention involves a system of corporate sponsorship recognition involving the identification of companies providing both the aforementioned guarantee of premium payments and the creation of a defined group for the provision of specialized underwriting. Block 172 is dedicated to this task.

An inquiry into the prospective applicant's tax status begins with Block 174. The prospective applicant's tax rate information is input directly, as indicated in User Screen 8.

The information obtained via User Screen 8 is used in estimating the amount of the tax benefit to the borrower from the deductible mortgage interest expense, which is an important consideration to anyone evaluating the monthly net after-tax cost of a home purchase. This tax rate is then stored in the Database 17 for later use in the computation of tax credits from the deductible mortgage interest expense.

Proceeding to FIG. 3B-2, the logic develops information as to what kind of loan the prospective applicant might require.

User Screen 9 generated by Block 176 inquires as to the amount of money which will be required to purchase the target property, based on the entered estimated appraised value of the real estate. This data is written to the Database 17 for later retrieval and processing by the Digital Computer 8 in the creation of the illustration. User Screen 9 further asks the user to choose between: (1) selecting a loan offered by one of the lenders that currently offers mortgages using life insurance as collateral and which has authorized the system owner/operator to illustrate the use of its loans in conjunction with life insurance; or (2) entering hypothetical loan rates. (See Branch 178 in FIG. 3B-2.)

The ability to illustrate hypothetical loan rates is offered as a convenience to prospective borrowers who, through their own lending relationships, may have identified lenders who are willing to provide loans which may not be available to other borrowers.

In the event the user chooses to use one of the loans from a lender which has authorized the illustration of its loans, the logic consults the Database 17 at Block 180 to identify all those loans listed and writes selection of loan, its pricing, and the name of the institution offering it in User Screen 10.

Otherwise, from Branch 178, in the event the user chooses to enter a hypothetical rate, the logic requests basic information regarding the expected loan costs via User Screen 11, which is generated by Block 182.

To minimize the potential for generating an unreasonable illustration as a result of a mistake, Branch 184 checks to see that such rates are reasonable, given the current range of possibilities available in the market. If the rates are unreasonable, the logic loops back to Block 182.

User Screens 10 and 11, constructed at Branch 186, also ask the user if the prospective applicant would like the illustration to be based on closing costs which are known, or if it would be preferable to use some or all of the closing costs provided by the Database 17, derived from statistics provided by the Department of Housing and Urban Development or some other entity which gathers and reports such information. In the event the prospective applicant knows or can reliably estimate some or all of the costs, User Screen 12 appears, via Block 188.

The typical closing costs estimated by the system appear in one column. The user may alternatively enter the prospective applicant's estimate of those costs in a second column or leave certain cost categories in the second column blank, or if only a grand total of all closing costs is known to the prospective applicant, the prospective applicant may choose to enter the grand total amount, which then supersedes the itemized amounts listed in the "if known" column. The user must, however, enter a separate amount for the tax escrow. In those categories where blanks remain, Block 190 provides estimates. After Block 190, the estimates will be written to the Database 17 via Block 192, and in those categories where data has been entered to fill in the blanks, the Digital Computer 8 will, for this specific illustration, replace the system's estimates with those made by the prospective applicant when writing these values to the Database 17. Likewise, if only a grand total and tax escrow amount have been entered, those amounts are written to the Database 17 superseding all of the system's estimates.

Turning now to FIG. 3B-3, Branch 194 tests whether the system has identified a corporate sponsor number when the prospective applicant's employment data was compared to the aforementioned stored corporate sponsor tables via Block 172 (FIG. 3B-1). If none has been identified and the prospective applicant is unsure if there is a sponsor, Block 196 presents User Screen 13.

User Screen 13 asks if the prospective applicant has a corporate sponsor number and provides access to a listing of sponsors. In the event that there is a sponsor number in Branch 194 or in Branch 198, User Screen 14 appears via Block 200.

In User Screen 14, options are presented as to the lump-sum prepayment or the corporate guarantee of annual premium payments to be made, as well as the preferred mortgage repayment plan. User Screen 14 also prompts the user to select the mortgage repayment plan. Once designated, these selections are written to the Database 17 for the final computation of the mortgage using life insurance as collateral. If a corporate sponsor number is not identified in Branches 194 or 198, User Screen 15 appears via Branch 202.

In User Screen 15, via Block 202, options are presented as to the lump-sum prepayment or annual premium payments to be made, as well as the mortgage repayment plan. Screen 15 also prompts the user to select a mortgage repayment plan based on the distinct financial advantages of each plan to the prospective applicant. These selections are written to the Database 17 for the final computation of the mortgage using life insurance as collateral.

At Branch 204, if the prospective applicant is interested in securing an irrevocable letter of credit arrangement to backup the annual premium payment, a list of institutions which might be willing to offer such is provided to the user via Block 206. The entry of a selection of an institution in Block 206 brings up a financial sponsor number, which is written to the Database 17 for later retrieval and processing by the Digital Computer 8 in the creation of the illustration. In the event of unsponsored (lump-sum) purchases and Letter of Credit sponsored purchases, the information is stored at Block 208. The system reviews policy parameters saved in the Database 17 and consults the insurance data tables for policies conforming to the choices selected, and writes (Letter of Credit or unsponsored) summary information regarding these policies to the screen. The screen data appearing before the user is summarized in User Screen 16 for borrowers contemplating employer sponsored life insurance purchases.

Once selected by the user the policy selections are written to the Database 17 for later retrieval and processing by the Digital Computer 8 in the creation of the illustration. If instead a corporate sponsor number existed in Block 194 or 198, Block 210 presents User Screen 16, which obtains mortgage data from user selections.

Block 210, User Screen 16, selects a specific insurance policy in accordance with corporate sponsorship. The selected policy offered through the corporate sponsor can include three underwriting types: full medical underwriting, simplified issue and guaranteed issue. Normally, with guaranteed issue or simplified issue underwriting, the selection is limited to only one carrier's policy. Most carriers will require that only their product be illustrated in exchange for offering non-medical underwriting. The system then moves to Block 212 where the underwriting type is determined. If the policy is guaranteed issue, then the logic proceeds directly to Block 214 to store the selection, and then to FIG. 3B-4, where the system identifies the illustration as a single product illustration.

If instead the user had selected Simplified, the logic proceeds, to Block 216 where a four-question health questionnaire is presented via User Screen 18.

If the prospective applicant answers all the questions in the negative, at Branch 218, the policy selection and underwriting information is written to the Database 17 via Block 214 for later retrieval and processing by Digital Computer 8 in the creation of the illustration.

However, if the prospective applicant does not answer all questions in the negative, the logic of Branch 218 offers the choice of proceeding to Electronic Health Questionnaire 220, exemplified in User Screen 19. The choice is whether to continue to illustrate or to proceed to an Electronic Health Questionnaire 220, which is designed to more accurately portray the health status of the prospective applicant and hence facilitate the underwriting process by providing health information which will be needed for the prospective insured's life insurance application. This questionnaire will vary by policy, and may require several screens to complete, as different carriers have very different underwriting standards.

The other choice offered in Branch 218 is to proceed directly to the illustrations (via FIG. 3B-3) with the knowledge that illustration values may not reflect the actual insurance costs to be incurred by the individual. In this case, a blank health questionnaire is also printed out for the prospective applicant to complete at a later date.

Also, if the policy selected uses Medical underwriting, (or after Block 208) the logic proceeds to Block 220, User Screen 20, where the user enters answers to the Electronic Health Questionnaire 220 before proceeding ultimately to FIG. 3B-4.

No matter what choice is selected, all data created regarding the prospective insured's health status is written at Block 214 to the Database 17 for later retrieval and processing by the Digital Computer 8 in the creation of the illustration.

The logic then proceeds to FIGS. 3B-4, etc., which has been previously discussed herein with reference to the Generic Illustration selection of Block 58. Generally, though, the logic determines the number of policies to be illustrated (one for corporate sponsored or user selected policies, two or more for best product) solicits the best product search criteria, reads the values saved in the database, computes insurance and loan values, writes these values to the illustration table, prints these values on the user's screen, and allows the user to print out the illustration requested. However, in contrast to the procedure followed in the generation of a generic illustration, the logic automatically asks the user if it would be desirable to save the values in the illustration table for later use in updating the illustration or in generating and printing completed loan and/or insurance application forms as in Block 62.

Returning to FIG. 3, the Update Existing Illustration 62 function goes to FIG. 3C-1, which commences with Select Input Menu 222. This selection is depicted in User Screen 21, which is also known as the Update Existing Illustration Supermenu.

The logic then goes to the following boxes: Block 224 to update the prospective applicant data, including personal, employment, and health data; Block 226 to update the property data; Block 228 to update the tax rate data; Block 230 to update the insurance data, including the premium structure, as well as the policy selection; and Block 232 to update the mortgage data, including the loan selection and closing costs data. These Blocks 224–232 permit the user to revise selected data in Database 17. Once the menu item has been selected and the update screen has been visited, Block 234 is used to facilitate going to the appropriate screen. The screens are filled in with the old data and in Block 236 the user is allowed to change, add to, or delete from any of the existing data. Block 236 then returns to Block 222. When the user has gone through this loop as many times as necessary to update whatever screens need updating, then from Block 222, the choice of Proceed, Block 238, can be made in which the illustration process proceeds to FIG. 3B-5, which then completes the illustration.

Additionally, the user may select Help, Block 18, which has been previously mentioned as being available from any screen in the system from the Update Existing Illustration Supermenu. A representative context-sensitive hypertext Help screen is shown in User Screen 22.

Lastly, Block 240, may be selected to quickly terminate the current illustration session and return to the Main Menu 44 via Entry Point X1. The user is given an opportunity at this time to save what data has been entered thus far.

With further reference to FIG. 3, the Print Life Insurance Application 64 selection goes to FIG. 3D-1. Block 242 selects one form from a variety of insurance forms that could be printed, depending on the carrier. The logic proceeds to Block 244, which retrieves the existing prospective applicant data from Database 17, which was solicited in the process of creating the illustration, and prefills the insurance application form. If necessary, Block 246 allows the user to fill in any additional data. Then Block 248 prints the application at Local Printer 5. The logic proceeds to Block 250 which requests whether or not to send the application to the system owner/operator electronically. (The system owner/operator may also expedite transmission of application to the insurance carrier.) If that answer, in fact, is "no," the logic goes to Block 252 to return to Block 244. If the answer is "yes," Block 254 checks for completeness and permits sending the application to the Carrier via Block 256. Block 258 saves the insurance policy data and then returns to Block 64 in FIG. 3.

FIG. 3 also has a Print Loan Application 66 selection, which goes to FIG. 3E-1. While differing from Print Life Insurance Application 64 in the output provided, these two parts of the program carry out similar tasks. The user is asked whether to fill out the form by: (1) merging it with existing applicant illustration file data and adding whatever data might remain missing; or (2) filling out a loan form electronically ex nove. The user has the option of printing out the application form in varying degrees of completeness. However, in order for the loan application to be accepted electronically for processing, the form must have been completed for all answers programmed.

More particularly, in FIG. 3E-1, Block 260, the system automatically selects the particular loan application form from the library of loan application forms for the various lenders, and proceeds to Block 262, which retrieves existing applicant data from Database 17 and prefills the form. Block 264 allows the user to update fields that were not present in the illustration process. Block 266 prints the application on Local Printer 5. Block 268 asks whether or not the application should be sent electronically to the lender. If the answer is "no," the routine goes to Block 270, which returns to Block 66 in FIG. 3. If the answer is "yes," the routine proceeds to Block 272 to check the application for completeness. If it is complete, it is sent via Block 274 to the lender for processing electronically. Block 276 saves the data, and the logic finally returns to Block 66 on FIG. 3.

Review Insurance Product Developments and Review Loan Rates, Functions 68 and 70 in FIG. 3, permit the user to read through prepared textual data by allowing the user to move from screen-to-screen. Once the user has completed a review of the data from Database 17, one or all of the textual screens or "pages" can be printed at the Local Printer 5.

More particularly, for Review Insurance Product Developments 68 in FIG. 3, the logic goes to FIG. 3F-1. In Block 278, new insurance product developments are retrieved and displayed for the user. Block 280 allows the new insurance product developments to be printed on the Local Printer 5, if desired, and then the logic returns via Block 282 to Block 68 on FIG. 3.

In FIG. 3, Review Loan Rates 70 goes to FIG. 3G-1, which begins with Block 284, to retrieve and display the loan rate data from Database 17. Block 284 permits displaying that information and Block 286 permits printing that information on Local Printer 5, if desired, and then the logic returns via Block 288 to Review Loan Rates Block 70 of FIG. 3.

A separate but associated computer program which uses Database 17 is exemplified in FIGS. 3H-1 and 3H-2. FIG. 3H-1 shows a reillustration function of the present invention. The system uses this function in the maintenance of the policies, after the prospective applicant has entered a home financing transaction. The system essentially reillustrates a previously given illustration and saves the results of the reillustration. The system uses this reillustration information to monitor the annual cash value accumulation of the life insurance contract.

The system performs this function using, in part, data it already has from Database 17 by completing a batch run, for example, two months prior to the policy anniversary date. This is shown in Block 290. The system finds the original applicant data at Block 292 in the existing applicant Database 17, and then compares the cash value originally projected in the original Ryan product illustration to the annual cash value growth actually occurring in the insurance contract. In order to do this, the system finds the original illustration product parameters via Block 294 from the Database 17. Monitoring computations may be made using a life insurance policy index rate and a mortgage index rate.

In a preferred embodiment of the system, the life insurance policy credited rate and the mortgage loan rate use the same interest rate index. The interest rate index might be, for example, the average yield on United States Treasury Bills over the past year. Both life insurance policy interest credited and the mortgage rate are therefore variable in one embodiment of the invention. (In another embodiment of the invention, the mortgage interest rate and payment can be fixed.) However, some lenders will introduce mortgage products that place caps or limits on the amount interest rates can go up or down. This could limit interest changes in a given year, and/or over the life of the mortgage. (This is appealing to borrowers because it limits the potential cost of the mortgage upon a rise in interest rates. Also, most life insurance contracts must by present law provide a guaranteed minimum credited rate of interest on policyholder's funds. This amount is usually four percent. This feature is appealing to policyholders because it assures them a minimum return on their invested funds.)

In Block 296, the reillustration function of the system computes at the end of each year what the interest rate will be in the upcoming year using historical index interest rate information from Database 17. It makes this calculation for both the life insurance policy and the mortgage. This, in turn, permits the system to predict the cash value accumulation in the policy and recalculate the monthly mortgage payment in Block 298.

If interest rates go down, the amount of interest credited on the homeowner's policy will go down and the cash value will drop below the target. In order for the product to be acceptable to lenders or endorsers, however, the system must assure that the homeowner will have sufficient cash value to pay back the principal at the end of the mortgage term. Therefore, the terms of the mortgage agreement may require that the homeowner pay extra premiums in the event of a cash value shortfall. There is a test of whether extra premiums calculated by the system are payable upon a projected cash value shortfall due to lower interest rates in a given year in Block 300. The amount the home buyer must pay is determined by reference to the difference between the cash value originally projected and the amount that the contract will earn in the upcoming year. (A rise in interest rates will create a cash value surplus that will carry over into years of low interest rates.) This amount, for example, can be payable in twelve monthly installments and held in escrow by the lender. These amounts are computed in Block 302, the mortgage payment is computed in Block 304, FIG. 3H-2, these are stored in memory in Block 306 and sent to the lender in Block 308. The logic returns via Block 310 to Block 290.

At the end of the year, the lender sends the accumulated twelve monthly extra premium payments to the insurance company. After this payment is made, the life insurance policy will be at its originally projected cash value. Thus, the policy is subsequently back on target, even though interest rates may have fallen below original projections.

The increased cost of the additional premium payment payable in the event of a cash value shortfall is offset by the decreased cost of the mortgage interest. Mortgage interest rates typically exceed life insurance credited rates by one or two percentage points. The cash value amount will exceed the mortgage principal only in the last years of the mortgage. Therefore, the decrease in the cost of the mortgage payment will equal or exceed the cost increase from supplemental insurance premium payments. The net payment will be lower in all but the last years of the mortgage. The supplemental insurance premium payments can only exceed the decrease in mortgage payments when the cash value balance exceeds the principal balance. Then, generally after year twenty-five of the mortgage, a sudden drop in interest rates will cause the homeowner to pay the largest extra premium payments. This is because the cash value accumulation is greatest in those years.

This situation is analogous to the effects of a precipitous drop in interest rates in the last years of a variable rate conventional mortgage. In a variable rate mortgage, the year's mortgage payment is recalculated each year. The calculation is based on the preceding year's principal balance, the year's interest rate, and the number of payments remaining over the life of the mortgage. The rate at which principal is amortized in a conventional mortgage differs, according to the interest rate. At higher interest rates, amortization occurs more slowly. Thus, if the mortgage principal has been amortized at a higher interest rate and interest rates drop suddenly in a given year, the homeowner must pay a larger amount of principal in that year than originally expected. The Ryan Mortgage functions the same way when interest rates decline. However, when interest rates go up, in the Ryan Mortgage principal accumulation is actually more rapid, because the principal is accumulating in a life insurance contract. Thus, the Ryan Mortgage variable rate mortgage offers the consumer the same assurance of mortgage repayment as a conventional mortgage upon falling interest rates, but it also provides for more rapid repayment of the mortgage in the event of rising interest rates. This feature is a significant improvement over the conventional variable rate mortgage.

FIG. 4 provides a depiction of a relational Database 17 for the present invention. The description of the relational Database 17 includes numbered entity (database table) definitions and detailed descriptions of the columns (fields) present and their characteristics. NOT NULL specifies that a column is required to be filled, and TYPE designates the type of data that this column contains. The following table definitions parallel the above entity definitions and detail the columns (fields) present and their characteristics.

ADDITIONAL_RESPONSES 400 has records of additional responses made by the prospective applicant to questions that appear on an insurance or loan application form that were not solicited during the illustration process.

| Name | Null? | Type |
|---|---|---|
| ADDITIONAL_RESPONSES_ID | NOT NULL | NUMBER |
| APPLICATION_ID | | NUMBER |
| PAPER_FORM_ITEM_ID | | NUMBER |
| RESPONSE | | CHAR(255) |

APPLICATION 402 is a super entity which holds the various insurance applications 402A and loan applications 402B (each specific type of application is a view or instance of this table). These application records are built on information contained in the illustration, as well as supplemental information supplied by the prospective applicant (e.g., provided in ADDITIONAL_RESPONSES 400). There is one APPLICATION 402 record for every application created for a prospective applicant

| Name | Null? | Type |
|---|---|---|
| APPLICATION_ID | NOT NULL | NUMBER |
| APPLICATION_TYPE | | CHAR(10) |
| THEPI_APPLICATION | | NUMBER |
| ILLUSTRATION_ID | | NUMBER |
| PAPER_FORM_ID | | NUMBER |

CLOSING_COSTS 404 is an entity that holds closing costs data that is used to generate the estimates used for the closing costs specific to an illustration.

| Name | Null? | Type |
|---|---|---|
| CLOSING_COSTS_ID | NOT NULL | NUMBER |
| CITY | | CHAR(30) |
| STATE | | CHAR(2) |
| ZIP | | NUMBER(5) |
| TAX_ESCROW | | NUMBER |
| INTEREST_ADJUSTMENT | | NUMBER |
| LEGAL | | NUMBER |
| TITLE | | NUMBER |
| GOVMT | | NUMBER |
| SURVEY | | NUMBER |
| HAZARD | | NUMBER |
| OTHER | | NUMBER |

The CONVENTIONAL_MORTGAGE 406 entity contains all the information necessary to compute the conventional mortgage costs for the same property. These figures are reported in the illustration printout.

| Name | Null? | Type |
|---|---|---|
| CONVENTIONAL_MORTGAGE | NOT NULL | NUMBER |
| LOAN_TERM | | NUMBER |
| INTEREST_RATE | | NUMBER |
| POINTS | | NUMBER |

The CS_CLOSED_ELIGIBILITY 408 entity contains the specific eligibility requirements for each corporate sponsored premium guarantee plan. Specifically, it contains the eligibility requirements for closed plans, i.e., those corporate sponsored premium guarantee plans that are available only to limited personnel within an organization.

| Name | Null? | Type |
|---|---|---|
| CS_CLOSED_ELIGIBILITY_ID | NOT NULL | NUMBER |
| CS_ID | | NUMBER |

The CS_OPEN_ELIGIBILITY 410 entity contains the specific eligibility requirements for each corporate sponsored premium guarantee plan. Specifically, it contains the eligibility requirements for open plans, i.e., those corporate sponsored premium guarantee plans that are available to all personnel within an organization.

| Name | Null? | Type |
|---|---|---|
| CS_OPEN_ELIGIBILITY_ID | NOT NULL | NUMBER |
| CS_ID | | NUMBER |

The EMPLOYMENT 412 entity contains the employment data for the prospective applicant requesting an illustration, such as place of employment, salary, etc.

| Name | Null? | Type |
|---|---|---|
| EMPLOYMENT_ID | NOT NULL | NUMBER |
| EMPLOYER_ID | | NUMBER |
| PERSON_ID | | NUMBER |
| OCCUPATION | | CHAR(30) |
| TITLE | | CHAR(30) |
| PHONE | | NUMBER(10) |
| PHONE_EXTENSION | | NUMBER |
| SALARY | | NUMBER |

The FMA_HELP 414 entity contains all context sensitive, hypertext linked help records for Help 18. It contains context keywords, and hyperlink keywords in addition to the help text that enables these features.

| Name | Null? | Type |
|---|---|---|
| FACILITY | NOT NULL | NUMBER(4) |
| TOPIC | NOT NULL | CHAR(30) |
| LINE | NOT NULL | NUMBER(5) |
| TEXT | | CHAR(80) |

The HEALTH_QUESTION 416 entity contains the individual questions that comprise a specific health questionnaire. Depending on the question and questionnaire, a specific question may appear in multiple health questionnaires.

| Name | Null? | Type |
|---|---|---|
| HEALTH_QUESTION_ID | NOT NULL | NUMBER |
| HEALTH_QUESTION_TYPE | | CHAR(30) |
| SEQUENCE_NUMBER | | NUMBER |
| QUESTION_LINE1 | | CHAR(70) |
| QUESTION_LINE2 | | CHAR(70) |

The HEALTH_QUESTION_RESPONSE 418 entity contains the responses to the health questions by the prospective applicant. It contains responses to all of the health questions, be they simplified or medical underwriting types.

| Name | Null? | Type |
|---|---|---|
| HEALTH_QUESTION_RESPONSE_ID | NOT NULL | NUMBER |
| PERSON_ID | | NUMBER |
| HEALTH_QUESTION_ID | | NUMBER |
| RESPONSE | | CHAR(255) |
| BEGIN_DATE | | DATE |
| END_DATE | | DATE |

The IC_CS_REGISTER 420 entity is an intersection table used internally to resolve the "many-to-many" relationship between insurance carriers (IC) and corporate sponsors (CS). Since any single corporate sponsor may have agreements with multiple insurance carriers, and any single insurance carrier may have agreements with multiple corporate sponsors, this table is required to describe these relationships.

| Name | Null? | Type |
|---|---|---|
| INSURANCE_CARRIER_ID | NOT NULL | NUMBER |
| CORPORATE_SPONSOR_ID | NOT NULL | NUMBER |

An ILLUSTRATION 422 is a document (both hard copy and database record) that is produced for a PERSON 452 (prospective applicant) which compares a conventional mortgage with an insurance collateralized, Ryan Mortgage on a specific property. Multiple illustrations may be produced for a single prospective applicant illustrating various insurance and loan selections, but each illustration must be owned by a single prospective applicant. A special generic illustration may be created in which most (or all) of the client information is derived from a generic set of data. With the exception of the generic illustration, any illustration may result in an insurance and loan application. The ILLUSTRATION entity contains both data and pointers to data for all aspects of an illustration.

| Name | Null? | Type |
|---|---|---|
| ILLUSTRATION_ID | NOT NULL | NUMBER |
| ILLUSTRATION_TYPE | | CHAR(10) |
| ILLUSTRATION_DATE | | DATE |
| STATUS | | CHAR(10) |
| PERSON_ID | | NUMBER |
| PERSON_DOB | | DATE |
| PERSON_SALARY | | NUMBER |
| PERSON_INTEREST_DIVIDENDS | | NUMBER |
| PERSON_OTHER_INCOME | | NUMBER |
| COPERSON_ID | | NUMBER |
| COPERSON_DOB | | DATE |
| COPERSON_SALARY | | NUMBER |
| COPERSON_INTEREST_DIVIDENDS | | NUMBER |
| COPERSON_OTHER_INCOME | | NUMBER |
| TAX_RATE | | NUMBER |
| NUMBER_OF_DEDUCTIONS | | NUMBER |
| PROPERTY_ID | | NUMBER |
| PROPERTY_PURCHASE_PRICE | | NUMBER |
| REALTOR_ID | | NUMBER |
| REALTY_FIRM_ID | | NUMBER |
| COLLATERAL_TYPE | | CHAR(30) |
| MORTGAGE_TYPE | | CHAR(30) |
| MORTGAGE_VARIETY | | CHAR(30) |
| BANK_ID | | NUMBER |
| BANK_OFFICER_ID | | NUMBER |
| MORTGAGE_RATE | | NUMBER |
| MORTGAGE_TERM | | NUMBER |
| MORTGAGE_POINTS | | NUMBER |
| INSURANCE_PACKAGE_ID | | NUMBER |
| INSURANCE_CARRIER_ID | | NUMBER |
| INSURANCE_AGENT_ID | | NUMBER |
| UNDERWRITING_TYPE | | CHAR(30) |
| HEALTH_ANY_YESES | | CHAR(1) |
| OTHER_COLLATERAL_ID | | NUMBER |
| INSURANCE_RATE | | NUMBER |
| LOAN_PACKAGE_ID | | NUMBER |
| CS_ID | | NUMBER |
| CS_ELIGIBILITY_TYPE | | CHAR(10) |
| CS_OPEN_ELIGIBILITY_ID | | NUMBER |
| CS_CLOSED_ELIGIBILITY_ID | | NUMBER |
| CS_OFFICER_ID | | NUMBER |
| LOC_ID | | NUMBER |
| LOC_FS_ID | | NUMBER |
| LOC_ELIGIBILITY_ID | | NUMBER |

-continued

| Name | Null? | Type |
|---|---|---|
| LOC_FS_OFFICER_ID | | NUMBER |
| DEATH_BENEFIT | | NUMBER |
| CC_VARIETY | | CHAR(10) |
| CC_ID | | NUMBER |
| CC_TAX_ESCROW | | NUMBER |
| CC_INTEREST_ADJUSTMENT | | NUMBER |
| CC_LEGAL | | NUMBER |
| CC_TITLE | | NUMBER |
| CC_GOVMT | | NUMBER |
| CC_SURVEY | | NUMBER |
| CC_HAZARD | | NUMBER |
| CC_OTHER | | NUMBER |
| CC_TOTAL | | NUMBER |
| CONVENTIONAL_MORTGAGE_ID | | NUMBER |
| THEPI_USER_ID | | NUMBER |
| CLOSING_DATE | | DATE |
| CC_GRAND_TOTAL | | NUMBER |

The ILLUSTRATION_RIDERS 424 table, also an intersection table, contains a list of all of the rider clauses required for a particular illustration.

| Name | Null? | Type |
|---|---|---|
| ILLUSTRATION_ID | | NUMBER |
| RIDER_ID | | NUMBER |

The INSTITUTION 426 entity is a super entity (like APPLICATION 402) which holds the various institution types. Each specific type of institution (like LENDER, INSURANCE_CARRIER, etc.) is a view of this table. There is an INSTITUTION 426 record for every institution participating in the illustration process. The INSTITUTION entity is not shown on the Entity Relationship Diagram (ERD) of FIG. 4. Rather, the specific views are represented. These are:
  AGENCY (not shown)
  EMPLOYER/CORPORATE_SPONSOR
  INSURANCE_CARRIER
  LENDER
  REALTY_FIRM

| Name | Null? | Type |
|---|---|---|
| INSTITUTION_ID | NOT NULL | NUMBER |
| INSTITUTION_TYPE | | CHAR(30) |
| INSTITUTION_NAME | | CHAR(50) |
| DIVISION | | CHAR(30) |
| ADDRESS_LINE1 | | CHAR(50) |
| ADDRESS_LINE2 | | CHAR(50) |
| CITY | | CHAR(30) |
| STATE | | CHAR(2) |
| ZIP | | NUMBER(5) |
| PHONE | | NUMBER(10) |
| CONTACT_PERSON_ID | | NUMBER |
| CORPORATE_SPONSOR_ID | | NUMBER |
| FINANCIAL_SPONSOR_ID | | NUMBER |
| CURRENT_CREDIT_RATE | | NUMBER |
| GUARANTEED_CREDIT_RATE | | NUMBER |
| AVERAGE_CREDIT_RATE | | NUMBER |
| ANNUITY_CREDIT_RATE | | NUMBER |
| MOODYS_RATING | | NUMBER |
| UNDERWRITING_TYPE | | CHAR(30) |

The INSTITUTION_OFFICER 428 entity is a super entity (like APPLICATION) which holds the various institution officer types. Each specific type of institution officer (like LOAN_OFFICER, INSURANCE_AGENT, etc.) is a view of this table. There is an INSTITUTION_OFFICER record for every institution officer participating in the illustration process. The INSTITUTION_OFFICER entity is not shown on the ERD of FIG. 4. Rather, the specific views are represented. These are:
  AGENCY_OFFICER (not shown)
  CORPORATE_SPONSOR_OFFICER
  EMPLOYER_CONTACT (not shown)
  INSURANCE_AGENT
  LOAN_OFFICER
  REALTOR
  USER

| Name | Null? | Type |
|---|---|---|
| INSTITUTION_OFFICER_ID | NOT NULL | NUMBER |
| INSTITUTION_OFFICER_TYPE | | CHAR(30) |
| LAST_NAME | | CHAR(50) |
| FIRST_NAME | | CHAR(30) |
| INSTITUTION_ID | | NUMBER |
| PHONE | | NUMBER(10) |
| PHONE_EXTENSION | | NUMBER |
| STATUS | | CHAR(10) |
| ACCOUNT_NAME | | CHAR(30) |
| PRIVS | | CHAR(10) |
| PRINTER_DRIVER | | CHAR(20) |

The INSURANCE_PACKAGE 430 entity details the insurance packages available to be chosen for an illustration—the rates, duration, etc. This list can be viewed during the illustration process. If the prospective applicant has chosen an alternative form of collateral (a zero coupon bond, for example) this collateral is detailed in the OTHER_COLLATERAL 444 entity. The database entity is OTHER_COLLATERAL capable of storing information regarding other types of securities, term insurance, and the type of account in which the securities are held (e.g., IRA, Keough Account, or other tax-favored account.) For an individual illustration, OTHER_COLLATERAL 444 and INSURANCE_PACKAGE 430 are mutually exclusive.

| Name | Null? | Type |
|---|---|---|
| INSURANCE_PACKAGE_ID | NOT NULL | NUMBER |
| POLICY_NAME | | CHAR(50) |
| PREMIUM_PAYMENT_STRUCTURE | | CHAR(10) |
| POLICY_TYPE | | CHAR(10) |
| INSURANCE_CARRIER_ID | | NUMBER |
| INSURANCE_AGENT_ID | | NUMBER |
| POLICY_TERM | | NUMBER |
| CURRENT_RATE | | NUMBER |
| GUARANTEED_RATE | | NUMBER |
| UNDERWRITING_TYPE | | CHAR(30) |
| BEGIN_DATE | | DATE |
| END_DATE | | DATE |
| PAPER_FORM_ID | | NUMBER |
| MOODYS_RATING | | CHAR(3) |

The INSURANCE_POLICY 432 entity contains data specific for a policy issued as a result of an illustration.

| Name | Null? | Type |
|---|---|---|
| INSURANCE_POLICY_ID | NOT NULL | NUMBER |
| INSURANCE_CARRIER_ID | | NUMBER |

The LOAN_AGREEMENT 434 entity contains data specific for a loan agreement issued as a result of an illustration.

| Name | Null? | Type |
|---|---|---|
| LOAN_AGREEMENT_ID | NOT NULL | NUMBER |
| BANK_ID | | NUMBER |

The LOAN_PACKAGE 436 entity details the Ryan Mortgage authorized lender loan packages available to be chosen for an illustration—the rates, duration, etc. This list can be viewed during the illustration process.

| Name | Null? | Type |
|---|---|---|
| LOAN_PACKAGE_ID | NOT NULL | NUMBER |
| STATE | | CHAR(2) |
| TYPE | | CHAR(30) |
| MORTGAGE_RATE | | NUMBER |
| POINTS | | NUMBER |
| BEGIN_DATE | | DATE |
| END_DATE | | DATE |
| LOAN_TERM | | NUMBER |
| BANK_ID | | NUMBER |
| BANK_OFFICER_ID | | NUMBER |
| PAPER_FORM_ID | | NUMBER |

The LETTER OF CREDIT (LOC) 438 entity contains data on the available irrevocable letters of credit available to be chosen for an illustration. The LOC can be used in lieu of a corporate sponsored premium guarantee, where the prospective applicant would choose not to have the lump-sum prepayment. The lump-sum prepayment, corporate sponsored premium guarantee, and the irrevocable letter of credit premium guarantee are all mutually exclusive.

| Name | Null? | Type |
|---|---|---|
| LOC_ID | NOT NULL | NUMBER |
| FS_ID | | NUMBER |
| LOC_COST | | NUMBER |

The LOC_ELIGIBILITY 440 entity contains the specific eligibility requirements for each irrevocable letter of credit available for use in an illustration.

| Name | Null? | Type |
|---|---|---|
| FS_ELIGIBILITY_ID | NOT NULL | NUMBER |
| FS_ID | | NUMBER |

The NEW_INSURANCE_DEV 468 entity contains primarily textual data describing the new insurance developments in the industry that are and will be available to a prospective applicant in creating a Ryan Mortgage.

| Name | Null? | Type |
|---|---|---|
| NEW_INSURANCE_DEV_ID | NOT NULL | NUMBER |
| INSURANCE_CARRIER_ID | | NUMBER |
| NEW_INSURANCE_DEV_TEXT | | CHAR(255) |

The NEW_LOAN_DEV 442 entity contains primarily textual data describing the new loan developments in the industry that are and will be available to a prospective applicant in creating a Ryan Mortgage.

| Name | Null? | Type |
|---|---|---|
| NEW_LOAN_DEV_ID | NOT NULL | NUMBER |
| BANK_ID | | NUMBER |
| NEW_LOAN_DEV_TEXT | | CHAR(255) |

The OTHER_COLLATERAL 444 entity contains data on other instruments that are used to secure a Ryan Mortgage. The OTHER_COLLATERAL_ID number identifies the type of investment instrument to be illustrated. Other instruments may include, for example, term insurance used in conjunction with a security, such as a zero coupon bond, or term insurance used in conjunction with a deferred annuity. Each of these instruments, like a universal life policy, may be used in place of a down payment to provide a means of accumulating the principal needed to repay the mortgage. This data base entity is also capable of storing the type of account that the security is held in. TAX_STATUS identifies the kind of account that the investment is held in and may include information regarding a Keough Account, Individual Retirement Account, Profit Sharing Plan, 401k plan, or other tax-favored investment account. The tax status of the account in which the investment is held is important, as it dictates the amount and timing of the taxes payable on the investment's earnings. This, in turn, dictates the amount of up-front payment required for the mortgage transaction, as well as any tax escrows which may be required.

| Name | Null? | Type |
|---|---|---|
| OTHER_COLLATERAL_ID | NOT NULL | NUMBER |
| TAX_STATUS | | NUMBER |

The PAPER_FORM 446 entity describes the individual paper form for the specific mortgage loan and insurance application forms, illustration forms, and health questionnaires used by the system. It holds global information regarding the form, (e.g., WordPerfect merge file name). It is pointed to by the individual PAPER_FORM_ITEM.

| Name | Null? | Type |
|---|---|---|
| PAPER_FORM_ID | NOT NULL | NUMBER |
| PRIMARY_MERGE_FILE | | CHAR(30) |

The PAPER_FORM_ITEM 448 entity contains the specific "select data" instructions that are used to retrieve the prospective applicant data that will then be written to a paper form, e.g., the prospective applicant's name. Any PAPER_FORM_ITEM 448, like the prospective applicant's name, may be used in multiple paper forms throughout the system, which allows for non-redundant storage of common information between forms.

| Name | Null? | Type |
|---|---|---|
| PAPER_FORM_ITEM_ID | NOT NULL | NUMBER |
| NAME | | CHAR(30) |
| SEL | | LONG |
| ADDITIONAL_RESPONSE_ITEM | | CHAR(1) |
| PROMPT | | CHAR(255) |

The PAPER_FORM_ITEM_REGISTER 450 entity is an intersection table that resolves the "many-to-many" relationship between the PAPER_FORM and PAPER_FORM_ITEM tables, and details which paper forms contain which items, and which items belong to which forms.

| Name | Null? | Type |
|---|---|---|
| PAPER_FORM_ID | | NUMBER |
| PAPER_FORM_ITEM_ID | | NUMBER |
| SEQ | | NUMBER |

A PERSON 452 (applicant) is defined as a person or husband/wife couple who collectively request an illustration. A PERSON file may contain two insureds and/or borrowers. Two insureds could have, for example, two separate policies with coverage proportional to their share of the combined household income. Two insureds' policies are calculated separately then combined in a composite illustration for the two-insured PERSON. Two insureds may also own a single policy. A single policy option for two insureds includes a joint and survivor policy wherein death benefits are paid upon the death of the second insured to die, and a joint life policy which pays a death benefit on the death of the first insured. Each PERSON may have requested multiple illustrations.

| Name | Null? | Type |
|---|---|---|
| PERSON_ID | NOT NULL | NUMBER |
| COPERSON_ID | | NUMBER |
| PERSON_TYPE | | CHAR(10) |
| LAST_NAME | | CHAR(50) |
| FIRST_NAME | | CHAR(30) |
| MIDDLE_NAME | | CHAR(30) |
| ADDRESS_LINE1 | | CHAR(50) |
| ADDRESS_LINE2 | | CHAR(50) |
| CITY | | CHAR(30) |
| STATE | | CHAR(2) |
| ZIP | | NUMBER(5) |
| PHONE | | NUMBER(10) |
| DOB | | DATE |
| DATE_OF_DEATH | | DATE |
| SEX | | CHAR(1) |
| MARITAL_STATUS | | CHAR(10) |
| EMPLOYMENT_STATUS | | CHAR(10) |
| INTEREST_DIVIDENDS | | NUMBER |
| OTHER_INCOME | | NUMBER |
| INCOME_TAX_RETURN_TYPE | | CHAR(10) |
| THEPI_USER_ID | | NUMBER |
| STATE_OF_RESIDENCE | | CHAR(2) |
| STATE_OF_EMPLOYMENT | | CHAR(2) |

The PROPERTY 454 is the real estate (land, dwelling, etc.) on which the illustration is being drawn up.

| Name | Null? | Type |
|---|---|---|
| PROPERTY_ID | NOT NULL | NUMBER |
| ADDRESS_LINE1 | | CHAR(50) |
| ADDRESS_LINE2 | | CHAR(50) |
| CITY | | CHAR(30) |
| STATE | | CHAR(2) |
| ZIP | | NUMBER(5) |
| APPRAISAL_VALUE | | NUMBER |
| PURCHASE_PRICE | | NUMBER |
| PROPERTY_SPECIFICS | | CHAR(50) |
| PERSON_ID | | NUMBER |

The RIDER 456 entity describes the insurance riders available for use in the illustration process. A policy rider is an amendment attached to a policy that modifies the conditions of the policy by expanding, or decreasing its benefits or excluding certain conditions from coverage. Typical examples of policy riders include disability income riders which pay a benefit equal to the mortgage cost in the event the insured(s) are disabled and waiver of premium riders (typically used in conjunction with disability riders to waive the cost of insurance charges in the policy in the event the insured is disabled).

| Name | Null? | Type |
|---|---|---|
| RIDER_ID | NOT NULL | NUMBER |
| RIDER_TYPE | | CHAR(10) |
| RIDER_TEXT | | CHAR(255) |

The UPDATE_ACTIVITY 458 entity is an internal table that is used to keep track of the dates of supervisory update and modification operations made to the various reference tables (e.g., INSURANCE_PACKAGE 430, LOAN_PACKAGE 436, etc.).

| Name | Null? | Type |
|---|---|---|
| UPDATE_TYPE | | CHAR(30) |
| UPDATE_DATE | | DATE |
| VALID_THRU_DATE | | DATE |

The MORT_REGISTER 460 entity documents the association of group numbers with various combinations of prospective applicant attributes and insurance products.

| Name | Null? | Type |
|---|---|---|
| GROUP_NUMBER | NOT NULL | NUMBER |
| GROUP_NAME | | CHAR(25) |
| DESCRIPTION | | CHAR(255) |
| YS | | NUMBER |

This table documents the association of group numbers with the various combinations of attributes possible:
Male/Female
Smoking/Non-smoking/Aggregate
Age last/Age nearest
Insurance Product CSO table/COI table For example:

| GROUP_NUMBER | YS | GROUP_NAME | DESCRIPTION |
|---|---|---|---|
| 1 | 0 | CSO-M-N-AL | CSO table Male/Non-smoking/Age last |
| 2 | 0 | CSO-F-N-AL | CSO table Female/Non-smoking/Age last |
| 3 | 0 | CSO-M-S-AL | CSO table Male/Smoking/Age last |
| . | . | . | . |
| ≈ | ≈ | ≈ | ≈ |
| 100 | 8 | METRO-117 | Metro 117 table; Male/Non-smoking/Age last, commonly used by sponsored policies |

The "description" data in MORT_REGISTER is simply that. It describes the attributes of each table for use in managing the system. During the illustration process the system uses another database entity to select which of the MORT_REGISTER tables are applicable to a particular product. The actual logical selection of which table is to be used for each combination is accomplished by entries in the INSURANCE_PACKAGE 430 table, which describes in detail each insurance product available to the system, and which, through its associated detail tables, points to the particular MORT_REGISTER Groups to be used, for each sex/smoking/etc. combination, in illustrating that particular product, referring to each group by its GROUP_NAME.

MORT 462 tabulates mortality figures (either in strict deaths per thousand or cost of insurance). While the common mortality tables (CSO and the like) and the product specific Cost Of Insurance (COI) tables are essentially the same, there are some differences.

Both conceptual tables are housed inside one relational database table structure (MORT 462) to allow for ease of access. The relational table's structure for the MORT 462 table follows:

| Name | Null? | Type |
|---|---|---|
| GROUP_NUMBER | NOT NULL | NUMBER |
| AGE_OF_ISSUE | | NUMBER |
| YEAR | | NUMBER |
| MORTALITY | | NUMBER |

The MORT 462 table is organized into groups of records, each group having the same GROUP_NUMBER. A group is a "Mortality Table." Each combination of the following attributes will reference a GROUP_NUMBER:

Male/Female
Smoking/Non-smoking/Aggregate
Age last/Age nearest
Insurance Product
CSO table/COI table A GROUP_NUMBER may be used by any combination. Therefore, for a particular Group (mortality table), for example, the 1980 CSO table for Male/Non-smoking/Age last (no product designation in this case), there are records for ages 18 through 99 as shown below:

| GROUP_NUMBER | AGE_OF_ISSUE | YEAR | MORTALITY |
|---|---|---|---|
| 1 | NULL | 18 | 12.0 |
| 1 | NULL | 19 | 20.0 |
| . | . | . | . |
| ≈ | ≈ | ≈ | ≈ |
| . | . | . | . |
| 1 | NULL | 99 | 1000.0 |

Note that in the case of the CSO tables, there is nothing in the AGE_OF_ISSUE column (NULL). So, to reference the CSO Group that corresponds to Male/Non-smoking/Age last, the system retrieves all records for GROUP_NUMBER+1.

To satisfy all combinations of the above attributes for the CSO tables (Male/Female, Smoking/Non-smoking/Aggregate, Age last/Age nearest) there are as many as 12 groups, each group having entries for ages 18 through 99 years of age. Thus, there will be 82 (i.e., 99−18+1) rows (i.e., records) in each group, one for each year of age, times each of the 12 combinations, resulting in 984 records for the collection of all 12 CSO groups. Like the common mortality groups (mortality tables), the COI groups (mortality tables) are organized by GROUP_NUMBER. The GROUP_NUMBER in this case segregates groups not only by sex, smoking, etc., but also by insurance product. But unlike the common mortality tables, there is a sub-group structure to the mortality table based on the prospective applicant's age at the time of policy issue. There is a special "sub-table," selected by the prospective applicant's age, as designated by the AGE_OF_ISSUE column, that is used for the first YS years. The AGE_OF_ISSUE entry specifies the select versus ultimate portions of the mortality table. If the AGE_OF_ISSUE column is NULL, then that series of records correspond to the ultimate series within that particular insurance product group. The CSO mortality table, then, is a standard mortality table with YS=O (i.e., no select entries).

One further difference is that the year/age column designates age of the insured for ultimate groups, but designates year of policy for select groups.

An applicant's cost of insurance will be determined by selecting the rows corresponding to a particular group number (which may be for a specific insurance product and a specific collection of attributes such as sex, smoking, etc.) for the applicant's AGE_OF_ISSUE. There will be typically 10 or less rows (YS) within a particular AGE_OF_ISSUE sub-group. For years beyond the YS years, the ultimate group is used, which is retrieved by selecting the rows for this GROUP_NUMBER whose AGE_OF_ISSUE is NULL and whose "year/age" entries are AGE_OF_ISSUE+YS and greater.

An example of a COI group is given below:

| GROUP_NUMBER | AGE_OF_ISSUE | YEAR | MORTALITY |
|---|---|---|---|
| 5 | 35 | 1 | 12.0 |
| 5 | 35 | 2 | 20.0 |
| ≈ | ≈ | ≈ | ≈ |
| ≈ | ≈ | ≈ | ≈ |
| 5 | 35 | 10 | 100.0 |
| . | . | . | . |
| . | . | . | . |
| 5 | 40 | 1 | 22.0 |
| 5 | 40 | 2 | 50.0 |

-continued

| GROUP_NUMBER | AGE_OF_ISSUE | YEAR | MORTALITY |
|---|---|---|---|
| . | . | . | . |
| . | . | . | . |
| . | . | . | . |
| 5 | 40 | 10 | 500.0 |
| . | . | . | . |
| . | . | . | . |
| . | . | . | . |
| 5 | NULL | 10 | 2.0 |
| 5 | NULL | 11 | 5.0 |
| . | . | . | . |
| . | . | . | . |
| . | . | . | . |
| 5 | NULL | 99 | 1000.0 |

The above shows two of the select sub-groups (for age of issue 35 and 40) for COI group 5, as well as the ultimate group (age of issue=NULL) for COI group 5. (Subgroups will be present for all possible AGE_OF_ISSUE values.)

The COI group 5 may be used by any insurance product. This association of product to group (mortality table) is managed by the MORT_REGISTER 460 table.

The CORPORATE_SPONSOR_GUARANTEE 464 entity contains data on the corporate guarantees available to be chosen for an illustration. The corporate sponsor guarantee is only available to those prospective applicants with a participating employer and can be used where a prospective applicant prefers not to use a lump-sum prepayment.

| Name | Null? | Type |
|---|---|---|
| CSG_ID | NOT NULL | NUMBER |
| CS_ID | | CHAR(10) |

The HEALTH_QUESTIONNAIRE 466 entity is used to register the individual questions that comprise a specific health questionnaire. Depending on the question and questionnaire, a specific question may appear in multiple questionnaires.

| Name | Null? | Type |
|---|---|---|
| HEALTH_QUESTIONNAIRE_ID | NOT NULL | NUMBER |
| HEALTH_QUESTIONNAIRE_NAME | | CHAR(30) |

B. Discussion of Variables

The following variables, identities, and formulas show how the insurance and mortgage illustrations of the kind previously described are computed in a preferred embodiment of the invention. Because these variables are used throughout the illustration process, references to how and where they are used will include multiple Figures and Blocks. Every effort, however, has been made to illustrate the flow of system logic in the description of the variables and computations.

LNUM: This is the number of annual insurance premiums. This is a system parameter. Two possibilities exist in a preferred embodiment of the invention: (1) Assuming an annuity, this value is four and is the minimum normally allowed under legal definitions of insurance; or (2) Assuming a non-annuity, this number is typically ten, but could range from four to the total number of years in the mortgage. These values are not user selectable but may be system adjusted.

LIFPAY: This is the annual premium required. This value is computed. The system assumes a value in Blocks 108, 116, 124, and 126, and evaluates the formulas in Block 110. The system uses iterative approximation to find the value that will produce the needed insurance, and the cash value. Then, the system iterates if needed on the illustrated insurance values to test if the value computed meets the regulatory definition of insurance in Block 128. The variable, once computed, is also used to show contract performance assuming guaranteed interest and mortality charges apply in Block 134.

PRIN: Initially, this is equal to the value of the property being financed but may also be equal to the sum borrowed. A default value is assumed in Block 72 of FIG. 3A-1. It is a system input in Block 176 of FIG. 3B-2. The death benefit of the insurance must equal this value, at a minimum. The death benefit may be higher, for certain options, if the regulatory tests are not met at this value.

$a_1$: This is the age of the insured for the first year of the policy. It is computed from the birth date solicited in Block 170 or solicited directly in Block 72.

The birth date is a system input. Each product has a parameter, using the "nearest" or "last" birthday which defines how the birth date is used to compute $a_1$. An insured stays this age for the first year of the policy. The age is incremented at each policy anniversary. The policy anniversary date is the date when the policy is sold. For illustration purposes, the policy anniversary date is equal to the estimated closing date, a system input.

Because changes in birth date in relation to closing date can change policy charges, any non-final illustration in FIG. 3B-8, Block 160, and FIG. 3B-7, Block 152 may include a disclaimer in its output to the effect that a delay in making the application may result in changes to the projections, comparisons, and costs.

inlp: This is the percentage discount rate for a Guideline Level Premium (GLP) value calculation which is computed in FIG. 3B-6, Block 128. The system stores this information by product. The variable, mlp=monthly multiplier=$(1+\text{inlp})^{1/12}$, is computed upon use of inlp.

insp: This is the discount rate, expressed as a percentage, for the Guideline Single Premium (GSP) value calculation which is computed in FIG. 3B-6, Block 128. The system stores this information by product. The variable, msp=monthly multiplier=$(1+\text{insp})^{1/12}$, is computed upon use of insp.

The mortality table data discussed below is stored as percentages. The system stores all percentages as such. All formulas assume the fractional equivalent which is the value divided by one hundred. The stored values, however, are not generally integers.

CSO(a): All values from the Commissioner's Standard Ordinary Table, a common mortality table published in 1980, are stored in deaths/1000 at age a. These are real numbers. The system allows up to five place accuracy after the decimal point, i e., xxx.xxxxx.

The table, as it is used by the system, is tabulated for ages eighteen to ninety-nine. This table is used for GSP and GLP calculations in FIG. 3B-6, Block 128 and is therefore a system parameter. The system contains several versions of the 1980 CSO tables. They include: Male/Female, Smoking/Nonsmoking/Aggregate, and Age last/Age nearest. The system contains, therefore, a total of 2×3×2=12 tables. Table entries appear as a value per thousand and are used to obtain a fractional probability of death. Each product indicates whether to use the male/female tables in accordance with the sex of the insured, or whether to use a blend. If a blend is indicated, the product data table indicates the percentage male. The remainder is female. An exception table exists, by state, for each product. Multiple products may be present in the system for a single carrier and all use this same exception table. However, this is not a system rule. There is not a unique exception table for every product, but a given exception table may apply to any number of products, including just one. If an entry is present, it mandates the blend percentage male to use for policies issued in that state for the product(s) referencing that table. That blend percentage will override any generic male/female or blend selection in the product. This feature is a system requirement because some states require the use of unisex tables weighted exactly in proportion with the carrier's male/female weighting of its existing insured population.

$A_{max}$: This is the variable for the assumed maximum survival age. This is a system parameter. Typically, it is age ninety-five or ninety-nine. For the sake of consistency, this document has assumed age ninety-nine throughout its discussion.

NYR: This is the variable for mortgage length, usually 30 years. This is a system parameter. The system manager can change this variable using the aforementioned super user function. The system is capable of illustrating other mortgage lengths, and permitting user selection of various mortgage lengths in FIG. 3B-2, Block 182. This capability is needed as lenders offer alternative length mortgages.

MTH: This is the variable for the number of months in the mortgage. It is computed as:

$$=12 \times NYR$$

LEXP(n): This is the variable for per-policy expenses, in month n. The cost is independent of the premium size and the prospective applicant's characteristics. It is dependent, however, on month and Specified Amount, SA. A table exists for each product to store this information. Each table entry, for month n of the insurance period, contains two values: a fixed dollar amount, LEXPF(n), and, a percentage amount expressed as cost as a percentage of SA: LEXPV(n).

On use in FIG. 3B-5, Block 110 and FIG. 3B-6, Blocks 128 and 134, the system computes $$LEXP(n) = LEXPF(n) + \frac{LEXPV(n) \times SA}{1000}$$

In month one, the system adds LEXPSELL, a one time charge by product to LEXP(n).

LPCT(n): This variable is the percent-of-premium expense charged by the carrier, in a given month n. For each product, the system develops a "table" of values, generated from parameters for that product. It likewise is used in FIG. 3B-5, Block 110 and FIG. 3B-6, Blocks 128 and 134.

For each combination of the criteria below which a product uses, the system contains six values. These values are reflected using flags for a particular product's criteria. LPCT1A and LPCT1B are the initial values, LPCT2A and LPCT2B are the continuing values, and LPCTY is the year number (of the policy) at the beginning of which the system switches between pairs 1 and 2.

$$LPCTx(n) = LCPT1x, \quad n \leq 12x(LPCTY-1)$$
$$= LCPT2x, \quad n > 12x(LPCTY-1)$$
$$\text{for } x = A \text{ and } B$$

LPCTSA: This variable is the break ratio, in dollars per thousand dollars of Specified Amount or basic death benefit, SA. (The formula for Specified Amount appears later in the formula description text.) This is used to compute a breakpoint value for LPCT(n).

$$LPCTBRK = LPCTSA \times SA$$

Then, when the equations call for applying LPCT(n), the system uses LPCTA(n) on the first LPCTBRK dollars, and LPCTB(n) on the remainder. If LPCTSA=0, there is no break and, for ease of computation, the system stores equal values for the A and B versions.

The following variables store mortgage repayment plan information solicited in FIG. 3B-4, Block 98.

LOPT: This is the loan repayment option referred to earlier in the document. It is selected by the user.

LOPT=0: This variable assumes the mortgage is to be paid off with the after-tax insurance cash surrender value after MTH months.

LOPT=1: This variable assumes the mortgage is to be paid off with a life insurance policy loan secured by the insurance cash value, after MTH months. The interest on the loan is paid by further borrowing. The system guideline is net remaining cash value just greater than zero at $A_{max}$.

LOPT=2: This loan repayment option assumes the mortgage is rolled over and is paid off by the death benefit when the insured dies. The insured starts borrowing against the cash value to pay the mortgage interest after MTH months. The system tracks cumulative borrowing, per LOPT=1. The system assumes the same premium as is solved for assuming LOPT=1.

iCL: This is the annual policy loaned funds interest rate. It is stored by product. This is the cost of policy loan interest. Carriers compute this figure in one of two ways. Therefore, the system uses a flag for iCL, by product. Based on this flag, the system uses interest in arrears or in advance formulas in the computation of policy loans in FIG. 3B-5, Block 110. The system computes, at the start of the illustration for a specific product, the monthly compounding multiplier: $mCL=(1+iCL)^{1/12}$.

Qx(a): This variable represents the annual cost of insurance at attained age a. The data is contained in multiple tables. The data is stored by product. However, a single set of tables, with state exceptions (please see below), may service multiple products. The data is stored as real values, in terms of mortality per 1000. Wherever used in a formula in this patent application, it should be understood that the value used is the probability of dying at age $$a = \frac{Qx(a)}{1000}.$$

This variable is used in the computation of cash value and death benefit amounts in FIG. 3B-5, Block 110.

q̄x(a): This is a table for the monthly cost of insurance values. It is shown as a computed value in the formulas, as computed from Qx(a). The system allows for a product to point to tables, directly, in the same structure, for example Select/Ultimate, and with the same selection criteria, sex, smoking, etc., and sponsored/unsponsored flags as Qx(a).

The following statements apply to both Qx(a) and, if present, qx(a). Every Qx and qx table in the system is in two parts, Select and Ultimate, either of which may be empty. It is rare for part two, the Ultimate Table, to be empty. The Select Table is empty more frequently. The first part is the Select table. The select table is actually a table of tables. (See also the MORT and MORT_REGISTER table discussion for additional information on Select and Ultimate tables.)

The Ultimate table has entries for attained age from $Y_s$ to 100 (maximum), that apply for those attained ages, after the first $Y_s$ years have elapsed. For example, assume $Y_s$=8, for a policy issued at attained age of 35. The system uses the entries in the Select table, for the age at issue=35, for the first 8 years, then uses the Ultimate table, thereafter. The system from there on will use the entry for attained-age=43 for year 9, 44 for year 10, etc. Therefore, an important parameter stored by the system by product is which table to use. A table is described by Select/Ultimate breakpoint (in years), and the two actual tables, the first of which has two dimensions, and the second of which, is a vector.

In summary, a single set of mortality tables may apply to many products, or to just one. The system tracks the tables by carrier and product. These variables are used in the computation of death benefit and cash value amounts in Block 110 of FIG. 3B-5.

The number and application of tables in each set is specified for a given set of tables by the following product-specific flags:

Smoking/Nonsmoking tables, or just Aggregate Tables.
Preferred/Nonpreferred risk tables, or no selection on risk.
Male, Female, and Unisex tables, or just Unisex tables.

The Unisex table subset includes a table to be used in other than exception states, with auxiliary tables for specific states. A system exception list contains specific states for which Unisex rating is required and, if so, whether to use the standard Unisex table, or the name of a special table for that state. If normally the product selects between male/female tables, the system will instead use the Unisex table if mandated for that State by state regulatory guidelines. In addition, a separate product flag indicates if the Unisex table is to be used for any sponsored applicant (guaranteed premiums). Finally, in the sponsor table, a flag indicates whether that sponsor mandates the use of the Unisex table.

The system uses a group of default tables, characterized as 1983 GAM Mortality, which is a typical mortality assumption. However, other default tables may be used at the system operator's discretion. These tables are used for illustrations when no other mortality data is listed for a product. There are four 1983 GAM tables: Nearest age, or last age, and male, female. A flag in a product record will indicate whether or not to use these mortality tables and, if so, the default male percentage to use when blending for Unisex. The system default for the state exception table that mandates unisex rating also mandates the male percentage value. The system default also uses the same mortality table for life insurance in the Ryan Mortgage and the conventional mortgage term insurance.

The system also allows for the input of a rating factor for high risk, separately underwritten prospective applicants, qf. Its default value is 100%. The system formulas use qf×q̄x (or Qx) wherever the equations use q̄x (or Qx). This input will not be under the prospective applicant's control. Rather, it is provided by the system owner's operations staff or the carrier's staff. If rating is required, it triggers the generation of a new illustration, otherwise the same as the old illustration, except that the mortality charges will be based on a rating factor. The illustration is of a single product and will be printed by the system locally and mailed to the prospective applicant separately.

Set out below are a number of computational flags:

qx guideline guarantee flag: If set, qx is computed from Qx, or is tabular and is used for the first year instead of qxg in the guideline premium computations.

qx minimum guaranteed interest projection flag: If set, qx is computed from Qx, or is tabular and is used for the first year, instead of qxg, in the minimum guaranteed interest projection.

qxg(a): This is a special set of qx tables, the guaranteed monthly cost of insurance. Each is a simple table of values versus attained age. There is no Select table, just Ultimate. The system stores this information by product. A data set consists of a standard table product, plus special table(s) for specific states. For example, a product uses its standard qxg except for certain states. Each special state present points to a qxg table, but multiple special states may use the same special qxg table.

The table, standard, or special for each state, is actually several. Tables appear by sex, smoking/nonsmoking/aggregate, age last/next, in parallel with the CSO tables. However, there is not a blend percentage for producing a unisex table for a state; rather, an explicit Unisex table is present, with the possibility of different tables for different states, and, again, a state flag that mandates the use of a Unisex table, overriding the product preference.

The formula below is used in refining the gLP and gSP.

A product flag, if set, indicates that the formula approximation is to be used. If so, the qxg(a) value is computed from the corresponding CSO(a) value as:

$$qxg(a) = \frac{\frac{CSO(a)}{12}}{\left[1 - \frac{11}{24}CSO(a)\right]}$$

CORR(a): The guideline premium corridor is the minimum insurance coverage or death benefit permissible under law. The death benefit computed in FIG. 3B-5, Block 110 is this factor times cash value. The values are expressed as a percent of cash value, (e.g., 250 is 2.5 times cash value). The corridor data consists of a single table, by attained age. No male/female or other differentiation is made in the computation.

iC1, iC2, iCbreak: These flags identify current policy credited rates as a percentage of unloaned funds, and the breakpoint value on the dollar amount at which to switch from iC1 to iC2 by product. The system also allows for a no breakpoint case. The system computes, and then saves for use in formulas, the monthly rates:

$$iC1_m = (1+iC1)^{1/12} - 1$$

$$iC2_m = (1+iC2)^{1/12} - 1$$

iC guideline guarantee flag: If this flag is set, iC1 and iC2 are guaranteed for the first year, in guideline premium computations.

iC minimum interest guarantee flag: If this flag is set, iC1 and iC2 are guaranteed for the first year of the minimum guaranteed interest projection.

iL: This variable represents the annual policy loan credited rate for a particular product. The system computes, then saves for use in formulas, the monthly rate:

$$iL_m = (1+iL)^{1/12} - 1$$

TAXRATE: This variable represents the prospective applicant's tax bracket. This is a user input entered in FIG. 3B-1, Block 174. The system default used in FIG. 3A-1 is 30 percent.

Set out below are formulas for the life insurance and mortgage computations of the system. #: Indicates a computation which is independent of life insurance policy size. These computations are therefore out of the illustration system's iterative loop. *: Indicates a computation which is product independent and is therefore standard for all products.

LPAY(n): This is the premium paid in month n. The system computes a first trial value as to the value for LPAY(1) in FIG. B5, Block 108, then makes iterative trials as to the correct amount.

=LIFPAY,n=1, 13, 25, ..., 12×LNUM−11

=0, otherwise

The premium is paid annually, in the beginning of each year's first month.

LBASIS(n): This is the value for cumulative premiums paid to date, including the month n. It is computed as:

$$= \sum_{r=1}^{n} LPAY(r)$$

* $a_t$: This is the variable for the insured's age in year t of the policy.

$$=a_1+(t-1)$$

This variable is used in equations which calculate annual amounts.

$\hat{a}_n$=: This variable tracks the insured's age in month n. It is used for age nearest/age last computations.

$$=^a{}_{int(n+11)/12]},$$ where int is the integer function.

* Q(t): This is the variable for the probability of death, during year t, using the 1980 CSO table, a common mortality table used in the system's regulatory compliance computations in FIG. 3B-4, Block 128. Carriers commonly use this table in the calculation of guaranteed mortality. It is computed as:

$$= \frac{CSO(a_t)}{1000}$$

* P(t): This variable represents the probability of not dying in a given year. It is computed as:

$$=1-Q(t)$$

7#* tP(t): This variable represents the probability of surviving through year t. It is computed as:

$$= \prod_{s=1}^{t} P(s), \quad t > 0$$

$$= 1, \quad t = 0$$

* $N_{max}$: This variable represents the maximum number of policy years. It is computed in relation to the insured's ninety-fifth or ninety-ninth birthday, as:

$$=A_{max}-a_1+1$$

Initially, the system uses the regulatory guideline formulas to develop an estimate of the appropriate insurance to cash value relationship. The system calculates estimates of the regulatory guideline premium amounts, and uses them as a basis for computing cash value and death benefit amounts in the system in FIG. 3B-5. Block 110. The initial estimates use approximations of the Guideline Single, Guideline Level, and Guideline Seven Pay Premium amounts. The variables for these approximations, and formulas for computing them are set out below.

gSP. This is a variable for the estimated Guideline Single Premium (GSP). The variable is calculated as a fraction of coverage, expressed in dollars. It is first calculated as:

$$\# = \frac{\sum_{t=1}^{N_{max}} \frac{tP(t-1) \times Q(t)}{(1+insp)^t}}{1 - LPCTA(1)}$$

gLP. This is the variable for the estimated Guideline Level Premium (GLP). The variable is calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{N_{max}} \frac{tP(t-1) \times [1 - LPCTA(12t-11)]}{(1+inlp)^{t-1}}}$$

7LP (or "SLP"): This is the variable for the estimated Guideline Seven Pay Premium. This variable is likewise calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{7} \frac{tP(t-1)}{(1+inlp)^{t-1}}}$$

SA: This is the variable for the policy's Specified Amount. The Specified Amount, a common life insurance expression, is equal to the basic, stated policy death benefit (the face amount of the policy.) The policy death benefit will remain equal to the Specified Amount until such time as changes in cash value cause it to change. Withdrawals of cash value or cash value growth may cause an increase or decrease in the death benefit. The Specified Amount appears on page three of a life insurance policy. The Specified Amount formula uses boolean logic designed to assure compliance with the regulatory guidelines. It is computed as:

$$= \max\left\{PRIN, \frac{LIFPAY}{SLP}, \min\left[\frac{LIFPAY}{gLP}, \left(\frac{LIFPAY}{\frac{gSP}{LNUM}}\right)\right]\right\}$$

The system records which of the three cases determined SA.

LOAN(n): This is the variable for new borrowings, in the beginning of month n, as computed in FIG. 3B-5, Block 110.

LOPT = 0:LOAN(n) = 0, all n

LOPT = 1:LOAN(n)

-continued $$= PRIN, n = MTH + 1$$

$$= TOTLOAN(n - 12) \times iCL, \ n = MTH + 13, MTH + 25,$$

$$MTH + 37, \ldots$$

$$= 0, \text{ elsewhere}$$

The system uses an alternative formula for policy loan interest if policy loan interest is in advance rather than in arrears. This formula assumes interest on policy loans is paid annually in arrears.

$$LOPT=2:LOAN(n)$$

$$=PRIN \times iM+TOTLOAN(n-12) \times iCL$$

$$n=MTH+1, MTH+13, MTH+25, MTH+37, \ldots$$

$$=0, \text{ elsewhere}$$

This computation assumes mortgage interest is paid annually in arrears. The system uses a second formula if policy loan interest is paid in advance.

TOTLOAN(n): This value presents total borrowings, in the beginning of month n:

$$=TOTLOAN(n-1)+LOAN(n), n>0$$

$$=0, n=0$$

This value becomes non-zero for LOPT=1 or LOPT=2 at n=MTH+1 and normally changes only annually.

LOANBAL(n): This variable computes the loan balance, including accrued interest, in the beginning of month n. This formula assumes interest is paid in arrears.

$$=TOTLOAN(n), n=1, 13, 25, 37, \ldots$$

$$=LOANBAL(n-1) \times mCL, \text{ otherwise.}$$

qx(n): This variable computes the monthly cost of insurance.

$$= \frac{\frac{Qx(\hat{a}_n)}{12}}{1 - \frac{Qx(\hat{a}_n)}{12}}$$

The variable qx(n) is independent of loan or mortgage value, and is computed for a prospective applicant for a product, and saved by the system. The system also allows for qx(n) to be table-driven instead of being computed as above from Qx. In this case, tables qx(a), as follows, are present instead of Qx.

:$\overline{q}$x(a) This is the monthly cost of insurance for a person of attained age a. The system uses the same kind of multiple tables with selection factors, etc., that apply to Qx, including state-dpendent unisex requirements and tables. This permits carriers which have non-standard actuarial approaches to the conversion of annual mortality figures into monthly figures to use the system. In this case:

$$qx(n)=qx(\hat{a}_n)$$

The cash value computations in FIG. 3B-5, Block 110 are iterative. The system starts with CV(0)=0. The cash value at the start of the contract is always equal to zero.

CVI(n): This is an intermediate value, calculated for the beginning of month n:

$$=CV(n-1)+LPAY(n)-LEXP(n)-[LPCT(n) \times LPAY(n)]$$

AAR(n): This variable computes the amount by which the carrier is at risk in any month n. It is calculated as:

$$= \max \left\{ \frac{SA}{mlp} - CVI(n), \left[ \frac{CORR(\hat{a}_n)}{100} - 1 \right] \times CVI(n) \right\}$$

COI(n): This variable computes the cost of insurance charge for a given month n $$=qx(n \times ARR(n)$$

The following variables are used for the computation of cash values and interest rate breakpoints. These are calculated net of policy loans. Breakpoint formulas include:

NCV(n): This is the net pre-interest cash value, end of month n. It is computed as:

$$=CVI(n)-COI(n)-LOANBAL(n)$$

NCVI(n): Part 1, up to the break:

$$=\min(NCV(n), iC\text{break})$$

NCV2(n): Part 2, above the break:

$$=\max(0, NCV(n)-iC\text{break})$$

INTC(n): This is the variable for interest credited in a given month n. It is computed as:

$$=LOANBAL(n) \times iL_m+NCV1(n) \times iC1m+NCV2(n) \times iC2_m$$

CV(n): This is the variable that computes the end of monthly life insurance cash value. It is equal to:

$$=CVI(n)-COI(n)+INTC(n)$$

MINS(n): This is the variable for the life insurance death benefit for month n. It is the larger of the estimated guideline amount calculated in SA, or the insurance corridor amount, multiplied by the Cash Value:

$$=\max\{SA, CORR(\hat{a}_n) \times CV(n)\}$$

LSURR(n): This is the after-tax cash surrender value, at the end of month n, which is the amount the policyholder would receive if he or she were to surrender the contract and pay his/her tax obligation at the end of month n.

$$=CV(n)-TAXRATE \times \max\{0, CV(n)-LBASIS(n)\}$$

LSNET(n): This is the net after-tax surrender value, at the end of month n, assuming the policyholder surrenders the contract and pays off the policy loan and the tax liability at the end of month n.

$$=LSURR(n)-LOANBAL(n)$$

The homeowner's surrender value includes the present value of the future annuity payments plus LSURR(n) and LSNET (n) in those years when an annuity is present.

The system's first trial as to the premium amount needed to fund the policy is calculated using the 7LP formula. The system replaces Q(t) with Qx(a$_t$) for this computation; if only a value for qx(a$_t$) is available, the system uses 12×qx (a$_t$). The system sets inlp equal to (iC1+iC2)2, and sums to LNUM instead of using 7 in the denominator.

For any solved policy in FIG. 3B-6, Block 130, the system must check that it conforms with regulatory limits on the size of premium for the policy cash value. The original gSP and gLP rates were approximations. The estimated guideline amounts are rates, expressed as dollars of premium divided by dollars of insurance, where the estimated GLP=gLP×SA, and the estimated GSP=gSP×SA. The system next finds the actual GLP and GSP for this policy in FIG. 3B-6, Block 128, both to report to the carrier, and to check that the illustrated policy conforms to tax rules governing insurance in FIG. 3B-6, Block 130. To do this, the system reruns the insurance LIFPAY calculation, but with a change of certain parameters and tables, and with a new target.

In these re-illustrations:

The system saves the entire results of the preceding insurance computation in FIG. 3B-6, Block 128, since they may remain valid. In particular, the system lets $SA_r$=SA, $LIFPAY_r$=LIFPAY, each from the previously solved insurance run.

The system then uses $qxg(â_n)$ tables instead of the tabulated or computed qx(n) values. The systems checks, however, the qx guarantee flag for guideline premiums. If it is set, the system uses qx(n) instead of $qxg(ân)$ in the first year. For COI(n), n=1 to 12, the guaranteed rate is assumed to be equal to the current rate, for those carriers that guarantee the first year's interest crediting rate.

The system freezes SA in the GSP/GLP runs at $SA_r$. It does not use the formula previously shown for the computation of SA. Therefore, the system skips the computations for Q(t), P(t), tp(t), gSP, gLP, 7LP, and SA in this iteration.

The target in each iteration is to find the value for LIFPAY that achieves $CV(12N_{max})=SA_r$. The cash value at the end of the insurance policy must equal the Specified Amount the system just projected and saved. None of the standard insurance targets apply. However, the system checks and reports if the projected cash value drops below zero CV(n)<=0, any n, throughout the projection.

The system does not compute loans in this iteration. LOAN, TOTLOAN and LOANBAL are equal to zero, for all n. The system also does not compute LBASIS (n), MINS(n), LSURR(n), or LSNET(n).

For The Actual Regulatory GSP: The system first assumes: LNUM=1, is a single premium, in the first month of the policy.

$$iC1=iC2=\max(insp, IRS\_insp)$$

where IRS_insp is a system parameter. Currently, this value is 6 percent.

The resulting LIFPAY computed by the system is the new Guideline Single Premium, $GSP_a$.

For The Actual Regulatory GLP. The system assumes:

$$LNUM=\min(N_{max}, 95-a_1+1)$$

$$iC1=iC2=\max(inlp, IRS\_inlp)$$

where IRS_inlp is a system parameter. This value is usually four percent for most carriers. The resulting LIFPAY computed by the system is the new Guideline Level Premium, $GLP_a$.

Both $GSP_a$ and $GLP_a$, as finally computed, are reported to the carrier as part of the insurance issuance process. They are also used to confirm that the originally saved illustration values met the guidelines, as follows:

The system computes new guideline ratios, $$gSP = \frac{GSP_a}{SA_r}$$

$$gLP = \frac{GLP_a}{SA_r}$$

and checks that the original SA formula continues to be met. For example, using the original LIFPAY and the new gLP and gSP, the system checks whether it computed the same $SA_r$. Also, the system checks the cumulative premiums each year:

$$t \times LIFPAY_r \leq \max(GSP_a, t \times GLP_a), t=1 \text{ to } LNUM_r$$

where $LNUM_r$ is the LNUM from the original illustration.

The technical tax rule that must be met is that the cumulative premiums paid, as of year t, are less than or equal to $\max(GSP_a, t \times GLP_a)$. However, since the policies illustrated will initially require a fixed premium per year, in order to comply with other regulatory requirements previously noted, the cumulative premium paid is quickly computed by the system. If the test is met when the last premium is paid, at $LNUM_r$, it must be met thereafter. Thus, a simpler two part test suffices: (1) if $LIFPAY_r \leq GLP_a$·the test is met. Otherwise, (2) if $LNUM_r \times LIFPAY_r \leq GSP_a$·the test is met.

If any of these three tests is not met in FIG. 3B-6, Block 130, the system uses the new gLP and gSP in place of the last in Block 132, whether from their approximation formulas or the last iteration, and re-solves the insurance computation originally saved, returning to FIG. 3B-5, Block 110. Then the system repeats the $GSP_a$ and $GLP_a$ determination and test for the new $SA_r$ resulting from the re-illustration. The system repeats this computation as required. Once the tests are all met, the system saves the $gLP_a$ and $gSP_a$ values.

When it has completed the aforementioned regulatory guideline computations, the system computes a projection of insurance cash values based upon carrier guaranteed rates for the minimum credited interest and maximum mortality charges in Block 133. This projection is unrealistic and will look unattractive to the applicant. (See Guaranteed Life Insurance Values, Specimens 2–7.) However, by law it must be presented to the prospective applicant. The cash value will in many instances drop to below zero before the end of the required period. The system continues the computation, but the display shows the insurance lapsing in the first month the cash value is negative.

This projection therefore uses the LIFPAY and LNUM for the actual projected insurance premium values, the $qxg(â_n)$ table(s) in place of qx(n) table/formula, and iC1=iC2=inlp. However, if the iC year-one guarantee flag for this projection is set because the carrier guarantees its first year rate, the system uses iC1 and iC2 for n=1 to 12. These are used to compute INTC(n). Similarly, if the qx year-one guarantee flag for this projection is set because the carrier guarantees the first year mortality changes, the systems uses qx(n) instead of $qxg(â_n)$, for n=1 to 12 for the first year.

The system also computes the required policy cost indices, see Block 134, FIG. 3B-6, for each insurance product illustrated. These are the Surrender Cost Index At 5%, also called the Interest Adjusted Net Cost Index (IANC), and the Net Payment Cost Index At 5%. The formulas are noted below:

Surrender Cost Index At 5% at year t:

$$IANC(t) = \frac{LIFPAY \sum_{i=1}^{LNUM} (1 + INVI)^{t-i+1} - CV(12t)}{SA \sum_{i=1}^{t} (1 + INVI)^i}$$

where INVI is the investment interest rate, here assumed to be 5%. The cash value term, CV(12t), is the illustrated cash value at the end of policy year t. The Surrender Cost Index is typically computed for years 10 and 20 of the policy.

Similarly, the Net Payment Cost Index (NPI), Formula is identical to IANC(t) except that the cash value term CV(12t) is omitted, as shown below:

Net Payment Cost Index At 5% at year t:

$$NPI(t) = \frac{LIFPAY \sum_{i=1}^{LNUM} (1 + INVI)^{t-i+1}}{SA \sum_{i=1}^{t} (1 + INVI)^i}$$

If in FIG. 3B-7, Block 155, the prospective applicant wishes to see a comparison with a larger up-front payment than the Ryan Mortgage requires, or if he or she wishes to see an equal up-front payment comparison for the sponsored case, the following describes how the system computes the additional up-front payment in the Ryan Mortgage.

The variables below are used by the system in this computation:

CLDP: This is the applicant-specified up-front payment amount which is:

| | |
|---|---|
| >DOWN1 | (Unsponsored) |
| >LIFPAY | (Sponsored) |

ADDEQ: This is a variable for additional equity achieved by applying that part of the up-front payment not going towards the premium to reducing the original amount borrowed:

| | |
|---|---|
| = CLDP − DOWN1 | (Unsponsored) |
| = CLDP − LIFPAY | (Sponsored) |

Then, the system reduces PRIN by ADDEQ, and solves for the new LIFPAY and, if unsponsored, the annuity for the new DOWN1. This gives a new ADDEQ.

To bracket the final value and apply interpolation, rather than the asymptotic approach that simple iteration would achieve, the system uses a first try of $PRIN_1 = PRIN_0 - CLDP$. The system assumes all the prospective applicant's payment is used to reduce principal. Thus, the system has two end values:

ADDEQ=0: ERR=CLDP−DOWN1$_0$ (or, LIFPAY$_0$)  (1)

ADDEQ=CLDP: ERR=−DOWN1$_1$ (or, −LIFPAY$_1$)  (2)

where DOWN1$_0$ (or LIFPAY$_0$) are the original insurance values, and DOWN1$_1$ or LIFPAY$_1$ are the values obtained by applying the entire CLDP to reduce PRIN. Then the system interpolates to ERR=0, to obtain the next trial for ADDEQ. As for the aforementioned insurance illustration iterations, quadratic interpolation is used to accelerate convergence.

Set out below are the formulas for computing the targets referred to in FIG. 3B-4, Block 104, and which are tested against in FIG. 3B-6, Block 130.

The basic target that a universal life policy must meet is that the premium must be adequate to provide a positive net cash value at all times.

$\min_n \{CV(n) - LOANBAL(n)\} > 0$, $n=1$ through $12N_{max}$

Whether or not there is a loan balance, of course, depends on which LOPT is in use. If there is none, the system test is $\min_n (\{CV(n)\} > 0$, for all n.

For each of the LOPIT values, this basic test is combined with others, as follows:

LOPT=0:
(1) Basic test:

$\min_n \{CV(n)\} > 0$, $n=1$ through $12N_{max}$ (2) The guideline test for the ability of the cash surrender value to repay the mortgage is:

LSURR(MTH)=PRIN

Where the test value is V=LSURR(MTH)−PRIN, where V=0.

If test (2) is not met, the system scales LIFPAY by the factor $$\frac{PRIN}{LSURR(MTH)}.$$

If this does not bracket V=0, the system repeats the computation with a double correction, $$\left[\frac{PRIN}{LSURR(MTH)}\right]^2.$$

Once the value is bracketed, the system applies interpolation on V to find the correct LIFPAY.

LOPT=1:
(1) Basic test:

$\min_n \{CV(n)\} > 0$, $n=1$ through MTH (2) The guideline test for the repayment of the mortgage:

$CV(n) \geq LOANBAL(n)$, $n=MTH+1, \ldots, 12N_{max}$

The test value for this computation is: $V = \min_n \{CV(n) - LOANBAL(n)\}$

If test (2) is not met, then the systems scales LIFPAY by the factor $$\frac{LOANBAL(n_0)}{CV(n_0)},$$

where $n_0$ is the month in which the minimum value of V was reached. As before, the system uses double correction as needed to bracket V=0. The system checks for $CV(n_0)$ going negative and, if it does, uses a much larger LIFPAY instead of using a computed factor. Then, the system interpolates.

The system then performs Check (1). If this condition is not met, the system proceeds per LOPT=0.

LOPT=2:
(1) The Basic test is the same as LOPT=1.
(2) There are two guideline tests. The first, V1, is the same as V for LOPT=1. The second is the sufficiency of the insurance death benefit to, eventually, pay off the mortgage and the borrowing against the policy's cash value, and is expressed as:

$$MINS(n) \geq LOANBAL(n) + PRIN, n = MTH+1, \ldots, 12N_{max}.$$

The test value is:

$$V2 = \min_n \{MINS(n) - LOANBAL(n) - PRIN\}.$$

The goal is to achieve V1=0 or V2=0, and the other $\geq 0$. If in FIG. 3B-5, Block 118, both V1 and V2 are less than zero, the system scales LIFPAY by the larger of:

$$V1: \frac{LOANBAL(n_0)}{CV(n_0)}, \quad n_0 = \text{month of minimum } V1$$

$$V2: \frac{LOANBAL(n_0) + PRIN}{MINS(n_0)}, \quad n_0 = \text{month of minimum } V2$$

and, as necessary, uses double correction to bracket V1 (or V2)=0.

If both V1 and V2 are greater than zero, the system scales LIFPAY by the smaller of these two ratios. If one of V1 and V2 is less than zero, but not the other, the system uses the ratio for that one which is less than zero. The system once again uses double correction if necessary to achieve bracketing If $CV(n_0)$ is negative, or $MINS(n_0)$ is negative, the system uses a much larger fixed factor times LIFPAY instead of attempting to scale by a computed factor.

If the LIFPAY range that brackets V1=0 also yields V2$\geq$0 at both ends, the system only needs to solve for the former. Otherwise the system interpolates with each, and uses the larger LIFPAY. Eventually, one dominates.

The system once again, tests (1). If it is not met, it proceeds per LOPT=0. In general, the month at which the auxiliary tests of LOFT=1 and 2 yield the minimum V (or V1 and V2) should be at $12N_{max}$.

The selection of a life insurance product also selects the companion annuity if one is needed. Annuity parameters, tables, etc., therefore, are stored with the companion product as product parameters, tables, etc.

In FIG. 3B-7, Block 146, the system computes the annuity from basic expense, cost, and interest values, or uses a table-driven set of pre-computed values provided by the carrier. The selected product data file indicates which computational approach is used. The following variables are used to compute the annuity for a lump-sum premium payment plan.

ATYPE: This is the annuity type flag. It indicates whether the annuity computation for that product is to be made by formula, or is to be table driven.

NUM: This is the variable for the number of annuity payments. This value is equal to LNUM-1, one less than the number of insurance payments. The system default is three.

ANNPAY: This is the variable for the annual annuity payment. This value is equal to LIFPAY, the required life insurance (annual) premium.

APCTAX: This is the variable for the annuity initial tax charge, expressed as a percentage of annuity premium. Annuity taxes differ for each state. This variable is independent of product.

iA: This is the annual annuity credited rate expressed as a percentage. It is the rate of interest earned by the funds invested in the annuity. This rate varies by product.

APCT: This is the annuity initial expense, expressed as a percentage of annuity premium, for this product.

ASELEXP: This is the annuity selling expense. This is a fixed dollar amount and normally applies only in the first month of the first year.

AMNTEXP(n): This is the annuity maintenance expense. It is also a fixed dollar amount. Depending on the product, it may be an annual charge, in the first month of each year, or a monthly charge. It may be constant or variable, depending on the size of the annuity. A value may be present for (12×NUM)+1, i.e. in the month the last annuity payment is received.

AMTH: This is the variable for the number of months in the annuity. It is computed as:

$$=(12 \times NUM) + 1$$

$iA_M$: This is the variable for the monthly annuity credited rate. It is computed as:

$$=(1+iA)^{1/12} - 1$$

APCTOT: This is the total percentage of annuity initial expense. It reflects the carrier's charges and annuity taxes:

$$= APCT + APCFAX$$

AEXP(n): This is the total carrier's fixed charges in the annuity for month n. It is computed as:

$$= ASELEXP + AMNTEXP(n), n = -1$$

$$= AMNTEXP(n), n = 2, \ldots, AMTH$$

DOWN1: This is the variable for the up-front payment amount. This is the amount the applicant pays, at the start, to: (1) pay the first year's insurance premium; and (2) buy the annuity that will pay the rest of the premiums. It is computed as:

$$= \frac{\left[ ANNPAY \times \left\{ 1 - APCTOT + \sum_{t=1}^{NUM} \frac{1}{(1+iA)^t} \right\} \right] + \sum_{n=1}^{AMTH} \frac{AEXP(n)}{(1+iA_m)^{n-1}}}{1 - APCTOT}$$

DOWN1A: This is the variable for the annuity portion of the lump-sum prepayment. It is computed as:

$$= \frac{\left[ ANNPAY \times \sum_{t=1}^{NUM} \frac{1}{(1+iA)^t} \right] + \sum_{n=1}^{AMTH} \frac{AEXP(n)}{(1+iA_m)^{n-1}}}{1 - APCTOT}$$

The applicant pays taxes on annuity interest earned received in the annual proceeds in the month the annuity payment is made. This is the beginning of the first month, in each year, starting in the second year. For tax purposes, the total income of the annuity is shown as received by the applicant in equal annual payments.

ATAX(n): This is equal to the taxes payable on the annuity interest income. It is computed as:

$$= \max\left\{ 0, \left( ANNPAY - \frac{DOWN1A}{NUM} \right) \times TAXRATE \right\},$$

$$n = 13, 25, \ldots, (12 \times NUM) + 1$$

$$= 0, \text{ elsewhere}$$

Monthly Interest Rates: The system uses the interest rate, iA, in its monthly equivalent multiplier, $$(1+iA)^{1/12} - 1 = iA_m$$

ABASIS(n): This is the remaining basis in the annuity as of month n. It is equal to:

$$= DOWN1A\left[\frac{NUM-t}{NUM}\right],$$

where $t=int[(n-1)^{1/12}]$ is the number of whole years elapsed prior to month n, the number of payments made to date.

ABAL(n): This is the remaining annuity balance at the end of month n. It is computed as:

ABAL(0)=DOWN1A=(1-APCTOT)

ABAL(1)=[ABAL(0)-AEXP(1)]×(1+$iA_m$)

ABAL(n)=[ABAL(n-1)-AEXP(t+1)-ANNPAY]×(1+$iA_m$), n=12t+1, for t=1, 2, . . . , NUM-1

ABAL(n)=ABAL(n-1)×(1+$iA_m$), otherwise, n≧12×NUM

This reflects: (1) AEXP(t) is charged in the first month of year t, and; (2) ANNPAY is paid out in the first month of each year t, following year 1.

ASURR(n): This is the after-tax surrender value, at the end of month n. Since this is the amount the policyholder's estate would receive in the event of his or her death, it is also the annuity death benefit in month n. Because the annuity is not insurance, the gain on the annuity is taxable.

ABAL(n)-TAXRATE×max{0, ABAL(n)-ABASIS(n)}

The following are inputs and parameters for table-driven annuity computations.

ARATE(NUM): This is the gross annuity conversion rate for table-driven annuities. This number is stored exclusive of state tax, and is expressed in terms of dollars of premium per dollar of annual payment, for an annuity with NUM annual payments.

DOWN1A: This is the annuity portion of the lump-sum prepayment for a table-driven annuity. It is computed as:

$$= ARATE(NUM) \times \frac{ANNPAY}{1-APCTAX}$$

DOWN1: This is the total down payment for a table-driven annuity. It is computed as:

=DOWN1A+ANNPAY

ATAX(n), ABASIS(n): These are computed in the same way in a table-driven annuity as in a computed annuity.

ABAL(n): This is the before-tax annuity surrender value, at the end of month n. For a table-driven annuity, this is computed as:

=(NUM-$T_n$+1)×ANNPAY, 0<n≦12NUM where $T_n$=int[(n+11)/12]

ASURR(n): For a table-driven annuity, this is calculated in the same manner as for a computed annuity, using the preceeding ABAL(n).

The system includes two tables of mortgages to illustrate to the prospective applicant. One is for use in illustrating a conventional mortgage shown in FIG. 3B-7, Block 150, and one is for a balloon payment mortgage of the type made possible by this invention shown in FIG. 3B-7, Block 148. Selection from the system is based on whether a particular mortgage is available to the prospective applicant in the state in which the property is located and the mortgage duration. The system default for comparisons is to select the conventional mortgage most closely matching the Ryan Mortgage assumptions.

In order to provide a comparison of the economic benefits of the Ryan Mortgage, the system illustrates the conventional mortgage together with the prospective applicant purchase of life insurance with death benefit equal to the outstanding mortgage balance. This is compared to the Ryan Mortgage. The term insurance cost is computed using the same mortality charges used for the universal life product to which it is being compared. To this end, certain additional parameters are added to each product's description, for use in computing the conventional mortgage's life insurance costs.

The system, with a lump-sum prepayment illustration comparison to a conventional mortgage, solves for a conventional mortgage with the same down payment, in terms of initial cost, as the Ryan Mortgage. However, since sponsored plans allow for insurance premiums to be spread over a longer period with no annuity purchase, the initial Ryan Mortgage up-front payment may be lower than the five percent minimum down payment a standard mortgage will permit. In that case, the system assumes the minimum down payment, five percent (or the minimum available on the market), is to be paid, and the comparisons will show the lower up-front payment advantage of the Ryan Mortgage. Otherwise the comparison will be based on like amounts.

Any Ryan Mortgage available in a particular location may be used with any insurance product available in that particular location. However, if selecting the best combination, the system will default to insurance and mortgage products tied to the same index.

The system computes the various elements of the mortgage transaction in FIG. 3B-7 Blocks 148 and 150.

INITPAY: This is the variable for the conventional mortgage, from the insurance illustration, for the amount to be used for the comparison of the up-front payment:

=LIFPAY, sponsored Ryan Mortgage (no annuity)

=DOWN1, not sponsored (annuity+LIFPAY)

PTS: This is the variable for mortgage points. It is expressed as a percentage of the mortgage principal. It is retrieved either as an average value from a database of closing costs (FIG. 3A-1, Block 78 or FIG. 3B-2, Block 190) or if known, entered by the user in FIG. 3B-2, Block 188. Mortgage principal, and therefore the cost of mortgage points, will differ between the Ryan and conventional mortgages. Some mortgage points are deductible as interest, while others are non-deductible fees. A flag is set if, for this mortgage, all or part of the PTS is deductible interest, rather than a non-deductible fee.

PMIPCT: This is the cost of private mortgage insurance. Because of its enhanced security to lenders, this is not expected to be a cost with the Ryan Mortgage. Conventional mortgages typically require private mortgage insurance if the down payment amount is less than 20 percent of the purchase price of the home. The system allows an input in FIG. 3B-2, Block 182, but the default is 0.5 percent of the original mortgage balance annually until the mortgage balance goes below 80% of the original purchase price of the home. The system uses zero for the Ryan Mortgage. However, other values may be used for both the Ryan Mortgage and the conventional mortgage.

dpins: This is the down payment expressed as a percentage of property value, below which PMI must be paid. The system allows an input in FIG. 3B-2, Block 182, but the default is 20 percent. This is a system parameter.

dpmin: This is the minimum down payment permissible for this mortgage, expressed as a percentage of PRIN, the mortgage principal amount. The default minimum down payment is five percent. However, this may vary in the case of VA or other federal or state agency endorsed mortgages.

TRATE: This is the variable for the term mortality rate. It is used to adjust the Qx table as it applies to the equivalent term insurance. It varies by life insurance product.

TEXP: This is the variable for the fixed expense charges, charged by the carrier, for maintenance of the term insurance policy. This data is stored by product as a fixed dollar amount.

TLOAD: This is the variable for the term insurance load factor. It is expressed as a percentage of premium for each product.

iM: This is the variable for the nominal annual mortgage interest rate. It is converted to a monthly rate when used for monthly payment amounts as, for example, in FIG. 3B-7, Block 148. The formula for the monthly rate is:

$$iM_m = \frac{iM}{12}$$

Because the Ryan Mortgage may be a variable mortgage, the system may contain three values. The first is the fixed mortgage rate if one is offered. The second is the increment to be added to the current index rate in order to obtain the first year's rate, and the third, the increment to be added in succeeding years. The current index rate (for example the Treasury rate index) is a system parameter, maintained as required by the Ryan Mortgage operations management. Fixed rate values are stored by product. Most variable rate mortgages include a low rate for the first year and a higher rate attached to an index in later years. In the equations for a variable rate mortgage, wherever $iM_m$ is specified, the system uses $$iM_m(n) = \frac{iM_t}{12}, t = int\left[\frac{(n+11)}{12}\right],$$

for the value in month n.

NYR: This is the variable for the mortgage length in years, per insurance parameters. It is equal to MTH/12.

Each mortgage chosen in the system is qualified by, or selected by, state and length of mortgage, NYR. The system may accommodate from 15 to 40, in 5 year increments where 15, 20, 30 and 40 are the most common choice of lenders. The Ryan Mortgage table includes a ninety-nine year table entry which permits illustration of a mortgage for which the LOPT=1 and LOPT=2.

INITPAY is used to pay: (1) the actual up-front payment; (2) the initial points; and (3) the first year's PMI, if needed. Since the system cannot determine whether there is a PMI charge before it has computed the up-front payment the system solves it both ways.

INITPAY=DOWN+[PTS×MBAL(0)]+[PMIPCT×MBAL(0)]

where

MBAL(0)=Initial mortgage balance,

=PRIN−DOWN

The system solves the above formula with PMIPCT=0, then, if dpmin<dpins, the system checks $$\frac{DOWNX}{PRIN} < dpins.$$

If this condition is true, the system solves for INITPAY again with PMIPCT at its standard value, and uses that result.

Then, the system takes DOWN=max(DOWNX, dpmin× PRIN) and recomputes INITPAY, if DOWN does not equal DOWNX.

MPAY: This is the monthly payment in a conventional mortgage. The conventional mortgage payment includes mortgage principal and interest as of the end of each month n.

$$= \frac{iM_m \times MBAL(0)}{1-(1+iM_m)^{-MTH}}$$

For variable rate mortgages, $iM_m$ is a function of the month number, and MPAY is recomputed each year, with MBAL (12t−12), t=1, 2, 3, . . . being the initial balance instead of MBAL(0), and MMH−12t+12 replacing MTH in the exponent, to compute MPAY(12t+i−12), i=1 to 12. In the system illustration, three values are defined for iM. The year 1 guaranteed rate, the assumed value, based on the current Treasury bill rate, in years 2 and on, and the maximum value required for truth in lending disclosure.

PRINRE(n): This is the reduction in mortgage principal during month n.

=MPAY−INT(n)

=MBAL(n−1)−MBAL(n)

INT(n): This is the interest paid at end of month n.

=$iM_m$×MBAL(n−1)

=MPAY−PRINRE(n)

so

INT(n)=$iM_m$×MBAL(n−1)

MBAL(n): This is the variable for mortgage principal, after the payment at end of month n.

=MBAL(n−1)−PRINRE(n)

$PMI_t$: This is the annual PMI cost for year t.

$$= 0, \text{ if } \frac{MBAL(12t-12)}{PRIN} \leq (1-dpins)$$
$$= PMIPCT \times MBAL(12t-12), \text{ otherwise}$$

PMI_1, is a prepaid item.

$TERM_t$: This is the annual term insurance premium for year t.

$$= \frac{[Qx_t(a_t) \times MBAL(12t-12)] + TEXP}{1 - TLOAD}$$

where $Qx_t(a_t)$=TRATE×Qx($a_t$)

MPTOT(n): This is the conventional loan monthly payment. It is computed as:

$$MPAY + \frac{PMI_t}{12} + \frac{TERM_t}{12}$$

where t=int[(n+23)/12]

This shows the applicant prepaying, into escrow, next year's PMI premiums and paying annual term insurance premiums.

TAXDED$_t$: This is the annual tax credit used by the system in computing the mortgage after-tax cost. It is computed as:

$$= TAXRATE \times \sum_{n=12t-11}^{12t} INT(n), \ t > 1$$

$$= TAXRATE \times \left[ \sum_{n=1}^{12} INT(n) + [PTS \times MBAL(0)] \right], \ t = 1$$

C. Discussion of Specimens

Specimens 1–7 provide samples of part of the output that would be printed on the user's printer.

Specimen 1 includes a sample of explanatory textual material that would be provided to introduce prospective applicants to the principal concepts involved in the use of life insurance as collateral for mortgages. Specimens 2–7 provide examples of the textual data which would be merged with illustration data in order to apprise prospective applicants of the potential advantages of using such a vehicle. Specimen 8 provides an example of textual data than can be merged with client data to provide a completed insurance application form. Specimen 9 provides an example of textual data that can be merged with client data to provide a completed loan application form. In this embodiment of the invention, it is contemplated that such textual data as is required by federal, state, and local regulations in the disclosure of loan, insurance, and other information to potential purchasers/borrowers would be automatically generated. This information might include data from insurers and their agents as to minimum interest crediting rates and maximum cost of insuance charges, truth in lending disclosure information from lenders, information from employers or financial institutions regarding premium payment guarantees, and all other information necessary for legal compliance, ethical business practice, and improved marketing through the provision of that information which may be most useful to the prospective applicant in financial planning and decision making.

D. Conclusion

In sum, the present invention involves a computer system used to support a financial innovation in which a mortgage is combined with an investment as a means for repaying the mortgage. This investment may collateralize the mortgage. Also, the investment may serve in place of a down payment for a conventional mortgage. The combination is tailored to meet the U S legal requirements for offering such a combination, but without the drawbacks of a cost containment clause approach. There are many variations on the theme of this invention, revolving primarily around variations in the kind of investment and variations in the kind of mortgage that are combined, and each variation can inherently impart computational and illustration requirements on the computer system. All involve providing the consumer access to an investment specifically designed for use in repaying a mortgage. Preferably, this investment is made available for purchases from multiple suppliers and is purchased and owned by the borrower.

As to the investment, in one case, it can be placed in a tax-favored account, such as an IRA, Keough, or 401K plan, but in another case, the investment can be held separately (i.e., in a manner that is not tax-favored).

In any of these cases, one alternative is for the investment to include a security or a security in combination with term life insurance. The security can be a zero coupon bond, such as a US Treasury Derivative or a municipal bond derivative, or the security can be a mutual fund.

Another alternative is for the investment to include an annuity. The annuity can be either an immediate annuity or a deferred annuity. Each can be used with or without term life insurance to assure that the mortgage is repaid upon the death of the borrower. The immediate annuity can be used to pay interest on the mortgage, more particularly where the mortgage is a home equity loan, and the term life insurance can be used in repaying the home equity mortgage. The deferred annuity can be a single premium, level premium, or variable premium annuity and may be used as a means for accumulating the necessary principal to repay the mortgage. Still another alternative is for the investment to include life insurance. The life insurance can be term or permanent. For the permanent life insurance, there can be one policy covering two insured lives (e.g., borrower and co-borrower), and such a policy can be a joint policy (which pays on the first death) or a joint and survivor policy (which pays on the second death). The policy may also be a single policy covering a single life. Either way, the permanent life insurance can be universal life insurance or variable life insurance, or the permanent life insurance can have at least one rider, such as a disability rider or an income rider.

For any of these cases and any of these alternatives, the mortgage can be more particularly defined as including a first mortgage, a home equity mortgage, a balloon repayment mortgage, a fixed interest mortgage, or a variable interest mortgage. As to the latter, the computer system can be programmed to compute a fixed payment, variable interest rate mortgage having extra amortization of principal when interest rates are low, and negative amortization of the principal when interest rates are high. Such a mortgage may be used together with permanent life insurance or a deferred annuity such that cash value accumulation from the investment is an offset to the negative amortization.

While this invention has been particularly shown and described with reference to a preferred embodiment, it will be readily appreciated by those of ordinary skill in the art that various changes and modifications may be made without departing from the spirit or scope of the invention. For example, the particular formats of the various display screens or output herein described may be modified, as desired. Likewise, the present invention should not be limited to the specific examples described herein since a greater or lesser number of options and functions for each of the menus and submenus that may be displayed on a CRT or VDT are within the scope of this invention. It is therefore, contemplated that the appended claims be interpreted as including the foregoing and other changes and modifications.

Insurance Component

A. Discussion of Figures (FIGS.) and User Screens

The following includes a description of the manner in which the computerized insurance system of the present invention can be made and used. Some of the unique insurance functions that are carried out by this system are described in detail. Other transactions arc described more generally. In the interest of brevity, a highly detailed description of each and every one of the data transactions that could be performed by the computerized system of the present invention is not provided. But based upon the detailed description of certain examples, and the knowledge of those familiar with the life insurance industry, how to make and use the present invention should be readily apparent from the information provided herein.

Generally, the system includes a digital computer for receiving input data and for storing insured information and life insurance information. The digital computer is programmed with means, responsive to the data, the insured information, and to the insurance information, for computing an amount of universal life insurance premium sufficient to provide needed coverage and for generating an illustration of said life insurance as a means for understanding that coverage.

More particularly, the computer system requests that a user input data specifying the kind of insurance coverage (e.g., amount and duration of coverage) to be illustrated. This information is stored in the computer's database system Also, the computer is programmed to make calculations of universal life insurance policy riders and other data needed for the illustration. When all the values have been computed and written to the database, the computer will then combine them with text data to provide an illustration that can be printed out. This information will also be stored in a database and may be updated as needed.

Once the user, in consultation with a prospective insured, has designated the illustration as complete, data in the database can be merged with stored text data and other input data in order to produce insurance application forms. These forms can be printed out on the user's printer for signature by the prospective applicant and for subsequent processing by the system operator and the life insurance carrier.

It is to be explicitly understood that other implementations of the present invention, say, those using a different kind of digital computer, analogous hardware, multiple computer systems, comparable input and output, a computer program or computer programs written in a different language, a chip or chips, or a full or partially hardwired system replacing (and in accordance with) the logic of the computer program, are entirely acceptable and equivalent to the embodiment of the invention discussed herein. Also the invention can be implemented by hardwired logic in a handheld calculator. When software is loaded into, and running, a programmable computer, the software sets what in effect are many, many "switches," and the result can be considered a new computer machine, with logic formed from the set switches. Instead of setting the switches, a circuit equivalent would be to hardwire the same or equivalent logic. Therefore, whether a configurable device is configured to the requirements of the present invention, or a device is constructed from scratch solely for meeting the requirements of the present invention, the result is effectively the same from an electrical signal processing standpoint. All these embodiments are different species of the present invention that are within the contemplated scope of the present invention.

Turning now to FIG. 1, an overview of a data processing system for producing a universal life insurance policy illustration system according to the present invention is shown. The Data Screen 4, discussed more fully hereinafter, can be produced on Terminal 2, for example an IBM compatible PC running Smarterm 340 (available from Persoft Corp.), with a Local Printer 5. e.g., a laser printer. Terminal 2 is linkable to Communications System 6. The Communication System 6 can be a modem and appropriate telephone lines. Communications System 6 is thus linkable to a Digital Computer 8, for example, a Digital Equipment Corporation VAX with a VMS operating system, ORACLE, and WordPerfect (e.g., 5.1) from WordPerfect Corporation. Digital Computer 8 is operably connected to Central Printer 9. The Digital Computer 8 contains a Central Processor 10 that is operable to obtain Insurance Product Information 12 (digital electric signals), and Insurance Premium Information 16. The respective information of Blocks 12 and 16 can optionally be accessible on line to other computers or stored as data in a System Database 17 of the Digital Computer 8.

Help 18 is a computerized system, preferably a context sensitive, hypertext-linked help system. Help 18 is available throughout the program.

Central Processor 10 is also operable to activate a function Print Out Insurance Application Forms 22 on Central Printer 9, which points to the function Fill In Forms 24 to selectively transmit Life Insurance Application Data To Carrier 28.

Further, Central Processor 10 can generate an illustration via a function Generate Illustration 30, which leads to Print Illustration 32 On Local Printer 5. The generated illustration can be saved in the Database 17.

When the system is accessed, the user must choose the transaction desired, and the selection will vary by the type of user. A management level user with a higher level of authority can update the data used in the illustration process. This data includes, but is not limited to: (1) insurance underwriting related values, including data regarding age, sex, and health characteristics, premium amounts to be applied, cash value accumulation factors, annual death benefit amounts, and typical policy interest crediting rates and insurance charges; (2) all of the illustrations saved in the Database 17, which may be used for manipulation and analysis in both the marketing and underwriting functions carried out by an insurance agent and carrier; and (3) administrative messages from other users. Otherwise, a non-management user of the system has access to only a portion of the system.

Prior to engaging the computerized aspects of the present invention, the user should consult with the prospective applicant to obtain such information as the prospective insured's age and sex, the amount of life insurance coverage desired, whether or not the individual has certain health problems which may require specialized insurance underwriting, whether or not the individual's employer is currently involved in a program that will sponsor reduced cost policy premiums, etc. After this information-gathering step has been completed, the user "logs on" at Terminal 2 by entering an assigned authorization password.

Turning now to FIG. 36, the user engages the system at Sign On To System 534. Branch 536, Authorized To Use System?, checks the password against stored passwords to determine whether the user is authorized to use the system. If the user is not authorized, Block 538 displays a message on the Terminal 2 indicating that the user should telephone the system owner/operator for further information. If the user is authorized, meaning that the password is recognized by the Digital Computer 8, the logic continues to Branch 542. However, prior to Branch 542, there is a logic entry point X4, which is described more fully below, but which generally is a connection from another part of the logic.

In any case, Branch 542 assesses the level of authority of the user from the password. In the present embodiment of the invention, there are two alternatives. First, as previously suggested, the user could be a "Client User," in which case the logic connects to Client User Menu 546 as is subsequently discussed. Second, the user could be a "Super User," having access to Super User Main Menu 544.

The Client User/Super User authorization system is included in a preferred embodiment of this invention to avoid security problems which would otherwise be created by different kinds of system users. Different degrees of authorization also provide for confidentiality of database information and, in the case of communications between the system owner/operator and users, allows each user to view only the information relating to the applicants for whom the user is providing illustrations.

From the Super User Main Menu 544, if -the user does not yet wish to log off at Block 558, there are a number of choices shown in User Screen 23.

The Super User Main Menu 544 permits access to Illustration 552 used to create an illustration. The user can also select Update Database 550, which is described with particularity hereinafter, but which generally is a list of tables that can be updated.

The user can select Analyze 548 to access various reports and statistics on illustrations. Electronic Mail 556 permits electronic communication between system users (see FIG. 1). Mail messages may be printed out via the Printers 5 and 9.

Returning to FIG. 2, the Electronic Mail 556 function utilizes the VMS operating system mail feature. The system has the ability to alert the user that a message is present in his or her electronic "mail box." The system is capable of reading these messages from that file onto the user's screen, again allowing the user to move from screen-to-screen at his or her own speed. Once the user has completed a review of the data, one or all of the textual screens or "pages" may be printed at the Local Printer 5. The user may also write electronic messages to other users' mail boxes to be used in a similar manner.

At the completion of each subordinate function 548, 550, 552, 554 and 556, control is returned to the Super User Main Menu 544 via the Return To Main Menu Block 560.

Turning now to FIG. 37A where the logic proceeds from Illustration 552 of FIG. 36, the user is presented with a Select Type Of Illustration 562 submenu, shown as a portion of User Screen 23. Each of the functions of the submenu of Branch 568 will be presented in summary form here and described subsequently in detail. One function is Generate New Application Illustration 568, which is elaborated by FIG. 37B-1. This Function 568 permits the user to provide a detailed-presentation, tailored to the prospective applicant's own factual situation, of how universal life insurance might perform for the prospective applicant. This Function 568 also allows the user to save the illustration for later updates and to send the illustration to the Local Printer 5 for review by the prospective applicant.

A second function of Submenu 562 is Choose Existing Illustration 566, which goes to FIG. 37C-1. This Function 566 permits the user to update a previously saved prospective applicant illustration using different assumptions. This Function 566 also allows the user to quickly create an illustration which is different from one already saved by allowing the user to change only those few items that the prospective applicant may select, thereby avoiding the laborious process of entering all of the information required to create a new prospective applicant illustration. This 566 likewise allows the user to save a new illustration for later updates and to send the illustration to the Local Printer 5 to permit review by the prospective applicant.

A third function of Submenu 562 is the Print Existing Illustration Function which goes to 732 in FIG. 37 B-8. This allows the user to print the illustration on which he or she is currently working at any time, without having to move through other menus.

Returning to FIG. 37A, once the illustration has been compiled, the system presents a sequence of further options. Print Life Insurance Application 570, goes to FIG. 37D-1. This Function 570 allows the user to: (1) take the information generated and saved in the aforementioned illustration process, add to it, and merge it with life insurance application form text data to construct a customized, printed life insurance application form for signature; (2) electronically save in a file the customized life insurance application form; or (3) print out a partially completed or blank life insurance application form for later manual completion by the prospective applicant.

Review Insurance Product Developments 572 goes to FIG. 37E-1. This Function 572 allows the user to be quickly apprised of new developments in the insurance products used in forming the illustrations including, but not limited to, changes in interest rates credited by carriers on cash value reserves in the life insurance policies, new underwriting rules, new products provided by different carriers, etc. This information is available inside the Generate New Applicant Illustration 572 and Choose Existing Applicant Illustration 566 functions. Information may be read from the screen or printed out.

Proceeding to FIG. 37B-1 Generate New Applicant Insurance Illustration 576, the system offers maximum flexibility so that it may accommodate virtually any life insurance policy. In a preferred embodiment of the invention, the system also provides many tables for product-specific data such as mortality tables, expense charges, interest rates, and other insurance-related data. These tables can be used to store the different components of the carriers' products. Product specific "flags" or identifiers in the insurance computation formulas can be used to provide maximum flexibility in the way the system makes insurance computations. This allows the system to offer a method of customizing computations that are common to all life insurance products. This feature also makes it possible for a single computer to efficiently provide multiple life insurance product illustrations for multiple life insurance carriers. (In another embodiment of the invention, the system can use front-end network gateways to connect multiple carriers' computers to the Digital Computer 8.)

The system maintains security by affording limited access to carrier-specific databases. The system provides carriers exclusive access to their own databases, for example, via modern, by requiring a password. Only individuals authorized by the carrier can access or see the carrier's databases.

Block 576 leads to Block 578, which solicits the type of policy the user would have selected as displayed on the User Screen 24. The user may select to illustrate either a joint and survivor life insurance policy or an individual life insurance policy. If it is a joint and survivor policy, the system will require policy information for each of two insureds. This is because a joint and survivor policy pays a benefit only upon the death of both insureds. Such policies are often used in estate planning for the payment of estate taxes upon the death of, for example, a married couple or a father and a daughter. Such policies are often used to assure that an estate has sufficient liquid assets to pay estate taxes. In Block 580, Solicit: Insureds Information; Employer Information, and as shown in Screens 25 and 26, the system solicits the Prospective Insured's information including, but not limited to the Insured's home address and telephone number, age, sex, and date of birth, and place of work. In Block 582, and as depicted by Screen 27, the system goes on to solicit information regarding the prospective Insured's Health. These general questions regarding the prospective insured's health permit carriers to segment prospective policy applicants into preferred and non-preferred risks and thereby provide a more accurate projection of policy charges. Preferred risks are individuals who exhibit desirable underwriting characteristics, as exemplified by good health, for whom carriers may lay away smaller amounts in reserve against the future possibility of death Non-preferred risks include individuals who have physical conditions which tend to place them at greater risk of early mortality. Such characteristics might include, for example, being a smoker or having been diagnosed as having had a Heart Attack, Cancer, AIDS or some other life-threatening condition. In Blocks 584 through 586, the same questions are repeated for the prospective co-Insured in the Joint and Survivor branch of the logic.

If the response to the question posed in User Screen 24 is "Individual" then the system goes instead to Block 588, Solicit Insured Information; Employer Information and Block 590, Solicit Insured Answers to Four Underwriting Questions. This information will be used likewise by the system to determine whether the applicant(s) is (are) a preferred or non-preferred risk,-through comparison with specific desired responses, stored by product in System Data Base 17.

Once this information has been obtained, the system goes on to solicit what kind of illustration the user would like in Block 592, Solicit Insurance Requirements. An example of the Screen that appears in front of the user appears in Screen 28 Insurance Requirements—Insured. The system requires the user to designate two out of three key variables needed in the illustration of a life insurance policy. The user must enter onto the screen some combination of the Minimum Death Benefit, Cash Value (and year the Cash Value should be attained), and premium amount. For example, if given Death Benefit and Cash Value amounts, the system finds for any product stored in the system that amount of Premium (and the Number of Years it would be payable) needed for the system to achieve that goal. Similarly, if given the annual Premium, the Number of Years for which it would be paid and the Death Benefit desired, the system projects the Cash Value that would be associated with such a transaction.

In Block 594, Solicit Additional Coverages, the system solicits any additional coverages desired by the client. These coverages, made available in the form of riders to the base policy, will permit the user to augment his/her coverage under the terms of the policy in exchange for an additional premium payment. Screen 29, for example, shows several riders potentially made available by the system. A waiver of annual premium benefit provides that premiums will be automatically waived in the event of policyholder disability. The Accidental Death Benefit Rider allows for the payment of an additional death benefit in the event the insured dies in an accident. The Additional Death Benefit Rider allows the policyholder to obtain additional coverage during the early years of the policy. A Spousal Death Benefit allows the user to obtain coverage for his or her spouse in addition to his or her own coverage. This screen has an electronically highlighted area, a "form" or blank, appearing next to the description of each additional benefit. This "form" is filled in by the user with a dollar amount. The system interprets any blanks as zeros with the exception of Waiver of Premium, which requires a "Yes" or "No" response from the user before allowing the user to move onto the next screen. Screen 30 solicits information as to where the policy will be issued.

In Block 596, Store, all the information regarding the prospective Insured and, if one exists, the co-Insured, is stored in System Data Base 17 for later use by the system.

Moving now to FIG. 37B-2, the part of the system logic dedicated to identifying and verifying the existence a Corporate Sponsor is shown. In Block 602, Identify and Mark Corporate Sponsor, information regarding the employer of the prospective applicant is used by the system for the selection of a policy. For example, there exist policies that life insurance carriers sell in large volumes through sponsored corporate purchases. Often such policies are paid for via a monthly payroll deduction. Because such automatic payments reduce the costs of distribution to the carrier, such policies are often offered on a discount basis to any employee purchasing the policy.

Also, in the event that corporations are willing to offer corporate sponsored purchase of life insurance, life insurance carriers may be willing to relax their underwriting requirements. Relaxed underwriting requirements usually take one of two forms, simplified issue or guaranteed issue. In simplified issue underwriting, only a few simple questions (typically three or four) are asked of the prospective insured. In guaranteed issue underwriting, no questions apart from the age and sex of the prospective insured are asked.

The availability of this kind of underwriting may be beneficial to both the insurance carrier, which may profit from increased insurance sales by providing insurance policies with reduced underwriting in a high volume sale, and to the employer, which as a consequence may offer an enhanced product to its employees. In addition, this kind of underwriting creates another use for the prospective applicant's employment information. The employment information may be compared to a database of all those companies which offer corporate sponsorship of insurance purchases for their employees. If there is a match between the data provided concerning a prospective applicant's employer and information in the database, a corporate sponsor number will be used to identify a product which may be offered to the employee at reduced cost or with less stringent underwriting requirements.

A preferred embodiment of the invention involves a system of corporate sponsorship recognition involving the identification of companies providing both the aforementioned guarantee of premium payments and the creation of a defined group for the provision of specialized underwriting. Block 602 is dedicated to this task.

In Block 604, the system checks System DataBase 17 to see whether or not the Prospect Applicant Works with a company which provides corporate sponsored polices. If the Answer is "Yes," then the system moves to Block 610, Select Corporate Sponsored Policy, and the system selects the appropriate corporate sponsored policy for that particular employer and writes the information to System DataBase 17. If the user and/or client is unsure, the system provides a list of Corporate Sponsors for him or her to consult in Block 606, Check List of Corporate Sponsors. In Block 608, Sponsor Selected?, the system checks to see if a Sponsor has been selected from the list of sponsored policies. If the answer is "Yes," the system moves to Block 610, Select Corporate Sponsored Policy. If the answer is "No," the system moves to Block 612, User Selects Policy or Best, as shown by Screen 31. If the response is "Best," the system logic moves to 614, Select Best Product—whereupon the system solves for the policy that provides the best solution to the mathematical problem identified in Block 592, Solicit Insurance Requirements, given the underwriting information provided in Blocks 580, 582, 584 and 586 for joint and survivor policies and Blocks 588 and 590 for individual life insurance policies. "Best" is defined as the Minimum Premium amount if the dollar cost of the annual premium is the solved for amount. Otherwise, if the missing variables are cash value or death benefit, then the "Best" will be defined in terms of highest Death Benefit or Cash Value. Screen 32 provides a sample of a screen which is provided to the user to summarize all the information in the system prior to computing to find the "Best" policy. Because finding the best policy from many different policies can be a time-consuming process, this screen helps to avoid finding the "Best" policy using the wrong information. Screen 33 provides a representative example of a screen that appears before the user while the system is searching out the "Best" policy while Screen 34 shows the listing of the "Best" policies identified on the screen by the system based on a single premium payment.

If, on the other hand, the user wishes to select the policy from a number of different policies available in the system, then the system moves to Block 612, User Selects Policy. Screen 33 shows an example of a screen listing of available policies on the system. Policies are listed alphabetically, but the system provides an electronic policy search capability, allowing the user to search out all policies that match a given criterion such as carrier name, policy name, current life insurance policy interest credited rate, or guaranteed rate of interest in the life insurance policy.

Moving now to FIG. 37B-3, a schematic representation of the policy search function of the system is shown. Block 622, Corporate Sponsored/User Selection or Best Product, is the branch of the system logic that identifies whether the system is to illustrate one Corporate Sponsored/User Selected Product or whatever number of policies fit the "Best" criteria. Blocks 624, Solicit Best Product Criteria, and 626, Store Criteria, identify and store a count of products to be illustrated. Block 628, J Gets Total Number of Products Available, initializes a counter to keep track of the number of products meeting the desired criteria to be illustrated.

In FIG. 37B-4 a schematic representation of the insurance illustration function of the system is presented. First, in Block 640, the system retrieves all components needed for a projection of life insurance values: product-specific data from data tables, stored by product and carrier; information regarding the insured(s) and information regarding the prospective insured(s)' life insurance needs and other personal information as solicited and stored in FIG. 37B-1.

Moving now to Block 642, the system determines whether riders are present. If the answer is "No," then in Block 644, Compute 1st Premium, Trial Guideline for Policy, the system computes its first guess as to the premium amount, or uses the premium amount previously provided by the user. The system also computes a trial guideline amount, an initial estimate as to actuarial regulatory guideline values. Using trial amounts speeds the illustration process, by reducing the number of iterations needed. These trial amounts, used at the onset of the illustration process, assure that policy values computed during the illustration process will in most cases ultimately comply with regulatory definitions of insurance during the first round of computations.

In Block 646, Compute Specified Amount, the system uses the guideline values previously computed to calculate a Specified Amount. The Specified Amount is the amount that the insurance company will pay the beneficiary upon the death of the insured. In most states the Specified Amount must by law appear on page three of a life insurance policy. The Specified Amount is a common life insurance variable and is equal to the basic, stated policy death benefit (the face amount of the policy). The policy death benefit will remain equal to the Specified Amount until such time as changes in cash value cause it to change. Withdrawals of cash value or cash value growth may cause a decrease or increase in the death benefit. Returning now to another branch of the logic, if the answer to the question "Riders Present?" is "Yes," the system moves to 648 Compute 1st Premium Trial Guideline for Base Policy. With Riders present, the system calculates the Trial Guidelines and Premium amounts first for the base policy as previously described for a policy with no riders, then computes a Trial Guideline amount including the rider(s) in Block 650, then computes a Specified Amount including combined Rider and Base Policy values in Block 652, Compute Specified Amount w/Riders.

Then, in Block 654, Iterate on Target Value: Death Benefit, Cash Value or Premium, the system enters into an iterative illustration loop used to solve for the target value, refining its initial guesses as to Premium Guideline Amounts and Specified Amount, moving to FIG. 37F-1. In order to solve for these policy values the system computes additional guesses, and tests those guesses iteratively until it finds the appropriate target value. This kind of iteration is required because of the non-linear nature of universal life insurance policy values, as many of the policy values being solved for will have no closed form solution. Once the system has solved initial illustration and has a Premium and Specified Amount combination that corresponds to the target value, it saves it in Block 656, Save Specified Amount, Premium.

Next, in Block 658, Compute Guideline Single Premium for Base Policy, the system makes another illustration, this time calculating a Single Premium amount for the Base Policy assuming Guaranteed Carrier policy values, and corresponding to the Specified Amount previously computed in Block 656.

Moving now to FIG. 37B-5, in Block 644, Set Guideline Single Premium for Base Policy Equal to Premium variable, the system makes this equivalency, then in Block 666, Store, saves the information. Next in Block 670, Compute Guideline Level Premium for Policy, the system uses the aforementioned Specified Amount as the target value, and then finds the level annual premium amount, payable over the entire time of the illustration's duration and assuming guaranteed policy values, that would yield that Specified Amount. In Block 672, Store, the system saves this premium amount as well.

At Block 674, Riders Present, the system once again determines whether riders are present. If not, the system moves on to FIG. 37B-6. If so, the system moves on to Block 676, Compute Guideline Single Premium for Policy Including Riders. The calculation here is the same as that made in Block 658 except that this computation includes in the Specified Amount whatever additional coverage is provided for under the rider. In Block 678, Set Guideline Single Premium for Total Policy Equal to Premium Variable, the equivalency is made and the value is stored in Block 680. Similar steps are taken to compute values for the Guideline Level Premium including riders in Blocks 682 and 684. This value is stored in 686.

Moving on to FIG. 37B-6, Block 692, Recompute Specified Amount using Guideline Values, the system recomputes the Specified Amount, originally computed in Block 654, and saved in Block 656, this time using the Guideline Premium amounts computed in Blocks 658, 668, 676 and 682 if riders are present. The Specified Amount so calculated in Block 692 is then compared in Block 694 to the previously calculated Specified Amount. In Block 696, Are Two Amounts Equal?, the system tests for equivalency. If the answer is "Yes," then the Specified Amount lies within actuarially defined regulatory guidelines for life insurance, and the system moves on to FIG. 37B-7. If the two values are not equal, the system in Block 698, First Pass, determines whether or not this is the first attempt at an illustration. If the answer is "No," the system determines whether the Premium Values are equal in Block 700. If the answer is "No," once again the system returns to either Z4 or Z5 depending on whether or not Riders are found to be present in Block 701. Both Z4 and Z5 are entry points for the illustration system in FIG. 37B-4.

If the two Specified Amounts are not equal in Block 696 and if this is not the first pass for the system in Block 698, the system returns to Z4 in the event that riders are present, and Z5 in the event that they are not, in Block 701.

Once the system has solved for the correct premium/cash value combination and has tested this value against regulatory requirements, the system carries out four other operations in FIG. 37B-7. First, it prepares a further illustration in Block 708. This illustration assumes that the policyholder pays the previously determined premium amount and maintains the desired death benefit. However, the illustration further assumes that the carrier pays only the minimum guaranteed interest crediting rate on policy cash value, and charges the maximum mortality charges possible under the terms of the insurance contract. Samples of these Guaranteed Values appear in Specimen 10.

Next, the system in Block 710 computes two policy cost indices designed to provide the prospective applicant with a bench mark for measuring product performance. The first index is the Surrender Cost Index which is 1000 times the present value of premiums paid discounted at five percent minus the present value of the end-of-period cash value divided by the present value of the death benefits. The second index, known as the Net Payment Cost Index, is equal to 1000 times the ratio of the present value of the premiums discounted at five percent to the present value of the death benefits over the period discounted at five percent. The system calculates these two indices through Years 10 and 20 of the policy illustrated, assuming current interest and mortality charges apply, and assuming guaranteed interest and mortality charges apply. Sample calculations of these cost indices appears on the last page of Specimen 16.

After the aforementioned analyses have been completed, the system saves the results in Block 712 for later printing. This completes the illustration for a particular financial product. Next, the system checks to see if it needs to make a similar computation for other products. If in Branch 656 it finds that not all desired products have been illustrated by comparing a target number of products to be illustrated with a counter, the system increments the counter in Block 714 and returns to FIG. 37B-4 to initiate another illustration.

Otherwise, the system tests whether more than one product has been illustrated (J>1), and if so, proceeds to Block 722 to find the best product based on the criteria entered in Block 592. In either case, the logic goes to Block 724 to store the insurance product specific data for an illustration.

Next in Block 726, Comparative Analysis, the system asks the user if he or she would like to see a comparison of the best policies. If the answer is "Yes," the system moves to FIG. 37B-9 and otherwise, the system goes to FIG. 37B-8.

Turning to FIG. 37B-8 at Block 666, the values relevant to the computation of an illustration are generated, then displayed at the user's terminal in Block 668, and stored in the Database 17. The user can select a number of options: Print Illustration? 672, which will print the information on the Local Printer 5 via Block 674; Print and Mail Illustration? 676, which will print the illustration on the Central Printer 9 for mailing to a requested address via Block 678; and Make Application Using This Illustration? 680, which merges illustration data with stored text to make an application form, in Block 682. Block 670 also will save the illustration results for further analysis or review. The logic returns to the submenu provided by Block 560 in FIG. 36. This return is helpful for changing the illustration assumptions in order to see a different version of the illustration.

Turning to FIG. 37B-9, a schematic representation of the comparative analysis function is shown. In Block 750, prepare J≦5 Best Illustrations, the system creates the illustration from the values stored in Block 724. Then, in Block 751, those values are printed side by side for comparison by the user. The system returns to the subroutine that called it.

Returning to FIG. 36, the Update Existing Illustration 566 function goes to FIG. 37C-1, which commences with Select Input Menu 752. This selection is depicted in User Screen 34, which is also known as the Update Existing Illustration Supermenu.

The logic then goes to the following boxes: Block 754 to update the prospective applicant data, including personal, employment, and health data; and Block 756 to update the insurance data, including the premium structure, as well as the policy selection. These Blocks 754-756 permit the user to revise selected data in Database 17. Once the menu item has been selected and the update screen has been visited, Block 768 is used to facilitate going to the appropriate screen. The screens are filled in with the old data, and in Block 770 the user is allowed to change, add to, or delete from any of the existing data. Block 770 then returns to Block 752. When the user has gone through this loop as many times as necessary to update whatever screens need updating, from Block 752, the choice of Proceed, Block 758 can be made. The illustration process then proceeds to FIG. 37B-4, which then completes the illustration.

Additionally, the user may select Help, Block 18, which has been previously mentioned as being available from any screen in the system from the Update Existing Illustration Supermenu. A representative context-sensitive hypertext Help screen is shown in User Screen 35.

Lastly, Block 762 may be selected to quickly terminate the current illustration session and return to the Main Menu, 44, via Entry Point X4. The user is given an opportunity at this time to save what data has been entered thus far.

With further reference to FIG. 36, the Print Life Insurance Application 570 selection goes to FIG. 37D-1. Block 774 selects one form from a variety of insurance forms that could be printed, depending on the carrier. The logic proceeds to Block 776, which retrieves the existing prospective applicant data from Database 17, which was solicited in the process of creating the illustration, and prefills the insurance application form. If necessary, Block 778 allows the user to fill in any additional data. Then Block 780 prints the application at Local Printer 5. The logic proceeds to Block 782 which requests whether or not to send the application to the carrier electronically. If that answer, in fact, is "No," the logic goes to Return 752. If the answer is "Yes," Block 784 checks for completeness and permits sending the application to the Carrier via Block 786. Block 788 saves the insurance policy data and then returns to Block 570 in FIG. 36.

Review Insurance Product Developments 572 in FIG. 36, permits the user to read through prepared textual data by allowing the user to move from screen-to-screen. Once the user has completed a review of the data from Database 17, one or all of the textual screens or "pages" can be printed at the Local Printer 5.

More particularly, for Review Insurance Product Developments 572 in FIG. 36, the logic goes to FIG. 37E-1. In Block 792, new insurance product developments are retrieved and displayed for the user. Block 794 allows the new insurance product developments to be printed on the Local Printer 5, if desired, and then the logic returns to Block 572 on FIG. 36.

FIG. 37F-1 provides a schematic representation of the system's life insurance values computation and testing activities. In Block 800, Compute Insurance Values Using Specified Insurance Parameters, the system takes those values for Specified Amount, Premium, and targets from the subroutine that called it, and produces an illustration. Then, in Block 802, Target(s) Are Met, the system tests the value against the requested target, for example, death benefit or cash value. If the answer is "Yes" in Block 808, Store Premium Amount, LIFPAY, the system stores the Premium Amount associated with this illustration and returns to the subroutine that called it.

If, on the other hand, the answer to the above question is "No," the system goes on to determine in Block 804, First Trial, whether this is the first attempt at the computation. If the answer is "Yes," then the system generates a guess value in Block 806, Generate New Trial, and returns to Block 800 to make an additional computation. If, on the other hand, the answer to the question in Block 804 is "No," then the system moves to Block 810, Does this Trial Bracket?, where the system tests to see whether two values have been identified that lie above and below (i.e., bracket) the target value. If the answer is again "No," then the system moves to Block 806, Generate New Trial, thereby returning to Block 800 to generate an additional value.

If the answer to the question asked in Block 810 is "Yes," and the system has found two values above and below the Target value, the system next checks to see if the system has attempted an interpolation using three values, in Block 812, First Interpolation?. If the answer is "Yes," then the system uses Bisection to Interpolate the values in Block 814, Bisection Interpolation. Otherwise, in Block 816 the system uses Weighted Interpolation to arrive at an additional value.

In this manner, by iteratively interpolating between guess values and throwing out old guesses, the system converges rapidly on the desired value, and, having found it, returns the desired value to the subroutine that called it.

B. Discussion of Database Structures

FIG. 4 provides a depiction of a relational Database 17 for the present invention. The description of the relational Database 17 includes numbered entity (database table) definitions and detailed descriptions of the columns (fields) present and their characteristics. NOT NULL specifies that a column is required to be filled, and TYPE designates the type of data that this column contains. The following table definitions parallel the above entity definitions and detail the columns (fields) present and their characteristics.

ADDITIONAL_RESPONSES 900 has records of additional responses made by the prospective applicant to questions that appear on an insurance application form that were not solicited during the illustration process.

| Name | Null? | Type |
| --- | --- | --- |
| APPLICATION_ID | NOT NULL | NUMBER |
| REQUEST_ID | NOT NULL | NUMBER |
| R_ORDER | NOT NULL | NUMBER |
| RESPONSE | | CHAR (255) |
| WP_FLDNUM | | NUMBER |

ALLOWED_RESPONSES 977 is a database entity holding information of permitted responses in the health questionnaire. Answers are used in identifying preferred risk applicants.

| Name | Null? | Type |
| --- | --- | --- |
| REQUEST_ID | NOT NULL | NUMBER (8) |
| R_ORDER | NOT NULL | NUMBER (8) |
| VALUE | | CHAR (20) |
| REC_ORDER | NOT NULL | NUMBER (3) |
| NEXT_REQUEST | | NUMBER (8) |

APPLICATION 902 is a super entity which holds the various insurance applications 902A (each specific type of application is a view or instance of this table). These application records are built on information contained in the illustration, as well as supplemental information supplied by the prospective applicant (e.g., provided in ADDITIONAL_RESPONSES 900). There is one APPLICATION 902 record for every application created for a prospective applicant.

| Name | Null? | Type |
| --- | --- | --- |
| APPLICATION_ID | NOT NULL | NUMBER |
| APPLICATION_TYPE | | CHAR (10) |
| THEPI_APPLICATION | | NUMBER |
| ILLUSTRATION_ID | | NUMBER |
| PAPER_FORM_ID | | NUMBER |
| STATUS | | CHAR (9) |

COI SET 970 is a data entity used to store information regarding special mortality data that an employer may have negotiated with a carrier as part of a corporate-sponsored program.

| Name | Null? | Type |
| --- | --- | --- |
| COI_SET_ID | NOT NULL | NUMBER (8) |
| SPONSOR_ID | | NUMBER (8) |
| MORT_SET_NAME | NOT NULL | CHAR (30) |
| MORT_SET_TYPE | NOT NULL | CHAR (1) |
| MORT_CONVERSION_METHOD | | CHAR (1) |

CORPORATE SPONSOR GUARANTEE 964 is a data entity used to store information regarding the Corporate sponsor including information regarding eligibility requirements and contact information.

| Name | Null? | Type |
| --- | --- | --- |
| CS_ID | NOT NULL | NUMBER (8) |
| INSTITUTION_ID | NOT NULL | NUMBER (8) |
| INSURANCE_PACKAGE_ID | NOT NULL | NUMBER (8) |
| CONTACT_ID | NOT NULL | NUMBER |
| CODE | NOT NULL | CHAR (8) |
| ELIG_REQ | | CHAR (255) |

CORPORATE SPONSOR OFFICER 928 is used to store information needed to identify those individuals permitted to use the system to offer corporate sponsored quotes.

| Name | Null? | Type |
|---|---|---|
| INSTITUTION_OFFICER_ID | NOT NULL | NUMBER |
| INSTITUTION_OFFICER_TYPE | | CHAR (30) |
| LAST_NAME | | CHAR (50) |
| FIRST_NAME | | CHAR (30) |
| INSTITUTION_ID | | NUMBER |
| PHONE | | NUMBER (10) |
| PHONE_EXTENSTION | | NUMBER |
| STATUS | | CHAR (10) |
| ACCOUNT_NAME | | CHAR (30) |
| PRIVS | | CHAR (10) |
| PRINTER_DRIVER | | CHAR (20) |
| GENERIC | | CHAR (1) |

The EMPLOYMENT 912 entity contains the employment data for the prospective applicant requesting an illustration, such as place of employment, salary, etc.

| Name | Null? | Type |
|---|---|---|
| EMPLOYMENT_ID | NOT NULL | NUMBER |
| EMPLOYER_ID | | NUMBER |
| PERSON_ID | | NUMBER |
| OCCUPATION | | CHAR (30) |
| TITLE | | CHAR (30) |
| PHONE | | NUMBER (10) |
| PHONE_EXTENSION | | NUMBER |
| SALARY | | NUMBER |
| GENERIC | | CHAR (1) |

FINANCIAL_INDEX_DESC 971 is a database entity used to track special indexes used by the system illustrating insurance products. Some policies use a particular financial index, the average rate for T-Bills or Moody's Baa Bond rate for example, as a means of calculating the policy crediting rate. This database structure stores the index name and code.

| Name | Null? | Type |
|---|---|---|
| INDEX_CODE | NOT NULL | CHAR (3) |
| INDEX_NAME | | CHAR (50) |

FINANCIAL_INDEX_VALUES 970 is a database entity employed by the system to store the index values for the Financial Index described in FINANCIAL_INDEX_DESCRIPTION 971.

| Name | Null? | Type0 |
|---|---|---|
| INDEX_CODE | NOT NULL | CHAR (3) |
| VALUE | | NUMBER (7, 4) |
| BEGIN_DATE | NOT NULL | DATE |
| END_DATE | | DATE |

The FMA_HELP 914 entity contains all context sensitive, hypertext linked help records for Help 18. It contains context keywords, and hyperlink keywords in addition to the help text that enables these features.

| Name | Null? | 1Type |
|---|---|---|
| FACILITY | NOT NULL | NUMBER (4) |
| TOPIC | NOT NULL | CHAR (30) |
| LINE | NOT NULL | NUMBER (5) |
| TEXT | | CHAR (80) |

The HEALTH_QUESTION 916 entity contains the individual questions that comprise a specific health questionnaire. Depending on the question and questionnaire, a specific question may appear in multiple health questionnaires.

| Name | Null? | Type |
|---|---|---|
| HEALTH_QUESTION_ID | NOT NULL | NUMBER |
| HEALTH_QUESTION_TYPE | | CHAR (30) |
| SEQUENCE_NUMBER | | NUMBER |
| QUESTION_LINE1 | | CHAR (70) |
| QUESTION_LINE2 | | CHAR (70) |
| QUESTION_LINE3 | | CHAR (70) |

The HEALTH_QUESTION_RESPONSE 918 entity contains the responses to the health questions by the prospective applicant. It contains responses to all of the health questions, be they simplified or medical underwriting types.

| Name | Null? | Type |
|---|---|---|
| HEALTH_QUESTION_RESPONSE_ID | NOT NULL | NUMBER |
| PERSON_ID | | NUMBER |
| HEALTH_QUESTION_ID | | NUMBER |
| RESPONSE | | CHAR (1) |
| REMARK | | CHAR (255) |
| CREATE_DATE | | DATE |
| CHANGE_DATE | | DATE |

An ILLUSTRATION 922 is a document (both hard copy and database record) that is produced for a PERSON 952 (prospective applicant). Multiple illustrations may be produced for a single prospective applicant illustrating various insurance selections, but each illustration pertains to a single prospective applicant (or joint applicants). Any illustration may result in an insurance and loan application. The ILLUSTRATION 922 entity contains both data and pointers to data for all aspects of an illustration.

| Name | Null? | Type |
|---|---|---|
| ILLUSTRATION_ID | NOT NULL | NUMBER (8) |
| ILLUSTRATION_TYPE | | CHAR (10) |
| ILLUSTRATION_DATE | | DATE |
| STATUS | | CHAR (10) |
| PERSON_ID | | NUMBER (8) |
| PERSON_DOB | | DATE |
| PERSON_SALARY | | NUMBER (10, 2) |
| PERSON_INTEREST_DIVIDENDS | | NUMBER (10, 2) |
| PERSON_OTHER_INCOME | | NUMBER (10, 2) |
| COPERSON_ID | | NUMBER (8) |
| COPERSON_DOB | | DATE |
| COPERSON_SALARY | | NUMBER (10, 2) |
| COPERSON_INTERST_DIVIDENDS | | NUMBER (10, 2) |
| COPERSON_OTHER_INCOME | | NUMBER (10, 2) |
| TAX_RATE | | NUMBER (4, 2) |
| PRIN | | NUMBER (10, 2) |

-continued

| Name | Null? | Type |
|---|---|---|
| INSURANCE_PACKAGE_ID | | NUMBER (8) |
| INSURANCE_CARRIER_ID | | NUMBER (8) |
| INSURANCE_AGENT_ID | | NUMBER (8) |
| UNDERWRITING_TYPE | | CHAR (30) |
| HEALTH_ANY_YESES | | CHAR (1) |
| INSURANCE_RATE | | NUMBER (7, 4) |
| CS_ID | | NUMBER (8) |
| LOC_ID | | NUMBER (8) |
| LOC_CONTACT_ID | | NUMBER (8) |
| DEATH_BENEFIT | | NUMBER (10, 2) |
| CLOSING DATE | | DATE |
| LIFPAY | | NUMBER (8, 2) |
| LNUM | | NUMBER (2) |
| SA | | NUMBER (10, 2) |
| CV_10 | | NUMBER (10, 2) |
| CV_20 | | NUMBER (10, 2) |
| THEPI_USER_ID | | NUMBER (8) |
| MORT_GROUP_NAME | | CHAR (30) |
| QF | | NUMBER (6, 3) |
| IANC10_GUAR | | NUMBER (7, 2) |
| IANC20_GUAR | | NUMBER (7, 2) |
| NPI10_GUAR | | NUMBER (7, 2) |
| NPI20_GUAR | | NUMBER (7, 2) |
| IANC10_CURR | | NUMBER (7, 2) |
| IANC20_CURR | | NUMBER (7, 2) |
| NPI10_CURR | | NUMBER (7, 2) |
| NPI20_CURR | | NUMBER (7, 2) |
| SELECTED_INSURANCE_STATE | | CHAR (2) |
| PERSON_SMOKER_FLAG | | CHAR (1) |
| PERSON_RISK_FLAG | | CHAR (1) |
| COPERSON_SMOKER_FLAG | | CHAR (1) |
| COPERSON_RISK_FLAG | | CHAR (1) |
| MAX RATE | | NUMBER (7, 4) |

ILLUSTRATION DATA 978 is an entity used to store information from past illustrations. This permits the system to pick up where it left off in allowing the user to improve upon illustrations for PERSON 952.

| Name | Null? | Type |
|---|---|---|
| ILLUSTRATION_ID | NOT NULL | NUMBER (8) |
| YEAR | NOT NULL | NUMBER (2) |
| CV | | NUMBER (12, 2) |
| MINS | | NUMBER (12, 2) |
| CVMAX | | NUMBER (12, 2) |
| CVGIP | | NUMBER (12, 2) |
| MINSGIP | | NUMBER (12, 2) |
| LPAY | | NUMBER (8, 2) |

The ILLUSTRATION_RIDERS 924 table, also an intersection table, contains a list of all of the rider clauses required for a particular illustration.

| Name | Null? | Type |
|---|---|---|
| ILLUSTRATION_ID | NOT NULL | NUMBER (8) |
| RIDER_ID | NOT NULL | NUMBER (8) |
| BENEFIT_AMT | | NUMBER (9) |
| BENEFIT_YRS | | NUMBER (2) |

The INSTITUTION 926 entity is a super entity (like APPLICATION 902) which holds the various institution types. Each specific type of institution (e.g., INSURANCE_CARRIER) is a view of this table. There is an INSTITUTION 926 record for every institution participating in the illustration process. The INSTITUTION 926 entity is not shown on the Entity Relationship Diagram (ERD) of FIG. 38. Rather, the specific views are represented. These are:

INSURANCE_AGENT

AGENCY (not shown)

EMPLOYER/CORPORATE_SPONSOR

INSURANCE_CARRIER

The INSTITUTION_OFFICER 928 entity is a super entity (like APPLICATION 902) which holds the various institution officer types. Each specific type of institution officer (e.g., INSURANCE_AGENT) is a view of this table. There is an INSTITUTION_OFFICER record for every institution officer participating in the illustration process. The INSTITUTION_OFFICER entity is not shown on the ERD of FIG. 38. Rather, the specific views are represented. These are:

CORPORATE_SPONSOR_OFFICER

INSURANCE_AGENT

USER

| Name | Null? | Type |
|---|---|---|
| INSTITUTION_OFFICER_ID | NOT NULL | NUMBER |
| INSTITUTION_OFFICER_TYPE | | CHAR (30) |
| LAST_NAME | | CHAR (50) |
| FIRST_NAME | | CHAR (30) |
| INSTITUTION_ID | | NUMBER |
| PHONE | | NUMBER (10) |
| PHONE_EXTENSION | | NUMBER |
| STATUS | | CHAR (10) |
| ACCOUNT_NAME | | CHAR (30) |
| PRIVS | | CHAR (10) |
| PRINTER_DRIVER | | CHAR (20) |

INSURANCE CARRIER 926 is a database entity used to store information regarding each of the carriers whose products are illustrated by the system. It stores information regarding each carrier's name and address, contact, and ratings which are used in the illustration process.

| Name | Null? | Type |
|---|---|---|
| INSTITUTION_ID | NOT NULL | NUMBER (8) |
| INSTITUTION_TYPE | | CHAR (30) |
| INSTITUTION_NAME | | CHAR (50) |
| DIVISION | | CHAR (30) |
| ADDRESS_LINE1 | | CHAR (50) |
| ADDRESS_LINE2 | | CHAR (50) |
| CITY | | CHAR (30) |
| COUNTY | | CHAR (30) |
| STATE | | CHAR (2) |
| ZIP | | NUMBER (5) |
| PHONE | | NUMBER (10) |
| CONTACT_PERSON_ID | | NUMBER (8) |
| CORPORATE_SPONSOR_ID | | NUMBER (8) |
| FINANCIAL_SPONSOR_ID | | NUMBER (8) |
| MOODYS_RATING | | NUMBER (7, 2) |
| GENERIC | | CHAR (1) |

INSURANCE_EXPBRK 974 is a database entity used to store information regarding life insurance cash value breakpoints. Breakpoints are levels of cash value which trigger changes in policy charges.

| Name | Null? | Type |
|---|---|---|
| EXPBRK_ID | NOT NULL | NUMBER (8) |
| LEXP_ID | NOT NULL | NUMBER (8) |
| LEXPBRK | NOT NULL | NUMBER (8, 2) |

INSURANCE_LPCT 973 is a database entity used to store information regarding the percentage of premium charges applied by the carrier for a given product.

| Name | Null? | Type |
|---|---|---|
| LPCT_ID | NOT NULL | NUMBER (8) |
| BEGIN_AGE | | NUMBER (2) |
| END_AGE | | NUMBER (2) |
| SEX | | CHAR (1) |
| SMOKING_FLAG | | CHAR (1) |
| RISK_FLAG | | CHAR (1) |
| LPCT1AF | | NUMBER (5, 2) |
| LPCT1AV | | NUMBER (5, 2) |
| LPCT1AC | | NUMBER (5, 2) |
| LPCT1BF | | NUMBER (5, 2) |
| LPCT1BV | | NUMBER (5, 2) |
| LPCT1BC | | NUMBER (5, 2) |
| LPCT2AF | | NUMBER (5, 2) |
| LPCT2AV | | NUMBER (5, 2) |
| LPCT2AC | | NUMBER (5, 2) |
| LPCT2BF | | NUMBER (5, 2) |
| LPCT2BV | | NUMBER (5, 2) |
| LPCT2BC | | NUMBER (5, 2) |
| LPCTY | | NUMBER (5, 2) |
| LPCTSA | | NUMBER (5, 2) |

INSURANCE MONTH EXPENSE 975 stores information regarding policy fixed charges like administration or selling charges levied by the carrier. Because system policy values are calculated in a monthly basis, this information is stores by policy month.

| Name | Null? | Type |
|---|---|---|
| LEXP_ID | NOT NULL | NUMBER (8) |
| MONTH | | NUMBER (3) |
| LEXPF | | NUMBER (7, 2) |
| LEXPV | | NUMBER (7, 2) |

The INSURANCE_PACKAGE 930 entity details the insurance packages available to be chosen for an illustration—the rates, duration, etc. This list can be viewed during the illustration process.

| Name | Null? | Type |
|---|---|---|
| INSURANCE_PACKAGE_ID | NOT NULL | NUMBER (8) |
| BEGIN_DATE | | DATE |
| END_DATE | | DATE |
| POLICY_NAME | | CHAR (50) |
| INSURANCE_CARRIER_ID | | NUMBER (8) |
| PREMIUM_PAYMENT_STRUCTURE | | CHAR (50) |
| POLICY_TYPE | | CHAR (50) |
| POLICY_TERM | | NUMBER (3) |
| INLP | | NUMBER (7, 4) |
| INSP | | NUMBER (7, 4) |
| IC1 | | NUMBER (7, 4) |
| IC2 | | NUMBER (7, 4) |

-continued

| Name | Null? | Type |
|---|---|---|
| ICBREAK | | NUMBER (7, 4) |
| IC_GUIDE_GUARANTEE | | CHAR (1) |
| IC_MIN_INT_GUARANTEE | | CHAR (1) |
| QX_GUIDE_GUARANTEE | | CHAR (1) |
| QX_MIN_INT_GUARANTEE | | CHAR (1) |
| ICL | | NUMBER (7, 4) |
| IL | | NUMBER (7, 4) |
| CURRENT RATE | | NUMBER (7, 4) |
| GUARANTEED_RATE | | NUMBER (7, 4) |
| MAX_CHANGE_RATE | | NUMBER (7, 4) |
| UNDERWRITING_TYPE | | CHAR (30) |
| CSO_TABLE_NAME | | CHAR (30) |
| CSO_DEFAULT_BLEND | | NUMBER (5, 2) |
| CSO_SMOKE_AGGR_FLAG | | CHAR (1) |
| PAPER_FORM_ID | | NUMBER (4) |
| GENERIC | | CHAR (1) |
| CV_RATIO | | NUMBER (7, 4) |
| COMMIT_DAYS | | NUMBER (3) |
| INDEX_CHANGE_TOL | | NUMBER (7, 4) |
| INDEX_FROM_MONTH | | NUMBER (2) |
| INDEX_TO_MONTH | | NUMBER (2) |
| INDEX_CODE | | CHAR (3) |
| TRATE | | NUMBER (7, 4) |
| TEXP | | NUMBER (7, 4) |
| TLOAD | | NUMBER (5, 2) |
| QXG_TABLE_NAME | | CHAR (30) |
| QXG_APPROX_FLAG | | CHAR (1) |
| IC1_INCR | | NUMBER (7, 4) |
| IC2_INCR | | NUMBER (7, 4) |
| LEXPSELL | | NUMBER (7, 2) |
| ANNUITY_ID | | NUMBER (8) |
| EXPBRK_ID | | NUMBER (8) |
| GUARANTEE_MONTHS | | NUMBER (2) |
| CSO_BLEND_ID | | NUMBER (8) |
| LPCT_ID | | NUMBER (8) |
| LPCT_AGE_FLAG | | CHAR (1) |
| LPCT_SEX_FLAG | | CHAR (1) |
| LPCT_SMOKING_FLAG | | CHAR (1) |
| LPCT_RISK_FLAG | | CHAR (1) |
| QXG_TYPE | | CHAR (1) |
| QXG_MORT_CONVERSION_METHOD | | CHAR (1) |
| COI_SET_ID | | NUMBER (8) |
| QXG_SMOKE_AGGR_FLAG | | CHAR (1) |
| CV_LOAN_INT_FLAG | | CHAR (1) |

MORT 962 tabulates mortality figures (either in strict deaths per thousand or cost of insurance). While the common mortality tables (CSO and the like) and the product specific Cost Of Insurance (COI) tables are essentially the same, there are some differences.

Both conceptual tables are housed inside one relational database table structure (MORT 962) to allow for ease of access. The relational table's structure for the MORT 962 table follows:

| Name | Null? | Type |
|---|---|---|
| GROUP_NUMBER | NOT NULL | NUMBER (8) |
| AGE_OF_ISSUE | | NUMBER (2) |
| YEAR_AGE | NOT NULL | NUMBER (3) |
| MONTH | | NUMBER (2) |
| MORTALITY | NOT NULL | NUMBER (9, 5) |

The MORT 962 table is organized into groups of records, each group having the same GROUP_NUMBER. A group is a "Mortality Table." Each combination of the following attributes will reference a GROUP_NUMBER:

Male/Female
Smoking/Non-smoking/Aggregate
Age last/Age nearest
Insurance Product
CSO table/COI table A GROUP_NUMBER may be used by any combination. Therefore, for a particular Group (mortality table), for example, the 1980 CSO table for Male/Non-smoking/Age last (no product designation in this case), there are records for ages 18 through 99 as shown below:

| GROUP_NUMBER | AGE_OF_ISSUE | YEAR | MORTALITY |
|---|---|---|---|
| 1 | NULL | 18 | 12.0 |
| 1 | NULL | 19 | 20.0 |
| . | . | . | . |
| . | . | . | . |
| 1 | NULL | 99 | 1000.0 |

Note that in the case of the CSO tables, there is nothing in the AGE_OF_ISSUE column (NULL). So, to reference the CSO Group that corresponds to Male/Non-smoking/Age last, the system retrieves all records for GROUP_NUMBER+1.

To satisfy all combinations of the above attributes for the CSO tables (Male/Female, Smoking/Non-smoking/Aggregate, Age last/Age nearest) there are as many as 12 groups, each group having entries for ages 18 through 99 years of age. Thus, there will be 82 (i.e., 99−18+1) rows (i.e., records) in each group, one for each year of age, times each of the 12 combinations, resulting in 984 records for the collection of all 12 CSO groups. Like the common mortality groups (mortality tables), the COI groups are organized by GROUP_NUMBER. The GROUP_NUMBER in this case segregates groups not only by sex, smoking, etc., but also by insurance product. But unlike the common mortality tables, there is a sub-group structure to the CSO table based on the prospective applicant's age at the time of policy issue. There is a special "sub-table," selected by the prospective applicant's age, as designated by the AGE_OF_ISSUE column, that is used for the first $Y_s$ years. The AGE_OF_ISSUE entry specifies the select versus ultimate portions of the mortality table. If the AGE_OF_ISSUE column is NULL, then that series of records correspond to the ultimate series within that particular insurance product group. The CSO mortality table, then, is a standard mortality table with $Y_s=0$ (i.e., no select entries).

One further difference is that the year/age column designates age of the insured for ultimate groups, but designates year of policy for select groups.

An applicant's cost of insurance will be determined by selecting the rows corresponding to a particular group number (which may be for a specific insurance product and a specific collection of attributes such as sex, smoker, etc.) for the applicant's AGE_OF_ISSUE. There will be typically 10 or less rows ($Y_s$) within a particular AGE_OF_ISSUE sub-group. For years beyond the $Y_s$ years, the ultimate group is used, which is retrieved by selecting the rows for this GROUP_NUMBER whose AGE_OF_ISSUE is NULL and whose "year/age" entries are AGE_OF_ISSUE+$Y_s$ and greater.

An example of a COI group is given below:

| GROUP_NUMBER | AGE_OF_ISSUE | YEAR | MORTALITY |
|---|---|---|---|
| 5 | 35 | 1 | 12.0 |
| 5 | 35 | 2 | 20.0 |
| . | . | . | . |
| . | . | . | . |
| 5 | 35 | 10 | 100.0 |
| . | . | . | . |
| . | . | . | . |
| 5 | 40 | 1 | 22.0 |
| 5 | 40 | 2 | 50.0 |
| . | . | . | . |
| . | . | . | . |
| 5 | 40 | 10 | 500.0 |
| . | . | . | . |
| . | . | . | . |
| 5 | NULL | 10 | 2.0 |
| 5 | NULL | 11 | 5.0 |
| . | . | . | . |
| . | . | . | . |
| 5 | NULL | 99 | 1000.0 |

The above shows two of the select sub-groups (for age of issue 35 and 40) for COI group 5, as well as the ultimate group (age of issue=NULL) for COI group 5. (Subgroups will be present for all possible AGE_OF_ISSUE values).

The COI group 5 may be used by any insurance product. This association of product to group (mortality table) is managed by the MORT_REGISTER 960 table.

THE MORT SELECTOR 960 entity documents the association of group numbers with various combinations of prospective applicant attributes and insurance products.

| Name | Null? | Type |
|---|---|---|
| MORT_SET_NAME | NOT NULL | CHAR (30) |
| STATE | | CHAR (2) |
| SEX | NOT NULL | CHAR (1) |
| SMOKING | NOT NULL | CHAR (1) |
| RISK | | CHAR (1) |
| GROUP_NUMBER | NOT NULL | NUMBER (8) |
| DESCRIPTION | | CHAR (255) |
| YS | | NUMBER (2) |
| AGE_TYPE | NOT NULL | CHAR (1) |
| MORT_TYPE | NOT NULL | CHAR (1) |
| BEGIN_DATE | NOT NULL | DATE |
| END_DATE | NOT NULL | DATE |

This table documents the association of group numbers with the various combinations of attributes possible:

Male/Female
Smoking/Non-smoking/Aggregate
Age last/Age nearest
Insurance Product
CSO table/COI table
For example:

| GROUP_NUMBER | YS | GROUP_NAME | DESCRIPTION |
|---|---|---|---|
| 1 | 0 | CSO-M-N-AL | CSO table Male/Non-smoking/Age last |

-continued

| GROUP_NUMBER | YS | GROUP_NAME | DESCRIPTION |
|---|---|---|---|
| 2 | 0 | CSO-F-N-AL | CSO table Female/Non-smoking/Age last |
| 3 | 0 | CSO-M-S-AL | CSO table Male/Smoking/Age last |
| . | . | . | . |
| . | . | . | . |
| . | . | . | . |
| 100 | 8 | METRO-117 | Metro 117 table; Male/Non-smoking/Age last, commonly used by sponsored policies |

The "description" data in MORT_REGISTER 960 is simply that. It describes the attributes of each table for use in managing the system. During the illustration process the system uses another database entity to select which of the MORT_REGISTER 960 tables are applicable to a particular product. The actual logical selection of which table is to be used for each combination is accomplished by entries in the INSURANCE_PACKAGE 930 table, which describes in detail each insurance product available to the system, and which, through its associated detail tables, points to the particular MORT_REGISTER 960 Groups to be used, for each sex/smoking/etc. combination, in illustrating that particular product, referring to each group by its GROUP_NAME.

NEW INSURANCE DEV 968 entity describes the information regarding new product developments that is broadcast to users through the system.

| Name | Null? | Type |
|---|---|---|
| INSURANCE_CARRIER_ID | NOT NULL | NUMBER (8) |
| INPUT_DATE | NOT NULL | DATE |
| DEV_TEXT | NOT NULL | LONG |

The PAPER_FORM 946 entity describes the individual paper form for the specific insurance application forms, illustration forms, and health questionnaires used by the system. It holds global information regarding the form (e.g., WordPerfect merge file name). It is pointed to by the individual PAPER_FORM_ITEM.

| Name | Null? | Type |
|---|---|---|
| PAPER_FORM_ID | NOT NULL | NUMBER |
| PRIMARY_MERGE_FILE | | CHAR (30) |
| STARTING REQUEST ID | | NUMBER |

A PERSON 952 (applicant) is defined as a person or husband/wife couple who collectively request an illustration. A PERSON 952 file may contain two insureds. Two insureds could have, for example, two separate policies with coverage proportional to their share of the combined household income. Two insureds may own a single policy. A single policy option for two insureds includes a joint and survivor policy wherein death benefits are paid upon the death of the second insured to die, and a policy with a spousal rider which pays a death benefit on the death of the first insured. Each PERSON 952 may have requested multiple illustrations.

| Name | Null? | Type |
|---|---|---|
| PERSON_ID | NOT NULL | NUMBER |
| PERSON_TYPE | | CHAR (10) |
| LAST_NAME | | CHAR (50) |
| FIRST_NAME | | CHAR (30) |
| MIDDLE_NAME | | CHAR (30) |
| ADDRESS_LINE1 | | CHAR (50) |
| ADDRESS_LINE2 | | CHAR (50) |
| CITY | | CHAR (30) |
| STATE | | CHAR (2) |
| ZIP | | NUMBER (5) |
| PHONE | | NUMBER (10) |
| DOB | | DATE |
| DATE_OF_DEATH | | DATE |
| SEX | | CHAR (1) |
| MARITAL_STATUS | | CHAR (10) |
| EMPLOYMENT_STATUS | | CHAR (10) |
| INTEREST_DIVIDENDS | | NUMBER |
| OTHER_INCOME | | NUMBER |
| INCOME_TAX_RETURN_TYPE | | CHAR (10) |
| THEPI_USER_ID | | NUMBER |
| STATE_OF_RESIDENCE | | CHAR (2) |
| STATE_OF_EMPLOYMENT | | CHAR (2) |
| SSN | | CHAR (2) |
| HEIGHT_FEET | | NUMBER |
| HEIGHT_INCHES | | NUMBER |
| US_CITIZEN | | CHAR (1) |
| WEIGHT | | NUMBER |
| COUNTY | | CHAR (30) |
| SMOKER_FLAG | | CHAR (1) |
| RISK_FLAG | | CHAR (1) |

PRODUCT LICENSE STATE 972 is the database entity for storing information as to whether or not a particular PRODUCT is licensed in a given state.

| Name | Null? | Type |
|---|---|---|
| PRODUCT_ID | NOT NULL | NUMBER (8) |
| STATE | NOT NULL | CHAR (2) |

REQUESTED RESPONSES 976 is the database entity for storing that information to which the Health Questionnaire answers are compared in evaluating the health of an initial applicant. The data is stored as a table.

| Name | Null? | Type |
|---|---|---|
| REQUEST_ID | NOT NULL | NUMBER (8) |
| R_ORDER | NOT NULL | NUMBER (3) |
| TABLE_NAME | | CHAR (30) |
| COLUMN_NAME | | CHAR (30) |
| PRE_CONDITION | | CHAR (30) |
| PROMPT1 | | CHAR (60) |
| PROMPT2 | | CHAR (60) |
| PROMPT3 | | CHAR (60) |
| PROMPT4 | | CHAR (60) |
| LABEL | | CHAR (10) |
| REQUIRED_FLAG | | CHAR (1) |
| WP_FLDNUM | | NUMBER |
| EDIT_ATTRIB | | CHAR (30) |

The RIDER 956 entity describes the insurance riders available for use in the illustration process. A policy rider is an amendment attached to a policy that modifies the conditions of the policy by expanding, or decreasing its benefits or excluding certain conditions from coverage. Typical examples of policy riders include disability income riders which pay a benefit equal to the mortgage cost in the event the insured(s) are disabled and waiver of premium riders (typically used in conjunction with disability riders to waive the cost of insurance charges in the policy in the event the insured is disabled).

| Name | Null? | Type |
|---|---|---|
| RIDER_ID | NOT NULL | NUMBER |
| RIDER_TYPE | | CHAR (10) |
| RIDER_TEXT | | CHAR (255) |
| COL_SET_ID | | NUMBER (8) |
| QXG_TABLE_NAME | | CHAR (30) |
| QXG_TYPE | | CHAR (1) |
| QXG_MORT_CONVERSION_METHOD | | CHAR (1) |
| QXG_SMOKE_AGGR_FLAG | | CHAR (1) |

The UPDATE_ACTIVITY 958 entity is an internal table that is used to keep track of the dates of supervisory update and modification operations made to the various reference tables (e.g., INSURANCE_PACKAGE 930 etc.).

| Name | Null? | Type |
|---|---|---|
| UPDATE_TYPE | | CHAR (30) |
| UPDATE_DATE | | DATE |
| VALID_THRU_DATE | | DATE |

C. Discussion of Variables

The following variables, identities, and formulas show how the insurance illustrations of the kind previously described are computed in a preferred embodiment of the invention. Because these variables are used throughout the illustration process, references to how and where they are used will include multiple Figures and Blocks. Every effort, however, has been made to illustrate the flow of system logic in the description of the variables and computations.

The following variables Bwsp, Badb, Bali, Bals represent the amount of additional insurance benefits that may be purchased through the endorsement of a life insurance policy rider.

Bwsp: This variable represents the waiver of stipulated premium benefit. It is input by the user. The waiver of premium is an annual benefit payable to the insured in the event of disability of the insured, for the period during which premiums are due. The benefit should pay those premiums. It is a stipulated amount and any excess is payable to the insured. Likewise, any insufficiency is still due from the insured. This coverage does not apply to the disability of the second insured. The actual amount is limited by the policy to the total guideline premium (defined below). If the guideline premium, when determined, is smaller than Bwsp, the system must reduce the amount of the waiver of premium benefit so that it is in line with the regulatory guideline.

Badb: This is the variable for the amount of accidental death benefit purchased through a policy rider, over and above the universal life insurance death benefit. An accidental death benefit is an additional amount of life insurance payable in the event the insured individual dies in an accident. This value is a system input.

Bali: This variable represents an additional death benefit, purchased through a policy rider, as a separate additional benefit. It is payable only upon the death of the insured. This value is a system input.

Bals: This is the variable for an additional amount of life insurance, purchased through a policy rider, as an additional life insurance benefit covering the spouse of the insured. This is a means of providing, through the system, joint coverage payable on the death of the first insured.

Nwsp(min): This is the minimum number of years for which a Bwsp benefit would be paid.

Joint policy flag: This flag is set if there is to be a second insured to be covered by the insurance policy. The flag indicates to the system that a benefit is payable only on the death of the last of two individuals. The flag is also set in the event there is an additional life insurance benefit, Bals, desired for the spouse. There are two different values for this flag. If selected, the underwriting information regarding the second person, including age, sex, smoking status and health are collected by the system as well.

inlp: This is the percentage discount rate for a Guideline Level Premium (GLP).value calculation which is computed in FIG. 37B-5, Block 646. The system stores this information by product. The variable, mlp=monthly multiplier=$(1+inlp)^{1/12}$, is computed upon use of inlp.

insp: This is the discount rate, expressed as a percentage, for the Guideline Single Premium (GSP) value calculation which is computed in FIG. 337B-5, Block 646. The system stores this information by product. The variable, msp=monthly multiplier=$(1+insp)^{1/12}$, is computed upon use of insp.

The mortality table data discussed below is stored as percentages. The system stores all percentages as such. All formulas assume the fractional equivalent which is the value divided by one hundred. The stored values, however, are not generally integers.

CSO(a): All values from the Commissioner's Standard Ordinary Table, a common mortality table published in 1980, are stored in deaths per 1000 at age a. These are real numbers. The system allows up to five place accuracy after the decimal point, i.e., xxx.xxxxx.

The table, as it is used by the system, is tabulated for ages eighteen through ninety-nine. This table is used for GSP and GLP calculations in FIG. 37B-5. Block 646 and is therefore a system parameter. The system contains several versions of the 1980 CSO tables. They include: Male/Female, Smoking/Nonsmoking/Aggregate, and Age last/Age nearest. The system contains, therefore, a total of 2×3×2=12 tables. Table entries appear as a value per thousand and are used to obtain a fractional probability of death. Each product indicates whether to use the male/female tables in accordance with the sex of the insured, or whether to use a blend. If a blend is indicated, the product data table indicates the percentage male. The remainder is female. An exception table exists, by state, for each product Multiple products may be present in the system for a single carrier and all use this same exception table. However, this is not a system rule. There is not a unique exception table for every product, but a given exception table may apply to any number of products, including just one. If an entry is present, it mandates the blend percentage male to use for policies issued in that state for the product(s) referencing that table. That blend percentage will override any generic male/female or blend selection in the product. This feature is a system requirement because some states require the use of unisex tables weighted exactly in proportion with the carrier's male/female weighting of its existing insured population $A_{max}$: This is the variable for the assumed maximum survival age. This is a system parameter. Typically, it is age ninety-five or ninety-nine. For the sake of consistency, this document has assumed age ninety-nine throughout its discussion.

LEXP(n): This is the variable for per-policy expenses, in month n. The cost is independent of the premium size and the prospective applicant's characteristics. It is dependent, however, on month and Specified Amount, SA. A table exists for each product to store this information. Each table entry, for month n of the insurance period, contains two values: a fixed dollar amount, LEXPF(n), and a percentage amount expressed as cost per $1,000 of SA: LEXPV(n).

On use in FIG. 37B-4, Block 628, the system computes $$LEXP(n) = LEXPF(n) + \frac{LEXPV(n) \times SA}{1000}$$

In month one, the system adds LEXPSELL, a one time charge by product, to LEXP(n).

LPCT(n): This variable is the percent-of-premium expense charged by the carrier, in a given month n. For each product, the system develops a "table" of values, generated from parameters for that product. It likewise is used in FIG. 37B-4, Block 628.

For each combination of the criteria below which a product uses, the system contains six values. These values are reflected using flags for a particular product's criteria. LPCT1A and LPCT1B are the initial values, LPCT2A and LPCT2B are the continuing values, and LPCTY is the year number (of the policy) at the beginning of which the system switches between pairs 1 and 2.

$$LPCT\underline{x}(n) = LCPT1\underline{x}, n \leq 12 \times (LPCTY - 1)\}$$

$$= LCPT2\underline{x}, n > 12 \times (LPCTY - 1)\}$$

$$\text{for } \underline{x} = A \text{ and } B$$

LPCTSA: This variable is the break ratio, in dollars per thousand dollars of Specified Amount or basic death benefit, SA. (The formula for Specified Amount appears later in the formula description text) This is used to compute a breakpoint value for LPCT(n).

LPCTBRK=LPCTSA×SA

Then, when the equations call for applying LPCT(n) the system uses LPCTA(n) on the first LPCTBRK dollars, and LPCTB(n) on the remainder. If LPCTSA=0, there is no break and, for ease of computation, the system stores equal values for the A and B versions.

Rx(a) This variable represents the annual cost of insurance at attained age a. The data is contained in multiple tables. The data is stored by product. However, a single set of tables, with state exceptions (please see below), may service multiple products. The data is stored as real values, in terms of mortality per 1000. Wherever used in a formula in this patent application, it should be understood that the value used is the probability of dying at age a=Rx(a).

$$a = \frac{Rx(a)}{1000}.$$

This variable is used in the computation of cash value and death benefit amounts in FIG. 37B-4, Block 628.

dx(a) This is a table for the monthly cost of insurance values. It is shown as a computed value in the formulas, as computed from Rx(a). The system allows for a product to point to tables, directly, in the same structure, for example Select/Ultimate, and with the same selection criteria, sex, smoking, etc., and sponsored/unsponsored flags as Rx(a).

The following statements apply to both Rx(a) and, if present, dx(a). Every Rx and dx table in the system is in two parts, Select and Ultimate, either of which may be empty. It is rare for part two, the Ultimate Table, to be empty. The Select Table is empty more frequently. The first part is the Select table. The select table is actually a table of tables. (See also the MORT and MORT_REGISTER table discussions for additional information on Select and Ultimate tables.)

The Ultimate table has entries for attained age from $Y_s$ to 100 (maximum), that apply for those attained ages, after the first $Y_s$ years have elapsed. For example, assume $Y_s=8$, for a policy issued at attained age of 35. The system uses the entries in the Select table, for the age at issue=35, for the first 8 years, then uses the Ultimate table thereafter. The system from there on will use the entry for attained-age=43 for year 9, 44 for year 10, etc. Therefore, an important parameter stored by the system by product is which table to use. A table is described by Select/Ultimate breakpoint (in years), and the two actual tables, the first of which has two dimensions, and the second of which is a vector.

In summary, a single set of mortality tables may apply to many products, or to just one. The system tracks the tables by carrier and product. These variables are used in the computation of death benefit and cash value amounts in Block 628 of FIG. 37B-4.

The number and application of tables in each set is specified for a given set of tables by the following product-specific flags:

Smoking/Nonsmoking tables, or just Aggregate Tables.
Preferred/Nonpreferred risk tables, or no selection on risk.
Male, Female, and Unisex tables, or just Unisex tables.

The Unisex table subset includes a table to be used in other than exception states, with auxiliary tables for specific states. A system list contains specific states for which Unisex rating is required and, if so, whether to use the standard Unisex table, or the name of a special table for that state. If normally the product selects between male/female tables, the system will instead use the Unisex table if mandated for that State by state regulatory guidelines. In addition, a separate product flag indicates if the Unisex table is to be used for any sponsored applicant (guaranteed premiums). Finally, in the sponsor table, a flag indicates whether that sponsor mandates the use of the Unisex table.

The system uses a group of default tables, characterized as 1983 GAM Mortality, which is a typical mortality assumption. However, other default tables may be used at the system operator's discretion. These tables are used for illustrations when no other mortality data is listed for a product. There are four 1983 GAM tables: Male/Female nearest age, or last age Male/Female. A flag in a product record will indicate whether or not to use these mortality tables and, if so, the default male percentage to use when blending for Unisex. The system default for the state exception table that mandates unisex rating also mandates the male percentage value.

The system also allows for the input of a rating factor for high risk, separately underwritten prospective applicants, qf. Its default value is 100%. The system formulas use qf×dx (or Rx) wherever the equations use dx (or Rx). This input will not be under the prospective applicant's control. Rather, it is provided by the system owner's operations staff or the carriers staff. If rating is required, it triggers the generation of a new illustration, otherwise the same as the old illustration, except that the mortality charges will be based on a rating factor. The illustration is of a single product and will be printed by the system locally and mailed to the prospective applicant separately.

Set out below are a number of computational flags:

qx guideline guarantee flag: If set, qx is computed from Rx, or is tabular and is used for the first year instead of rxg in the guideline premium computations.

qx minimum guaranteed interest projection flag: If set, qx is computed from Rx, or is tabular and is used for the first year, instead of rxg, in the minimum guaranteed interest projection.

rxg(a): This is a special set of qx tables, the guaranteed monthly cost of insurance. Each is a simple table of values versus attained age. There is no Select table, just Ultimate. The system stores this information by product. A data set consists of a standard table product, plus special table(s) for specific states. For example, a product uses its standard rxg except for certain states. Each special state present points to a rxg table, but multiple special states may use the same special rxg table.

The table, standard or special, for each state, is actually several. Tables appear by sex, smoking/nonsmoking/aggregate, and age last/next, in parallel with the CSO tables. However, there is not a blend percentage for producing a unisex table for a state; rather, an explicit Unisex table is present, with the possibility of different tables for different states, and, again, a state flag that mandates the use of a Unisex table, overriding the product preference.

The formula below is used in refining the gLP and gSP.

A product flag, if set, indicates that the formula approximation is to be used. If so, the rxg(a) value is computed from the corresponding CSO(a) value as:

$$rxg(a) = \frac{\frac{CSO(a)}{12}}{\left[1 - \frac{11}{24}CSO(a)\right]}$$

Rwsp(a), rwsp(a) dwsp(a): These are the variables representing the current annual or monthly mortality, or monthly cost of insurance, for a waiver of stipulated premium benefit. These values selected from annual mortality (Rwsp(a)), monthly mortality (rwsp(a)), or monthly cost of insurance (dwsp(a)) are stored in tables by product. These values have the same structure as other mortality or cost of insurance tables. If a policy does not reference such a table, this benefit is not available for that particular policy.

Radb(a), radb(a), dadb(a): These are the variables representing the current annual or monthly mortality, or monthly cost of insurance, for accidental death benefit. These values selected from annual morality (Radb(a)), monthly mortality (radb(a)), or monthly cost of insurance (dadb(a)) are stored in tables by product. These values have the same structure as other mortality or cost of insurance tables. If a policy does not reference such a table, this benefit is not available.

Rai(a), rai(a), dai(a): These are the variables representing the current annual or monthly mortality, or monthly cost of insurance, for additional insurance coverage—the so-called term rider. These values selected from annual mortality (Rai(a)), monthly mortality (rai(a)), or monthly cost of insurance (dadb(a)) are stored in tables by product. These values have the same structure as other mortality or cost of insurance tables. If a policy does not reference such a table, this benefit is not available.

Ras(a), ras(a), das(a): These are the variables representing the current annual or monthly mortality, or monthly cost of insurance, for additional insurance coverage for the insured's spouse—the so-called joint term rider. These values selected from annual mortality (Rai(a)), monthly mortality (rai(a)), or monthly cost of insurance (dadb(a)) are stored in tables by product. These values have the same structure as other mortality or cost of insurance tables. If a policy does not reference such a table, this benefit is not available.

Rwspg(a), rwspg(a), dwspg(a), Radbg(a), radbg(a), dadbg(a), Raig(a), raig(a), daig(a), Rasg(a), rasg(a), dasg(a): These variables represent the guaranteed values for the correspondingly named current value riders listed above. This information is stored by product. The system allows for an arbitrary number of riders. For each illustration, a flag indicates whether a given rider applies (1) to the insured only, (2) to the spouse only, (3) to either (a) as individuals, and (b) if selected, on a joint payout basis.

CORR(a): The guideline premium corridor is the minimum insurance coverage or death benefit permissible under law. The death benefit computed in FIG. 37B-4, Block 628 is this factor times cash value. The values are expressed as a percent of cash value (e.g., 250 is 2.5 times cash value). The corridor data consists of a single table, by attained age. No male/female or other differentiation is made in the computation.

iC1, iC2, iCbreak: These flags identify current policy credited rates as a percentage policy of unloaned funds, and the breakpoint value on the dollar amount at which to switch from iC1 to iC2 by product. The system also allows for a no breakpoint case. The system computes, and then saves for use in formulas, the monthly rates:

$iC1_m = (1+iC1)^{1/12} - 1$ $iC2_m = (1+iC2)^{1/12} - 1$ iC guidline guarantee flag: If this flag is set, iC1 and iC2 are guaranteed for the first year, in guideline premium computations.

iC minimum interest guarantee flag: if this flag is set, iC1 and iC2 are guaranteed for the first year of the minimum guaranteed interest projection.

LPAY(n): This is the premium paid in month n. The system computes a first trial value as to the value for LPAY(1) in FIG. 37B-5, Block 608, then makes iterative trials as to the correct amount.

=LIFPAY, $n=1, 13, 25, \ldots, 12 \times \text{NUM}-11$

=0, otherwise

The premium is paid annually, in the beginning of each year's first month.

LBASIS(n): This is the value for cumulative premiums paid to date, including the month n. It is computed as:

$$= \sum_{r=1}^{n} LPAY(r)$$

* $a_t$: This is the variable for the insured's age in year t of the policy.

$=a_1+(t-1)$

This variable is used in equations which calculate annual amounts.

: Indicates a computation which is independent of life insurance policy size.

*: Indicates a computation which is product independent and is therefore standard for all products.

$â_n$: This variable tracks the insured's age in month n. It is used for age nearest/age last computations.

$=a_{int[(n+11)/12]}$, where int is the integer function.

* Q(t): This is the variable for the probability of death, during year t, using the 1980 CSO table, a common mortality table used in the system's regulatory compliance computations in FIG. 37B-5, Block 646. Carriers commonly use this table in the calculation of guaranteed mortality. It is computed as:

$$= \frac{CSO(a_t)}{1000}$$

* P(t): This variable represents the probability of not dying in a given year. It is computed as:

$$= 1 - Q(t)$$

* tP(t): This variable represents the probability of surviving through year t. It is computed as:

$$= \prod_{s=1}^{t} P(s), \quad t > 0$$

$$= 1, \quad t = 0$$

tPc(t) is the variable representing the probability of two individuals surviving through a given year, t. For joint and survivor policies, the system combines the values for each of two individual insureds as follows:

Qa(t) and Qb(t) are the annual CSO mortality values for each of the two people, and Pa(t), Pb(t), and tPa(t), tPb(t) are the corresponding computed values, as shown in the formula for tP(t) above. Then, defining $$tPa(1) = tPb(1) = 1, \quad t = 0$$

the system iteratively computes $$Za(t) = tPa(t-1) \times [1 \times tPb(t-1)] \times Qa(t)$$

$$Zb(t) = tPb(t-1) \times [1 \times tPa(t-1)] \times Qb(t)$$

$$Zc(t) = tPa(t-1) \times tPb(t-1) \times Qa(t) \times Qb(t)$$

$$Qc(t) = [Za(t) + Zb(t) + Zc(t)] / tPc(t-1)$$

$$tPc(t) = tPc(t-1) \times [1 - Qc(t)]$$

The iterations continue through to the max[$Na_{max}$, $Nb_{max}$]—i.e., until the youngest of the two reaches age $A_{max}$. For $t \geq t_{max}$—for values beyond the mortality table the system takes Qa(t) or Qb(t)=1. These are the same joint and survivor insurance equations that are described later in this document. The variables the tPa(t) and tPb(t) correspond to the npa and npb values discussed later.

* $N_{max}$: This variable represents the maximum number of policy years. It is computed in relation to the insured's ninety-fifth or ninety-ninth birthday, as:

$$= A_{max} - a_1 + 1$$

$N_{wsp}$: This is the variable representing the number of years that a waiver of premium benefit will be in effect. It is defined mathematically as:

$$= \min[A_{max} - a_1 + 1, \max(Nwsp(min), LNUM)]$$

For the waiver of premium benefit, the system uses $N_{wsp}$ as the $N_{max}$. The system holds all other riders to $N_{max}$ for the insured that is covered. For all 7LP computations (see below), if the $N_{max}$ for that coverage is less than 7, the system uses the $N_{max}$ as the upper limit of the denominator's summation in the guideline premium calculations set out below.

Initially, the system uses the regulatory guideline formulas to develop an estimate of the appropriate insurance to cash value relationship. The system calculates estimates of the regulatory guideline premium amounts, and uses them as a basis for computing cash value and death benefit amounts in the system in FIG. 37B-4, Block 628. The initial estimates use approximations of the Guideline Single, Guideline Level, and Guideline Seven Pay Premium amounts. The variables for these approximations, and formulas for computing them, are set out below.

gSP: This is a variable for the estimated Guideline Single Premium (GSP). The variable is calculated as a fraction of coverage, expressed in dollars. It is first calculated as:

$$\# = \frac{\sum_{t=1}^{N_{max}} \frac{tP(t-1) \times Q(t)}{(1+insp)^t}}{1 - LPCTA(1)}$$

gLP: This is the variable for the estimated Guideline Level Premium (GLP). The variable is calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{N_{max}} \frac{tP(t-1) \times [1 - LPCTA(12t-11)]}{(1+inlp)^{t-1}}}$$

7LP (or "SLP"): This is the variable for the estimated Guideline Seven Pay Premium. This variable is likewise calculated as a fraction of coverage, expressed in dollars. It is calculated as:

$$\# = \frac{\sum_{t=1}^{N_{max}} \frac{tP(t-1) \times Q(t)}{(1+inlp)^t}}{\sum_{t=1}^{7} \frac{tP(t-1)}{(1+inlp)^{t-1}}}$$

If riders are selected, the system makes a separate set of calculations to make sure that the riders that provide additional coverage for the insured likewise will meet the regulatory guidelines as to the definition of insurance. Here, the variable, $Q_{g(rider)}$ represents the guaranteed annual mortality values, Radbg(a), Raig(a) Rasg(a) for those riders offering additional term insurance benefits:

$$gSP(rider) = \left[\sum_{t=1}^{Nmax} \frac{tP(t-1)Q_{g(rider)}(t)}{(1+insp)^t}\right] / [1 - LPCTA(1)]$$

$$gLP(rider) = \frac{\sum_{t=1}^{Nmax} \frac{tP(t-1)Q_{g(rider)}(t)}{(1+inlp)^t}}{\sum_{t=1}^{Nmax} \frac{tP(t-1)[1 - LPCTA(12t-11)]}{(1+inlp)^{t-1}}}$$

Note: $LPCTA(12t-11) = 0$ for $t > LNUM$

-continued $$7LP(rider) = \left[ \frac{\sum_{t=1}^{Nmax} \frac{tP(t-1)Q_{g(rider)}(t)}{(1+inlp)^t}}{\sum_{t=1}^{7} \frac{tP(t-1)}{(1+inlp)^{t-1}}} \right]$$

SA: This is the variable for the policy's Specified Amount. The Specified Amount, a common life insurance expression, is equal to the basic, stated policy death benefit (the face amount of the policy.) The policy death benefit will remain equal to the Specified Amount until such time as changes in cash value cause it to change. Withdrawals of cash value or cash value growth may cause a decrease or increase in the death benefit. The Specified Amount appears on page three of a life insurance policy. The Specified Amount formula uses boolean logic designed to assure compliance with the regulatory guidelines. It is computed as:

$$= \max\left\{ PRIN, \frac{LIFPAY}{SLP}, \min\left[ \frac{LIFPAY}{gLP}, \frac{LIFPAY}{\left(\frac{gSP}{LNUM}\right)} \right] \right\}$$

The system records which of the three cases determined SA.

If the computation includes riders, then the above formula will change in order to take into account riders:

$$\max\left\{ PRIN, \frac{\left(LIFPAY - \sum_{rider}(7LP(rider) \times Benefit(rider))\right)}{SLP}, \right.$$

$$\min\left[ \frac{LIFPAY - \sum_{rider} gLP(rider) \times Benefit(rider)}{gLP}, \right.$$

$$\left. \left. \frac{LIFPAY - \sum_{rider} gSP(rider) \times Benefit(rider)}{\left(\frac{gSP}{LNUM}\right)} \right] \right\}$$

cx(n): This variable computes the monthly cost of insurance.

$$= \frac{\frac{Rx(\hat{a}_n)}{12}}{1 - \frac{Rx(\hat{a}_n)}{12}}$$

The variable cx(n) is computed for a prospective applicant for a product, and saved by the system. The system also allows for cx(n) to be table-driven instead of being computed as above from Rx. In this case, tables dx, as follows, are present instead of Rx.

$dx(\hat{a}_n)$: This is the monthly cost of insurance for a person of attained age a. The system uses the same kind of multiple tables with selection factors, etc., that apply to Rx, including state-dependent unisex requirements and tables. This permits carriers which have non-standard actuarial approaches to the conversion of annual mortality figures into monthly figures to use the system. In this case:

$$rx(n) = dx(\hat{a}_1)$$

The system computes mortality values differently for joint and survivor policies in Block 588. This is because such policies pay a benefit only on the last of two deaths. The system calculates the joint probability figures by first taking the existing cost of insurance values for each individual using the c(n) value defined above and converting it into a probability figures using the following formula:

$$q(n) = c(n)/[1 + c(n)]$$

Next, the system creates a combined mortality computation for both individuals using three variables:

qa(n) is the variable for the likelihood of death, q, for the month, n, for the first insured, "a."

qb(n) is the variable for the likelihood of death, q, for the month, n, for the second insured, "b."

npa(n), npb(n), npc(n) are the variables for the probability of survival through month n for person "a," person "b," and jointly, "c."

qc(n), the joint probability of death, is computed by the system as:

$$qc(n) = ['npa(n-1)qa(n) + npb(n-1)qb(n)$$
$$-npa(n-1)npb(n-1)[qa(n) + qb(n)]$$
$$-qa(n)qb(n)]]/npc(n-1)$$

In making this computation the system sets qa(n) and qb(n) equal to 1 for any n value greater than the maximum age set by the system.

Finally, in calculating the cost of insurance, the system converts qc(n) back into cost of insurance according to the formulas set by the carrier.

The cash value computations in FIG. 37B-4, Block 628 are iterative. The system starts with CV(O)=0. The cash value at the start of the contract is always equal to zero.

CVI(n): This is an intermediate value, calculated for the beginning of month n:

$$= CV(n-1) + LPAY(n) - LEXP(n) - [LPCT(n) \times LPAY(n)]$$

AAR(n): This variable computes the amount by which the carrier is at risk in any month n. It is calculated as:

$$= \max\left\{ \frac{SA}{mlp} - CVI(n), \left[ \frac{CORR(\hat{a}_n)}{100} - 1 \right] \times CVI(n) \right\}$$

COI(n): This variable computes the cost of insurance charge for a given month n $$= cx(n) \times ARR(n)$$

if riders are present this expression is expanded to:

$$= \left[ cx(n) + \sum_{(rider)} cx_{(rider)}(n) \times ARR(n) \right]$$

The system sets the cost of the rider to zero when the rider expires.

The following variables are used for the computation of cash values and interest rate breakpoints. Breakpoint formulas include:

NCV(n): his is the net pre-interest cash value, end of month n. It is computed as:

$$= CVI(n) - COI(n)$$

NCVI(n):Part 1, up to the break:

$$= \min(NCV(n), iCbreak)$$

NCV2(n):Part 2, above the break:

$$= \max(0, NCV(n) - iCbreak)$$

INTC(n): This is the variable for interest credited in a given month n. It is computed as:

$NCV1(n) \times iC1_m + NCV2(n) \times iC2_m$

CV(n): This is the variable that computes the end of monthly life insurance cash value. It is equal to:

$CVI(n) - COI(n) + INTC(n)$

MINS(n): This is the variable for the life insurance death benefit for month n. It is the larger of the estimated guideline amount calculated in SA, or the insurance corridor amount, multiplied by the Cash Value:

$\max\{SA, CORR(\hat{a}_n) \times CV(n)\}$

The system's first trial as to the premium amount needed to fund the policy is calculated using the 7LP formula. The system replaces Q(t) with Qx($a_t$) for this computation; if only a value for qx($a_t$) is available, the system uses 12×qx ($a_t$). The system sets inlp equal to (iC1+iC2)/2, and sums to LNUM instead of using 7 in the denominator.

For any solved policy in FIG. 37B-5, Block 648, the system must check that it conforms with regulatory limits on the size of premium for the policy cash value. The original gSP and gLP rates were approximations. The estimated guideline amounts are rates, expressed as dollars of premium divided by dollars of insurance, where the estimated GLP=gLP×SA, and the estimated GSP=gSP×SA. The system next finds the actual GLP and GSP for this policy in FIG. 37B-5, Block 646, both to report to the carrier, and to check that the illustrated policy conforms to tax rules governing insurance in FIG. 37B-5, Block 648. To do this, the system reruns the insurance LIFPAY calculation, but with a change of certain parameters and tables, and with a new target. If riders are present, the system calculates the guidelines GLP and GSP for the base policy assuming no riders, then for the combined policy including riders. These data too are reported to the carrier.

In these re-illustrations:

The system saves the entire results of the preceding insurance computation in FIG. 37B-5, Block 654, since they may remain valid. In particular, the system lets $SA_r$=SA, $LIFPAY_r$=LIFPAY, each from the previously solved insurance run.

The system then uses rxg($\hat{a}_n$) tables instead of the tabulated or computed rx(n) values. The systems checks, however, the qx guarantee flag for guideline premiums. If it is set, the system uses rx(n) instead of rxg($\hat{a}_n$) in the first year. For COI(n), n=1 to 12, the guaranteed rate is assumed to be equal to the current rate, for those carriers that guarantee the first year's mortality charges.

The system freezes SA in the GSP/GLP runs at $SA_r$. It does not use the formula previously shown for the computation of SA. Therefore, the system skips the computations for Q(t), P(t), tP(t), gSP, gLP, 7LP, and SA in this iteration.

The target in each iteration is to find the value for LIFPAY that achieves $CV(12N_{max})=SA_r$. The cash value at the end of the insurance policy must equal the Specified Amount the system just projected and saved. None of the standard insurance targets apply. However, the system checks and reports if the projected cash value drops below zero, CV(n)≦0, any n, throughout the projection.

For The Actual Regulatory GSP: The system first assumes:

LNUM=1, is a single premium, in the first month of the policy.

iC1=iC2=max(insp, IRS_insp)

where IRS_insp is a system parameter. This value can be 6 percent. The resulting LIFPAY computed by the system is the new Guideline Single Premium, $GSP_a$.

For The Actual Regulatory GLP: The system assumes:

$LNUM=\min(N_{max\ 3}, 95-a_1+1)$ iC1=iC2=max(inlp, IRS_inlp)

where IRS_inlp is a system parameter. This value is usually four percent for most carriers. The resulting LIFPAY computed by the system is the new Guideline Level Premium, $GLP_a$.

With riders present, the system must determine the GLP/GSP with riders. The system saves those just found as the base policy riders, $GLP_{base}$ and $GSP_{base}$. Next, the system resets the target SA to the last saved total value, $SA_r$, restores the riders to the COI determination, and reruns the GLP and GSP determination process. These are the total guideline premiums. From these, the system determines the portion to be ascribed to all the riders as a unit, $GLP(rider)=GLP_{total}-GLP_{base}$ $GSP(rider)=GSP_{total}-GSP_{base}$ and, if a new iteration for the true insurance is required, these will be use in place of the equations therefore used in the first pass.

Both GSP and GLP (base and rider components, if riders are present) as finally computed will be reported to the carrier, as part of the insurance issuance process. First, they are used to confirm that the system has met the guidelines, and that the system is not buying excess insurance over the guidelines. To do this, it computes the new gLP and gSP for the base insurance as:

$gSP=GSP_{base}/SA_b$ $gLP=GLP_{base}/SA_b$

The system recomputes the Specified Amount using the SA equation and the new gSP and gLP values for the base insurance, modified if riders are present, with the new GLP(riders) and GSP(riders) just determined, and calls this new value $SA_a$; if $SA_a=SA_r$, the system has finished.

If not, and this is not the first pass through this determination, there will be a previous LIFPAY, called $LIFPAY_{prev}$; the system compares $LIFPAY_{prev}$ to the saved $LIFPAY_r$. If the difference is significant—greater than, say, $1.00—or if this is the first pass, the system saves $LIFPAY_r$ as $LIFPAY_{prev}$ then re-solves the "real insurance" problem using the new gSP and gLP and GSP(riders) and GLP(riders) if any—i.e., with $SA=SA_a$—then redetermines the GSP, GLP, and new $SA_a$, and repeats the test.

When it has completed the aforementioned regulatory guideline computations, the system computes a projection of insurance cash values based upon carrier guaranteed rates for the minimum credited interest and maximum mortality charges in Block 652. This projection is unrealistic and will look unattractive to the applicant. (See Guaranteed Life Insurance Values, Specimen 1) However, by current law this projection must be presented to the prospective applicant. The cash value will in many instances drop to below zero before the end of the required period. The system continues the computation, but the display shows the insurance lapsing in the first month the cash value is negative.

This projection therefore uses the LIFPAY and LNUM for the actual projected insurance premium values the $rxg(\hat{a}_n)$ table(s) in place of rx(n) table/formula, and iC1=iC2=inlp. However, if the iC year-one guarantee flag for this projection is set because the carrier guarantees its fist year rate, the system uses iC1 and iC2 for n=1 to 12. These are used to compute INTC(n). Similarly, if the qx year-one guarantee flag for this projection is set because the carrier guarantees the first year mortality changes, the systems uses rx(n) instead of $rxg(\hat{a}_n)$, for n=1 to 12 for the first year.

The system also computes the required policy cost indices, see Block 653, FIG. 37B-5, for each insurance product illustrated. These arc the Surrender Cost Index At 5%, also called the Interest Adjusted Net Cost Index (IANC), and the Net Payment Cost Index At 5%. The formulas are noted below:

Surrender Cost index At 5% at year t:

$$IANC(t) = \frac{LIFPAY \sum_{i=1}^{LNUM} (1+INVI)^{t-i+1} - CV(12t)}{SA \sum_{i=1}^{t} (1+INVI)^{i}}$$

where INVI is the investment interest rate, here assumed to be 5%. The cash value term, CV(12t), is the illustrated cash value at the end of policy year t. The Surrender Cost Index is typically computed for years 10 and 20 of the policy.

Similarly, the Net Payment Cost Index (NPI), Formula is identical to IANC(t) except that the cash value term CV(12t) is omitted, as shown below:

Net Payment Cost Index At 5% at year t:

$$NPI(t) = \frac{LIFPAY \sum_{i=1}^{LNUM} (1+INVI)^{t-i+1}}{SA \sum_{i=1}^{t} (1+INVI)^{i}}$$

D. Discussion of Specimens

The specimens provide samples of part of the output that would be printed on the user's printer. Specimen 1 provides an example of the textual data which would be merged with illustration data in order to create an illustration. Specimen 2 provides an example of textual data that can be combined with multiple illustration data to allow users to compare various policies identified by the system. Specimen 3 provides an example of textual data than can be merged with client data to provide a completed insurance application form.

V. Conclusion

While this invention has been particularly shown and described with reference to a preferred embodiment, it will be readily appreciated by those of ordinary skill in the art that various changes and modifications may be made without departing from the spirit or scope of the invention. For example, the particular formats of the various display screens or output herein described may be modified, as desired. Likewise, the present invention should not be limited to the specific examples described herein since a greater or lesser number of options and functions for each of the menus and submenus that may be displayed on a CRT or VDT are within the scope of this invention. It is, therefore, contemplated that the appended claims be interpreted as including the foregoing and other changes and modifications.

We claim:

1. A computer-implemented method using front-end network gateways and search criteria entered at a remote computer terminal to conduct a search of multiple financial products for efficient quoting at a remote location, the method including the steps of:
   providing at least one data input screen with signals communicated from a digital computer to the remote terminal connected by a communications system, the at least one data input screen at the terminal soliciting entry of financial product selection criteria;
   receiving the selection criteria from the terminal over the communications system at the digital computer; and
   using the front-end network gateways, data accessible by the digital computer representing the multiple financial products, and the selection criteria entered at the terminal to provide a quote at the terminal for a financial product identified from the multiple financial products.

2. The method of claim 1, wherein the step of providing is carried out with a form for the soliciting entry of the financial product selection criteria including criteria representing a prospective applicant for the financial product identified from the multiple financial products.

3. The method of claim 2, wherein the step of using includes providing a quote for a mutual fund as the financial product identified from the multiple financial products.

4. The method of claim 2, wherein the step of using includes providing a quote for life insurance as the financial product identified from the multiple financial products.

5. The method of claim 2, wherein the step of using includes providing a quote for term life insurance as the financial product identified from the multiple financial products.

6. The method of claim 2, wherein the step of using includes providing a quote for permanent life insurance as the financial product identified from the multiple financial products.

7. The method of claim 2, wherein the step of using includes providing a quote for universal life insurance as the financial product identified from the multiple financial products.

8. The method of claim 2, wherein the step of using includes providing a quote for a joint life insurance policy as the financial product identified from the multiple financial products.

9. The method of claim 2, wherein the step of using includes providing a quote for a joint and survivor life insurance policy as the financial product identified from the multiple financial products.

10. The method of claim 2, wherein the step of using includes providing a quote for variable life insurance as the financial product identified from the multiple financial products.

11. The method of claim 2, wherein the step of using includes providing a quote for permanent life insurance with at least one rider as the financial product identified from the multiple financial products.

12. The method of claim 2, wherein the step of using includes providing a quote for an annuity as the financial product identified from the multiple financial products.

13. The method of claim 2, wherein the step of using includes providing a quote for an immediate annuity as the financial product identified from the multiple financial products.

14. The method of claim 2, wherein the step of using includes providing a quote for a deferred annuity as the financial product identified from the multiple financial products.

15. The method of claim 2, wherein the step of using includes providing a quote for a mortgage as the financial product identified from the multiple financial products.

16. The method of claim 2, wherein the step of using includes providing a quote for a first mortgage as the financial product identified from the multiple financial products.

17. The method of claim 2, wherein the step of using includes providing a quote for a home equity mortgage as the financial product.

18. The method of claim 2, wherein the step of using includes providing a quote for a balloon repayment mortgage as the financial product.

19. The method of claim 2, wherein the step of using includes providing a quote for a fixed interest mortgage as the financial product.

20. The method of claim 2, wherein the step of using includes providing a quote for a variable interest mortgage as the financial product.

21. The method of claim 2, wherein the step of using includes providing a quote for a tax-favored account identified from the multiple financial products.

22. The method of claim 2, wherein the step of using includes providing a quote for an Individual Retirement Account identified from the multiple financial products.

23. The method of claim 2, wherein the step of using includes providing a quote for a Keough plan identified from the multiple financial products.

24. The method of claim 2, wherein the step of using includes providing a quote for a 401(k) plan identified from the multiple financial products.

25. The method of claim 2, wherein the step of using includes providing a quote for a security identified from the multiple financial products.

26. The method of claim 2, wherein the step of using includes providing a quote for a zero coupon bond identified from the multiple financial products.

27. The method of claim 2, wherein the step of using includes providing a quote for a US Treasury Derivative identified from the multiple financial products.

28. The method of claim 2, wherein the step of using includes providing a quote for a municipal bond identified from the multiple financial products.

29. The method of claim 2, wherein the step of using includes providing a quote for a combination of financial products at least in part identified from the multiple financial products.

30. The method of claim 1, wherein each step is carried out with hyperlink word capability available at the digital computer and the terminal.

31. The method of claim 30, further including the steps of:
entering a first password to operably connect the terminal to the digital computer and entering a second password to obtain some of the data.

32. The method of claim 1, wherein the criteria includes sex.

33. The method of claim 2, wherein each step is carried out with hyperlink key word capability available at the digital computer and the terminal.

34. The method of claim 3, wherein each step is carried out with hyperlink key word capability available at the digital computer and the terminal.

35. The method of claim 4, wherein each step is carried out with hyperlink key word capability available at the digital computer and the terminal.

36. The method of claim 5, wherein each step is carried out with hyperlink key word capability available at the digital computer and the terminal.

37. The method of claim 6, wherein each step is carried out with hyperlink key word capability available at the digital computer and the terminal.

38. The method of claim 7, wherein each step is carried out with hyperlink key word capability available at the digital computer and the terminal.

39. The method of claim 8, wherein each step is carried out with hyperlink key word capability available at the digital computer and the terminal.

40. The method of claim 9, wherein each step is carried out with hyperlink key word capability available at the digital computer and the terminal.

41. The method of claim 10, wherein each step is carried out with hyperlink key word capability available at the digital computer and the terminal.

42. The method of claim 11, wherein each step is carried out with hyperlink key word capability available at the digital computer and the terminal.

43. The method of claim 12, wherein each step is carried out with hyperlink key word capability available at the digital computer and the terminal.

44. The method of claim 13, wherein each step is carried out with hyperlink key word capability available at the digital computer and the terminal.

45. The method of claim 14, wherein each step is carried out with hyperlink key word capability available at the digital computer and the terminal.

46. The method of claim 15, wherein each step is carried out with hyperlink key word capability available at the digital computer and the terminal.

47. The method of claim 16, wherein each step is carried out with hyperlink key word capability available at the digital computer and the terminal.

48. The method of claim 17, wherein each step is carried out with hyperlink key word capability available at the digital computer and the terminal.

49. The method of claim 18, wherein each step is carried out with hyperlink key word capability available at the digital computer and the terminal.

50. The method of claim 19, wherein each step is carried out with hyperlink key word capability available at the digital computer and the terminal.

51. The method of claim 20, wherein each step is carried out with hyperlink key word capability available at the digital computer and the terminal.

52. The method of claim 21, wherein each step is carried out with hyperlink key word capability available at the digital computer and the terminal.

53. The method of claim 22, wherein each step is carried out with hyperlink key word capability available at the digital computer and the terminal.

54. The method of claim 23, wherein each step is carried out with hyperlink key word capability available at the digital computer and the terminal.

55. The method of claim 24, wherein each step is carried out with hyperlink key word capability available at the digital computer and the terminal.

56. The method of claim 25, wherein each step is carried out with hyperlink key word capability available at the digital computer and the terminal.

57. The method of claim 26, wherein each step is carried out with hyperlink key word capability available at the digital computer and the terminal.

58. The method of claim 27, wherein each step is carried out with hyperlink key word capability available at the digital computer and the terminal.

59. The method of claim 28, wherein each step is carried out with hyperlink key word capability available at the digital computer and the terminal.

60. The method of claim 29, wherein each step is carried out with hyperlink key word capability available at the digital computer and the terminal.

61. The method of claim 1, wherein the criteria includes a health criteria.

62. The method of claim 2, wherein the criteria includes a health criteria.

63. The method of claim 4, wherein the criteria includes a health criteria.

64. The method of claim 5, wherein the criteria includes a health criteria.

65. The method of claim 6, wherein the criteria includes a health criteria.

66. The method of claim 7, wherein the criteria includes a health criteria.

67. The method of claim 8, wherein the criteria includes a health criteria.

68. The method of claim 9, wherein the criteria includes a health criteria.

69. The method of claim 10, wherein the criteria includes a health criteria.

70. The method of claim 11, wherein the criteria includes a health criteria.

71. The method of claim 12, wherein the criteria includes a health criteria.

72. The method of claim 13, wherein the criteria includes a health criteria.

73. The method of claim 14, wherein the criteria includes a health criteria.

74. The method of claim 15, wherein the criteria includes a health criteria.

75. The method of claim 16, wherein the criteria includes a health criteria.

76. The method of claim 17, wherein the criteria includes a health criteria.

77. The method of claim 18, wherein the criteria includes a health criteria.

78. The method of claim 19, wherein the criteria includes a health criteria.

79. The method of claim 20, wherein the criteria includes a health criteria.

80. The method of claim 21, wherein the criteria includes a health criteria.

81. The method of claim 22, wherein the criteria includes a health criteria.

82. The method of claim 23, wherein the criteria includes a health criteria.

83. The method of claim 25, wherein the criteria includes a health criteria.

84. The method of claim 26, wherein the criteria includes a health criteria.

85. The method of claim 27, wherein the criteria includes a health criteria.

86. The method of claim 29, wherein the criteria includes a health criteria.

87. The method of claim 30, wherein the criteria includes a health criteria.

88. The method of claim 33, wherein the criteria includes a health criteria.

89. The method of claim 35, wherein the criteria includes a health criteria.

90. The method of claim 36, wherein the criteria includes a health criteria.

91. The method of claim 37, wherein the criteria includes a health criteria.

92. The method of claim 38, wherein the criteria includes a health criteria.

93. The method of claim 39, wherein the criteria includes a health criteria.

94. The method of claim 40, wherein the criteria includes a health criteria.

95. The method of claim 41, wherein the criteria includes a health criteria.

96. The method of claim 42, wherein the criteria includes a health criteria.

97. The method of claim 43, wherein the criteria includes a health criteria.

98. The method of claim 44, wherein the criteria includes a health criteria.

99. The method of claim 45, wherein the criteria includes a health criteria.

100. The method of claim 46, wherein the criteria includes a health criteria.

101. The method of claim 47, wherein the criteria includes a health criteria.

102. The method of claim 48, wherein the criteria includes a health criteria.

103. The method of claim 49, wherein the criteria includes a health criteria.

104. The method of claim 50, wherein the criteria includes a health criteria.

105. The method of claim 51, wherein the criteria includes a health criteria.

106. The method of claim 52, wherein the criteria includes a health criteria.

107. The method of claim 53, wherein the criteria includes a health criteria.

108. The method of claim 54, wherein the criteria includes a health criteria.

109. The method of claim 55, wherein the criteria includes a health criteria.

110. The method of claim 56, wherein the criteria includes a health criteria.

111. The method of claim 57, wherein the criteria includes a health criteria.

112. The method of claim 58, wherein the criteria includes a health criteria.

113. The method of claim 59, wherein the criteria includes a health criteria.

114. The method of claim 1, wherein the criteria includes sex.

115. The method of claim 2, wherein the criteria includes sex.

116. The method of claim 4, wherein the criteria includes sex.

117. The method of claim 5, wherein the criteria includes sex.

118. The method of claim 5, wherein the criteria includes sex.

119. The method of claim 6, wherein the criteria includes sex.

120. The method of claim 8, wherein the criteria includes sex.

121. The method of claim 9, wherein the criteria includes sex.

122. The method of claim 10, wherein the criteria includes sex.

123. The method of claim 11, wherein the criteria includes sex.

124. The method of claim 12, wherein the criteria includes sex.

125. The method of claim 13, wherein the criteria includes sex.

126. The method of claim 14, wherein the criteria includes sex.

127. The method of claim 15, wherein the criteria includes sex.

128. The method of claim 16, wherein the criteria includes sex.

129. The method of claim 17, wherein the criteria includes sex.

130. The method of claim 18, wherein the criteria includes sex.

131. The method of claim 19, wherein the criteria includes sex.

132. The method of claim 20, wherein the criteria includes sex.

133. The method of claim 21, wherein the criteria includes sex.

134. The method of claim 22, wherein the criteria includes sex.

135. The method of claim 23, wherein the criteria includes sex.

136. The method of claim 24, wherein the criteria includes sex.

137. The method of claim 25, wherein the criteria includes sex.

138. The method of claim 26, wherein the criteria includes sex.

139. The method of claim 27, wherein the criteria includes sex.

140. The method of claim 28, wherein the criteria includes sex.

141. The method of claim 29, wherein the criteria includes sex.

142. The method of claim 30, wherein the criteria includes sex.

143. The method of claim 33, wherein the criteria includes sex.

144. The method of claim 35, wherein the criteria includes sex.

145. The method of claim 36, wherein the criteria includes sex.

146. The method of claim 37, wherein the criteria includes sex.

147. The method of claim 38, wherein the criteria includes sex.

148. The method of claim 39, wherein the criteria includes sex.

149. The method of claim 40, wherein the criteria includes sex.

150. The method of claim 41, wherein the criteria includes sex.

151. The method of claim 42, wherein the criteria includes sex.

152. The method of claim 43, wherein the criteria includes sex.

153. The method of claim 44, wherein the criteria includes sex.

154. The method of claim 45, wherein the criteria includes sex.

155. The method of claim 46, wherein the criteria includes sex.

156. The method of claim 47, wherein the criteria includes sex.

157. The method of claim 48, wherein the criteria includes sex.

158. The method of claim 49, wherein the criteria includes sex.

159. The method of claim 50, wherein the criteria includes sex.

160. The method of claim 51, wherein the criteria includes sex.

161. The method of claim 52, wherein the criteria includes sex.

162. The method of claim 53, wherein the criteria includes sex.

163. The method of claim 54, wherein the criteria includes sex.

164. The method of claim 55, wherein the criteria includes sex.

165. The method of claim 56, wherein the criteria includes sex.

166. The method of claim 57, wherein the criteria includes sex.

167. The method of claim 58, wherein the criteria includes sex.

168. The method of claim 59, wherein the criteria includes sex.

169. The method of claim 60, wherein the criteria includes sex.

170. The method of claim 61, wherein the criteria includes sex.

171. The method of claim 62, wherein the criteria includes sex.

172. The method of claim 63, wherein the criteria includes sex.

173. The method of claim 64, wherein the criteria includes sex.

174. The method of claim 65, wherein the criteria includes sex.

175. The method of claim 66, wherein the criteria includes sex.

176. The method of claim 66, wherein the criteria includes sex.

177. The method of claim 67, wherein the criteria includes sex.

178. The method of claim 68, wherein the criteria includes sex.

179. The method of claim 69, wherein the criteria includes sex.

180. The method of claim 70, wherein the criteria includes sex.

181. The method of claim 71, wherein the criteria includes sex.

182. The method of claim 72, wherein the criteria includes sex.

183. The method of claim 73, wherein the criteria includes sex.

184. The method of claim 74, wherein the criteria includes sex.

185. The method of claim 75, wherein the criteria includes sex.

186. The method of claim 76, wherein the criteria includes sex.

187. The method of claim 77, wherein the criteria includes sex.

188. The method of claim 78, wherein the criteria includes sex.

189. The method of claim 79, wherein the criteria includes sex.

190. The method of claim 80, wherein the criteria includes sex.

191. The method of claim 81, wherein the criteria includes sex.

192. The method of claim 82, wherein the criteria includes sex.

193. The method of claim 83, wherein the criteria includes sex.

194. The method of claim 84, wherein the criteria includes sex.

195. The method of claim 85, wherein the criteria includes sex.

196. The method of claim 86, wherein the criteria includes sex.

197. The method of claim 87, wherein the criteria includes sex.

198. The method of claim 88, wherein the criteria includes sex.

199. The method of claim 89, wherein the criteria includes sex.

200. The method of claim 90, wherein the criteria includes sex.

201. The method of claim 91, wherein the criteria includes sex.

202. The method of claim 92, wherein the criteria includes sex.

203. The method of claim 93, wherein the criteria includes sex.

204. The method of claim 94, wherein the criteria includes sex.

205. The method of claim 95, wherein the criteria includes sex.

206. The method of claim 96, wherein the criteria includes sex.

207. The method of claim 97, wherein the criteria includes sex.

208. The method of claim 98, wherein the criteria includes sex.

209. The method of claim 99, wherein the criteria includes sex.

210. The method of claim 100, wherein the criteria includes sex.

211. The method of claim 101, wherein the criteria includes sex.

212. The method of claim 102, wherein the criteria includes sex.

213. The method of claim 103, wherein the criteria includes sex.

214. The method of claim 104, wherein the criteria includes sex.

215. The method of claim 105, wherein the criteria includes sex.

216. The method of claim 106, wherein the criteria includes sex.

217. The method of claim 107, wherein the criteria includes sex.

218. The method of claim 108, wherein the criteria includes sex.

219. The method of claim 109, wherein the criteria includes sex.

220. The method of claim 110, wherein the criteria includes sex.

221. The method of claim 111, wherein the criteria includes sex.

222. The method of claim 112, wherein the criteria includes sex.

223. The method of claim 113, wherein the criteria includes sex.

224. The method of claim 1, further including the steps of:
entering a first password to operably connect the terminal to the digital computer and entering a second password to obtain some of the data.

225. The method of claim 2, further including the steps of:
entering a first password to operably connect the terminal to the digital computer and entering a second password to obtain some of the data.

226. The method of claim 3, further including the steps of:
entering a first password to operably connect the terminal to the digital computer and entering a second password to obtain some of the data.

227. The method of claim 4, further including the steps of:
entering a first password to operably connect the terminal to the digital computer and entering a second password to obtain some of the data.

228. The method of claim 5, further including the steps of:
entering a first password to operably connect the terminal to the digital computer and entering a second password to obtain some of the data.

229. The method of claim 6, further including the steps of:
entering a first password to operably connect the terminal to the digital computer and entering a second password to obtain some of the data.

230. The method of claim 7, further including the steps of:
entering a first password to operably connect the terminal to the digital computer and entering a second password to obtain some of the data.

231. The method of claim 8, further including the steps of:
entering a first password to operably connect the terminal to the digital computer and entering a second password to obtain some of the data.

232. The method of claim 9, further including the steps of:
entering a first password to operably connect the terminal to the digital computer and entering a second password to obtain some of the data.

233. The method of claim 10, further including the steps of:
entering a first password to operably connect the terminal to the digital computer and entering a second password to obtain some of the data.

234. The method of claim 11, further including the steps of:
entering a first password to operably connect the terminal to the digital computer and entering a second password to obtain some of the data.

235. The method of claim 12, further including the steps of:
entering a first password to operably connect the terminal to the digital computer and entering a second password to obtain some of the data.

236. The method of claim 13, further including the steps of:
entering a first password to operably connect the terminal to the digital computer and entering a second password to obtain some of the data.

237. The method of claim 14, further including the steps of:
entering a first password to operably connect the terminal to the digital computer and entering a second password to obtain some of the data.

238. The method of claim 15, further including the steps of:
  entering a first password to operably connect the terminal to the digital computer and entering a second password to obtain some of the data.

239. The method of claim 16, further including the steps of:
  entering a first password to operably connect the terminal to the digital computer and entering a second password to obtain some of the data.

240. The method of claim 17, further including the steps of:
  entering a first password to operably connect the terminal to the digital computer and entering a second password to obtain some of the data.

241. The method of claim 18, further including the steps of:
  entering a first password to operably connect the terminal to the digital computer and entering a second password to obtain some of the data.

242. The method of claim 19, further including the steps of:
  entering a first password to operably connect the terminal to the digital computer and entering a second password to obtain some of the data.

243. The method of claim 20, further including the steps of:
  entering a first password to operably connect the terminal to the digital computer and entering a second password to obtain some of the data.

244. The method of claim 21, further including the steps of:
  entering a first password to operably connect the terminal to the digital computer and entering a second password to obtain some of the data.

245. The method of claim 22, further including the steps of:
  entering a first password to operably connect the terminal to the digital computer and entering a second password to obtain some of the data.

246. The method of claim 23, further including the steps of:
  entering a first password to operably connect the terminal to the digital computer and entering a second password to obtain some of the data.

247. The method of claim 24, further including the steps of:
  entering a first password to operably connect the terminal to the digital computer and entering a second password to obtain some of the data.

248. The method of claim 25, further including the steps of:
  entering a first password to operably connect the terminal to the digital computer and entering a second password to obtain some of the data.

249. The method of claim 26, further including the steps of:
  entering a first password to operably connect the terminal to the digital computer and entering a second password to obtain some of the data.

250. The method of claim 27, further including the steps of:
  entering a first password to operably connect the terminal to the digital computer and entering a second password to obtain some of the data.

251. The method of claim 28, further including the steps of:
  entering a first password to operably connect the terminal to the digital computer and entering a second password to obtain some of the data.

252. The method of claim 29, further including the steps of:
  entering a first password to operably connect the terminal to the digital computer and entering a second password to obtain some of the data.

253. The method of claim 33, further including the steps of:
  entering a first password to operably connect the terminal to the digital computer and entering a second password to obtain some of the data.

254. The method of claim 34, further including the steps of:
  entering a first password to operably connect the terminal to the digital computer and entering a second password to obtain some of the data.

255. The method of claim 35, further including the steps of:
  entering a first password to operably connect the terminal to the digital computer and entering a second password to obtain some of the data.

256. The method of claim 36, further including the steps of:
  entering a first password to operably connect the terminal to the digital computer and entering a second password to obtain some of the data.

257. The method of claim 37, further including the steps of:
  entering a first password to operably connect the terminal to the digital computer and entering a second password to obtain some of the data.

258. The method of claim 38, further including the steps of:
  entering a first password to operably connect the terminal to the digital computer and entering a second password to obtain some of the data.

259. The method of claim 39, further including the steps of:
  entering a first password to operably connect the terminal to the digital computer and entering a second password to obtain some of the data.

260. The method of claim 40, further including the steps of:
  entering a first password to operably connect the terminal to the digital computer and entering a second password to obtain some of the data.

261. The method of claim 41, further including the steps of:
  entering a first password to operably connect the terminal to the digital computer and entering a second password to obtain some of the data.

262. The method of claim 42, further including the steps of:
  entering a first password to operably connect the terminal to the digital computer and entering a second password to obtain some of the data.

263. The method of claim 43, further including the steps of:
  entering a first password to operably connect the terminal to the digital computer and entering a second password to obtain some of the data.

264. The method of claim 44, further including the steps of:
    entering a first password to operably connect the terminal to the digital computer and entering a second password to obtain some of the data.
265. The method of claim 45, further including the steps of:
    entering a first password to operably connect the terminal to the digital computer and entering a second password to obtain some of the data.
266. The method of claim 46, further including the steps of:
    entering a first password to operably connect the terminal to the digital computer and entering a second password to obtain some of the data.
267. The method of claim 47, further including the steps of:
    entering a first password to operably connect the terminal to the digital computer and entering a second password to obtain some of the data.
268. The method of claim 48, further including the steps of:
    entering a first password to operably connect the terminal to the digital computer and entering a second password to obtain some of the data.
269. The method of claim 49, further including the steps of:
    entering a first password to operably connect the terminal to the digital computer and entering a second password to obtain some of the data.
270. The method of claim 50, further including the steps of:
    entering a first password to operably connect the terminal to the digital computer and entering a second password to obtain some of the data.
271. The method of claim 51, further including the steps of:
    entering a first password to operably connect the terminal to the digital computer and entering a second password to obtain some of the data.
272. The method of claim 52, further including the steps of:
    entering a first password to operably connect the terminal to the digital computer and entering a second password to obtain some of the data.
273. The method of claim 53, further including the steps of:
    entering a first password to operably connect the terminal to the digital computer and entering a second password to obtain some of the data.
274. The method of claim 54, further including the steps of:
    entering a first password to operably connect the terminal to the digital computer and entering a second password to obtain some of the data.
275. The method of claim 55, further including the steps of:
    entering a first password to operably connect the terminal to the digital computer and entering a second password to obtain some of the data.
276. The method of claim 56, further including the steps of:
    entering a first password to operably connect the terminal to the digital computer and entering a second password to obtain some of the data.
277. The method of claim 57, further including the steps of:
    entering a first password to operably connect the terminal to the digital computer and entering a second password to obtain some of the data.
278. The method of claim 58, further including the steps of:
    entering a first password to operably connect the terminal to the digital computer and entering a second password to obtain some of the data.
279. The method of claim 59, further including the steps of:
    entering a first password to operably connect the terminal to the digital computer and entering a second password to obtain some of the data.
280. The method of claim 60, further including the steps of:
    entering a first password to operably connect the terminal to the digital computer and entering a second password to obtain some of the data.
281. The method of claim 61, further including the steps of:
    entering a first password to operably connect the terminal to the digital computer and entering a second password to obtain some of the data.
282. The method of claim 62, further including the steps of:
    entering a first password to operably connect the terminal to the digital computer and entering a second password to obtain some of the data.
283. The method of claim 63, further including the steps of:
    entering a first password to operably connect the terminal to the digital computer and entering a second password to obtain some of the data.
284. The method of claim 64, further including the steps of:
    entering a first password to operably connect the terminal to the digital computer and entering a second password to obtain some of the data.
285. The method of claim 65, further including the steps of:
    entering a first password to operably connect the terminal to the digital computer and entering a second password to obtain some of the data.
286. The method of claim 66, further including the steps of:
    entering a first password to operably connect the terminal to the digital computer and entering a second password to obtain some of the data.
287. The method of claim 66, further including the steps of:
    entering a first password to operably connect the terminal to the digital computer and entering a second password to obtain some of the data.
288. The method of claim 67, further including the steps of:
    entering a first password to operably connect the terminal to the digital computer and entering a second password to obtain some of the data.
289. The method of claim 68, further including the steps of:
    entering a first password to operably connect the terminal to the digital computer and entering a second password to obtain some of the data.

290. The method of claim 69, further including the steps of:
  entering a first password to operably connect the terminal to the digital computer and entering a second password to obtain some of the data.

291. The method of claim 70, further including the steps of:
  entering a first password to operably connect the terminal to the digital computer and entering a second password to obtain some of the data.

292. The method of claim 71, further including the steps of:
  entering a first password to operably connect the terminal to the digital computer and entering a second password to obtain some of the data.

293. The method of claim 72, further including the steps of:
  entering a first password to operably connect the terminal to the digital computer and entering a second password to obtain some of the data.

294. The method of claim 73, further including the steps of:
  entering a first password to operably connect the terminal to the digital computer and entering a second password to obtain some of the data.

295. The method of claim 74, further including the steps of:
  entering a first password to operably connect the terminal to the digital computer and entering a second password to obtain some of the data.

296. The method of claim 75, further including the steps of:
  entering a first password to operably connect the terminal to the digital computer and entering a second password to obtain some of the data.

297. The method of claim 76, further including the steps of:
  entering a first password to operably connect the terminal to the digital computer and entering a second password to obtain some of the data.

298. The method of claim 77, further including the steps of:
  entering a first password to operably connect the terminal to the digital computer and entering a second password to obtain some of the data.

299. The method of claim 78, further including the steps of:
  entering a first password to operably connect the terminal to the digital computer and entering a second password to obtain some of the data.

300. The method of claim 79, further including the steps of:
  entering a first password to operably connect the terminal to the digital computer and entering a second password to obtain some of the data.

301. The method of claim 80, further including the steps of:
  entering a first password to operably connect the terminal to the digital computer and entering a second password to obtain some of the data.

302. The method of claim 81, further including the steps of:
  entering a first password to operably connect the terminal to the digital computer and entering a second password to obtain some of the data.

303. The method of claim 82, further including the steps of:
  entering a first password to operably connect the terminal to the digital computer and entering a second password to obtain some of the data.

304. The method of claim 83, further including the steps of:
  entering a first password to operably connect the terminal to the digital computer and entering a second password to obtain some of the data.

305. The method of claim 84, further including the steps of:
  entering a first password to operably connect the terminal to the digital computer and entering a second password to obtain some of the data.

306. The method of claim 85, further including the steps of:
  entering a first password to operably connect the terminal to the digital computer and entering a second password to obtain some of the data.

307. The method of claim 86, further including the steps of:
  entering a first password to operably connect the terminal to the digital computer and entering a second password to obtain some of the data.

308. The method of claim 87, further including the steps of:
  entering a first password to operably connect the terminal to the digital computer and entering a second password to obtain some of the data.

309. The method of claim 88, further including the steps of:
  entering a first password to operably connect the terminal to the digital computer and entering a second password to obtain some of the data.

310. The method of claim 89, further including the steps of:
  entering a first password to operably connect the terminal to the digital computer and entering a second password to obtain some of the data.

311. The method of claim 90, further including the steps of:
  entering a first password to operably connect the terminal to the digital computer and entering a second password to obtain some of the data.

312. The method of claim 91, further including the steps of:
  entering a first password to operably connect the terminal to the digital computer and entering a second password to obtain some of the data.

313. The method of claim 92, further including the steps of:
  entering a first password to operably connect the terminal to the digital computer and entering a second password to obtain some of the data.

314. The method of claim 93, further including the steps of:
  entering a first password to operably connect the terminal to the digital computer and entering a second password to obtain some of the data.

315. The method of claim 94, further including the steps of:
  entering a first password to operably connect the terminal to the digital computer and entering a second password to obtain some of the data.

316. The method of claim 95, further including the steps of:
  entering a first password to operably connect the terminal to the digital computer and entering a second password to obtain some of the data.

317. The method of claim 96, further including the steps of:
  entering a first password to operably connect the terminal to the digital computer and entering a second password to obtain some of the data.

318. The method of claim 97, further including the steps of:
  entering a first password to operably connect the terminal to the digital computer and entering a second password to obtain some of the data.

319. The method of claim 98, further including the steps of:
  entering a first password to operably connect the terminal to the digital computer and entering a second password to obtain some of the data.

320. The method of claim 99, further including the steps of:
  entering a first password to operably connect the terminal to the digital computer and entering a second password to obtain some of the data.

321. The method of claim 100, further including the steps of:
  entering a first password to operably connect the terminal to the digital computer and entering a second password to obtain some of the data.

322. The method of claim 101, further including the steps of:
  entering a first password to operably connect the terminal to the digital computer and entering a second password to obtain some of the data.

323. The method of claim 102, further including the steps of:
  entering a first password to operably connect the terminal to the digital computer and entering a second password to obtain some of the data.

324. The method of claim 103, further including the steps of:
  entering a first password to operably connect the terminal to the digital computer and entering a second password to obtain some of the data.

325. The method of claim 104, further including the steps of:
  entering a first password to operably connect the terminal to the digital computer and entering a second password to obtain some of the data.

326. The method of claim 105, further including the steps of:
  entering a first password to operably connect the terminal to the digital computer and entering a second password to obtain some of the data.

327. The method of claim 106, further including the steps of:
  entering a first password to operably connect the terminal to the digital computer and entering a second password to obtain some of the data.

328. The method of claim 107, further including the steps of:
  entering a first password to operably connect the terminal to the digital computer and entering a second password to obtain some of the data.

329. The method of claim 108, further including the steps of:
  entering a first password to operably connect the terminal to the digital computer and entering a second password to obtain some of the data.

330. The method of claim 109, further including the steps of:
  entering a first password to operably connect the terminal to the digital computer and entering a second password to obtain some of the data.

331. The method of claim 110, further including the steps of:
  entering a first password to operably connect the terminal to the digital computer and entering a second password to obtain some of the data.

332. The method of claim 111, further including the steps of:
  entering a first password to operably connect the terminal to the digital computer and entering a second password to obtain some of the data.

333. The method of claim 112, further including the steps of:
  entering a first password to operably connect the terminal to the digital computer and entering a second password to obtain some of the data.

334. The method of claim 113, further including the steps of:
  entering a first password to operably connect the terminal to the digital computer and entering a second password to obtain some of the data.

335. The method of claim 114, further including the steps of:
  entering a first password to operably connect the terminal to the digital computer and entering a second password to obtain some of the data.

336. The method of claim 115, further including the steps of:
  entering a first password to operably connect the terminal to the digital computer and entering a second password to obtain some of the data.

337. The method of claim 116, further including the steps of:
  entering a first password to operably connect the terminal to the digital computer and entering a second password to,obtain some of the data.

338. The method of claim 117, further including the steps of:
  entering a first password to operably connect the terminal to the digital computer and entering a second password to obtain some of the data.

339. The method of claim 118, further including the steps of:
  entering a first password to operably connect the terminal to the digital computer and entering a second password to obtain some of the data.

340. The method of claim 119, further including the steps of:
  entering a first password to operably connect the terminal to the digital computer and entering a second password to obtain some of the data.

341. The method of claim 120, further including the steps of:
  entering a first password to operably connect the terminal to the digital computer and entering a second password to obtain some of the data.

342. The method of claim 121, further including the steps of:
   entering a first password to operably connect the terminal to the digital computer and entering a second password to obtain some of the data.

343. The method of claim 122, further including the steps of:
   entering a first password to operably connect the terminal to the digital computer and entering a second password to obtain some of the data.

344. The method of claim 123, further including the steps of:
   entering a first password to operably connect the terminal to the digital computer and entering a second password to obtain some of the data.

345. The method of claim 124, further including the steps of:
   entering a first password to operably connect the terminal to the digital computer and entering a second password to obtain some of the data.

346. The method of claim 125, further including the steps of:
   entering a first password to operably connect the terminal to the digital computer and entering a second password to obtain some of the data.

347. The method of claim 126, further including the steps of:
   entering a first password to operably connect the terminal to the digital computer and entering a second password to obtain some of the data.

348. The method of claim 127, further including the steps of:
   entering a first password to operably connect the terminal to the digital computer and entering a second password to obtain some of the data.

349. The method of claim 128, further including the steps of:
   entering a first password to operably connect the terminal to the digital computer and entering a second password to obtain some of the data.

350. The method of claim 129, further including the steps of:
   entering a first password to operably connect the terminal to the digital computer and entering a second password to obtain some of the data.

351. The method of claim 130, further including the steps of:
   entering a first password to operably connect the terminal to the digital computer and entering a second password to obtain some of the data.

352. The method of claim 131, further including the steps of:
   entering a first password to operably connect the terminal to the digital computer and entering a second password to obtain some of the data.

353. The method of claim 132, further including the steps of:
   entering a first password to operably connect the terminal to the digital computer and entering a second password to obtain some of the data.

354. The method of claim 133, further including the steps of:
   entering a first password to operably connect the terminal to the digital computer and entering a second password to obtain some of the data.

355. The method of claim 134, further including the steps of:
   entering a first password to operably connect the terminal to the digital computer and entering a second password to obtain some of the data.

356. The method of claim 135, further including the steps of:
   entering a first password to operably connect the terminal to the digital computer and entering a second password to obtain some of the data.

357. The method of claim 136, further including the steps of:
   entering a first password to operably connect the terminal to the digital computer and entering a second password to obtain some of the data.

358. The method of claim 137, further including the steps of:
   entering a first password to operably connect the terminal to the digital computer and entering a second password to obtain some of the data.

359. The method of claim 138, further including the steps of:
   entering a first password to operably connect the terminal to the digital computer and entering a second password to obtain some of the data.

360. The method of claim 139, further including the steps of:
   entering a first password to operably connect the terminal to the digital computer and entering a second password to obtain some of the data.

361. The method of claim 140, further including the steps of:
   entering a first password to operably connect the terminal to the digital computer and entering a second password to obtain some of the data.

362. The method of claim 141, further including the steps of:
   entering a first password to operably connect the terminal to the digital computer and entering a second password to obtain some of the data.

363. The method of claim 142, further including the steps of:
   entering a first password to operably connect the terminal to the digital computer and entering a second password to obtain some of the data.

364. The method of claim 143, further including the steps of:
   entering a first password to operably connect the terminal to the digital computer and entering a second password to obtain some of the data.

365. The method of claim 144, further including the steps of:
   entering a first password to operably connect the terminal to the digital computer and entering a second password to obtain some of the data.

366. The method of claim 145, further including the steps of:
   entering a first password to operably connect the terminal to the digital computer and entering a second password to obtain some of the data.

367. The method of claim 146, further including the steps of:
   entering a first password to operably connect the terminal to the digital computer and entering a second password to obtain some of the data.

368. The method of claim 147, further including the steps of:
  entering a first password to operably connect the terminal to the digital computer and entering a second password to obtain some of the data.
369. The method of claim 148, further including the steps of:
  entering a first password to operably connect the terminal to the digital computer and entering a second password to obtain some of the data.
370. The method of claim 149, further including the steps of:
  entering a first password to operably connect the terminal to the digital computer and entering a second password to obtain some of the data.
371. The method of claim 150, further including the steps of:
  entering a first password to operably connect the terminal to the digital computer and entering a second password to obtain some of the data.
372. The method of claim 151, further including the steps of:
  entering a first password to operably connect the terminal to the digital computer and entering a second password to obtain some of the data.
373. The method of claim 152, further including the steps of:
  entering a first password to operably connect the terminal to the digital computer and entering a second password to obtain some of the data.
374. The method of claim 153, further including the steps of:
  entering a first password to operably connect the terminal to the digital computer and entering a second password to obtain some of the data.
375. The method of claim 154, further including the steps of:
  entering a first password to operably connect the terminal to the digital computer and entering a second password to obtain some of the data.
376. The method of claim 155, further including the steps of:
  entering a first password to operably connect the terminal to the digital computer and entering a second password to obtain some of the data.
377. The method of claim 156, further including the steps of:
  entering a first password to operably connect the terminal to the digital computer and entering a second password to obtain some of the data.
378. The method of claim 157, further including the steps of:
  entering a first password to operably connect the terminal to the digital computer and entering a second password to obtain some of the data.
379. The method of claim 158, further including the steps of:
  entering a first password to operably connect the terminal to the digital computer and entering a second password to obtain some of the data.
380. The method of claim 159, further including the steps of:
  entering a first password to operably connect the terminal to the digital computer and entering a second password to obtain some of the data.
381. The method of claim 160, further including the steps of:
  entering a first password to operably connect the terminal to the digital computer and entering a second password to obtain some of the data.
382. The method of claim 161, further including the steps of:
  entering a first password to operably connect the terminal to the digital computer and entering a second password to obtain some of the data.
383. The method of claim 162, further including the steps of:
  entering a first password to operably connect the terminal to the digital computer and entering a second password to obtain some of the data.
384. The method of claim 163, further including the steps of:
  entering a first password to operably connect the terminal to the digital computer and entering a second password to obtain some of the data.
385. The method of claim 164, further including the steps of:
  entering a first password to operably connect the terminal to the digital computer and entering a second password to obtain some of the data.
386. The method of claim 165, further including the steps of:
  entering a first password to operably connect the terminal to the digital computer and entering a second password to obtain some of the data.
387. The method of claim 166, further including the steps of:
  entering a first password to operably connect the terminal to the digital computer and entering a second password to obtain some of the data.
388. The method of claim 167, further including the steps of:
  entering a first password to operably connect the terminal to the digital computer and entering a second password to obtain some of the data.
389. The method of claim 168, further including the steps of:
  entering a first password to operably connect the terminal to the digital computer and entering a second password to obtain some of the data.
390. The method of claim 169, further including the steps of:
  entering a first password to operably connect the terminal to the digital computer and entering a second password to obtain some of the data.
391. The method of claim 170, further including the steps of:
  entering a first password to operably connect the terminal to the digital computer and entering a second password to obtain some of the data.
392. The method of claim 171, further including the steps of:
  entering a first password to operably connect the terminal to the digital computer and entering a second password to obtain some of the data.
393. The method of claim 172, further including the steps of:
  entering a first password to operably connect the terminal to the digital computer and entering a second password to obtain some of the data.

394. The method of claim 173, further including the steps of:
    entering a first password to operably connect the terminal to the digital computer and entering a second password to obtain some of the data.
395. The method of claim 174, further including the steps of:
    entering a first password to operably connect the terminal to the digital computer and entering a second password to obtain some of the data.
396. The method of claim 175, further including the steps of:
    entering a first password to operably connect the terminal to the digital computer and entering a second password to obtain some of the data.
397. The method of claim 176, further including the steps of:
    entering a first password to operably connect the terminal to the digital computer and entering a second password to obtain some of the data.
398. The method of claim 177, further including the steps of:
    entering a first password to operably connect the terminal to the digital computer and entering a second password to obtain some of the data.
399. The method of claim 178, further including the steps of:
    entering a first password to operably connect the terminal to the digital computer and entering a second password to obtain some of the data.
400. The method of claim 179, further including the steps of:
    entering a first password to operably connect the terminal to the digital computer and entering a second password to obtain some of the data.
401. The method of claim 180, further including the steps of:
    entering a first password to operably connect the terminal to the digital computer and entering a second password to obtain some of the data.
402. The method of claim 181, further including the steps of:
    entering a first password to operably connect the terminal to the digital computer and entering a second password to obtain some of the data.
403. The method of claim 182, further including the steps of:
    entering a first password to operably connect the terminal to the digital computer and entering a second password to obtain some of the data.
404. The method of claim 183, further including the steps of:
    entering a first password to operably connect the terminal to the digital computer and entering a second password to obtain some of the data.
405. The method of claim 184, further including the steps of:
    entering a first password to operably connect the terminal to the digital computer and entering a second password to obtain some of the data.
406. The method of claim 185, further including the steps of:
    entering a first password to operably connect the terminal to the digital computer and entering a second password to obtain some of the data.
407. The method of claim 186, further including the steps of:
    entering a first password to operably connect the terminal to the digital computer and entering a second password to obtain some of the data.
408. The method of claim 187, further including the steps of:
    entering a first password to operably connect the terminal to the digital computer and entering a second password to obtain some of the data.
409. The method of claim 188, further including the steps of:
    entering a first password to operably connect the terminal to the digital computer and entering a second password to obtain some of the data.
410. The method of claim 189, further including the steps of:
    entering a first password to operably connect the terminal to the digital computer and entering a second password to obtain some of the data.
411. The method of claim 190, further including the steps of:
    entering a first password to operably connect the terminal to the digital computer and entering a second password to obtain some of the data.
412. The method of claim 191, further including the steps of:
    entering a first password to operably connect the terminal to the digital computer and entering a second password to obtain some of the data.
413. The method of claim 192, further including the steps of:
    entering a first password to operably connect the terminal to the digital computer and entering a second password to obtain some of the data.
414. The method of claim 193, further including the steps of:
    entering a first password to operably connect the terminal to the digital computer and entering a second password to obtain some of the data.
415. The method of claim 194, further including the steps of:
    entering a first password to operably connect the terminal to the digital computer and entering a second password to obtain some of the data.
416. The method of claim 195, further including the steps of:
    entering a first password to operably connect the terminal to the digital computer and entering a second password to obtain some of the data.
417. The method of claim 196, further including the steps of:
    entering a first password to operably connect the terminal to the digital computer and entering a second password to obtain some of the data.
418. The method of claim 197, further including the steps of:
    entering a first password to operably connect the terminal to the digital computer and entering a second password to obtain some of the data.
419. The method of claim 198, further including the steps of:
    entering a first password to operably connect the terminal to the digital computer and entering a second password to obtain some of the data.

420. The method of claim 199, further including the steps of:
entering a first password to operably connect the terminal to the digital computer and entering a second password to obtain some of the data.

421. The method of claim 200, further including the steps of:
entering a first password to operably connect the terminal to the digital computer and entering a second password to obtain some of the data.

422. The method of claim 201, further including the steps of:
entering a first password to operably connect the terminal to the digital computer and entering a second password to obtain some of the data.

423. The method of claim 202, further including the steps of:
entering a first password to operably connect the terminal to the digital computer and entering a second password to obtain some of the data.

424. The method of claim 203, further including the steps of:
entering a first password to operably connect the terminal to the digital computer and entering a second password to obtain some of the data.

425. The method of claim 204, further including the steps of:
entering a first password to operably connect the terminal to the digital computer and entering a second password to obtain some of the data.

426. The method of claim 205, further including the steps of:
entering a first password to operably connect the terminal to the digital computer and entering a second password to obtain some of the data.

427. The method of claim 206, further including the steps of:
entering a first password to operably connect the terminal to the digital computer and entering a second password to obtain some of the data.

428. The method of claim 207, further including the steps of:
entering a first password to operably connect the terminal to the digital computer and entering a second password to obtain some of the data.

429. The method of claim 208, further including the steps of:
entering a first password to operably connect the terminal to the digital computer and entering a second password to obtain some of the data.

430. The method of claim 209, further including the steps of:
entering a first password to operably connect the terminal to the digital computer and entering a second password to obtain some of the data.

431. The method of claim 210, further including the steps of:
entering a first password to operably connect the terminal to the digital computer and entering a second password to obtain some of the data.

432. The method of claim 211, further including the steps of:
entering a first password to operably connect the terminal to the digital computer and entering a second password to obtain some of the data.

433. The method of claim 212, further including the steps of:
entering a first password to operably connect the terminal to the digital computer and entering a second password to obtain some of the data.

434. The method of claim 213, further including the steps of:
entering a first password to operably connect the terminal to the digital computer and entering a second password to obtain some of the data.

435. The method of claim 214, further including the steps of:
entering a first password to operably connect the terminal to the digital computer and entering a second password to obtain some of the data.

436. The method of claim 215, further including the steps of:
entering a first password to operably connect the terminal to the digital computer and entering a second password to obtain some of the data.

437. The method of claim 216, further including the steps of:
entering a first password to operably connect the terminal to the digital computer and entering a second password to obtain some of the data.

438. The method of claim 217, further including the steps of:
entering a first password to operably connect the terminal to the digital computer and entering a second password to obtain some of the data.

439. The method of claim 218, further including the steps of:
entering a first password to operably connect the terminal to the digital computer and entering a second password to obtain some of the data.

440. The method to claim 219, further including the steps of:
entering a first password to operably connect the terminal to the digital computer and entering a second password to obtain some of the data.

441. The method of claim 220, further including the steps of:
entering a first password to operably connect the terminal to the digital computer and entering a second password to obtain some of the data.

442. The method of claim 221, further including the steps of:
entering a first password to operably connect the terminal to the digital computer and entering a second password to obtain some of the data.

443. The method of claim 222, further including the steps of:
entering a first password to operably connect the terminal to the digital computer and entering a second password to obtain some of the data.

444. The method of claim 223, further including the steps of:
entering a first password to operably connect the terminal to the digital computer and entering a second password to obtain some of the data.

445. The method of claim 1, further including the step of:
carrying out a direct sale of the financial product via said digital computer.

446. The method of claim 2, further including the step of:
carrying out a direct sale of the financial product via said digital computer.

447. The method of claim 3, further including the step of:
carrying out a direct sale of the financial product via said digital computer.

448. The method of claim 4, further including the step of:
carrying out a direct sale of the financial product via said digital computer.

449. The method of claim 5, further including the step of:
carrying out a direct sale of the financial product via said digital computer.

450. The method of claim 6, further including the step of:
carrying out a direct sale of the financial product via said digital computer.

451. The method of claim 7, further including the step of:
carrying out a direct sale of the financial product via said digital computer.

452. The method of claim 8, further including the step of:
carrying out a direct sale of the financial product via said digital computer.

453. The method of claim 9, further including the step of:
carrying out a direct sale of the financial product via said digital computer.

454. The method of claim 10, further including the step of:
carrying out a direct sale of the financial product via said digital computer.

455. The method of claim 11, further including the step of:
carrying out a direct sale of the financial product via said digital computer.

456. The method of claim 12, further including the step of:
carrying out a direct sale of the financial product via said digital computer.

457. The method of claim 13, further including the step of:
carrying out a direct sale of the financial product via said digital computer.

458. The method of claim 14, further including the step of:
carrying out a direct sale of the financial product via said digital computer.

459. The method of claim 15, further including the step of:
carrying out a direct sale of the financial product via said digital computer.

460. The method of claim 16, further including the step of:
carrying out a direct sale of the financial product via said digital computer.

461. The method of claim 17, further including the step of:
carrying out a direct sale of the financial product via said digital computer.

462. The method of claim 18, further including the step of:
carrying out a direct sale of the financial product via said digital computer.

463. The method of claim 19, further including the step of:
carrying out a direct sale of the financial product via said digital computer.

464. The method of claim 20, further including the step of:
carrying out a direct sale of the financial product via said digital computer.

465. The method of claim 21, further including the step of:
carrying out a direct sale of the financial product via said digital computer.

466. The method of claim 22, further including the step of:
carrying out a direct sale of the financial product via said digital computer.

467. The method of claim 23, further including the step of:
carrying out a direct sale of the financial product via said digital computer.

468. The method of claim 24, further including the step of:
carrying out a direct sale of the financial product via said digital computer.

469. The method of claim 25, further including the step of:
carrying out a direct sale of the financial product via said digital computer.

470. The method of claim 26, further including the step of:
carrying out a direct sale of the financial product via said digital computer.

471. The method of claim 27, further including the step of:
carrying out a direct sale of the financial product via said digital computer.

472. The method of claim 28, further including the step of:
carrying out a direct sale of the financial product via said digital computer.

473. The method of claim 29, further including the step of:
carrying out a direct sale of the financial product via said digital computer.

474. The method of claim 30, further including the step of:
carrying out a direct sale of the financial product via said digital computer.

475. The method of claim 33, further including the step of:
carrying out a direct sale of the financial product via said digital computer.

476. The method of claim 34, further including the step of:
carrying out a direct sale of the financial product via said digital computer.

477. The method of claim 35, further including the step of:
carrying out a direct sale of the financial product via said digital computer.

478. The method of claim 36, further including the step of:
carrying out a direct sale of the financial product via said digital computer.

479. The method of claim 37, further including the step of:
carrying out a direct sale of the financial product via said digital computer.

480. The method of claim 38, further including the step of:
carrying out a direct sale of the financial product via said digital computer.

481. The method of claim 39, further including the step of:
carrying out a direct sale of the financial product via said digital computer.

482. The method of claim 40, further including the step of:
carrying out a direct sale of the financial product via said digital computer.

483. The method of claim 41, further including the step of:
carrying out a direct sale of the financial product via said digital computer.

484. The method of claim 42, further including the step of:
carrying out a direct sale of the financial product via said digital computer.

485. The method of claim 43, further including the step of:
carrying out a direct sale of the financial product via said digital computer.

486. The method of claim 44, further including the step of:
carrying out a direct sale of the financial product via said digital computer.

487. The method of claim 45, further including the step of:
carrying out a direct sale of the financial product via said digital computer.

488. The method of claim 46, further including the step of:
carrying out a direct sale of the financial product via said digital computer.

489. The method of claim 47, further including the step of:
carrying out a direct sale of the financial product via said digital computer.

490. The method of claim 48, further including the step of:
carrying out a direct sale of the financial product via said digital computer.

491. The method of claim 49, further including the step of:
carrying out a direct sale of the financial product via said digital computer.

492. The method of claim 50, further including the step of:
carrying out a direct sale of the financial product via said digital computer.

493. The method of claim 51, further including the step of:
carrying out a direct sale of the financial product via said digital computer.

494. The method of claim 52, further including the step of:
carrying out a direct sale of the financial product via said digital computer.

495. The method of claim 53, further including the step of:
carrying out a direct sale of the financial product via said digital computer.

496. The method of claim 54, further including the step of:
carrying out a direct sale of the financial product via said digital computer.

497. The method of claim 55, further including the step of:
carrying out a direct sale of the financial product via said digital computer.

498. The method of claim 56, further including the step of:
carrying out a direct sale of the financial product via said digital computer.

499. The method of claim 57, further including the step of:
carrying out a direct sale of the financial product via said digital computer.

500. The method of claim 58, further including the step of:
carrying out a direct sale of the financial product via said digital computer.

501. The method of claim 59, further including the step of:
carrying out a direct sale of the financial product via said digital computer.

502. The method of claim 60, further including the step of:
carrying out a direct sale of the financial product via said digital computer.

503. The method of claim 61, further including the step of:
carrying out a direct sale of the financial product via said digital computer.

504. The method of claim 62, further including the step of:
carrying out a direct sale of the financial product via said digital computer.

505. The method of claim 63, further including the step of:
carrying out a direct sale of the financial product via said digital computer.

506. The method of claim 64, further including the step of:
carrying out a direct sale of the financial product via said digital computer.

507. The method of claim 65, further including the step of:
carrying out a direct sale of the financial product via said digital computer.

508. The method of claim 66, further including the step of:
carrying out a direct sale of the financial product via said digital computer.

509. The method of claim 67, further including the step of:
carrying out a direct sale of the financial product via said digital computer.

510. The method of claim 68, further including the step of:
carrying out a direct sale of the financial product via said digital computer.

511. The method of claim 68, further including the step of:
carrying out a direct sale of the financial product via said digital computer.

512. The method of claim 69, further including the step of:
carrying out a direct sale of the financial product via said digital computer.

513. The method of claim 70, further including the step of:

carrying out a direct sale of the financial product via said digital computer.

514. The method of claim 71, further including the step of:

carrying out a direct sale of the financial product via said digital computer.

515. The method of claim 72, further including the step of:

carrying out a direct sale of the financial product via said digital computer.

516. The method of claim 73, further including the step of:

carrying out a direct sale of the financial product via said digital computer.

517. The method of claim 74, further including the step of:

carrying out a direct sale of the financial product via said digital computer.

518. The method of claim 75, further including the step of:

carrying out a direct sale of the financial product via said digital computer.

519. The method of claim 76, further including the step of:

carrying out a direct sale of the financial product via said digital computer.

520. The method of claim 77, further including the step of:

carrying out a direct sale of the financial product via said digital computer.

521. The method of claim 78, further including the step of:

carrying out a direct sale of the financial product via said digital computer.

522. The method of claim 79, further including the step of:

carrying out a direct sale of the financial product via said digital computer.

523. The method of claim 80, further including the step of:

carrying out a direct sale of the financial product via said digital computer.

524. The method of claim 81, further including the step of:

carrying out a direct sale of the financial product via said digital computer.

525. The method of claim 82, further including the step of:

carrying out a direct sale of the financial product via said digital computer.

526. The method of claim 83, further including the step of:

carrying out a direct sale of the financial product via said digital computer.

527. The method of claim 84, further including the step of:

carrying out a direct sale of the financial product via said digital computer.

528. The method of claim 85, further including the step of:

carrying out a direct sale of the financial product via said digital computer.

529. The method of claim 86, further including the step of:

carrying out a direct sale of the financial product via said digital computer.

530. The method of claim 87, further including the step of:

carrying out a direct sale of the financial product via said digital computer.

531. The method of claim 88, further including the step of:

carrying out a direct sale of the financial product via said digital computer.

532. The method of claim 89, further including the step of:

carrying out a direct sale of the financial product via said digital computer.

533. The method of claim 90, further including the step of:

carrying out a direct sale of the financial product via said digital computer.

534. The method of claim 91, further including the step of:

carrying out a direct sale of the financial product via said digital computer.

535. The method of claim 92, further including the step of:

carrying out a direct sale of the financial product via said digital computer.

536. The method of claim 93, further including the step of:

carrying out a direct sale of the financial product via said digital computer.

537. The method of claim 94, further including the step of:

carrying out a direct sale of the financial product via said digital computer.

538. The method of claim 95, further including the step of:

carrying out a direct sale of the financial product via said digital computer.

539. The method of claim 96, further including the step of:

carrying out a direct sale of the financial product via said digital computer.

540. The method of claim 97, further including the step of:

carrying out a direct sale of the financial product via said digital computer.

541. The method of claim 98, further including the step of:

carrying out a direct sale of the financial product via said digital computer.

542. The method of claim 99, further including the step of:

carrying out a direct sale of the financial product via said digital computer.

543. The method of claim 100, further including the step of:

carrying out a direct sale of the financial product via said digital computer.

544. The method of claim 101, further including the step of:

carrying out a direct sale of the financial product via said digital computer.

545. The method of claim 102, further including the step of:

carrying out a direct sale of the financial product via said digital computer.

546. The method of claim 103, further including the step of:

carrying out a direct sale of the financial product via said digital computer.

547. The method of claim 104, further including the step of:

carrying out a direct sale of the financial product via said digital computer.

548. The method of claim 105, further including the step of:

carrying out a direct sale of the financial product via said digital computer.

549. The method of claim 106, further including the step of:

carrying out a direct sale of the financial product via said digital computer.

550. The method of claim 107, further including the step of:

carrying out a direct sale of the financial product via said digital computer.

551. The method of claim 108, further including the step of:

carrying out a direct sale of the financial product via said digital computer.

552. The method of claim 109, further including the step of:

carrying out a direct sale of the financial product via said digital computer.

553. The method of claim 110, further including the step of:

carrying out a direct sale of the financial product via said digital computer.

554. The method of claim 111, further including the step of:

carrying out a direct sale of the financial product via said digital computer.

555. The method of claim 112, further including the step of:

carrying out a direct sale of the financial product via said digital computer.

556. The method of claim 113, further including the step of:

carrying out a direct sale of the financial product via said digital computer.

557. The method of claim 114, further including the step of:

carrying out a direct sale of the financial product via said digital computer.

558. The method of claim 115, further including the step of:

carrying out a direct sale of the financial product via said digital computer.

559. The method of claim 116, further including the step of:

carrying out a direct sale of the financial product via said digital computer.

560. The method of claim 117, further including the step of:

carrying out a direct sale of the financial product via said digital computer.

561. The method of claim 118, further including the step of:

carrying out a direct sale of the financial product via said digital computer.

562. The method of claim 119, further including the step of:

carrying out a direct sale of the financial product via said digital computer.

563. The method of claim 120, further including the step of:

carrying out a direct sale of the financial product via said digital computer.

564. The method of claim 121, further including the step of:

carrying out a direct sale of the financial product via said digital computer.

565. The method of claim 122, further including the step of:

carrying out a direct sale of the financial product via said digital computer.

566. The method of claim 123, further including the step of:

carrying out a direct sale of the financial product via said digital computer.

567. The method of claim 124, further including the step of:

carrying out a direct sale of the financial product via said digital computer.

568. The method of claim 125, further including the step of:

carrying out a direct sale of the financial product via said digital computer.

569. The method of claim 126, further including the step of:

carrying out a direct sale of the financial product via said digital computer.

570. The method of claim 127, further including the step of:

carrying out a direct sale of the financial product via said digital computer.

571. The method of claim 128, further including the step of:

carrying out a direct sale of the financial product via said digital computer.

572. The method of claim 129, further including the step of:

carrying out a direct sale of the financial product via said digital computer.

573. The method of claim 130, further including the step of:

carrying out a direct sale of the financial product via said digital computer.

574. The method of claim 131, further including the step of:

carrying out a direct sale of the financial product via said digital computer.

575. The method of claim 132, further including the step of:

carrying out a direct sale of the financial product via said digital computer.

576. The method of claim 133, further including the step of:

carrying out a direct sale of the financial product via said digital computer.

577. The method of claim 134, further including the step of:

carrying out a direct sale of the financial product via said digital computer.

578. The method of claim 135, further including the step of:

carrying out a direct sale of the financial product via said digital computer.

579. The method of claim 136, further including the step of:

carrying out a direct sale of the financial product via said digital computer.

580. The method of claim 137, further including the step of:

carrying out a direct sale of the financial product via said digital computer.

581. The method of claim 138, further including the step of:

carrying out a direct sale of the financial product via said digital computer.

582. The method of claim 139, further including the step of:

carrying out a direct sale of the financial product via said digital computer.

583. The method of claim 140, further including the step of:

carrying out a direct sale of the financial product via said digital computer.

584. The method of claim 141, further including the step of:

carrying out a direct sale of the financial product via said digital computer.

585. The method of claim 142, further including the step of:

carrying out a direct sale of the financial product via said digital computer.

586. The method of claim 143, further including the step of:

carrying out a direct sale of the financial product via said digital computer.

587. The method of claim 144, further including the step of:

carrying out a direct sale of the financial product via said digital computer.

588. The method of claim 145, further including the step of:

carrying out a direct sale of the financial product via said digital computer.

589. The method of claim 146, further including the step of:

carrying out a direct sale of the financial product via said digital computer.

590. The method of claim 147, further including the step of:

carrying out a direct sale of the financial product via said digital computer.

591. The method of claim 148, further including the step of:

carrying out a direct sale of the financial product via said digital computer.

592. The method of claim 149, further including the step of:

carrying out a direct sale of the financial product via said digital computer.

593. The method of claim 150, further including the step of:

carrying out a direct sale of the financial product via said digital computer.

594. The method of claim 151, further including the step of:

carrying out a direct sale of the financial product via said digital computer.

595. The method of claim 152, further including the step of:

carrying out a direct sale of the financial product via said digital computer.

596. The method of claim 153, further including the step of:

carrying out a direct sale of the financial product via said digital computer.

597. The method of claim 154, further including the step of:

carrying out a direct sale of the financial product via said digital computer.

598. The method of claim 155, further including the step of:

carrying out a direct sale of the financial product via said digital computer.

599. The method of claim 156, further including the step of:

carrying out a direct sale of the financial product via said digital computer.

600. The method of claim 157, further including the step of:

carrying out a direct sale of the financial product via said digital computer.

601. The method of claim 158, further including the step of:

carrying out a direct sale of the financial product via said digital computer.

602. The method of claim 159, further including the step of:

carrying out a direct sale of the financial product via said digital computer.

603. The method of claim 160, further including the step of:

carrying out a direct sale of the financial product via said digital computer.

604. The method of claim 161, further including the step of:

carrying out a direct sale of the financial product via said digital computer.

605. The method of claim 162, further including the step of:

carrying out a direct sale of the financial product via said digital computer.

606. The method of claim 163, further including the step of:

carrying out a direct sale of the financial product via said digital computer.

607. The method of claim 164, further including the step of:

carrying out a direct sale of the financial product via said digital computer.

608. The method of claim 165, further including the step of:

carrying out a direct sale of the financial product via said digital computer.

609. The method of claim 166, further including the step of:

carrying out a direct sale of the financial product via said digital computer.

610. The method of claim 167, further including the step of:

carrying out a direct sale of the financial product via said digital computer.

611. The method of claim 168, further including the step of:

carrying out a direct sale of the financial product via said digital computer.

612. The method of claim 169, further including the step of:

carrying out a direct sale of the financial product via said digital computer.

613. The method of claim 170, further including the step of:

carrying out a direct sale of the financial product via said digital computer.

614. The method of claim 171, further including the step of:

carrying out a direct sale of the financial product via said digital computer.

615. The method of claim 172, further including the step of:

carrying out a direct sale of the financial product via said digital computer.

616. The method of claim 173, further including the step of:

carrying out a direct sale of the financial product via said digital computer.

617. The method of claim 174, further including the step of:

carrying out a direct sale of the financial product via said digital computer.

618. The method of claim 175, further including the step of:

carrying out a direct sale of the financial product via said digital computer.

619. The method of claim 176, further including the step of:

carrying out a direct sale of the financial product via said digital computer.

620. The method of claim 177, further including the step of:

carrying out a direct sale of the financial product via said digital computer.

621. The method of claim 178, further including the step of:

carrying out a direct sale of the financial product via said digital computer.

622. The method of claim 179, further including the step of:

carrying out a direct sale of the financial product via said digital computer.

623. The method of claim 180, further including the step of:

carrying out a direct sale of the financial product via said digital computer.

624. The method of claim 181, further including the step of:

carrying out a direct sale of the financial product via said digital computer.

625. The method of claim 182, further including the step of:

carrying out a direct sale of the financial product via said digital computer.

626. The method of claim 183, further including the step of:

carrying out a direct sale of the financial product via said digital computer.

627. The method of claim 184, further including the step of:

carrying out a direct sale of the financial product via said digital computer.

628. The method of claim 185, further including the step of:

carrying out a direct sale of the financial product via said digital computer.

629. The method of claim 186, further including the step of:

carrying out a direct sale of the financial product via said digital computer.

630. The method of claim 187, further including the step of:

carrying out a direct sale of the financial product via said digital computer.

631. The method of claim 188, further including the step of:

carrying out a direct sale of the financial product via said digital computer.

632. The method of claim 189, further including the step of:

carrying out a direct sale of the financial product via said digital computer.

633. The method of claim 190, further including the step of:

carrying out a direct sale of the financial product via said digital computer.

634. The method of claim 191, further including the step of:

carrying out a direct sale of the financial product via said digital computer.

635. The method of claim 192, further including the step of:

carrying out a direct sale of the financial product via said digital computer.

636. The method of claim 193, further including the step of:

carrying out a direct sale of the financial product via said digital computer.

637. The method of claim 194, further including the step of:

carrying out a direct sale of the financial product via said digital computer.

638. The method of claim 195, further including the step of:

carrying out a direct sale of the financial product via said digital computer.

639. The method of claim 196, further including the step of:

carrying out a direct sale of the financial product via said digital computer.

640. The method of claim 197, further including the step of:

carrying out a direct sale of the financial product via said digital computer.

641. The method of claim 198, further including the step of:

carrying out a direct sale of the financial product via said digital computer.

642. The method of claim 199, further including the step of:

carrying out a direct sale of the financial product via said digital computer.

643. The method of claim 200, further including the step of:

carrying out a direct sale of the financial product via said digital computer.

644. The method of claim 201, further including the step of:

carrying out a direct sale of the financial product via said digital computer.

645. The method of claim 202, further including the step of:

carrying out a direct sale of the financial product via said digital computer.

646. The method of claim 203, further including the step of:

carrying out a direct sale of the financial product via said digital computer.

647. The method of claim 204, further including the step of:

carrying out a direct sale of the financial product via said digital computer.

648. The method of claim 205, further including the step of:

carrying out a direct sale of the financial product via said digital computer.

649. The method of claim 206, further including the step of:

carrying out a direct sale of the financial product via said digital computer.

650. The method of claim 207, further including the step of:

carrying out a direct sale of the financial product via said digital computer.

651. The method of claim 208, further including the step of:

carrying out a direct sale of the financial product via said digital computer.

652. The method of claim 209, further including the step of:

carrying out a direct sale of the financial product via said digital computer.

653. The method of claim 210, further including the step of:

carrying out a direct sale of the financial product via said digital computer.

654. The method of claim 211, further including the step of:

carrying out a direct sale of the financial product via said digital computer.

655. The method of claim 212, further including the step of:

carrying out a direct sale of the financial product via said digital computer.

656. The method of claim 213, further including the step of:

carrying out a direct sale of the financial product via said digital computer.

657. The method of claim 214, further including the step of:

carrying out a direct sale of the financial product via said digital computer.

658. The method of claim 215, further including the step of:

carrying out a direct sale of the financial product via said digital computer.

659. The method of claim 216, further including the step of:

carrying out a direct sale of the financial product via said digital computer.

660. The method of claim 217, further including the step of:

carrying out a direct sale of the financial product via said digital computer.

661. The method of claim 218, further including the step of:

carrying out a direct sale of the financial product via said digital computer.

662. The method of claim 219, further including the step of:

carrying out a direct sale of the financial product via said digital computer.

663. The method of claim 220, further including the step of:

carrying out a direct sale of the financial product via said digital computer.

664. The method of claim 221, further including the step of:

carrying out a direct sale of the financial product via said digital computer.

665. The method of claim 222, further including the step of:

carrying out a direct sale of the financial product via said digital computer.

666. The method of claim 223, further including the step of:

carrying out a direct sale of the financial product via said digital computer.

667. The method of claim 224, further including the step of:

carrying out a direct sale of the financial product via said digital computer.

668. The method of claim 225, further including the step of:

carrying out a direct sale of the financial product via said digital computer.

669. The method of claim 226, further including the step of:

carrying out a direct sale of the financial product via said digital computer.

670. The method of claim 227, further including the step of:

carrying out a direct sale of the financial product via said digital computer.

671. The method of claim 228, further including the step of:

carrying out a direct sale of the financial product via said digital computer.

672. The method of claim 229, further including the step of:

carrying out a direct sale of the financial product via said digital computer.

673. The method of claim 230, further including the step of:

carrying out a direct sale of the financial product via said digital computer.

674. The method of claim 231, further including the step of:

carrying out a direct sale of the financial product via said digital computer.

675. The method of claim 232, further including the step of:

carrying out a direct sale of the financial product via said digital computer.

676. The method of claim 233, further including the step of:

carrying out a direct sale of the financial product via said digital computer.

677. The method of claim 234, further including the step of:

carrying out a direct sale of the financial product via said digital computer.

678. The method of claim 235, further including the step of:

carrying out a direct sale of the financial product via said digital computer.

679. The method of claim 236, further including the step of:

carrying out a direct sale of the financial product via said digital computer.

680. The method of claim 237, further including the step of:

carrying out a direct sale of the financial product via said digital computer.

681. The method of claim 238, further including the step of:

carrying out a direct sale of the financial product via said digital computer.

682. The method of claim 239, further including the step of:

carrying out a direct sale of the financial product via said digital computer.

683. The method of claim 240, further including the step of:

carrying out a direct sale of the financial product via said digital computer.

684. The method of claim 241, further including the step of:

carrying out a direct sale of the financial product via said digital computer.

685. The method of claim 242, further including the step of:

carrying out a direct sale of the financial product via said digital computer.

686. The method of claim 243, further including the step of:

carrying out a direct sale of the financial product via said digital computer.

687. The method of claim 244, further including the step of:

carrying out a direct sale of the financial product via said digital computer.

688. The method of claim 245, further including the step of:

carrying out a direct sale of the financial product via said digital computer.

689. The method of claim 246, further including the step of:

carrying out a direct sale of the financial product via said digital computer.

690. The method of claim 247, further including the step of:

carrying out a direct sale of the financial product via said digital computer.

691. The method of claim 248, further including the step of:

carrying out a direct sale of the financial product via said digital computer.

692. The method of claim 249, further including the step of:

carrying out a direct sale of the financial product via said digital computer.

693. The method of claim 250, further including the step of:

carrying out a direct sale of the financial product via said digital computer.

694. The method of claim 251, further including the step of:

carrying out a direct sale of the financial product via said digital computer.

695. The method of claim 252, further including the step of:

carrying out a direct sale of the financial product via said digital computer.

696. The method of claim 253, further including the step of:

carrying out a direct sale of the financial product via said digital computer.

697. The method of claim 254, further including the step of:

carrying out a direct sale of the financial product via said digital computer.

698. The method of claim 255, further including the step of:

carrying out a direct sale of the financial product via said digital computer.

699. The method of claim 256, further including the step of:

carrying out a direct sale of the financial product via said digital computer.

700. The method of claim 257, further including the step of:

carrying out a direct sale of the financial product via said digital computer.

701. The method of claim 258, further including the step of:

carrying out a direct sale of the financial product via said digital computer.

702. The method of claim 259, further including the step of:

carrying out a direct sale of the financial product via said digital computer.

703. The method of claim 260, further including the step of:

carrying out a direct sale of the financial product via said digital computer.

704. The method of claim 261, further including the step of:

carrying out a direct sale of the financial product via said digital computer.

705. The method of claim 262, further including the step of:

carrying out a direct sale of the financial product via said digital computer.

706. The method of claim 263, further including the step of:

carrying out a direct sale of the financial product via said digital computer.

707. The method of claim 264, further including the step of:

carrying out a direct sale of the financial product via said digital computer.

708. The method of claim 265, further including the step of:

carrying out a direct sale of the financial product via said digital computer.

709. The method of claim 266, further including the step of:

carrying out a direct sale of the financial product via said digital computer.

710. The method of claim 267, further including the step of:

carrying out a direct sale of the financial product via said digital computer.

711. The method of claim 268, further including the step of:

carrying out a direct sale of the financial product via said digital computer.

712. The method of claim 269, further including the step of:

carrying out a direct sale of the financial product via said digital computer.

713. The method of claim 270, further including the step of:

carrying out a direct sale of the financial product via said digital computer.

714. The method of claim 271, further including the step of:

carrying out a direct sale of the financial product via said digital computer.

715. The method of claim 272, further including the step of:

carrying out a direct sale of the financial product via said digital computer.

716. The method of claim 273, further including the step of:

carrying out a direct sale of the financial product via said digital computer.

717. The method of claim 274, further including the step of:

carrying out a direct sale of the financial product via said digital computer.

718. The method of claim 275, further including the step of:

carrying out a direct sale of the financial product via said digital computer.

719. The method of claim 276, further including the step of:

carrying out a direct sale of the financial product via said digital computer.

720. The method of claim 277, further including the step of:

carrying out a direct sale of the financial product via said digital computer.

721. The method of claim 278, further including the step of:

carrying out a direct sale of the financial product via said digital computer.

722. The method of claim 279, further including the step of:

carrying out a direct sale of the financial product via said digital computer.

723. The method of claim 280, further including the step of:

carrying out a direct sale of the financial product via said digital computer.

724. The method of claim 281, further including the step of:

carrying out a direct sale of the financial product via said digital computer.

725. The method of claim 282, further including the step of:

carrying out a direct sale of the financial product via said digital computer.

726. The method of claim 283, further including the step of:

carrying out a direct sale of the financial product via said digital computer.

727. The method of claim 284, further including the step of:

carrying out a direct sale of the financial product via said digital computer.

728. The method of claim 285, further including the step of:

carrying out a direct sale of the financial product via said digital computer.

729. The method of claim 286, further including the step of:

carrying out a direct sale of the financial product via said digital computer.

730. The method of claim 287, further including the step of:

carrying out a direct sale of the financial product via said digital computer.

731. The method of claim 288, further including the step of:

carrying out a direct sale of the financial product via said digital computer.

732. The method of claim 289, further including the step of:

carrying out a direct sale of the financial product via said digital computer.

733. The method of claim 290, further including the step of:

carrying out a direct sale of the financial product via said digital computer.

734. The method of claim 291, further including the step of:

carrying out a direct sale of the financial product via said digital computer.

735. The method of claim 292, further including the step of:

carrying out a direct sale of the financial product via said digital computer.

736. The method of claim 293, further including the step of:

carrying out a direct sale of the financial product via said digital computer.

737. The method of claim 294, further including the step of:

carrying out a direct sale of the financial product via said digital computer.

738. The method of claim 295, further including the step of:

carrying out a direct sale of the financial product via said digital computer.

739. The method of claim 296, further including the step of:

carrying out a direct sale of the financial product via said digital computer.

740. The method of claim 297, further including the step of:

carrying out a direct sale of the financial product via said digital computer.

741. The method of claim 298, further including the step of:

carrying out a direct sale of the financial product via said digital computer.

742. The method of claim 299, further including the step of:

carrying out a direct sale of the financial product via said digital computer.

743. The method of claim 300, further including the step of:

carrying out a direct sale of the financial product via said digital computer.

744. The method of claim 301, further including the step of:

carrying out a direct sale of the financial product via said digital computer.

745. The method of claim 302, further including the step of:

carrying out a direct sale of the financial product via said digital computer.

746. The method of claim 303, further including the step of:

carrying out a direct sale of the financial product via said digital computer.

747. The method of claim 304, further including the step of:

carrying out a direct sale of the financial product via said digital computer.

748. The method of claim 305, further including the step of:

carrying out a direct sale of the financial product via said digital computer.

749. The method of claim 306, further including the step of:

carrying out a direct sale of the financial product via said digital computer.

750. The method of claim 307, further including the step of:

carrying out a direct sale of the financial product via said digital computer.

751. The method of claim 308, further including the step of:

carrying out a direct sale of the financial product via said digital computer.

752. The method of claim 309, further including the step of:

carrying out a direct sale of the financial product via said digital computer.

753. The method of claim 310, further including the step of:

carrying out a direct sale of the financial product via said digital computer.

754. The method of claim 311, further including the step of:

carrying out a direct sale of the financial product via said digital computer.

755. The method of claim 312, further including the step of:

carrying out a direct sale of the financial product via said digital computer.

756. The method of claim 413, further including the step of:

carrying out a direct sale of the financial product via said digital computer.

757. The method of claim 314, further including the step of:

carrying out a direct sale of the financial product via said digital computer.

758. The method of claim 315, further including the step of:

carrying out a direct sale of the financial product via said digital computer.

759. The method of claim 316, further including the step of:

carrying out a direct sale of the financial product via said digital computer.

760. The method of claim 317, further including the step of:

carrying out a direct sale of the financial product via said digital computer.

761. The method of claim 318, further including the step of:

carrying out a direct sale of the financial product via said digital computer.

762. The method of claim 319, further including the step of:

carrying out a direct sale of the financial product via said digital computer.

763. The method of claim 320, further including the step of:

carrying out a direct sale of the financial product via said digital computer.

764. The method of claim 321, further including the step of:

carrying out a direct sale of the financial product via said digital computer.

765. The method of claim 322, further including the step of:

carrying out a direct sale of the financial product via said digital computer.

766. The method of claim 323, further including the step of:

carrying out a direct sale of the financial product via said digital computer.

767. The method of claim 324, further including the step of:

carrying out a direct sale of the financial product via said digital computer.

768. The method of claim 325, further including the step of:

carrying out a direct sale of the financial product via said digital computer.

769. The method of claim 326, further including the step of:

carrying out a direct sale of the financial product via said digital computer.

770. The method of claim 327, further including the step of:

carrying out a direct sale of the financial product via said digital computer.

771. The method of claim 328, further including the step of:

carrying out a direct sale of the financial product via said digital computer.

772. The method of claim 329, further including the step of:

carrying out a direct sale of the financial product via said digital computer.

773. The method of claim 330, further including the step of:

carrying out a direct sale of the financial product via said digital computer.

774. The method of claim 331, further including the step of:

carrying out a direct sale of the financial product via said digital computer.

775. The method of claim 332, further including the step of:

carrying out a direct sale of the financial product via said digital computer.

776. The method of claim 333, further including the step of:

carrying out a direct sale of the financial product via said digital computer.

777. The method of claim 334, further including the step of:

carrying out a direct sale of the financial product via said digital computer.

778. The method of claim 335, further including the step of:

carrying out a direct sale of the financial product via said digital computer.

779. The method of claim 336, further including the step of:

carrying out a direct sale of the financial product via said digital computer.

780. The method of claim 337, further including the step of:

carrying out a direct sale of the financial product via said digital computer.

781. The method of claim 338, further including the step of:

carrying out a direct sale of the financial product via said digital computer.

782. The method of claim 339, further including the step of:

carrying out a direct sale of the financial product via said digital computer.

783. The method of claim 340, further including the step of:

carrying out a direct sale of the financial product via said digital computer.

784. The method of claim 341, further including the step of:

carrying out a direct sale of the financial product via said digital computer.

785. The method of claim 342, further including the step of:

carrying out a direct sale of the financial product via said digital computer.

786. The method of claim 343, further including the step of:

carrying out a direct sale of the financial product via said digital computer.

787. The method of claim 344, further including the step of:

carrying out a direct sale of the financial product via said digital computer.

788. The method of claim 345, further including the step of:

carrying out a direct sale of the financial product via said digital computer.

789. The method of claim 346, further including the step of:

carrying out a direct sale of the financial product via said digital computer.

790. The method of claim 347, further including the step of:

carrying out a direct sale of the financial product via said digital computer.

791. The method of claim 348, further including the step of:

carrying out a direct sale of the financial product via said digital computer.

792. The method of claim 349, further including the step of:

carrying out a direct sale of the financial product via said digital computer.

793. The method of claim 350, further including the step of:

carrying out a direct sale of the financial product via said digital computer.

794. The method of claim 351, further including the step of:

carrying out a direct sale of the financial product via said digital computer.

795. The method of claim 352, further including the step of:

carrying out a direct sale of the financial product via said digital computer.

796. The method of claim 353, further including the step of:

carrying out a direct sale of the financial product via said digital computer.

797. The method of claim 354, further including the step of:

carrying out a direct sale of the financial product via said digital computer.

798. The method of claim 355, further including the step of:

carrying out a direct sale of the financial product via said digital computer.

799. The method of claim 356, further including the step of:

carrying out a direct sale of the financial product via said digital computer.

800. The method of claim 357, further including the step of:

carrying out a direct sale of the financial product via said digital computer.

801. The method of claim 358, further including the step of:

carrying out a direct sale of the financial product via said digital computer.

802. The method of claim 359, further including the step of:

carrying out a direct sale of the financial product via said digital computer.

803. The method of claim 360, further including the step of:

carrying out a direct sale of the financial product via said digital computer.

804. The method of claim 361, further including the step of:

carrying out a direct sale of the financial product via said digital computer.

805. The method of claim 362, further including the step of:

carrying out a direct sale of the financial product via said digital computer.

806. The method of claim 363, further including the step of:

carrying out a direct sale of the financial product via said digital computer.

807. The method of claim 364, further including the step of:

carrying out a direct sale of the financial product via said digital computer.

808. The method of claim 365, further including the step of:

carrying out a direct sale of the financial product via said digital computer.

809. The method of claim 366, further including the step of:

carrying out a direct sale of the financial product via said digital computer.

810. The method of claim 367, further including the step of:

carrying out a direct sale of the financial product via said digital computer.

811. The method of claim 368, further including the step of:

carrying out a direct sale of the financial product via said digital computer.

812. The method of claim 369, further including the step of:

carrying out a direct sale of the financial product via said digital computer.

813. The method of claim 370, further including the step of:

carrying out a direct sale of the financial product via said digital computer.

814. The method of claim 371, further including the step of:

carrying out a direct sale of the financial product via said digital computer.

815. The method of claim 372, further including the step of:

carrying out a direct sale of the financial product via said digital computer.

816. The method of claim 373, further including the step of:

carrying out a direct sale of the financial product via said digital computer.

817. The method of claim 374, further including the step of:

carrying out a direct sale of the financial product via said digital computer.

818. The method of claim 375, further including the step of:

carrying out a direct sale of the financial product via said digital computer.

819. The method of claim 376, further including the step of:

carrying out a direct sale of the financial product via said digital computer.

820. The method of claim 377, further including the step of:

carrying out a direct sale of the financial product via said digital computer.

821. The method of claim 378, further including the step of:

carrying out a direct sale of the financial product via said digital computer.

822. The method of claim 379, further including the step of:

carrying out a direct sale of the financial product via said digital computer.

823. The method of claim 380, further including the step of:

carrying out a direct sale of the financial product via said digital computer.

824. The method of claim 381, further including the step of:

carrying out a direct sale of the financial product via said digital computer.

825. The method of claim 382, further including the step of:

carrying out a direct sale of the financial product via said digital computer.

826. The method of claim 383, further including the step of:

carrying out a direct sale of the financial product via said digital computer.

827. The method of claim 384, further including the step of:

carrying out a direct sale of the financial product via said digital computer.

828. The method of claim 385, further including the step of:

carrying out a direct sale of the financial product via said digital computer.

829. The method of claim 386, further including the step of:

carrying out a direct sale of the financial product via said digital computer.

830. The method of claim 387, further including the step of:

carrying out a direct sale of the financial product via said digital computer.

831. The method of claim 388, further including the step of:

carrying out a direct sale of the financial product via said digital computer.

832. The method of claim 389, further including the step of:

carrying out a direct sale of the financial product via said digital computer.

833. The method of claim 390, further including the step of:

carrying out a direct sale of the financial product via said digital computer.

834. The method of claim 391, further including the step of:
carrying out a direct sale of the financial product via said digital computer.

835. The method of claim 392, further including the step of:
carrying out a direct sale of the financial product via said digital computer.

836. The method of claim 393, further including the step of:
carrying out a direct sale of the financial product via said digital computer.

837. The method of claim 394, further including the step of:
carrying out a direct sale of the financial product via said digital computer.

838. The method of claim 395, further including the step of:
carrying out a direct sale of the financial product via said digital computer.

839. The method of claim 396, further including the step of:
carrying out a direct sale of the financial product via said digital computer.

840. The method of claim 397, further including the step of:
carrying out a direct sale of the financial product via said digital computer.

841. The method of claim 398, further including the step of:
carrying out a direct sale of the financial product via said digital computer.

842. The method of claim 399, further including the step of:
carrying out a direct sale of the financial product via said digital computer.

843. The method of claim 400, further including the step of:
carrying out a direct sale of the financial product via said digital computer.

844. The method of claim 401, further including the step of:
carrying out a direct sale of the financial product via said digital computer.

845. The method of claim 402, further including the step of:
carrying out a direct sale of the financial product via said digital computer.

846. The method of claim 403, further including the step of:
carrying out a direct sale of the financial product via said digital computer.

847. The method of claim 404, further including the step of:
carrying out a direct sale of the financial product via said digital computer.

848. The method of claim 405, further including the step of:
carrying out a direct sale of the financial product via said digital computer.

849. The method of claim 406, further including the step of:
carrying out a direct sale of the financial product via said digital computer.

850. The method of claim 407, further including the step of:
carrying out a direct sale of the financial product via said digital computer.

851. The method of claim 408, further including the step of:
carrying out a direct sale of the financial product via said digital computer.

852. The method of claim 409, further including the step of:
carrying out a direct sale of the financial product via said digital computer.

853. The method of claim 410, further including the step of:
carrying out a direct sale of the financial product via said digital computer.

854. The method of claim 411, further including the step of:
carrying out a direct sale of the financial product via said digital computer.

855. The method of claim 412, further including the step of:
carrying out a direct sale of the financial product via said digital computer.

856. The method of claim 413, further including the step of:
carrying out a direct sale of the financial product via said digital computer.

857. The method of claim 414, further including the step of:
carrying out a direct sale of the financial product via said digital computer.

858. The method of claim 415, further including the step of:
carrying out a direct sale of the financial product via said digital computer.

859. The method of claim 416, further including the step of:
carrying out a direct sale of the financial product via said digital computer.

860. The method of claim 417, further including the step of:
carrying out a direct sale of the financial product via said digital computer.

861. The method of claim 418, further including the step of:
carrying out a direct sale of the financial product via said digital computer.

862. The method of claim 419, further including the step of:
carrying out a direct sale of the financial product via said digital computer.

863. The method of claim 420, further including the step of:
carrying out a direct sale of the financial product via said digital computer.

864. The method of claim 421, further including the step of:
carrying out a direct sale of the financial product via said digital computer.

865. The method of claim 422, further including the step of:

866. The method of claim 423, further including the step of:

carrying out a direct sale of the financial product via said digital computer.

867. The method of claim 424, further including the step of:

carrying out a direct sale of the financial product via said digital computer.

868. The method of claim 425, further including the step of:

carrying out a direct sale of the financial product via said digital computer.

869. The method of claim 426, further including the step of:

carrying out a direct sale of the financial product via said digital computer.

870. The method of claim 427, further including the step of:

carrying out a direct sale of the financial product via said digital computer.

871. The method of claim 428, further including the step of:

carrying out a direct sale of the financial product via said digital computer.

872. The method of claim 429, further including the step of:

carrying out a direct sale of the financial product via said digital computer.

873. The method of claim 430, further including the step of:

carrying out a direct sale of the financial product via said digital computer.

874. The method of claim 431, further including the step of:

carrying out a direct sale of the financial product via said digital computer.

875. The method of claim 432, further including the step of:

carrying out a direct sale of the financial product via said digital computer.

876. The method of claim 433, further including the step of:

carrying out a direct sale of the financial product via said digital computer.

877. The method of claim 434, further including the step of:

carrying out a direct sale of the financial product via said digital computer.

878. The method of claim 435, further including the step of:

carrying out a direct sale of the financial product via said digital computer.

879. The method of claim 436, further including the step of:

carrying out a direct sale of the financial product via said digital computer.

880. The method of claim 437, further including the step of:

carrying out a direct sale of the financial product via said digital computer.

881. The method of claim 438, further including the step of:

carrying out a direct sale of the financial product via said digital computer.

882. The method of claim 439, further including the step of:

carrying out a direct sale of the financial product via said digital computer.

883. The method of claim 440, further including the step of:

carrying out a direct sale of the financial product via said digital computer.

884. The method of claim 441, further including the step of:

carrying out a direct sale of the financial product via said digital computer.

885. The method of claim 442, further including the step of:

carrying out a direct sale of the financial product via said digital computer.

886. The method of claim 443, further including the step of:

carrying out a direct sale of the financial product via said digital computer.

887. The method of claim 444, further including the step of:

carrying out a direct sale of the financial product via said digital computer.

* * * * *

UNITED STATES PATENT AND TRADEMARK OFFICE
CERTIFICATE OF CORRECTION

| | | |
|---|---|---|
| PATENT NO. | : 6,684,189 B1 | Page 1 of 1 |
| APPLICATION NO. | : 08/906736 | |
| DATED | : January 27, 2004 | |
| INVENTOR(S) | : Ronald D. Ryan and Ronald G. Marquart | |

It is certified that error appears in the above-identified patent and that said Letters Patent is hereby corrected as shown below:

Title page, item (75) Inventors, delete "Ronald B. Ryan", and insert -- Ronald D. Ryan --.

Column 2, line 47, delete "Keough", and insert -- Keogh --.

Column 6, line 46, delete the word "and".

Column 13, line 26, delete "Keough", and insert -- Keogh --.

Column 13, line 32, delete "Keough", and insert -- Keogh --.

Column 31, line 50, delete "Keough", and insert -- Keogh --.

Column 52, line 45, delete "Keough", and insert -- Keogh --.

Column 54, line 34, delete "Keough", and insert -- Keogh --.

Column 79, line 67, delete "Keough", and insert -- Keogh --.

Column 117, line 40, delete "Keough", and insert -- Keogh --.

Signed and Sealed this
Third Day of July, 2012

David J. Kappos
*Director of the United States Patent and Trademark Office*